United States Patent [19]

Rupp

[11] 4,177,514

[45] Dec. 4, 1979

[54] GRAPH ARCHITECTURE INFORMATION PROCESSING SYSTEM

[75] Inventor: Charle' R. Rupp, Pittsfield, Mass.

[73] Assignee: General Electric Company

[21] Appl. No.: 853,880

[22] Filed: Nov. 22, 1977

Related U.S. Application Data

[63] Continuation of Ser. No. 741,421, Nov. 12, 1976, abandoned, which is a continuation-in-part of Ser. No. 707,721, Jul. 21, 1976, abandoned.

[51] Int. Cl.[2] ........................ G06F 15/16; G06F 15/34

[52] U.S. Cl. ........................ 364/200

[58] Field of Search ........................ 364/200 MS File

[56] References Cited

U.S. PATENT DOCUMENTS

| | | | |
|---|---|---|---|
| 3,530,438 | 9/1970 | Mellen et al. | 364/200 |
| 3,534,338 | 10/1970 | Christensen et al. | 364/200 |
| 3,641,505 | 2/1972 | Artz et al. | 364/200 |
| 3,665,421 | 5/1972 | Rehhauzer et al. | 364/200 |
| 3,905,023 | 9/1975 | Perpiglia | 364/200 |
| 3,973,245 | 8/1976 | Belser | 364/200 |
| 4,014,005 | 3/1977 | Fox et al. | 364/200 |

*Primary Examiner*—Harvey E. Springborn
*Attorney, Agent, or Firm*—Francis K. Richwine

[57] ABSTRACT

An information processing system employing functionally distributed multiple processors has a unique manner of interconnecting and controlling the processors so that the deadlock problem is avoided even though the interconnection of the processors is based on a graph basis in the mathematical sense. The system employs a plurality of control processors of the same or different design to control by sequences of instructions the operation of data processors or other control processors. Each data processor performs a specific set of functions on varying data structures to accomplish such purposes as providing a memory in which a program resides or performs arithmetic or string computations. The design of the control and data processors are required to meet the definition of a control arc scheme for inter-processor communication. Uniquely designed control processors and/or data processors are required to allow interaction with external processors, such as keyboard, display and mass memory devices which are desired to be included in a given system but do not meet the control arc interface requirements. A functional system describing the utility and the manner of implementing the principles of the invention illustrates novel approaches for the direct execution of high level programming languages, string computation sequences and the generation of displayed images from a common source language for varying types of displays.

18 Claims, 135 Drawing Figures

```
4D01   [
4D02      s. nul. .nul.
4D03      dO" .dle. THE SYMBOL: .cr.. tab.
4D04           .dc3. I .cr.
4D05           IS GIVEN WHICH OF THE .cr.
4D06           FOLLOWING NAMES ? .cr. "
4D07      S A 10, 02
4D08           dO "A. NAND .cr."
4D09      S B 10,02
4D10           dO" B. NOR.cr. "
4D11   [
4D12     *
4D13      [I.BACK.:::r]
4D14      [#Q + : =Q
4D15         [IA dO" INCORRECT ":e]
4D16         [IB dO" CORRECT " #e+I=c:e]
4D17          dO" INVALID ENTRY":r ]]
4D18     *
4D19    [ I. BACK: r]
```

FIG. 4E

| | META STATE | SELF OPCODE | SELF OPERAND | |
|---|---|---|---|---|
| 4E01 | PROG | PASW | ADVANCE | BEGIN INTERPRETATION STATE SEQUENCE PART |
| 4E02 | | LOAD | PMEM | |
| 4E03 | | NCLASS | BEGIN | |
| 4E04 | | EXEC | | |
| 4E05 | | JUMP | PROG | |
| 4E06 | # | JUMP | LET | STATE TRANSITION TABLE PART |
| 4E07 | . | JUMP | HALT | |
| 4E08 | [ | JUMP | DO | |
| 4E09 | ] | JUMP | END | |
| 4E10 | d | JUMP | DISPLAY | |
| 4E11 | e | JUMP | EXIT | |
| 4E12 | : | JUMP | END | |
| 4E13 | ⌊ | JUMP | ALT | |
| 4E14 | HALT | PASS | CLEARM | HALT STATE SEQUENCE PART |
| 4E15 | | PASS | ENABLE | |
| 4E16 | | HALT | | |
| 4E17 | HALT2 | PASW | PUSHM | |
| 4E18 | | JUMP | PROG | |
| 4E19 | DISPLAY | PASS | LINKFORM | DISPLAY STATE SEQUENCE PART |
| 4E20 | D | SCNW | ADVANCE | |
| 4E21 | | NCHAR | ' " ' | |
| 4E22 | | JUMP | DQUOTE | |
| 4E23 | | NCLASS | DIGIT | |
| 4E24 | | JUMP | DNUM | |
| | | JUMP | PROG | |
| 4E25 | DNUM | PASS | DCUSET | |
| 4E26 | | JUMP | D | |
| 4E27 | DQUOTE | SCNW | ADVANCE | DQUOTE STATE PART |
| 4E28 | | NCHAR | ' " ' | |
| 4E29 | | JUMP | D | |
| 4E30 | | PASS | DCUEXC | |
| 4E31 | | JUMP | DQUOTE | |
| 4E32 | DO | PASS | PUSHS | DO STATE SEQUENCE PART |
| 4E33 | | PASS | RDROW | |
| 4E34 | | PASS | STROW | |
| 4E35 | | PASS | RDCOL | |
| 4E36 | PASS | PASS | STCOL | |
| 4E37 | | MICRO | FLGO | |
| 4E38 | | JUMP | PROG | |
| 4E39 | ALT | MICRO | FLGT | ALT STATE SEQUENCE PART |
| 4E40 | | SCNW | ADVANCE | |
| 4E41 | | PASW | READM | |
| 4E42 | | PASW | ONECP | |
| 4E43 | | SKIP | SEM | |
| 4E44 | | MICRO | FLGO | |
| 4E45 | COND | NSKIP | FLG | |
| 4E46 | | JUMP | PROG | |
| 4E47 | FINDEND | SCNW | ADVANCE | |
| 4E48 | | CHAR | ' ]' | |
| 4E49 | | JUMP | FINDEND | |
| 4E50 | | PASS | POPS | |
| 4E51 | | JUMP | PROG | |

FIG. 4F

| | SEM STATE | SELF OP CODE | SELF OPERAND | |
|---|---|---|---|---|
| 4F01 | ONECP | JUMP | ONECPB | STATE TRANSITION TABLE PART |
| 4F02 | ONETOR | JUMP | ONERB | |
| 4F03 | ONECPB | MICRO | FLG0 | ONECP STATE SEQUENCE PART |
| 4F04 | | PASS | SEULD | |
| 4F05 | | PASW | COMPM | |
| 4F06 | | RET | SEUEQ | |
| 4F07 | | MICRO | FLG1 | |
| 4F08 | | RET | | |
| 4F09 | ONERB | PASS | READL | ONERB STATE SEQUENCE PART |
| 4F10 | | MICRO | FLG1 | |
| 4F11 | | RET | EMPTY | |
| 4F12 | | PASS | PUSHR | |
| 4F13 | | MICRO | FLG0 | |
| 4F14 | | PASS | POPL | |
| 4F15 | | RET | | |

FIG. 4G

MICRO-CODE GENERATOR OUTPUTS

| INSTRUCTION OP CODE NAME | MICRO-CODE GENERATOR ADDRESS | RD-MAT | RD-LR | RD-AO | WRT-MAT | WRT-LR | WRT-AO | MATCH-S | PUSH | CLEAR | POP | SOURCE-1 | SOURCE-2 | MUX-ADD/0 | MUX-ADD/1 | SAVE | LOAD-DIN | LOAD-DONT' | VALUE | USE-LBLE | FIFO-LIFO | MRSTR | A8 | A9 |
|---|---|---|---|---|---|---|---|---|---|---|---|---|---|---|---|---|---|---|---|---|---|---|---|---|
| SEUNOP | 00 | | | | | | | | | | | | | | | | | | | | | | | |
| CLEARM | 01 | 1 | | | 1 | | | 1 | | 1 | | 1 | | | | | | | | | 1 | | | |
| SAVEM | 02 | 1 | | | 1 | | 1 | 1 | | | | 1 | | | | 1 | | | | | | | | |
| RSTRM | 03 | 1 | | 1 | 1 | | | 1 | | | | 1 | | | | | | | | | | | | |
| PUSHM | 04 | 1 | | | 1 | | | 1 | 1 | | | 1 | | | | | 1 | | | | | | | 1 |
| READM | 05 | 1 | | | | | | 1 | | | | 1 | | | 1 | | | 1 | | | | | | 1 |
| POPM | 06 | 1 | | | 1 | | | 1 | | | 1 | 1 | | | 1 | | | 1 | | | | | | 1 |
| LENM | 07 | 1 | | | | | | 1 | | | | 1 | | 1 | | | | 1 | | | | | | |
| SEUMR | 10 | | | | | | | | | | | | | | | | | | | 1 | 1 | | | |
| CLEARL | 11 | 1 | | 1 | 1 | | | | | 1 | | | | | | | | | | | | | | |
| SAVEL | 12 | 1 | | | 1 | | 1 | | | | | | | | | 1 | | | | | | | | |
| RSTRL | 13 | 1 | | 1 | 1 | | | | | | | | | | | | | | | | | | | |
| PUSHL | 14 | 1 | | | 1 | | | | 1 | | | | | | | | 1 | | | | | | | |
| READL | 15 | 1 | | | | | | | | | | | | | 1 | | | 1 | | | | | | |
| POPL | 16 | 1 | | | 1 | | | | | | 1 | | | | 1 | | | 1 | | | | | | |
| LENL | 17 | 1 | | | | | | | | | | | | 1 | | | | 1 | | | | | | |
| SEULD | 20 | | | | | | | | | | | | | | | | 1 | | | | | | | |
| CLEARR | 21 | | 1 | | | 1 | | | | 1 | | | 1 | | | | | | | | | | | |
| SAVER | 22 | | 1 | | | 1 | 1 | | | | | | 1 | | | 1 | | | | | | | | |
| RSTRR | 23 | | 1 | 1 | | 1 | | | | | | | 1 | | | | | | | | | | | |
| PUSHR | 24 | | 1 | | | 1 | | | 1 | | | | 1 | | | | 1 | | | | | | 1 | |
| READR | 25 | | 1 | | | | | | | | | | 1 | | 1 | | | 1 | | | | | 1 | |
| POPR | 26 | | 1 | | | 1 | | | | | 1 | | 1 | | 1 | | | 1 | | | | | 1 | |
| LENR | 27 | | 1 | | | | | | | | | | 1 | 1 | | | | 1 | | | | | | |
| FIFO | 30 | | | | | | | | | | | | | | | | | | 1 | | 1 | | | |
| LIFO | 31 | 1 | | | | | | | | | | | | | | | | | | | 1 | | | |
| COMPM | 32 | | | | | | | | | | | 1 | | 1 | | | | | | | | | | |
| USER | 33 | | 1 | | | | | | | | | | | 1 | | | | | | 1 | | | 1 | |
| USEL | 34 | | | | | | | | | | | | | | | | | | 1 | 1 | | | | |
| ANY | 35 | 1 | | | 1 | | | 1 | 1 | | | 1 | | | | | 1 | | 1 | | | | | 1 |
| PUSHLI | 36 | 1 | | | 1 | | | | 1 | | | | | | | | | | | | | | | |
| PUSHRI | 37 | | 1 | | | 1 | | | 1 | | | | 1 | | | | | | | | | | 1 | |

CRT INTERFACE BLOCK DIAGRAM

CRT DRIVE CIRCUITRY

STANDARD CRT COLOR MONITOR
CRT SWEEP LEFT TO RIGHT
TOP TO BOTTOM
HORIZONTAL FREQ. 15.75 KHZ
VERTICAL FREQ. 60HZ
HORIZONTAL RESOLUTION 512 DOTS
VERTICAL RESOLUTION 512 LINES

REFRESH TIMING CIRCUITRY

CRT INTERFACE TIMING REFRESH

CRT REFRESH MEMORY TIMING

PLASMA INTERFACE CIRCUITRY

| | DIG-CL | DIG-CO |
|---|---|---|
| NO-OP | 1 | 1 |
| WRITE | 1 | 0 |
| ERASE | 0 | 1 |
| BULK-ERASE | 0 | 0 |

PLASMA INTERFACE
TIMING

OIU BLOCK DIAGRAM

INPT BLOCK DIAGRAM

INPT TIMING

BOOT CIRCUIT

REPEAT CIRCUIT

KBD-RES = KBD-CLR · OIU-CLK + OIU-MR
WR-KBD = (KBD-STB · KBD-OP-MOD) +
(INPT-WR-INPT-SEL-KBD)
SET-KB-RQ = INPT-WR-INPT-SEL-INPK
RES-SEL-KBD = INPT-ACT-OIU + XXX-RQ-OIU

KEYBOARD INTERFACE CIRCUIT

GRAPH PEN INTERFACE CIRCUIT

OIU INSTRUCTION + DATA FORMATS

STG

SEM

META

MS

DL

FORM

LOAD-OPCODE = SYSTEM-CLOCK·SEM-RQ-STG·NOT-STG-ACTIVE
LOAD-DATA = (LOAD-DIN·P0 + LOAD-DOUT·P7)
SELECT-SEM = LOAD-DIN

WRITE-STACK = $P6 \cdot \overline{WRT} \cdot RAM$
SELECT-MATCH = $\overline{A8} \cdot \overline{A9}$
SELECT-LEFT = $A8 \cdot \overline{A9}$
SELECT-RIGHT = $\overline{A8} \cdot A9$
SELECT-LABLE = $A8 \cdot A9$

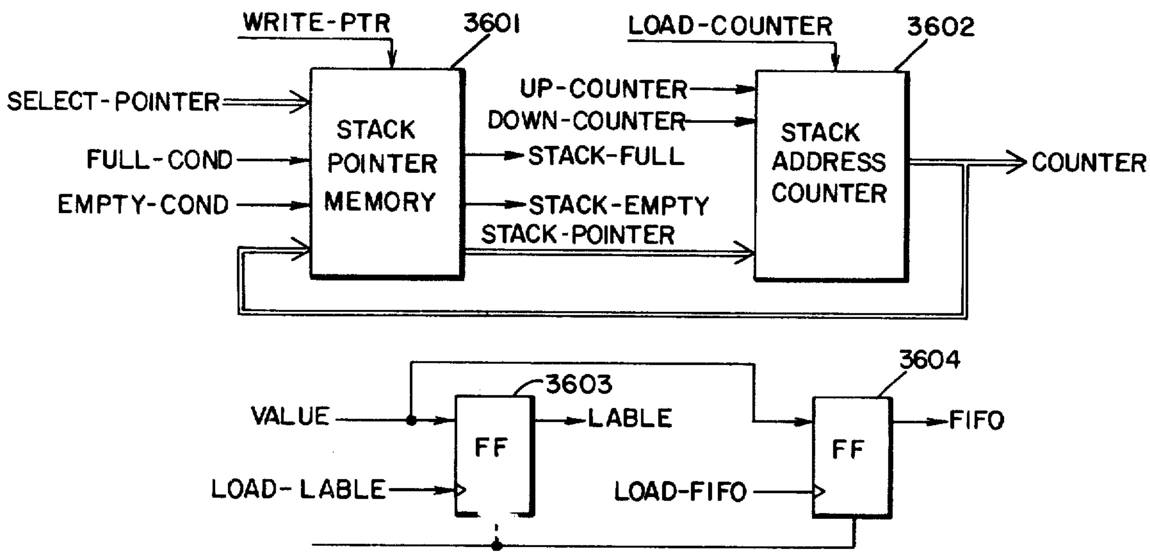

FIG. 36

LOAD-COUNTER = P3 • $\overline{\text{CLEAR}}$
UP-COUNTER = P4 • EN-CNTR-UP
DOWN-COUNTER = P5 • EN-CNTR-DOWN
RESET-COUNTER = P3(CLEAR + FIFO • MRSTR)
LOAD-LABLE = P2 • USE-LBLE
LOAD-FIFO = P2 • FIFO-LIFO
WRITE-PTR = $\overline{(\text{PUSH} \cdot \text{FULL} + \text{POP} \cdot \text{EMPTY})}$ • P7(WRT-MAT + WRT-LR)

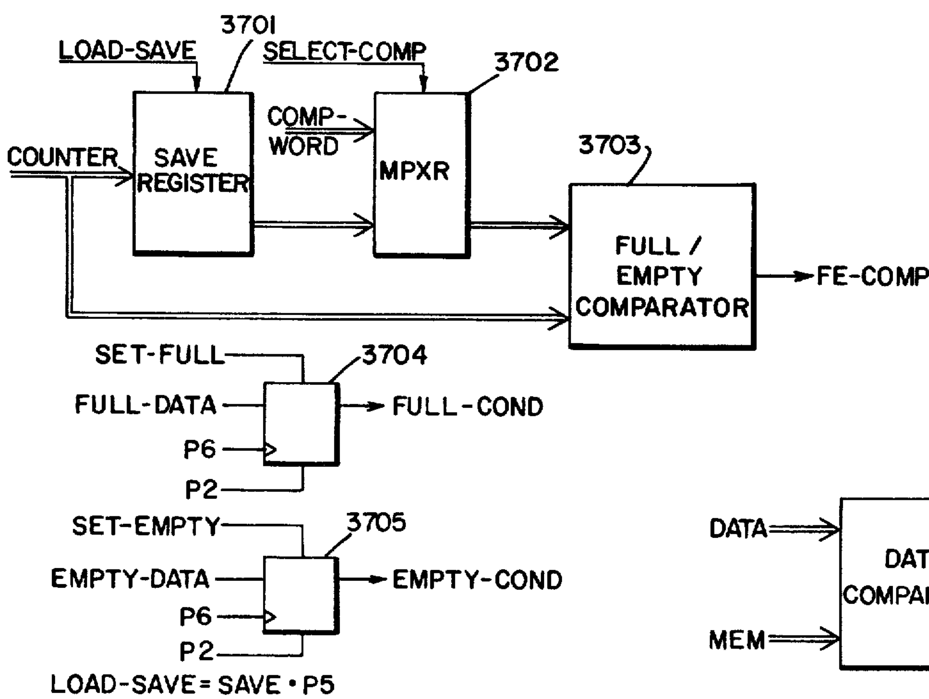

LOAD-SAVE = SAVE • P5
SELECT-COMP = POP • FIFO • MATCH-S
COMP-WORD = PUSH
SET-FULL = P3 • STACK-FULL
SET-EMPTY = P3 • STACK-EMPTY
FULL-DATA = PUSH • FE-COMP • $\overline{(\text{POP} + \text{CLEAN})}$
EMPTY-DATA = (CLEAR + POP • FE-COMP) • $\overline{(\text{PUSH})}$

FIG. 37

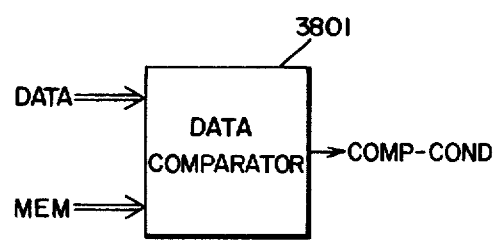

FIG. 38

EOS=ADVANCE·(HALT+DIRECT·META PRESET)
ADVANCE=NOT STATE 2·(ADV-UNCOND + ACTIVE-DOWN + ACTIVE-UP· PASS·TAG 1

LOAD-DREG=(P4·EN-LD-DREG-P4+P3·EN-LD-DREG-P3 +P1·META-PRESET

LOAD-OPCODE=(P3·EN-LD-META-OPCODE·TAGO +
P2·EN-LD-META-OPCODE +
P1·$\overline{\text{META-ACTIVE}}$·META-PRESET
LOAD-SEQCTR=P4·EN-LD-SEQCTR
UP-SEQCTR=P3·UP-P3+P4·$\overline{\text{META-PRESET}}$
LOAD-SELF=P1
SELF-SELECT=META-PRESET
LOAD-OPERAND=P1
LOAD-SEQ-HI=STATE 2·EN-LD-HI
LOAD-SEQ-LO=STATE 2·EN-LD-LO PUSH=P2·(MICRO-PUSH+EN-PUSH)
POP=P4(MICRO-POP+$\overline{\text{SKIP}}$·EN-POP)
WRITE-STACK=EN-LD-STACK·P3

SKIP=TAGO + (CLASS-COMP·EN-CLASS+
DATA-COMP·EN-COMP+
COND-COMP·EN-COND)

LOAD-COND=P2·EN-LOAD-COND

OIU CLOCK & MASTER RESET GENERATION

OIU-CONTROL CIRCUITRY

OIU BUS CONTROL CIRCUITRY

OIU OUTPUT INSTRUCTION CIRCUIT

INPT INTERFACE CIRCUIT

OIU TIMING SYSTEM CLOCK TIMING

GRAPH PEN INTERFACE TIMING

BOOT CIRCUIT TIMING

REPEAT CIRCUIT TIMING

KEYBOARD INTERFACE CIRCUIT TIMING

FORM INTERFACE TIMING

INPT INTERFACE TIMING

OUTPUT INSTRUCTION TIMING-PASS

OIU OUTPUT CIRCUIT TIMING-PASS WAIT

DISPLAY PROCESSOR APPLICATION IN A SYSTEM

DIU BLOCK DIAGRAM

FIG. 59
DIU INSTRUCTION & DATA FORMATS
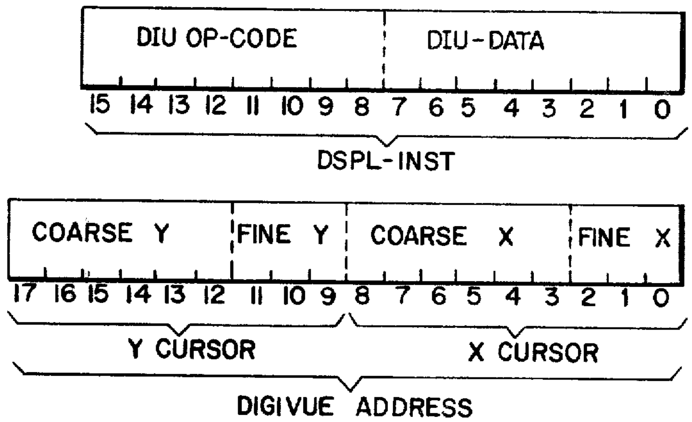
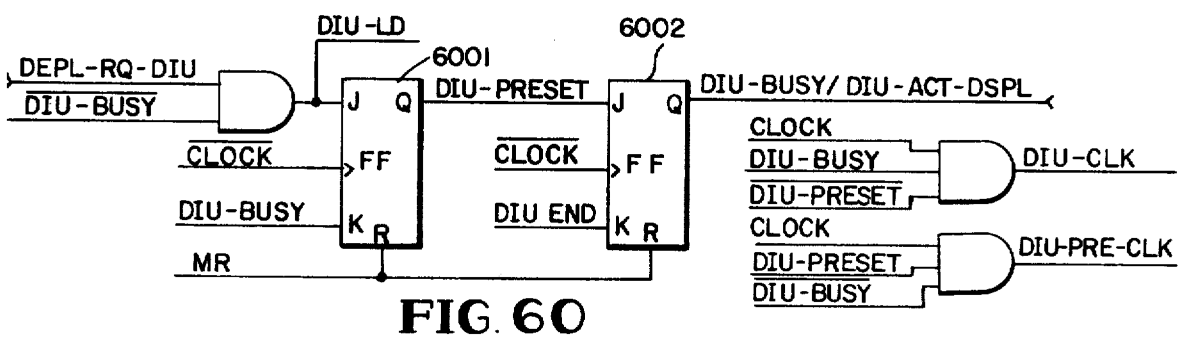
FIG. 60
DIU CONTROL LOGIC
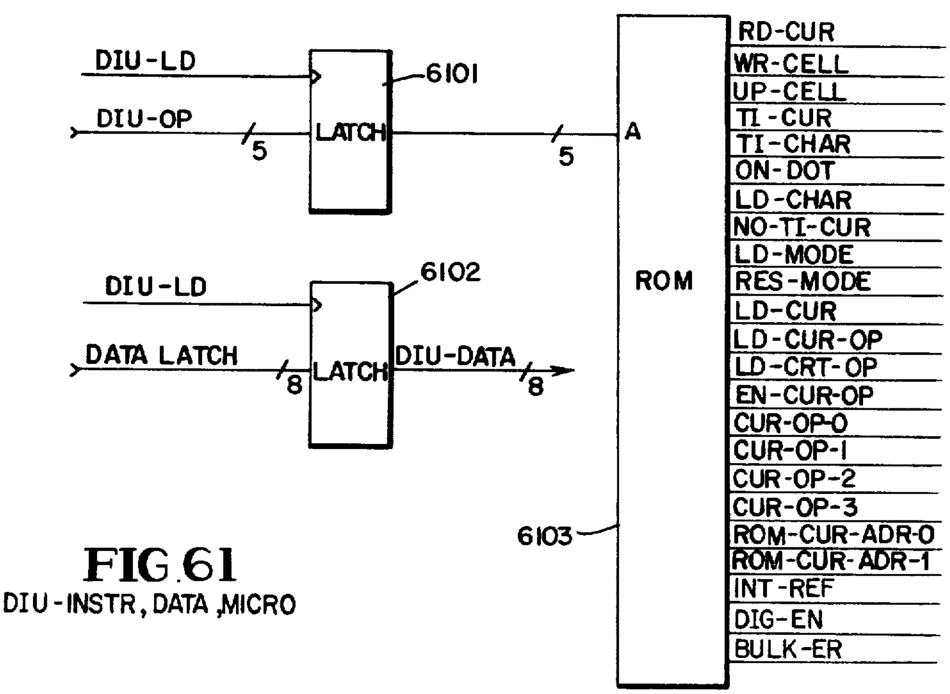
FIG. 61
DIU-INSTR, DATA, MICRO LD-CRT-ON/OFF = DIU-DATA-6 ·DIU-DATA-5·LD-CRT-OP· DIU-PRE-CLK
LD-BLINK-OP= DIU-DATA-6· DIU-DATA-5 · LD-CRT-OP·DIU-PRE-CLK
LD-COLOR-OP= DIU-DATA-6·LD-CRT-OP·DIU-PRE-CLK

OPTIONS + MODES CIRCUITRY

DIU CURSOR CIRCUITRY

DIU CHAR GEN CIRCUITRY

DIU TIMING DIAGRAMS

LOAD-PROW=P4•EN-LOAD-PROW
LOAD-PCOL=P4•EN-LOAD-PCOL
PCTR-UP=P1•EN-PCTR-UP
PCTR-DOWN=P1•EN-PCTR-DOWN
RESET-PCNTR=PRESET+RESET
LOAD-STACK-PTR=P1•EN-LOAD-SCTR
UP-STACK-PTR=P4•EN-SCTR-UP•$\overline{\text{STACK-OVER}}$
DOWN-STACK-PTR=P4•EN-SCTR-DOWN•$\overline{\text{STACK-END}}$
RESET-STACK-PTR=PRESET
WRITE-STACK=(EN-WRT-MSROW+EN-WRT-MSCOL)•(PHASE-COUNT≠0)

GRAPH ARCHITECTURE INFORMATION PROCESSING SYSTEM

PRIOR APPLICATION

This application is a continuation of my copending application Ser. No. 741,421, filed Nov. 12, 1976, and abandoned Nov. 23, 1977, which in turn was a continuation-in-part of my copending application Ser. No. 707,721, filed July 21, 1976, and abandoned Dec. 1, 1977, entitled "Graph Architecture Information Processing System."

BACKGROUND OF THE INVENTION

1. Field of the Invention

This invention relates to a new concept for structuring an information processing system. In terms of terminology which has become well founded in the art (in reference, for example, the text book by C. G. Bell and A. Newell, "Computer Structures: Readings and Examples" published in 1971 by McGraw-Hill, Inc., New York, New York, and the reference work "Multiprocessors and Parallel Processing" by Phillip H. Enslow published by John Wiley and Sons, New York, 1974), this invention relates an architecture approach for implementing information processing systems. (Appendix VV is a catalogue of references cited.) Since there are many architectural approaches in existence in the art for the implementation of such systems, it is desirable to classify these systems so that the proper position of my invention may be identified with respect to the prior art approaches. Since there is a great disparity in the use of nomenclature in the information processing architecture art, it is also necessary to identify the nomenclature which shall be used to specifically define my invention and shall also permit contrasting my invention with the prior art.

Three differing parameters may be employed to characterize the architecture of information processing systems:

1. The number of processors utilized in the system in addition to the number of peripheral equipments employed. For the purpose of describing my invention, I shall call peripheral equipments by the nomenclature "external processors" since I consider such devices (which include line printers, card readers, keyboards and display devices) external to that portion of a system implemented in accordance with my invention which is new in the art.
2. The manner of interconnecting the processors of a system which is also called the topology of a system. In this regard, the taxonomical system for differentiating different interconnection schemes as defined in the paper "Computer Interconnection: Taxonomy, Characteristics and Examples" by G. A. Anderson and E. D. Jensen which appears in "Computing Surveys" Volume 7, No. 4, December 1975, published by the Association for Computing Machinery (ACM) is used in my description.
3. The functionality assigned to the processors of a system. In this regard, the external processors of a system usually have well-defined functional roles (such as listing the results of computations on a line printer). In contrast, the internal processors (those portions of the system not considered peripheral devices in the common nomenclature) may be of either a general purpose or of a dedicated function type. Such systems are also often called "homogeneous" systems if they utilize general purpose processors or "heterogeneous" if each processor is designed and built to perform only a selected set of functions. The differentiation of such systems and the advantages of each are clearly outlined in the current art in the paper "Innovations in Heterogeneous and Homogeneous Distributed Function Architectures" E. C. Joseph, published in the Institute for Electrical and Electronic Engineers (IEEE) Computer Magazine, March 1974.

With regards to the functionality of processors in a given system, four main functional areas may be identified:

1. Memory for containing the data to be manipulated as well as the programs which define the order of manipulations of the data. This will also be referred to as the data structure of the system and it should be noted that data structures may be implemented in hardware using general purpose memories (such as central random-access memory) or in a specialized functional manner (such as hardware stacks and queues as defined, for example, in the text by Robert R. Korfphage entitled "Discrete Computational Structures" published in 1974 by Academic Press, Inc., New York, and in the textbook "Computer Architecture" by Caxton Foster published in 1970 by Van Nostrand Reinhold Company, New York).
2. Mechanisms for manipulating the data in the data structures (memories) of the system. In practice, these may be of the general purpose type such as an arithmetic-logic unit or of a special purpose nature such as a string processor for manipulating character-oriented data structures.
3. Control mechanisms which effectively activate the data manipulations as a function of interpreting the commands also called instructions in the program.
4. Input/output mechanisms which allow the transmission of information to and from the external processors (peripheral equipment) and in so doing allow the information processing system to perform a useful purpose (for otherwise if there were no external processors, the system could neither obtain the data to be processed nor communicate the results of its computations).

With regards to the number of processors employed in a system, my invention along with many other approaches refers to a concept in which more than one processor is used in addition to any number (but at least one) of external processors. The principal advantage in these approaches over single processors systems being a net increase in performance as measured by how long in time it takes to execute a given program and/or how short a time the system can respond to a stimulus from an external processor.

With regards to the functionality of processors in a system built in accordance with my invention, it is a feature of my approach to allow specific dedicated special purpose functions to be assigned and built into each processor. For example, if two different data structures are needed in a system, then in my approach two different processors are designed and each placed at an appropriate point in the interconnection network of the system. Since the functions of the system are "distributed" amongst the processors in a system, then my invention appropriately falls into the category of "distributed function architecture" machines. Further, since each processor in my approach generally has a different design and different capabilities from each of the other processors in the system, my approach falls into the category of "heterogeneous distributed function architecture systems" in the nomenclature of the Joseph reference.

With regards to the topology of interconnection of processors in a system, the Anderson and Jensen paper define a taxonomy on the basis of four parameters which briefly are:

1. Whether messages between processors are communicated directly between one processor to another or possibly indirectly in which case the message must first be communicated through a third processor and with possible modification then communicated to the second intended processor. In my invention, message communication which I call "instruction transfer" in general may travel through intervening processors with modification and thus in my approach message transfer is indirect.
2. Whether the switching of messages from one processor to another is accomplished by a centralized mechanism (such as a so-called "cross-bar" network which is described in Anderson's paper) or on a decentralized basis wherein each processor may control the switching of messages between itself and other processors in the system with which messages can be communicated. In this respect, my invention utilizes decentralized switching using a technique and structure to which I refer as "control arcs" and defined more fully in the following portions of the specification.
3. Whether the physical paths for message (instruction) communication are shared amongst more than two processors or dedicated for communication between a first and second processor. In my invention, message paths are dedicated and the physical hardware required to form each instruction communication path is called a "control arc."
4. Whether the network of communication paths and placement of processors within this network is arranged on the basis of a regular pattern or alternately on the basis of an irregular pattern. In my invention, each practical implementation generally results in an irregular pattern.

In summary then, under the structural taxonomy convention defined by Anderson and Jensen, my invention reconstitutes a multiple processor information processing system utilizing indirect message (instruction) transmissions (communication) which are decentrally switched over dedicated message (instruction) paths resulting in a generally irregular arrangement of processors, and referred to as an IDDI category from the first letters of the words "indirect," "decentrally," "dedicated," and "irregular."

2. Description of the Prior Art

In contrast, the approach of Frank J. Perpiglia as defined in U.S. Pat. No. 3,905,023, Sept. 9, 1975, entitled "Large Scale Multi-Level Information Processing System Employing Improved Failsaft [Sic] Techniques," also refers to a system having more than one processor in addition to external processors. In the Perpiglia approach, each processor may communicate directly to any other second processor by way of a centralized non-dedicated switching network. In addition, the arrangement of processors when viewed from the block diagram level looks the same for any machine implemented in accordance with the Perpiglia concept independent of the number of processors employed and thus a machine under this concept has a regular interconnection topology. Thus, although my invention is similar to the Perpiglia approach in the sense of utilizing multiple processors, my structure varies from the Perpiglia architecture on the basis of all four major structural taxonomy parameters. In this regard, the disclosures of L. D. Amdahl et al in U.S. Pat. No. 3,226,689, Dec. 28, 1965, entitled "Modular Computer System Master Disconnect Capability"; Frederich V. Rehhauser et al in U.S. Pat. No. 3,665,421, May 23, 1972, entitled "Information Processing System Implementing Program Structures Common to Higher Level Program Languages"; and R. C. Richmond et al in U.S. Pat. No. 3,374,465, Mar. 15, 1968, entitled "Multiprocessor System Having Floating Executive Control" all describe computer architectures or means for controlling the interaction amongst the processors of systems having structural topology similar to the Perpiglia architecture and thus vary significantly in the manner of implementation and intended application from my invention.

Another prior art approach for implementing systems utilizing multiple processors is the "Electronically Controlled Microelectronic Cellular Logic Array" as disclosed by S. E. Wahlstrom in U.S. Pat. No. 3,473,160, issued Oct. 14, 1969. In this approach, direct message transmission is accomplished over dedicated decentrally switched paths. However, all processors according to Wahlstrom are required to be identical in design and each processor is required to have a fixed set of connections with an identical number of other processors so that the network is always regular and thus varies from my approach on the basis of regularity or irregularity of interconnection. The Wahlstrom approach also differs from my approach on the basis of functionality of usage of each processor. In the Wahlstrom arrangement, as well as in similar cellular array concepts such as the ILLIAC-4 computer (described in the previously cited Enslow reference ) and the theoretical Solomon approach (described in the Bell reference), each processor is capable of performing the functions of any other processor in the system and thus each processor is a general purpose processor which is, therefore, burdened with the overhead of hardware normally associated with general purpose processors. In architecture according to my invention, each processor is designed for each intended application to perform only a subset of the necessary system functions and thus my graph architecture system can be built at lower cost as less hardware is involved, or conversely, the processor may be of higher performance since specialized circuitry such as custom large-scale integrated circuits may be employed in a single specific processor without having to supply the same circuitry in all other processors in the system.

As further background to my invention, it is pointed out that a significant problem of multiple processor systems is a problem called "deadlock" and otherwise called "deadly embrace." This problem results from the possibility, as a function of how a given information processing system is programmed, that a situation may arise such that several processors request the services of other processors in the system in such a way that none of the processors can continue its activities causing the system to be deadlocked and precluding further work. The theoretical solution of this problem, as it applies to software management, is described in the article by E. G. Coffman, Jr., et al entitled "System Deadlocks"

published in the ACM Computing Surveys Journal, Vol. 3, No. 2, June 1971.

Although solutions exist to this problem (as well as associated problems such as data contention) the programmer is burdened with ensuring that deadlock can never occur and this is very difficult in large systems in which many programmers are involved. A better solution is to have an architecture design of a multiple-processor system which automatically (and without programmer knowledge) inhibits the system's operation in such a way as to eliminate any possible deadlock (and since the solution is in hardware, the programmer can not do anything to make the system deadlock). The extensions necessary to the theoretical art of computer science required for such a hardware solution have been accomplished by me and reported in my doctoral thesis (Ph.D., University of Massachusetts, 1976) entitled "A Class of Multiple Processor Computers with Grammar Directed Control" published in 1976 by University Microfilms, Ann Arbor, Mich. This work in abbreviated form appears in my article "Grammar Based Multiple Processor Design," 1977 IEEE Micro-Computer Conference Record and also my chapter entitled "A Design Approach for Multiple Processor Computers" which appears as Chapter 2 in the book "Micro-computer Design and Applications" edited by Samuel C. Lee and published in 1977 by Academic Press, Inc., New York. In the thesis, I show from a theoretical point of view that a multiple processor system can be designed with no inherent deadlock problems by allowing a high-level definition of the information processing system to be specified using a notation which I call "control grammars." Well defined operations on such a control grammer (which is based upon the theory of formal languages as described in the paper "Syntax Directed Transduction" by P. M. Lewis, 2nd, and R. E. Stearns appearing in the ACM Journal, Volume 15, No. 3, July 1968, and further expanded in the textbook entitled "Compiler Design Theory" by P. M. Lewis, J. Rosenkrantz and R. E. Stearns published by Addison-Wesley Co., Reading, Mass., 1976) are used to generate the definition of interconnection of processors in the system. The relationship between the architecture of a system and its definition by control grammars is based upon a mathematics common to both the system and the grammar which is known as "graph-theory" and is discussed in the previously mentioned text by Korfphage. The main theoretical concept here is that both the interconnection of processors in an information processing system and the relationship of elements in a grammar may be depicted as "graphs" in the previously mentioned mathematical theory. It is a purpose of my invention to disclose the concept of and the means of implementing such systems without burdening the user to understanding the aforementioned mathematical theory. Since the theoretical basis of my invention is the mathematics of graphs, I have chosen to call my invention the "Graph Architecture Information Processing System."

Reference to prior art work must include the disclosure of Saul B. Dinman of "Direct Function Processor" in U.S. Pat. No. 3,631,401 issued Dec. 28, 1971. In this approach, the structural taxonomy of the system is similar to that in my system except that the interconnection of processors in limited to two levels of control wherein one level is a master processor for controlling a plurality of subprocessors. In the Dinman architecture approach, no deadlock can occur because the subprocessors are not allowed to communicate with each other, thus avoiding the deadlock issue altogether.

Another system which avoids the deadlock issue is the "Data Processing System Having Pyramidal Hierarchy Control Flow" defined in U.S. Pat. No. 3,962,685 issued June 8, 1976, to Albert P. Belle Isle and assigned to the same assignee as is my invention. In the Belle Isle architecture, any number of levels of control may be employed potentially achieving a much more powerful system than the Dinman architecture, but one single processor is still required to be the master driver of the system in such a way that full utility of the processors is limited. In my approach, there is no requirement for a first high-level master processor since deadlock is resolved on the basis of the architecture topology in conjunction with the aforementioned theory. Thus, my invention allows nearly the full performance capabilities of systems such as that defined by Perpiglia but without the burdening of software to resolve deadlock and associated problems. As in-depth discussion of the relationship of these inventions is given in the following detailed portions of my specification.

My invention also includes and implements a new concept for directly executing high level languages. High level languages differ from what is commonly referred to as machine language. In machine language, the programmer is given a set of instructions, each having a different numerically-coded operation code (which will be abbreviated as "opcode") and data parameters (which will be called simply "data"). A program is constructed by defining a specific order of these instructions. In a program, the same instruction may appear many times. When executed by a computer, the instructions are read out and the operation defined by the opcode is executed in the order of the instructions in the program. The main feature of machine language instructions is that an instruction having a specific opcode is always executed in the same way independently of instructions previously executed.

In contrast, in a high level language program, a relatively free form of data is used and programs consist of ordered sequences of alpha-numeric characters instead of the numeric data which forms the basis of machine language. It is a specific objective of a high level language to represent a form which is readily indentified by the user and relates to the type of problems being solved.

For example, in the high level language BASIC described in the previously-cited Lewis (1976) reference, the programmer is allowed to write algebraic equations as opposed to listing a sequence of memory reads, accumulator additions and the like which typify machine language programming. A peculiarity of high level languages is that a single character sequence can have entirely different meanings under different circumstances. For example, the characters "SIN" could mean a variable name or mean the sine trigonometric function. This is in sharp contrast to machine language in which a specific operation code number (opcode) always has a specific meaning.

In prior art systems, high level language capabilities are implemented by use of a program, written in machine language, which is capable of converting a high level language character sequence to the ordered instruction sequence of a machine language which is subsequently executed. This process of converting a high level language program to a machine level language program is usually called "compilation" and the mathematical process of deciphering the intended meaning of the high level language program is called "parsing." A discussion of these terms may be found in the textbook, "The theory of Parsing, Translation and Compiling" by A. V. Aho and J. D. Ullman published by Prentice-Hall, Inc., Englewood Cliffs, N.J., 1972.

In my invention, a specific processor called a METAPROCESSOR is used to interpret a high level language and generate the appropriate machine level instructions to be executed by other processors. The advantages of this approach over prior art systems include:

1. Memory requirements are reduced since only sufficient memory to contain the high level language is necessary (the additional memory required to save the machine language program in prior art devices is not needed).
2. The overall implementation of programs is simpler since only one step is necessary to run a program.

In my invention, the METAPROCESSOR may be reprogrammed to allow changes in the high level language or allow execution of programs in different high level languages. To maintain maximum speed, the programming of the METAPROCESSOR is accomplished in a machine level language. Since the language of the METAPROCESSOR allows the definition of a high level language, the METAPROCESSOR instruction set effectively defines a "meta-language". . . that is a language for defining a language (in reference see the previously-cited Aho and Ullman text). Since the METAPROCESSOR of my invention allows the direct programming of operations required for parsing and metalanguage operations, I have chosen to call this particular portion of my invention by the name METAPROCESSOR.

Prior art systems for directly executing high level languages are typified, for example, by the "Information Processing System Implementing Program Structures Common to High Level Program Languages" as defined in the above-cited U.S. Pat. No. 3,665,421 to Rehhauser et al. In the Rehhauser arrangement, hardware is added to a multi-processor system of the Perpiglia architecture to allow direct execution of high level languages.

In contrast, the concept in my METAPROCESSOR is to supply a dedicated function processor for use in systems which support the use of such processors as, for example, my own graph architecture. In addition, within the architecture of a given system, more than one METAPROCESSOR may be employed to speed up the execution of programs by assigning specific METAPROCESSORS to interpret (parse) different portions of a high level language. It is also a feature of my invention to use "classifier" and "push-down" stack mechanisms to allow the direct implementation of the language types called LL(1) as defined in the previously-mentioned Lewis text, these circuits being new and novel in the art of directly executed high level languages.

My invention also includes and implements a novel concept for performing string computations. By a "string" is meant a data structure formed by an ordered sequence of data characters. By a "character" is meant a data word of fixed size (usually 8 binary digits). This is in contrast to prior art computing systems which:

1. Use numbers as the basis for computations.
2. Perform operations on these numbers such as add and subtract to produce other numbers.

In string computing:

1. The elements (data) to be manipulated are strings.
2. Operations over the strings include the mathematical operations "alternation" and "concatenation."

String computations are useful in systems in which the problems to be solved are inherently non-numeric in nature, for example, the analysis of inputs from a student in a computer-aided instruction system to determine if the student has correctly answered a question.

In prior art systems, string computations are performed by using softward algorithms on arrays of numbers which represent strings. Typical languages which support such computation are the LISP language (as defined in reference "LISP 1.5 Primer" by Clark Weissman and published by Dickenson Publishing Co., Inc., Belmont, California, 1967) and the SNOBOL language (as described in the text "A SNOBOL 4 Primer" by R. E. Griswold and M. T. Griswold published by Prentice-Hall, Inc., Englewood Cliffs, N.J., 1973).

As opposed to prior art systems, in my invention hardware "stacks" are used to allow a significant speed-up of string computation operations for a modest system cost. The stack approach also allows a significant reduction in program size for specific problems when compared to solutions of these problems in prior art systems. My invention takes advantage of current art high speed semiconductor memory technology to implement the hardware stacks. No predecessor hardware string processor devices appear in the prior art.

My invention also relates to an approach for storing graphic information in a reduced form and for generating complex visual presentations on a variety of different types of display devices using the same hardware processor. For example, the same processor is used to generate images for a raster scan cathode ray tube (CRT) display device and also drives a flat panel dot-addressable plasma panel type display. Prior art systems are typified by the "Method and Apparatus for Point Plotting of Graphical Data From a Coded Source Into a Buffer and For Rearranging That Data for Supply to a Raster Responsive Device" as defined in U.S. Pat. No. 3,973,245, Aug. 3, 1976, to Karl A. Belser. In contrast, in my invention, the same hardware is utilized to drive dissimilar display devices.

It is an object of the present invention to provide an information processing system having the ability to directly execute high level user languages.

It is a further object to provide a system of modular design where a plurality of processing elements may be utilized each performing different functions within the system.

It is a further object to provide a system in which similar processing elements are utilized to direct the activities of dissimilar external processors.

It is a further object to provide a system of processing elements having the capability of constructing and displaying images of arbitrary complexity from a specified set of primitive images.

It is a further object to provide a system of processing elements having the ability to develop a tree-structured organization of display image definitions.

It is a further object to provide a system including processing elements having the capability of converting information produced by a first external processor to information in a form characteristically produced by a dissimilar second external processor. The interpretation of information produced by the first processor is re-definable.

It is a further object to provide a system including processing elements having the capability of interpreting high level user languages and directing activities of the system in accordance with such interpretations.

It is a further object to provide a system including processing elements having the capability of interpreting high level user languages and directing activities of the system in accordance with such interpretations.

It is a further object to provide a system including processing elements having the ability to manipulate strings of data to effect reduction of language based data (non-numeric computations), parsing of high level algorithm programming language and editing of data files.

These and further objects of the invention will become apparent by referring to the following detailed description and accompanying drawings.

SUMMARY OF THE INVENTION

An information processing system according to my invention for a heterogeneous distributive function processing system having indirect message communication, decentralized switching, dedicated message paths and an irregular arrangement of processors (IDDI) is constructed from a plurality of processing elements integrated into a novel heterodox or heterohierarchical (i.e., non-hierarchical or other than hierarchical arrangemet which is different from those previously known) architecture defined by control grammars where both the architecture and the control grammar are based on the mathematical concept known as graph theory. The processing elements are functionally classified according to their role in the overall system as control processors, data processors and external processors. Integration is accomplished by means of dedicated communication lines providing message paths interconnecting control logic circuitry in processing elements for transmitting and receiving control signals. Data processors are processors which primarily perform data manipulation functions and are integrated into the system by their included control logic circuitry which has a capability to receive but not send control signals. Control processors are processors which, whether or not having data manipulation capabilities, primarily perform control functions, are distinguished by the fact that they include control logic circuitry having a capability of transmitting control signals and may contain additional control logic circuitry for transmitting and receiving control signals. Each dedicated communication line between two processors along with the control logic circuitry within the processor to which the line is connected is designated a "control arc." External processors are processors which communicate with control processors or data processors, perform functions comparable to peripheral devices in other systems and are "external" to the control system as they do not have control arc connections. Data lines interconnecting processors provide for data flow among processors as required.

The processors in the network are interconnected in a non-hierarchical (or heterodox or heterohierachical) structure in which control of processing elements is selective between control processors and several control processors can simultaneously exercise control over other processing elements. As an example, a training system (the implementation constituting the inventor's first reduction to practice) constructed from the above-described processing elements in the described non-hierarchical structure includes processors to perform display processing operations, input processing operations, program execution operations and mass data transfer operations.

Display processing is accomplished by an arrangement of processors for effecting construction of images on disparate display screens from similar dot-pattern information originated by one of the processors. An example includes a prior art cathode-ray-tube type display device and a cathode ray tube processor which is unique to my invention for receiving the dot-pattern information and controlling the electron beam in the cathode ray tube device to effect display of images defined by the information at sections of the device screen located by the information. The arrangement also includes a plasma panel display device and a unique plasma panel processor for controlling row and column grid lines of the plasma panel to effect display of images defined by the information at sections of the plasma panel screen located by the information. Additionally, the arrangement includes a novel display processor for generating the information defining the images and locating the sections. A novel symbols processor is also included in the arrangement for storing definitions of primitive images and definitions of images of arbitrary complexity constructed from these primitive images and which sequentially transmits information defining adjacently located primitive images to the display processor to facilitate display of complex images on the screens of the prior art display devices. A multileveled, tree-structured organization of stored information is employed, with the lowest level of information defining primitive images and the highest level defining the most complex image to be constructed from the primitive images.

Input processing is accomplished by an arrangement of processors for converting information produced by a first prior art input device (such as a sound driven pen device) to information characteristically produced by a dissimilar prior art input device (such as a typewriter-like keyboard). An example includes an input device for producing electrical signals representing locations on a plasma panel, a keyboard device for producing codes representing specific key depressions, a graph-pen processor and an operator input unit or OIU processor for receiving inputs from the graph-pen processor and codes from the keyboard device. The graph-pen processor converts the electrical signals to X and Y co-ordinate information. The input processor holds definitions of predetermined locations on the plasma panel. These locations are each defined as representing specific inputs produced by depression of keys on the keyboard device. The input processor converts co-ordinate information from the graph-pen processor to the specific keyboard inputs defined for the locations corresponding to the co-ordinates.

Program execution operations are accomplished by an arrangement of processors for interpreting high level user type languages and effecting performance of operations dictated by information from an operator and stored program material. This arrangement comprises a string processor for manipulating and comparing serial strings of data words by transferring the words among a plurality of memory stacks. The arrangement also includes a novel METAPROCESSOR comprising a memory containing rules for interpreting the high level language, state determination elements for determining states defining the order of use of said rules and selection elements for selecting rules on the basis of data comparisons or classification of program inputs.

Mass data transfer is accomplished by an arrangement of prior art processors for transferring data between processing elements.

BRIEF DESCRIPTION OF DRAWINGS

FIG. 4E illustrates the portion of the programming of a control processor (CP) known as METAPROCESSOR in the training system of FIG. 4A where it is identified as META and illustrates the programming necessary for the interpretation of the high level language for the example question query program illustrated in FIG. 4D.

FIG. 4F illustrates the programming of a control processor (CP) known as a Semantics Processor (SEM) in the training system of FIG. 4A (which is controlled by the METAPROCESSOR as shown in FIG. 4B) for carrying out a subset of instructions initiated by the METAPROCESSOR as determined by the execution of the sequence shown in FIG. 4E.

FIG. 4G illustrates the programmed contents of the micro-code generator read only memory for the String Processor (STG) in the system of FIG. 4A (which is controlled by the SEM processor as shown in FIG. 4B) and illustrates the step of translating instructions to micro-level register and flip-flop operations for the instructions initiated by the SEM processor as shown in FIG. 4F.

FIG. 36 illustrates the address stack computing circuit portion of FIG. 21 for an STG processor, the purpose of which is to allow manipulations of the stack data in the stack memory of FIG. 35.

FIG. 37 illustrates the full and empty condition circuitry portion of FIG. 21 for an STG processor, the purpose of which is to determine the full and empty status of the computing stacks.

FIG. 38 illustrates the data comparison circuit portion of FIG. 21 for an STG processor, the purpose of which is to compare individual words to determine the equality of strings of data.

FIG. 56I illustrates the detailed timing for an OIU control arc transmit logic for the circuit of FIG. 54.

FIG. 57 is a block diagram of the interconnection of processing elements DSPL, SYM and DIU in the display subsystem with control processor FORM in the system of FIGS. 4A and 4B.

FIG. 58 is a block diagram of the DIU processing element 5801 of FIG. 57.

FIG. 59 illustrates the instruction and data formats for the DIU processing element of FIG. 58.

FIG. 60 is a detailed implementation of the control logic portion of FIG. 58 in a DIU processing element in accordance with the general scheme of FIG. 5D.

FIG. 61 illustrates the instruction data and microcode circuitry including 5817 of FIG. 58 for a DIU processing element in accordance with the general scheme of FIGS. 5B and 5C.

FIG. 62 illustrates the detailed implementation of the options and mode circuitry including 5805 of FIG. 58 for a DIU processing element for selectively controlling the manner in which characters are written.

FIG. 63 illustrates the detailed implementation of the DIU cursor circuitry including 5804 of FIG. 58 for a DIU processing element.

FIG. 64 illustrates the detailed implementation of the DIU processor character generation circuitry portion of FIG. 58.

FIG. 65 illustrates the timing of operations for a typical DIU processor instruction execution.

FIG. 66A illustrates the instruction (comprising opcode and data signals) input format to an SYM processor for communication over the lines illustrated in FIG. 57.

FIG. 66B illustrates the data, the row and column address word format for the SYM processor portion of FIG. 57, being the same design as for the PMEM processor of FIG. 23.

Figure 5A:
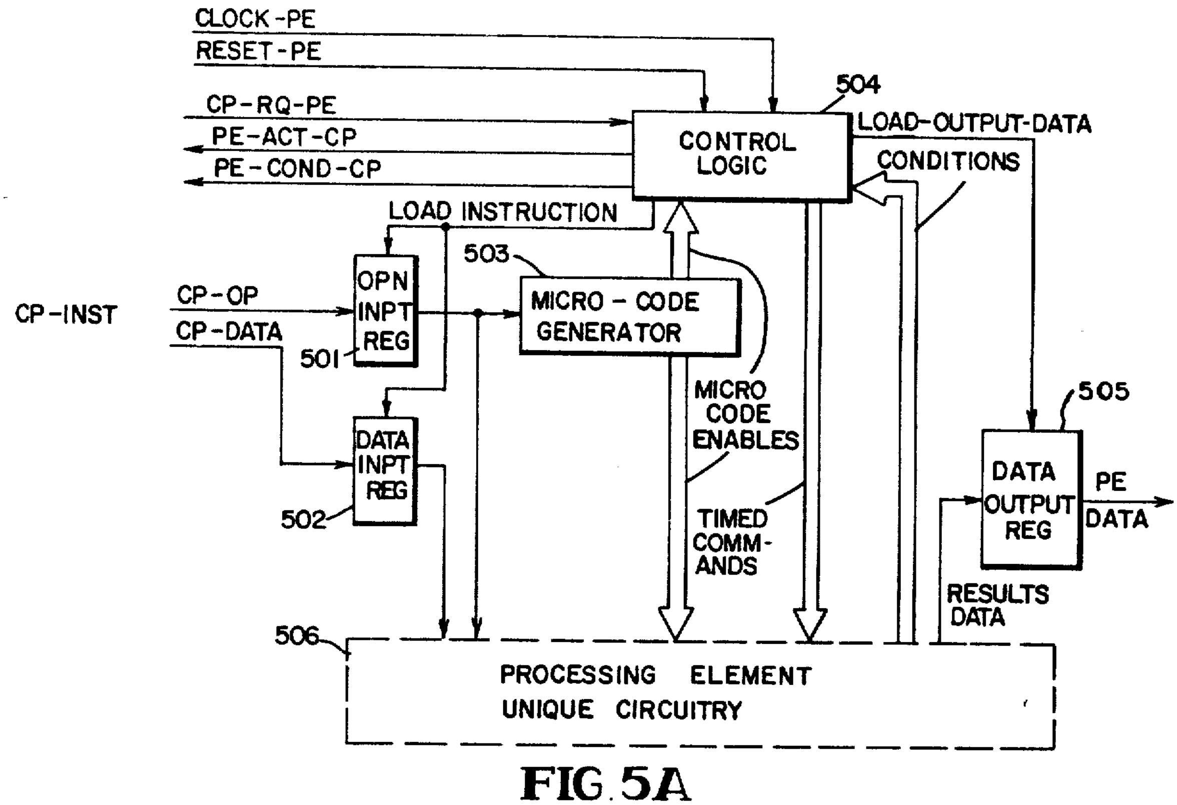
FIG. 5A illustrates in block diagram a typical implementation of a processing element in a system according to the invention and shows logic which is common amongst all processing elements and illustrates the interface of that common logic to circuitry which is unique for each type of processing element in a graph architecture machine.
Figure 5B:
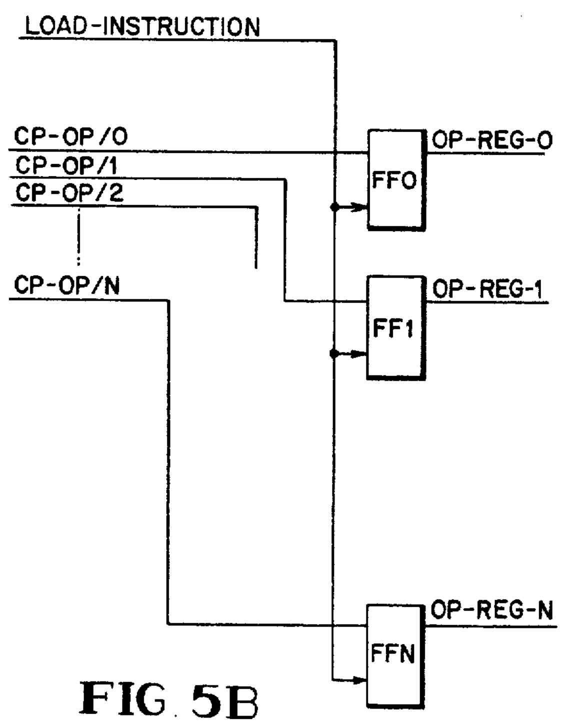
FIG. 5B illustrates the detailed implementation of the Operation Input Register (501) or opcode register portion of a processor as shown in FIG. 5A for use in a processing element in a graph architecture machine, said opcode register used to hold the definition of the instruction currently being executed in a processor.
Figure 5C:
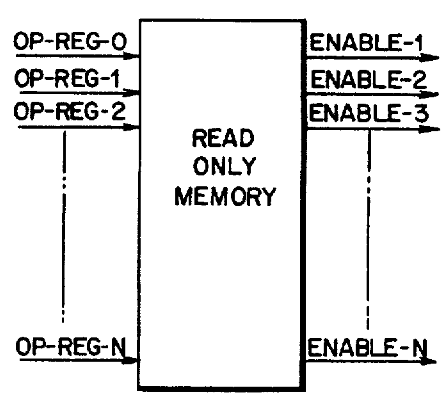
FIG. 5C illustrates the interfaces to the micro-code read only memory device in the Micro-Code Generator (503) of FIG. 5A for use in a processing element in an exemplary graph architecture machine, said read only memory device used for activating specific register level operation as a function of the opcode of the current instruction.
Figure 5D:
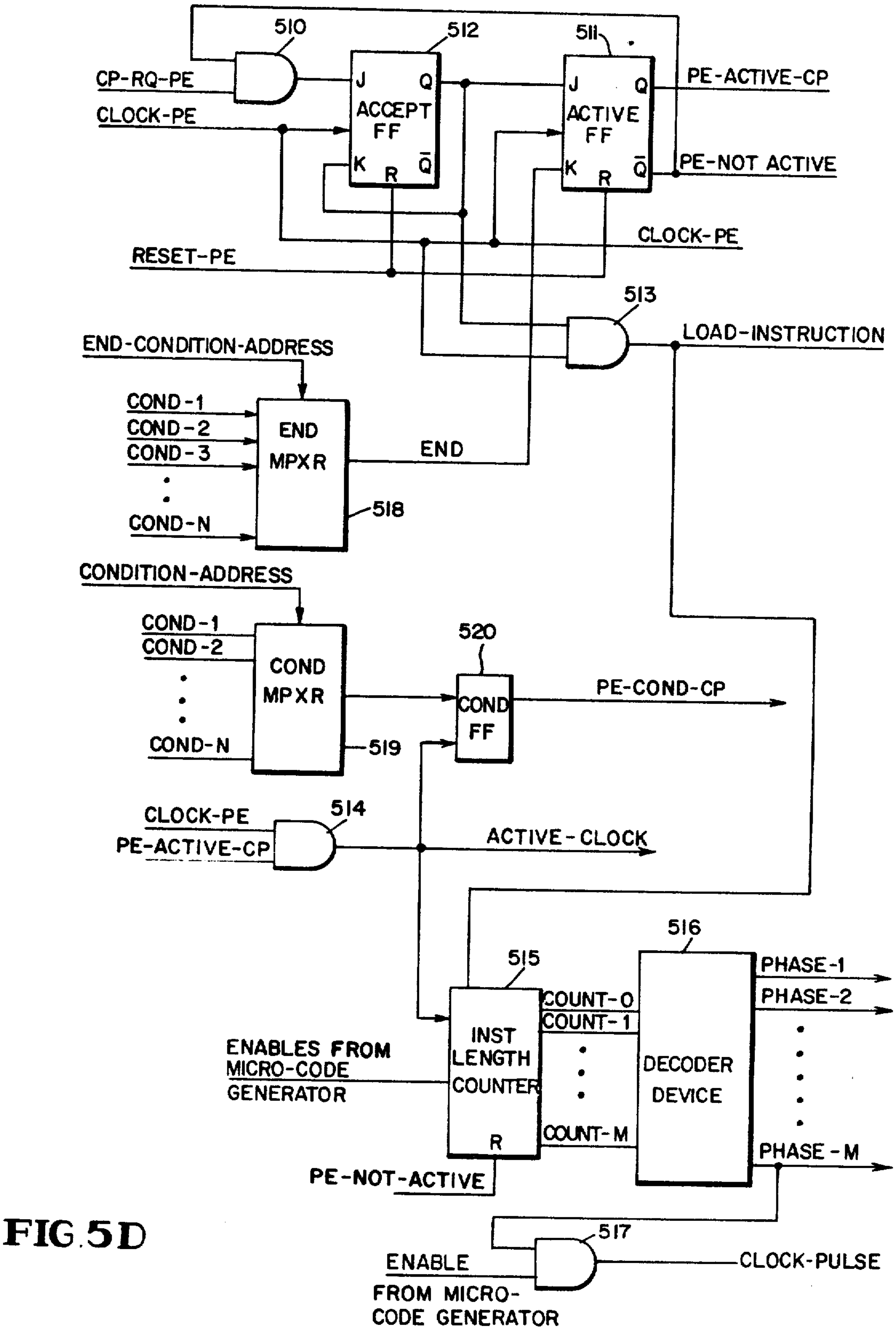
FIG. 5D illustrates the detailed implementation of the control logic circuit portion of the processing element of FIG. 5A for use in processing elements built in accordance to the graph architecture principle, said control logic circuit performing the functions of responding to requests for instruction execution, supplying timing signals at specific times during instruction execution and determining when the instruction has completed execution.
Figure 23:
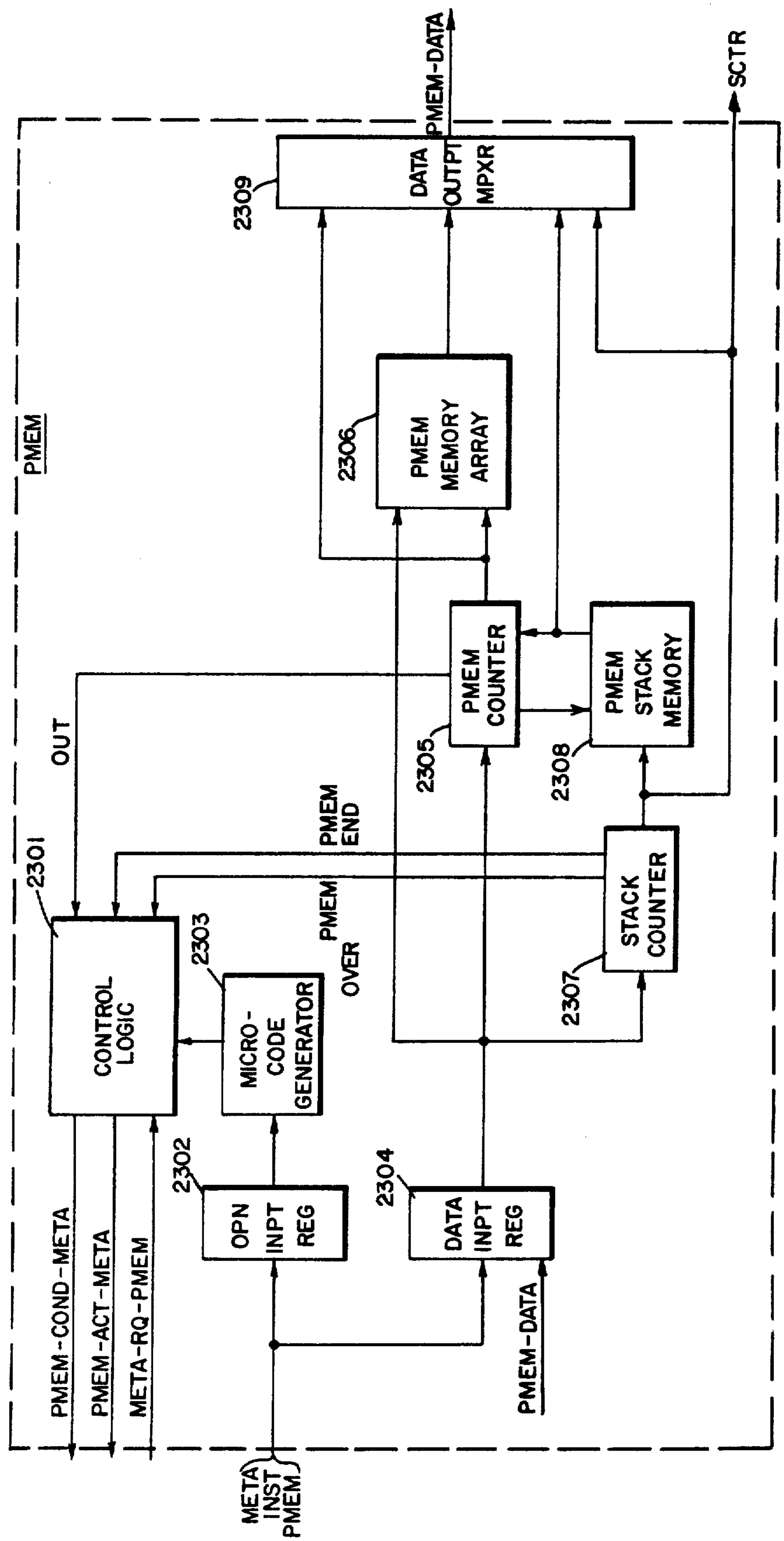
FIG. 23 is a block diagram of an implementation of the PMEM data processor of FIGS. 4A and 4B, the purpose of which is to store and perform operations on the program data structure in the system.
Figure 67A:
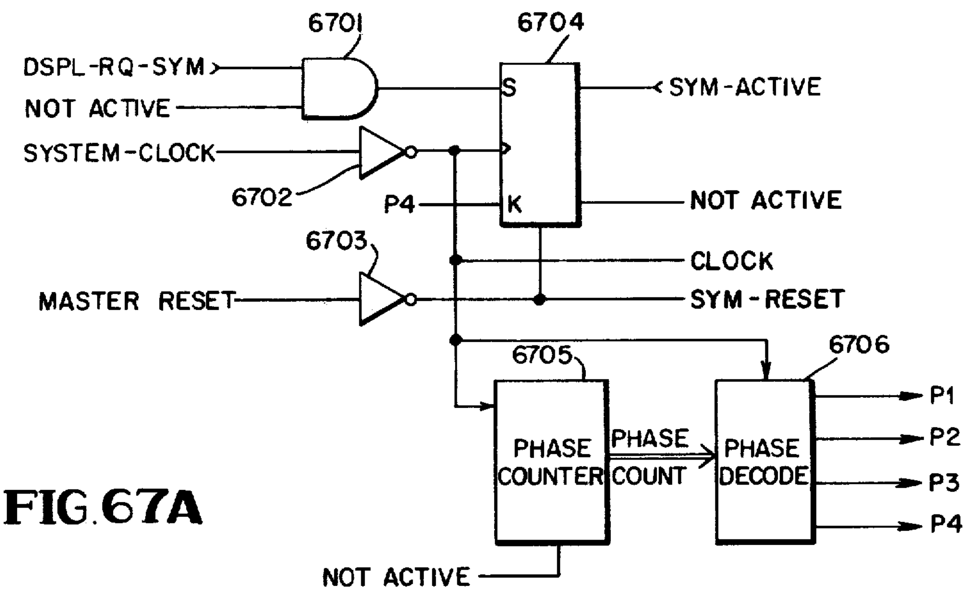
Figure 67B:
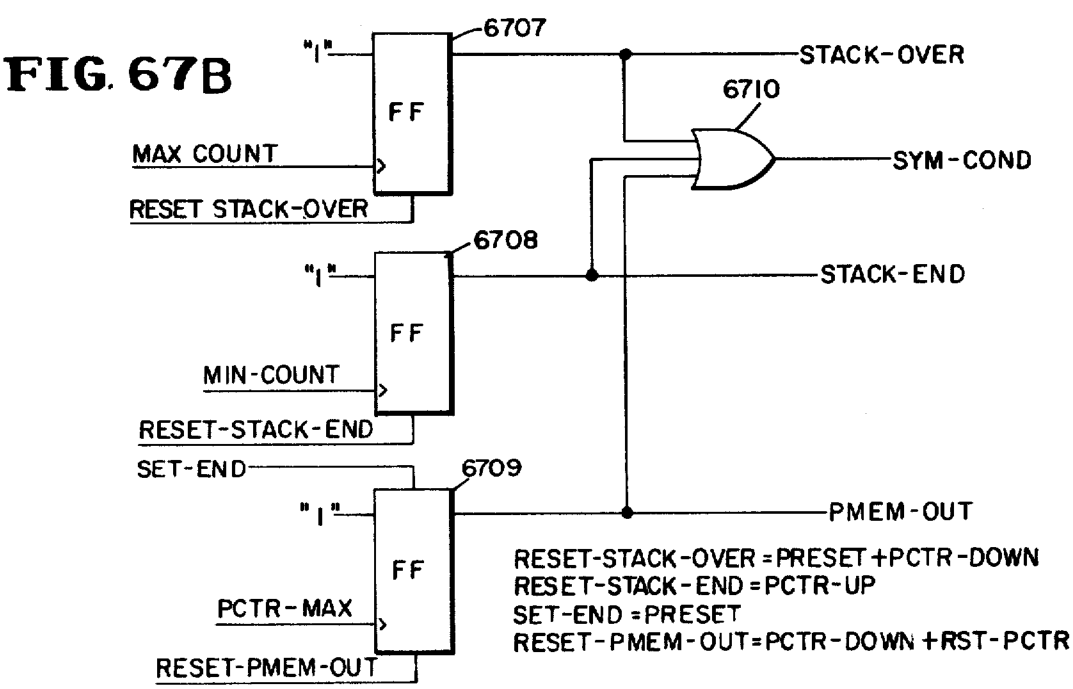

FIGS. 67A and 67B illustrate the detailed implementation of the control circuit 2301 of FIG. 23 for a SYM or PMEM processing element in accordance with the general scheme of FIG. 5D. FIG. 67A details request receipt and internal timing circuitry. FIG. 67B is a schematic of the arrangement of memories.

Figure 68A:
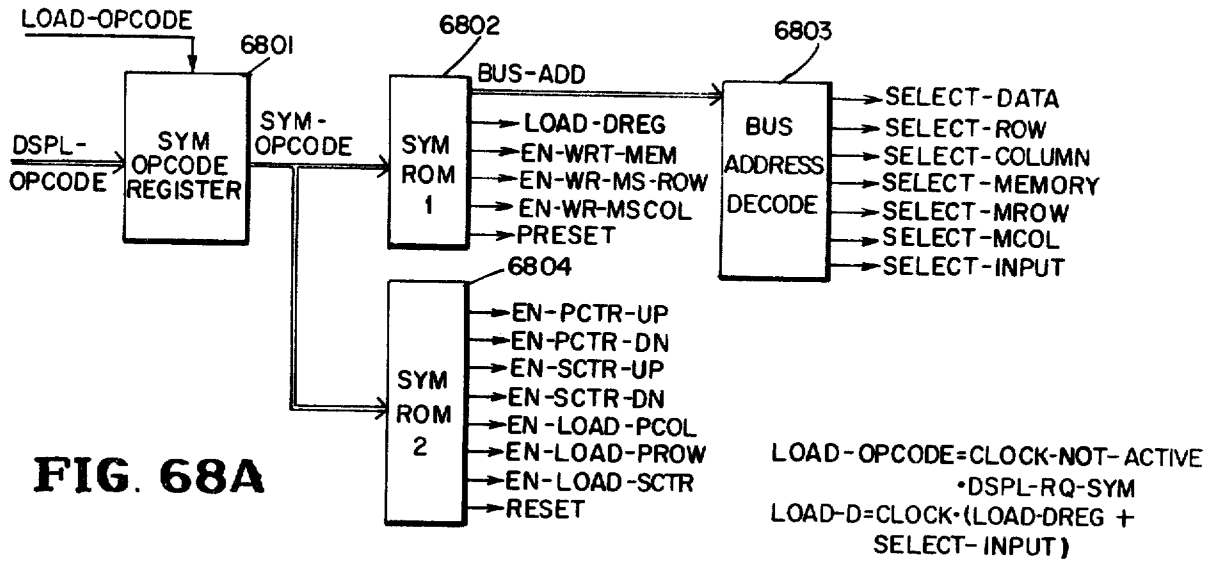
Figure 68B:
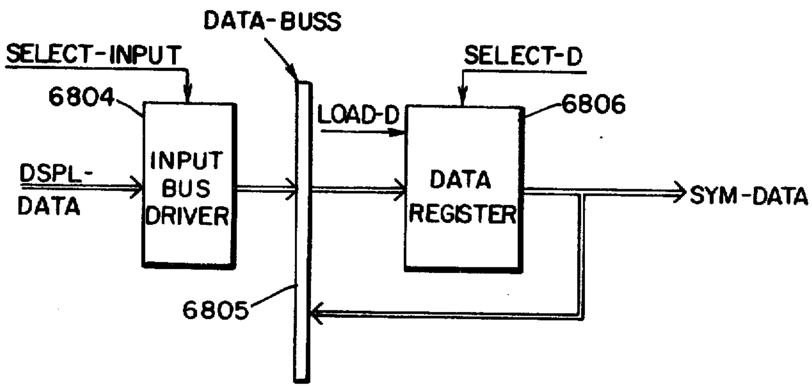

FIGS. 68A and 68B illustrate the detailed implementation of the instruction input register and micro-code generator portions of FIG. 23 for the SYM and PMEM processing elements in accordance with the general schemes of FIGS. 5B and 5C.

Figure 69:
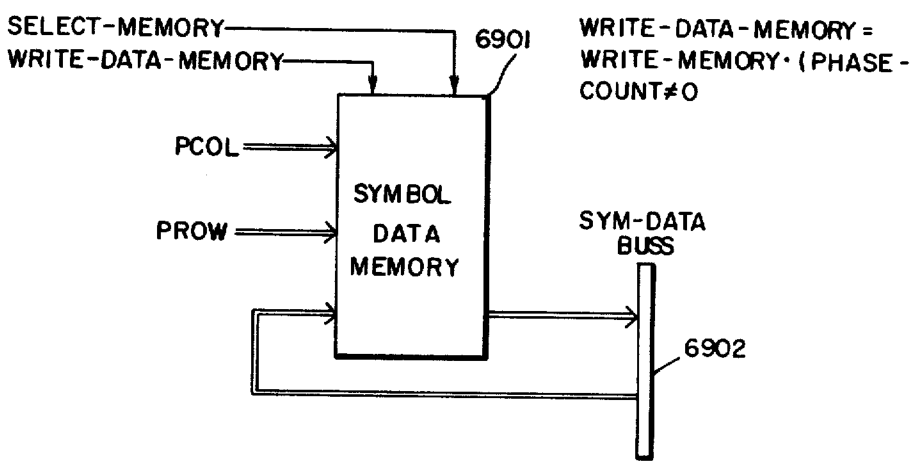

FIG. 69 illustrates the detailed implementation of the data memory portion of FIG. 23 for a SYM or PMEM processing element.

Figure 70:
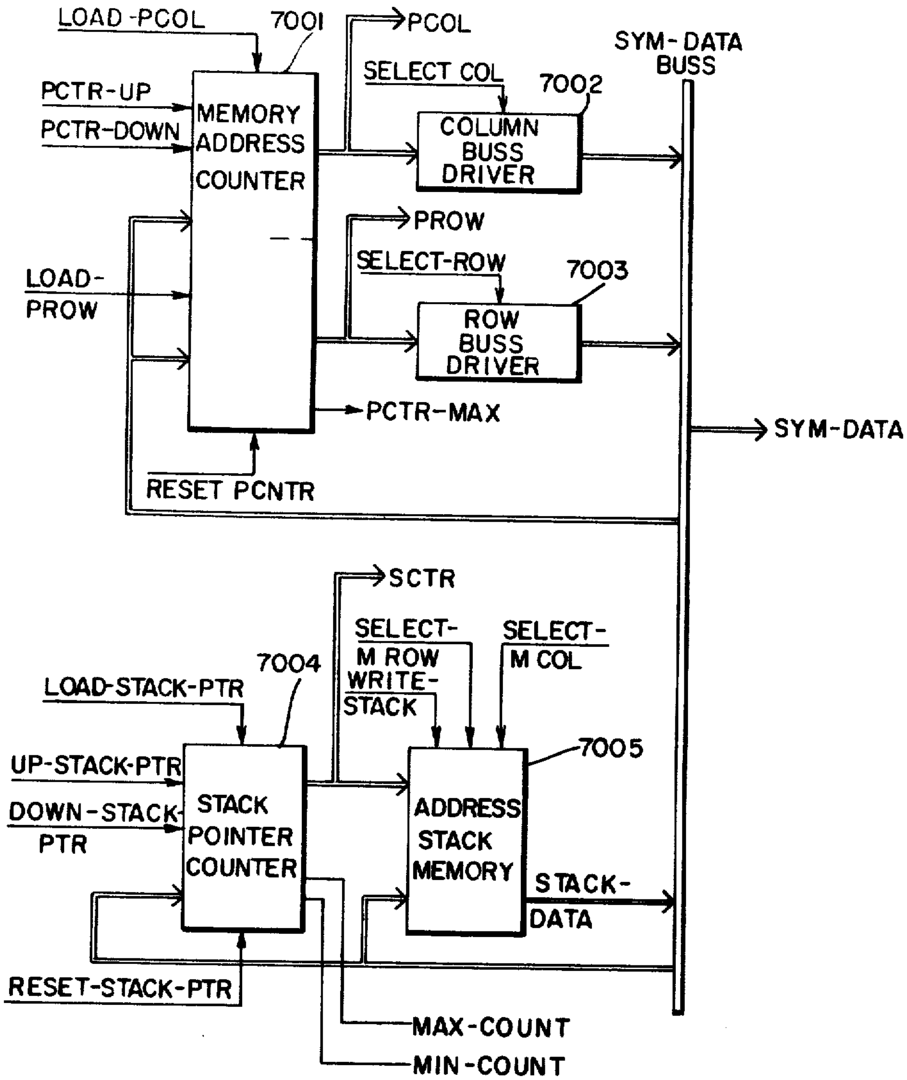

FIG. 70 illustrates the detailed implementation of the address generation circuitry portion of FIG. 23 of a SYM or PMEM processing element.

Figure 71:
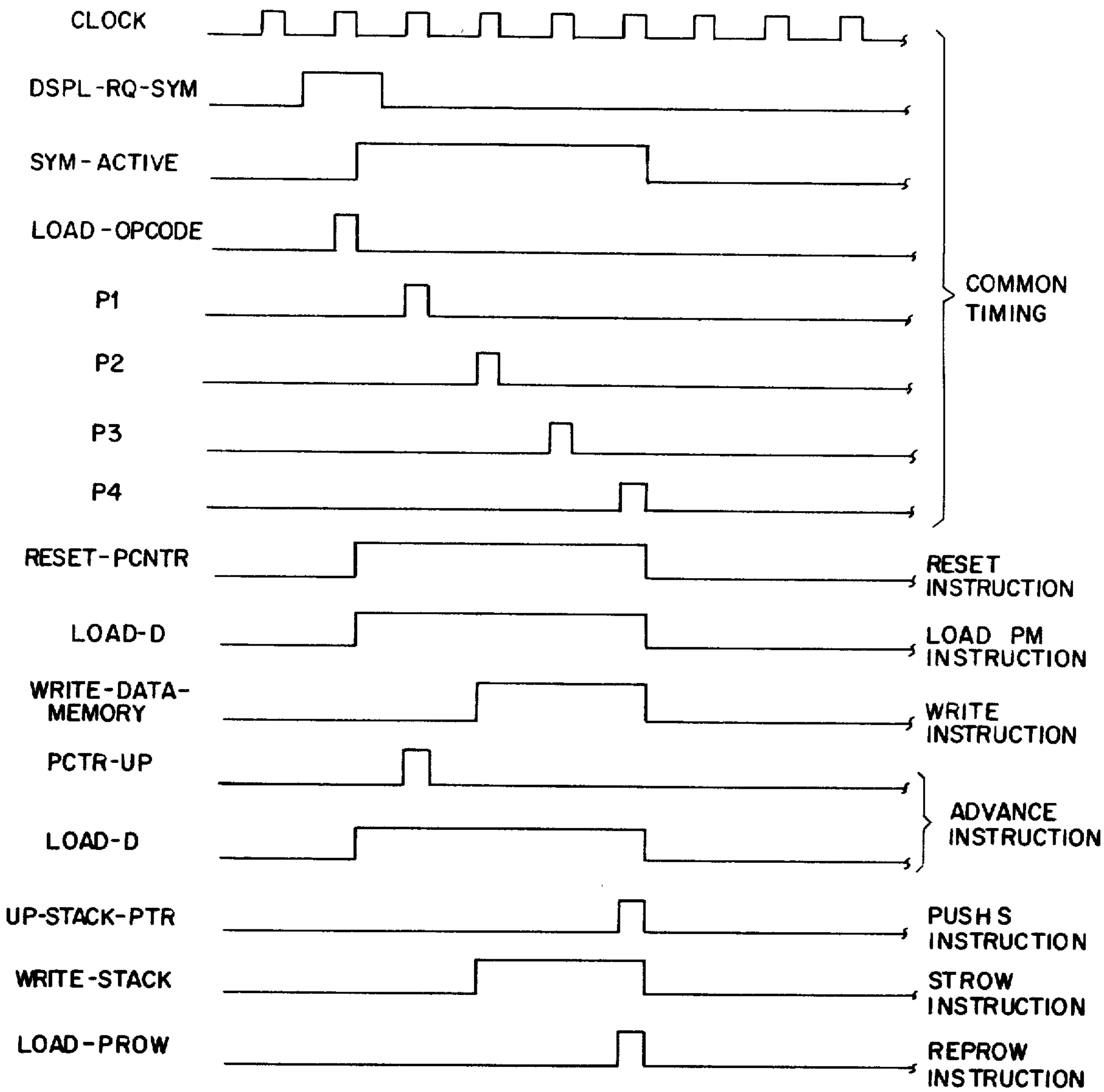

FIG. 71 illustrates the detailed timing of operations for instructions within a SYM or PMEM processing element.

DETAILED DESCRIPTION

GRAPH ARCHITECTURE INFORMATION PROCESSING SYSTEM

Figure 1:
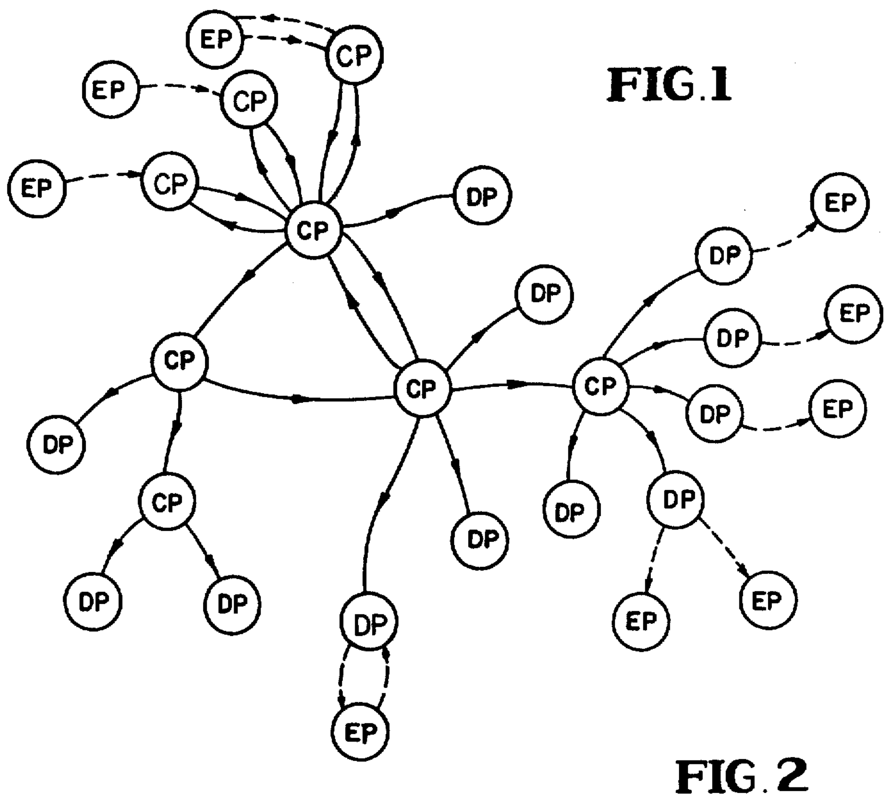
FIG. 1 illustrates a hypothetical interconnection of a plurality of processing elements to form an information processing system in accordance with the graph architecture concept and illustrates a typical arrangement of interconnected control processing elements (CP), data processing elements (DP) and external processing elements (EP).

The following description relates to a graph architecture concept according to my invention for structuring information processing systems. I have adopted the term "graph architecture" as descriptive of my system because, according to this concept, a network of processing elements are interconnected in a manner dictated by the intended application to any specific purpose or system using, as noted in the background discussion above, principles of graph theory. A hypothetical exemplary graph acrhitecture for such a network is illustrated in FIG. 1. In that FIGURE graphically illustrating the novel architecture, each of the circles represents a processing element (PE) of one of three types designated by me as a control processor (CP), a data processor (DP) and an external processor (EP), respectively according to its nature or function. A control processor (CP) is defined as a processing element which directs the actions of other processing elements. A data processor (DP) is a processing element which performs an information or data transformation. An external processor (EP) is a processing element which does not communicate with other processors in the system over the peculiar interfacing connections referred to as control arcs which constitute a characteristic of my invention and is, therefore, "external" to the control system defined by control arc connections. An external processor may be connected to either a CP or a DP, but is connected by lines and circuitry in accordance with prior art for communication with the other processing elements rather than by means of lines and circuitry within the control arc definition. The solid lines in FIG. 1 represent control arc communication lines over which control flows from a control processor to another processing element, with the arrowheads indicating direction of control flow. Each control arc communication line interconnects control logic circuitry in two processors (CP's or one CP and one DP) and with that circuitry is, for convenience of description, referred to as a control arc. When a CP and a DP are connected, the arrow which indicates direction of control flow always points to the DP as control flows from CP's to DP's. In the case of two CP's having control arc connection, the arrow shows the control flow for each control arc and the particular combination of two CP's may have two control arcs—one for each direction of control flow. The dashed lines indicate information flow over conventional (prior art) communication links between control or data processors on one hand and external processors on the other, with the arrowheads indicating direction of information flow. In accordance with the graph architecture concept of the present invention for structuring an information processing system which at the time of my invention was heterodoxial, no single processing element is given overall control of the network as is done in prior art hierarchical systems using distributed processing as noted above with respect to the prior art. Rather, several control processors assume only temporary control over other processing elements in the network and over each other when required to effect performance of a specific operation. Control of processing elements in the network may alternate among various control processors, and several control processors may exercise controls over other processing elements simultaneously. A data processor may be located at any point in the defining graph of the network without modification. An external processor may be connection to any control processor or data processor which is uniquely designed to interface with the particular external processor. This system is not hierarchical or is nonhierarchical in the sense that there is no established unchanging control hierarchy among the processing units as exists in the prior art systems referred to. This is true even though there can be a certain amount of established unchanging hierarchy of control by CP's over certain DP's in branches of the graph. Similarly, this system is heterodoxial in that previous systems regarded an unchanging hierarchy of control as orthodox.

Figure 2:
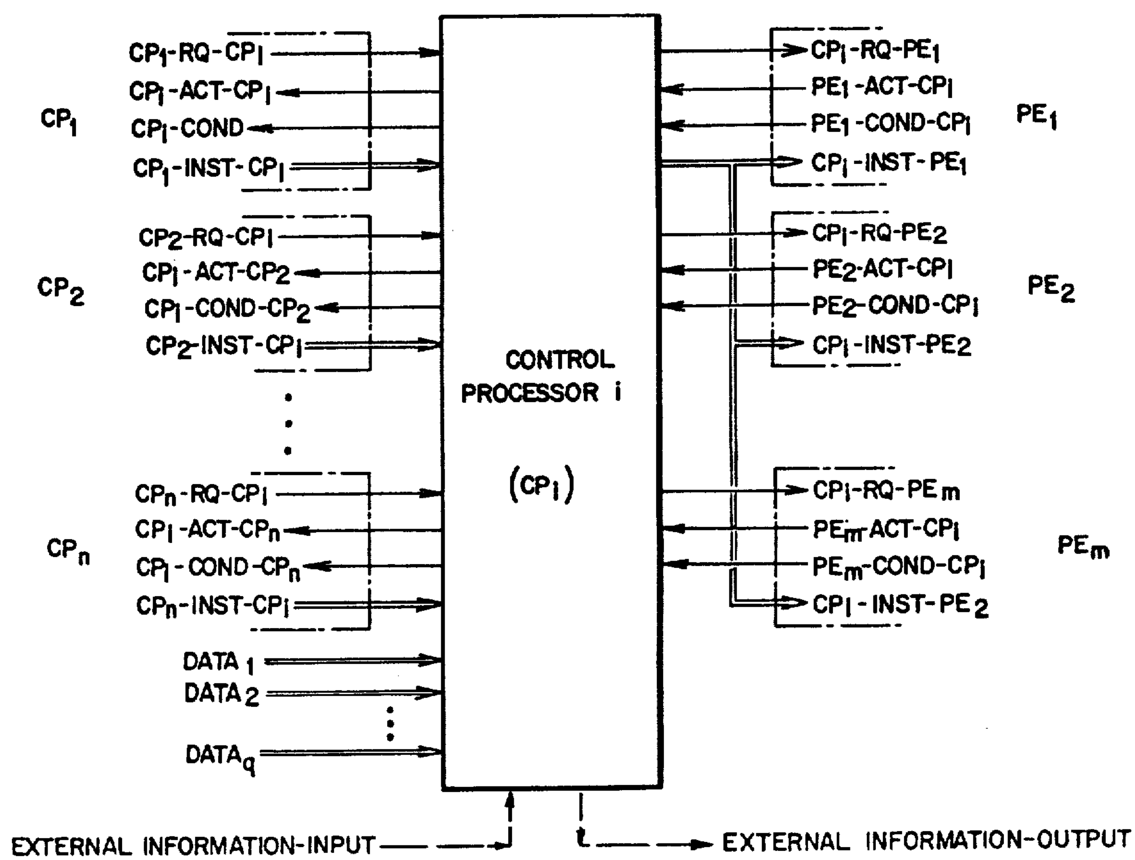
FIG. 2 is a diagram showing the interface signals to a typical control processor ($CP_i$) constituting an essential element of a system as illustrated in FIG. 1 including the definition of the signal content of control arc information communication paths, a plurality of said control arc inputs to the control processor (CP) from a plurality of other control processors (CP's) and a plurality of control arc outputs from the control processor (CP) to other control (CP's) or data processors (DP's) as well as the means for a uniquely designed control processor to interface to external processors (EP's) over prior art communication means.

A typical control processor designated control processor i ($CP_i$) is illustrated in FIG. 2. The primary functions of a control processor is that of issuing instructions (commands to initiate operations) to other processing elements. The control processor may receive instructions from several other control processors designated $CP_1, CP_2, \ldots, CP_n$ and as a result of an instruction input may issue instructions to one or more processing elements of either type, control processor or data processor, and as denoted $PE_1, PE_2, \ldots, PE_m$. In FIG. 2, the lines with arrows represent the communication of signals, designated as, for example, $CP_1$-RQ-$CP_i$ according to the nature of the signal. The double lines indicate a multiple line or wire signal as opposed to the single wire (or line) signals represented by the single lines. Specifically in the convention commonly used in mathematics where $CP_i$ and $CP_j$ represent any two CP's in a system having n CP's, issuance of one instruction input to a selected $CP_i$ from another selected control processor $CP_j$ which is also one of the control processors $CP_1$, $CP_2$, . . . , $CP_n$ of the system includes the following set (sequence) of signals:

$CP_j$-RQ-$CP_i$

This is a single wire signal, the purpose of which is to notify $CP_i$ that $CP_j$ requests $CP_i$ to execute an instruction.

$CP_i$-ACT-$CP_j$

This is a single wire signal indicating to $CP_j$ that $CP_i$ has accepted the instruction from $CP_j$ and is currently active executing the instruction.

$CP_i$-COND-$CP_j$

This is a single wire signal indicating the current condition or status of $CP_i$ and monitored by $CP_j$ to determine its course of action as a function of $CP_i$ operations.

$CP_j$-INST-$CP_i$

This is a multiple line signal containing the instruction given $CP_i$ by $CP_j$. The same lines utilized to transmit instructions are also utilized to transmit data.

The above-described set of signals taken together is referred to as a control arc input from $CP_j$ to $CP_i$. The "direction" of the control arc input is in the control sense even though a control arc input includes a two-way communication (or conversation) including responses (receipts, busy signals, etc.). As a general rule, the "direction" of the control arc input is determined by the direction of the "instruction" communication or signal. A control processor may receive any number of control arc inputs or no control arc inputs. In a similar manner, a control processor may generate a plurality of control arc outputs to other processing elements, but by definition must have at least one control arc output. The set of signals included in a control arc output are the same as those in a control arc input and for $CP_i$ are designated:

$CP_i$-RQ-$PE_k$ $PE_k$-ACT-$CP_i$ $PE_k$-COND-$CP_i$ $CP_i$-INST-$PE_k$ wherein $PE_k$ designates a processing element numbered k, which is any selected one of the set of processing elements $PE_1$, $PE_2$, . . . , $PE_m$ which is a system having m processing elements. As in the case of control arc inputs, control arc outputs involve both conversations and single and multiple line or wire signals. Direction generally is that of the "instruction."

In addition to the required signal inputs, a control processor may also have the following signal inputs if needed for a particular design:

CLOCK

This is a periodic signal used by the control processor to sequentially perform its operations. A particular control processor may generate its own CLOCK signal internally.

DATA

A control processor may receive one or more DATA signals from other processing elements. The time of reading of these signals is determined by the control processor.

EXTERNAL

These are signals utilized to communicate directly with external processors.

MAINTENANCE-ADDRESS

These are multiple-line signals which allow readout of the register and memory values within a processor for maintenance or performance evaluation purposes.

MAINTENANCE-ENABLE

Allows the readout of maintenance data selected by the maintenance address.

MAINTENANCE-STEP

This signal causes each PE to stop after executing each instruction so that maintenance data may be read out between successive instruction executions.

Figure 3:
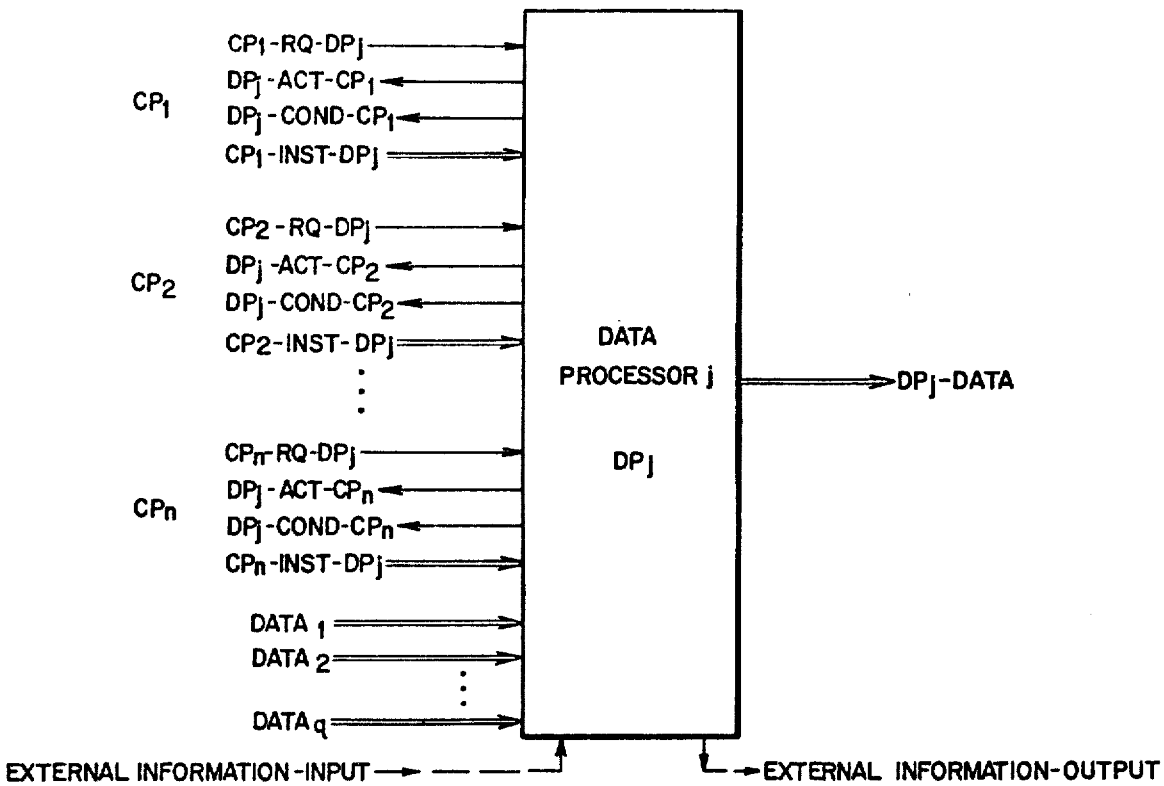
FIG. 3 illustrates the interface block diagram of a typical data processor ($DP_j$) constituting a data processor of the system of FIG. 1 including multiple control arc input paths and the capability of a uniquely designed data processor to interface with external information processing elements over prior art communication means.

A typical data processor designated data processor j ($DP_j$) is illustrated in FIG. 3. The data processor inputs and outputs are the same as those of a control processor with the following exceptions:

1. A data processor does not generate a control arc output.
2. A data processor generates a multiline signal called DATA which is nominally a meaningful result of an operation performed by the data processor as directed by instructions given it by a control processor and using DATA provided by other data processors.

In general a graph architecture network according to my invention operates as follows. In response to an external signal, a control processor initiates the execution of a sequence of operations including the issuance of instructions to other processing elements. Each instruction issuance is typified by the following steps:

1. The originating control processor places the instruction information (CP-INST-PE) on its output lines.
2. The originating control processor places a signal on the request line (CP-RQ-PE) to the destination processing element which the control processor wants to perform the operations specified by the instruction information.
3. If the destination processing element is currently active performing a prior instruction, the control processor keeps the request signal on the line.
4. When a processor active aignal (PE-ACT-CP) is raised by the destination processing element, the originating control processor may assume that the instruction has been taken and drops the request signal.

THE PREFERRED MANNER FOR INTERCONNECTION OF PROCESSING ELEMENTS IN A GRAPH ARCHITECTURE SYSTEM

The following paragraphs describe details of the preferred manner of interconnection of a plurality of processor elements in accordance with the graph architecture concept. In addition, this preferred manner of interconnection is described in the context of the prior art and the preferred manner of interconnection in prior art architecture concepts.

FIG. 5B illustrates the typical interconnection of prior art processors in what is commonly referred to as "general purpose computer" or alternately referred to as a one-processor or uni-processor system. Shown are four circles using the notation (DP, EP) discussed previously to illustrate features of existing general purpose computers. Illustrated in a single uni-processor DP 5V01 (as made and sold by many manufacturers as, for example, a PDP 1103 computer by Digital Equipment Corporation, Maynard, Mass.) which has a capability of communicating by use of nonstandard interface schemes with different kinds of external processing elements, e.g., tape drives, disk file devices, card reader devices, display devices and other devices necessary to allow a system to perform its intended purpose. The prior art system illustrated in FIG. 5V is an example of the minimal information processing system. That is a single data processor which can communicate with a plurality of processors and does communicate with at least one external processor, where said external processor is necessary to allow the practical use of the information processing capability of the data processor based on external information from a human operator or other parts of a realistic system.

Figure 5E:
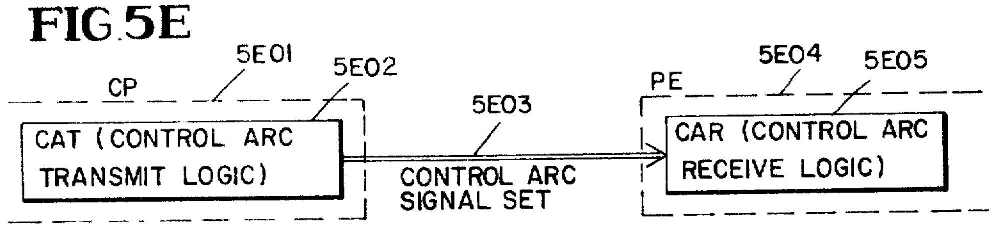
FIG. 5E illustrates the interconnection of two processing elements by way of the control arc concept having a control arc transmit logic in one processing element for communication to the control arc receive logic in a second processing element, with connections between these logic circuits in accordance with FIG. 2.
Figure 5F:
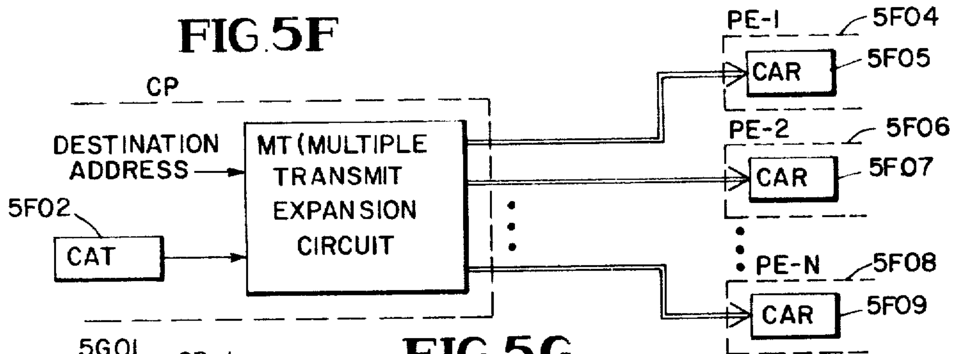
FIG. 5F is a block diagram on one arrangement to permit a control processor to communicate with a plurality of processing elements over multiple control arc outputs, each control arc output being in accordance with FIG. 2.
Figure 5G:
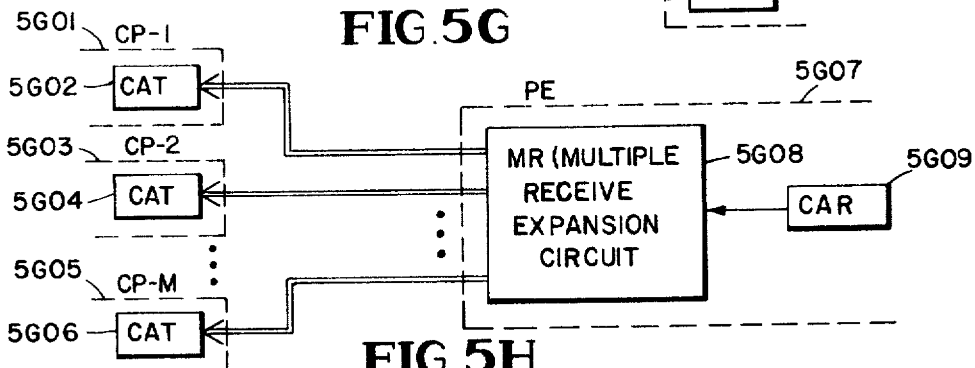
FIG. 5G is a block diagram of one arrangement to permit a single processing element to receive control signals from one or more control processors in a graph architecture machine, each control arc input being in accordance with FIGS. 2 and 3.
Figure 5H:
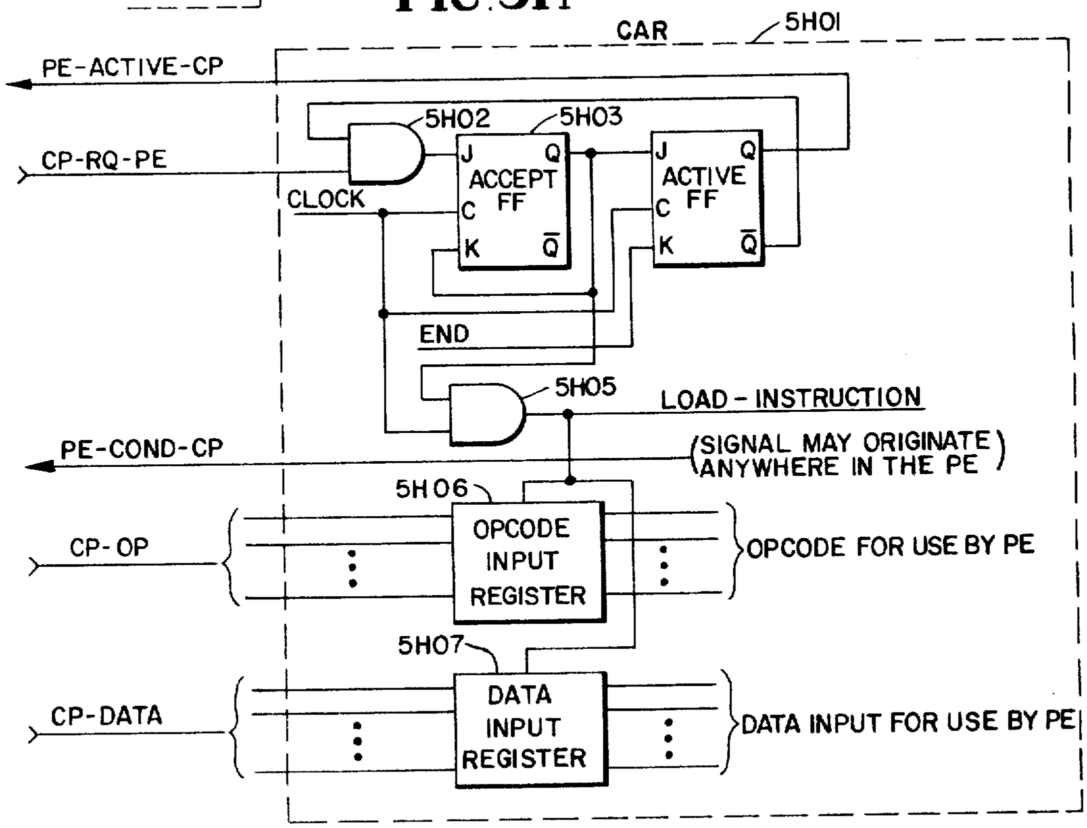
FIG. 5H illustrates an implementation of the control arc receive logic portion (CAR) of FIG. 5E of a processing element such as that shown in FIG. 5A.
Figure 5J:
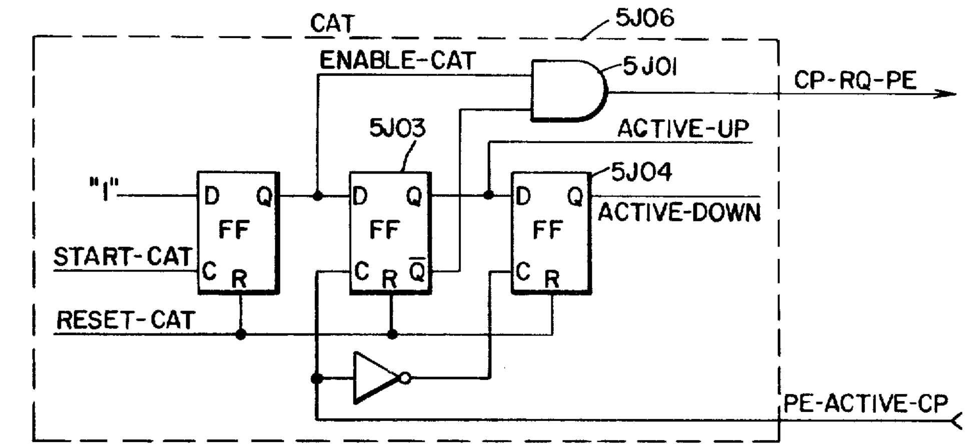
FIG. 5J illustrates an implementation of the control arc transmit logic circuit portion of FIG. 5E for a processing element in a graph architecture machine such as that shown in FIG. 5A.
Figure 5K:
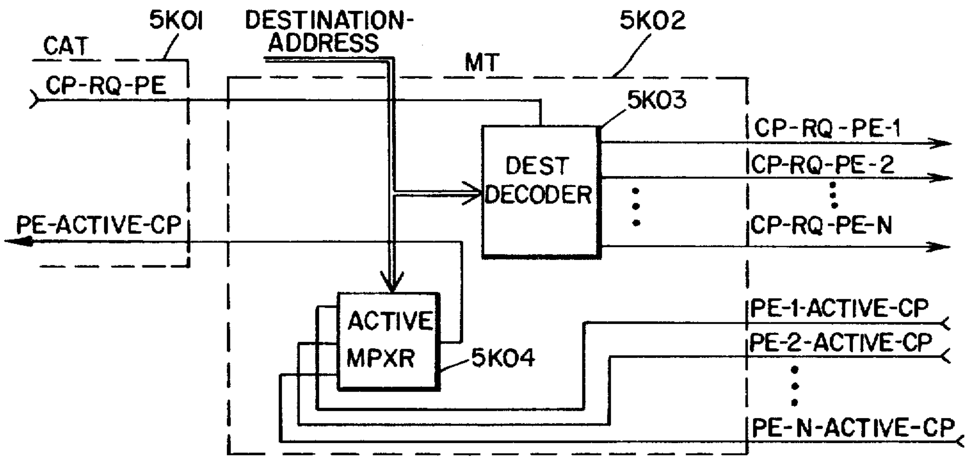
FIG. 5K illustrates an implementation of the multiple transmit expansion circuit portion of the multiple control arc tramsmit logic circuit of FIG. 5F for use in a control processor element such as that illustrated in FIG. 5A in a graph architecture system, where said control processor is required to have more than one output control arc.
Figure 5L:
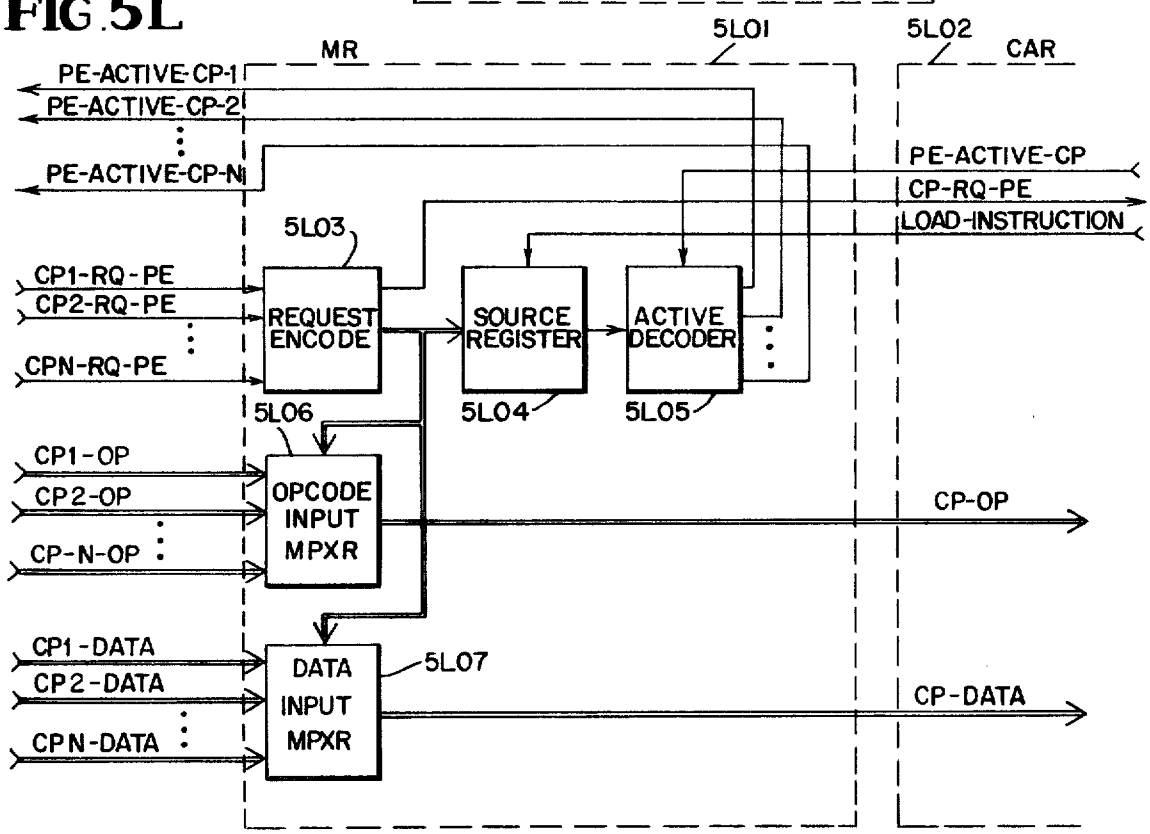
FIG. 5L illustrates an implementation using standard logic for the multiple receive expansion circuit portion of FIG. 5G for a processing element required to have more than one input control arc.
Figure 5M:
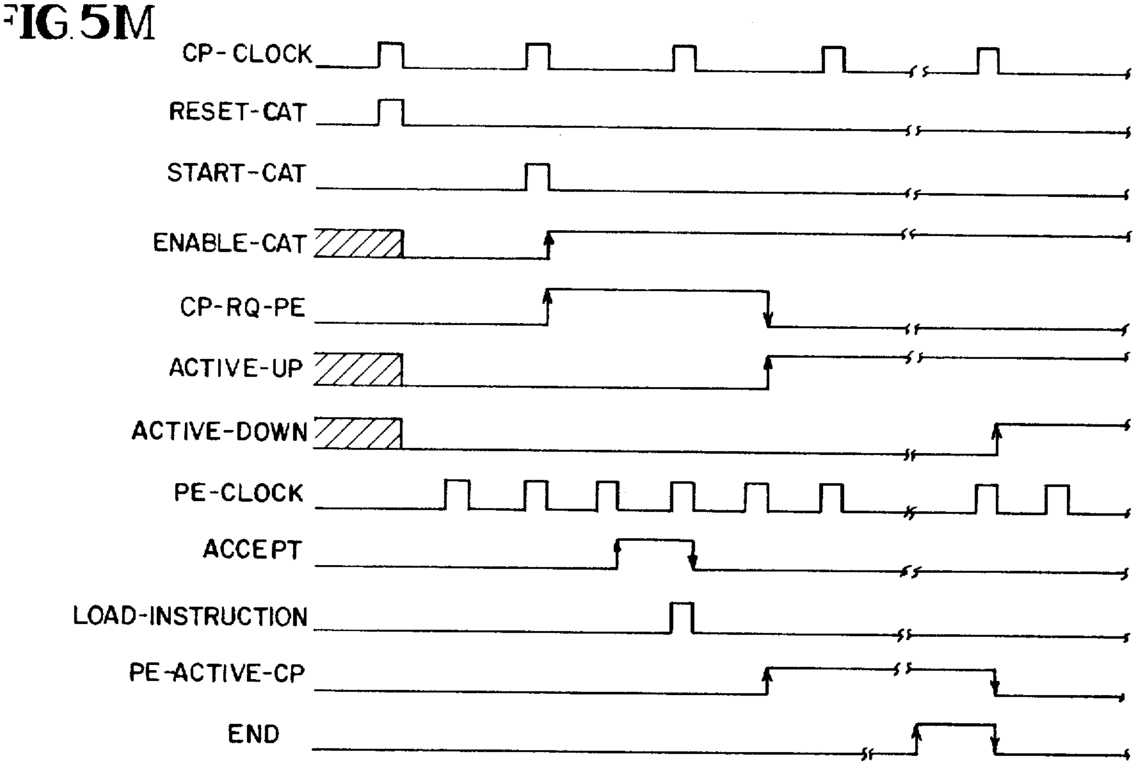
FIG. 5M is a timing diagram for the circuits shown in FIGS. 5H and 5J for the case in which the receiving processing element is not active at the time the request signal is received.
Figure 5N:
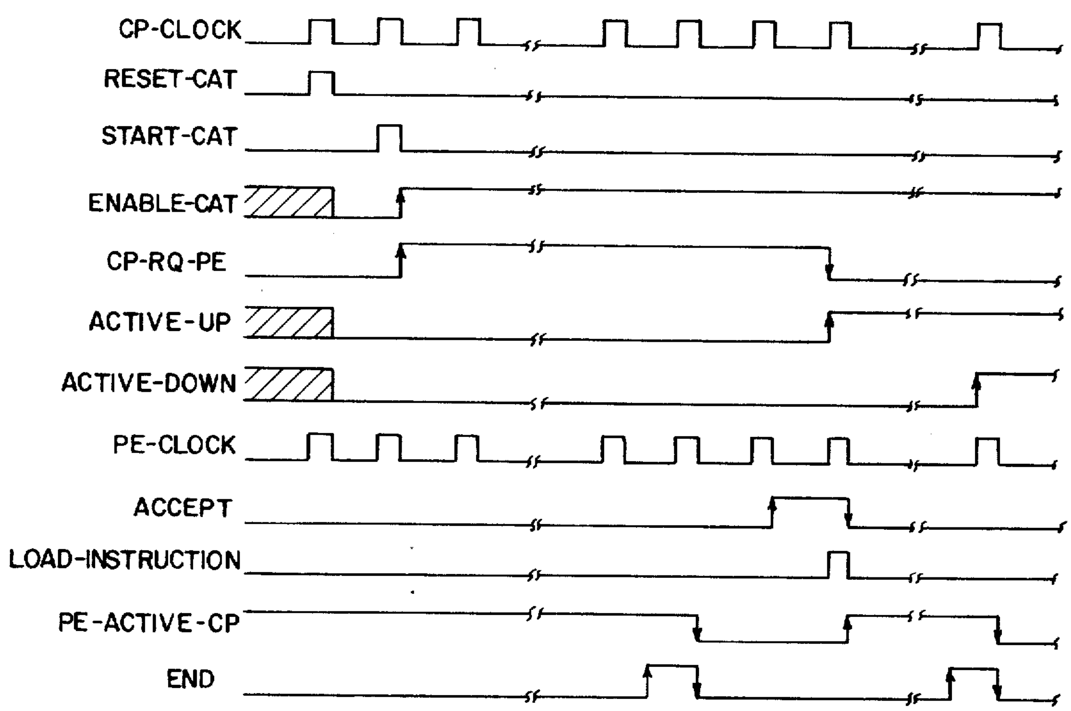
FIG. 5N is a timing diagram for the circuits shown in FIGS. 5H and 5J for the case in which the receiving processing element is active at the time that a new instruction is requested.
Figure 5P:
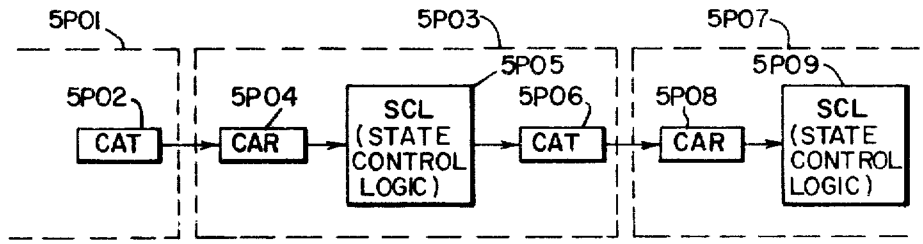
FIG. 5P illustrates a typical interconnection of three processors using the control arc implementations of FIG. 5A and also illustrates the state control logic in two processing elements, and further illustrates that a processor may generate an instruction to a third processor as determined by a combination of an instruction from a first processor in conjunction with a current state value.
Figure 5Q:
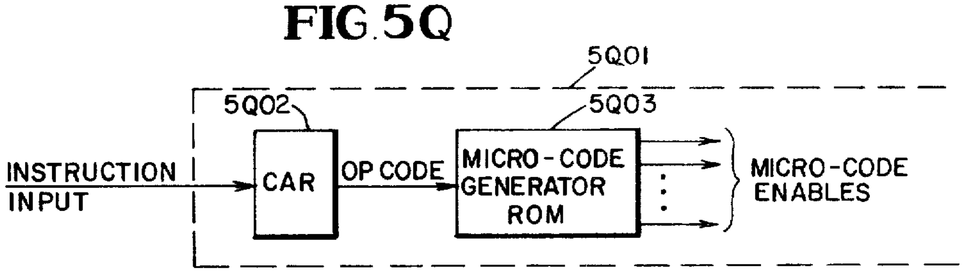
FIG. 5Q illustrates the simple case of a processing element not having means of the state control concept shown in FIG. 5P.
Figure 5R:
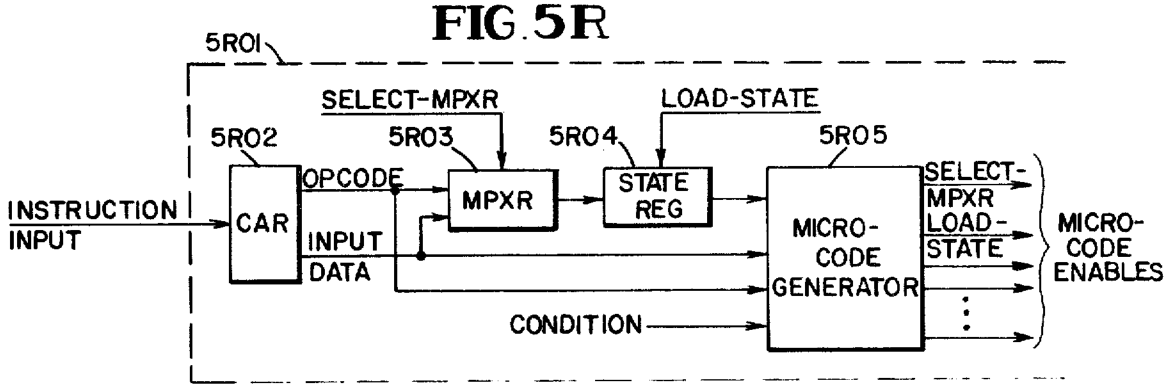
FIG. 5R illustrates an implementation of the state defined control logic portion (SCL) of FIG. 5P for a processing element in which the state may change only once during the execution of a given instruction input.
Figure 5S:
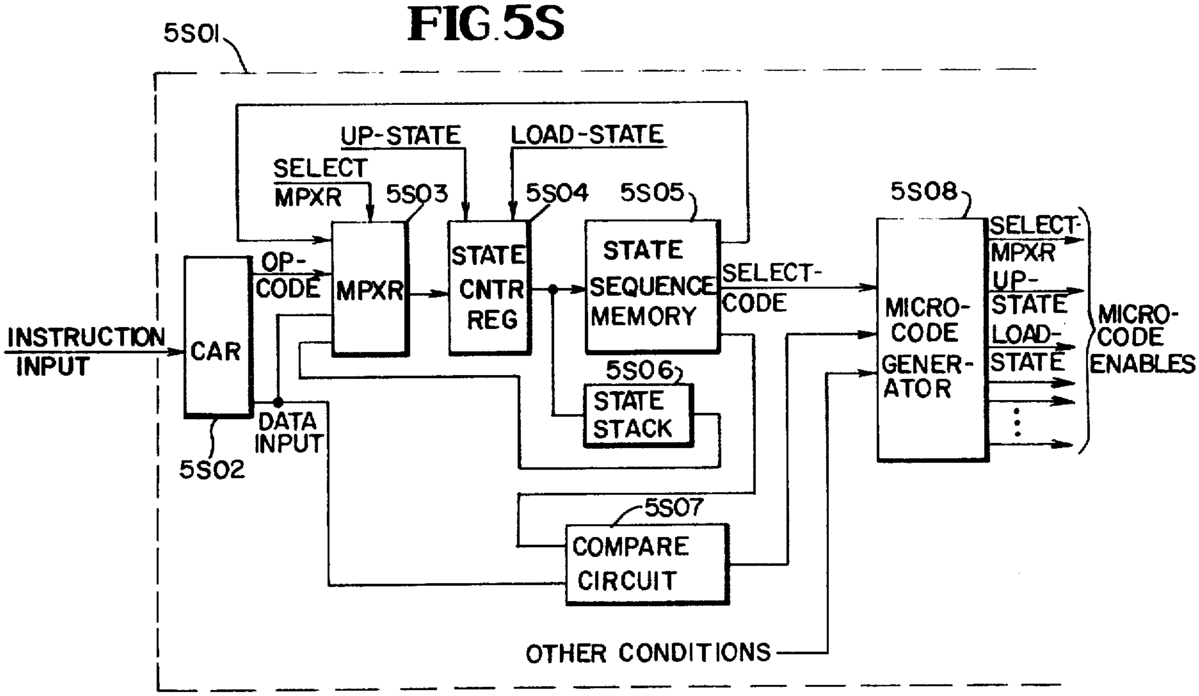
FIG. 5S illustrates an implementation of hardware for the state controlled logic portion (SCL) of FIG. 5P for a processing element in which the state may change several times during the execution of a single instruction input and intermediate states may be recorded on a control stack.
Figure 5T:
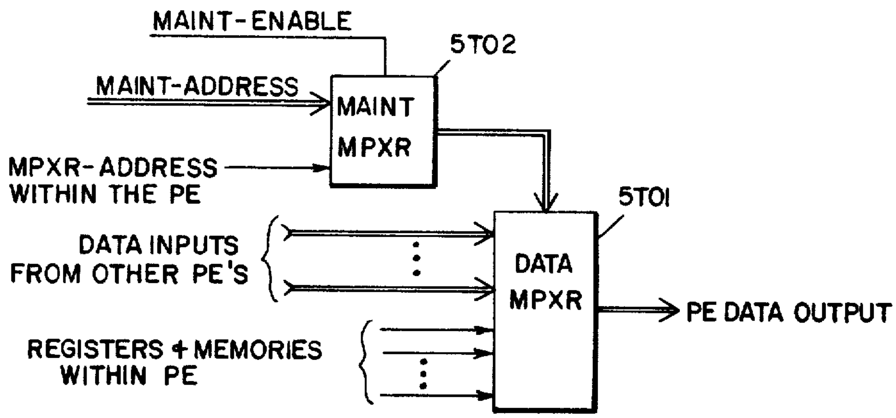
FIG. 5T illustrates the detailed implementation of the maintenance multiplexer concept in a processing element in a graph architecture system.
Figure 5U:
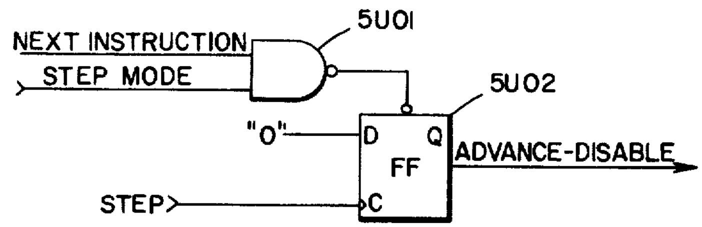
FIG. 5U illustrates an advance disable circuit of a control processor necessary for use in conjunction with the maintenance multiplexer concept for allowing access to the values of data registers and memories within an information processing system built in accordance with the graph architecture principle.
Figure 5V:
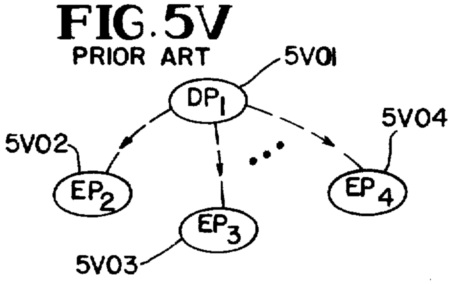
FIG. 5V illustrates the interconnection of processing elements in prior art general purpose computers having a uniprocessor capability, and showing that such a system may have any number of external processors connected to the uni-processor.
Figure 5W:
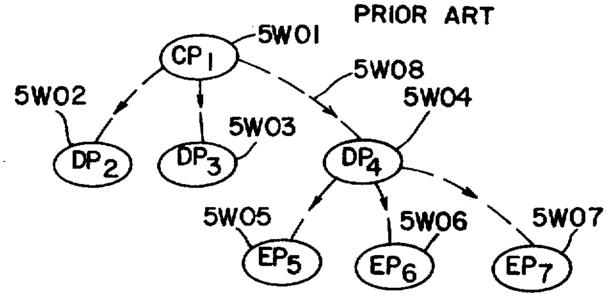
FIG. 5W illustrates the interconnection of processing elements in prior art systems built in accordance with the direct function processor concept, in which there may be a plurality of processors in addition to external processors but in which only two levels of processors are allowed.

FIG. 5W illustrates another prior art information processing system built in accordance with the "direct function processor" concept referenced in U.S. Pat. No. 3,631,401, Dec. 28, 1971, "Direct Function Processor," to Saul B. Dinman. FIG. 5W is a plurality of processing elements interconnected in accordance with the concept of the Dinman invention into a processing system consisting of one processing element which performs functions similar to a control processor in my invention and which has communication links to a plurality of data processing elements which in Dinman are referred to as "direct function processors" where in turn those processing elements may have further communication ties to external processing equipments such as the standard line printers, card input readers, etc., referred to previously. Since in the architecture approach of Dinman, the communication ties between the processing elements which perform the control processing function and those processing elements which perform the data processing function are not over lines which meet control arc definition described in and constituting a characteristic of my invention, the communication lines are illustrated in FIG. 5W by the dashed lines. In summary, the Dinman invention, as noted above in the discussion of the prior art, refers to the implementation of a distributed processing information processing system in which there are two levels of control: (1) a main control which is similar to the uni-processor control as illustrated in FIG. 5V, and (2) a second level of control consisting of one or more processing elements for performing specific functions in the information processing system.

Figure 5X:
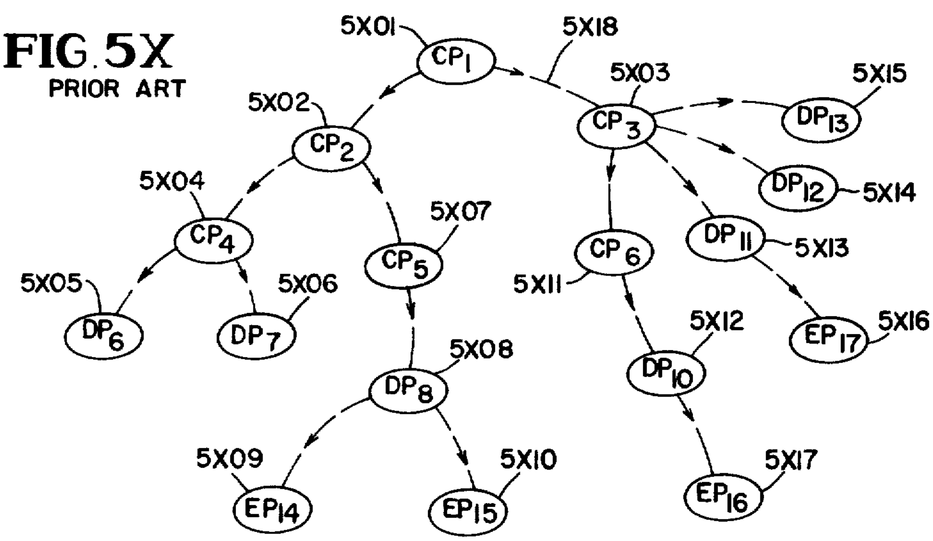
FIG. 5X illustrates the possible interconnection of processing elements in prior art information processing systems built in accordance with the pyramidal hierarchy control flow concept, in which there may be a plurality of control levels of processors in addition to external processors.

A further prior art evolution of the distributed processing architectural art is that described in U.S. Pat. No. 3,962,685, "Data Processing System Having Pyramidal Hierarchy Control Fow, "Albert P. Belle Isle, as described above in the analysis of the prior art. An illustrative machine built in accordance with the Belle Isle concept as depicted in FIG. 5X shows a machine having a plurality of processors in several levels arranged in a pyramidal or tree-structured manner wherein there is one processor 5X01 at the top of the pyramid. Processor 5X01 as the main processor is designated $CP_1$ (control processor) and has responsibility for directing the activities in its subprocessors wuch as $CP_2$ 5X02 and $CP_3$ 5X03 which in turn may direct the activities of subordinate processors such as $CP_4$ 5X04 and data processor $DP_{11}$ 5X13.

In this scheme of Belle Isle, as in other prior art arrangements, there are communication ties between processors, but the communication ties are orthodox hierarchical ties which do not purport to meet the novel control arc interconnection described and claimed in this application. In summary, an information processing system of the pyramidal hierarchical control flow concept may have multiple levels of control, having at least three levels according to Belle Isle, and must have a top-most level processor as the overall controlling element and the only processing element in the system which may have the state defined control concept used in the control processors of my invention. In addition, the ends of the tentacle-like depending processors of Belle Isle forming the base of the pyramid remote from the top-most processor must be data processors or external processors but never control processors.

Figure 5Y:
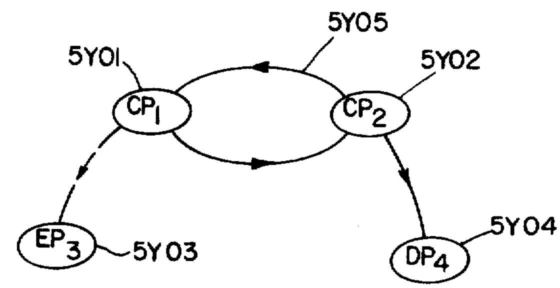
FIG. 5Y illustrates the minimum connection of processing elements for any system built in accordance with the graph architecture principle, showing that a plurality of processors is used in addition to external processors and that no single processor is required to be a dedicated highest level control processor, and also showing the interconnection of processors in accordance with the control arc concept implementations shown in FIGS. 2, 5E, 5F, etc., and the connection to external processors over prior art communication paths.

In contrast to these prior art information processing system architecture concepts, FIG. 5Y illustrates a minimal information processing according to my novel graph architecture concept. FIG. 5Y shows a system consisting of four processing elements, of which one, 5Y03, is an external processor $EP_3$ which as in the other systems illustrated conforms to a principal requirement of any information processing system, a combination of two interconnected control processors, $CP_1$ 5Y01 and $CP_2$ 5Y02, and a data processor $DP_4$ 5Y04. One principal difference between this graph implemented information processing system and each of those described previously is that as illustrated in FIG. 5Y, "control loops" may exist in the interconnection of processing elements. For example, $CP_1$ 5Y01 has a control arc output to $CP_2$ 5Y02 and, in addition, control processor $CP_2$ 5Y02 has a control arc output to $CP_1$ 5Y01. In this interconnection, the control processors $CP_1$ and $CP_2$ are said to be in a control loop or cycle. Also, in the graph architecture concept, each of the processors may utilize the state defined control concept and in the general case at least two of the processors must have state defined control. In this manner, neither control processor $CP_1$ nor control processor $CP_2$ is required to be the principal control processor in the system at all times. That is, at one time, control processor $CP_1$ may be the principal control activator in the system whereas at other times, as a function of the state defined control, control processor $CP_2$ may be the principal control processor and data processor $DP_4$ is utilized for performing the actual information transformations required to result in a useful and meaningful transformation of data for computations. For semantic purposes and to distinguish my system from the prior art, I use and define the term non-hierarchical as meaning a system that does not have an established structural hierarchy of processors as do Dinman and Belle Isle.

As a way of determine whether a given information processing system is of the type found in prior art or in a machine in accordance with my graph architecture concept, the number of processing elements in the system may be compared to the number of control arcs defined in this sense solely as the number of interconnections useable for control purposes among processing elements. In a graph architecture machine having a number N of processing elements of type CP or DP (excluding EP's), the number of control arcs interconnecting said processing elements is N or more. By contrast, in an information processing system along the lines of Dinman or Belle Isle, the number of interconnections among N processors of type CP or DP is N−1. This is illustrated by FIG. 5X wherein there are N=13 processing elements of type CP or DP with 12 or N−1 interconnections; by FIG. 1 wherein there are N−20 CP's plus DP's interconnected by 24 or N+4 control arcs. In the minimal system of FIG. 5Y, there are N=3 CP's and DP's and 3 or N interconnecting control arcs. The Dinman system of FIG. 5W has N=4 CP's plus DP's and 3 or N−1 interconnections.

Figure 5Z:
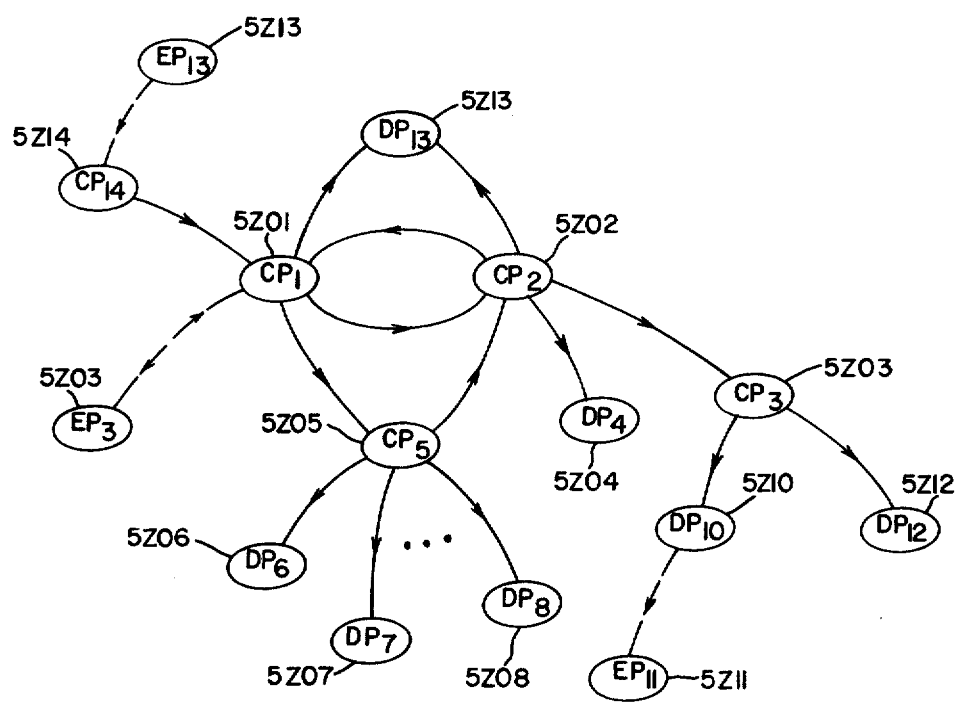
FIG. 5Z illustrates an information processing system built in accordance with the graph architecture principle having a plurality of processing element interconnections, including multiple input arcs and multiple control loops and also showing that prior art hierarchial structures may be included as a part of an overall interconnection work.

FIG. 5Z illustrates an arbitrary hypothetical interconnection of a plurality of processing elements into a system in accordance with the concept of my graph architecture. The FIGURE shows the various ways in which processing elements can be interconnected including:

1. A control processor to control processor loop as illustrated by the two control arc lines connecting $CP_1$ to control processor CP2.
2. There may be more than two control processors in a loop as illustrated by the loop formed by control arc lines running from $CP_1$ to $CP_5$ to $CP_2$ which in turn has connection back to $CP_1$.
3. In the general case, an information processing system built in accordance with the graph architecture concept may have control loops amongst a set of control processors in which there may be two processors in that loop or three processors in that loop or a multiplicity of processors in that loop.
4. In addition, as illustrated in FIG. 5Z, there may be more than one control arc loop in the information processing system network as described in 1 and 2 above.
5. In addition, an information processing system built in accordance with the graph architecture principle may have multiple control arc inputs to individual processing elements and those multiple control arc inputs may be generated into processing elements either of type control processor, e.g., $CP_2$, or of type data processor, e.g., $DP_{13}$.
6. Also illustrated in FIG. 5Z is the fact that a control processor may not have a control arc input as illustrated in the case of $CP_{14}$ in which case the control input originates as a result of an input from external processor $EP_{13}$ and as a result, $CP_{14}$ generates a control for controlling the activities of $CP_1$.
7. In addition, an information processing system built in accordance with the concept of the graph architecture principle may include, as subparts, tree-structured networks as illustrated in the connection of $CP_3$ to data processor $DP_{10}$ and also data processor $DP_{12}$.
8. One aspect of my concept of my graph architecture is the denial of a requirement for any one single control processor to be the principal control agent of the network for all time. In the network illustrated in FIG. 5Z, any of the control processors $CP_1$, $CP_5$ or $CP_2$ may be the principal control processor at a particular time. The passing of the principal control function from one processor to another processor is made possible by facts that (1) there is a cycle otherwise called a loop in the control arc network and (2) there are more than one processing element in the system that have state defined control.

Figure 4A:
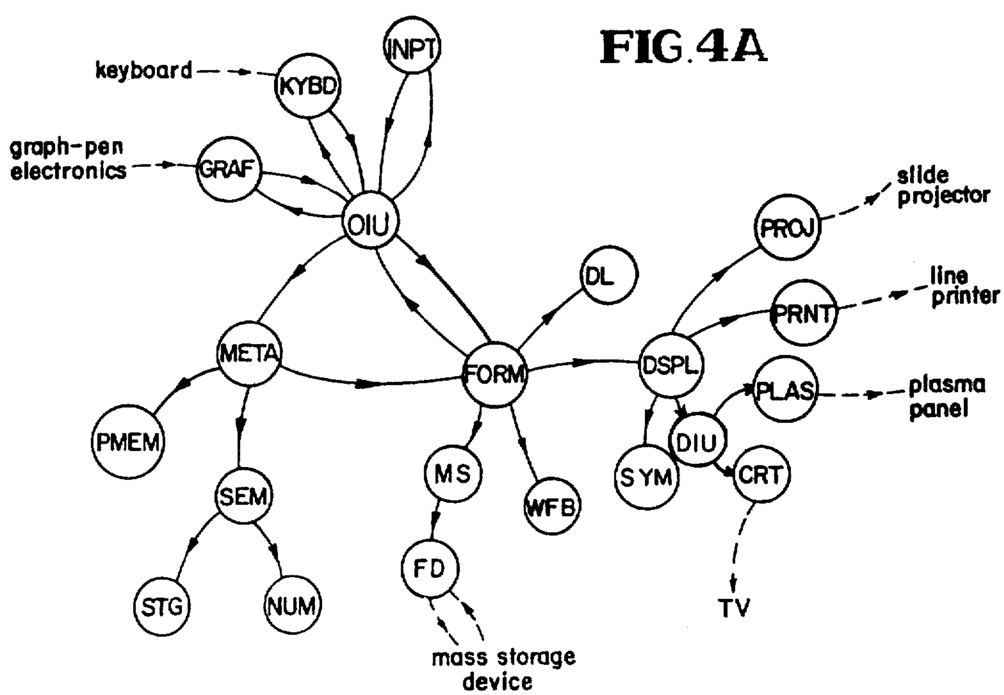
FIG. 4A illustrates the interconnection network of a plurality of processing elements for the training system built in accordance with the graph information processing concept referred to in the specification as representing the reduction to practice of my invention.
Figure 4B:
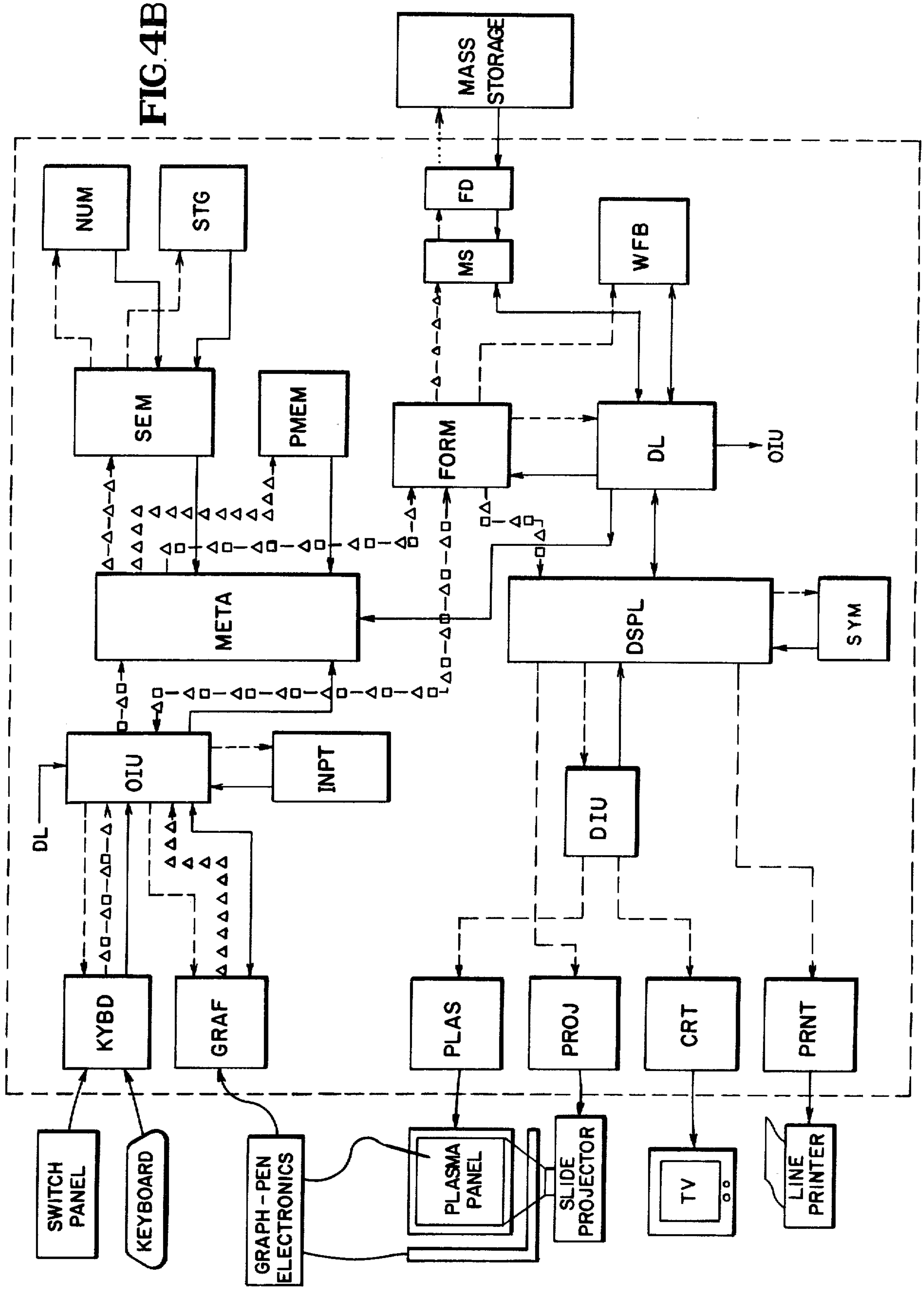
FIG. 4B illustrates the block diagram of the same training system depicted in FIG. 4A illustrating the data and control flow amongst the plurality of processing elements and illustrating that the data flow amongst processors need not be identical to the control arc interchange amongst the processors.

These eight features of the graph architecture information processing system concept may now be related to the interconnection network of the training system noted in the foregoing "Summary of Invention" as constituting the reduction to practice of my invention as illustrated in FIGS. 4A and 4B. As shown, the training system exhibits the principle of having control arc loops as illustrated by the cyclic connection of the OIU processor to the METAPROCESSOR to the FORM processor. In addition, the training system exhibits the principle of having two or more processing elements having state defined control in that the METAPROCESSOR and the FORM processor each have state defined control ability. As a result of the combination of these two facts, no single processor in the system need be the principal control processor at all times. Thus, at certain times and as actually occurs in operation of my training system, the METAPROCESSOR is the principal control agent for program execution. At other times, the FORM processor is the principal control agent which issues instructions through the OIU to the METAPROCESSOR, for example, to load the definition of a particular high level language in the METAPROCESSOR, or to load a specific user level lesson program in the program memory processor, or to distribute data to the INPT processor for definition of the hit points associated with the student pen entries. In addition, as illustrated in FIG. 4A, the training system built in accordance with the graph information system processing concept uses multiple control arc input to more than one processing element. For example, the OIU processor receives control arc inputs from the GRAF, KYBD, INPT, and FORM processors. In addition, the FORM processor receives control arc inputs from both the META and OIU processing elements.

EXEMPLARY INFORMATION PROCESSING SYSTEM

FIG. 4A, as noted previously, is an illustration of an information processing system built in accordance with the graph architecture concept discussed above. This system is useable for a wide range of processing tasks but in the implementation used for reduction to practice and testing of my invention is particularly suitable for use as a training device and it will hereinafter be referred to as a training system and discussed with this particular application in mind.

The training system is illustrated in more detail in block diagram form in FIG. 4B. That portion of FIG. 4B enclosed within the large dashed line box corresponds to the network of processing elements interconnected by the control arcs in FIG. 4A. Each block within the dashed line box corresponds to one of the processing elements in FIG. 4A—and also the system generally corresponds to the network of control processors (CP's) and data processors (DP's) of FIG. 1 (except for a rearrangement in the Display Processor). The solid lines interconnecting the blocks are data lines with arrowheads indicating direction of information flow. Each of various types of broken lines interconnecting the blocks represents a control arc corresponding to one of the control arcs (solid lines with arrow) illustrated in FIG. 4A. All system elements external to the control arc network (i.e., external processors, EP's) are located outside the dashed line box and arrowheads on lines of interconnecting these elements with processing elements within the network indicate direction of information flow.

The purpose of the training system constituting the reduction to practice and the basis for explanation of the invention is to provide an automatic training device which has the capability of communicating with a trainee and evaluating the trainee's response to sensuous presentations provided by the system in accordance with a preprogrammed lesson plan or program. The training system also has the capability of communicating with an instructor and cooperating with the instructor in preparation of lesson plans. Additionally, the training system has the capability of communicating with other information processing systems thus allowing the training system to be integrated into a central general purpose computer controlled training complex, if desired.

To facilitate the above-mentioned communication between the system network and the trainee, the following external processing elements (exemplary vendor types are given in Appendix A) are provided in the particular model of system used in the example.

1. Switch Panel—This panel includes switches utilized to select one of three modes of system operation, i.e., bootstrap, normal lesson run and maintenance.
2. Keyboard—A standard ASCII (American Standard Code for Information Interchange) keyboard having the capability of generating 128 separate codes is provided. Ninety-six of these codes represent characters and thirty-two represent control functions.
3. Graph-Pen Electronics—The graph-pen electronics locates a hit point of a sonic pen touched to a surface in a grid area bounded by two microphones positioned to form an L or the adjacent sides of a rectangle. The times required for an ultrasonic sound generated by the pen to travel from the hit point to the two microphones defines X and Y coordinates of the hit point. These times are measured by the graph-pen electronics and signals designated X-on and Y-on are produced for time periods representative of the X and Y coordinates of the hit point.
4. Plasma Panel—A flat matrix plasma panel is utilized as the primary display device of the training system. Complex graphics, pictorial representations and characters may be displayed by illuminating patterns of dots within the matrix of the panel. The plasma panel is located within the grid defined by the microphones of the graph-pen device and an operator may indicate selected areas on the panel by utilizing the pen to cause generation of X and Y coordinate signals. Thus, a device enabling two-way communication between operator and training system has been established. For example, a dot-formed image of a hand-held calculator can be displayed on the panel and the operator will actually have the ability to operate the calculator by touching the pen to the displayed calculator keys indicating what operations he desires the calculator to perform. This information will be communicated to the network of processors in the training system which will actually perform the desired calculations and cause the calculated answers to appear in the numeric display portion of the image of the hand-held calculator.
5. Slide Projector—A slide projector is provided to enable rear projection of images on the plasma panel for more realistic pictorial representations than are possible by use of the plasma panel display alone. For example, a pictorial representation of a hand-held calculator might be projected onto the panel with only the numeric display being presented in dot form. A projector having a multiple slide cartridge is utilized in conjunction with a stepping motor and a digital counter to enable selection of any one of a plurality of slides by the network.
6. TV—A three beam cathode-ray-tube device is provided to enable multi-color presentations.
7. Line Printer—A device is utilized to provide a record of operations performed by the training system and/or the operator. This printer forms characters on a paper surface by spraying a beam of ionized ink spurts in a continually changing direction required to write the character. The direction of the beam is controlled by X and Y deflection grids. The required deflections are controlled by electronics within the line printer and information defining characters to be printed is transmitted to the control electronics in the form of a 7-bit data code and a request signal.
8. Mass Storage—A magnetic disc system is utilized to provide storage of lesson plans. In this particular system, a floppy disc device utilizing flexible diskettes for the storage medium is utilized.

Before describing the functions of the processing elements enclosed within the large dashed line box, it is advantageous to note some terms that will be used similar to their uses elsewhere in the art to describe the network:

1. String—An ordered sequence of characters which may represent a statement in a programming language, computation sequence, or data element to be processed.
2. Metalanguage—A language used to describe a programming language.
3. Grammar—The set of rules for the high level language defined by metalanguage notation.
4. Language Level—The degree of complexity of operations described by a single communication in a language.
5. Instruction—A data word defining a specific operation or sequence of operations to be performed.
6. Data—Any information other than operations commanded by control processors.
7. Delimiter—A character indicating the beginning or end of a string or group of strings.

The network has been designed to take advantage of its metamorphic control scheme wherein control processing elements have the ability of issuing commands to each other directly in a high level language beginning at different points in the structure so that no permanent hierarchy is established by the structure. As noted above, this is denoted by a non-hierarchical structure. The various broken lines representing control arcs in FIG. 4B are formed from symbols representing the various language levels used for communicating between processing elements. These levels are defined in Table I. Note that the processing elements often have the capability of communicating at more than one language level and this capability is evidenced by the use of more than one type of symbol to form the broken lines representing a specific control arc connecting two processing elements.

TABLE I

| Level | Symbol | Name | Maximum Complexity |
|---|---|---|---|
| 0 | . | Micro-code or Primitive | Logic Level (e.g., "1" or "0") |
| 1 | — | Instruction Execution | Instruction defining single operation (e.g.,ADD) |
| 2 | Δ | Instruction | Instruction defining sequence |

TABLE I-continued

| Level | Symbol | Name | Maximum Complexity |
|---|---|---|---|
| | | Sequence | of operation (e.g., MULTIPLY) |
| 3 | □ | Program Interpretation | Programming language statement defining sequence of instruction |

The system network for the example training system includes the following processing elements:

Keyboard Processor (KYBD)—This control processor conveys keyboard generated codes to other processing elements and initiates a mode of operation selected by the operation actuation of one of the switches on the switch panel.

Graph-Pen Processor (GRAF)—This control processor retrieves information from internal hit-point memory locations corresponding to plasma panel hit point locations and transmits this information over control arc means to other processing elements.

Inputs Processor (INPT)—This control processor performs input pre-processing operations prior to generating a RUN command, and initiates operations for system initialization.

Operator Inputs Unit (OIU)—This control processor generates instructions for INPT or META based upon inputs from KYBD, INPT and GRAF.

Program Memory Processor (PMEM)—This data processor provides random access memory or RAM storage for that portion of a lesson plan currently in use. This processor also scans the stored information for delimiters and performs program addressing functions.

Meta-Processor (META)—This novel control processor stores the grammar of the programming language used with the system and performs the basic translation of program interpretation level information received from other processing elements.

Semantics Processor (SEM)—This control processor generates sequences of instructions commanding NUM and STG to perform complex numeric and character string computations, respectively.

Numerics Processor (NUM)—This data processor performs numeric operations, logical operations and code conversion.

String Processor (STG)—This novel data processor performs complex string operations under the direction of the semantics processor.

Format Processor (FORM)—This control processor controls the distribution of large blocks of information between the processing elements.

Mass Storage Processor (MS)—This control processor generates sequences of instruction for controlling the floppy disk device.

Floppy Disk Processor (FD)—This data processor directs the floppy disk mass storage unit to store and to read information.

Working File Buffer Processor (WFB)—This data processor provides temporary information storage when the training system is used to prepare lesson plans.

Display Processor (DSPL)—This control processor interprets information provided by other processing elements and directs the activities of PLAS, PROJ, CRT, PRNT, and SYM.

Symbols Processor (SYM)—This data processor stores information needed to construct graphic and pictorial displays on the plasma panel and the TV.

Projection Processor (PROJ)—This external processor interfaces between DSPL and the slide projector.

Display Interface Unit (DIU)—This novel data processor interprets character codes and generates the proper dot patterns for a plasma display device (PLAS) or a cathode ray tube device (CRT) or both.

Print Processor (PRNT)—This external processor interfaces between DSPL and the line printer.

Data Link Processor (DL)—This data processor provides an information distribution path between processing elements connected to FORM and other processing elements in the network. DL also provides temporary storage for information passing between the network and the mass storage equipment.

Before giving a detailed description of the processing elements, a typical operation of the system as built will be described including operations performed by the individual system elements and information flow between these elements.

The most common usage of the system will be that of communicating with a trainee where display information will be presented to the trainee on the plasma panel, and the trainee will respond to information presented by touching one or more hit points on the plasma panel with the sonic pen. The system reacts to the trainee's response by performing an operation consistent with the particular hit point(s) touched, as discussed with respect to the hit point memory in explanation of the INPT processor. Examples of system reactions include comparing the response of the trainee to a specific response required by the lesson plan, performing operations specified by the trainee and calling up sub-routines or new lesson plans requested by the trainee.

To initiate operation, the trainee actuates the bootstrap switch causing a bootstrap signal to be transmitted to the OIU. OIU transmits a code sequence level instruction to INPT which then initiates the sequence of operations defined for this instruction. These operations include issuing instructions to KYBD, GRAF and META commanding these processors to assume predetermined initial states. INPT will then transmit a code sequence level instruction through META to FORM. In compliance with this instruction, FORM issues instructions to MS and to META (through OIU) causing the first block of information in the mass storage to be transferred through MS, DL and OIU to a meta-memory located in META. On completion of the transfer of this block of information, FORM transmits a code execution level RUN instruction through OIU to META.

META next begins execution of the block of instructions in its meta-memory. Normally, one of these instructions causes META to command FORM to load the second block of information stored in mass storage into PMEM. This second block of information is transferred from mass storage to PMEM under the direction of FORM. Upon completion of this transfer, FORM again issues a RUN instruction through OIU to META.

META now begins interpreting the information in PMEM. Typically, this second block of information located in PMEM will include program statements causing META to command FORM to load other memories in the system with blocks of information in mass storage. Upon completion of loading these memories, META normally issues a command to DSPL causing information to be displayed on the plasma panel. The trainee's response to this information by touching the sonic pen to a particular section of the image on the plasma display will be interpreted by META and control of the system will shift from one control processor to another as dictated by subsequent responses of the trainee to display images.

LEVELS OF OPERATING COMPLEXITY

A detailed example is now given illustrating the several levels of language in the exemplary graph architecture machine including those parts of programming performed by a person who is generating the lesson programs for the system, the functions performed by the trainee to operate that lesson program, and in addition the discrete functions performed in the system in response to the inputs of the trainee. As an example, a program called the multiple choice question program or MCP for short will be used throughput the specification to illustrate the various features of the processors and the interconnection of processors in the graph architecture training system machine used as an example. In this respect, examples of the design at all levels for the MCP program are given. On the one extreme in the example, the trainee performs operations using the keyboard and the pen selection device in response to displays given him on the display device in the system. In the other extreme, the system must take the inputs given it by the trainee and execute a sequence of micro-level operations, i.e., individual register loads, memory write and flip-flop set and reset functions. Between these two extremes, the different levels of language implementation allow a straightforward manner for interpreting the student's desires and generating new display information for the student as a function of those desires.

Figures 4C, 4D:
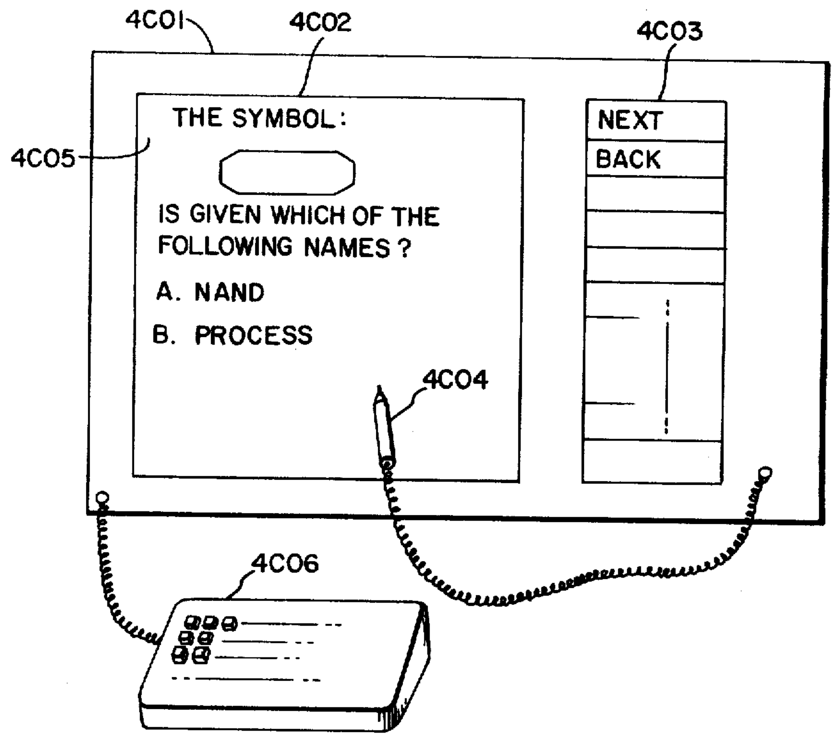
FIG. 4C illustrates an operating panel as used in the training system built in accordance with the graph architecture concept as depicted in FIGS. 4A and 4B and includes the definition of two operator input devices for allowing an operator to make inputs to the systems and a display device for giving information to the operator of the system.
FIG. 4D illustrates a program in the high level language used in the training system of FIGS. 4A, 4B and 4C for implementing a question query response scenario with the operator of the training system, said program including the coding which results in the message displayed as seen in FIG. 4C.

FIG. 4C illustrates one implementation of an operating panel which is the visual part of the system seen by the operator or trainee of the exemplary training system. Shown here is the operating panel 4CO1 which contains a display device 4CO2 which is shown to the student and to the side of the display device a predefined hit point selection area 4CO3. In addition is shown the hit point selection device or sonic pen 4CO4 and the alternate keyboard input device 4CO6. During execution of the lesson program, statements in the language of the system when programmed properly by the user of the system allows the generation of various display sentences and graphics as illustrated in FIG. 4C as 4CO5. The illustration shows a multiple choice question consisting of the stem part which reads "the symbol" followed by a typical symbol which is being used to query the student and it is asked if that symbol "is given which of the following names." There follows two alternatives from which the student must choose. Alternative "A" is selected by the student if the student believes that the symbol shown is a "NAND" symbol. Alternative "B" is selected if the student believes that the symbol shown is a "process" symbol. The student may reply to the question by one of two means. The student may use the pointer selection device 4CO4 to touch the point or line representing alternative "A" or alternative "B". Alternately, the student may select to choose one of the standard control options for the student entry such as the "NEXT" control or "BACK" control in the off-screen hit area 4CO3. Alternately, the student may choose to make any of these entries by way of the keyboard 4CO6. The operation of the program in either case is the same.

The MCP program in this example is expected to allow the question display information to be shown on the display device 4CO2 and then halt its operation and wait for input from the trainee. In response to input from the student, the program causes the system either (1) to display additional information such as the fact the student answered the question correctly or incorrectly or, in response to, for example, a "BACK" input from the student which requires backing up in the lesson program or in the case of the "NEXT" input from the student, (2) to back up or go forward to another part of the lesson program. In the present case, the correct answer to the question is line B, i.e., the symbol is a PROCESS symbol. If the student selects this alternative, then the program will display the message CORRECT and then halt again allowing the student to make a second entry. At this second entry point, the student selects the NEXT entry and the next question in the sequence will be displayed to the student. In this manner, not only can several questions be illustrated to the student, but information of background nature may be displayed to the student explaining what the difference in symbols is or another suitable subject material which can be programmed using the capabilities of the system can be displayed. In particular, this training system has specific utility in the simulation of operation panels such as computer maintenance panels and allows a student to self-test his understanding of the operation sequences for using such a panel. With this equipment, a plurality of different training situations can be presented to a student so that he might learn many different subject materials using this same training device.

The programmer of this system must generate a program for executing the above sequence of operations for the student using the high level language of this system which I have designated the string problem oriented machine language or SPOML.

In FIG. 4D is illustrated a sample portion of a lesson program written in the SPOML language to show a sequence of statements in this high level language, the purpose of which when executed in the system is to generate display information for the sample question, to allow the inputs from the student and to permit subsequent processing of the inputs from the student. A summary definition of the SPOML language is given in Appendix C. The meaning of the various statements used in the execution of the MCP program as set out in FIG. 4D will now be described. On line 4DO1 is illustrated a left bracket character which executed by the system means "beginning a new control point." The meaning of a control point is that conditional operations within the language must flow from one control point to another or back to a previous control point. The use of a control point at the beginning of a question allows the question to be repeated later or bypassed by choice of the student. On line 4DO2 is illustrated the sensitized hit point type statement. In this case, the parameters following the "s" which stands for sensitize statement are the "nul" characters from the ASCII (American Standard Code for Information Interchange) character set. These are written by the word "nul" surrounded by the periods. This allows the differentiation between the single data words which has name "nul" from a sequence of word characters. The ".s.nul..nul." statement desensitizes all the current hit points on the screen. Line 4DO3 starts the display message to be displayed. The initiation of the display operation is by way of the "d" character which means "start display statement sequence." The "0" character after the "d" is used by the DCU processor to determine in what state to start. The "0" state means "display with normal cursor controls the following information." The display sequence now contains a string of characters surrounded by the quote characters. This has the meaning "display all the information within the quotes" so that, for example, the "dle" control item is used to clear the display. This is then followed by displaying the message "THE SYMBOL." This is followed by a carriage return of the cursor ":.cr." and a tab function of the cursor ".tab." and this is followed by the displaying of the symbol referenced by name "I". This is followed then by a second carriage return, followed by the message "IS GIVEN WHICH OF THE FOLLOWING NAMES." The operation of the display functions is described in detail in the display processing subsystem of the specification. On line 4DO7 is illustrated a second sensitize statement which in this case will sensitize the area then under the cursor of the display to be of name "A" and of size ten characters by two characters. At this point on the screen, by way of the display statement on line 4D08, is now written the message "A.NAND." This is now followed by a carriage return at which time a third sensitize statement is used to sensitize an area called "B" on the screen. At this point on the screen the message "B.NOR" is written. In this manner, if a student uses the hit point selection device and points to a point inside the area defined as A or points to a point inside the area defined as B, the system will accept that input as the character A or B. Alternately, the student may enter the characters A or B on the keyboard with the same effect. The program now starts a new control point having not forgotten the previous control point on line 4DO1 and starts this new control point at line 4D11. The program now at line 4D12 performs the halt operation statement which is represented in the high level language by the period character. The halt operation allows the system to stop and await an input from the student. Upon an input from the student, the execution of the program is now continued. The statement sequence on line 4D13 allows the checking of the student's input to see if it corresponds to the BACK operation. If the student has selected the BACK operation, then the sequence of the three colons followed by "r" allows the repetition of a control point before that defined at point 4DO1, e.g., the backing up to a previous question in the lesson program sequence. Alternately, if the student's input is not a BACK function, then on line 4D14 a numeric variable called "Q" is incremented. This "Q" variable may be used to keep track of how many times a student has answered a question. At line 4D15 a test is made to see if the student entered the "A" alternative for the question. In this case, the message "INCORRECT" is displayed and the operation is exited by the colon followed by the "e" statement in such a manner that the operation will now continue at line 4D18. Alternately, if the student entered the "B" alternative, then the message "CORRECT" would be displayed and a second numeric variable would be incremented which in this case might be used to denote the number of correct responses made by the student. Again, in this case, the continued operation of the program by way of the colon followed by the "e" statement causes execution to be continued at line 4D18. If the student entered none of the BACK, A or B inputs, then the message "INVALID ENTRY" is given and the control halt at point 4D12 is executed. This requires the student to reanswer the question for he may not have selected a point within a hit point area or he may have attempted to make an entry which is not allowed by the program at this time. The student would then respond again until he has gotten the correct answer or incorrect answer or entered a BACK operation. At line 4D18, the program again halts and requires a student entry. In this example, if the student enters BACK, the question starting at line 4D01 is again repeated so that, for example, if the student answered a question incorrectly he might be given another opportunity to answer that question. Alternately, the lesson program would now continue with its next part which is not shown, but which might be another question or a sequence of descriptive material or a sequence of exercises for execution by the student, all of which are programmed in this high level language in a manner similar to what has been described.

The interpretation of SPOML program such as that illustrated in FIG. 4D is carried out principally by the METAPROCESSOR. As a function of interpreting the character string output of the program memory in which the program is stored, the METAPROCESSOR will direct the activities of other processors in the system and for this purpose function as the principal control processor.

FIG. 4E now illustrates the next level of complexity in the system which is the program interpretation level. FIG. 4E shows the detailed coding of the METAPROCESSOR state sequences for interpreting a program. The META sequences consist of a plurality of sequence parts, each part of which is used for interpreting different statements in the SPOML language. The common return point for all parts of interpreting a program is the state called PROG on line 4EO1 in FIG. 4E. The PROG point allows the reception from the program memory of the next sequence of character(s) in the program and determines which of a plurality of different statement types are to be executed. Lines 4EO6 through 4E13 illustrate a portion of the state transition table which is used to determine which parts in the META sequences are to be executed for each statement type. For example, in line 4EO7 is illustrated the period state which allows the jumping to the halt sequence part of the META sequences to perform those functions required for the halt statement. In a similar manner, on line 4E10 is illustrated the "d" state which allows access to that sequence in the METAPROCESSOR for executing the display sequence statement part. A detailed explanation of the operation of the METAPROCESSOR in carrying out this interpretation process using the instruction illustrated in FIG. 4E is given in the detailed description of the METAPROCESSOR.

The next level of operation in this system is the execution of those instructions commanded from the METAPROCESSOR. For example, in the case of the alternative statement sequence illustrated in lines 4E39 through 4E51 in FIG. 4E there is the occurrence of the instruction ONECP at line 4E42. This is a command from the METAPROCESSOR to the SEM processor to execute the instruction called "ONECP." FIG. 4F illustrates the state transition table part and exemplary parts of the operation sequences within the SEM processor. For example, the "ONECP" instruction state allows access to the "ONECP" sequence at line 4F03. This sequence now executed within the SEM processor executes a series of instructions, some of which such as the microinstruction at line 4FO3 are executed completely with the SEM processor, and other instructions of which such as the "SEULD" at line 4FO4 is executed by the STG instruction processor. Differentiation upon which the processor determines whether the instruction is to be executed by the SEM itself or by yet another processor is made on the basis of the SELF OPCODE.

In the case that the SELF OPCODE is a "PASS" or a "PASW" instruction for 4FO4 or 4FO5, then the OPERAND portion of the self instruction in a sequence is the OPCODE instruction to be executed by yet another processor.

The next level of execution of operation within this system is now at the instruction level. For example, the "SEULD" instruction required from the SEM processor at line 4FO4 is executed by the STG processor.

FIG. 4G illustrates the micro-operations performed by the STG processor for each instruction input type. In this table is given in the columns the thirty-two possible instructions executed by the STG processor and horizontally the micro-operations within the STG processor which may be performed for each instruction. Then, for example, the "SEULD" instruction which has micro-code generator address 20 requires only the operation called LOAD-DIN within the STG. A detailed explanation of these operations is contained in the SEM/STG processor descriptions below.

Overall as can be seen from this example, the approach of taking a program in a high level language and breaking it down into further detailed parts can be seen to be very useful in allowing a programmer, by using the high level language and a very simple statement of desired actions, to develop a program which when executed by the system as used as an example is then expanded into a sequence of very detailed operations representing several times the number of operations originally defined by the programmer in the program. In this manner, the programming of this system is simplified and the amount of storage is simplified considerably. The system operation cost is greatly reduced as well as the cost of the design of this system which is greatly reduced.

GENERAL PROCESSOR STRUCTURE

In each of the control and data processors of a system built in accordance with graph architecture concept, there exists a collection of hardware components common to all processors except CP's not having an input control arc.

FIG. 5A illustrates the general structure of a typical processor. The processor includes the common hardware components, hereinafter termed common logic, and unique circuitry, the details of which are unique to the purpose of a specific processor for an intended specific application.

The purpose of the circuits of the common logic is as follows:

1. OPERATION INPUT REGISTER 501—holds the operation code, hereafter called OPCODE, portion of the instruction during the time that the instruction is being executed.
2. DATA INPUT REGISTER 502—holds the DATA portion of the input instruction during execution of a given instruction and supplies this data to the processing element unique circuitry 506 where it may be combined with other data or otherwise manipulated to obtain results data corresponding to the intended purpose of the processor.
3. MICRO-CODE GENERATOR 503—takes the OPCODE from the operation input register 501 and generates individual signals called enables to the other components of the processor commanding specific operations to be performed. For example, if a given instruction needs data register to be loaded the LOAD-ENABLE signal must be active for that instruction, whereas for another instruction which does not require that register to be loaded then that same LOAD-ENABLE signal must be inactive. The micro-code generator also supplies signals to control logic 504 to allow selection of conditions and determine the number of clock pulses which are to be generated.
4. CONTROL LOGIC 504—performs the overall control activities of the processor including receiving the request signal, generating the active signal, generating the condition signal and generating the timing pulses needed by the other components of the processor to perform the functions needed for a specific instruction. Upon receipt of a CP-RQ-PE signal, if the PE-ACT-CP signal is not currently enabled, the control logic causes a LOAD-INSTRUCTION signal to be generated which effects loading of the OPCODE and data portions of the instruction into the operation input and data input registers. The control logic then generates a series of timing pulses and commands, the number and type of which are defined for each different instruction by the micro-code generator 503. After the proper number of timing pulses have been generated or upon reception of a certain condition (the particular case being determined by the micro-code generator) then the control logic drops the PE-ACT-CP signal and may thereafter accept another instruction and repeat the above actions in a similar manner. At the appropriate time and by enable from the micro-code generator, the control logic may set or reset the PE-COND-CP signal and/or load a data output register 505 with data.
5. THE DATA OUTPUT REGISTER 505—may be loaded with data during the execution of an instruction. This data may then be used by other processors for their own operations. By convention this data may only be used when the processor is not active and it is the responsibility of the processors using the data to ensure this situation by monitoring the PE-ACT-CP and PE-COND-CP signals.
6. PROCESSING ELEMENT UNIQUE CIRCUITRY 506—includes those components such as registers, memory and arithmetic networks which are necessary to allow a specific processor to perform processor unique functions in the system. Later paragraphs describe exemplary processors detailing the various types of components and interconnections which make up the unique circuitry.

The ensuing paragraphs detail the composition of the various circuits which make up the common portion of a DP or CP.

The operation input register as shown in FIG. 5B comprises a set of flip-flop components, which are well known devices in the art or alternately a collection of integrated circuits containing flip-flops, also well known in the art. Each flip-flop holds the value of a single bit of the input OPCODE. The OPCODE value is caused to be stored upon the occurrence of the LOAD-INSTRUCTION pulse which is generated by the control logic and the data so stored is kept until a subsequent LOAD-INSTRUCTION pulse is received. The data input register 502, data output register 505 and other registers in the system have an identical construction with differing signal names.

The micro-code generator circuit as illustrated in FIG. 5C comprises one or more read only memory devices, such devices being well known in the art. The input address of these read only memories in the OP- CODE of a given instruction. For a particular processor, the contents of the read only memory are permanently defined in such a manner that the outputs of the memories, called micro-codes or enables, uniquely define a set of primitive operations (such as memory write, multiplexer address, etc.) which are to be accomplished for each instruction.

In the general case, the control logic as shown in FIG. 5D includes flip-flops, logic gates, multiplexers, counters and decoders, all such devices being well known in the art. The operation of the control logic in receiving and generating various signals is as follows:

Upon the receipt of the CP-RQ-PE signal and if an ACTIVE flip-flop 511 is reset, meaning that the processor is not currently active, then AND-gate 510 generates a signal to the J input of a J-K flip-flop 512 designated the ACCEPT FF. Upon receipt of a next CLOCK-PE pulse, which is part of a continuous train of clock pulses generated by another processor or generated within the subject processor, the ACCEPT FF 512 is set. Upon the reception of the next CLOCK-PE pulse, the LOAD-INSTRUCTION signal is generated from AND-gate 513 and the ACTIVE FF is set. Now the ACTIVE FF transmits the PE-ACTIVE-CP signal and the AND-gate 510 is disabled, thus preventing reception of further instructions. Also, since the ACCEPT FF was set, the K input causes the ACCEPT FF to become reset, thus preventing the generation of further LOAD-INSTRUCTION pulses. If at any time, and particularly when power is first applied to a given machine, the RESET-PE signal is received, then both the ACCEPT FF and ACTIVE FF are reset establishing a state in which the processor may receive instructions. While the ACTIVE FF is set, AND-gate 514 generates a stream of pulses which allow operation of the other components of the processor. In particular, an instruction length counter 515, having been loaded with a number signifying the number of pulses to be generated, now is incremented by the pulses from gate 514 and as a result of each count a clock phase is generated from a decoder device 516. For a given instruction, the clock phases are used to order the sequence of various commands as, for example, the combination of a phase and an enable from the micro-code generator through AND-gate 517 causes a clock pulse to be issued effecting performance of some predetermined elementary operation.

One such clock phase may be gated through an END multiplexer switch 518 which then supplies the END signal to the K input of the ACTIVE FF resulting in that flip-flop being reset, thus causing the processor to become inactive and allowing subsequent requests to be honored. During execution of the instruction, one of a multiplicity of conditions may be monitored by a condition multiplexer 519, a selection address of which is supplied by the micro-code generator. The output of the condition multiplexer is recorded into a condition FF 520, the output of which constitutes the PE-COND-CP signal for use by the processor which originated the instruction.

As stated previously, all of the previous circuits are common to all processors. For this reason, a detailed description of the circuits is not repeated. Also, since the micro-code generator and control logic circuits generate signals to all other components in a given processor, and since this is generally a large number of lines to be shown on a diagram, such lines will be left off of subsequent diagrams for clarity, but it is to be understood that such lines do exist. The design of a specific PE need not include all of the components of the common logic. For example, (1) a CP not having an input control arc does not have the common logic, (2) a particular PE need not store both the DATA and OPCODE portions of the input instruction, (3) the ACCEPT flip-flop may not be used, (4) the same register may be used for data input and output, and (5) the micro-code enables may be taken directly from the OPCODE so that the micro-code generator is not necessary.

THE PHYSICAL AND FUNCTIONAL IMPLEMENTATION OF THE CONTROL ARC CONCEPT

FIG. 5E illustrates a typical block diagram of the connection of a control processor 5EO1 to a processing element 5EO4 by way of a control arc 5EO3. In this diagram is illustrated that the control arc itself physically consists of a circuit in the control processor element 5EO1 which is called a control arc transmit logic 5EO2 or CAT for short. In conjunction with this, the processing element receiving the control arc must have a control arc receive logic element 5EO5 or CAR for short. In other words, a control arc consists of the combination of a control arc transmit logic in one processor and a control arc receive logic in another processor. Between these two logic blocks, the control arc signal set as described previously are connected. The processing element illustrated in FIG. 5E may be either of type data processor or of type control processor. If that processing element is of type control processor, then the processing element 5EO4 will in addition have control arc transmit logic of its own for communicating to other processors in the network. The control processor 5E01 illustrated in FIG. 5E may also contain a control arc receive logic for receiving instructions from other processors. These extra elements are not shown.

As illustrated in FIG. 5F, a particular control processor 5F01 in an exemplary machine may require connection to several processing elements by way of output control arcs. In this case, the control processor may in the first case have multiple control arc transmittal logics or in the case illustrated have a multiple transmit expansion circuit 5FO3 which is driven by a single control arc transmit logic element 5FO2 in this control processor 5FO1. This multiple transmit expansion circuit 5FO3 has inputs both from the single control arc transmit logic 5FO2 and a destination address which is used to select which of the processing elements PE1, PE2 and generally up to PEN the particular instruction is to flow over the control arc. In this diagram, these processing elements PE1, PE2 and so forth contain their own control arc receive logic to receive this instruction over the control arc signal set. In a similar manner, a particular processing element may be needed for use by several control processors.

This situation is illustrated in FIG. 5G. In this example, several control processors labeled CP1, CP2, etc., have control arc outputs to the single processing element which may receive these multiple control arc inputs in one of two ways. In the first way, this processing element may contain several control arc receive logics or alternately in the case illustrated, this processing element 5GO7 may contain a multiple receive expansion circuit 5GO8. These cases may be combined so that a particular processing element in an exemplary graph architecture machine may have multiple control arc inputs using a multiple receive expansion circuit in conjunction with a control arc receive logic and, in addition, multiple control arc outputs using a single control arc transmit logic and multiple transmit expansion circuit. The details of exemplary control arc transmit logic, control arc receive logic, and multiple expansion circuits are not described.

FIG. 5H illustrates an exemplary control arc receive logic circuit. This consists, as illustrated, of logic devices which have previously been described in the area of the control logic portion of the processing element, i.e., a control arc receive element may consist of two flip-flops, one called the ACCEPT flip-flop 5HO3 and an ACTIVE flip-flop 5HO4. In addition, the control arc logic may contain an OPCODE input register 5HO6 and a data input register 5HO7. The circuit, as described previously, works as follows: Upon the reception of a CP-RQ-PE signal, the ACCEPT flip-flop becomes set on the next clock signal, this allows the LOAD-INSTRUCTION signal to be generated which loads the CP OPCODE and CP-DATA portions of the input instructions from the control arc into the OPCODE INPUT REGISTER and DATA INPUT REGISTER 5HO7. After the instruction is loaded, then the ACTIVE flip-flop 5HO4 is set generating the PE-ACTIVE-CP signal back to the requesting control processor. This initially requesting control processor must now drop the CP-RQ-PE signal. The control processor may now on its own go about the generation of more instructions to flow over a control arc to this particular processing element or another processing element which is connected to that control processor.

FIG. 5J illustrates an exemplary design of a control arc transmit logic function. The control arc transmit logic function 5JO6 consists of three flip-flops with supporting gate logic. Of these three flip-flops, the ENABLE-CAT flip-flop 5JO2 is used to control the overall operation of the CAT logic. The ACTIVE-UP flip-flop 5JO3 when set denotes the fact that the processor to which the instruction has been requested for execution has accepted that instruction and is now active. The ACTIVE-DOWN flip-flop on the other hand when set denotes that the instruction execution by the processor for which the request was generated has been completed. In this manner, the control processor can determine when to continue its own operation on the basis of either the acceptance of the instruction or on the basis of the instruction having been completed. The general operation of the CAT logic is as follows: Firstly, the control processor generates the RESET-CAT signal which clears the flip-flops to put them in the initial state. The control processor now generates the START-CAT pulse which sets the ENABLE-CAT flip-flop 5JO2. Since now the ACTIVE-UP flip-flop which was reset on the occurrence of the RESET-CAT signal now enables gate 5JO1 and thusly allows the generation of the signal CP-RQ-PE. In response to this signal, the processing element will at some point in future time generate the PE-ACTIVE-CP signal which now on the low to high transmission sets the ACTIVE-UP flip-flop 5JO3. Since now the ACTIVE-UP flip-flop is set, the gate 5JO1 is disabled, thus dropping the CP-RQ-PE signal. When the processing element to which the instruction was sent has completed the execution of that instruction, the PE-ACTIVE-CP signal goes low and on this transition the ACTIVE-DOWN flip-flop 5JO4 is set. The control process in which the CAT logic is resident may choose on its own to continue operation either on the state that the ACTIVE-UP flip-flop is set or on the state that the ACTIVE-DOWN flip-flop is set. In the case that an instruction completion is not needed for the continued operation of the control processor, that control processor will generally proceed with its operations when the ACTIVE-UP flip-flop is set. On the other hand, if the instruction to be executed is such that data is needed back or where the condition is needed back to the control processor, then that control processor may elect to wait for continuation of its operations until the ACTIVE-DOWN flip-flop is set.

FIG. 5K illustrates an exemplary multiple transmit arc expansion circuit which is used in conjunction with a single control arc transmit logic element 5KO1. The multiple transmit expansion circuit 5KO2 consists of two elements: firstly, a destination decoder and secondly, an ACTIVE multiplexer 5KO4. The destination decoder takes the destination address which is generated elsewhere within the control processor and generates an ACTIVE signal on one of the lines CP-RQ-PE1 or CP-RQ-PE2, etc., as a function of the address lines of the destination address. The signal outputs from the destination decoder are enabled to a high state only at the presence of the CP-RQ-PE signal which is generated by the control arc transmit logic 5KO1. In response to the REQUEST signal, the processing element will at some time generate an ACTIVE signal. This may be PE1-ACTIVE-CP signal, PE2-ACTIVE-CP signal, etc., the one used in correspondence with the original request signal sent out. The destination address is also given to the active multiplexer 5KO4 which allows selection of the appropriate active line which is then sent to the single control arc transmit logic 5KO1 for use as described before. In this manner, a multiplicity of processing elements may be communicated to by a single control processor over multiple control arcs. The instruction content of the control arc sent out by the control processor consisting of the OPCODE and DATA PORTIONS is from a common source in the CP not illustrated in the diagram.

FIG. 5L illustrates an exemplary multiple receive circuit expansion. This circuit 5LO1 works in conjunction with a single control arc receive logic block 5LO2, the details of which have been described previously. The purpose of the multiple receive logic is to accept request signals from a multiplicity of control processors and encode these on a priority basis into a single control arc set of signals for use by the CAR logic 5LO2. The multiple receive expansion circuit consists of the following elements: a request encode element 5LO3 which has as inputs each of the request signals from the control processors in mention. From this set of request signals, the request encode circuit generates the addresss of the highest priority currently HI request signal and the signal CP-RQ-PE which is used to denote that at least one request signal from the lowest numbered control processor in the case that there are two or more request signals present at any given point in time. The source register 5LO4 is loaded by the LOAD-INSTRUCTION pulse from the CAR logic 5LO2 so that the number of the control processor requesting instruction execution may be saved. This is necessary since the control processor will drop the request signal as soon as the processing element is activated. In contrast, the active signal going back to that requesting control processor must remain steady for that control processor throughout the execution of the instruction. To generate this active signal back to the originating control processor, the active decoder circuit 5LO4 is used. This takes the address which is now stored in the source register 5L04 and decodes it to one of a multiplicity of signals which constitute the processor active signal back to the control processor and this signal is present when the processor active signal is generated by the CAR logic 5LO2. The multiple receive expansion circuit also includes the OPCODE-INPUT multiplexer 5LO6 and the DATA-INPUT-MULTIPLEXER 5LO7. The address of these multiplexers is also driven by the address generated by the request encode circuit 5LO3. In this manner, the operation code and data portions of the instruction associated with request signal of the requesting control processor is switched onto the lines CP-OP and CP-DATA for use by the control receive logic 5LO2 which then stores those quantities into the OPCODE register and INPUT-DATA register also on the occurrence of the LOAD INSTRUCTION pulse.

FIGS. 5M and 5N illustrate exemplary timing sequences for the operation of the combination of a control arc transmit logic and a control arc receive logic. This timing is the same whether there are multiple arcs involved or not. There are two cases to be described. In the first case, the request is given to the processing element during a time period in which that processing element is not currently active. In the second case, the processing element may be currently active executing an instruction when the request signal is received. The case of the processing element firstly being not active is described.

FIG. 5M illustrates the timing of the various pulses involved in the CAT-CAR logic for this case. Also shown is the CP-CLOCK signal which is the assumed pulse train used internal to the control processor and a separate pulse train PE-CLOCK signal which is used internal to the processing element. These pulse trains may be the actual same clock trains or dissimilar pulse trains as illustrated in the FIGURE, i.e., each processing element may contain its own clock generation circuitry and the overall instruction acceptance over the control arc will operate the same. The sequence of events for accepting instruction is as follows: Firstly, in the control processor the reset CAT signal is generated which resets the ENABLE-CAT, ACTIVE-UP and ACTIVE-DOWN flip-flops as illustrated in the diagram. The second event is the generation of the START-CAT pulse on the next clock pulse in this control processor. This sets the ENABLE-CAT flip-flop which allows the generation of the CP-RQ-PE signal. In the processing element receiver, the reception of the control processor request PE signal allows the setting of the ACCEPT flip-flop which in turn on the next clock pulse allows the generation of the load instruction pulse so that the instruction may be loaded into the OPCODE and DATA registers. On the trailing edge of this same clock pulse, the ACTIVE flip-flop is set. When received by the control processor, the ACTIVE-UP flip-flop is immediately set which in turn disables the CP-RQ-PE signal. The operation now continues with the control processor performing other tasks if it has been programmed in a manner to do that but at some point in time the END signal is generated within the control arc receive logic which on the next PE-CLOCK signal allows the ACTIVE flip-flop to be reset which in turn causes the ACTIVE-DOWN flip-flop to be set. If in the case the originating control processor sought to wait until the completion of the execution of the instruction, said control processor would now continue its operation.

The exemplary case of a processing element already in the active state at the reception of a request signal is illustrated in FIG. 5N. In this FIGURE, the control arc transmit logic not knowing initially that the processing element for which it is going to request instruction execution is active proceeds with the generation of the reset CAT and START-CAT clock pulses and thus enabling the generation of CP-REQUEST-PE signal as described before. The processing element now, however, being active, the operation of the control processor waits. The action in the processing element continues with the completion of this instruction until the generation of the END signal which allows the resetting of the ACTIVE flip-flop on the next clock PE clock signal. After this occurrence, the request signal is now accepted by the receiving processing element which allows the setting of the ACCEPT flip-flop and on the next clock pulse the load instruction pulse is generated and the processor's ACTIVE-CP signal is generated as before. The remainder of the operation in this case is as described previously.

In concept, this particular interchange of signals allows maximum utilization of each processing element and is accomplished because the control processor may be actively generating the next instruction to be executed by processing elements while that original processing element is currently executing an instruction. It should be noted, however, that only a single request signal can be active at one point in time over one of the control arcs out of the control processor and that only one instruction input over a control arc can be honored by a processing element at one point in time. In a particular exemplary implementation of a graph architecture machine, a single request signal may be used by several processing elements. In this manner, a single control arc can thus be used to broadcast an instruction to several processing elements simultaneously. This is particularly useful in the implementation of machines which have highly parallel operation of instruction in several different processing elements. In no case, however, can a single processing element receive instructions from more than one control processor at the same time.

STATE DEFINED CONTROL CONCEPT

The state defined control concept is now described in detail. The basic idea of the state defined control concept is that a particular processing element may execute its sequence of operations as a function both of a current state value within the PE which was set by previous instructions or previous execution by the processing element in conjunction with the new instruction received by the processing element. In this manner, the requesting processing element does not need to keep track of the complete sequence of operations within the processing element in which an instruction is to be executed. The idea of a processing element operating in such a state defined control manner is not new. What is new and novel for application in a graph architecture information processing system is that at least two processing elements shall have such a state defined control mechanism. In this manner, the complete operation of the system is defined by states in a multiplicity of processors and not by any one single processing element. This situation is illustrated in FIG. 5P which illustrates three processing elements labeled 5PO1, 5PO3 and 5PO7. In the situation illustrated, processor 5PO1 by way of its control arc to 5PO2 can request execution of an instruction in processor 5PO3 which receives such instruction in its control arch receiver logic 5PO4. This instruction now is used by the state control logic 5PO5 or SCL for short to determine the sequence of actions by processor 5PO3. As a function of the operation code and data portions of this new instruction received in processing element 5PO3, that processor may elect to perform operations completely within itself or execute a sequence of instructions to yet another processing element 5PO7 by way of sending instructions over the control arc from the control arc transmit logic 5PO6 to CAR logic 5PO8 in said second processor. This second processor now may also have its own state control logic 5PO9 for determining its sequence of operations as a function of its new instruction input. In the general case, processor 5PO3 will initiate the state in processor 5PO7 by way of an instruction. After this, subsequent instructions received by 5PO7 from processor 5PO3 will be interpreted by said second processor and its actions performed as a function of that previously defined state and the new instruction input. In this manner, processor 5P03 does not have to record in its own memories or in its own operations what state 5PO7 may be in. As an example, consider the case of PE 5PO3 having two possible state values, one called STATE1 and the other called STATE2. In the first case, assume PE 5PO3 has state value STATE1. Upon reception of an instruction called EXECUTE from PE 5PO1, PE 5PO3 in this case generates an instruction to PE 5PO7. In a second case, assume PE 5PO3 has state value STATE2. In this case, PE 5PO3 will generate no instructions to PE 5PO7 even though the same EXECUTE instruction is received. These state defined actions on the part of PE 5PO3 are performed on the basis of the state sequence programming of the state control logic in PE 5PO3, said programming being performed during the design of the system. Also, the state sequences may be redefined during the operation of the system by reloading the memories contained in said processor. An example of such redefinable state sequence state defined control processing element is the METAPROCESSOR described in later paragraphs. Not all processing elements in exemplary graph architecture machine need be implemented using the state control logic block.

FIG. 5Q illustrates an example showing a processor 5QO1 which does not have state defined control and which has an instruction input into the CAR logic 5QO2. The individual operations now executed by this processing element as defined by the micro-code generator ROM 5QO3 which has been described previously is now completely defined by the instruction input and the OPCODE in CAR registers.

Processing elements in an exemplary graph architecture machine may implement the state control logic SCL in one of two principal ways as illustrated in FIGS. 5R and 5S. The simpler case of the processing element determining its operations as a function of state and new instruction input but being allowed only to change its state value once per instruction execution is illustrated in FIG. 5R. What is shown is the control arc receive logic 5RO2 which has outputs which feed the microcode generator as described previously in FIG. 5Q but in addition go to a multiplexer 5RO3 which then gates these signals to state register 5RO4. For a specific instruction as commanded by the OPCODE portion of the instruction, the micro-code generator 5RO5 will require the loading of the state register by enabling the load state signal which then allows the value of the OPCODE or DATA PORTIONS from the input instruction to be loaded into the state register 5RO4. The determination of whether the OPCODE or the INPUT DATA PORTION of the instruction is loaded into the STATE REGISTER is determined by the SELECT-MPXR signal into the multiplexer 5RO3. On subsequent instructions, the OPCODE or DATA PORTIONS are now used in conjunction with the output value of the STATE REGISTER to determine which of the multiplicity of the microcode enables are to be executed. The STG, DLU, FDIU and DIU processors in the exemplary training system are examples of state defined control processing elements using the scheme illustrated in FIG. 5R.

The more complex case is illustrated in FIG. 5S wherein is illustrated a processing element 5SO1 which has a state control logic which allows the changing of states a multiplicity of times during the execution of a single instruction. In this case, the processor has logic similar to that illustrated in FIG. 5R but, in addition, has a STATE SEQUENCE MEMORY 5SO5. The STATE REGISTER in this case 5SO4 is also a counter so that a sequence of states can be executed and by way of an output from the state sequence memory 5SO5 through the multiplexer 5SO3 a new state value may be loaded into the state counter register 5SO4 as determined by the current value outputs of the micro-code generator 5S08. The determination of whether the next state or a different state is to be executed in the exemplary processor is made by the micro-code generator which determines as a function at a portion of the STATE SEQUENCE MEMORY 5SO5 output called the SELF-CODE in conjunction with conditions generated within the processing element as well as conditions which may be generated externally to the processing element. In a particular example, while the processing element is executing a state sequence the state sequence memory SELF-CODE may require the execution of an instruction in another processing element. This requires the initiation of operation of the control arc transit logic element which must be part of the processing element 5SO1 is such an external instruction is to be executed. It is not necessary, however, that a processing element be a control processor to have state defined control. In this case, the execution of such an instruction by a second processor may now result in data being generated which is used through the instruction input lines in the control arc receive logic to be compared with data in the compare circuit 5SO7 with data in the state sequence memory 5SO5. As a function of this data comparison, the micro-code generator may the require a new state to be entered in the state counter register 5SO4. This then allows a conditional execution of states within the processing element and this is what is meant by a state defined control processing element. In the exemplary training system, the META, FORM, INPT and DCU processors have this type of state defined control capability. In particular, the METAPROCESSOR operates in conjunction with the DSPL processor in such a manner that the combination of the state in the METAPROCESSOR and a separate state in the DSPL processor allow the generation of complex graphic sequences seen on the display element and such complex graphics are generated under the direction of the DSPL with only the data generated by the METAPROCESSOR. For example, in the MCP program example described previously, the "0" portion of the display statement at line 4D03 requires the selection of the zero state in the DSPL processor. This then will require the DSPL processor to use the data given in the quoted string of characters in lines 4DO3 through 4DO6 to generate the display illustrated in FIG. 4C. Alternately, a display statement may be used in an SPOML program which sets a separate state in the DSPL. As a function of setting this separate state, the use of the data from a quoted string such as 4DO3 to 4DO6 will have a completely different effect on the operation of the DSPL. For example, the DSPL as a function of the initial state to which it was set may generate the information on a CRT display device as opposed to a plasma display type of device or, alternately, print the information on a printer device of system. The determination of what action is taken using the data from the DSPL input instruction is made independently of actions in the METAPROCESSOR and this is what is meant by the processing system having processing elements at least two of which have separate state defined control elements and can work in conjunction to perform more complex operations than either processing element operating alone.

The instruction sequence level of operation in this system may now be further explained. Referring to FIG. 4E again, execution lines 4E19 through 4E31 constitutes the sequence for interpreting the characters in the display statement of an SPOML program. At line 4E20 is shown an instruction out of the state sequence memory for the METAPROCESSOR which is called a SCAN-WAIT or SCANW instruction. This instruction has the effect of causing the execution of the ADVANCE instruction in the program memory processor. At the completion of the execution of this instruction in PMEM, the METAPROCESSOR automatically loads the data from the program memory processor output into the register for its own use. The instruction called CHAR at line 4E21 with operand quote (") now compares the input data from the PMEM with the quote character. If the two characters are the same, then a jump is executed, i.e., a redefinition of the current METAPROCESSOR state to the state called DQUOTE. Alternately, in lines 4E23 and 4E24 is a check to see if the character input from the program memory processor is of the type DIGIT. If the character is a digit, then a new state called DNUM is entered at line 4E25 which consists singly of execution of the instruction DCUSET which is an instruction executed in the DSPL processor and since in this case the data is a digit the DSPL is set in that state. This is an example of the mechanism for setting a state in one processor as a function of the execution of a sequence in a sequence processor. Within the DQUOTE state at line 4E27 in the METAPROCESSOR sequence is now the sequence of steps which allows the generation of data from the program memory which is then sent to the DSPL processor for execution. For example, the SCAN instruction is issued again at line 4E27 to pick up the next character from the SPOML program and assuming that this character is not the quote character which would mean the end of the string of data then that data is sent out with the DCUEXC instruction which allows the DSPL to execute its current state with the new data. In this manner, the DSPL will use this data to generate the several display lines and symbols as illustrated in FIG. 4C. At the completion of the sequence of data from the DSPL from the METAPROCESSOR, the quote character is detected at line 4E28. At this point, the new state in the METAPROCESSOR called state D is entered and the operation continues by intepreting the characters from the program memory processor for the currently running program.

At a given point in time, the period character may be detected from the program memory which is the SPOML program statement to require the system to stop. The halt sequence, lines 4E14 through 4E18, is now executed. Initially, the instruction CLEARM is executed which clears the match stack in the STG processor. Now the instruction ENABLE is executed within the OIU processor which allows input from the student and now the HALT self instruction at line 4E16 is executed by the METAPROCESSOR. This stops the operation of interpretation processes by the METAPROCESSOR. However, the METAPROCESSOR keeps its state which is called HALT2 at line 4E17 so that subsequent instruction initiation from the OIU to the METAPROCESSOR will allow the continued execution of operation at this state. For example, once the student has entered his choice, say for the question in the MCP program, then continued operation in the METAPROCESSOR at line 4E17 will require the data which it receives with the instruction which is the character entered by the student either from the keyboard or by the pen selection device to be passed out with the PUSHM instuction which allows the storing of that data within the match stack within the STG processor. The METAPROCESSOR now at line 4E18 executes the instruction called JUMP PROG which allows the redefinition of meta state register to be at the PROG point 4EO1. This then allows subsequent interpretation of later statements in the SPOML program following the halt statement. These later statements as described previously then will monitor and evaluate the student's inputs to determine what actions the machine is to take as a function of the student's inputs.

As illustrated in FIG. 5S, an exemplary state control logic portion of a processing element may also contain a state stack element 5SO6. This state stack allows several states to be pushed into a memory by using a self instruction called PUSH. The purpose of saving such states is to determine the future operation of this processing element as a function of later inputs. In particular, at specific points in the execution of the sequences from the state sequence memory 5SO5, the operation called STACK POP is executed which allows now the previous value of state which has been loaded into the state stack to be reloaded into the state counter register 5SO4. This state stack control mechanism allows complex sequences of operation to be performed and in the case of the METAPROCESSOR is the principal which allows the implementation of a high level language. This combination allows the implementation of what is called language grammars directly in the state sequence memory of the METAPROCESSOR. The detailed operation examples of usage of this state defined control mechanism is described in detail in later paragraphs.

MAINTENANCE MULTIPLEXER CONCEPT

A detailed description of the maintenance multiplexer concept which may be used in conjunction with an exemplary graph architecture system is now given. The purpose of the mai"tenance multiplexer concept is to allow the inspection of the contents of any register or the output of any memory device is a graph architecture system. This concept allows access to these parameters independently of the size and number of processors used in a system. This is a new and novel concept and unique with the possibility for implementation in a graph architecture machine. The basis of the use of the maintenance multiplexer concept is that the processing elements in the graph architecture system already have the ability of switching data from within individual processors and giving that data to separate processors. For implementation of the maintenance multiplexer concept, two elements must be added to the processing elements in the graph machine.

In the first case as illustrated in FIG. 5T, a maintenance multiplexer 5TO2 must be added. The maintenance multiplexer allows the direction of the address input to the data multiplexer 5TO1 which is already a part of the processing element to be directed as a function of a MAINTENANCE ADDRESS input. The operation is as follows. During normal operation, the maintenance enable signal MAINT-ENBL points the maintenance multiplexer 5TO2 to allow the use of the multiplexer address generated within the processing element. In this manner, the processing elements operates as described before. Alternately, if the maintenance enable signal MAINT-ENBL is activated, then the maintenance multiplexer 5TO2 causes the maintenance address to be used as the address for the dta multiplexer 5TO1. In this manner, the contents internal to the processing elements or the value of signals input to the processing element may be read as the output from the processing element. By having such a mechanism in each processing element in an exemplary graph graph machine, then any particular data register or memory output may be accessed or viewed for maintenance purposes by defining the value for maintenance address which allows the switching of all multiplexers in the system to come to a common point. To illustrate, referring again to FIG. 5P, which shows three processors, separate maintenance address lines would be given to each processing element 5PO1, 5PO3 or 5PO7 and since there is a control arc from 5PO1 to 5PO3 a data register in 5PO1 can be read into processing element 5PO3. In a similar manner, by directing the multiplexer within processor 5PO3, the data can be put on the output lines to processing element 5PO7. In this manner, the data output from processor 5PO7 can reflect a value of a register in processing element 5PO1 or alternately the value of a register in processing element 5PO3 using a different maintenance address or alternately the value of a register in processing element 5PO7 using still yet a separate maintenance address number. In the exemplary graph architecture training system as illustrated in FIG. 4A, the data output from the METAPROCESSOR is used as the common point for maintenance data addressing. In this manner, the high level addresses for the maintenance address refer to registers within the METAPROCESSOR. The next address bits in a maintenance address refer to processors immediately surrounding the METAPROCESSOR, these being the INPT, the OIU, the FORM, the PMEM and the SEM. In a similar manner, the second level of processors may access data in a third level of processors, such as DSPL, WFB, etc. In this manner, in the exemplary system a tenbit maintenance address can access any of approximately fifty registers and memory outputs in this system. Appendix B contains a listing of maintenance addresses and the corresponding registers which may be monitored in this manner. This data value is valid for the maintenance address only in the contect that the MAINT-ENBL signal is active. Otherwise, the system operates normally. It is possible since the processing system may actively be performing functions that the switching of the maintenance multiplexer may cause improper operation. Because for maintenance purposes, it is desirable to monitor the value of specific registers at different points in the operation of the system a mechanism must be provided to allow the periodic stoppage of operation in the system. This is accomplished by adding an ADVANCE-DISABLE flip-flop to each control processor in the graph architecture machine as illustrated in FIG. 5U. What is shown here is the ADVANCE-DISABLE flip-flop 5UO2 and a gate 5UO1 which allows the use of the ADVANCE-DISABLE flip-flop. When the ADVANCE-DISABLE flip-flop 5UO2 is set, the ADVANCE signal which is used by the control processor to determine when it can proceed with the separate operations after generating an instruction to another processor is disabled. In this manner by controlling the action of this ADVANCE-DISABLE flip-flop, the system can be caused to stop after execution of each instruction in a sequence of instructions and thus data may be monitored at the points in between the execution of each instruction. This is independent of length of the sequence of instructions which in many cases may be several hundred thousand instructions long. The process operates as follows: The STEP-MODE signal into gate 5UO1 is activated for the maintenance operation. Since this is now active, the NEXT INSTRUCTION pulse into gate 5UO1 allows the setting of the ADVANCE-DISABLE flip-flop 5UO2 which then causes the control processor in which the flip-flop is contained to halt after each instruction issuance. The system now will not proceed until the reception of the STEP signal which allows the ADVANCE-DISABLE flip-flop 5UO2 to be reset. This then allows the control processor to issue the next instruction for execution and again wait until another STEP signal is received. The STEP-MODE and the STEP signals may variously be generated by switches on a maintenance control panel of the exemplary graph architecture machine or may be generated by a separate processing element whose function it is to evaluate the performance or monitor the operation or determine failures within the exemplary graph architecture system. Because the ADVANCE-DISABLE flip-flop is set in all control processors at the same time, the use of the maintenance address concept does not destroy the operation sequence of any processor in the system. In this manner, data can be reached and monitored in between the execution of each and every instruction in a sequence of instructions in the graph machine. In summary, by adding the maintenance multiplexer to each and every processing element in a graph architecture machine and by adding an ADVANCE-DISABLE flip-flop to each control processor in an exemplary graph architecture machine, it is allowed to monitor the value of any register or memory content in the system and it is clear that the number of processors in the system may be arbitrarily large for this operation to take place. In that the maintenance multiplexer concept is not a necessary part of every exemplary graph architecture machine, the portions of the maintenance multiplexer and the ADVANCE-DISABLE flip-flop circuits are not described in each of the ensuing processing element descriptions.

PROGRAM EXECUTION SUBSYSTEM

In the example training system, the function of the program execution subsystem is to take data from the inputs processing subsystem and determine what operations are to be performed using the current portion of a lesson program. The processors in FIG. 4A which make up the program execution subsystem include the: (1) METAPROCESSOR (META), (2) Program Memory Processor (PMEM), (3) Semantics Processor (SEM), (4) Numerics Processor (NUM), and (5) String Processor (STG) hereinafter described in detail. Of the foregoing, the METAPROCESSOR is the principal control processor for initiating sequences of operations in the other processors which make up the program execution circuitry as well as selectively initiating operations in other portions of the overall system. The NUM processor is a data processor which performs all program commanded numeric computations such as add and multiply and in addition performs the functions of converting numbers from one base number system to a different number base (such as decimal to binary), incorporates a real time clock and, as an example, allows storage for up to 64 numeric variables.

The string processor is a data processor which performs functions on strings of data. The term string means an ordered sequence of data words. The number of words in the string is called the string length. The functions performed by the string processor, or STG, on strings include (1) string concatenation in which two strings of the same or different lengths are strung (concatenated) together to form a single third string which has a length equal to the sum of the lengths of the original string, (2) string alteration in which case a string is broken up into two strings, the dividing point being determined by yet a third string called the match string which must correspond to a substring of the original string, and (3) string comparison in which a match string is compared word by word with a portion or all of the words of a second string to give a determination as to existence of that string at the beginning of the second string. The usefulness of these operations to problems in text editing. Student answer response processing, and grammar processing is well known in the art as described in, for example, any standard text for the SNOBOL programming language. The current mechanization of these functions using the concept of stacks is new in the art.

The SEM is a control processor which directs the activities of the STG and NUM processors either separately or in combination. In particular, a concatenate operation directed by command of the META to SEM causes SEM to issue a sequence of instructions to the STG, each instruction of which manipulates a single word of a string and only upon completion of the entire sequence of operation are all words of the first string concatenated with all the words of the second string. As a further illustration, a numeric variable within the NUM may be converted to a string of decimal characters representing that number and conversely a string of characters may be converted into a binary number by taking a string from STG and transferring each word of such string to NUM which comprises a single binary number.

The PMEM processor holds in a memory at any given time the portion of the overall lesson which is being used to direct the actions of the machine. This lesson program which is coded in the SPOML language, the elementary parts of which are alphabetic characters, is stored as a continuous string of 8 bit words called characters. The PMEM supplies the next logical character in the sequence to the META for interpreting the actions which are to be performed by other processors. As each sequence of characters is exhausted, a further program string segment is loaded into the PMEM.

The overall operation of the program execution circuitry may be likened to a software interpreter which is well known in the art, but which is embodied in a novel manner in the current invention and consists of the following sequence of operations: (1) source program is given a part at a time to the (2) lexical analyzer which composes the data such as for taking a string representing the name of a prior storage filed picture and converting said string to a single word address for locating said file in the mass storage device by way of supplying information to the (3) syntax analyzer which determines that the name so defined relates to a picture stored in mass storage as opposed to the name of a new program string portion and supplies this fact to a (4) code generator which provides an ordered sequence of instructions to one or more (5) instruction execution devices which carry out those primitive operations necessary to cause the mass storage data referred to originally by a name to be shown on a display device. In the current invention, the correspondence is that the object program is stored in the PMEM which supplies the character data to the META which performs the lexical and syntax operations itself or causes the FORMAT, DSPL or INPT processors or perform the lexical and syntax anaylsis depending upon whether the operation currently desired by the program is for string, numeric, mass data transfer, display or input processing. In the case that the META performs the lexical and syntax operations, the further operations are initiated in the control processors SEM, FORMAT, DSPL or INPT which perform the code generation functions to one or more of the data processors in the combination or ensemble of processors. Alternatively, the META may cause instructions to be sent out which directly cause data processor actions effectively bypassing the code generation function of the control processors although such instructions do flow through said control processors.

In the following, the detailed construction and operation of each processor which makes up the program execution subsystem is described.

NUM

The numerics processor performs the commonly known functions of arithmetic manipulation of data such as add, subtract, multiply and divide and further allows numbers to be inputted in various number bases and converts such numbers as is necessary to carry out the arithmetic computations as well as converting numbers stored in the binary form used internal to the processor for output in any number base. Further, the NUM contains storage for variables which may be referred to by the program and a real time clock useful in timing the difference between various events in the execution of a lesson such as the time required for the operator to make a response to a displayed question. The NUM processor may be implemented by a special design or using any number of vendor numeric processing devices and for this reason the function is not new in the art and since it is not new only a general description will be given.

Figure 20:
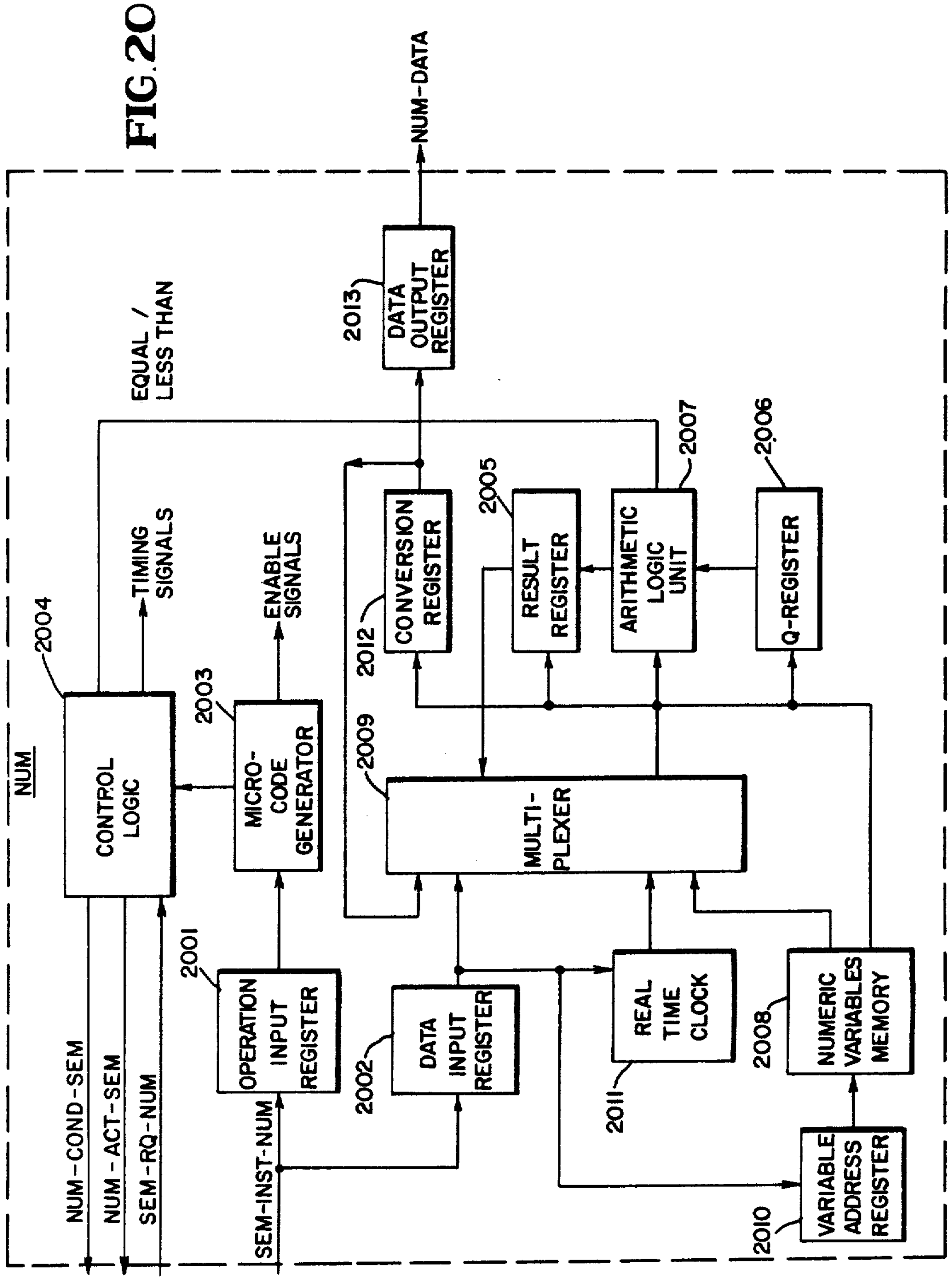
FIG. 20 is a block diagram of an implementation of the NUM data processing element of FIGS. 4A and 4B, the purpose of said NUM processor being to perform numeric computations.

The NUM processor is illustrated in block diagram form in FIG. 20. A signal, SEM-INST-NUM, is applied at terminal 20A and then to an operation input register 2001 which holds the numeric code representing the current instruction which is then being executed in a manner similar to that described previously. The data part of the SEM-INST-NUM is also applied to the data input register 2002 which may optionally as determined by the OPCODE hold the data supplied with the instruction for execution. The operation input register 2001 is connected to a micro-code generator 2003 which is a read only memory, and which decodes the encoded operation code into individual elementary register and data movement operations which are necessary to carry out the intent of the instruction during the execution of the instruction, and provides at its output enable signals as well as signals to a control logic circuit 2004 which is identical in function to the control logic previously described in that it supplies an ACTIVE signal in response to a REQUEST signal and during the ensuing time period generates one or more timing pulses (the number being defined by the micro-code generator) and upon having generated the proper number of timing pulses drops the ACTIVE signal and awaits the occurrence of yet another REQUEST signal. The control logic also generates the condition signal COND over a line NUM-COND-SEM to the originating control processor, the meaning of said COND signal being appropriate for the instruction being executed as, for example, an overflow condition which results when two numbers are added and the result is too large in value to be held in the result register 2005 which holds one of the two parameters in, for example, an add operation and receives the result of such an operation.

A Q-register 2006 which may supply the second parameter in an operation such as addition having been loaded previously with a number originating elsewhere in NUM is connected at its input to a numerics variables memory 2008 and at its output to an arithmetic logic unit 2007 which is a well known circuit in the art for performing addition and subtraction.

The numerics variable memory which is a random access memory may hold, for example, up to 64 numbers, any location thereof which may be used as a parameter for arithmetic operation by transfer through the multiplexer switch 2009 to the arithmetic logic unit 2007.

A variables address register 2010 holds a number, usually representing a character of the English alphabet, said number allowing the selection of one of the variables in the numeric variables memory 2008. A real time clock 2011 which is a continuously clocked counter allows readout and may be used as a parameter in an arithmetic operation by means of its value being transferred through the data multiplexer 2009.

A conversion register 2012 which is a shift register wired to allow conversion from one number base to another as for binary to decimal conversion receives input signals from the numeric variables memory and provides an output of the data output register 2013 which holds a part of a result number for use by the SEM and for subsequent distribution elsewhere.

A data multiplexer 2009 is a switch guided by the micro-code generator for a particular instruction to gate data from the input register 2002, real time clock 2011, numeric variables memory 2008, conversion register 2012, or results register 2005 to be used by the conversion register 2012, result register 2005, arithmetic logic unit 2007, Q-register 2006, or stored in the variables memory 2008.

The instructions executable by the NUM processor may be broken down into the following categories:

(1) Control setup as for defining the mode of number base conversion to be used.

(2) Data input and output.

(3) Arithmetic instructions such as add and subtract.

(4) Data transfer such as duplicating the result register data into a particular variables memory location or, as a further example, reading the current value of the real time clock for use as a parameter.

The sequence of operation of typical instructions carried out by NUM is hereinafter described. To set a mode for subsequent number base conversion, the SEM issues the appropriate instruction along with the SEM-RQ-NUM signal to control logic 2004. If, at this time, the NUM is not active, the control logic generates a timing pulse which latches the OPCODE portion of the instruction into the OPCODE input register 2001 and at the same time loads the SEM-DATA into the data input register 2002, and at the same time raises the NUM-ACTIVE-SEM signal which notifies the SEM that the instruction has been taken and the SEM may perform other operations. The micro-code generator switches the data multiplexer 2009 so that it may read the data input register, enables the conversion register to accept the parameter and enables the control logic to generate one timing pulse. The result of this timing pulse is to cause the parameter which defines the conversion mode to be stored into the conversion register 2012. Having issued the required number of timing pulses, the control logic drops the NUM-ACT-SEM signal and awaits a subsequent request signal. No condition signal is generated for this instruction.

Data input is accomplished by the execution of a series of DATA-IN instructions. Each instruction supplies a portion of the data needed by the conversion register to form a complete number. Each instruction works as follows. The instruction is accepted as previously described, the data input is selected to the conversion register 2012 through the data multiplexer 2009 and a timing pulse from control 2004 causes the conversion register to assemble the new data along with the old. As before, control 2004 drops the active signal.

As an example of data transfer, consider an instruction for moving data from the conversion register to the Q-register 2006. The instruction is accepted as before and the data multiplexer 2009 is switched to accept data from the conversion register 2012 and gate said data to the Q-register 2006. The control logic 2004 generates timing signals allowing the Q-register 2006 to load and then drops the active signal.

As an example of an arithmetic instruction, consider the addition of a number in the Q-register 2006 to a number in the result register 2005 with the sum placed into the result register 2005. The instruction (which has no associated SEM-DATA) is accepted as before and the micro-code generator 2003 enables the arithmetic logic unit 2007 to perform the add operation, enables the multiplexer 2009 to read the current result register 2005 data and enables the result register 2005 to be loaded. The control logic 2004 generates the required number of timing pulses to load the result register 2005 with the sum.

Other instructions may be used to store result data 2005 into the variables memory 2008, read the variables memory into the Q-register 2006, load the variables address register 2010 and transfer result data to the conversion register 2012 where said data may be converted to the appropriate data base and read out by a series of instructions through the data output register 2013 which forms the NUM-DATA.

STRING (STG) PROCESSOR

Figure 30:
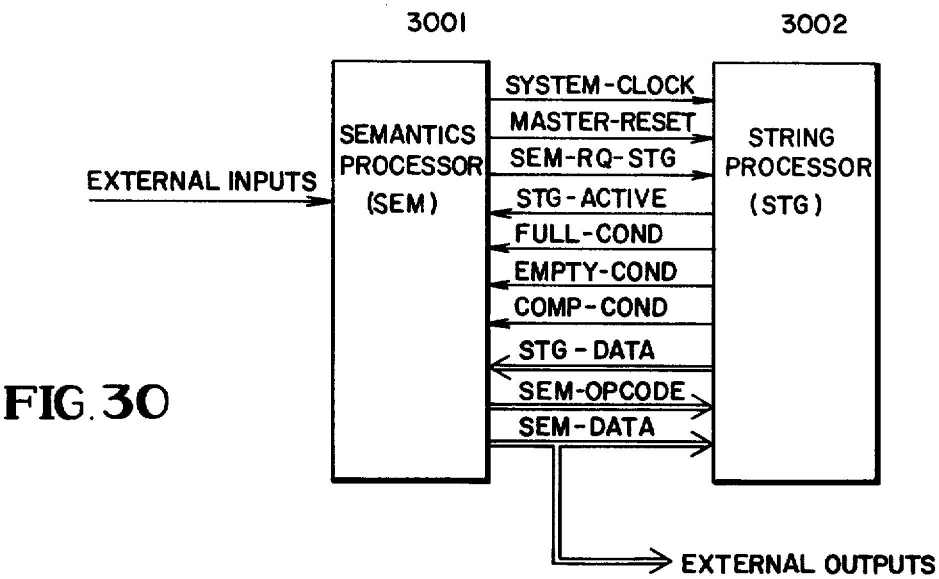
FIG. 30 illustrates the interface signals between the STG and SEM processors of FIGS. 4A and 4B as more fully illustrated in FIGS. 21 and 22.

The STG is an autonomous processor for manipulating data strings (an ordered sequence of data words) that may be used as a peripheral processor to an existing computer system or as a functional processor in a graph architecture processing system such as the example training system. FIG. 30 illustrates the typical interconnection of STG in such systems. The processor called SEM (for semantics processors) may be a computer or control processor and supplies the data and sequences of instructions necessary for performing the string computations. FIG. 30 also lists the signals which exist between STG and the rest of the system for operation and said signals include a:

SYSTEM CLOCK signal which is used by STG to synchronize its operation with the SEM and generate internal timing control signals.

MASTER RESET signal which is used to initialize the control logic within the STG.

SEM-RQ-STG signal which is active when the SEM processor desires the STG to execute an instruction.

STG-ACTIVE signal which is generated by STG and when active indicates that STG is executing the instruction requested by SEM.

FULL-COND signal which indicates that a data string is of maximum size.

EMPTY-COND signal which indicates that a data string has no data content.

STG-DATA word output of STG supplies the results of computations by STG.

SEM-OPCODE word input to STG defines which of the 32 instructions is to be executed for a given instruction request.

SEM-DATA word which supplies the data for use in executing an instruction.

An instruction is defined as the combination of the SEM-OPCODE and SEM-DATA words and an instruction execution is defined as one sequence of SEM-RQ-STG and STG-ACTIVE signal activations.

External inputs to SEM consist of user data (from the META) to be manipulated and external outputs are results of computations needed by the user (the META-PROCESSOR).

The sequence of instructions supplied to the STG from the SEM is defined by the user as a set of programs for accomplishing the computations desired by the user.

Concept of Operation

The STG processor performs those functions on data strings that are useful in performing text editing and grammar equation solution. These functions include, but are not limited to, string concatenation, string alternation and substring comparison and the approach taken in implementing these functions in the STG processor is a new and novel approach and is an essential part of the invention.

The method of string processing employed in STG is based upon generalizations of elementary pushdown (also called LIFO or Last-In-First-Out) stacks and elementary queueing (also called FIFO or First-In-First-Out) stacks, the principle of operation for which, taken individually, is well known in the art. Basically, a stack is a data storage structure which stores a string of data in which only the end data items of the string may be manipulated. For example, in the LIFO case, data is written on one end of the stack and taken back (with loss of that data to the stack) from the same end. For a FIFO stack, data is written in one end and taken from the other.

A string normally has two ends called a left and a right end respectively, or those ends which would appear to one if the data string is laid out horizontally.

There are basically four elementary pushdown stack operations: (1) write, (2) push, (3) pop, and (4) read. These are illustrated in the table below for the left end along with symbology useful in describing the operations and examples of their application to exemplary data strings.

| Stack | Symbolic | Example | |
|---|---|---|---|
| Operation | Equation | Before | After |
| Write | x → y | X . . . | y . . . |
| Push | → y | X . . . | yx . . . |
| Pop | x → | xy | y |
| Read | x | x . . . | x . . . |

In the immediate above table, x and y represent singular data words, the elipses " . . . " imply any other data which may be in the stack and the arrow → means the data is manipulated from the left end of the data string.

As in the immediately previous table, the four operations may similarly be defined in the right end of a data string as in the following table:

| Stack | Symbolic | Example | |
|---|---|---|---|
| Operation | Equation | Before | After |
| Write | x ← y | . . . x | . . . y |
| Push | y ← | . . . x | . . . xy |
| Pop | ← x | . . . yx | . . . y |
| Read | x | . . . x | |

It is to be noted that the data in the left end operation case is reversed with respect to the data appearance for the right end operation case and this is a useful feature of the string processor. Also, note that depending upon the current data contents of a stack, the push operation can not be accomplished if the amount of data already in the stack has used all the available storage locations in which case the stack is said to be "full." Also, the pop, write and read operations can not be accomplished if the stack has no data contained therein in which case the stack is said to be "empty." The first generalization of these elementary operations is for several character words manipulated at one time. There are again four operations each similar to those described, but more complex, and given the names replace, place-on, withdraw and read. These are illustrated immediately below for the case of left end manipulation of data.

| Operation | Example Symbolic | Example Result | |
|---|---|---|---|
| Name | Instruction | Before | After |
| Replace | "AB" → "C" | Case 1 "ABD . . ." | "CD . . ." |
| Place on | → "AB" | Case 2 "EBD . . ." | "EBD . . ." |
| | | "C . . ." | "ABC . . ." |
| Withdraw | "AB" → | Case 1 "ABD . . ." | "D . . ." |
| | | Case 2 "EBD . . ." | "EBD . . ." |

-continued

| Operation Name | Example Symbolic Instruction | Example Result | |
|---|---|---|---|
| | | Before | After |
| Read | | "ABC . . ." | "ABC . . ." |

In these cases, sine there are multiple data words represented, for example, by the letters A and B, these data words are enclosed in quotations so that no confusion can be made with the characters of normal words. In the case of replace and withdraw, the operations are performed only if the character string given in the instruction, such string normally referred to as a "match" string, is found on the top of the stack. If the match string is not found, then the operation is said to "fail." As before, these operations may also be accomplished on the right end of stack data.

The second principal generalization of these operations are for a multiplicity of stacks, some of which are manipulated on the left end and some on the right end. Consider the exemplary case of two stacks, one of which is called the LEFT stack and the second the RIGHT stack with connections such that data is manipulated on the right end of the LEFT stack and similarly data is manipulated on the left end of the RIGHT stack and data is allowed to flow between these ends. Pushing a string of characters into the left stack causes data movement in the left direction and similarly for the right stack. Moving characters from one stack to the other keeps the proper ordering of the strings overall. There are two operations called move and restore, illustrated by examples in the following table, for data movement in both the left direction and the right direction.

| Operation Name | Symbolic Instruction | Example | | | |
|---|---|---|---|---|---|
| | | Before | | After | |
| | | Left | Right | Left | Right |
| Move | ^ "A" < | ". . . C" | "BDAG . . ." | ". . . CBDA" | "G . . ." |
| Restore | % | above operation | | ". . . C" | "A . . ." |
| | % | above operation | | ". . . CBDA" | "BDAG . ." |
| Move | ^ "BC" > | ". . DBCA" | "L . ." | ". . D" | "BCAL . ." |
| Restore | % | above operation | | ". . DBCA" | "BCAL . ." |
| | % | above operation | | ". . D" | "L . ." |

The move operation moves all data preceding the matching string (does not operate exclusively on the top of the stack). Also, the restore operation is used after the move operation to either duplicate data (direction of restore operation is opposite to direction of move) or to eliminate a substring of data (direction of restore is the same as the direction of the move).

This set of generalized operations clearly can be accomplished by using the primitive stack operations wherein the stacks are arranged such that data may flow properly. Also, a multiplicity of stacks may be used to allow string computation on several data strings of different content.

General Functional Description

Figure 21:
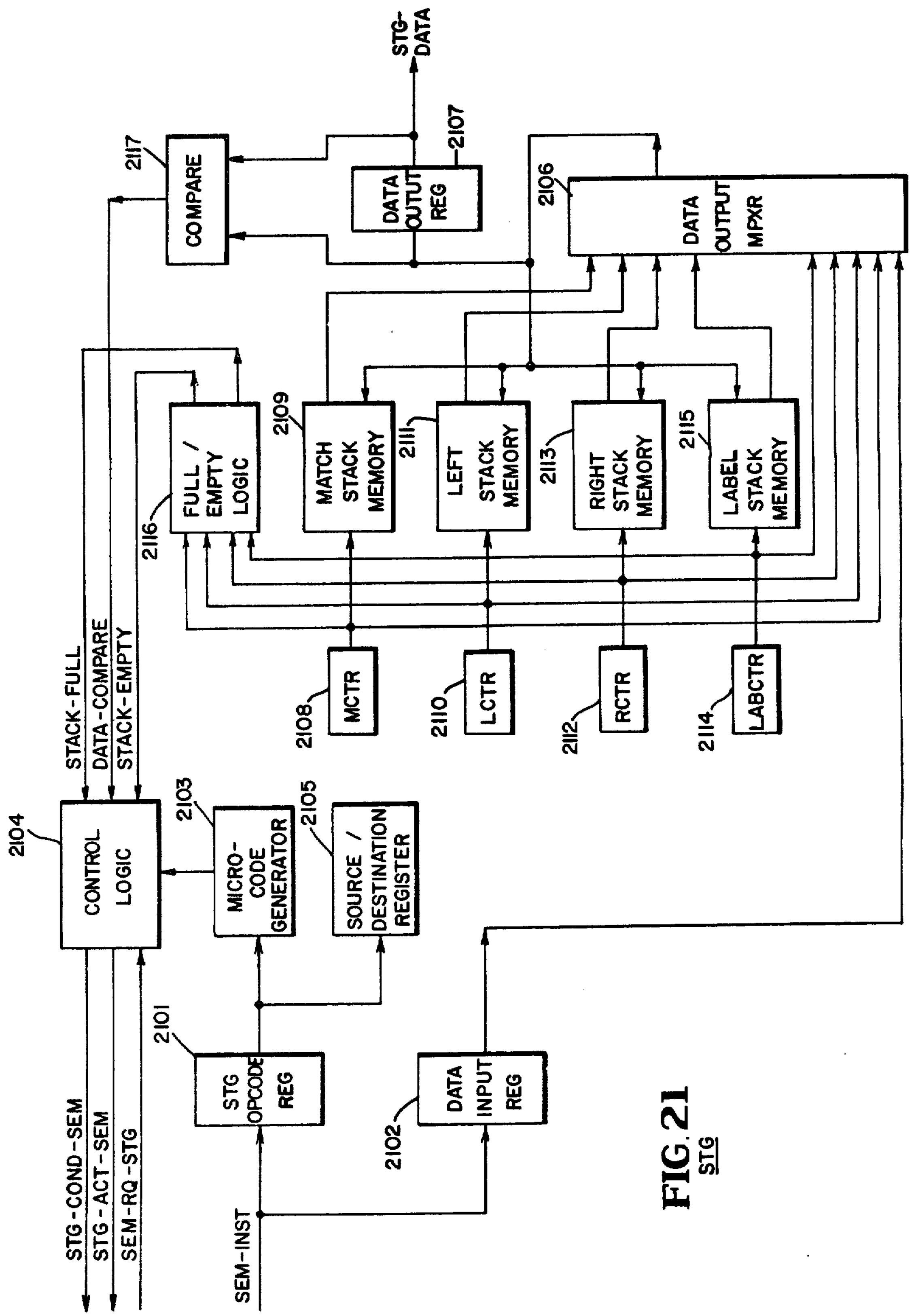
FIG. 21 is a block diagram of an implementation of the STG data processing element of FIGS. 4A and 4B, the purpose of said STG processor being to perform computations on string data structures in a new and novel way.

The principles here described are embodied in an exemplary fashion in the string processor (STG), the components and interconnect of components for said processor as illustrated in FIG. 21. The purpose of the illustrated components is firstly discussed.

The STG OPCODE register 2101 performs the function of holding the OPCODE part of the instruction. The input data register 2102 stores the DATA part of an instruction. The micro-code generator 2103 supplies the appropriate elementary enables and data switching as required for the current instruction.

The control logic 2104 communicates with the SEM processor using REQUEST, ACTIVE, and CONDITION signals as well as generates the required number of timing pulses for carrying out the execution of the instruction.

The source/destination register 2105 determines which stack data is taken from and/or which stack data is given to other parts of the STG. The output data multiplexer 2106 allows connection of data paths amongst the various data for use by the SEM as well as an OPERAND for comparison with data in one of the stacks.

The match counter 2108 (MCTR) and match stack memory 2109 taken together form the match stack, the purpose of which is to hold the definition of a match string during one of the generalized stack operations. The left counter 2110 and left stack memory 2111 together form the LEFT stack which performs the functions previously described. The right counter (RCRT) 2112 and right stack memory 2113 together form the RIGHT stack for STG.

The label counter (LABCTR) 2114 and label stack memory 2115 together form the LABEL stack which is one example of the multiplicity of additional stacks which may be used to allow computation on different strings in which computation is performed using a set of three of the stacks at one time. In a particular application, the LABEL stack holds the names for mass storage files which may be needed for display and program loading purposes.

The full/empty logic 2116 monitors the counts of the various stack counters and provides appropriate signals to the control logic 2104 when a stack becomes empty or is full.

The compare circuit 2117, which compares two words for correspondence, is used to determine if the data in the match string corresponds to the data in the required LEFT, LABEL or RIGHT stack.

The operations of the STG processor correspond to the primitive stack operations previously defined and may be broken down into the following categories: stack clear; read stack; write stack; pop stack; push stack; move stack; compare stack; read length; restore stack; and save stack contents.

By convention, a stack is empty if the count in the counter for that stack is of value zero. By convention, a stack is full if the counter has its maximum possible count which in the current machine is 255. The full/empty logic 2116 continuously monitors these conditions and enables the condition line through the control logic 2104 for any instruction for which these conditions are important. Examples of instruction execution follow.

The push stack instruction for the match stack is accepted and loaded into the OPCODE register 2101 and data input register 2102 after the occurrence of a SEM-RQ-STG signal through the control logic 2106. The MCTR 2108 is incremented by a pulse from control logic 2106 and the data having been gated through the output data MPXR 2106 to the match stack memory 2109, the data is recorded therein by a pulse from the control logic 2104.

The pop instruction to the LEFT stack, for example, causes the then current data at the location indicated by the LCTR 2110 to be gated through the data output MPXR 2106 and loaded into the output data register 2107. This is followed by decreasing the count in the LCTR 2110 by one count, effectively losing the data at the original location.

The move stack operation, as for moving data from the LEFT stack to the RIGHT stack, causes one character to be read from the LEFT stack, pushed into the RIGHT stack in the sequence previously defined and that character popped from the LEFT stack. During the operation, the data is compared with data in the data output register 2107, and the condition is set as a function of whether the data compare or not.

The save stack instruction causes the current count of, for example, the label counter 2114 to be duplicated in another register internal to this counter and described in more detail later. A subsequent restore instruction causes this saved count to be reloaded into the counter effectively restoring the size and content of the string value at the time of the save.

The read length instructions allow the size of any string stored in a stack to be read and used for computation and is accomplished by loading the counter contents for the appropriate stack into the output data register.

The generalized stack operations are accomplished by a sequence of the above instructions as commanded by the SEM processor.

STG Instruction Set Definition

Figure 31A:
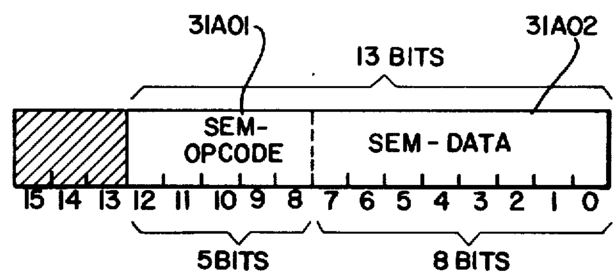
FIG. 31A illustrates the input instruction format to the STG processor of FIGS. 21 and 30, said instruction consisting of the opcode and data portions of the interface.
Figure 31B:
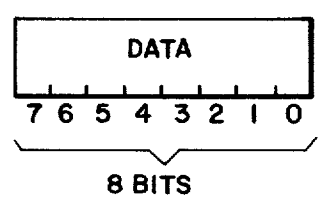
FIG. 31B illustrates the data format for data within the STG processor illustrated in FIGS. 21 and 30.
Figure 31C:
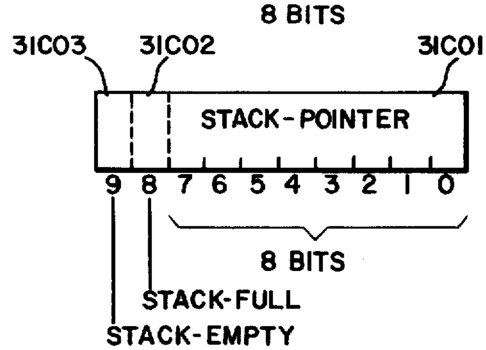
FIG. 31C illustrates the stack address word format for the STG processor of FIGS. 21 and 30, said stack address word being used to access specific words in a stack and define status of a stack.

FIG. 31A illustrates the format of the instructions given to STG. An instruction consists of an eight-bit OPCODE of which only the lower five bits are used and a SEM-DATA part of eight bits. The OPCODE part dictates which of the 32 possible instructions are to be executed for a given instruction acceptance and the DATA part supplies the data to be used for the execution of that instruction. FIG. 31B illustrates the format of the data used internally to the STG and is representative of the data content at each location in a stack. FIG. 31C illustrates the format of a stack pointer word which is used to define the left or right end of a stack. Note that the FULL and EMPTY status conditions are stored as part of the stack pointer word.

The complete set of 32 exemplary instructions for an STG are defined in summary in Appendix CC. Appendix CC also contains example specific OPCODE numbers which would be supplied from the SEM.

STG Detailed Functional Description

Figure 39A:
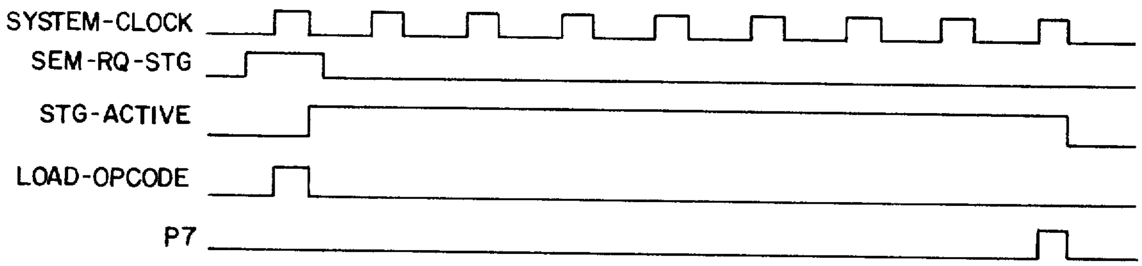
FIG. 39A illustrates the NOP ("no operation") instruction timing for the STG processor shown in FIG. 21, the purpose of said NOP instruction being to verify that the STG may accept instructions.
Figure 39B:
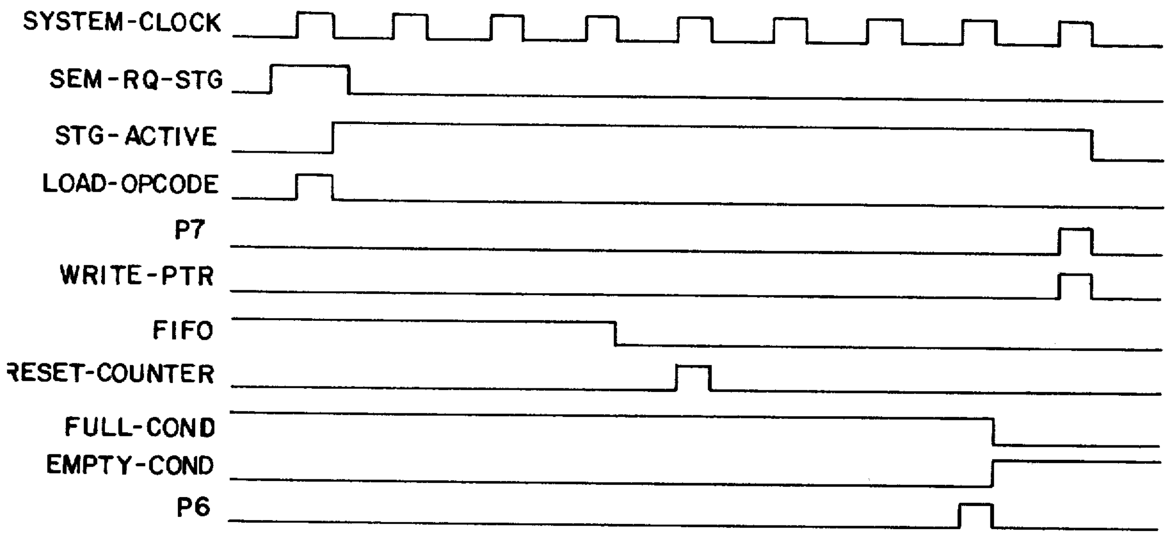
FIG. 39B illustrates the stack CLEAR instructiong timing for an STG processor of FIG. 21, the purpose of said CLEAR instruction being to initialize a data stack.
Figure 39C:
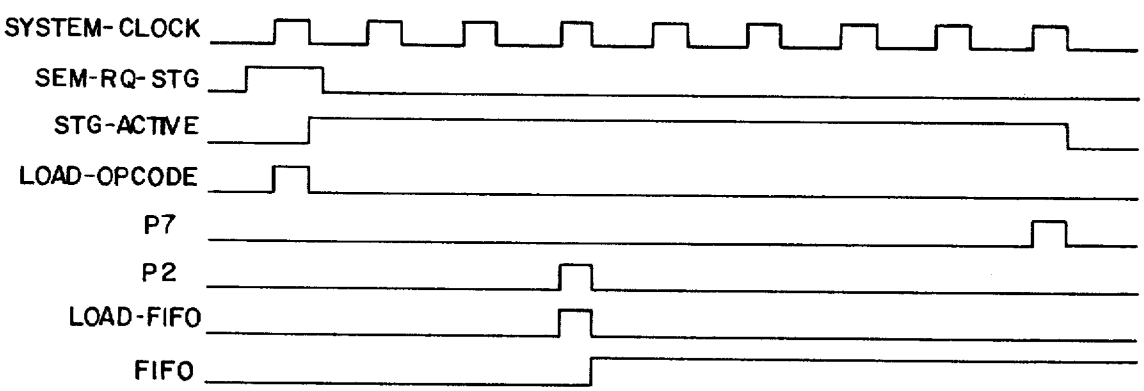
FIG. 39C illustrates the timing for the FIFO instruction in an STG processor for selecting the first-in—first-out mode of operation of a stack.
Figure 39D:
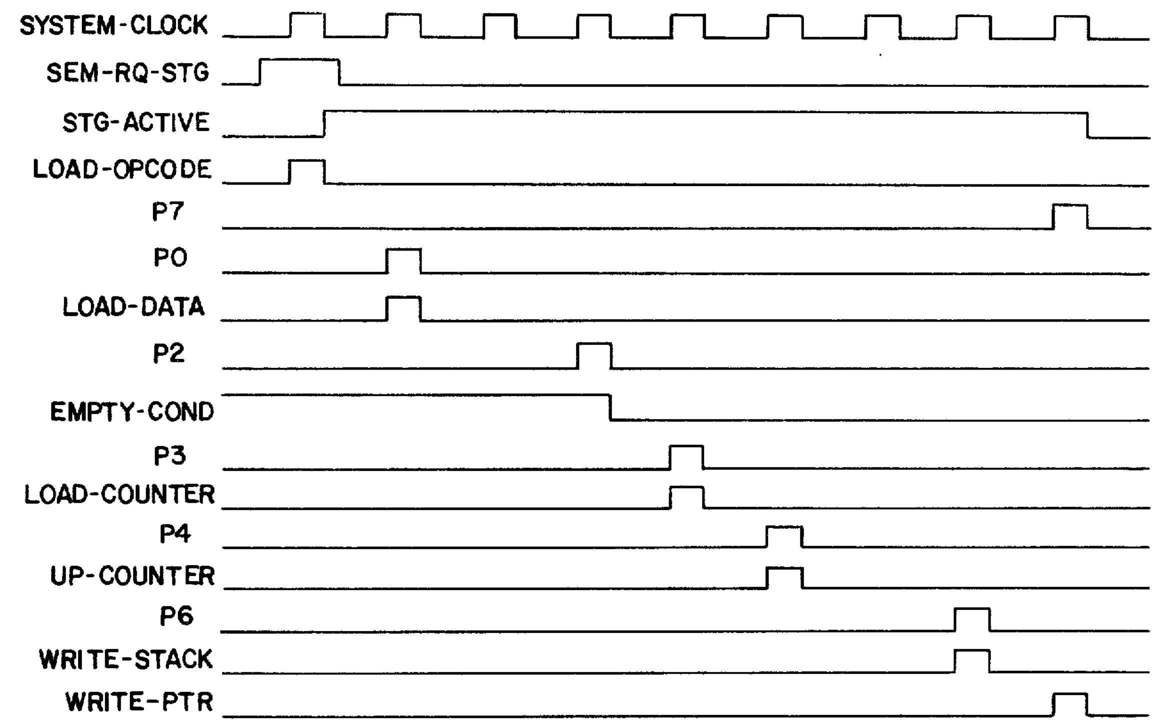
FIG. 39D illustrates the timing for the PUSH instruction in an STG for pushing data into a stack.
Figure 39E:
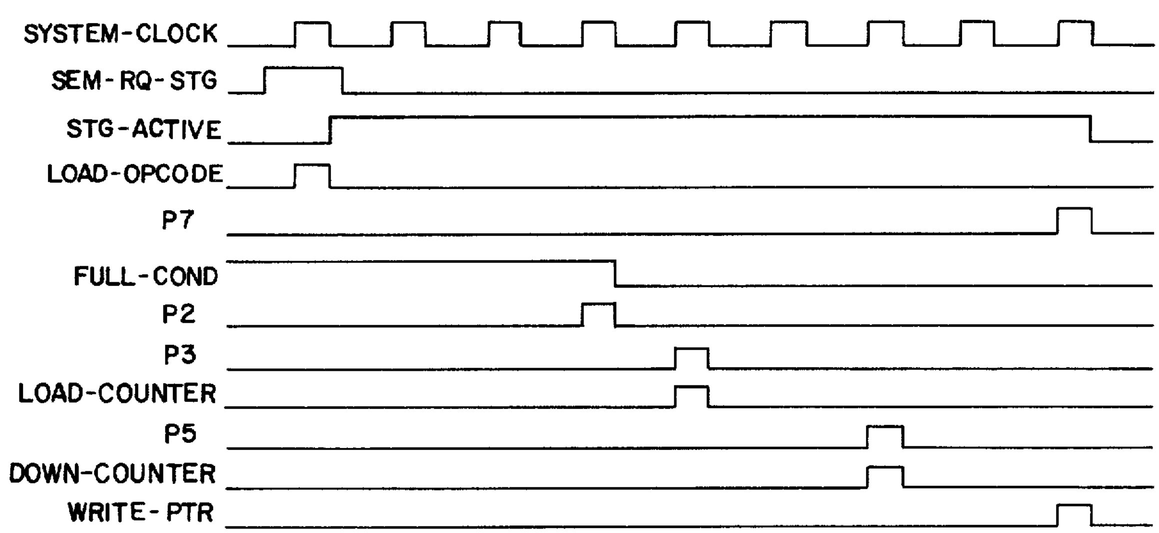
FIG. 39E illustrates the timing for the POP instruction in an STG for popping data from a stack.
Figure 39F:
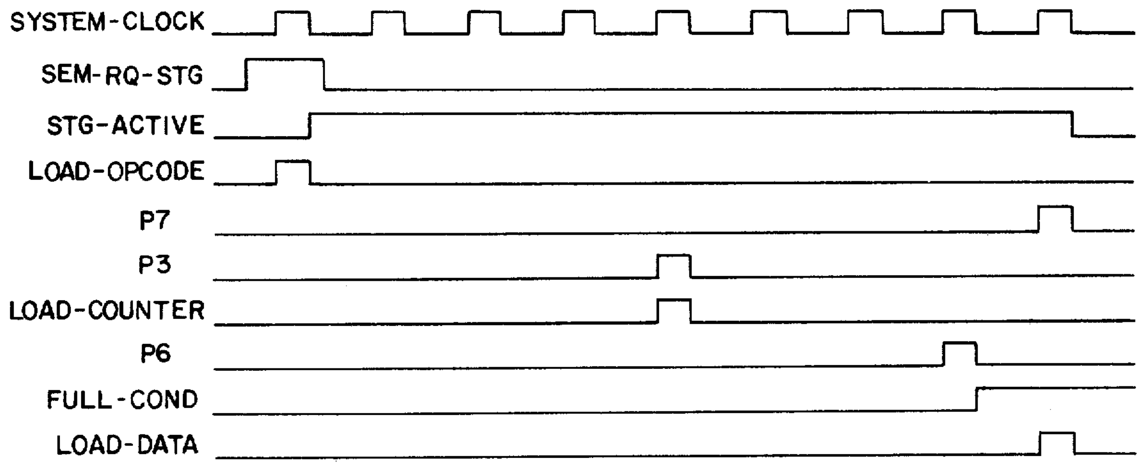
FIG. 39F illustrates the timing for the LEN (length) instruction in an STG for determining the number of characters currently in a stack.
Figure 39G:
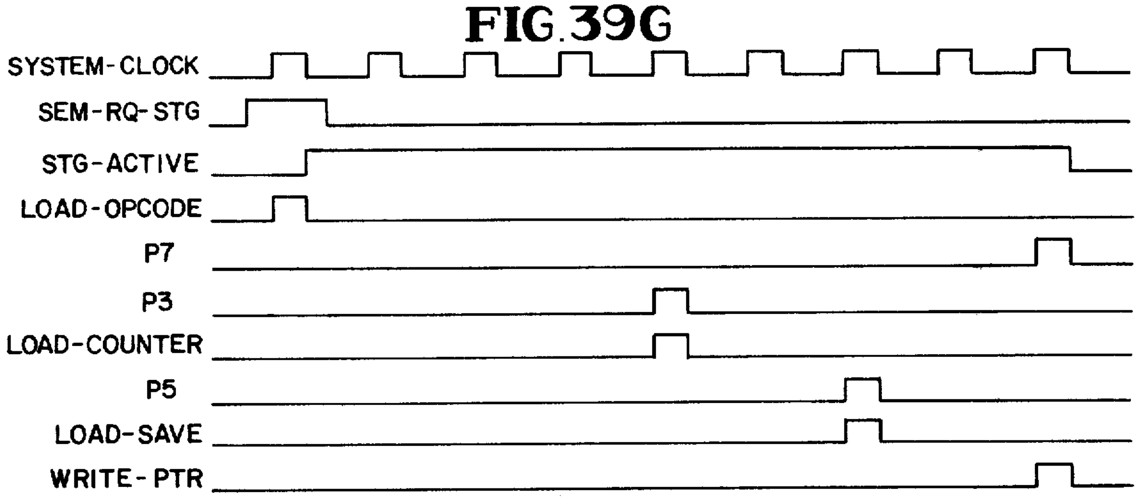
FIG. 39G illustrates the timing for a SAVE instruction in an STG for saving the current stack address for a stack.
Figure 39H:
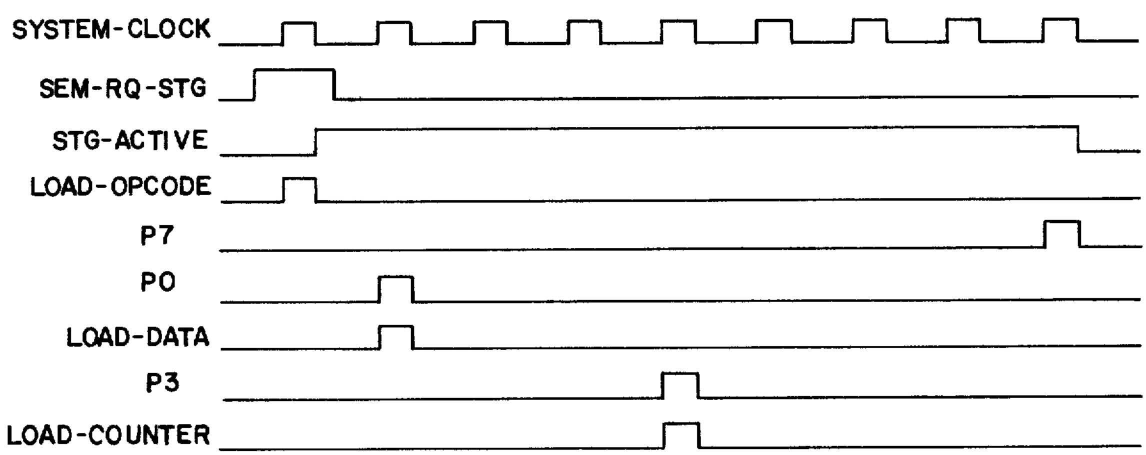
FIG. 39H illustrates the timing for a COMPARE instruction in an STG for comparing a first given character to a second character in a stack.

In this section, the operation of each of the STG circuits is described and the operation of each of the STG instructions is explained in terms of the detailed functional block diagrams FIGS. 32-38 and timing diagrams FIGS. 39-39H.

STG Instruction Acceptance and Control

Figure 32:
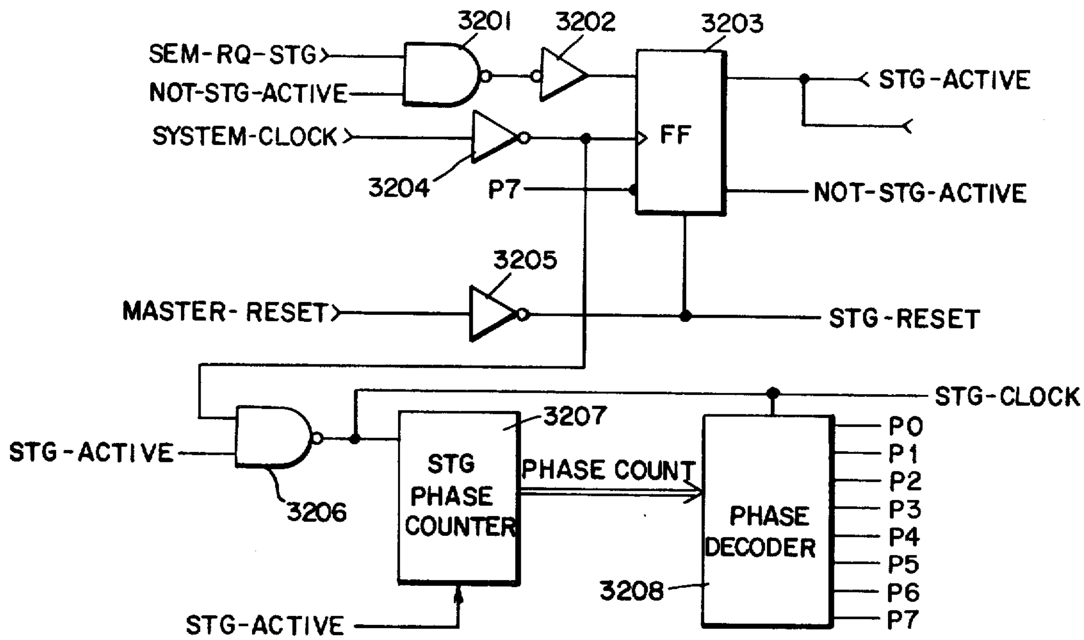
FIG. 32 is an implementation of the control logic portion 2104 of the STG processor of FIG. 21 in accordance with the general definition of implementation of control logic for processors as shown in FIG. 5D.
Figure 33:
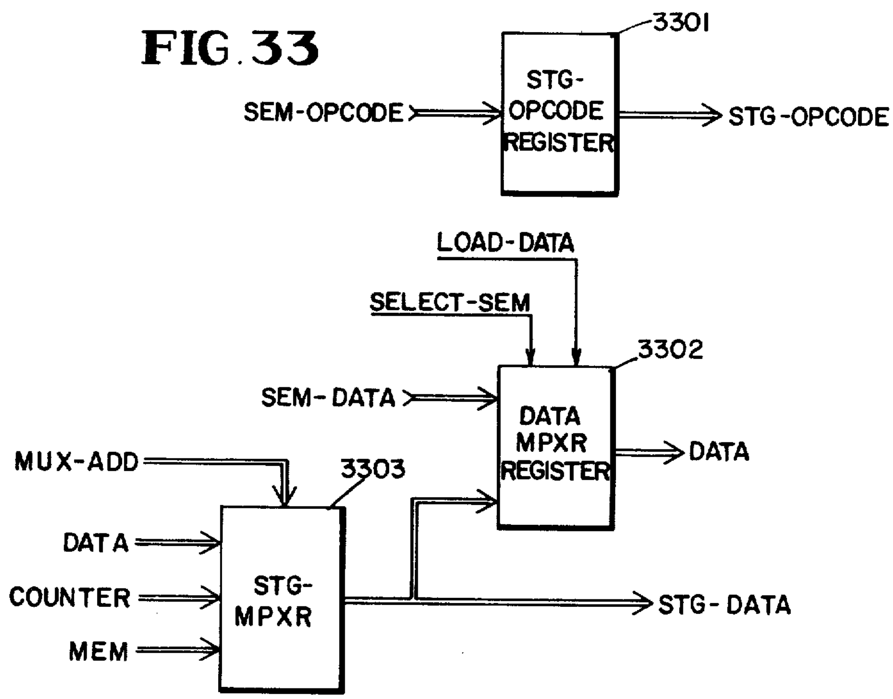
FIG. 33 illustrates the opcode and data register logic of FIG. 21 for an STG processor in accordance with the general definition of FIG. 5B.

FIG. 32 illustrates the detailed breakdown of the control logic 2104 which is used to interchange control signals with the SEM for accepting instructions and generating the timing pulses necessary to accomplish the execution of the instruction. An instruction is accepted by the STG at a time instant when the SEM-RQ-STG signal is present and the NOT-STG-ACTIVE signal is present. In the case that the STG is already executing an instruction, that instruction will be completed before the new instruction is accepted. At the time that gate 3201 becomes active, the STG-ACTIVE flip-flop 3202 becomes set on the next SYSTEM-CLOCK signal generating the STG-ACTIVE signal. This signal notifies the SEM that the new instruction has been received and the SEM now drops the SEM-RQ-STG signal. Once the STG-ACTIVE signal is enabled, the STG phase counter 3206 is allowed to count up on each occurrence of system clock pulse. As the STG phase counter 3206 counts, the phase decoder 3207 generates the eight pulses P0, P1, P2, P3, P4, P5, P6 and P7, in that order, and in step with the system clock pulses. Upon the occurrence of the P7 pulse, the STG-ACTIVE flip-flop is reset, completing the execution of the instruction. The P0, P1, . . . , P7 pulses are used to execute the micro-operations defined by the micro-code generator 2103 for the OPCODE of the current instruction. The master reset signal is used to reset the STG-ACTIVE flip-flop and thus initialize the STG for acceptance of a new instruction. The master reset is normally used after applying power to the STG or to abort the execution of an instruction. STG Instruction and Data Flow FIG. 33 illustrates the OPCODE and data (input/output) registers and the STG multiplexer 3303. The data register has two inputs and is used both for holding the SEM-DATA part of the input instruction and for holding data for output from the STG.

The STG OPCODE register 3301 is loaded on the same clock pulse which sets the ACTIVE flip-flop each time a new instruction is received. The STG-OPCODE signals are used by the micro-code generator shown in FIG. 34 to define the individual micro-operations to be performed for an instruction. For particular instructions, the LOAD-DIN signal is active from the micro-code generator allowing the data MPXR register 3302 to be loaded with the SEM-DATA part of the instruction. The data register 3302 is loaded at the P7 pulse time from STG-MPXR for more instructions have the LOAD-DOUT signal enabled. The MUX-ADD from the micro-code generator which is unique for each instruction is used to identify the source of data through the STG-MPXR 3303. In this manner, the data register 3302 may be loaded with the counter value of a particular stack or the MEM signals which are the content of a particular location in a stack.

STG Micro-Code Generator

Figure 34:
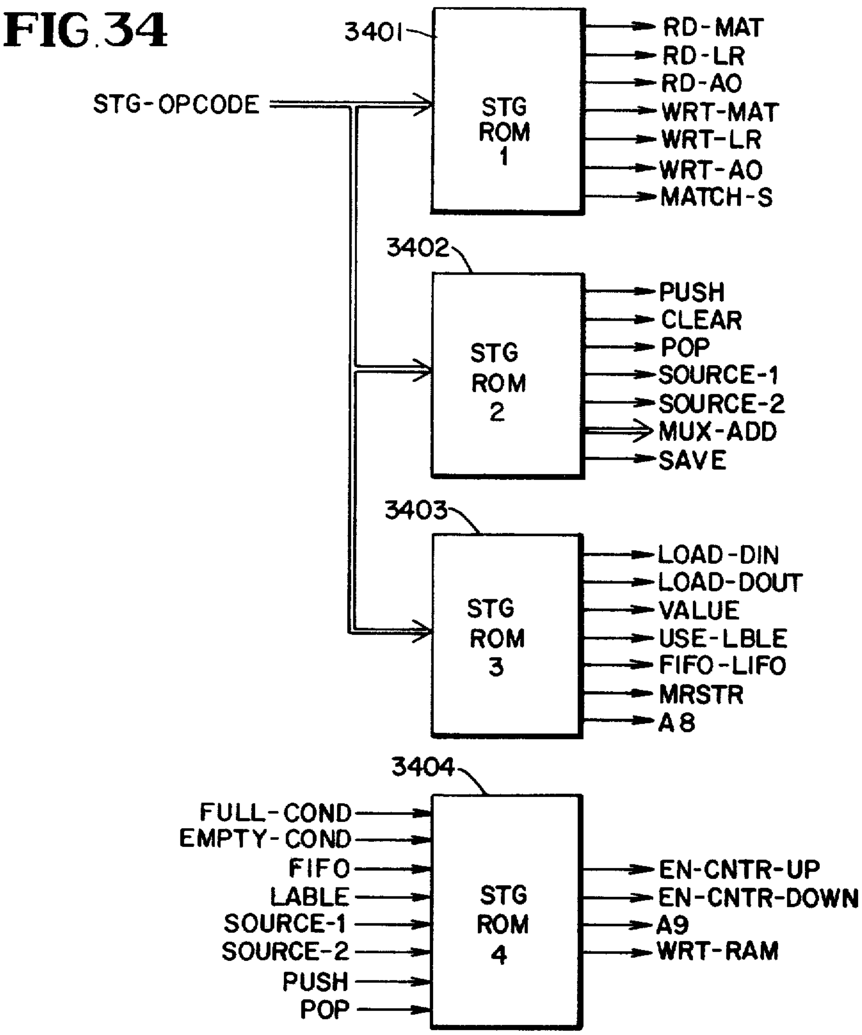
FIG. 34 illustrates the micro-code generator logic of FIG. 21 for an STG processor in accordance with the general definition of FIG. 5C.
Figure 35:
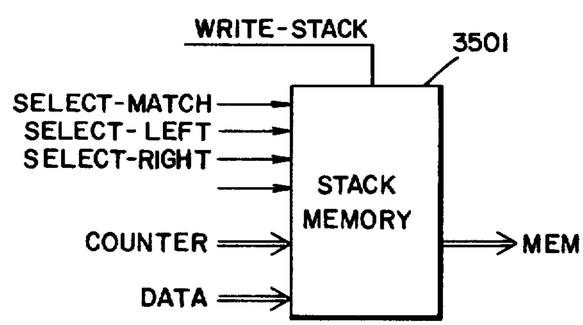
FIG. 35 illustrates the stack memory logic of FIG. 21 for an STG processor, the purpose of which is to store the data of stack structures.

FIG. 34 is the micro-code generator for the STG and consists of four read only memory (ROM) devices, labelled STG ROM 1, 2, 3 and 4. The address for ROM's 1, 2 and 3 are defined by the OPCODE portion of the instruction which forms a five-bit address. At each of the 32 locations in the ROM's is stored a pattern of bits to enable the several micro-functions for a given instruction OPCODE. In the general case, these micro-code enables such as the PUSH and POP signals from STG-ROM 2, 3402 are gated with timing pulses to accomplish a low level register load or counter operation. STG-ROM 4 3404 is used to enable the selection of stacks and counter actions as a function of its address inputs which are enables from ROM's 3401, 3402 and 3403 as well as the current full and empty conditions. For example, the contents of the ROM will disable the counter from decrementing (will not generate the EN (NTR-DOWN signal) if the stack referenced is currently empty even though a pop instruction is being executed which would normally cause the counter to decrement. The coding for these micro-code generator ROM's is given in Appendixes DD-GG.

STG Stack Memory

The computations for the several STG stacks are accomplished using a random access memory (RAM) in conjunction with address counters. In the exemplary STG, data is stored in the stack memory 3501 illustrated in FIG. 35. Data input to the stack memory is taken from the data register. Data output called MEM is used as an input to the STG-MPXR 3303.

At a given instant of time, the address for the stack memory 3501 is formed by a combination of the current counter value and a selection of which of the four stack memory areas are to be used. The stack area selection such as SELECT-MATCH is derived from the address signals A8 and A9 which are generated by micro-code generator ROM's 3403 and 3404.

Stack Pointer Addressing

FIG. 36 illustrates the parts of the stack pointer addressing circuitry which includes the counters for the match, left, right and label stacks. Actually, only one stack address counter 3602 is used in conjunction with a RAM stack pointer memory 3601 in the exemplary STG. This arrangement allows by expansion of the stack pointer memory 3601 the addition of a multiplicity of stacks while having only one stack address counter 3602. The stack pointer memory contains two locations for each stack and the contents of these locations has the format depicted in FIG. 31C and has already been described. Of these two locations, one is called the PTR and indicates the address in the stack memory which currently points to the left or right end of stack data. The other location in the stack pointer memory 3601 for each stack is used for the save value of a pointer for that stack. The LOAD-COUNTER, DOWN-COUNTER and RESET-COUNTER micro-operations are performed for any instruction for which the micro-code generator dictates that these operations are to be executed. The address input to the stack pointer memory 3601 is formed by a combination of the selection of one of the four stacks LEFT, RIGHT, MATCH or LABEL and the selection of PTR or SAVE. This selection is accomplished by the micro-code generator.

FIG. 36 also illustrates FIFO flip-flop 3604 which is used to denote whether the MATCH stack is in LIFO or FIFO mode. The FIFO flip-flop output goes to the micro-code generator and is used to determine the direction of counting for the MATCH stack. For example, if the MATCH stack is in FIFO mode (FIFO flip-flop 3604 is set) then the counter will decrement for a push instruction. This effectively causes reading and writing of the MATCH stack to be accomplished on the same end (memory location) for LIFO mode and opposite ends (different locations) for the FIFO mode.

FIG. 36 also illustrates the LABEL flip-flop 3603 which constitutes a one-bit stack select register. This flip-flop when reset allows selection of the RIGHT stack and allows selection of the LABEL stack when set. This flip-flop may be replaced with a multistage register to allow selection of a multiplicity of stacks.

Stack Conditions Logic

FIG. 37 illustrates the circuitry which determines the full and empty stack conditions. The FULL-COND flip-flop 3704 is reset using pulse P2 for every instruction. The flip-flop may then be set at pulse P6 if the combinationally defined FULL-DATA signal is active which results from the conditions defined in the illustrated Boolean equations. The EMPTY-COND flip-flop 3705 works in a similar manner. The save register 3701, MPXR 3702 and full/empty comparator 3703 operate together to determine if the present count in the stack address counter 3602 constitutes a full or empty condition. The several cases of this operation are as follows.

Case 1: LEFT, RIGHT or LABEL stack selected and a push instruction is being executed.

In this case, the COMP-WORD signals represent a count of 255 and the comparator 3703 compares this word through the MPXR 3702 with the present counter full. If the two words are equal, then the flip-flop 3703 is set, otherwise the full flip-flop is left reset. In either case, the empty flip-flop is left reset since after a push the stack can not be empty.

Case 2: LEFT, RIGHT or LABEL stack pop instruction.

The COMP-WORD represents a count of 0 in this case and is compared to the current count. If the comparator 3703 finds its inputs are equal, then the empty flip-flop is set, otherwise the empty flip-flop is left reset. The full flip-flop is left reset since a stack can not be full after a pop instruction.

Case 3: MATCH stack with a push instruction.

Operates the same as Case 1.

Case 4: MATCH stack is LIFO mode with a pop instruction.

Operates the same as Case 2.

Case 5: MATCH stack in FIFO mode with a pop instruction.

In this case, the save register is loaded with the right end of stack pointer using a save instruction, and the match pointer is cleared to zero. On subsequent pop instructions, the current save register contents are compared to the current counter and if they are equal, the empty flip-flop is set. This allows the data first into the match stack to be read out first.

STG Data Comparison Circuit

For the generalized stack operations which require data in the MATCH stack to be compared to data on the top of another stack, the DATA-COMPARE circuit as illustrated in FIG. 38 is used. This comparator 3801 compares the current output of the stack memory 3501 with the current contents of the data register 3302 and if they are equal, the COMP-COND signal is generated.

The following paragraphs describe each STG instruction in detail.

STG NOP Instruction

The STG NOP instruction performs no operation on the data within the STG and consists only of going through the instruction execution cycle. Timing for this instruction is illustrated in FIG. 39A. The basic sequence of operation is as follows: (1) SEM-RQ-STG signal is received, (2) STG-ACTIVE signal is generated, (3) operation code is loaded into the OPCODE register, (4) the eight clock pulses P0, P1, . . . , P7 are generated, and (5) the STG-ACTIVE signal is dropped at the time in which the P7 signal is generated. The NOP instruction is used to verify that the STG can accept and execute instructions for maintenance purposes.

Clear Instructions

A clear instruction is provided for each stack. The clear instruction resets the pointer value for the stack referenced, resets the FIFO flip-flop, sets the empty condition for that stack and resets the full flip-flop for that stack. Timing for the clear instruction is illustrated in FIG. 39B.

Save Pointer Instructions

A save instruction is provided for each of the stacks. The action of the save instruction is to (1) load the stack address counter 3602 with the current stack pointer from the stack pointer memory 3601, and (2) store the contents of the stack address counter into the save value part of the stack pointer memory.

In the case that the FIFO flip-flop is set and the MATCH save instruction is executed, the save register 3701 is loaded from the counter. Having saved the current address of the top of a stack, the address may later be restored using the restore instruction effectively returning the stack to the state at the time of the save independent of push and pop instructions which may have been executed in between the save and restore instruction.

Restore Pointer Instructions

A restore pointer instruction is provided for each stack. The restore instructions perform the reverse operation of the save instructions. That is, the save value in the stack pointer memory 3601 is read out and stored back into the stack pointer memory at the PTR value location for the referenced stack. After a restore instruction, operations on a stack will proceed in the same manner as if no instructions had been executed since the last save instruction.

Push Data Instruction

A push data instruction is provided for each of the stacks. The purpose of the push instruction is to add the SEM-DATA word portion of the input instruction to the current string of data in the stack, effectively increasing the length of string by one word. As described previously, the push instruction will perform a NOP if the stack is already full. Timing for a push instruction is illustrated in FIG. 39D. The sequence of micro-operations is as follows: (1) the instruction is accepted and the OPCODE loaded into the OPCODE register 3301, (2) on clock pulse PO, the SEM-DATA portion of the input instruction is loaded into the data register 3302, (3) the full and empty flip-flops 3704 and 3705 are reset by pulse P2, (4) the stack address counter 3602 is loaded with the current stack pointer value using clock pulse P3, (5) the address counter 3602 is incremented using timing pulse P4 and the full condition set if the stack is now full, (6) if the FULL-COND signal is not active, then the data from the data register 3302 is written into the stack memory 3501 at the memory address defined by the stack address counter 3602, and (7) the new stack pointer is written into the stack pointer memory 3601 at the pointer value location associated with the reference stack from the stack address counter 3602 and the STG-ACTIVE flip-flop is reset ending the instruction. For the case of push MATCH instruction is FIFO mode, the operation is similar excepting the counter is decremented instead of being incremented.

Pop Data Instructions

A pop instruction is provided for each stack in the STG. The purpose of the pop instruction is to delete a word from the top (current pointer position) of the stack. Timing for the pop instruction is illustrated in FIG. 39B. The sequence of actions is as follows: (1) the instruction is accepted, (2) the full 3704 and empty 3705 flip-flops are reset by pulse P2, (3) the stack address counter 3602 is loaded with the current pointer value from the stack pointer memory 3601 at the time of pulse P3, (4) the stack address counter is decremented using pulse P5, (5) if the stack has now become empty, the empty flip-flop 3705 is set using pulse P6, (6) the new pointer value is written into the stack pointer memory 3601 using time pulse P7. The operation for the case of MATCH stack in FIFO mode is similar with the exception that the counter is incremented.

Pop Data Instructions

A pop instruction is provided for each stack in the STG. The purpose of the pop instruction is to delete a word from the top (current pointer position) of the stack. Timing for the pop instruction is illustrated in FIG. 39E. The sequence of actions is as follows: (1) the instruction is accepted, (2) the full 3704 and empty 3705 flip-flops are reset by pulse P2, (3) the stack address counter 3602 is loaded with the current pointer value from the stack pointer memory 3601 at the time of pulse P3, (4) the stack address counter is decremented using pulse P5, (5) if the stack has now become empty, the empty flip-flop 3705 is set using pulse P6, (6) the new pointer value is written into the stack pointer memory 3601 using timing pulse P7. The operation for the case of MATCH stack in FIFO mode is similar with the exception that the counter is incremented.

String Length Instructions

A length instruction is provided for each stack and allows a one word data output which defines the number of words currently in that stack. The timing is illustrated in FIG. 39F and the sequence of actions is as follows: (1) the instruction is accepted, (2) the stack address counter 3602 is loaded from the stack pointer memory 3601, (3) the stack address counter 3602 content is loaded into the data register 3302.

Reset Instruction

The reset instruction resets the FIFO 3602 and LABEL 3604 flip-flops as values. The micro-code generator 3403 for this instruction activates the USE-LABEL and FIFO-LIFO signals. Upon the occurrence of pulse P2, the D-type flip-flops are loaded with the logic "0" VALUE signal effecting the reset of the flip-flops.

Load Data Instruction

The load instruction is used to load the SEM-DATA part of the instruction into the data register 3302. This allows an external data word to be compared to the last word read from a stack, the value of which is represented by the MEM signal input to the data comparator 3801.

FIFO/LIFO Instructions

The FIFO and LIFO instructions are used to set and reset the MFO 3604 flip-flop. Compare Data Instruction The compare instruction allows the SEM-DATA portion of the instruction to be compared with the top word in the MATCH stack. The timing is illustrated in FIG. 39H. The instruction has the following sequence of operations: (1) the instruction is accepted, (2) the data register 3302 is loaded with the SEM-DATA word part of the input instruction, (3) the MATCH pointer value is loaded into the stack address counter 3602 allowing the top MATCH stack word to be read out of the stack memory 3501, and (4) allowing that word to be compared to the input word through the data comparator 3801.

Use Instructions

The use instructions allow the selection of the RIGHT or LABEL stacks for manipulation. For the case of two stacks, two instructions are provided: the USE-RIGHT instruction and the USE-LABEL instruction. The action of these instructions is to reset and set the LABEL 3603 flip-flop respectively.

Any Instruction

For a particular implementation, an extra data bit may be provided for the MATCH stack memory. This bit may be written into by the any instruction in a manner similar to the push instruction. On a later compare instruction, the COMP-COND signal will be true independently of the data values if this bit is set. This capability allows masked string comparison.

Push Immediate Instructions

The push immediate instructions perform the same function as a push instruction with the exception that the current data register 3302 contents are used instead of the SEM-DATA part of the instruction. The push immediate instructions allow a one-word move operation from one stack to another to be accomplished by using a two-instruction sequence consisting of a pop instruction followed by a push immediate instruction.

Read Instructions

A read instruction is provided for each stack. The read instruction takes the current top word of a stack from the stack memory 3501 and loads that word into the data register 3302. The full 3704 and empty 3705 flip-flops are set or reset in correspondence with the current status of the stack so that the read instruction may be used as a test for these conditions.

An explanation of the implementation of the generalized (multistack, multicharacter) operation is given in the description of the SEM processor. Devices used to construct the example STG are listed in Appendix HH.

SEM

Figure 29:
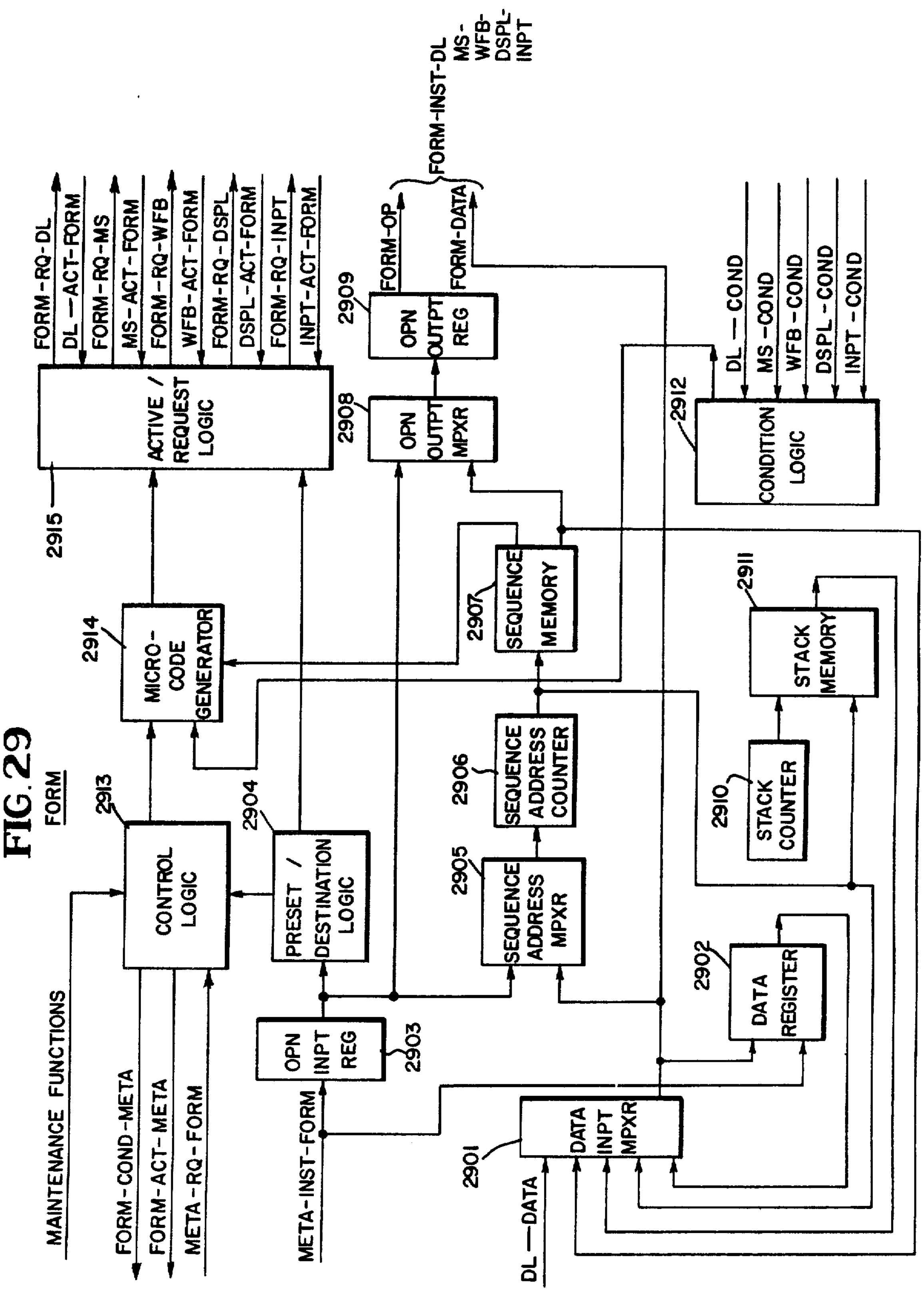
FIG. 29 is a block diagram of an implementation of the FORM control processor of FIGS. 4A and 4B, the purpose of which is to format the data for disk storage and to control the WFB, MS, DL, DSPL and OIU processors.

The SEM processor is a control processor which takes instructions from the META and issues a sequence of instructions to the NUM or to the STG or to both. In this manner, a desired operation which is of great complexity is broken down into individual steps which are executable as instructions in the STG or NUM or both. The construction of the SEM as shown in FIG. 29 is similar to the METAPROCESSOR except that a fewer number of self instructions are implemented and there is no compare and classify circuitry. For this reason, only a general description of the SEM is given here.

Figure 22:
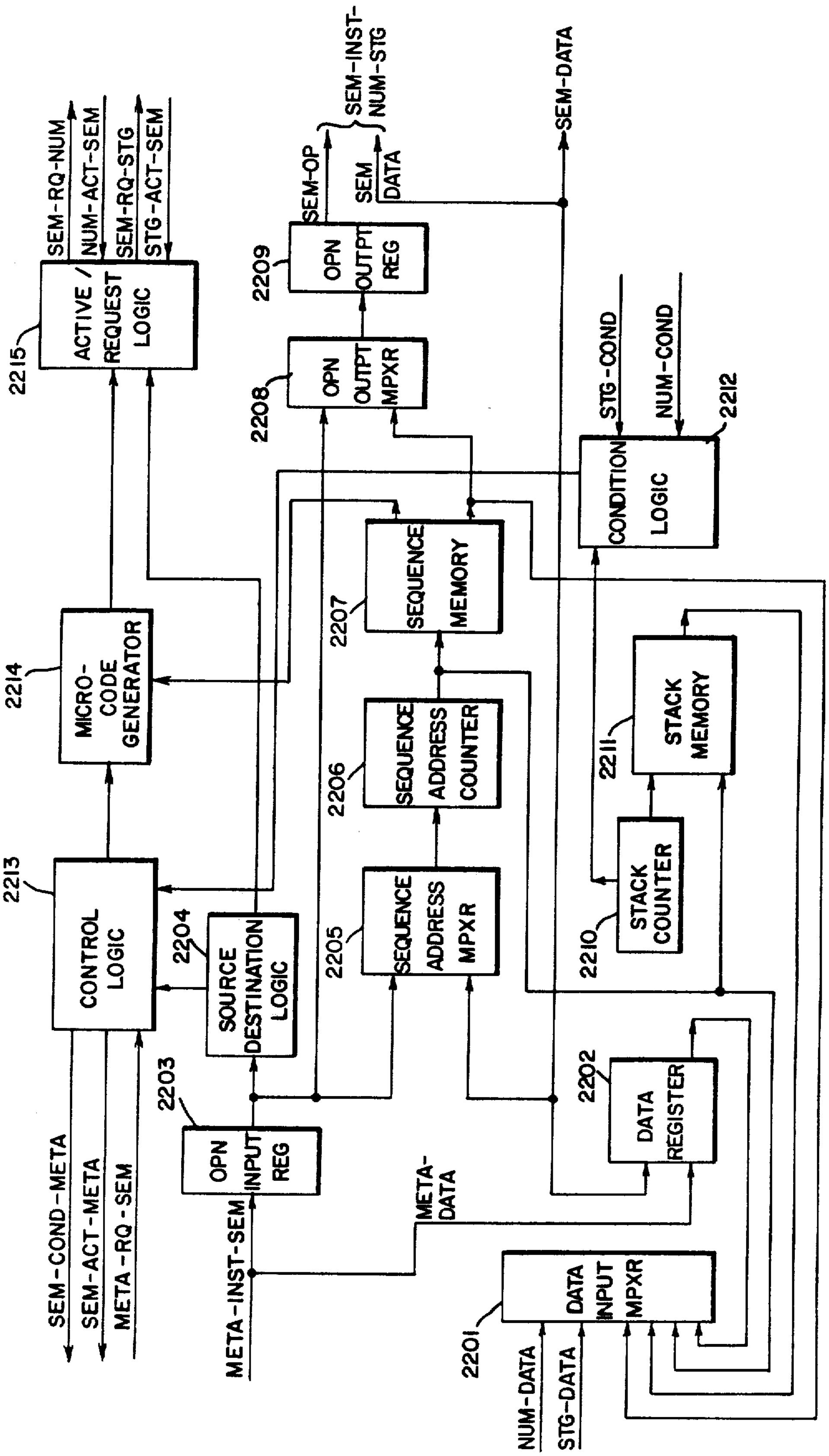
FIG. 22 is a block diagram of an implementation of the SEM control processor of FIGS. 4A and 4B, the purpose of which is to control the NUM and STG processors and translate higher level instructions from the META processor into sequences of lower level NUM and STG instructions.

FIG. 22 is a block diagram of the processor. The elements have the following functions. The data input multiplexer 2201 provides the data movement capability from the various external and internal sources onto a central bus for redistribution. This central bus forms the data portion of the SEM instruction. The data input register 2202 receives the data portion of the META instruction and receives and holds data received from and passed out to other processors. The operation input register 2203 holds the OPCODE received from the META for decoding by the source/destination logic 2204. The source/destination logic 2204 determines if the received code is to be passed directly out as a part of a FORM instruction, or if the code is to initiate a translation sequence. The control logic 2213 and active/request logic 2215 are informed accordingly. The sequence address multiplexer 2205 provides a means for the sequence address counter 2206 to be loaded from the data bus during jumps and subroutine returns; and from the operation input register 2203 during translation sequence preset. The sequence address counter 2206 drives the sequence memory 2207 and may be loaded or counter up. The sequence memory 2207 is used to program translation sequences. Its outputs are divided into two fields, control and data. The control field contains a self-code which, through the control logic 2213 and the micro-code generator 2214, controls all the other components in the processor. The data field contains OPCODES to be passed out as well as sequence addresses for jumps and subroutine calls. The operation out multiplexer 2208 allows loading of the operation out register 2209 from the operation input register 2203 for direct passed codes or from sequence memory 2207 for translation sequence codes. The operation out register 2209 holds the OPCODE portion of SEM instructions. The stack counter 2210 and the stack memory 2211 are used to implement the subroutine function. When a sub-routine is called, the stack counter 2210 is incremented and the stack memory 2211 is loaded from the sequence address counter 2206. On the return, the sequence address counter 2206 is loaded from stack memory 2211 and the stack counter 2210 is decremented. The condition logic 2212 allows the processor to execute conditional sequences based on the condition indicator of other processors. The micro-code generator 2214 decodes the sequence memory self-codes into the necessary signals and timing terms to control the other components in the processor. It also receives inputs from the control logic 2213 and condition logic 2213 which are necessary to complete generation of the component control signals. The control logic 2213 provides overall control of the actions taking place in the processor. When a META request is received, the control logic loads the operation code and data registers and raises the SEM active signal to the META. With the aid of the source/destination logic, the control logic starts a direct pass or a translation sequence depending on the code received. The active/request logic 2215 may be directed by the micro-code generator 2214 or by the source/destination logic 2204. When the SEM passes out an instruction, this logic raises a request to the appropriate processor and holds the request until the processor raises an active signal.

As an example of typical operation of SEM, consider the MOVE operation described in the preceding paragraphs. In particular, take the case of a move from LEFT STACK MEMORY to RIGHT STACK MEMORY of FIG. 21. Previous instructions must have already loaded up the match stack with the match string as shown in FIG. 21. Upon reception of the move-right instruction which is accepted by SEM in the manner already described, instructions are issued from the sequence memory to the STG, causing the values of the LEFT and RIGHT stacks to be saved. Now a move one character left-to-right sequence is issued to the STG. This sequence consists of three instructions: (1) READL, (2) PUSHRI, and (3) POPL, which are sent to STG. During this sequence, the character is compared to the first character in the match stack. If these characters compare as determined by the SEM monitoring the condition line from STG (signal STG-COND) the operation proceeds as described under Step 2 below. Otherwise the operation proceeds as described under Step 1 below.

Step 1: Another move one character sequence is executed by STG by command of the SEM. If the match stack character compares operation continues as under Step 2. If at any point the LEFT stack becomes empty as indicated by the empty condition, then instructions are issued to restore the original stack contents, the SEM-COND signal is generated notifying the META that the operation failed and the SEM-ACTIVE-META signal is dropped.

Step 2: Another move one character sequence is executed and the next match stack character is compared to it. If this comparison is valid, Step 2 is repeated, otherwise Step 1 above is executed. During this step, which uses several instructions for its completion, if the match stack becomes empty, then the proper string has been found. The SEM drops the SEM-ACTIVE-META signal completing the instruction execution in the SEM. The other instructions executable by the SEM proceed in a manner similar to the above discussion. A complete listing of SEM self-instructions is given in Appendix II and the PROM's used to implement the instruction sequences are defined in detail in Appendixes JJ, KK and LL.

PMEM

The Program Memory Processor (PMEM) is a data processor which provides RAM (Random Access Memory) storage for a program currently being executed and additional RAM storage for a table of specific addressable points in this executing program. This processor also performs addressing functions for both memory arrays. PMEM interfaces with the META-PROCESSOR in that PMEM makes availale the next character to be interpreted when the META indicates that another character is needed.

The Program Memory Processor (PMEM), shown in FIG. 23, comprises an instruction register which is in the nature of an operation input register 2302 and a data input register 2304. The operation code is decoded by a micro-code generator 2303 to determine if the operation code is intended for execution by PMEM and, if this is the case, generates the appropriate "enables" signal to other subunits of PMEM which are required for the execution of that instruction. The control logic circuit 2301 recognizes the META-PROCESSOR's request of PMEM, checks that the operation code sent is valid and provides feedback via the program memory active signal (PMEM-ACT-META) and the condition line (PMEM-CONT-META). In addition, the control logic 2301 provides the sequence of timing control signals to the other subunits of the program memory processor.

The program memory counter 2305 provides the address of the location where the instruction to be executed can be found in the PMEM memory array 2306. If the program memory counter 2305 at any time generates a count greater than the size of the memory array (indicating that the processor is trying to locate instructions that do not exist), PMEN notifies the META of this condition via the program memory error (PMEM ERROR) line. If a specific program memory address is to be stored for later reference, then it is stored in the PMEM stack memory 2308. The stack memory 2308 is employed as a first-in, first-out (or a "push-down") memory device where the address of the next possible storage location (for the stack memory) is kept in the stack counter 2307. Thus, if a program memory address is to be saved, it is stored in the stack memory at the current address value found in the stack counter. The stack counter contents are incremented so that the stack will hold the address of the location when the next program memory address is to be stored. Only the last saved program memory address or the "top of the stack" is in the stack memory, that is, the "last-one" stored, can be referenced. In this case, the contents of the stack counter are decremented and the program memory address which is stored at the location referenced by the contents of the stack counter is placed in the program counter. The decrementing of the stack counter uncovers a new "top of the stack" or "last-one" stored program memory address. If PMEM attempts to save more program memory addresses in the PMEM stack memory than there is available area, the stack counter notifies META via the program memory overflow (PMEM OVERFLOW) line. Likewise, if the processor attempts the recall more program memory addresses than were stored in PMEM stack memory, META is signaled of this condition via the program memory end line (PMEM-END).

The data input register 2304 contains any data that may be required for a specific operation code. There are two types of information which the data input register would contain: (1) addresses to be loaded into either the program memory 2305 or the stack counter 2307 and (2) data to be stored in the PMEM memory array, that is loading PMEM memory array with a set of instructions of a lesson plan which will shortly be executed. The data output multiplexer 2309 provides a means of accessing the outputs of several subunits of the processor. In typical operation, the data output multiplexer gates the output of the PMEM memory array 2306 (which is the next instruction to be executed) and places this information of the program memory data output line (PMEM-DATA) so that the information is available to other processors. However, for maintenance work, the content value of the stack counter 2307, the program memory address stored at the specific location in PMEM stack memory 2308 or the current value of the program memory counter 2305 can be switched onto the program memory data lines.

The PMEM operations are straight forward. Instructions such as load program memory counter, save program memory counter or read program memory are typical. The normal sequence for loading in the next lesson portion to be executed is to initialize the program memory counter 2305, then load into the program memory array 2306 data in the data input register 2304, increment the program memory counter 2305, and do another load into program memory 2306. This sequence continues until the PMEM-ERROR lines are activated, at which time the program memory counter is again initialized. Now PMEM is requested to read the program memory array, so that execution of this new lesson can begin.

For sequencing through a set of characters a number of times, first a designated program memory counter value is stored, in the stack memory 2308 and then recalled later. A typical sequence of instructions for this looping would be first to load to stack memory 2308 with the value from the program memory counter 2305, and then increment the stack counter 2307. The program memory counter 2305 is incremented and execution then continues until the end of the set of instructions in the lesson has been reached. If that sequence is to be repeated, then the stack counter is decremented and the value found in stack memory 2308 at that location is pushed into the program memory counter 2305, and the stack counter 2308 is again incremented. The character located in PMEM memory array 2306 addressed by the new value of the program counter is the next character of the lesson to be executed. If that sequence of instructions is not to be executed again, then the stack counter 2307 is decremented. The implementation of PMEM is identical to the SYM processor described later in greater detail and this detailed description is not repeated here.

META

Figure 24:
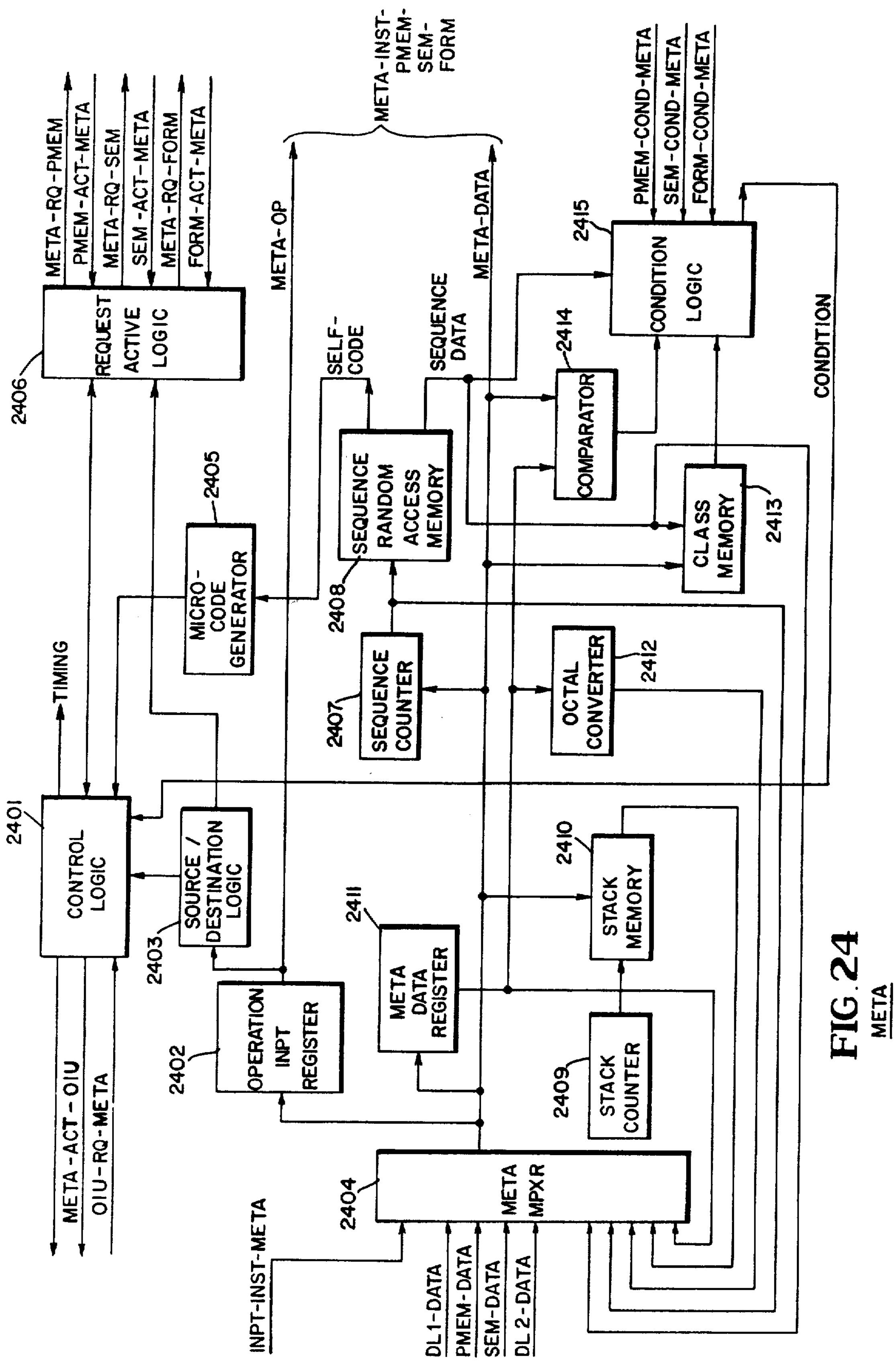
FIG. 24 is a block diagram of an implementation of the META control processor of FIGS. 4A and 4B, said META (also called METAPROCESSOR) itself constituting a new concept in interpreting high level language programs.

The METAPROCESSOR (META) shown in FIG. 24 is a control processor (CP) which stores the grammar of the programming language used with the training system and performs the interpretation of the lesson program stored in the program memory processor (PMEM). As the principal control processor of the program execution subsystem, the META receives control arc inputs from the inputs processing subsystem and sends control arcs to the mass data transfer subsystem, the PMEM, and SEM.

The META receives a control arc from the OIU processor and sends control arcs to the PMEM, semantics processor (SEM), and the format processor (FORM). The META receives data from the OIU, PMEM, SEM, and FORM processors and sends data to the FORM, PMEM, and SEM.

FIG. 24 further shows the control logic 2401 which directs all of the activity of the META. The control logic operates the control interface with the OIU processor, controls the request/active logic 2406 and generates timing for other logic in the META, based on input signals from the source/destination detector 2403, the condition logic 2415 and the micro-code generator 2405.

The operation code register 2402 is used to hold the OPCODE portion of the INPT instruction when the META goes active, and is also used to hold the OPCODE portion of the META instruction sent to the FORM, SEM and PMEM. The operation code register 2402 is loaded through the META multiplexer 2404 from either the INPT instruction or the sequence random access memory (sequence RAM) 2408. The contents of the operation code register 2402 are decoded by the source/destination detector 2403, which for input OPCODES (OIU) classifies them into direct and sequence OPCODE classes, and for both input and output OPCODES (from sequence RAM 2408) determines the proper destination of the OPCODE, whether PMEM, SEM, FORM or self (META). Input OPCODES in the direct class are those which are to be passed directly through the META to the PMEM, SEM or FORM processor. Input OPCODES in the sequence class are those which are executed by the META. All output OPCODES are in the direct class. The source/destination ROM 2403 provides direct/sequence class information to the control logic 2401, and provides destination information to the request/active logic 2406.

The request/active logic 2406 controls the control interface request and active lines to the PMEM, SEM and FORM under the direction of the control logic 2401 and the source/destination ROM 2403.

The META multiplexer 2404 selects the data source for the META data bus. The multiplexer inputs include the OIU instruction, PMEM data, SEM data, FORM data, the stack memory 2410, the sequence counter 2407, the octal converter 2412, and the META data register 2411. The META data bus in turn supplies data to the operation input register 2402, the stack memory 2410, the sequence counter 2407, the octal converter 2412, the META data register 2411, the sequence RAM 2408, the class memory 2413, the comparator 2414, and four other processors as explained above. Mutiplexer 2404 selection is provided by the control logic 2401.

The sequence counter 2407 provides an address for the sequence RAM 2408. The sequence counter 2407 can be loaded through the META multiplexer 2404 from the sequence RAM 2408 for implementing jump or all self-codes (see below) and from the stack memory 2410 for implementing return self-codes. The counter 2407 is normally incremented when the META is running through a sequence from sequence RAM 2408.

The sequence RAM 2408 is used to store self-code sequences which define the grammar used to interpret lesson programs in PMEM. The sequence RAM 2408 is addressed by the sequence counter 2407, can be loaded from a data source through the META multiplexer 2404, and supplies self-codes to the micro-code generator 2405 and sequence data to the META multiplexer 2404, the class memory 2413 and the condition logic 2415. The self-codes define the operations that are performed at each step in a sequence in the memory 2408.

The sequence data is used as a data source or as a self-code modification field.

The micro-code generator 2405 decodes the self-code from the sequence RAM 2408 into enable signals for the control logic 2401. These enable signals direct the action of the timing signals provided by the control logic 2401.

The META data register 2411 is used to store input data from the META multiplexer 2404. A common usage is that of holding PMEM-DATA characters for processing.

The stack counter 2409 and the stack memory 2410 form an address stack for use with the call, push and return self-codes (explained below). The stack memory 2410 is a random access memory (RAM) addressed by the stack counter 2409, and which can be written into from the sequence counter 2407 for call self-codes, and from the sequence RAM for push self-codes. The stack memory 2410 output can be loaded into the sequence counter 2407 for return self-codes. The stack counter 2407 can be incremented and decremented to provide the push and pop stack operations.

The octal converter 2412 can convert three ASCII octal characters into one 8-bit data word, and can reverse the process, using the META multiplexer 2404 to select both the source and the destination of the conversion.

The class memory 2413 is used to classify characters on the META-DATA but into different classes, such as a digit or a capital letter, with the class specified by the sequence data from sequence RAM 2408. This class memory 2413 is a read only memory (ROM) which is addressed by the META-DATA bus and sequence data from the sequence RAM 2408. The ROM 2413 contains the character class definitions. An output of the class memory 2413 called class goes to the condition logic 2415.

The comparator 2414 is a combinatorial logic circuit which makes a numerical equal comparison between the META data register 2411 contents and a data source selected by the META multiplexer 2404. The result of this comparison is sent to the condition logic 2415.

The condition logic 2415 selects a particular condition from the set of external conditions, SEM-COND, FORM-COND and PMEM-COND, and internal conditions, class memory 2413, comparator 2414, and settable flags within the condition logic 2415, to send a net condition true signal to the control logic 2401. The condition selected is specified by the sequence data from the sequence RAM 2408. The control logic 2401 uses the condition signal input to determine the resulting actions for conditional skip self-codes, and to set the META-COND-INPT line.

The general operation of the METAPROCESSOR is as follows. Starting from the quiescent state in which the META is not active, the presence of INPT-RQ-META causes the control logic 2401 to emit timing signals which load the operation code register 2402 with the INPT instruction, load the META data register 2411 with DL-1-DATA, and subsequently to raise the META-ACT-INPT signal. The OPCODE is then divided into the direct or sequence class by the source/destination logic 2403. For direct OPCODES, the OPCODE is passed out to either the PMEM, SEM or FORM processor depending on the destination code, by the request/active logic 2406, and then the META active line is lowered and the META returns to the quiescent state. For sequence OPCODES, the source/destination logic 2403 further divides the input OPCODE into run, or load OPCODES. The lead OPCODE causes the writing of the sequence RAM 2408 from the just loaded contents of the META data register 2411. This OPCODE is used to store a new lesson grammar sequence into the sequence RAM 2408 and is used for initial system bootstrap. The run OPCODE is issued from the INPT processor with operator input data, and causes the initiation of self-code execution from the sequence RAM 2408 without modifying the sequence counter 2407 value.

Self-codes are decoded by the micro-code generator 2405 which feeds enable signals to the control logic 2401 which in turn directs the self-code execution. Execution of self-codes continues until the half self-code is executed, which causes the META active to lower and returns the META to the quiescent state.

There are ten classes of META self-codes: pass, load, jump, call, return, push, skip, set flag, convert and halt. Except for jump, call and return, each self-code causes the sequence counter to increment by one so that self-codes are executed sequentially. The pass self-code causes the sequence data from the sequence RAM 2408 to be loaded into the operation code register 2402, and that OPCODE to be passed out to the PMEM, SEM or FORM by the request/active logic 2406. The load self-code causes the META data register 2411 to be loaded from a data source specified by the sequence data which in this case selects the META multiplexer 2404 directly. The jump self-code causes the sequence data to be loaded into the sequence counter 2407 and the next self-code will be read from the sequence RAM 2408 at that location.

The call self-code causes the stack counter 2409 to be incremented, the sequence counter 2407 contents plus one to be stored in the stack memory 2410, and then the sequence data is loaded into the sequence counter 2407. The old sequence counter 2407 value is saved in the stack memory 2410. The return self-code causes the stack memory 2410 contents to be loaded back into the sequence counter 2407, returning the counter to its saved value, and then decrements the stack counter 2409. The push self-code causes the stack counter 2409 to be incremented and the sequence data to be stored in the stack memory 2410. The skip self-code causes the next self-code in sequence RAM 2408 to be skipped over if a condition specified by the sequence data is satisfied. The skip action is achieved by double incrementing the sequence counter 2407. The convert self-codes cause the octal converter 2412 to perform the desired conversion operation. Finally, the halt self-code causes the META active to lower and returns the META to the quiescent state.

These self-codes combined with appropriate sequence data make up the "program" which runs in the META upon its receipt of a run OPCODE. This sequence RAM 2408 "program" defines the lesson grammar used for interpreting PMEM lesson programs and INPT inputs. The following paragraphs describe the detailed implementation of an exemplary METAPROCESSOR.

Figure 40:
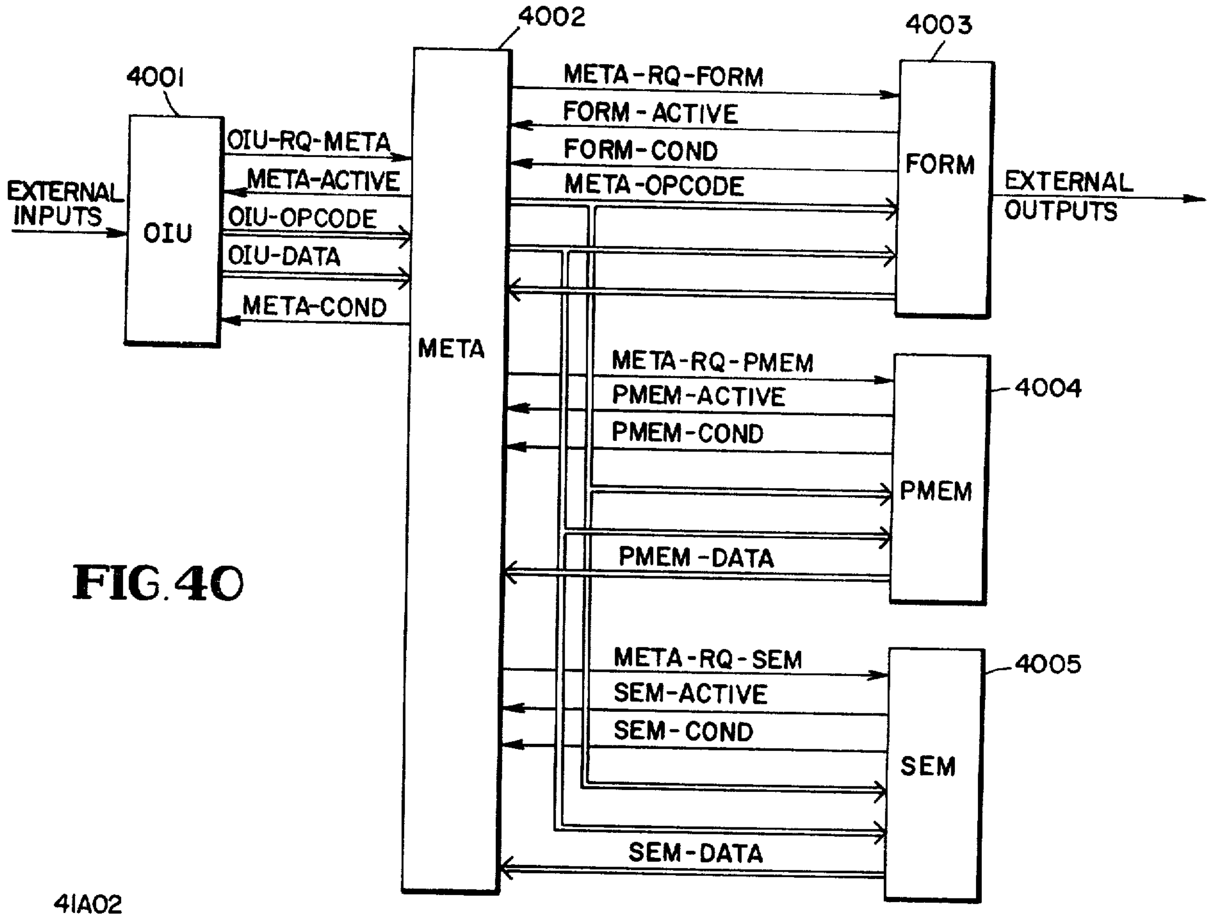
FIG. 40 illustrates the block diagram of the interconnection of the METAPROCESSOR or META processor with other processors in the exemplary training system, and represents a portion of FIG. 4B.

FIG. 40 illustrates the interfaces between a METAPROCESSOR 4002 with other elements in a typical system such as in the exemplary training system and output interface units 4001 and subordinate processing elements such as the FORM processor 4003, program memory processor 4004 and semantics processor 4005. The signal interfaces between these processing elements as shown on the FIGURE are basically a set of signals defined previously as control arc between the processing element in a network. For example, the connection between the OIU 4001 and METAPROCESSOR 4002 constitute a control arc input to the METAPROCESSOR. In a similar manner, the signals interchanged between the METAPROCESSOR and the FORM processor 4003 constitute a control arc output from META to FORM. Similarly, the signals to the PMEM constitute a control arc output from META, and similarly the signals between the META and the SEM 4005 constitute a control arc from META to SEM. These are the signals required in an exemplary system using the METAPROCESSOR for communication. In a different application, the METAPROCESSOR may have control arc outputs to more than the three processors illustrated in FIG. 40 or may have control arc outputs to only one processing element besides the META but in any case requires the control arc output to at least one other processing element to a system and a control arc input from at least one other control processor in the system for a useful application of the METAPROCESSOR.

Figure 41A:
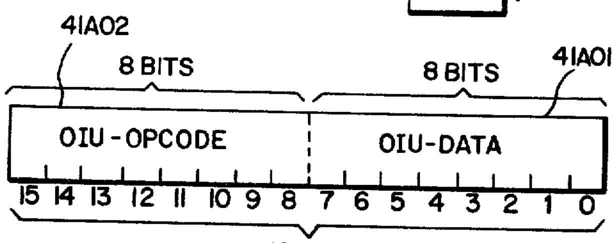
FIG. 41A illustrates the format of the instruction input to a METAPROCESSOR from the OIU processor over lines illustrated in FIG. 40 comprising opcode and data information.
Figure 41C:
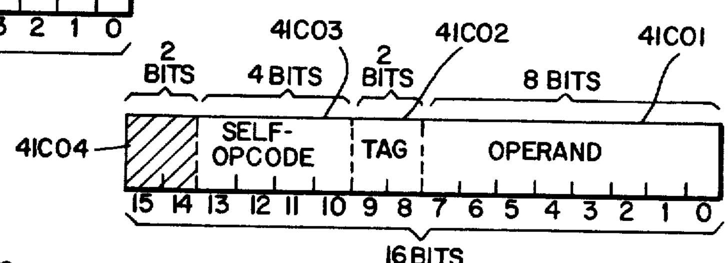
FIG. 41C illustrates the format of the self-instructions in a METAPROCESSOR for controlling operations internal to the METAPROCESSOR.
Figure 41B:
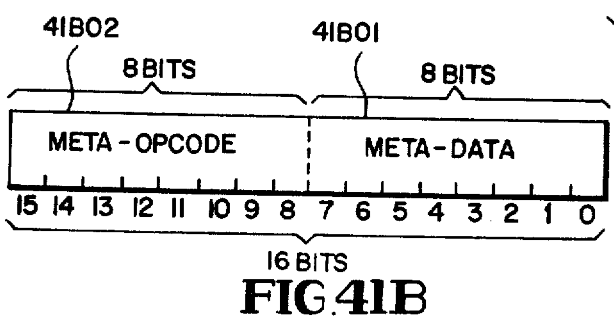
FIG. 41B illustrates the format of the instruction output from a METAPROCESSOR to one of the processors FORM, PMEM or SEM, each instruction comprising the META-OPCODE and META-DATA signals of FIG. 40.
Figure 41D:
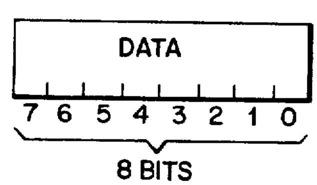
FIG. 41D illustrates the format of the data used internal to a METAPROCESSOR.

FIG. 41A illustrates the format of instruction accepted by a METAPROCESSOR from the OIU. The instruction input which flows over the control arc input lines is a 16-bit word consisting of two parts. In the first part, the bits labeled 8, 9, etc., through 15 constitute the 8-bit OPCODE from the OIU. In the second case, the bits labeled 0, 1 through 7 constitute the data portion of the OIU input instruction. This 16-bit word is received and loaded into the OPCODE and DATA input registers in the METAPROCESSOR during the instruction acceptance cycle that has been described previously. To initiate the actions of operations in subordinate processing elements, the METAPROCESSOR generates output instructions over an output control arc. The format of an output instruction is similar to the input instruction format and is illustrated in FIG. 41B. The output instruction consists of two fields, the upper 8-bits of which are the META-OP-CODE output and the lower 8-bits of which are the META-DATA output. Internal to the METAPROCESSOR, the control logic and the sequence logic within a METAPROCESSOR operate by way of executing a sequence of instructions which are called self instructions. To implement a particular grammar and thus to be able to interpret a high level language, a programmer develops such a sequence of self instructions which in the exemplary METAPROCESSOR case has 16 major instruction types. The format of these self instructions is illustrated in FIG. 41C. In this case, a 16-bit word is used and stored in a sequence memory for read out and subsequent execution internally to the METAPROCESSOR. The self instruction, however, uses only 14 bits of the 16-bit word. Of these 14 bits, the lower 8 bits are referred to as the OPERAND portion of the instruction. The next 2 bits are called the TAG portion of the instruction and finally the upper 4 bits are referred to as the SELF-OPCODE. The SELF-OPCODE selects one of the sixteen major instruction types, each of these instruction types may be modified for execution by the two-bit TAG portion and finally the OPERAND portion of the instruction supplies meaningful information used for particular SELF-OPCODES. For example, in different SELF-OPCODE cases, the OPERAND is used as data to be sent out as a data portion of an instruction or as an operation code to be sent out as a META-OPCODE of an instruction or as a multiplexer address to be used when reading data into the METAPROCESSOR and several other applications to be illustrated in the following paragraphs. Within the METAPROCESSOR, data is transferred between several logic devices in the form of 8-bit data words as illustrated in FIG. 41D. In the following paragraphs, the detailed implementation of each of the circuit blocks illustrated previously on the METAPROCESSOR block diagram is described in detail. Devices used to implement an example META are listed in Appendix BB.

Figure 42:
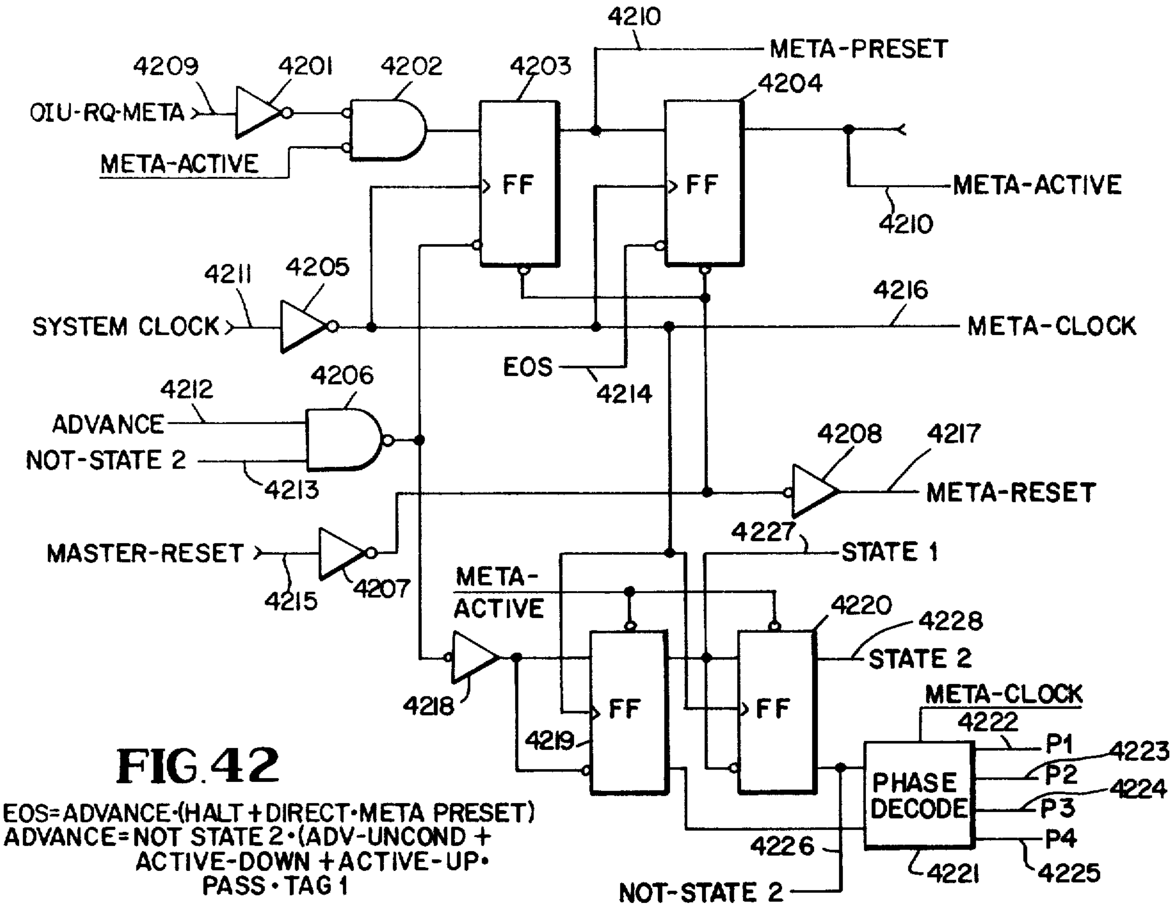
FIG. 42 is a detailed implementation of the control logic 2401 of FIG. 24 for a METAPROCESSOR, the purpose of which is to generate timing signals for carrying out of operations within a METAPROCESSOR.

FIG. 42 illustrates an exemplary implementation of the control logic portion of the METAPROCESSOR. The control logic as described previously consists of the preset and active flip-flops which are necessary in the sequence of events in accepting instructions and also of the flip-flops called STATE1 4219 and STATE2 4220 which are used for generating the clock pulses necessary for the execution of self instructions. The two flip-flops STATE1 and STATE2 in fact constitute a two-bit counter which drives the phase decode element 4221. In combination with a certain setting of the STATE1 and STATE2 flip-flops and the occurrence of a META clock pulse, this causes the generation of four clock pulses called P1, P2, P3 and P4 which occur in that order. For a complete operation of the METAPROCESSOR, each execution of a self instruction requires the sequence P1, P2, P3 and P4 and then on the next instruction read out of the sequence memory that sequence of signals is generated again. Thus, the METAPROCESSOR sequentially generates these clock pulses in a cyclic manner until such time as the HALT self instruction is executed which generates the end of sequence signal and thus causes the ACTIVE flip-flop 4204 to be reset. The master reset signal causes inverter element 4207 to be activated which resets the PRESET and ACTIVE flip-flops 4203, 4204 and thus puts the METAPROCESSOR in a state in which it can accept instructions. This master reset function is performed by external push button on other device to allow use of the METAPROCESSOR for useful processing of data. Normally, the master reset signal is generated during the sequence of operations for turning on the power to an equipment using a METAPROCESSOR. When the META-ACTIVE signal is low, that is the META-ACTIVE flip-flop is reset, this signal causes the STATE1 and STATE2 flip-flops to be in a set state and remain in that set state so that only the pulse P1 is generated. This keeps the self instructions from being executed when the METAPROCESSOR is not active. After the METAPROCESSOR becomes active upon the reception of instruction, the STATE1 and STATE2 flip-flops are allowed to set and reset as a function of its input signals and thus generate the clock phases so its self instructions can be executed.

Figure 43:
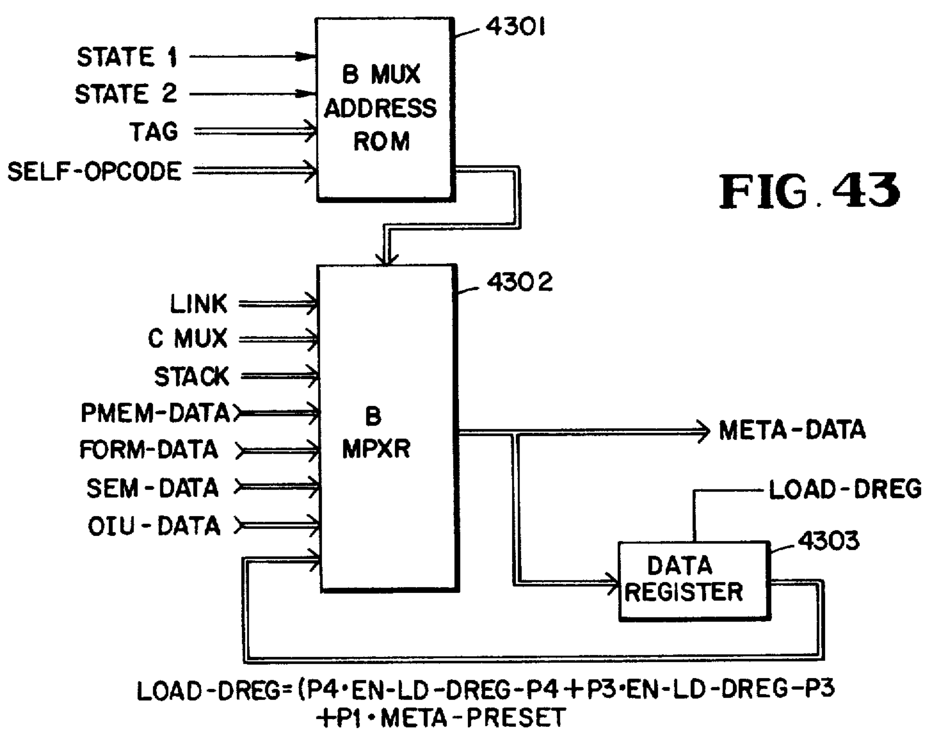
FIG. 43 illustrates the detailed data flow portion of FIG. 24 to the data register in a METAPROCESSOR.

FIG. 43 illustrates an exemplary implementation of the multiplexer B and data register within the METAPROCESSOR. The circuit consists of a read-only memory device 4301 (defined in detail in Appendix R), a multiplexer device 4302 and a data register 4303. The address read-only memory 4301 has inputs from STATE flip-flops, the TAG portion of the instruction, the SELF-OP portion of instruction currently being executed so that it can define the appropriate address for the B multiplexer as a function of the position and time of execution of an instruction and the data requirements for that instruction. The B multiplexer 4302 has inputs from external data, from the program memory processor, the FORM processor, the SEM processor, and the OIU processor. In addition, the B multiplexer has inputs from internal data registers within the METAPROCESSOR constituting of the link register, an input from the C multiplexer portion of the METAPROCESSOR and an input from the stack memory. The B multiplexer output is used as the META-DATA which is used internal to the METAPROCESSOR and also is used as the META-DATA portion of instruction being sent out of the METAPROCESSOR. When loaded into the data register 4303, the data may be read back to the B multiplexer 4302. When the METAPROCESSOR is not active, the read-only memory 4301 which has STATE inputs STATE1 and STATE2 causes the B multiplexer to have on its output lines the current value in the data register. In this manner, with the METAPROCESSOR inactive, the current data in the data register is accessible by other processors in the system.

Figure 44:
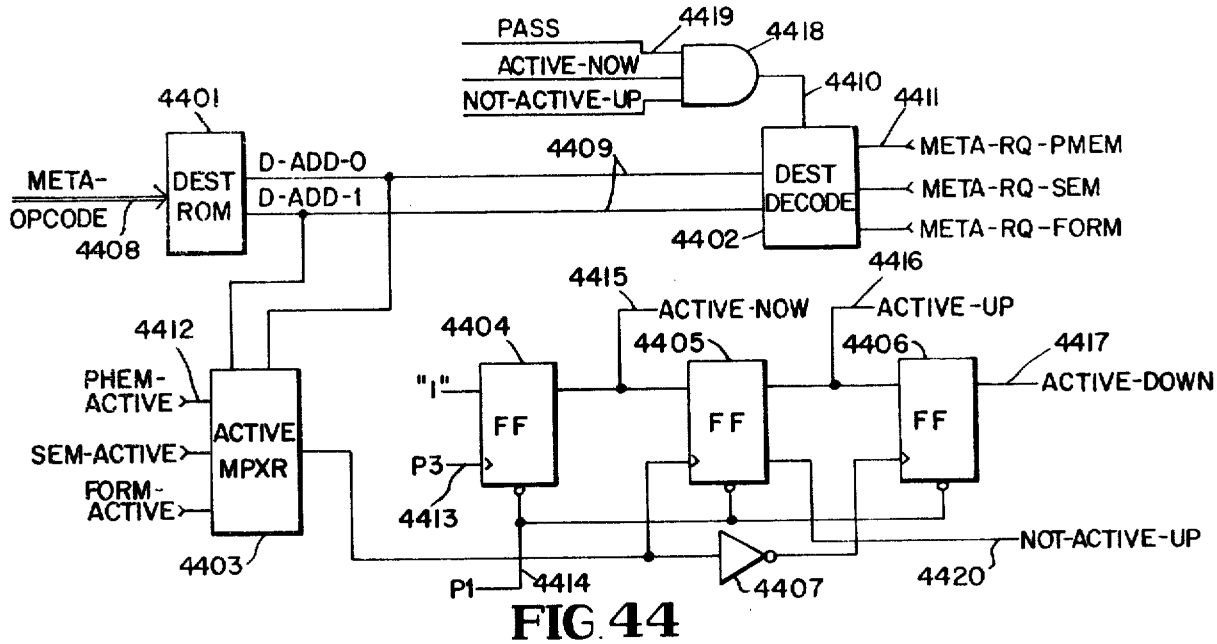
FIG. 44 is a detailed implementation of the control arc transmit logic of FIG. 24 in a METAPROCESSOR in accordance with the general scheme of FIG. 5J.

FIG. 44 illustrates an exemplary implementation of the control arc output generation logic. This logic consists of the destination decode element 4402 and flip-flops 4404 active now, the active up flip-flop 4405 and the active flip-flop 4406. In addition, the circuit uses the active multiplexer 4403 to allow the reception of the proper active signal from a processing element for which the METAPROCESSOR requires data instruction execution. The address for the decoder which selects the proper request line and the active multiplexer address input is supplied by the destination read-out memory 4401 (defined in Appendix U). The destination read-only memory has as its address input the METAOPCODE signals which are to be sent out as part of the instruction. The destination read-only memory is programmed in such a manner than an instruction intended for a particular processing element external to the METAPROCESSOR is denoted by a special code of the address lines. Thus, for example, the OPCODES sent out by the METAPROCESSOR are unique for each of the processing elements to receive those instructions. In this manner, a simple mapping by way of the destination read-only memory allows selection of the proper output processing element without the self instruction having to define completely which processing element the instruction is to be sent. The programming of the destination read-only memory 4401 in the exemplary implementation of the METAPROCESSOR is given in Appendix U. The detailed description of the operation of this circuit for generating and controlling the sending out of instructions to a processing element over a control arc has already been described.

Figure 45:
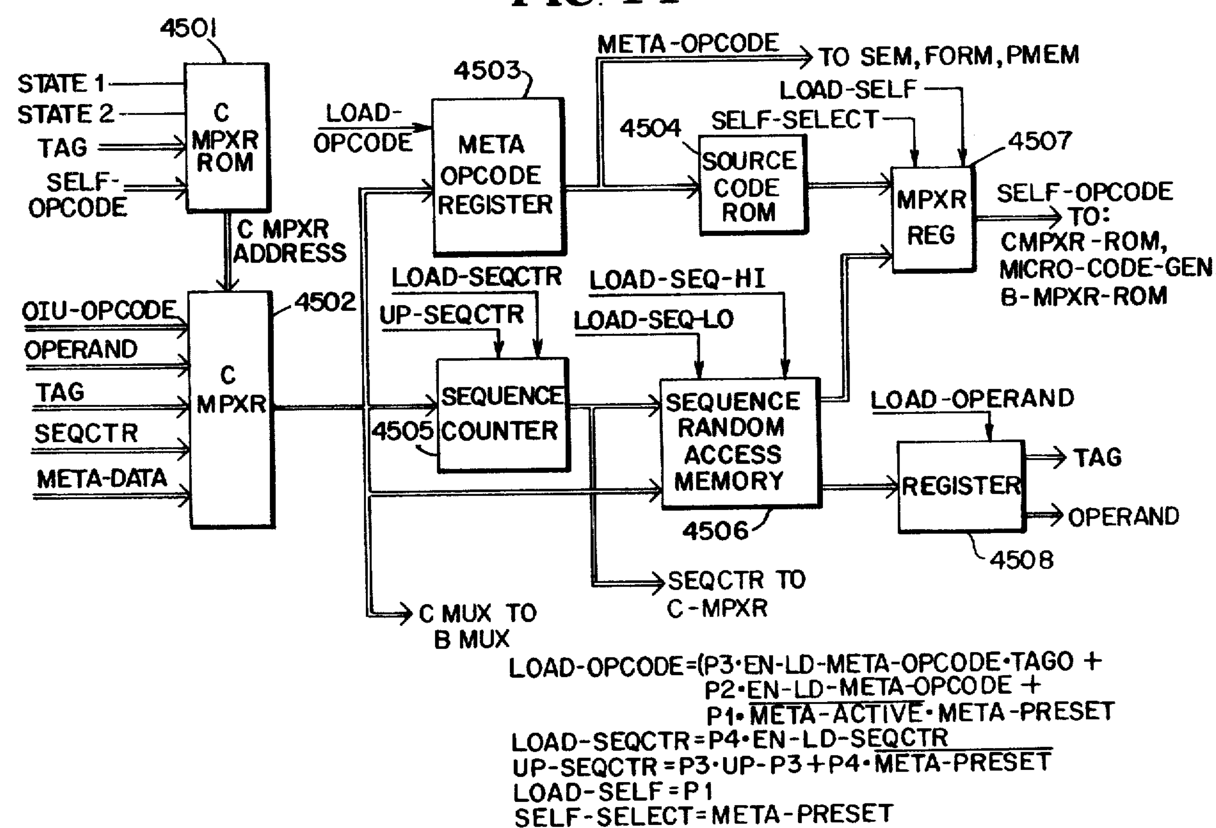
FIG. 45 is a detailed implementation of the state defined control logic of FIG. 24 for a METAPROCESSOR in accordance with the general scheme of FIG. 5S.

FIG. 45 illustrates a sequence random access memory in which the sequences of self instructions are stored in the METAPROCESSOR as well as the address generation circuitry for that sequence address memory. The elements of this circuit consists of multiplexer C4502 which is used to determine the proper addresses for the sequence counter 4505 for subsequent use in defining the location for the use of the self instruction in the sequence random access memory 4506. The read-only memory 4501 (defined in Appendix S) is used in a manner similar to that described in the B multiplexer for defining the address input the STATE1 and STATE2 flip-flop signals as well as the TAG and SELF-OPCODE signals. This circuit includes the META-OPCODE register. This register is common for use both as the receiver of data of the OPCODE portion of input instruction as well as being used for generating the OPCODE output/part of instruction to a processing element to receive an instruction. During the execution of the self instructions within the METAPROCESSOR, the two portions of a self instruction consisting of the SELF/OPCODE and the OPERAND and TAG portions are loaded respectively into the SELF-OPCODE register 4507 and the OPERAND register 4508. The SELF-OPCODE register 4507 in addition may be loaded by the source code read-only memory 4504 (defined in Appendix T). This source code read-only memory upon the initial acceptance of instruction by the METAPROCESSOR performs a mapping from the OPCODE portion of the instruction accepted to a SELF-OPCODE to be executed by the METAPROCESSOR. Thus, an external instruction may cause the METAPROCESSOR to execute any one of the sixteen possible self instructions. In typical cases, the source code read-only memory may require the SELF-OPCODE to be a direct instruction. In this case, the input instruction is sent out to some other processing element in the network in a manner described previously and upon the completion of sending out that instruction, the METAPROCESSOR becomes inactive. In a second case, the multiplexer register, the SELF-OPCODE register 4507 may be loaded with a JUMP instruction from the source code read-only memory as a function of the OPCODE input now stored in register 4503. In this case, the JUMP address as defined by the actual OPCODE value will be put into the sequence counter and thus define the initial position in the sequence random access memory 4506 for initial execution of that instruction. In this manner, a multiplicity of instructions can be accepted by the METAPROCESSOR, each of which accesses a different portion of a sequence address, sequence random access memory and thus allows selection of different sequences for execution by the METAPROCESSOR. In a third case, the sequence counter 4504 is allowed to retain its current value when the METAPROCESSOR becomes inactive. If now an input instruction is received by the METAPROCESSOR, such that the source code read-only memory 4504 calls for a no operation within the multiplexer register 4507 or SELF-OPCODE register, then the current value of the sequence counter is used causing the continuation of operation within the METAPROCESSOR from the position where it left off when it became inactive from a previous operation. In this manner, the METAPROCESSOR may perform the STATE defined control operations, i.e., the METAPROCESSOR executes a sequence of self instructions as defined in the sequence random access memory as a function of the state that it was in when the instruction was first received and the data which was received with that instruction. The determination of what further actions are to be taken is determined by the sequence of self-instructions in the sequence random access memory 4506 and the data value received with the input instructions.

Figure 46:
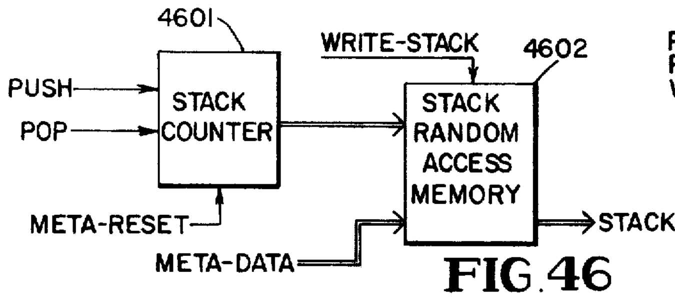
FIG. 46 illustrates the detailed implementation of the address stack portion of FIG. 24 for a METAPROCESSOR in accordance with the general scheme of FIG. 5S.

FIG. 46 illustrates an exemplary implementation of the address stack for the METAPROCESSOR. The address stack is used for storing address return values as well as the execution of primitive operations in the high level grammar that require the pushing of addresses on a stack until such time as POP (or RETURN) operations are performed at which time those addresses are loaded into the sequence counter and subsequently the sequence is executed. The address stack for the METAPROCESSOR is composed of two components, the stack counter 4601 and the stack random access memory 4602. The stack random access memory allows the storage of a multiplicity of addresses. The stack counter 4601 allows the selection of the proper address within the stack random access memory at a given point in time. Two basic operations are defined for the stack address operations. These are the PUSH operation and the POP operation. The PUSH operation works as follows: the current META-DATA value is written into the location of the STACK RANDOM ACCESS MEMORY 4602 at the location currently defined by the value in the STACK COUNTER. The STACK COUNTER is now incremented. The POP operation works in the reverse. The stack is first decremented, by a count of one allowing access to an address previously written into the STACK RANDOM ACCESS MEMORY. The execution of several POP operations would be the subsequent use of those addresses for executing a sequence of operations within the METAPROCES- SOR involved in the execution of a sequence of overall operation, each operation of which consists of a sequence of self instructions as defined by the addresses in the STACK RANDOM ACCESS MEMORY.

Figure 47:
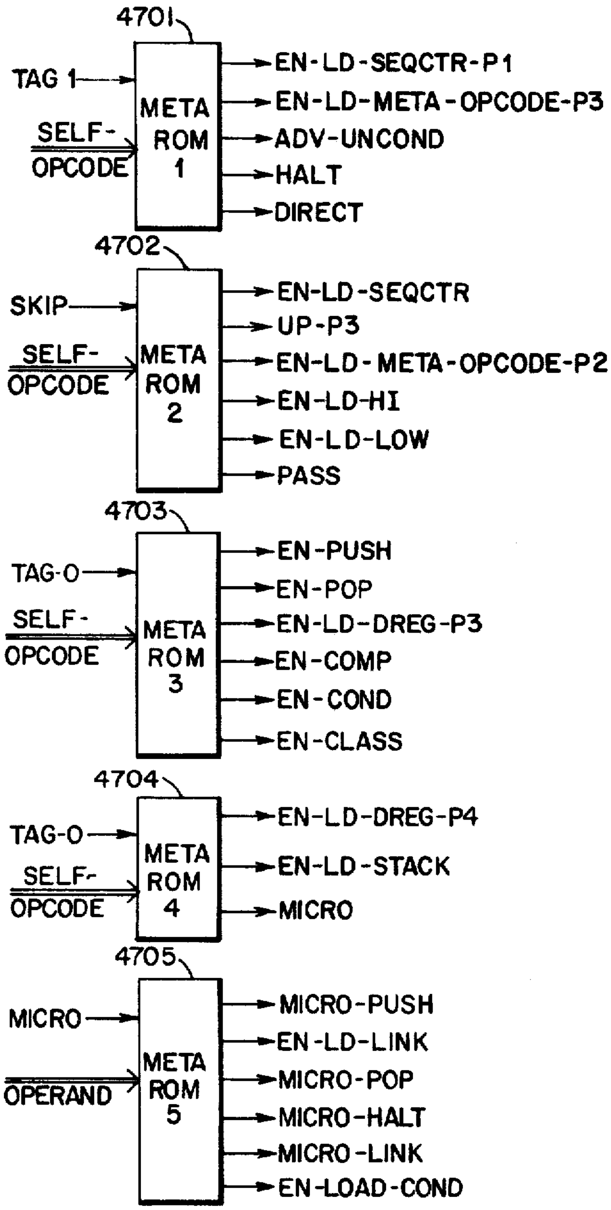
FIG. 47 illustrates the detailed implementation of the micro-code ROM portion of FIG. 24 for a METAPROCESSOR in accordance with the general scheme of FIG. 5C.

FIG. 47 illustrates an exemplary implementation of the micro-code generation logic of a METAPROCESSOR. In this example, five read only memories labeled METAROM-1, METAROM-2, etc., are used to decode the SELF-OPCODE portions of the SELF instruction. The programming of these ROM's are defined in Appendixes V, W, X, Y and Z. In addition, METAROM-5 4701 which is called the microinstruction generation ROM receives its inputs from the operand portion of a self instruction and is enabled by the MICRO signal from METAROM-4, 4704. In this manner, the SELF-OPCODE is translated by the contents of these read only memories into a set of functions out of the total possible set of functions illustrated by the outputs of the METAROMS. For each SELF instruction, only a subset of all these functions are performed. In this manner, a SELF instruction allows the execution of individual micro operations such as loading registers and controlling the position of multiplexers. The METAROM-5 because it has address input from the OPERAND portion of the SELF instruction allows expansion of the repertoire of the SELF instructions of the METAPROCESSOR, that is the single SELF-OPCODE if it selects the micro option will use the OPERAND portion of that instruction as a further operation code to define individual discrete operations to be performed within the METAPROCESSOR. The various enable signals from the METAROM's are used in conjunction with the P1, P2, P3 and P4 clock pulses to execute individual micro operations for a self instruction.

Figure 48:
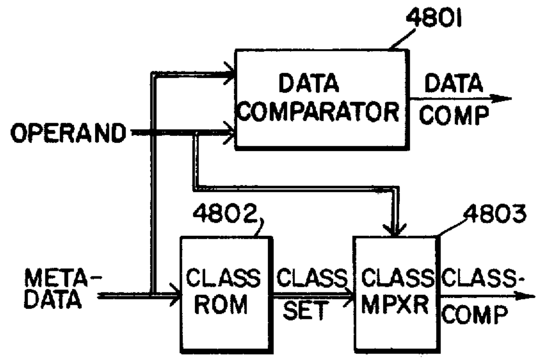
FIG. 48 illustrates the detailed implementation of the data compare and classify circuit portion of FIG. 24 for a METAPROCESSOR for allowing the generation of condition signals which allow conditional control of the METAPROCESSOR sequences.

FIG. 48 illustrates an exemplary implementation of the classify and compare circuitry of the METAPROCESSOR. This circuitry performs the operations within certain self instructions for comparing data and comparing data to a subset called a class of data. These instructions allow conditional operation of sequences of instructions within the METAPROCESSOR. The circuit consists of three elements respectively a DATA COMPARATOR 4101 whose output signal data compare is a high value only when the OPERAND portion of a self instruction is equal to the contents of the METADATA register. The element CLASS ROM 4802 (defined in Appendix AA) has input from the METADATA register. This read only memory is programmed in such a manner that the output of the read only memory discretely defines on a true and false logic level basis whether the data input to the read only memory is one of the multiplicity of sets called classes. The CLASS MULTIPLEXER 4803 which has address inputs from the OPERAND portion of the instruction is then allowed to select one of the line outputs of the CLASS READ ONLY MEMORY. In this manner, the output of the CLASS MULTIPLEXER called the CLASS COMPARE SIGNAL is a high value only if the data input to the CLASS READ ONLY MEMORY 4802 is in a set of words selected by the OPERAND portion of the self instruction.

Figure 49:
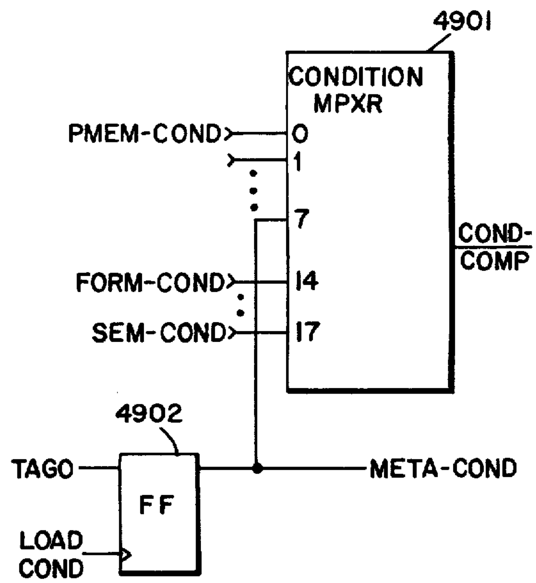
FIG. 49 illustrates the detailed implementation of the condition circuit portion of FIG. 24 for a METAPROCESSOR to allow conditional control.

FIG. 49 illustrates exemplary implementation of the condition logic of the METAPROCESSOR. The logic consists of a CONDITION MULTIPLEXER 4901 whose address input is in the OPERAND portion of a self instruction and the METACONDITION flip-flop 4902. The METACONDITION flip-flop is a data-one-bit data word which can be set or reset by self instructions in the METAPROCESSOR when monitored sometime later by a self instruction. This allows the METAPROCESSOR to determine the order of sequence of execution of instructions in the sequence memory. The CONDITION MULTIPLEXER has inputs both from internal to the METAPROCESSOR, such as the METACONDITION signal and conditions external to the METAPROCESSOR, such as the condition line inputs from the subprocessors SEM, FORM, and PMEM. By monitoring these conditions, the METAPROCESSOR can determine a reordering of the sequence of execution of instructions in the sequence memory.

Figure 50:
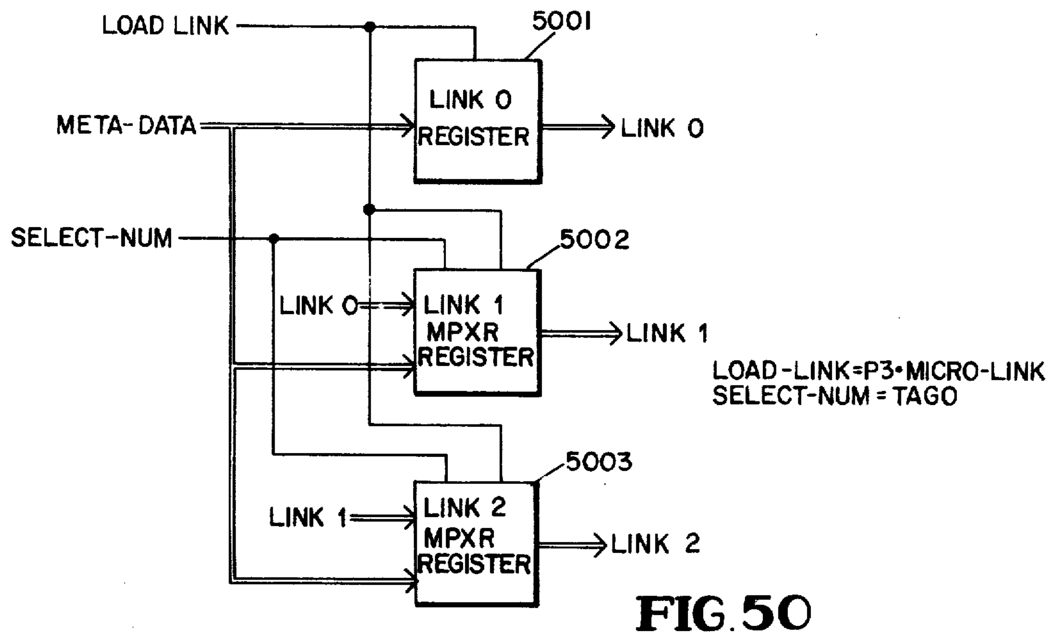
FIG. 50 illustrates the detailed implementation of the octal conversion circuit 2412 of FIG. 24 for a METAPROCESSOR to allow the conversion of numbers from serial to word formats.

FIG. 50 illustrates an exemplary implementation of the link register in the METAPROCESSOR. The link register is configured in such a manner that three consecutive data word inputs can be used to convert to a single byte word, that is the lower three bits three consecutive words are stripped off and compacted into one single eight-bit word. This is called a conversion of a character string to an octal number. In a similar manner, a single eight-bit word can be converted to three consecutive characters, each of which represents one digit of a three-character octal number. For this reason, the circuit is called on octal conversion circuit. The circuit itself consists of three registers called LINK0 5001, LINK1 5002 and LINK2 5003. Each of these registers is responsible to each point in time for holding three bits worth of information corresponding to three bits of an eight-bit word or three bits of the input character string. The operation of this circuit is as follows: the LOAD-LINK signal occurs in conjunction with a SELECT NUM signal in such a manner that the lower three bits of the character are loaded into the LINK0 register. Upon the next LOAD-LINK signal the contents currently in the LINK0 register 5001 are loaded into the LINK1 register 5002. On this same pulse, the lower three bits of the new data word are loaded into LINK0 register. On the next LOAD-LINK pulse the contents of LINK1 are put into the LINK2 register 5003. The contents of LINK0 are put into LINK1 register and the data input lower three bits are put into the LINK0 register. In this manner, the lower three bits of three consecutive data words are loaded as one eight-bit quantity in the LINK register. In a similar manner, the LOAD-LINK signal can allow the loading of all eight bits of the META-DATA information. Now subsequent LOAD-LINK signals with the SELECT-NUM signal in the opposite position allows the readout of consecutive three-bit quantities from the LINK register. The following is now a detailed description of the execution of each of the self instructions in the METAPROCESSOR.

The self instructions of the METAPROCESSOR (which are summarized in Appendix L) are now described in detail. Two cases must be discussed. In the first case, the operation of the METAPROCESSOR for instructions accepted from the OIU and in the second case, the execution instructions in the METAPROCESSOR during the execution of a sequence from the RANDOM ACCESS MEMORY. Instructions executed by the METAPROCESSOR are the same in two cases; however, the timing is slightly different.

Figure 51A:
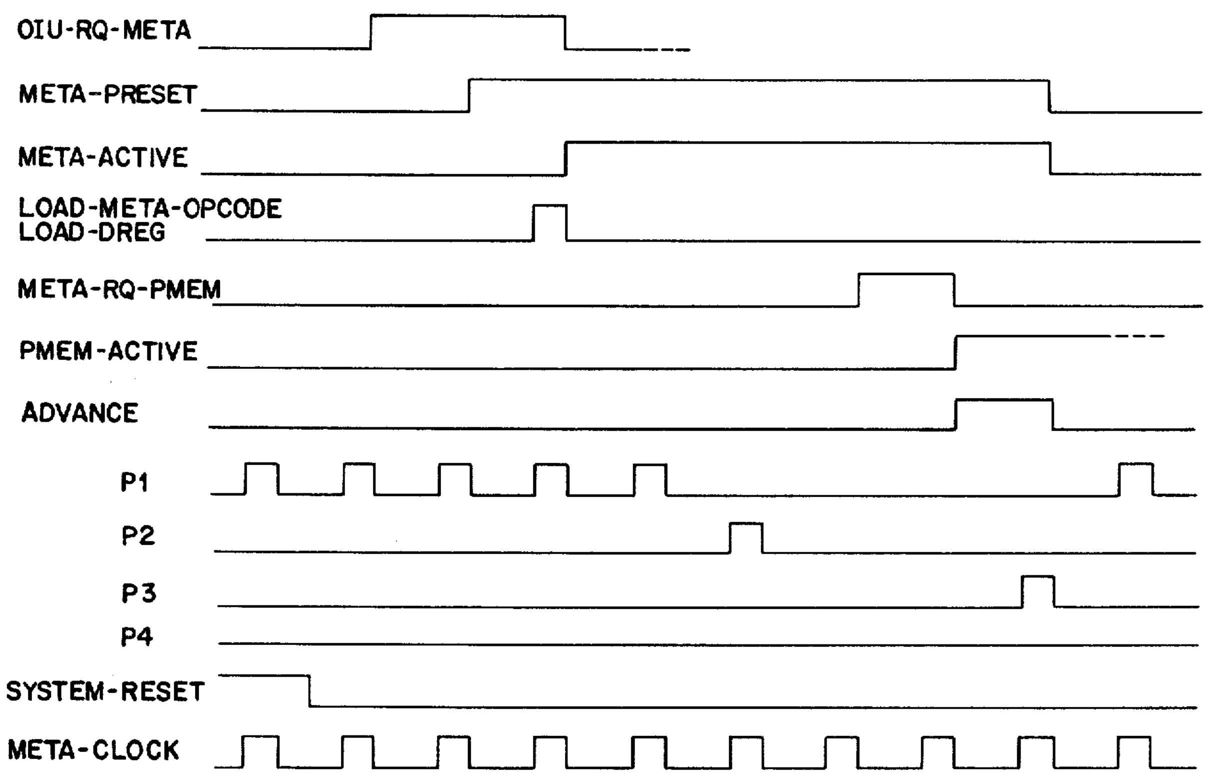
FIG. 51A illustrates the timing of operations for DIRECT instruction in a METAPROCESSOR for parsing input instructions directly to the output of a METAPROCESSOR.
Figure 51B:
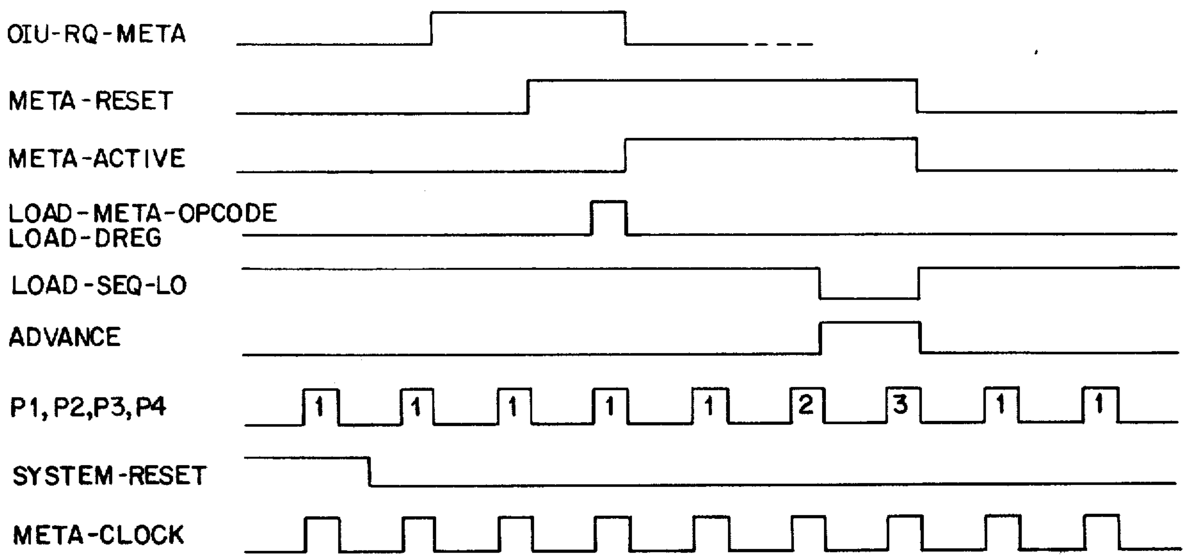
FIG. 51B illustrates the timing of operations for the LOAD-LOW instruction in a METAPROCESSOR for use in loading the sequence memory.

Instructions executed by the METAPROCESSOR from the OIU fall into three categories. In the first category are the instructions load sequence high and load sequence low which are used to load the SE- QUENCE RANDOM ACCESS MEMORY. In the second case are direct instructions for which the METAPROCESSOR simply takes the input instruction and then generates the same instruction on the output arc for a subordinate processor. In the third case are run instructions for the METAPROCESSOR which initiate the execution of a sequence in the SEQUENCE RANDOM ACCESS MEMORY, either from a new state point as defined in the sequence counter 4505 or from the current state. The LOAD-LO instruction is executed by the METAPROCESSOR upon the reception of instruction from the OIU with operation code 372. The purpose of this instruction is to take the data portion of the output instruction loaded into the lower eight bits of the current location in the SEQUENCE RANDOM ACCESS MEMORY defined by the sequence counter 4505. After completion of the instruction, the METAPROCESSOR becomes inactive and awaits the reception of a new instruction. The sequence of operations in the METAPROCESSOR for the load sequence low instruction is illustrated in FIG. 51B which shows the request signal from the OIU to the METAPROCESSOR and the response to that request signal by the METAPROCESSOR by way of the METAPRESET signal and then subsequently the generation of the active signal. During the preset time, the META-OPCODE register 4503 is loaded and the DATA REGISTER 4303 is loaded with the data input part of the instruction. The data flow to the data register 4303 is as follows: the B multiplexer 4302 is steered to the OIU data location by the multiplexer address ROM 4301 because the METAPROCESSOR is currently in STATE1 and STATE2. The SELF-OP register 4507 is loaded from the source code read only memory 4504 with the load sequence low SELF-OPCODE as a translation of the OPCODE in the META-OPCODE register 4503. That is the source code ROM 4304 is programmed to generate the load-sequence-low SELF-OPCODE with the OPCODE received from the OIU as the 372 OPCODE.

After the METAPROCESSOR becomes active, the P1, P2, P3 and P4 pulses are generated as illustrated in FIG. 51B. The generation of these pulses as described before is accomplished by the STATE1 and STATE2 flip-flops in combination with the phase decode device 4221. During the time that the STATE2 flip-flop is set, the load sequence low signal as shown in FIG. 51B is generated which allows the loading of the SEQUENCE RANDOM ACCESS MEMORy from the data through the C multiplexer 4502 which is steered to read the META-DATA register by the C multiplexer read only memory 4501. This accomplishes the loading of the lower eight bits of the word location in the SEQUENCE RANDOM ACCESS MEMORY 4506 at the current location defined by the sequence counter 4505. After leading the SEQUENCE RANDOM ACCESS MEMORY with the input data, the META-ACTIVE flip-flop 4204 is reset because the end of sequence signal 4214 is generated as a result of the halt enable signal from META ROM 4701 being active for this particular SELF-OPCODE. The METAPROCESSOR now waits in a quiescent state for the arrival of a new instruction from the OIU. This new instruction from the OIU may in the current case be a load-sequence-high instruction OPCODE 373. The operation for this instruction is similar to the load sequence low instruction except that in addition on pulse P3 the sequence counter 4505 is incremented by the UP-SEQUENCE COUNTER signal which is generated because of the LDSEQCTR signal from META-ROM-2 4702 which is enabled for this particular SELF-OPCODE. By performing a sequence alternately of load sequence low and low sequence high instructions, the OIU is allowed to load up completely the contents of the SEQUENCE RANDOM ACCESS MEMORY.

The second case for the METAPROCESSOR executing instructions from the OIU is the case of what is called passing direct instructions. For example, the OIU can load the program memory by way of sending a load PMEM instruction to the METAPROCESSOR along with data to be loaded into the program memory. In this case, the instruction is accepted as described before by loading the META-OPCODE register 4503 and the METADATA register 4303 during the preset flip-flop time. The timing for this operation is illustrated in FIG. 51A. As shown, the instruction is accepted and then the META-ACTIVE signal is generated. The input OPCODE which is now loaded in the META-OPCODE register 4503 is now presented to the source code ROM 4504 which allows the SELF-OPCODE register 4507 to be loaded up with the direct SELF-OPCODE which is SELF-OPCODE No. 01. Since the SELF-OPCODE is a direct OPCODE and the preset flip-flop is still set, the instruction is sent out to the program memory through the control arc transmit logic as described in previous cases. Upon reception of the active signal from the program memory, the METAPROCESSOR is now allowed to become inactive by resetting the active flip-flop. By generating a sequence of these instructions to the METAPROCESSOR from the OIU processor, the PMEM processor now can be loaded with a program to be executed by the METAPROCESSOR. In this case, the METAPROCESSOR acts simply as a data path for the instructions meant for the program memory. This device is very useful to allow the generation of instructions to processing elements which have no direct control arc connection to an originating control processor. For example, in this case, the OIU could have a control arc directly to the program memory but since the OIU already has a control arc connection to the METAPROCESSOR, the overall network design is simplified by sending instructions first to the METAPROCESSOR and then having the METAPROCESSOR send those instructions onto a program memory processor. The METAPROCESSOR itself does not change the value of its internal state or the value of any data in its registers and SEQUENCE RANDOM ACCESS MEMORY as a result of executing such direct instructions.

Figure 51C:
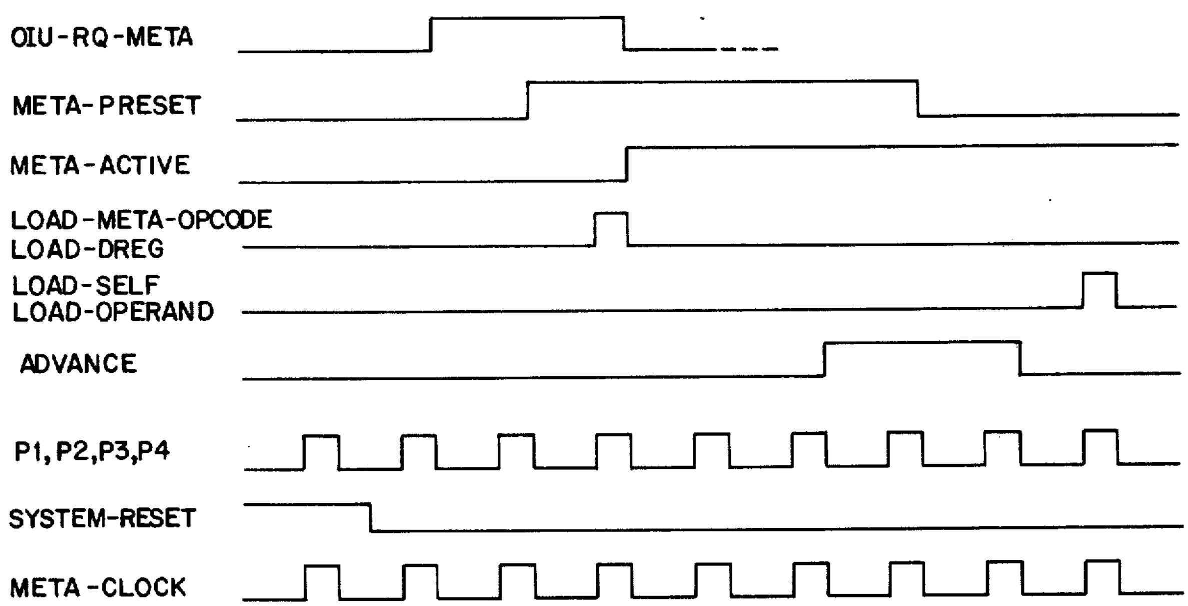
FIG. 51C illustrates the timing of operations for the RUN-META instruction in a METAPROCESSOR for initiating the execution of a sequence of operations within a METAPROCESSOR.
Figure 51D:
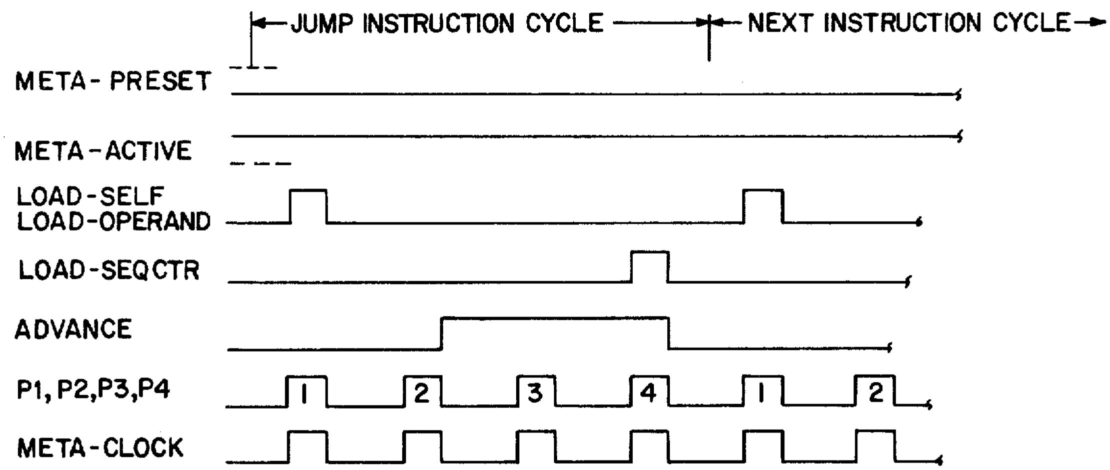
FIG. 51D illustrates the timing of operations for a JUMP instruction in a METAPROCESSOR for allowing access to a sequence of instructions other than that containing the JUMP instruction.
Figure 51E:
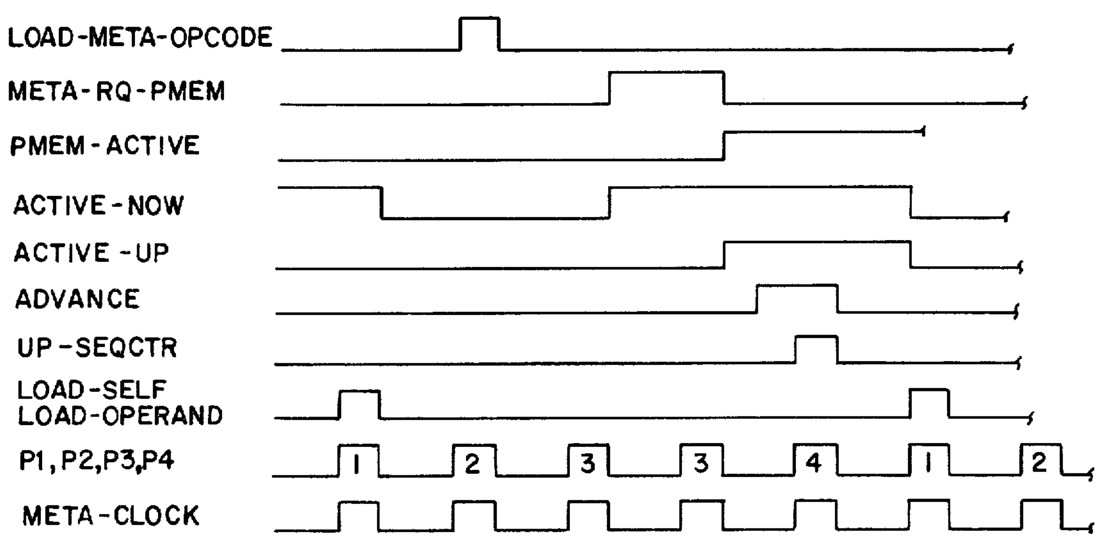
FIG. 51E illustrates the timing of operations for a PASS instruction in a METAPROCESSOR for requesting the execution of an instruction in the PMEM, FORM or SEM processors.

The third case of instructions executed by the METAPROCESSOR from the OIU processor is the case of the RUN instruction OPCODE 370. This instruction is accepted as described previously but results in a NOP SELF-CODE No. 00 being loaded in the SELF-OPCODE register 4507 as determined by the output of the source code ROM 4504 which monitors the value of the OPCODES in the META-OPCODE REGISTER 4503. Since the SELF-OPCODE is a NOP, no operation is performed for the initial instruction; however, the META-ACTIVE flip-flop is not reset at the end of this instruction. As a result, the next instruction in the SEQUENCE RANDOM ACCESS MEMORY 4506 at the location defined by the current value of the sequence counter 4505 is executed. This new self instruction now allows the METAPROCESSOR to execute a sequence of operations defined by sequentially accessing self instructions from the SEQUENCE RANDOM ACCESS MEMORY as a function of differing address generated from the sequence counter. In this manner, the METAPROCESSOR is allowed to execute sequences as a function of its current state saved in the sequence counter 4505 and the new instruction data inputs. This then is an exemplary illustration of the use of the state defined control concept described previously. Timing for the ROM META-OPERATION is illustrated in FIGURE 51C which shows the reception of the request signal from the OIU processor, the generation of the META-PRESET time, the generation of the META-ACTIVE signal after loading the instruction to the OPCODE and data registers and then the issuance of the pulses P1, P2, P3 and P4 which perform no operation for this initial cycle. However, after the issuance of pulse P4, operation of the METAPROCESSOR continues by again generating pulse P1 and on this new self instruction SEQUENCE RANDOM ACCESS MEMORY will perform yet another self instruction and this self instruction may be followed by again another self instruction as defined by varying locations defined in the sequence counter 4505. The cases of the METAPROCESSOR executing self instructions after having been initiated for running a sequence is now described. In the first case, the self instruction may have the SELF-OPCODE 00 which requires the METAPROCESSOR to execute a NOP instruction. This instruction performs no useful function during the execution of a sequence within the METAPROCESSOR and is used principally for initiating the running of the METAPROCESSOR by instruction from the OIU processor.

The METAPROCESSOR may execute a direct instruction OPCODE 01 if the self code register 4507 is loaded in the SELF-OPCODE for doing the direct function. In this case, the least significant tag bit is used to define whether the METAPROCESSOR will wait for the completion of the execution of the direct instruction or will continue the sequence of operation at the reception of the active signal from the processor to which the instruction is being sent. The instruction sent out by the METAPROCESSOR consists of the current contents of the META-OPCODE register and the current contents of the META-DATA register. Timing for this self instruction is to allow the program being read from the program memory processor to define operation codes and instructions to be sent out to other processors in the system. This is done by the METAPROCESSOR reading data from the program memory and then loading that data into the META-OPCODE register by the load P instruction which will be described in subsequent paragraphs.

The METAPROCESSOR will execute the PASS self instruction if the OPCODE loaded into the SELF-OPCODE register 4507 is the OPCODE 02. This case is similar to the direct instruction PASS operation except that the META-OPCODE register 4503 is loaded with the OPERAND portion of the self instruction from the SEQUENCE RANDOM ACCESS MEMORY 4506. The data flow in this case is to take the OPERAND from the OPERAND register 4508 which is loaded on pulse P1 and take the output of that OPERAND register through the C multiplexer which is steered by the C multiplexer ROM and then load the META-OPCODE register on pulse P2 as illustrated in the equations in FIG. 45. In this case, the instruction executed by an external processor to the METAPROCESSOR is composed of an OPCODE from the self instruction being executed and the current value of the data in the META-DATA register. The METAPROCESSOR will continue its execution of self instructions after receipt of the ACTIVE signal from the processor which is to execute the instruction as defined in the control arc transmit logic or in the case that the tag bit being set in the METAPROCESSOR will wait for the completion of that instruction before continuing.

The METAPROCESSOR will execute the scan self instruction if the SELF-OPCODE is 03. The scan instruction is similar to the pass instruction with the addition that the META-DATA register is loaded with the data from the program memory processor. In the case of the scan instruction, the instruction consisting of the OPCODE from the OPERAND portion of the self instruction and the current value of the META-DATA register is sent out to the processing unit defined by the destination read only memory in the control arc transmit logic 4401. As soon as the instruction is generated by the METAPROCESSOR, the contents of the program memory processor output is loaded into the METAPROCESSOR data register 4303 from the B multiplexer 4302 whose address is enabled by the B multiplexer address ROM 4301 to look at the PMEM data input which is the output of the program memory processor.

The SCANW (scan and wait) instruction is executed for the SELF-OPCODE 02 if the tag bit 0 is a logic 1 signal. In this case, the operation is the same as for SCAN except that the METAPROCESSOR will wait for the completion of instruction execution (usually in the program memory processor) before loading the META-DATA register from the output of the program memory. The SCANW instruction is used to access and load the META-DATA register with the next character data from the program in the program memory processor. Usually the operation code for the scan weight is the advance instruction in the program memory which allows accessing the next location in the program memory.

The load instruction is used to load the META-DATA register from any location accessible from the B multiplexer 4302. The operation is as follows: the SELF-OPCODE register is loaded with OPCODE 04 and the tag quantity of the self instruction is 0. In this case, the B multiplexer address ROM is steered to the location which is defined by the OPERAND portion of the self instruction. In this manner, any of the quantities, LINK, STACK, PMEM data processor output, FORM processor output, SEM processor output or OIU data output can be loaded into the META-DATA register. This instruction allows the METAPROCESSOR to access the results of computations performed in other processing elements of the exemplary graph architecture machine. Once the data is loaded into the DATA REGISTER, then that data may be used as a part of an instruction passed out by the METAPROCESSOR to another processing element or used internally in the METAPROCESSOR to determine on a conditional basis its sequence of operations.

The DATA self instruction is executed if the SELF-OPCODE 04 and the tag is value 1. In this case, the META-DATA register is loaded with the OPERAND portion of the self instruction by way of taking the OPERAND output of the register 4508 through the C multiplexer 4502 further through the B multiplexer 4302 and finally into the META-DATA register 4303. This instruction is used in the METAPROCESSOR sequences to load data which is initially defined in the SEQUENCE RANDOM ACCESS MEMORY. In this manner, the META-PROCESSOR using this instruction in combination with a PASS instruction may completely define an instruction to be passed out to other processors accessible from the METAPROCESSOR.

The load P instruction is executed if the SELF-OPCODE is 05 and tag is 0. In this case, the META-OPCODE register 4503 is loaded with the current value in the DATA register, or as defined by the OPERAND portion of the self instruction which allows loading the OPCODE register from any of the locations accessible by the C and B multiplexers.

The EXEC instruction is executed if the SELF-OPCODE is 05. In this case, the new state of the sequence counter 4505 is located by the contents of the META-DATA register. In this manner, a new state may be defined in the METAPROCESSOR using data loaded previously from an external processor or by the DATA instruction from the SEQUENCE RANDOM ACCESS MEMORY. This instruction is used to allow the access to differing sequences in the META-PROCESSOR by external data input.

The LOAD RAM HI and LOAD RAM LO Self instructions are executed for SELF-OPCODES 06 and 07 and are used to load the SEQUENCE RANDOM ACCESS MEMORY 4506. The operation of these instructions has been described previously.

The JUMP self instruction is executed if the SELF-OPCODE is 10. The JUMP instruction allows the current state value in the sequence counter 4505 to be loaded from the OPERAND and tag portions of the self instruction. This allows access to a different sequence in the SEQUENCE RANDOM ACCESS MEMORY from a currently executing sequence.

The CALL self instruction is executed if the SELF-OPCODE is 11. The operation is similar to the JUMP self instruction except that in addition the current value of the sequence counter 4505 is recorded in the sequence stack illustrated in FIG. 46. The sequence of operation is as follows: the stack counter 4601 is incremented using timing pulse P2. Pulse P4 stores the current value of the sequence counter in the STACK RANDOM ACCESS MEMORY 4602. The data is gated to the sequence counter 4505 through the C multiplexer 4502 which in turn is gated through the B multiplexer 4302 and subsequently presented to the data inputs to the STACK RANDOM ACCESS MEMORY 4602. This instruction is used to record the present value of the sequence while allowing the execution of a separate sequence in the SEQUENCE RANDOM ACCESS MEMORY. During the execution of the new sequence, a RETURN self instruction may be executed which allows the location of the call point stored to be reloaded into sequence counter 4505.

The RETURN self instruction is executed if the SELF-OPCODE is 12. The RETURN self instruction allows the current address value in the STACK RANDOM ACCESS MEMORY 4602 to be loaded into the sequence counter 4505. Subsequently, the sequence counter is incremented during the execution of the RETURN self instruction and in this manner the location of a sequence point previously used by a CALL instruction may be reloaded and the next sequence step in the calling sequence may be executed. A combination of the RETURN and CALL instructions allows the access and execution of subsequences in the SEQUENCE RANDOM ACCESS MEMORY which may be used by several other sequences in that SEQUENCE RANDOM ACCESS MEMORY. In addition, because the stack allows the storage of several addresses, a particular subsequence may in itself call that same subsequence and in that manner operate in a recursive manner, which is a principle well known in the art of computer science.

A PUSH self instruction is executed if the SELF-OPCODE is 13. In this case, the OPERAND and tag portions of the self instructions are stored in the STACK RANDOM ACCESS MEMORY 4602 in the manner described previously for the CALL instruction. In this case, however, the current sequence counter value is incremented. The PUSH instruction allows a future return instruction to access a sequence address defined by the PUSH instruction. The PUSH instruction is very useful in allowing the programming of the grammars necessary for defining the interpretation of the high level language.

The SKIP self instruction is executed if the SELF-OPCODE is 14 and the tag is 0. The SKIP instruction allows a conditional bypassing of the next instruction in the META-SEQUENCE and operates as follows: the OPERAND portion of the SKIP instruction is an address for selecting a condition in the condition circuit FIG. 49. If the condition selected by the OPERAND is true, then the sequence counter 4505 is incremented twice. In this manner, the next step in the sequence is bypassed. Normally, this next self instruction in the sequence is a JUMP instruction. In this manner, if the SKIP is performed, then the JUMP is not executed and the sequence proceeds to the next self instruction. If the SKIP is not performed, then the next instruction is executed which, for example, would be the JUMP instruction and this would allow the access to a different point in the SEQUENCE RANDOM ACCESS MEMORY. This allows the conditional operation of the METAPROCESSOR as a function of conditions both within the METAPROCESSOR and the condition lines from other processing elements in an exemplary graph architecture machine.

The CHAR instruction is executed if the SELF-OPCODE is 15. The operation of this instruction is similar to the SKIP instruction except that in this case the OPERAND is used as a data word for direct comparison to the current contents of the data register. That is, for example, if the current value of the data register is equal to the OPERAND portion of the CHAR self instruction, then a SKIP operation if performed. Otherwise, the next instruction in the sequence is executed which is normally a JUMP instruction to allow the access to a different sequence.

The NCHAR instruction is executed if the SELF-OPCODE is 15 and the tag is 2. The operaion is similar to the CHAR instruction except that the SKIP is performed if the OPERAND portion of the self instruction is not equal to the current value of the META-DATA register. The CHAR and NCHAR instructions are used in the interpretation process to determine what operations or sequences are to be performed by the META-PROCESSOR in response to the sequence of characters in the high-level language program. The CHAREX instruction operates similarly to the CHAR instruction except that the data for comparison is defined by an input to the B multiplexer as selected by the OPERAND part of the self instruction. In this manner, the conditional operation of the METAPROCESSOR can be determined by the comparison of data in the META-DATA register to any value accessible from the B multiplexer.

The class self instruction is executed if the SELF-OPCODE is 15 and the tag value is 1. The operation is similar to SKIP and CHAR instructions except that the condition is based upon whether the current value of data in the META-DATA register is in a class or set defined in the CLASSIFIER READ ONLY MEMORY illustrated in 4802. For example, one class is defined as capital letters. If the value in the META-DATA register is a capital D letter, then this data is in the class accessed by the class name which is selected by the OPERAND portion of the CLASS self instruction. In this case, the SKIP operation is performed and this allows again conditional operation of the META-PROCESSOR as a function of the classification of data in the META-DATA register. If, on the other hand, the data in the META-DATA register, say for example, is the small letter "a" character, then that letter is not in the class defined and in this case the SKIP is not performed.

The NCLASS self instruction is executed if the SELF-OPCODE is 15 and the tag value is 0. The OPERAND portion of this instruction is a class name for use in the classify circuit illustrated in FIG. 48. The NCLASS instruction is the same as the CLASS instruction except that the SKIP is performed if the data value in the META-DATA register is not in the class defined by the OPERAND portion of the self instruction.

The MICRO self instruction is executed if the SELF-OPCODE is 17. The MICRO self instruction allows the manipulation of individual discrete micro operations within the METAPROCESSOR. The selection of the individual micro operation which must be one of the operation outputs from the micro code generator is based upon the value of the OPERAND portion of the self instruction. The possible micro operations are as follows: if the OPERAND has value 0 a NOP is performed. If the OPERAND portion of this micro self instruction has value 01, the POP operation is performed which decrements the stack counter 4601. The META-CONDITION flip-flop 4902 is reset if the micro OPERAND portion has value 06 and similarly the flip-flop is set if the micro OPERAND portion has value 07. The link converter register is loaded if the micro OPERAND portion has value 10 and is loaded with an alpha-numeric character for octal-to-number conversion if the micro OPERAND portion has value 11. The stack counter 4601 is reset if the micro OPERAND has value 14. The stack counter 4601 is incremented if the self micro self instruction OPERAND has value 15. The METAPROCESSOR HALT operation is executed if the micro self instruction OPERAND has value 16. The micro halt self instruction is used to reset the METAPROCESSOR ACTIVE flip-flop and discontinue the execution of the current sequence. At the completion of this operation, the sequence counter 4505 retains the current state and upon the reception of a new RUN METAPROCESSOR instruction from the OIU will continue the execution of self instructions from the sequence RANDOM ACCESS MEMORY as defined by the previous value in the sequence counter 4505.

A detailed description is now given concerning the programming of self instruction sequences in the METAPROCESSOR to allow the interpretation of high level languages. A high level language is normally defined in terms of mathematical structure called a transduction grammar. The transduction grammar specifies the allowed sequences of characters in a high level language program and identifies what actions are to be taken by the machine in response to the character sequences in a high level language program. The METAPROCESSOR is eminently suited for this task since it can take data from the program memory processor which can be loaded with the high level language program being executed and its set of conditional instructions allows interpretation of those characters and the generation of instructions to other processors in the system to allow execution of numeric computations, display operations, etc., as a function of those statement sequences in the high level language program. The transduction grammar is written using a special notation illustrated in the following table:

< > Enclose the name of a state.
. . Enclose the name of an input symbol part of the high level language program.
( ) Enclose the name of actions or instructions to be executed by the METAPROCESSOR or other PE's.
→ Delimits the left hand side (LHS) and right hand side (RHS) of grammar rule equations.
ε Means any input symbol or character.
* Execute state without getting a new input character.

A transduction grammar consists of a listing of grammar rules similar to those defining the legal sentences in the English language and have the general form

LHS→RHS

For the types of grammars used in a high level language interpretation process, the LHS quantity is a single state name corresponding to an address value for loading into the sequence counter 4505 and the RHS part consists of a string of characters which denote actions and states to be executed by the METAPROCESSOR by way of passing out instructions to other processing elements in the system and in addition specifies new states to be executed if that particular grammar rule is to be executed. The RHS also contains a reference to specific character data or character classes to be used for determining whether that specific grammar rule is to be executed. In summary then, a list of grammar rules is given for a high level language and the operation of that grammar is determined by a combination of a current state value in combination with a new character input in the high level language program. This uniquely selects one of the grammar rules in the overall list of grammar rules and allows the conditional operation of the METAPROCESSOR in that manner. To illustrate this action, the following table illustrates a simple transduction grammar definition of a very simple case.

1. <A>→.1.<B>
2. →ε<B>
3. <B>→.a.<B><A>
4. →ε

Assume that the system is started in the state referenced by the state name "A" and that the input sequence of the characters is "1a23." By the rule selection process, since the system is now in STATE A and the first input symbol is 1, this causes RULE 1 to be executed. The execution of this rule causes the next state to be STATE B. Now the next input character is read and since it has value "a", this allows RULE NO. 3 to be executed. The execution of RULE 3 requires that the STATE A be remembered as a pending state, that is pushed on the address stack, and the next state to be executed is STATE B. The next input is the letter "2" and RULE 4 is executed. Since no new state is denoted in this case, then the last pending state value pushed on the address stack is used. In this case, that last address stack value denoted STATE A so that now the machine enters STATE A and must execute either RULE 1 or RULE 2. Since the next input symbol is the character 3, then RULE 2 is executed, which causes the STATE A to be again executed. A practical high level language may require the use of several hundred of these grammar rules for its definition, and require in correspondence several hundred self instruction sequences to be programmed into the SEQUENCE RANDOM ACCESS MEMORY.

The following conventions are followed when using this notation in the following discussions:

1. If a given state has more than one rule associated with it, these rules are listed without the current state name on the left of the arrow.
2. In a given state, the first arrow symbol means get or read a new input character. In the case of the METAPROCESSOR, this means execute the SCAN instruction with an OPCODE for accessing new data in the PMEM processor. Subsequent rules for that state in the list of grammar rules for that state do not get a new input character.
3. The input is not advanced for a current state if it was reached by a state reference having the star symbol "*" after it.
4. For a rule of the form →ε*, the latest pending state on the address stack is executed without getting into input character.
5. For a rule of form →ε, the next pending state is executed on the address stack.
6. The rules for a current state are assumed to be executed in the order given.

In the case of interpreting a high level language, the input symbols for determining which one of the grammar rules in the overall list of rules is to be executed is normally a character such as found in APPENDIX B. A combination of a sequence of these characters constitutes the high level language program. Examples are now given for the relationship of the grammar rule notation to self instructions for programming in the METAPROCESSOR. These examples are illustrated in the following table:

which constitutes the high level language program for this example. METAPROCESSOR programming for executing a portion of the sequences necessary for interpreting this program is illustrated in FIG. 4E. The PROG state is that state which is initially entered by the METAPROCESSOR when it begins interpretation of a program. This state is returned to subsequently between the execution interpretation of each statement in the program. Starting at the PROG state, the self instruction PASW ADVANCE causes the next character in the program to be accessed from the PMEM processor. The next self instruction at line 4EO2 causes that data value accessed within the PMEM processor to be loaded into the META-DATA register. The class is now checked of that data to see if it is the beginning character of a statement. This is performed by the NCLASS self instruction on line 4EO3, which determines if the data character which is now on the META-DATA register is in the class of characters called BEGIN class. The BEGIN class is illustrated in detail in APPENDIX Q. If the character read from the program memory processor and stored into the META-DATA register is in the BEGIN class, then the self instruction line 4EO4 is executed. In this case, the self instruction is the EXEC self instruction which causes the new state of the METAPROCESSOR to correspond to the character value in the META-DATA register. That is, the data value is used in the state transition table part of the META sequences illustrated in lines 4EO6 to lines 4EO3 to determine which of the sequences in the METAPROCESSOR are to be executed. For example, if the character read from the PMEM processor is the period character, then the state on line 4EO7 is entered which causes the JUMP to the sequence called HALT on line 4E14. During this sequence, a sequence of instructions is passed out including the clearing of the matched stack in the STG processor by way of the pass CLEARM instruction on line 4E14 and this is followed by the issuance of the ENABLE instruction for the OIU processor on line 4E15. This allows the input of data from the operator of the system. The HALT self instruction is now executed at line 4E16. This causes the METAPROCESSOR to discontinue its operation and await a new run command. Once the OIU processor has received new data from the operator, it will generate the run command to the METAPROCESSOR with the data entered from the operator. In this case then, the METAPROCESSOR will continue its operation from

| GRAMMAR RULES(S) | METAPROCESSOR SEQUENCE | |
|---|---|---|
| → | | SCNW ADVANCE |
| <STATEC>→A<STATEB> | STATEC | NCHAR 'A' |
| | | JUMP STATES |
| <STATED>→A<STATEB><STATEC> | STATED | CHAR 'A' |
| →ε | | RETURN |
| | | PUSH STATEC |
| | | JUMP STATEB |
| <STATEE>→B(ACTION1)<SA> | STATEE | CHAR 'B' |
| | | RETURN |
| | | PASS ACTION1 |
| | | JUMP SA |
| <STATEA>→<CAPITAL><SB> | STATEA | NCLASS CAPITAL |
| | | JUMP SB |
| <STATEB>→(FLG1) | STATEB | NCHAR 'A' |
| | | MICRO FLG1 |

To illustrate the programming of the METAPROCESSOR for implementation of the SPONL language, refer again to the MCP multiple choice program example. FIG. 4D illustrates a sequence of characters the state HALT 2 at 4E17. The self instruction at this location in the sequence causes the PUSHM instruction to be executed in the STG processor which allows the storing of the input data from the operator in the match stack. At line 4E18 now the JUMP to state PROG self instruction is executed and now the operation of the METAPROCESSOR continues as before from the state PROG on line 4E01. Now a new statement type is detected and the corresponding sequence for interpreting that new statement is entered. For example, in the case of the display sequence, the DISPLAY state at line 4E19 if the PROG state determines that the statement to be executed was begun with the little letter "d". DISPLAY sequence now performs additional states to generate instructions for the display portion of the system to generate information on the display device. Additional operations in the program in the high level language are accomplished by a combination of program control point sequences and conditional checking of the operator input data. For example, the alternate sequence line 4E39 is executed if character from the program memory is the vertical slash character (1). The ALT sequence allows the comparison of the next character in the program memory with the current character value in the match stack. If these compare, then the current control sequence in the program is skipped. The complete definition of the grammars implemented in the METAPROCESSOR for the exemplary training system are given in APPENDIXES M, N, O and P. APPENDIX M and APPENDIX N contain the special grammar called the META-INTERPRETER COMMUNICATION GRAMMAR. This particular grammar allows interpretation of inputs directly from the operator as opposed to interpretation of the program in the program memory processor. If the METAPROCESSOR is put into the state of using the interpreter communication grammar, the operator of the system is allowed direct control over the operation of the METAPROCESSOR and subsequently the operation of the other processing elements in the system.

This interpretation communication grammar is used mostly for maintenance of the system and access to specific programs to be executed. The self instruction sequence coding for the example SPOML grammar is illustrated in APPENDIX Q. The self instructions listed there include the binary and octal values of the SELF-OPCODES, OPERAND values and sequence address locations needed by the METAPROCESSOR for the actual execution of the sequences of interpreting high level SPOML language.

The METAPROCESSOR may be used for several applications by way of defining a new language or using the definition of an existing transduction grammar definition of a high level language. In particular, languages such as the BASIC and ALGOL which are commonly in use may be implemented in the METAPROCESSOR. In conjunction with new or the same processors illustrated in the exemplary training system, programs written in those languages may be executed using the METAPROCESSOR for interpreting the high level language and translating high level language statements to lower level sequences of primitive operations which can be executed by the METAPROCESSOR and other processing elements in the exemplary system.

INPUTS PROCESSING SUBSYSTEM

The processors performing input processing are illustrated in FIG. 4A and include GRAF, KYBD, INPT and OIU. In the example training system, the GRAF and KYBD processors are physically part of the OIU processor hardware but operate as separate processors under the definitions of my invention. INPT is a general purpose control processor based on a microprocessor which is programmed to preprocess inputs from KYBD, GRAF, INPT and FORM and sends outputs to the META to allow program processing of operator inputs. In typical system operation, the KYBD or GRAF originates an instruction input to OIU following an operator action such as striking a key on the keyboard, then OIU receives the instruction and passes that instruction to the INPT for preprocessing. For example, GRAF instructions containing Graf pen coordinate data are converted to symbolic names based on tables loaded into the INPT processor. The INPT then sends the symbolic name with the META "RUN" OPCODE to the OIU, and then the OIU passes this instruction to the META. After processing the symbolic name data, the META sends an "ENABLE INPUTS" instruction to the FORM. The FORM passes this instruction to the OIU and the OIU in turn passes the instruction to INPT, where a flip-flop is set enabling further input processing. The cycle repeats itself during normal training system operation.

KYBD and GRAF, while not physically distinct processors in the example training system, are logically distinct in that they provide output instructions to the OIU and interface independently with external equipments. KYBD interfaces with an ASCII (American Standard Code for Information Interchange) Keyboard which allows the operator input of alpha-numeric data to the system. In addition, KYBD can originate special instructions such as "BOOTSTRAP" and "REPEAT" in response to operator depression of actuator/indicator keys which are labeled with the names "BOOTSTRAP" and "REPEAT". Further, KYBD allows the operator (or the INPT processor) to load an instruction into a register within KYBD for subsequent passing to the IOU and then to the rest of the system. This instruction generation feature allows an operator to specifically command other processors in the system to effect manual system testing.

The GRAF processor interfaces with the Graf pen external electronics package. When the operator makes a pen entry, GRAF "calculates" the absolute X and Y rectangular coordinates of the pen hit position over the system display area, and generates an instruction called "PROCESS PEN ENTRY" to the OIU.

The OIU is a special control processor which can be described as a multiple control arc input/multiple control arc output CP. No instruction processing takes place inside the OIU: every instruction it receives from KYBD, GRAF, INPT or FORM is passed out without modification to INPT or META. The OIU is specialized in that the KYBD and GRAF are incorporated within it, and it has a special interface with the INPT unit. In addition, the OIU provides the system CLOCK and MASTER RESET signals used by the other processing elements in the system.

The INPT processor is a microprocessor based CP which makes use of special interface circuits in the OIU to function as a control processor. The INPT is programmed to preprocess KYBD and GRAF instructions via the OIU. INPT contains tables to aid in the processing of GRAF instructions, and these tables can be loaded under the direction of system programs by instructions from FORM. The detailed description of the INPT processor is brief because it differs little from similar processors common in the art.

In summary, in the inputs processing subsection, the KYBD and GRAF processors generate instructions from operator entries, the INPT processor does the data processing on these inputs, and the OIU processor allows instructions over control arcs from four sources to be channelled to any of four processors depending upon the OPCODE of a specific instruction and this is an example of a processor with multiple input arcs under the definition of my invention.

OIU DESCRIPTION

The Operator Interface Unit (OIU) is a control processor which allows instructions from GRAF, KYBD, FORM or INPT to be passed on to META or INPT. From FIG. 15, the OIU block diagram, it can be seen that actually the OIU has eight instruction sources, represented by request signals to the CAR circuit 1507, and four instruction sinks or destinations, represented by request signals out of the CAT circuit 1508. One request signal comes from the GRAF processor 1501, three requests come from the KYBD processor circuit 1504, repeat circuit 1503 and bootstrap circuit 1502, one request comes from the FORM interface circuit 1505, two requests come from the INPT interface circuit 1506, and the remaining request signal is a spare input not used. The output request signals go to the INPT and META processors (two are spare). In operation, the OIU control circuitry 1507 receives a request and instruction from one of the interface circuits, and directs the CAT circuit 1508 to send the request and instruction to the appropriate destination processor.

Figure 19:
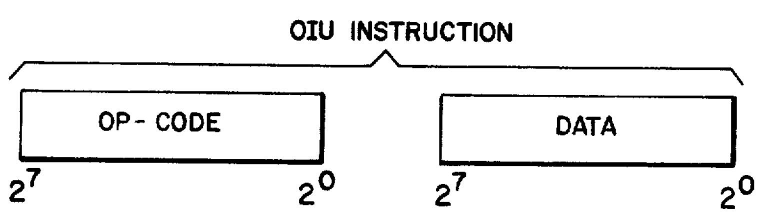
FIG. 19 illustrates the format of instructions and data for the OIU processor illustrated in FIG. 15, said formats specifying the meaning of instruction signals in control arcs to and from the OIU.

OIU-OPCODE is a time shared bus which is used to transfer input instructions, OPCODE and data, from the input interface circuits to the destination processors (INPT and META). In operation, the instruction data is first placed on the OIU-OPCODE bus and loaded into the data register 1509, and second, the instruction OPCODE is placed on the same bus. At this point in time, the instruction is ready to be passed from the OIU to the INPT or META processor. FIG. 19 shows the OIU instruction OPCODE and data format.

Figure 15:
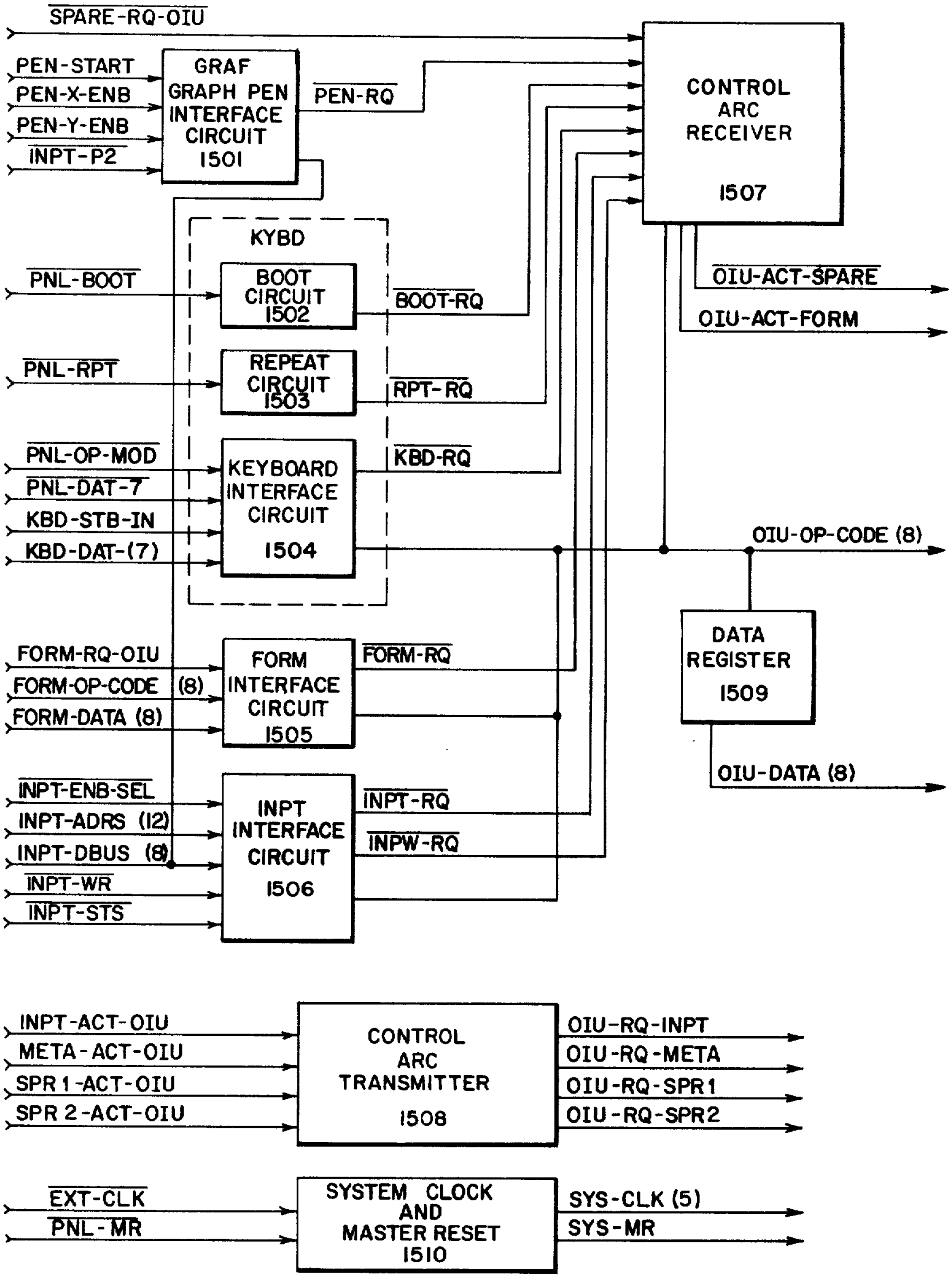
FIG. 15 is a block diagram of the OIU control processor of FIGS. 4A and 4B, the purpose of OIU being to accept instructions from multiple sources KYBD and GRAF and control the processors META and INPT.

The OIU provides the training system with several system CLOCK signals and a system MASTER RESET signal as shown as outputs from circuit 1510 in FIG. 15.

Each of the blocks of FIG. 15 are now examined in greater detail. Typical electronic components for constructing an OIU processor are listed in APPENDIX J.

GRAPH PEN PROCESSOR CIRCUIT

Figure 18:
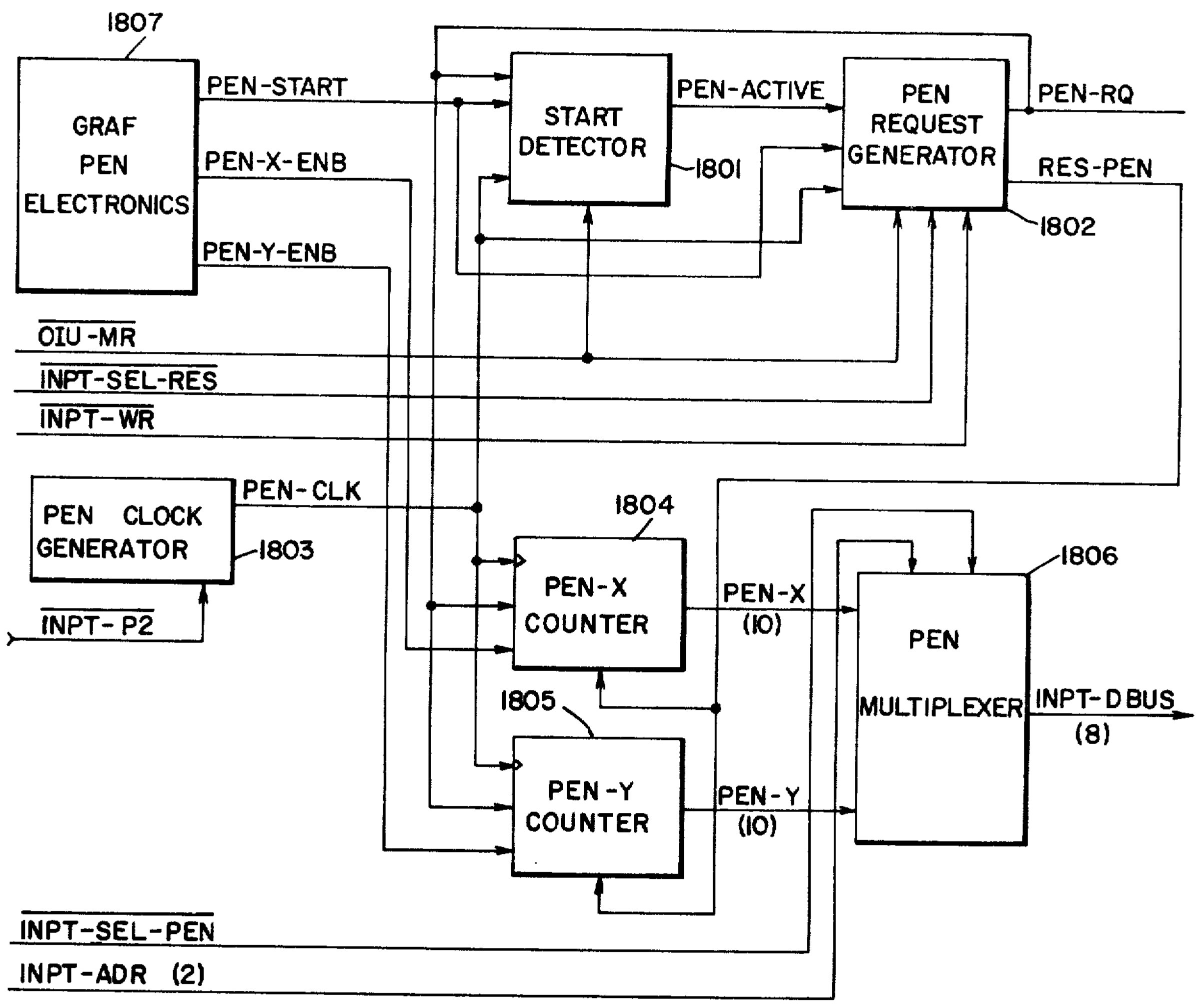
FIG. 18 illustrates a detailed implementation of a GRAF control processor of FIGS. 4A and 4B which is also depicted as the GRAF PEN INTERFACE 1501 in FIG. 15, the purpose of which is to allow communication to a sound driven operator interaction device.
Figure 56A:
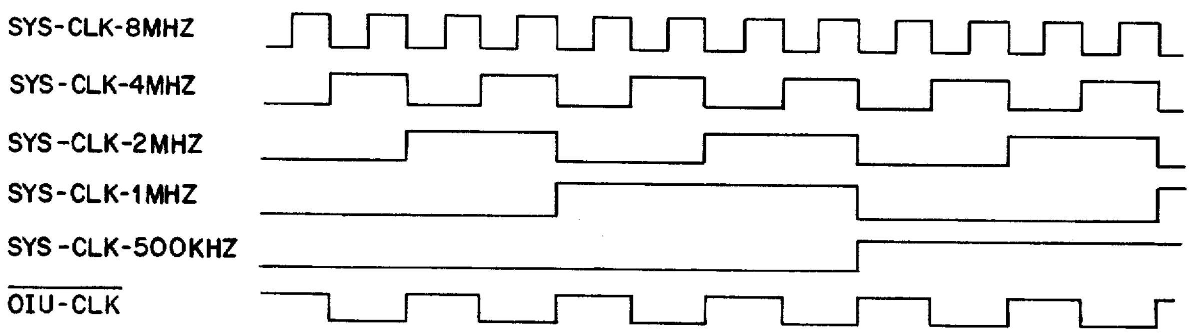
FIG. 56A illustrates the system clock timing in the OIU processor of FIG. 16A.
Figure 56B:
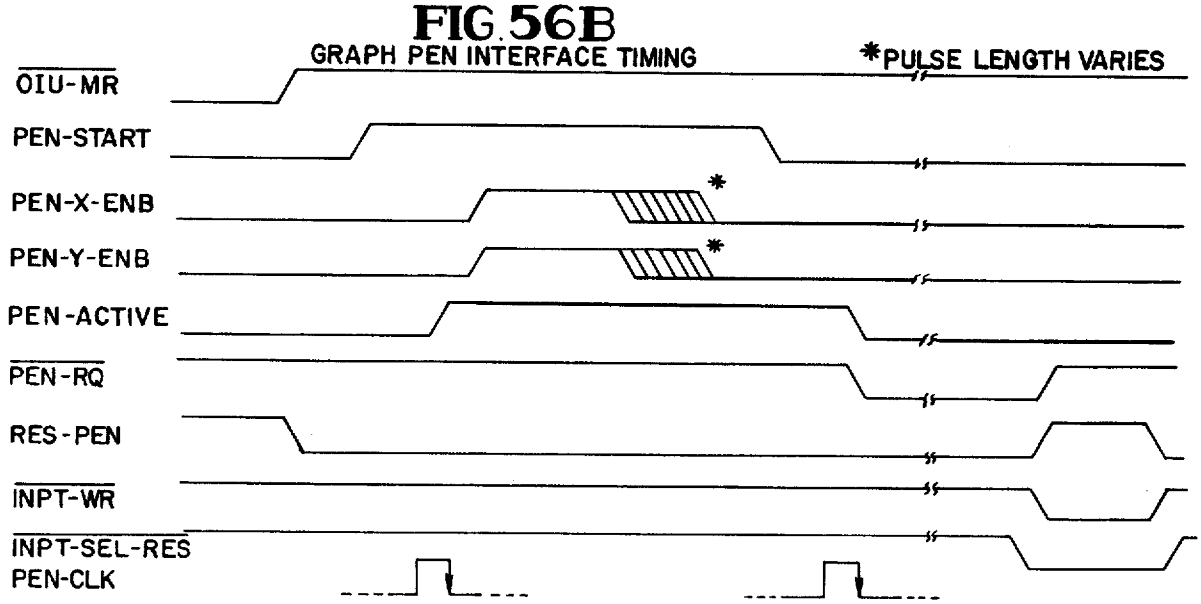
FIG. 56B illustrates the timing for the GRAF processor of FIG. 18.

The GRAF processor circuit 1501 is shown in greater detail in FIG. 18, and the circuit timing is shown in FIG. 56B. The Graf Pen Electronics 1807 is an external processor (as identified in APPENDIX A) which produces three pulse signals whenever the electronics is activated by an operator pen entry. The PEN-START signal is a long pulse which overlaps the other two signals and causes the request signal PEN-RQ to be generated. The start detector circuit 1801 generates PEN-ACTIVE-1 to the pen request generator circuit 1802 when $$(\overline{\text{PEN-RQ}}\cdot\text{PEN-START})=1$$

and is synchronized with the trailing edge (logic 1 to 0 transition) of the PEN-CLK signal. The PEN-ACTIVE signal is reset (set to logic 0) when $$\text{OIU-MR}=1$$

or when $$(\text{PEN-RQ}+\overline{\text{PEN-START}})=1$$

and the trailing edge of the PEN-CLK signal occurs. The request generator circuit 1802 generates the $\overline{\text{PEN-RQ}=1}$ signal to the OIU CAR circuit 1507 in FIG. 15 when $$((\text{PEN-ACTIVE}\cdot\overline{\text{PEN-START}})+\text{PEN-RQ})=1$$

and the trailing edge of the PEN-CLK signal occurs. Once the request is activated (logic 1 value), it remains so until $$((\text{INPT-WR}\cdot\text{INPT-SEL-RES})+\text{OIU-MR})=\text{RES-PEN}=1$$

The signal RES-PEN also serves to reset (set to 0) the pen X and Y counter circuits 1804 and 1805. The OIU CAR circuit responds to the $\overline{\text{PEN-RQ}}$ signal by generating a "PROCESS PEN ENTRY" instruction to the INPT processor. After INPT has completed its processing, it causes $\overline{\text{PEN-RQ}}$ to be reset via the OIU INPT interface circuit 1506. This circuit generates the $\overline{\text{INPT-SEL-RES}}$ and $\overline{\text{INPT-WR}}$ signals to the pen request generator circuit 1802 and this allows another operator pen entry to be processed.

The pen clock generator circuit 1803 generates a 0.816 MHZ clock signal called PEN-CLK from a 1.667 MHZ input clock signal called $\overline{\text{INPT-P2}}$ from the INPT processor. The pen clock generator contains toggle switches which allow a binary number N to be adjusted from 128 to 255 affecting a change in the frequency of PEN-CLK generated, given by the equation:

$$f_{PEN\text{-}CLK} = \frac{1}{2}\left(1 - \frac{1}{256\text{-}N}\right) f_{\overline{INPT\text{-}P2}}$$

The circuit is essentially a count by (256-N) counter which removes one pulse of the input clock signal every time the counter overflows to zero. An additional counter stage is used to effect the final frequency divide by two. N is normally set to 207 in this circuit. The PEN-CLK frequence is chosen to allow a convenient linear scale factor between the PEN-X and PEN-Y pen counter outputs and the distance covered by the pen sound wave across the display surface. This allows the pen coordinates to be proportional to the display address.

The PEN-X counter 1804 and the PEN-Y counter 1805 are binary counters which count up from zero at the rate set by PEN-CLK, and count only when enabled by the equations:

$$(\overline{\text{PEN-RQ}})\cdot\text{PEN-X-ENB})=1$$

and $$(\overline{\text{PEN-RQ}}\cdot\text{PEN-Y-ENB})=1$$

respectively. The Graf Pen Electronics generates PEN-X-ENB and PEN-Y-ENB pulse signals so that the pulse length (time active) of each is exactly the time required for the pen sonic impulse to travel to the X and Y linear microphones connected to the electronics package. The resulting counter values, PEN-X and PEN-Y, are proportional to the pen distances from the X and Y linear microphones, and thus can be considered to be the X and Y coordinates of the pen position over the display.

The ten bit PEN-X and PEN-Y signals are transferred to the INPT processor by the pen multiplexer circuit 1806 which puts the counter values on the INPT-DBUS data bus when enabled to do so by instructions from the INPT processor. In addition, six bits of fine adjustment information (toggle switches) can also be selected for output on the INPT-DBUS lines. Two INPT-ADR signals from the INPT interface circuit 1506 serve to select which of PEN-X, PEN-Y or the fine adjustment information is desired, and $\overline{\text{INPT-SEL-PEN}}=0$ enables or causes the selected information to be placed on INPT-DBUS. In processing the "PROCESS PEN ENTRY" instruction, the INPT processor reads the PEN-X, PEN-Y and fine adjustment values by acting through the INPT interface circuit to effect the enabling and control of the pen multiplexer as described.

BOOT CIRCUIT

Figure 17A:
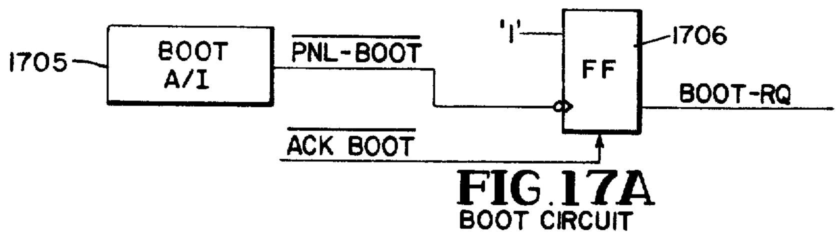
FIG. 17A illustrates an implementation of the bootstrap control processor circuit (BOOT CIRCUIT 1502) of FIG. 15, the purpose of which is to initiate initial program loading in the system.
Figure 17B:
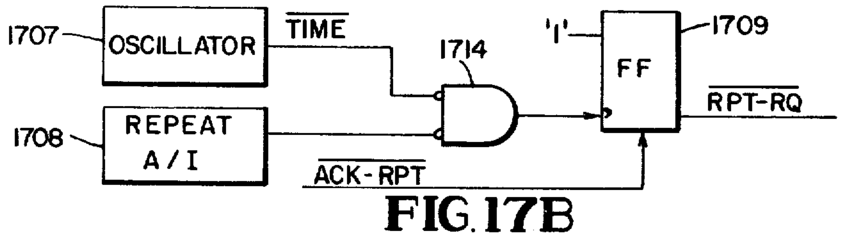
FIG. 17B illustrates an implementation of the repeat control processor circuit (1503) of FIG. 15, said circuit allowing multiple entry of operator entries under operator control.
Figure 56C:
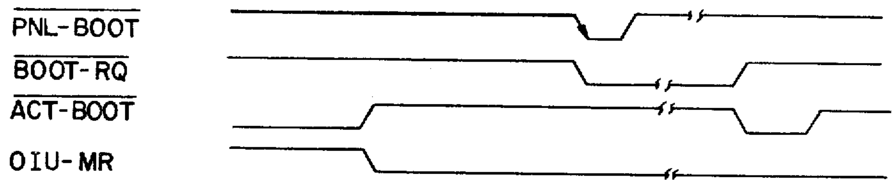
FIG. 56C illustrates the timing of the BOOT control processor of FIG. 17A.

The boot circuit 1502 which is normally considered part of the KYBD processor is shown in FIG. 17A, and FIG. 56C shows the boot circuit timing. When the operator depresses the BOOT A/I switch 1705, the $\overline{\text{PNL-BOOT}}$ signal is driven low (logic 0). The high to low transition of $\overline{\text{PNL-BOOT}}$ causes the request $\overline{\text{BOOT-RQ}}=0$ signal to be generated to the OIU CAR circuit 1507. The CAR responds to this request by generating a "BOOTSTRAP" instruction to the INPT processor and sending the ACTIVE acknowledge signal $\overline{\text{ACK-BOOT}}=0$ to the BOOT flip-flop 1706. This signal resets the request to $\overline{\text{BOOT-RQ}}=1$. BOOT is a very simple example of a control processor under the definitions of my invention.

REPEAT CIRCUIT

Figure 56D:
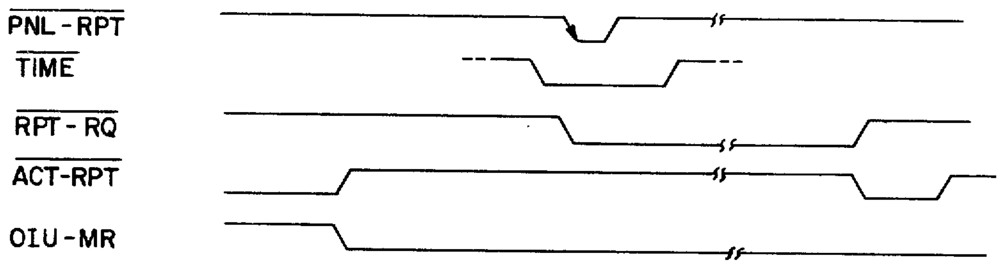
FIG. 56D illustrates the detailed timing of the repeat circuit of an OIU processor illustrated in FIG. 17B.

The repeat circuit 1503 which also is normally considered part of the KYBD processor is shown in greater detail in FIG. 56D. The oscillator 1707 is a RC (Resistor-Capacitor) timing circuit based on the Signetics 555 timer as listed in APPENDIX J which generates a low frequency square wave signal called $\overline{\text{TIME}}$. This signal is combined with the $\overline{\text{PNL-RPT}}$ signal from the repeat A/I switch 1708 so that when $$(\text{TIME}\cdot\text{PNL-RPT})=1$$

the repeat request flip-flop 1709 generates the request signal $\overline{\text{RPT-RQ}}=0$ to the OIU CAR circuit 1507. The CAR responds to this request by generating a "REPEAT" instruction for the INPT processor and sending an ACTIVE acknowledge signal $\overline{\text{ACK-RPT}}=0$ to the repeat request flip-flop. This signal resets the request to $\overline{\text{RPT-RQ}}=1$. REPEAT is a second example of a very simple control processor.

KEYBOARD PROCESSOR CIRCUIT

Figure 17C:
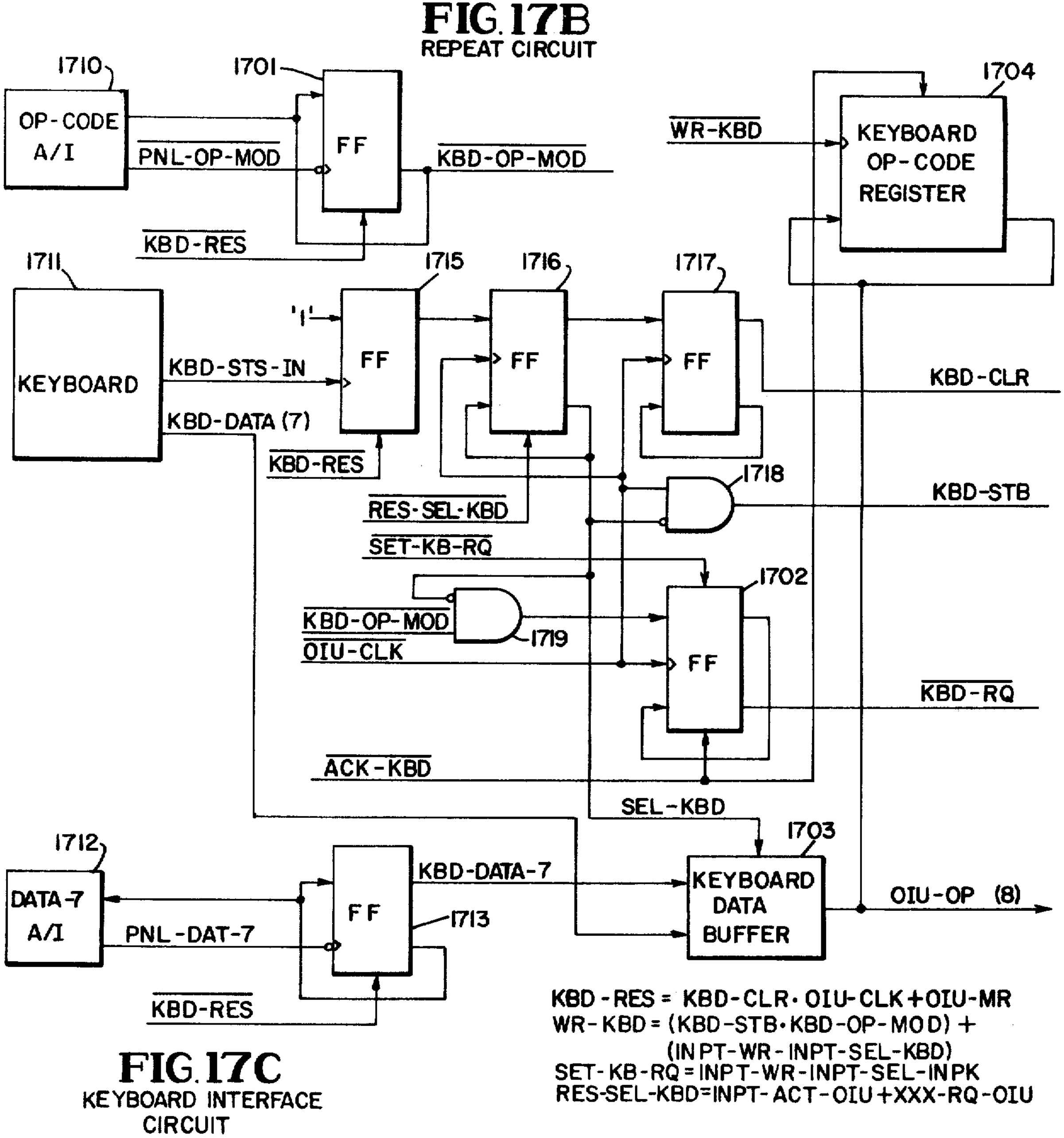
FIG. 17C illustrates a detailed implementation of a keyboard control processor of FIGS. 4A and 4B which is also depicted as the KYBD in FIG. 15, said circuit allowing communication with a keyboard external processor.
Figure 56E:
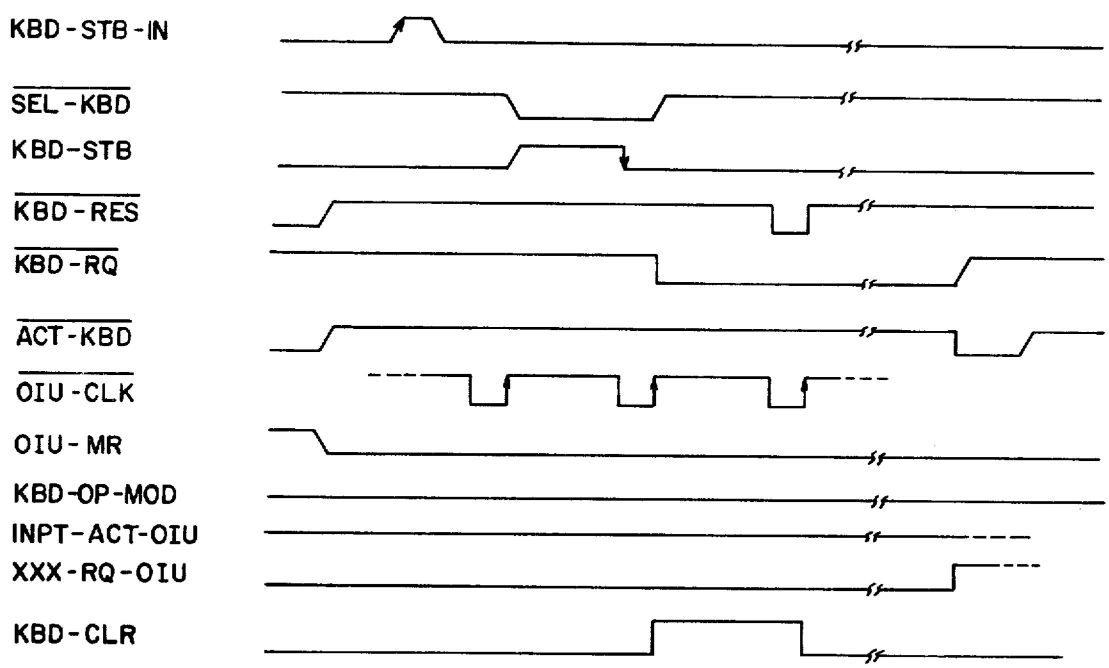
FIG. 56E illustrates the detailed timing of the interaction of the OIU with a KYBD control processor illustrated in FIG. 17C.

The keyboard processor circuit 1504 in FIG. 15 is shown in greater detail in FIG. 17C, and the circuit timing is shown in FIG. 56E. The KYBD processor generates instructions to the OIU processor from operator inputs on a typewriter-like keyboard external processor. This circuit interfaces with a standard ASCII keyboard 1711 and two A/I's (actuator/indicators) 1710 and 1712. The two A/I's are non-latching push button switches which change "state" with every actuation as indicated by lamps within the switches. The keyboard OPCODE mode flip-flop 1701 and the DATA-7 flip-flop 1713 each alternate state with each leading edge transition of the A/I signals $\overline{\text{PNL-OP-MOD}}=0$ and $\overline{\text{PNL-DAT-7}}=0$ respectively. $\overline{\text{KBD-RES}}=0$ resets the state of these flip-flops so that $\overline{\text{KBD-OP-MOD}}=1$ and $\overline{\text{KBD-DAT-7}}=1$.

The ASCII Keyboard 1711 generates 7-bits of KBD-DATA and a pulse KBD-STB-IN whenever a key is depressed. The data is is combined with the KBD-DAT-7 signal to meet the standard 8-bit word (character) system format, and is buffered by keyboard data buffer register 1703 before being placed on the OIU-OP signal lines. When the buffer is enabled by the $\overline{\text{SEL-KBD}}=0$ signal, the keyboard data is used to load either the keyboard OPCODE register 1704 and the OIU data register 1509 or just the keyboard OPCODE register.

The keyboard request generator flip-flops 1715, 1716, 1717 and 1702 generate the timing and control signals shown, following a strobe signal input from the keyboard. If $$(\text{INPT-ACT-OIU}+\text{XXX-RQ-OIU})=1$$

then the $\overline{\text{SEL-KBD}}=0$ signal is not generated following the keyboard strobe. This prevents possible usage conflicts over the OIU-OP bus. The OIU signal $\overline{\text{OIU-CLK}}$ is used to synchronize the signals generated by this circuit. The OIU-MR=1 signal serves to reset the circuit and also generates the $\overline{\text{KBD-RES}}=0$ signal. Following a keyboard strobe input, the $\overline{\text{SEL-KBD}}=0$ signal is generated for one clock period as shown in FIG. 56B. This signal causes the keyboard data to be placed on the OIU-OP bus. KBD-STB=1 is then generated and is used to effect the loading of the keyboard OPCODE register and the OIU data register. If $\overline{\text{KBD-OP-MOD}}=0$, then both registers are loaded; otherwise, only the OIU data register is loaded with keyboard data. Following KBD-STB=1, the request $\overline{\text{KBD-RQ}}=0$ is generated, but only if $\overline{\text{KBD-OP-MOD}}=1$; otherwise, no further action takes place. Thus, if the keyboard interface circuit is in the OPCODE mode ($\overline{\text{KBD-OP-MOD}}=0$), then keyboard data is loaded into the keyboard OPCODE and OIU data registers, and no request is generated. If the circuit is not in this mode ($\overline{\text{KBD-OP-MOD}}=1$), then keyboard data is loaded into the OIU data register and a request is generated to the OIU control circuitry.

When the OIU control circuitry receives the keyboard request, the circuitry sets $\overline{\text{ACK-KBD}}=0$ which resets the request and causes the keyboard OPCODE register contents to be placed on the OIU-OP bus. The keyboard output instruction (now OIU instruction) is then passed to the INPT or META processor. Normally, the instruction is a "PROCESS KEYBOARD ENTRY" instruction for INPT, although the capability exists for the operator to enter any instruction into the system with the keyboard by using the OPCODE A/I switch.

The keyboard OPCODE register 1704 is loaded from the OIU-OP bus with either KBD-STB=1 or under INPT control with $$(\overline{\text{INPT-SEL-KBD}}+\overline{\text{INPT-WR}})=0$$

from the INPT interface circuit. When the keyboard OPCODE register is loaded under INPT control, the OIU-OP bus contains INPT-DBUS data. During the time periods of system initialization and bootstrap, the INPT processor uses this capability to load the "process keyboard entry" OPCODE into the keyboard OPCODE register so that manual entry of this OPCODE is not required.

The INPT processor has the capability of generating a pseudo keyboard request via the INPT interface circuit by setting $\overline{\text{SET-KB-RQ}}$=0. Once this occurs, the OIU control circuitry processes the request in the same manner as any other keyboard request.

FORM INTERFACE CIRCUIT

Figure 53A:
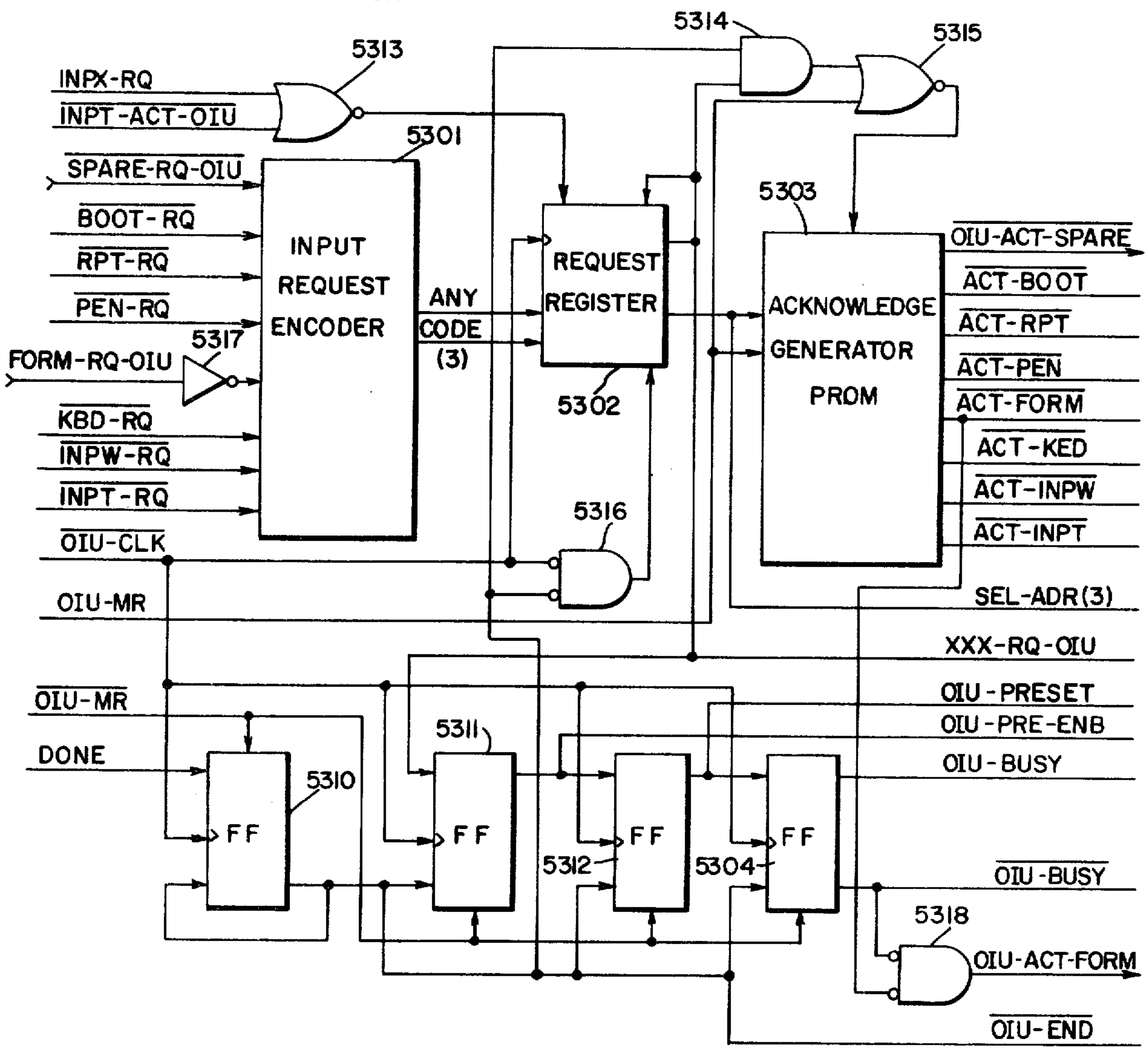
FIG. 53A is a detailed implementation of the control circuit portion of FIG. 15 including both the control circuitry 1507 and a multiple control arc receiver (FORM interface circuit 1505) for an OIU processing element in accordance with the general scheme of FIGS. 5D and 5L.
Figure 53B:
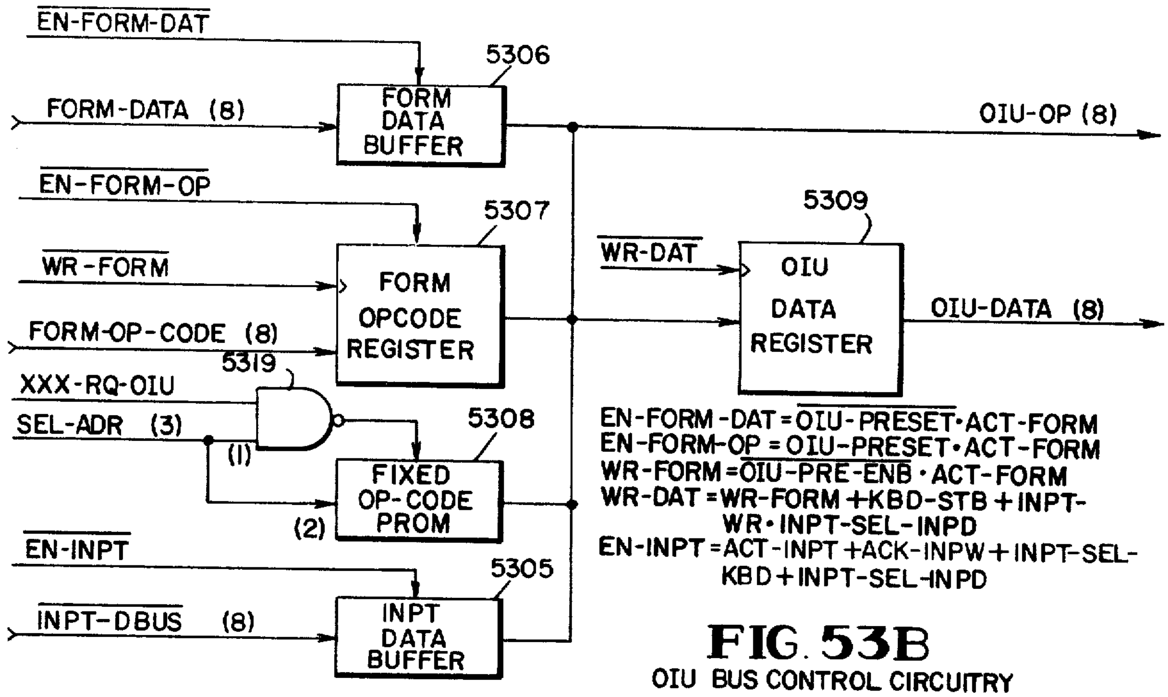
FIG. 53B illustrates the detailed implementation of the data bus control circuitry portion of FIG. 15 for an OIL processor for allowing the connection to several data sources.

The FORM interface circuit 1505 is shown in more detail in FIGS. 53A and 53B. FIG. 53A shows the FORM-RQ-OIU signal input request to the OIU input request encoder 5301. In responding to this request, the OIU control circuitry generates the active signal OIU-ACT-FORM as shown. The OIU CAR control circuitry is described in later paragraphs.

Figure 56F:
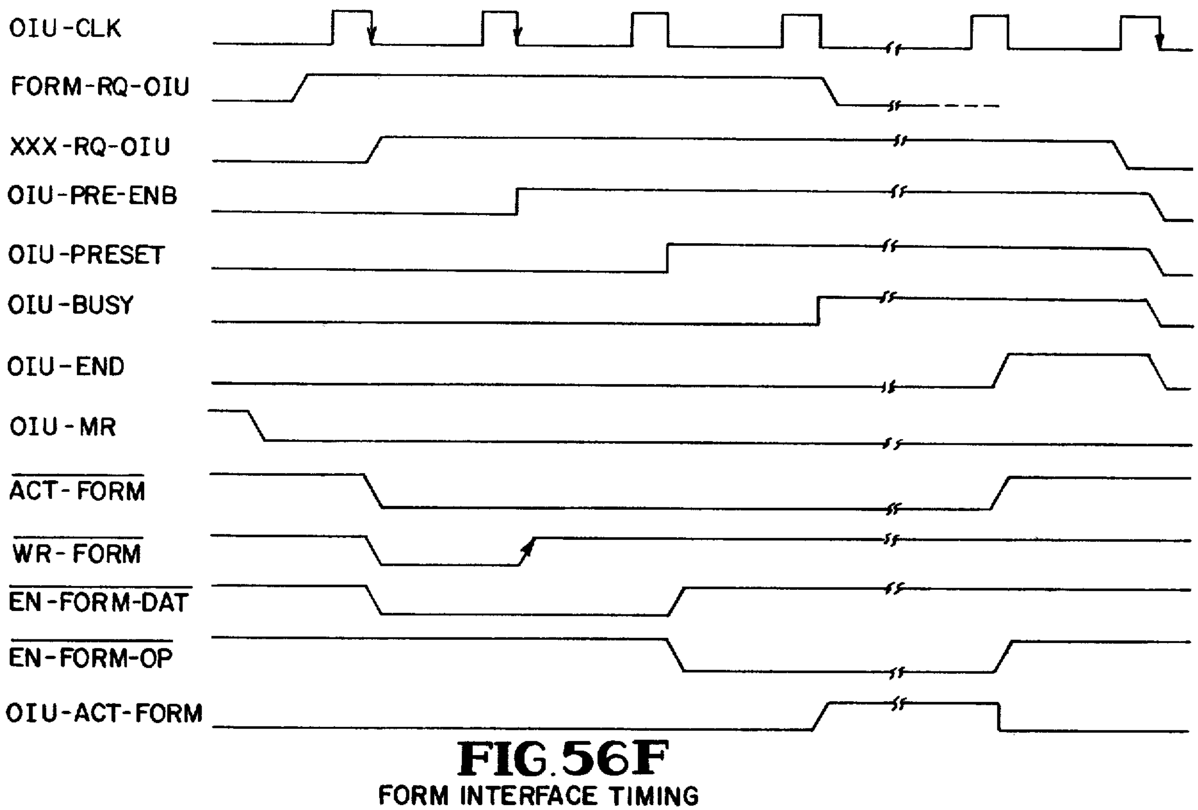
FIG. 56F illustrates the detailed timing of reception of instructions from a FORM processor to an OIU processor illustrated in FIG. 53A.

FIG. 53B shows the FORM data buffer 5306 and FORM OPCODE register 5307. In processing a FORM request, the FORM data buffer is enabled with the $\overline{\text{EN-FORM-DAT}}$=0 signal, placing FORM-DATA on the OIU-OP bus. This data is loaded into the OIU data register 5309 with $\overline{\text{WR-FORM}}$=1. At the same time, the FORM OPCODE register is loaded with FORM OPCODE. Subsequently, the OPCODE register contents are enabled onto the OIU-OP bus with $\overline{\text{EN-FORM-OP}}$=0, and the FORM instruction, now OIU instruction, is passed to the INPT or META processor. FIG. 56F shows the FORM interface timing.

INPT INTERFACE CIRCUIT

Figure 55:
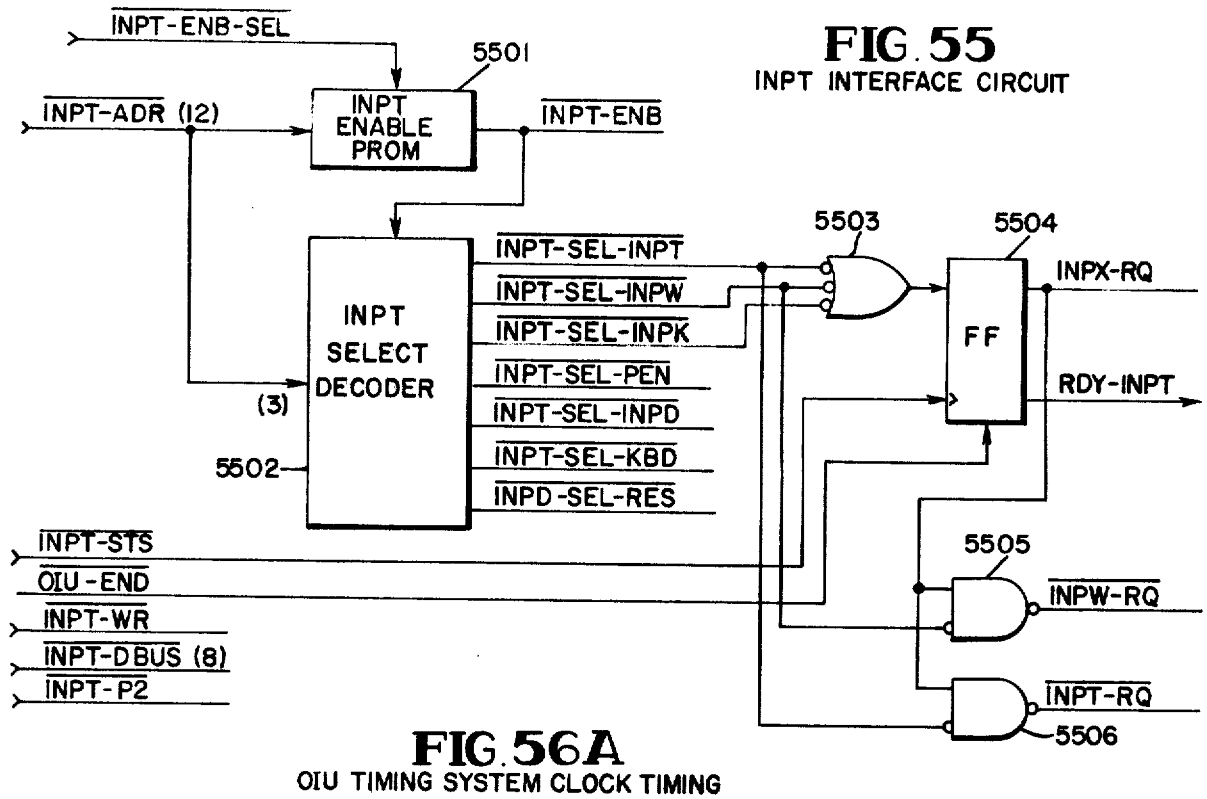
FIG. 55 is a detailed implementation of an INPT interface circuit 1506 of FIG. 15.
Figure 56G:
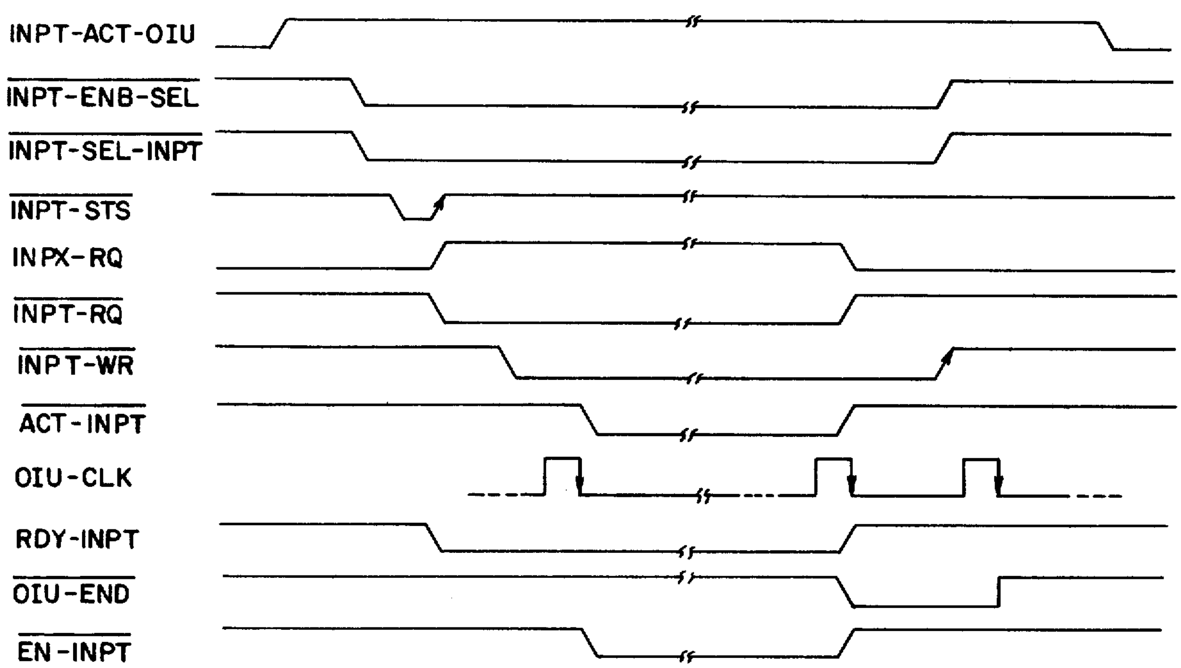
FIG. 56G illustrates the interface timing of an OIU processor with an INPT processor for the circuit illustrated in FIG. 54.

The INPT interface circuit 1506 is shown in greater detail in FIG. 55, and the circuit timing is shown in FIG. 56G. The INPT interface circuit can do seven different functions corresponding to the seven different output signals of the INPT select decoder 5502. When $\overline{\text{INPT-ENB-SEL}}$=0, the address bus INPT-ADR is checked for valid values by the enable PROM 5501. If the address is valid, then the INPT ENABLE PROM 5501 (as defined in detail in APPENDIX H) generates $\overline{\text{INPT-ENB}}$=0 which enables the address decoder. The functions performed or started by the decoder outputs are listed below:

(1) $\overline{\text{INPT-SEL-INPT}}$: pass INPT instruction.
(2) $\overline{\text{INPT-SEL-INPW}}$: pass-wait INPT instruction.
(3) $\overline{\text{INPT-SEL-INPK}}$: pass keyboard instruction.
(4) $\overline{\text{INPT-SEL-PEN}}$: enable pen multiplexer 1806 onto INPT-DBUS.
(5) $\overline{\text{INPT-SEL-INPD}}$: load OIU data register from INPT-DBUS data.
(6) $\overline{\text{INPT-SEL-KBD}}$: load keyboard OPCODE register from INPT-DBUS data.
(7) $\overline{\text{INPT-SEL-RES}}$: reset pen request and counters.

When enabled the decoder sets one of these outputs low (=0) and the rest high (=1).

Any of the first three outputs cause the flip-flop 5504 to be set with the strobe signal $\overline{\text{INPT-STS}}$. This flip-flop generates INPX-RQ=1 and RDY-INPT=0. The latter signal causes the INPT processor to suspend its operation until the OIU has finished passing the INPT or keyboard OPCODE and $\overline{\text{OIU-END}}$=0 resets the flip-flop. Either of two requests can be generated by gates 5505 and 5506

INPW-RQ=INPX-RQ·INPT-SEL-INPW or

INPT-RQ - INPX-RQ·INPT-SEL-INPT

In processing these requests, the OIU enables the INPT-DBUS onto the OIU-OP bus with $\overline{\text{EN-INPT}}$=0 (see FIG. 53B, INPT data buffer 5305). The OIU data register must be loaded previously, with $\overline{\text{INPT-SEL-INPD}}$=0, to provide data to be passed out with the OIU-OP OPCODE. After the instruction has been passed (to the META), the OIU control circuitry generates $\overline{\text{OIU-END}}$=0 which resets the INPT request flip-flop 5504.

OIU CAR CONTROL CIRCUITRY

Figure 56H:
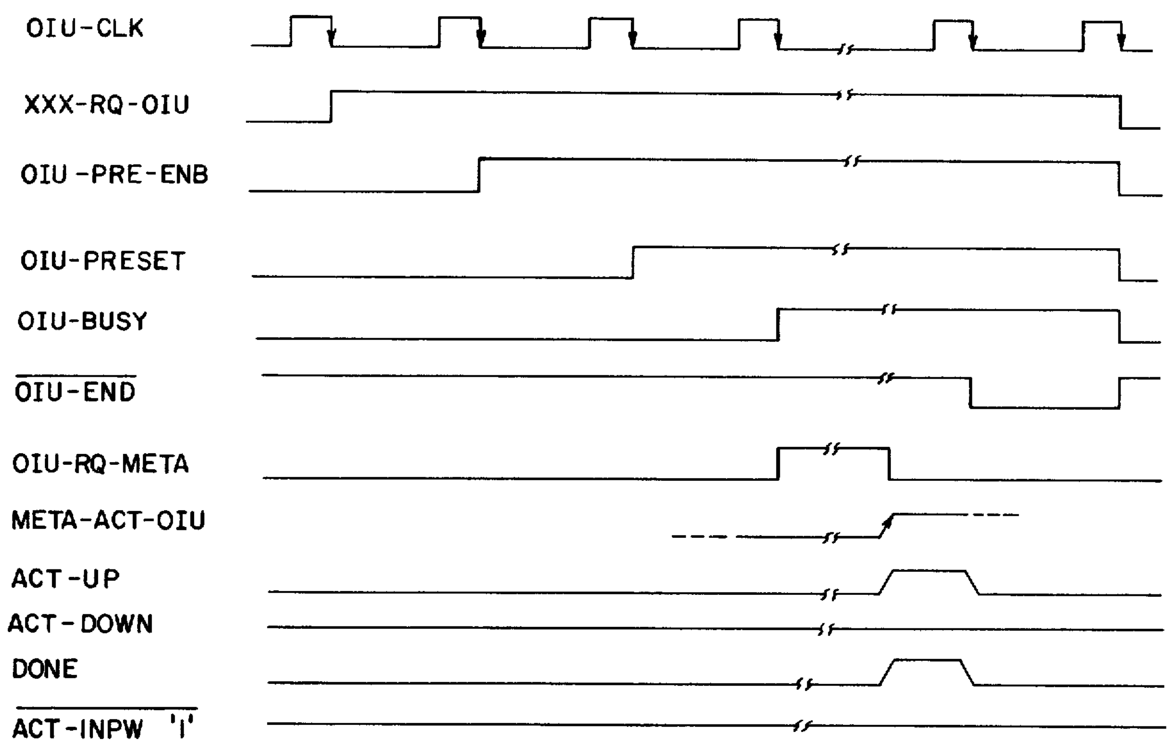
FIG. 56H illustrates the instruction interface timing of operations for an OIU processor passing out an instruction for the circuit of FIG. 54.

The OIU CAR control circuitry 1507 is shown in greater detail in FIGS. 53A and 53B, and the circuit timing is shown in FIGS. 56F and 56H. Eight request signals are prioritized and encoded by the input request encoder 5301 which forms the basis of multiple control arc input. The output ANY=1 indicates the presence of any request input to the encoder, and CODE is the 3-bit priority number of the highest priority request present. The CODE any ANY signals are loaded into the request register 5302 repeatedly with the $\overline{\text{OIU-CLK}}$ signal until 1=ANY=XXX-RQ-OIU. Also the request register is inhibited from being loaded if INPT-ACT-OIU·$\overline{\text{INPX-RQ}}$=1

This prevents any requests other than those initiated by the INPT interface circuit from getting recognized when INPT is active. When a request is recognized, XXX-RQ-OIU=1, and the request register is not reloaded until it is reset by

OIU-END·OIU-CLK=1 the CODE signal becomes SEL-ADR after being loaded into the request register 5302, and is used to address the ACTIVE acknowledge generator PROM 5303. This PROM is programmed (as defined in detail in APPENDIX E) to emulate a decoder circuit with the difference that when OIU-MR=1, the ROM output acknowledges are all activated. The ROM outputs are enabled when OIU-MR+(XXX-RQ-OIU·$\overline{\text{OIU-END}}$)=1 and the result is a low output acknowledge corresponding to the SEL-ADR code held in the request register.

The signal XXX-RQ-OIU=1 initiates a timing chain of flip-flops 5311, 5312 and 5304 which control the sequencing of OIU activities. The flip-flop signals control the flow of information on the OIU-OP bus in preparation for passing out an OIU instruction when OIU-BUSY=1. After the instruction has been passed out, the output instruction circuit sets $\overline{\text{DONE}}$=1, which causes flip-flop 5310 to generate $\overline{\text{OIU-END}}$=0. This last serves to reset the control circuitry and prepare the circuit to respond to another request.

The first four request sources, SPARE, BOOT, REPEAT and PEN, do not generate their own instructions. Instead, the fixed OPCODE ROM 5308 (as defined in detail in APPENDIX F) is used to supply OPCODES for these request sources. The remaining four request sources generate their own instruction OPCODES as has been described.

OIU CAT OUTPUT INSTRUCTION CIRCUIT

Figure 54:
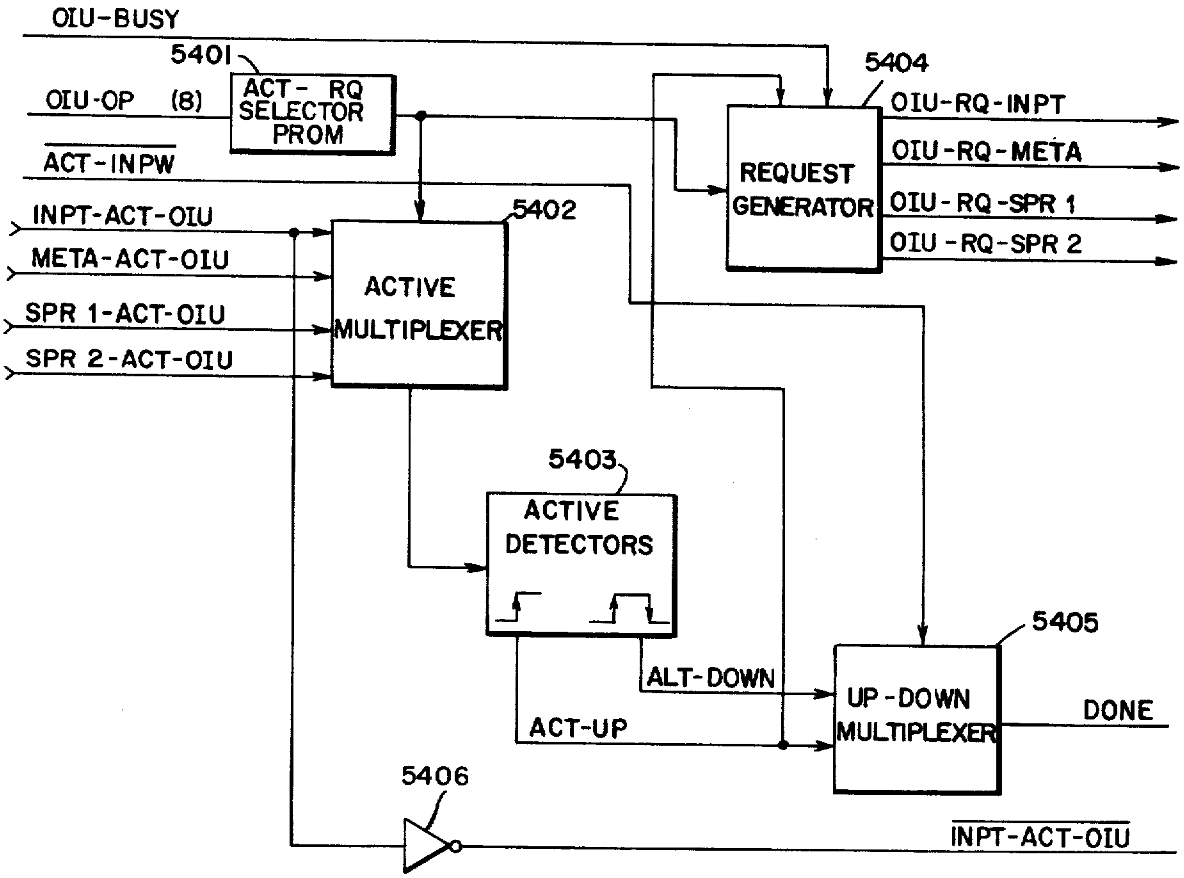
FIG. 54 is a detailed implementation of the control arc transmit logic of the output instruction circuit 1508 of FIG. 15 for an OIU processor in accordance with the general scheme of FIGS. 5J and 5K.
Figure 56I:
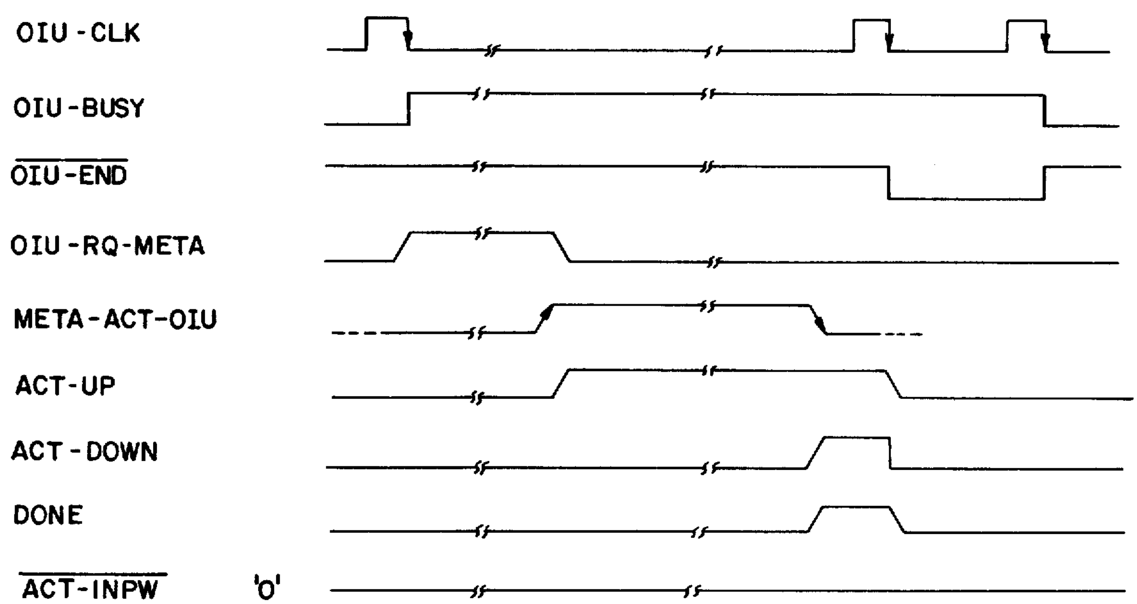

The OIU CAT output instruction circuit 1508 is shown in greater detail in FIG. 54, and the circuit timing is shown in FIGS. 56H and 56I. The OPCODE on the OIU-OP bus addresses the active/request selector PROM 5401 (defined in detail in APPENDIX G), which generates the RQ-ADR request address. Different OPCODES generate request addresses for their corresponding destination processors. When $\overline{\text{ACT-UP}}\cdot\text{OIU-BUSY}=1$ the request generator (decoder) 5404 generates an OIU request to the destination processor specified by the request address.

The same request address is used to switch the active multiplexer 5402 so that the active signal from the processor requested is monitored by the active edge detector circuit 5403. When the selected active goes from low (=0) to high (=1), the ACT-UP=1 signal is generated. When ACT-UP=1 and the selected active goes from high to low, ACT-OOWN=1 is generated. When the circuit is in pass-wait mode, $\overline{\text{ACT-INPW}}$=0, and ACT-DOWN is switched by the up-down multiplexer 5405 to supply the DONE signal. Otherwise, $\overline{\text{ACT-INPW}}$=1, and ACT-UP is switched to supply the DONE signal to the OIU control circuitry.

SYSTEM CLOCK AND MASTER RESET

Figure 52:
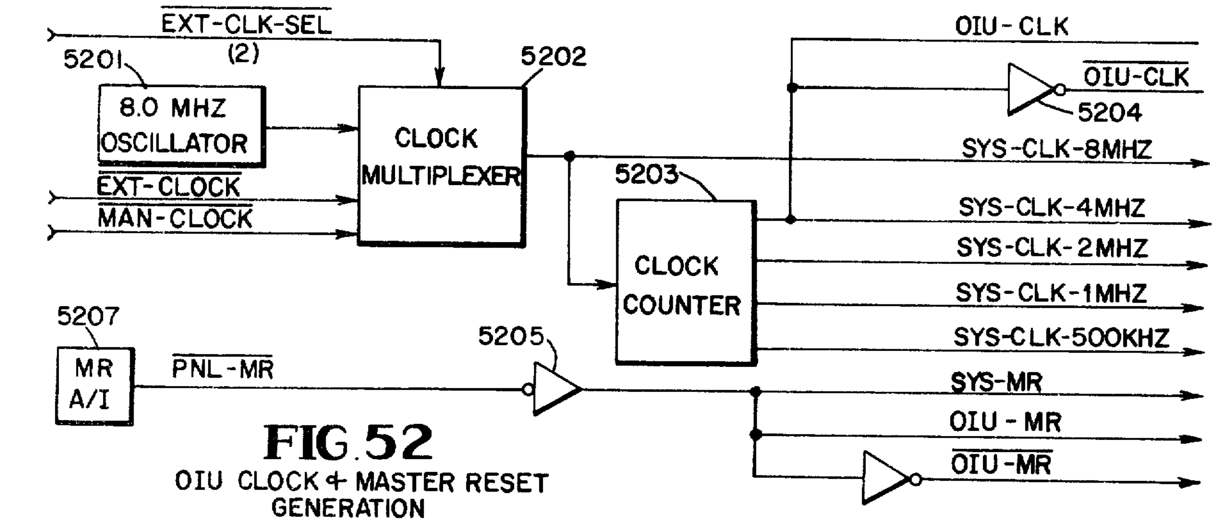
FIG. 52 is a detailed implementation of the system clock and master reset circuit 1510 of FIG. 15 in an OIU processor.

The system CLOCK and MASTER RESET generation circuit 1510 is shown in greater detail in FIG. 52, and the clock circuit timing in FIG. 56A. The system clock source can be selected between an internal oscillator 5201 and an external or manual clock by the clock multiplexer 5202. The external clock source is used only for maintenance purposes. Slower clock frequencies for different speed processors in the system are generated by the clock counter 5203. System MASTER RESET is generated by the MR actuator/indicator, and buffered in the OIU. The MASTER RESET signal is used by most processors in the example system to initialize control circuitry prior to program execution.

INPT DESCRIPTION

Figure 16A:
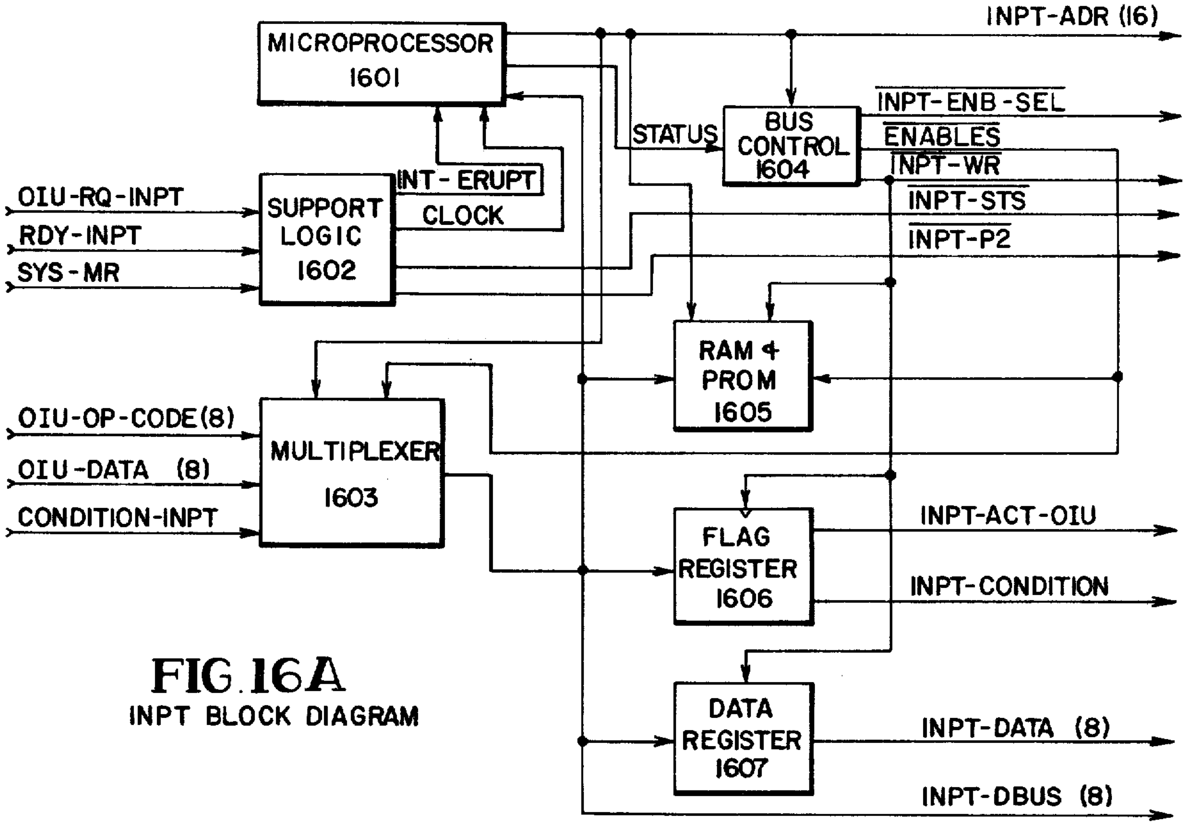
FIG. 16A is a block diagram of an implementation of an INPT processing element of FIGS. 4A and 4B, the purpose of which is to process operator input data.
Figure 16B:
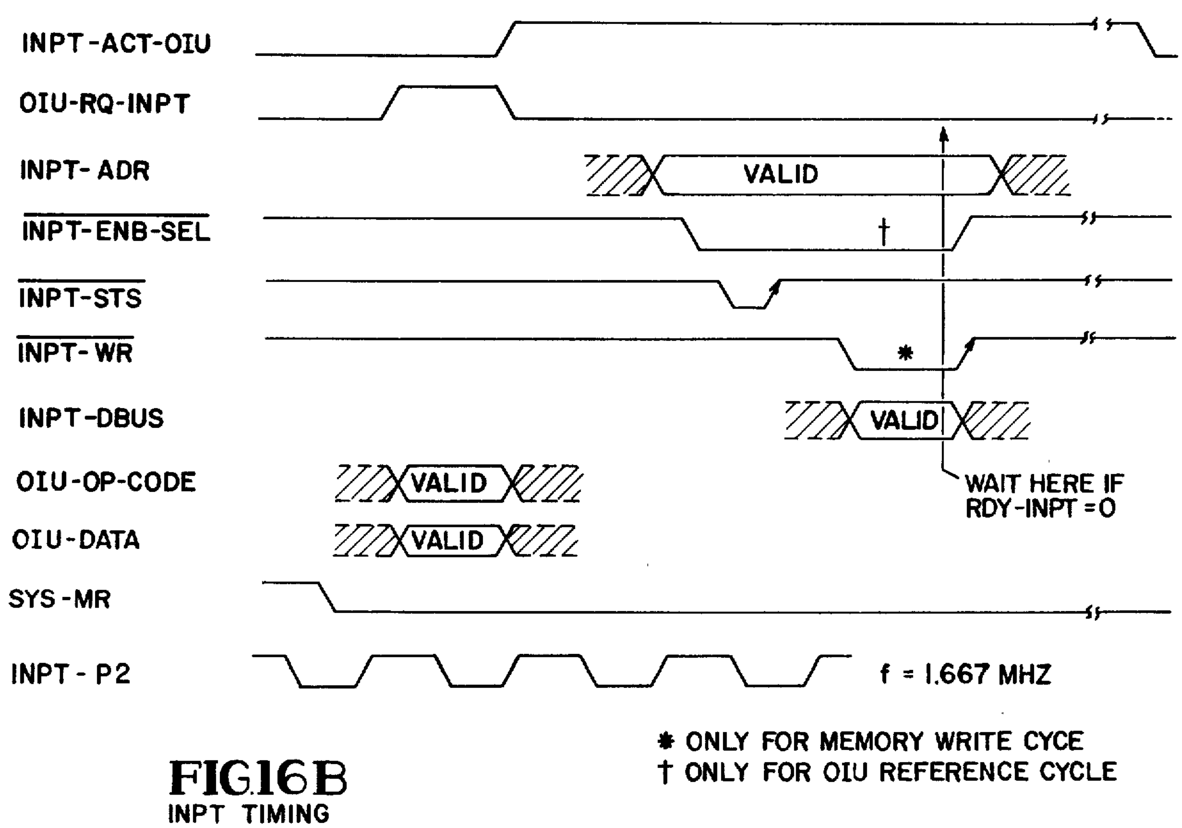
FIG. 16B illustrates the timing for the interface between the OIU and INPUT information processing elements of FIGS. 4A, 4B, 15 and 16A.

INPT or Input Processor is a general purpose microprocessor based processor which makes use of special interface circuits in the OIU to function as a control processor in the system. FIG. 16A is the INPT block diagram and FIG. 16B shows the INPT interface timing. The other circuits in INPT are controlled by the microprocessor and support logic. The address bus INPT-ADR from the microprocessor is used by the bus control logic 1604 to select data sources and destinations for data on the INPT-DBUS microprocessor data bus. The INPT-DBUS bus is a bidirectional data path linking the microprocessor with registers and memory within INPT, and also is used to transfer information to and from the OIU. Components for constructing an INPT processor are lists in APPENDIX K.

The support logic 1602 provides clock and reset signals for the microprocessor. The clock is derived from a crystal controlled oscillator circuit, and one of this clock's derivatives is the 1.667 MHZ square wave signal $\overline{\text{INPT-P2}}$ which is sent to the OIU sonic pen circuit. At the beginning of each microprocessor memory read or write cycle, a strobe $\overline{\text{INPT-STS}}$ is generated. When OIU-RQ-INPT=1, the support logic generates an interrupt to the microprocessor, which starts executing its program stored in the PROM 1605, which is defined in detail in APPENDIX I. The RDY-INPT signal is used for suspending the microprocessor operation in the middle of a memory read or write cycle (if RDY-INPT=0).

The bus control logic decodes the address bus and microprocessor status to generate enables to the data sources on the data bus, write strobes to the data destinations, and an external enable $\overline{\text{INPT-ENB-SEL}}$ for the OIU. The microprocessor status information determines whether a read or write cycle will occur.

The multiplexer 1603 is used to get OIU-OPCODE, OIU-DATA and condition input signals onto the microprocessor data bus.

The RAM and ROM memory 1605 is used for table and variable storage, and program storage respectively.

The flag register 1606 is used to generate the INPT-ACT-OIU active and condition output signals.

The data register 1607 is used to generate latched data output, INPT-DATA, which is not used in the present system.

MASS DATA TRANSFER SUBSYSTEM

The Mass Data Transfer Subsystem (MDTS) portion of the example training system consists of the: Format Processor (FORM), Working File Buffer Processor (WFB), Data Link Processor (DL), Mass Storage Processor (MSC), Floppy Disk Processor (FDIU), and Mass Storage Device external processor as shown in FIG. 5. This section describes the purpose and operation of this subsystem and the processors in it.

The MDTS's primary purpose is to manage block data transfers between the Mass Storage Device and the other portions of the system. Secondly, it is used by the Program Execution and Inputs Processing sections of the system to build, form, and/or manipulate data into data blocks (defined to be 256 eight-bit data characters) for use by the Program, Display, or Mass Transfer portions of the system. Additionally, it may be directed to perform operations on data strings of the type defined previously. The strings may originate from sources including the Mass Storage Device and the Input and Program Execution portions of the system. These operations are of an interpretive nature using the state defined control concept and allow strings to be broken down into control and data substrings for distribution to other processors. Finally, it provides instruction and data paths for interaction with the other subsystems.

The Format Processor (FORM) is a control processor which directs other processors in the MDTS and serves as the MDTS node for interaction with other portions of the system. It implements the state defined control operations. The Working File Buffer Processor (WFB) is a data processor which is used to implement the data forming function and is similar in design with the previously described PMEM processor. The Data Link processor (DL) is a data processor which is used to buffer blocks in a memory called a Mass Storage Buffer (MSB) to and from the mass storage device and to multiplex data betweem processors and other parts of the system. Additionally, it contains a comparison function to test the equality of two data words. Taken together, the FORM and DL perform similar types of operations performed by the METAPROCESSOR except that the Mass Storage Buffer (MSB) is added and not all the METAPROCESSOR self-instructions are implemented in the FORM. The Mass Storage (MS) Processor is a control processor which, together with the Floppy Disk Processor, implements mass storage access and data transfer operations. The Floppy Disk Processor (FD) is a data processor which interfaces with the Mass Storage External Device. It performs control and data transfer motions between the Mass Storage Device and the Mass Storage Processor. Additionally, the Floppy Disk Processor provides arithmetic and temporary register storage functions for use by the MS. The Mass Storage Device is an external processor which is used to store blocks of data in a non-volital fashion for use by the other portions of the system. In this application, the device is a Floppy Disk Drive of the type defined in APPENDIX A.

The MDTS can perform three classes of operation: (1) mass transfer, (2) control interpretation, and (3) data block manipulation. A typical operation of the first class is a transfer of display information otherwise called a display file from the Disk to the Display Processing portion of the system. Such an operation would typically be requested by the Program Execution portion of the system. First, the MS is given the Disk address associated with the display. Next, the FORM is given a command to perform the transfer. The FORM begins the transfer by initializing the DL for the receipt of a block of data from the MS, and then directs the MS to begin the transfer. The MS, in conjunction with the FD, accesses the block of data and starts reading words from the disk. The FORM takes these words one at a time and puts them in the DL mass storage buffer. When the transfer from the disk is complete, the MS indicates to the FORM the occurrence or non-occurrence of an error in the data. This allows a retry before the data leaves the subsystem. From the mass storage buffer, the data is transferred to the Display Subsystem. The operations are similar for other types of mass transfers.

A typical operation in the control interpretation class is the interpretation of a display string from the Program Execution portion of the system. First, the Program Execution portion of the system directs FORM to get ready for a display string. As the Program Execution portion of the system passes characters of the string to the FORM, the FORM uses the DL compare function to see if the character matches certain control characters. If they do, the FORM directs the Display Processing portion of the system to change its display mode. This might be a change from displaying the characters in a standard format to displaying them in a complemented format.

A typical operation in the third class of operations is character insertion into the WFB. Assume the WFB has a program in its memory which is being constructed, and the program author wishes to insert some new statements into the middle of the program at location "X". To insert the characters, the WFB is first commanded to set its memory address to X. Next, the FORM is given the first character, with the instruction to INSERT. The WFB is directed to save its current address (X), and present the character at that address to the FORM. The FORM takes the character from the WFB, and then directs the WFB to write its present memory location with the character the FORM received with the INSERT instruction. The WFB memory is incremented and the exchanging of characters between it and the FORM continues down through the memory until the end is reached. At this point, the FORM directs the WFB to return its memory address to X. It is then ready to receive the next character for insertion.

FD

The Floppy Disk (D) Processor performs data and control transformations between the Disk Drive of the Mass Storage and the MS. Additionally, it provides arithmetic and temporary register storage functions for the MS. Each of the FD operations consists of a few elementary steps which perform such operations as read/write head movement and parallel/serial/parallel data conversation.

Figure 25:
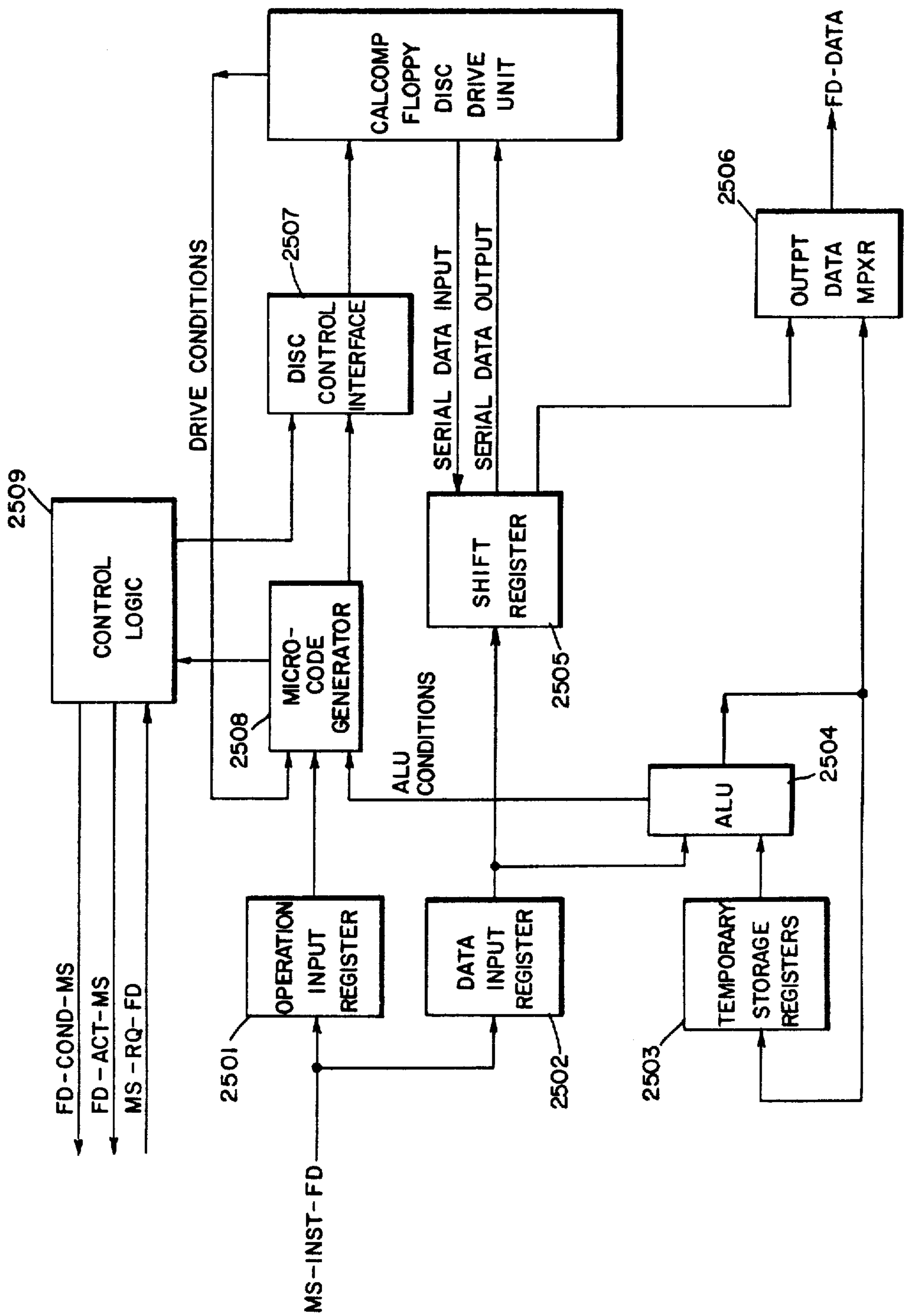
FIG. 25 is a block diagram of an implementation of the FD data processor of FIGS. 4A and 4B for communicating with a floppy disk external processing element.

FIG. 25 is a block diagram of the FD processor. The operation input register 2501 receives the OPCODE portion of the MS generated instruction. The Data Input Register 2502 receives the data portion of the MS instruction. From here, the data can be routed to the Disk Drive via the Shift Register 2505 or to the ALU (Arithmetic Logic Unit) 2504 for an arithmetic or logical operation. The Temporary Storage Registers 2503 are used for storage of control parameters, disk addresses, and intermediate arithmetic and logical results. The ALU 2504 is used to perform arithmetic and logical operations. The Shift Register 2505 is used to perform serial/parallel/serial conversions between the FD processor and the Disk Drive of the Mass Storage Device. The Output Data Multiplexer 2506 is used by the FD to output either disk or ALU data. The Disk Control Logic 2507 under the control of the MICRO-CODE GENERATOR 2508 produces the control signals which are sent to the Disk Drive. The MICRO-CODE GENERATOR 2508 decodes the OPCODE portion of the MS instruction. Depending on the OPCODE, ALU conditions and Drive conditions, enables are generated to control all the other components in the processor. The CONTROL LOGIC 2509 performs the FD/MS interface control functions and generates timing pulses and clocks which are gated with the enables from the MICRO-CODE GENERATOR 2508 to perform operations in the Processor components. Additionally, the control logic 2509 can be directed by the MICRO-CODE GENERATOR to raise or lower the Condition Flag.

The Processor performs two basic classes of operations: (1) ALU and (2) Disk Interface. A typical example of the first class is the addition of two numbers A and B. First, A is given to the Processor with a load register instruction. The data passes through the DATA INPUT REGISTER and the ALU for storage in one of the TEMPORARY REGISTERS. Next, the value of B is given to the Processor with an ADD instruction. B is added to A and the result passes out the OUTPUT DATA MULTIPLEXER 2506.

A typical example of the second class operation is read/write head movement. The MS passes a head move IN or OUT instruction to the FD. There is no data associated with the code. The MICRO-CODE GENERATOR 2508 decodes the instruction as a head move instruction and enables the DISK CONTROL INTERFACE 2507 to generate the appropriate command signals to the Disk Drive of the Mass Storage Device. Since the FD processor performs operations and is implemented in a manner well known in the art, no detailed description is given.

MS PROCESSOR

The Mass Storage Processor controls the FD Processor and is controlled by the FORM. Along with the FD, the MS implements the Mass Storage Functions. These functions are: (1) disk track a and sector access, (2) data reading (word by word at the MS/FORM interface), (3) data writing, and (4) data word error checking. The specific purpose of the MS in the implementation is to translate high level instruction OP-CODES and data for the FD. The Mass Storage Processor contains a programmed memory and other supporting functions which allow it to implement translation sequences containing conditional branches and procedure calls. The MS is of the same design as the SEM, FORM, and DSPL processing elements and is essentially a METAPROCESSOR element with reduced number of self instruction types.

Figure 26:
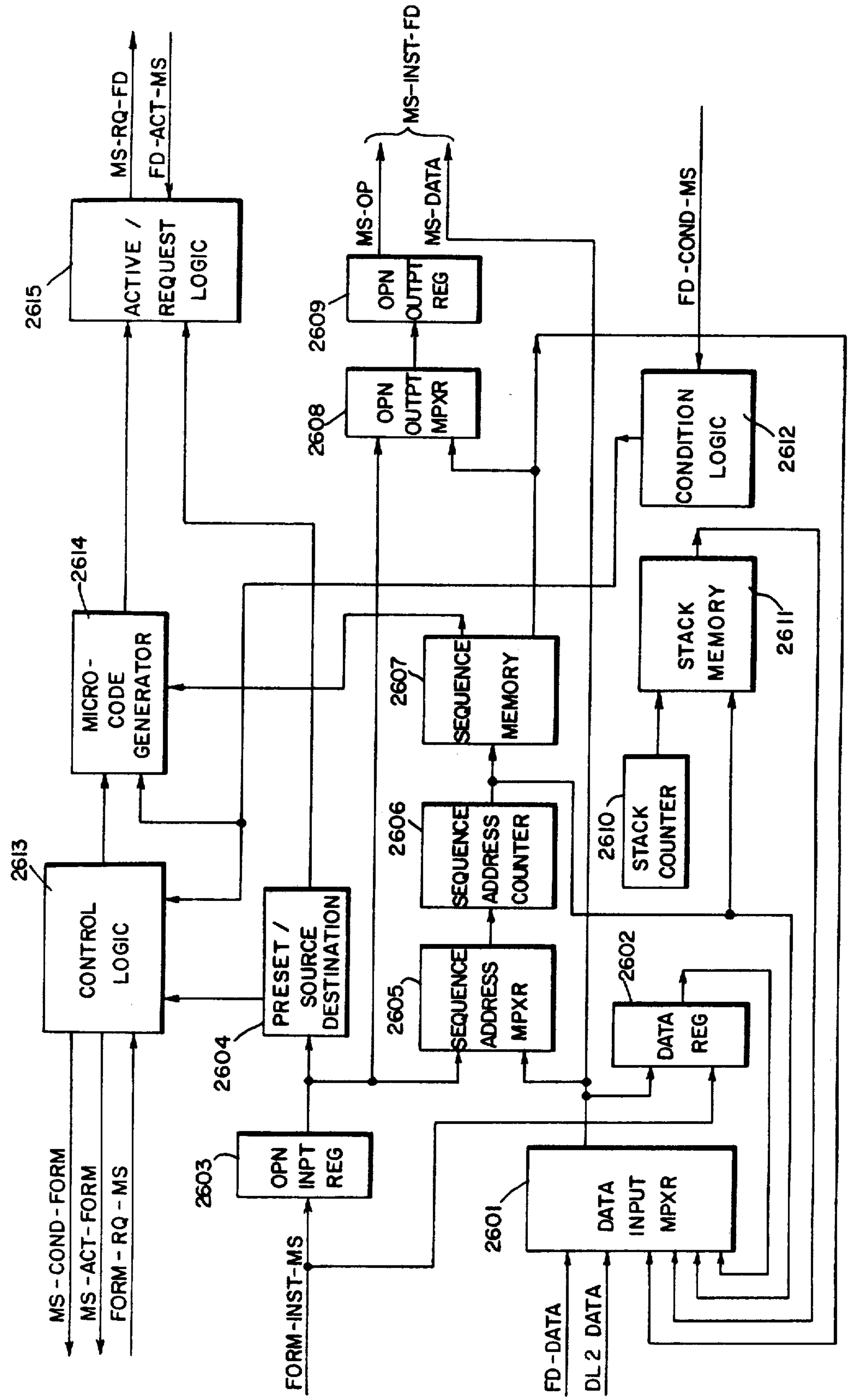
FIG. 26 is a block diagram of an implementation of the MS control processor of FIGS. 4A and 4B for controlling the sequence of operations of the FD processor to effect communication with a mass storage.

FIG. 26 is a block diagram of the MS Processor. The elements have the following functions. The DATA INPUT MULTIPLEXER 2601 provides data movement capability from the various external and internal sources onto a central bus for redistribution. This central bus forms the Data portion of the MS instruction. The DATA REGISTER 2602 receives the data portion of the FORM instruction and receives and holds data received from and passed out to other processors. The OPERATION INPUT REGISTER 2603 holds the OPCODE received from the FORM for decoding by the PRESET/DESTINATION LOGIC 2604. The SOURCE/DESTINATION LOGIC 2604 determines if the received instruction is to be passed directly out as part of an MS instruction, or if the instruction is to initiate a translation sequence. The CONTROL LOGIC 2613 and ACTIVE/REQUEST LOGIC 2615 are informed accordingly. The SEQUENCE ADDRESS MULTIPLEXER 2605 provides a means for the SEQUENCE ADDRESS COUNTER 2606 to be loaded from the Data Bus during JUMP and subroutine RETURNS self instructions and from the OPCODE INPUT REGISTER during translation sequence instructions. The SEQUENCE ADDRESS COUNTER 2606 provides states and addresses for the SEQUENCE MEMORY 2607 and may be loaded or counted up. The SEQUENCE MEMORY 2607 is used to program translation sequences, and its outputs are divided into two fields, SELF-OPCODE and OPERAND. The SELF-OPCODE through the CONTROL LOGIC 2613 and the MICRO-CODE GENERATOR 2614 controls all the other components in the processor. The OPERAND field contains OPCODES to be passed out as well as sequence addresses for JUMPS and subroutine CALLS. The OPCODE OUT MULTIPLEXER 2608 allows loading of the OPCODE OUT REGISTER 2609 from the OPCODE INPUT REGISTER 2603 for direct passed codes or from SEQUENCE MEMORY 2607 for translation sequence instructions. The OPCODE OUT REGISTER 2606 holds the OP-CODE portion of the MS instructions. The STACK COUNTER 2610 and the STACK MEMORY 2611 are used to implement the subsequence functions. When a subsequence is called, the STACK COUNTER 2610 is incremented and the STACK MEMORY 2611 is loaded from the SEQUENCE ADDRESS COUNTER 2606. On the RETURN self instruction, the SEQUENCE ADDRESS COUNTER 2606 is loaded from STACK MEMORY 2611 and the STACK COUNTER 2610 is decremented. The CONDITION LOGIC 2612 allows the processor to execute conditional sequences based on the Condition Indicator at the FD. The MICRO-CODE GENERATOR 2614 decodes the SEQUENCE MEMORY 2607 SELF-CODES into the necessary signals and timing terms to control the other components in the processor. The MICRO-CODE GENERATOR also receives inputs from the control logic 2613 and condition logic 2612 which are necessary for complete generation of the component control signals. The CONTROL LOGIC 2613 provides overall control of the actions taking place in the processor.

When a FORM request is received, the logic loads the OPCODE and DATA REGISTERS and raises the MS ACTIVE signal to the FORM. With the aid of the Source/Destination logic 2604, the Control Logic 2613 starts a direct pass or a translation sequence depending on the instruction received. The ACTIVE/REQUEST Logic 2613 may be directed by the MICRO-CODE GENERATOR 2614 or by the SOURCE/DESTINATION LOGIC 2604. When the MS passes out an instruction, this logic raises a Request to the FD processor and holds the Request until the processor raises an Active signal.

The processor performs two basic types of operations corresponding to the two types of instructions it may receive from the FORM: direct and sequence. When an instruction is received, it is first examined to determine if it is direct or sequence. If it is a direct instruction, the OPCODE is loaded into the OPCODE OUT REGISTER 2609 and the DATA INPUT MULTIPLEXER 2601 is switched to look at the DATA REGISTER 2602. The FORM instruction is then passed out as an MS instruction to the FD Processor. The ACTIVE/REQUEST Logic 2615 performs the necessary handshaking as directed by the Source/Destination logic 2604. If the FORM input instruction is a sequence instruction, the OPCODE is used as an address to preset the SEQUENCE ADDRESS COUNTER to the sequence location associated with that OPCODE. The translation sequence which is subsequently executed may take many forms, for it may cause a series of instructions to be passed out of memory unconditionally, or it may cause a series of instructions to be passed out repetitively until some condition is met. Consider the Access Track/Sector instruction as an example. First, FORM, using Direct Instructions, loads the desired disk track and sector into two temporary storage registers in the FD. The FORM then issues an access instruction to the MS. First, the MS gives an instruction to the FD to subtract the current track address from the desired track address. Depending on the outcome of the operation (indicated by the FD condition flag), the MS gives the FD a move read/write head instruction and a change current address instruction. This process continues until the head is positioned over the desired track. At this point, a similar operation is used to find the desired sector. When the sector is found, the MS goes not active. At this point, the FORM would direct the MS to perform an initiate Read or Write operation.

DATA LINK PROCESSOR

Figure 27:
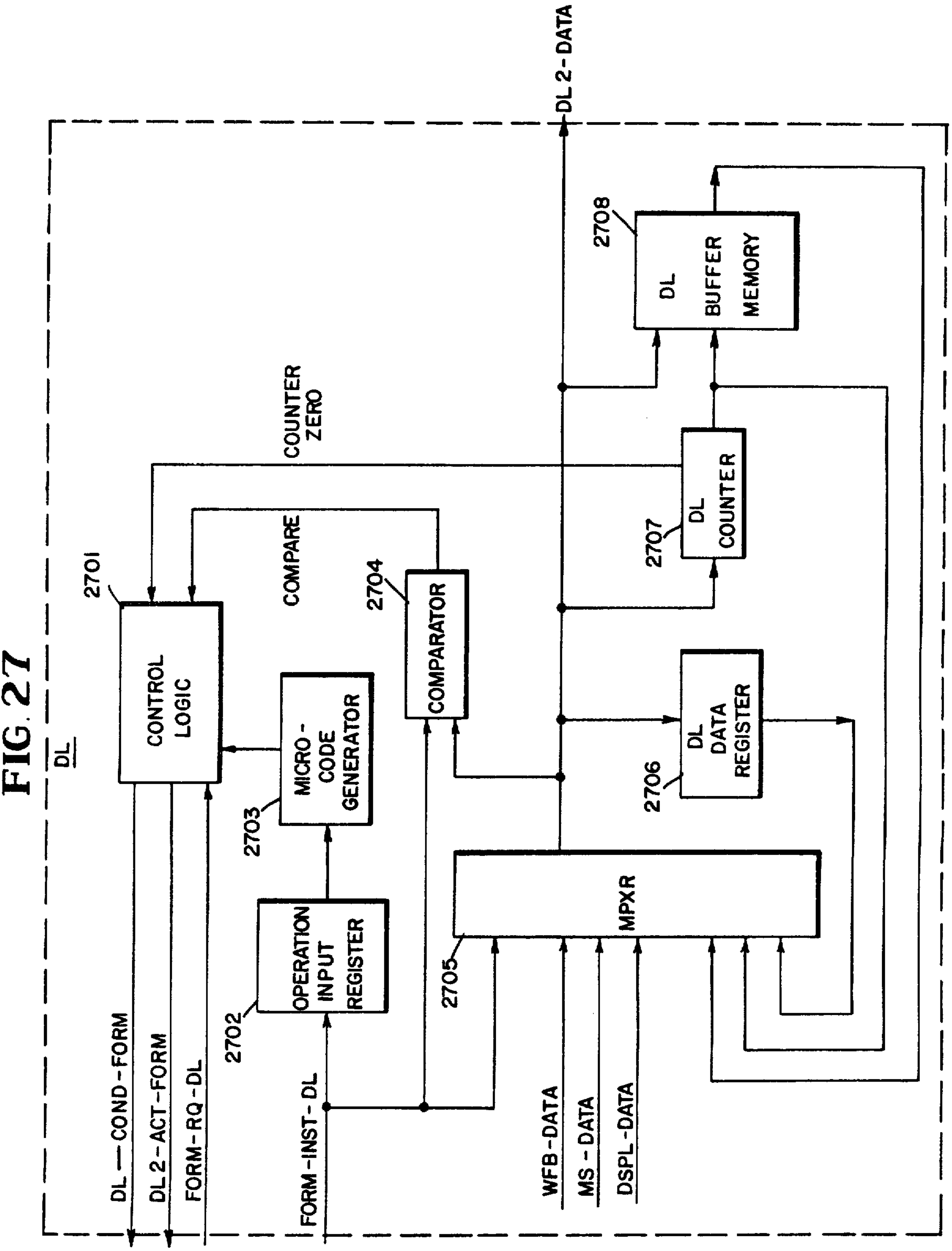
FIG. 27 is a block diagram of an implementation of the DL data processor of FIGS. 4A and 4B, the purpose of which is to facilitate communication of data to and from the mass data transfer portion of the system.

The Data Link Processor (DL) shown in FIG. 27 is a data processor (DP) which is primarily used to provide an information distribution path between processors within the Mass Data Transfer portions of the system and the other portions of the system, and to provide a buffer memory for blocks of data to and from the mass storage device. As an information distribution device, DL provides data transfers between the Format Processor (FORM), the METAPROCESSOR (META), the Working File Buffer Processor (WFB), the Mass Storage Processor (MS), the Display Processor (DSPL) and the Operator Inputs Unit (OIU). As a buffer memory device, DL provides data block storage for information going to and from the MS Processor and the above-mentioned processors. DL also provides a character "equal" comparison feature which is used for decoding character strings being processed by the FORM.

DL receives its control instruction and requests from the FORM processor and sends back the DL ACTIVE and CONDITION signals. DL-2 receives data from FORM, META, WFB, MS and DSPL and sends data for FORM, META, WFB, MS, DSPL and OIU.

FIG. 27 includes the control logic circuitry 2701 which interfaces with the control arc signals, DL-COND-FORM, DL-ACT-FORM and FORM-RQ-DL, the Comparator Circuit 2704 COMPARE signal, the DL COUNTER CIRCUIT 2707 COUNTER ZERO signal, and the MICRO-CODE GENERATOR 2703 output micro-code signals. The Control Logic 2701 contains combinational and sequential logic circuitry which controls and directs the control arc interface and all the other logic circuit sections 2702-2708 in DL based on its inputs from the MICRO-CODE GENERATOR 2703 COMPARATOR 2704 and DL Counter 2707. Specifically, the CONTROL LOGIC 2701 generates timing signals which direct activity in the other circuitry of DL, these timing signals being dependent on enable signals from the MICRO-CODE GENERATOR 2703, which enables are in turn dependent on the contents of the OPERATION CODE INPUT register 2702.

The OPERATION CODE INPUT REGISTER 2702 is a register which contains the OPCODE portion of the FORM which is being executed by DL while DL is active. The OPERATION CODE INPUT REGISTER 2702 contents are decoded combinationally by the MCIRO-CODE GENERATOR 2703, which generates enable signals for the control logic circuit 2701.

The multiplexer 2705 is an 8 to 1 data path switch controlled by the control logic 2701 section of DL. The multiplexer 2705 can select three internal sources, the DL BUFFER MEMORY 2708, the DL COUNTER 2707 and the DL DATA REGISTER 2706, and five external (to DL) sources, the data portion of FORM, META DATA, WFB DATA, MS DATA AND DSPL DATA, any one of these eight to be placed on the DL-DATA OUTPUT data path. The DL-DATA path goes to the comparator 2704, the DL DATA REGISTER 2706, the DL COUNTER 2707, the DL BUFFER MEMORY 2708 and six other processors in the training system as was outlined before.

The COMPARATOR 2704 is a combinational logic circuit which makes a numerical equal comparison between the DL DATA from the Multiplexer 2705 and the data portion of the FORM. The result of this comparison, equal or not equal, is provided to the control logic 2701 by a COMPARE signal, which in turn is used by the control logic 2701 to generate the DL-COND-FORM signal.

The DL DATA REGISTER 2706 is a register which can be loaded with DL-DATA from the multiplexer 2705 and which can be selected as a data source by that multiplexer. The DL DATA REGISTER is used for temporary data storage as, for example, a source for a subsequent comparison using the COMPARATOR 2704.

The DL Counter 2707 is a register which can be loaded the DL DATA from the Multiplexer 2705, which can be incremented or decremented by one, which has circuitry for determining when the counter contents is zero resulting in a COUNTER ZERO SIGNAL to the control logic 2701, and which provides the address for the DL BUFFER MEMORY 2708. The DL COUNTER 2707 can be selected as a data source by Multiplexer 2705.

The DL Buffer Memory 2708 is a random access memory (RAM) which can save DL DATA from the Multiplexer 2705 by being written into at a location in the memory selected by the address from the DL COUNTER 2707. The DL BUFFER MEMORY 2708 output can be selected as a data source by the Multiplexer 2705.

The general operation of the DL Processor is as follows. Starting from quiescent state in which DL is not active, the presence of FORM-RQ-DL causes the control logic 2701 to emit timing signals which load the operation code input register from the FORM INSTRUCTION and subsequently raise the DL-ACT-FORM signal. The OPCODE in the OPERATION INPUT REGISTER 2702 is then decoded into enable signals by the MICRO-CODE GENERATOR 2703, which enables are used by the CONTROL LOGIC 2701 to provide timing and control to direct the OPCODE's execution. After the OPCODE execution phase is complete, the LD-ACT-FORM signal is lowered and the DL Processor returns to the quiescent state.

There are three classes of DL operation codes: LINK OPCODES, Buffer OPCODES and Data Register OPOCDES. The LINK OPCODES cause the selection of a specified data source for the Multiplexer 2705 so that the data source is placed on the DL DATA OUTPUT for subsequent use within DL and/or by other processors in the training system. The Buffer OPCODES provide for writing into and reading from the DL BUFFER MEMORY 2708, and for loading, incrementing and decrementing the DL COUNTER 2707 which addresses the memory. The DATA REGISTER OPCODE loads the DL DATA REGISTER 2706.

WORKING FILE PROCESSOR

The Working File Buffer (WFB) Processor is used for program, symbol, and display construction under the control of the FORM. The WFB contains a main RAM storage for the data being constructed. It contains an additional auxiliary RAM for tables of specific addressable points in the main memory. The processor also performs addressing functions on both memory arrays.

Figure 28:
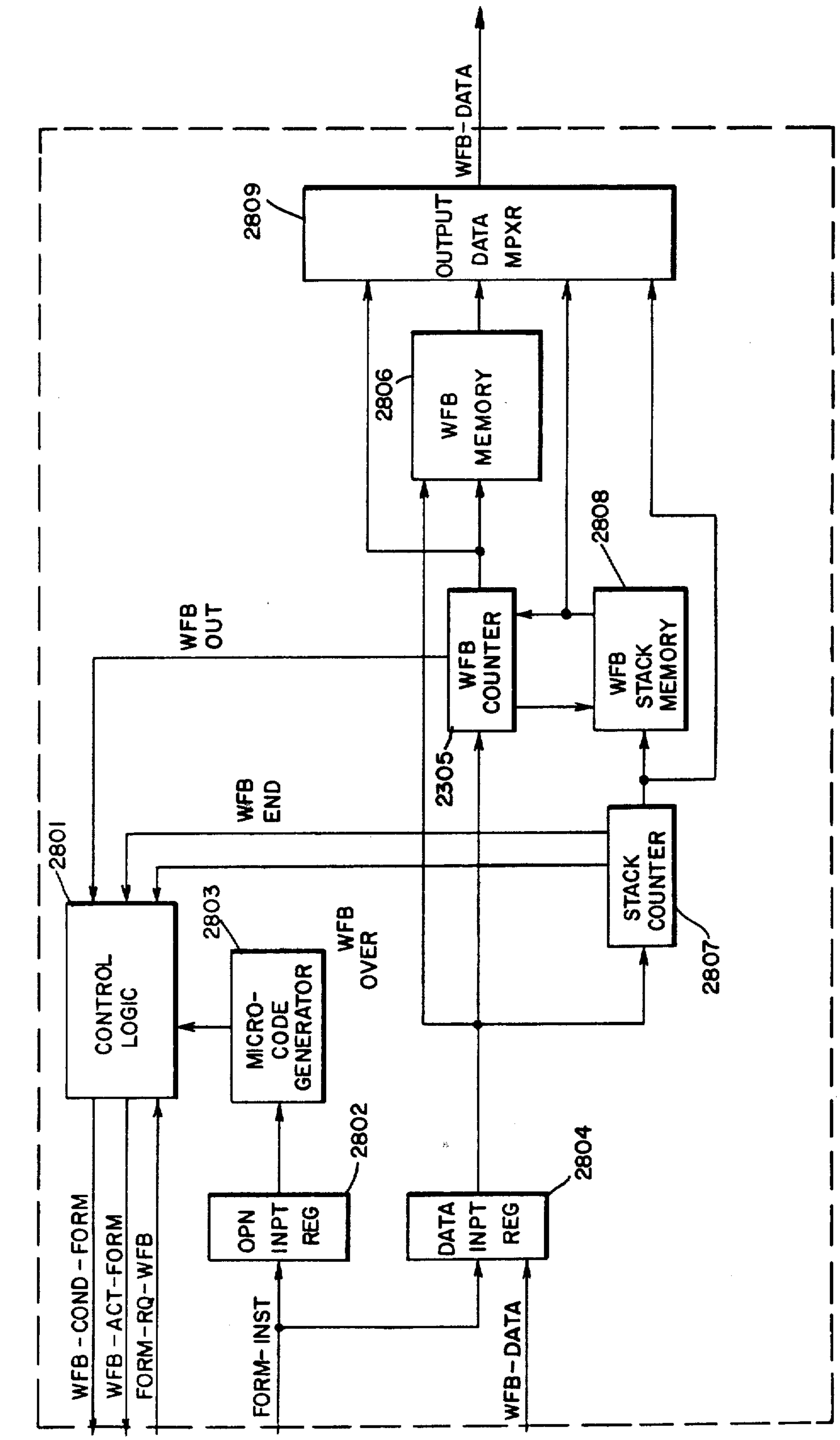
FIG. 28 is a block diagram of an implementation of the WFB data processor of FIGS. 4A and 4B, the purpose of which is to store and allow operations on a working file data structure during program editing.

The WFB Processor is diagrammed in FIG. 28. Its instruction register is composed of an OPERATION INPUT REGISTER 2802 and a DATA INPUT REGISTER 2804. The operation code is decoded by the MICRO-CODE GENERATOR 2803 into the appropriate enables to the other components for the execution of that instruction. The CONTROL LOGIC 2801 recognizes the FORM request to WFB and provides feedback via the WFB active and CONDITION lines. In addition, the control logic provides the sequence of timing control signals for the processor. The WFB COUNTER 2805 drives the WFB MEMORY ARRAY 2806. This memory is used for the data module constructions and may be loaded from the DATA INPUT REGISTER. The WFB COUNTER may be loaded, or incremented up or down, for movement throughout the memory. If the counter at anytime generates a count greater than the size of the memory array, the WFB notifies the FORM via the WFB CONDITION line. If a specific address of the memory array is to be remembered for later reference, then it is stored in the WFB STACK MEMORY 2803. The STACK MEMORY is employed as a last-in, first-out memory device where the address of the next possible storage location (for the stack memory) is kept in the STACK COUNTER 2807. Thus, if an address is to be saved, it is stored in the STACK MEMORY at the current address value found in the STACK COUNTER; then the STACK COUNTER contents are incremented so that it will hold the address of the location where the next address may be stored. A memory address may be restored by decrementing the stack and loading the WFB counter. If the WFB attempts to save or restore addresses off either end of the stack (no more storage room or no more addresses to restore), the WFB notifies the FORM via the WFB CONDITION line. The data input register 2804 contains any data that may be associated with an instruction. There are two types of input data: (1) addresses to be loaded in either the WFB counter or the stack counter or (2) data to be stored in the WFB MEMORY ARRAY. The output Data Multiplexer 2809 provides a means of accessing the outputs of the various WFB components.

The WFB operations are the same as those previously described for the PMEM processor.

FORM

The FORMAT (FORM) Processor controls the other processors in the MDTS and serves as the subsystem node for interactions with other subsystems. It controls and implements, in conjunction with the other processors in the subsystem, the functions of the subsystem. The specific purpose of the FORM in the implementation is to translate high level instructions and data into low level OPCODES and data for the processors under its control. It contains a programmed memory and other supporting functions which allow it to implement translation sequences containing conditional branches and procedure calls.

FIG. 29 is a block diagram of the processor and illustrates that FORM has the same design as the previously described MS and SEM processing elements.

The processor performs two basic types of operations corresponding to the two types of instructions it may receive from the META: direct and sequence. When an instruction is received, it is first examined to determine if it is a direct or sequence instruction. If it is a direct, the code is loaded into the OPERATION OUT REGISTER 2909 and the DATA INPUT MULTIPLEXER 2901 is switched to look at the DATA REGISTER 2902. The META instruction is then passed out as a FORM instruction. The ACTIVE/REQUEST LOGIC 2915 performs the necessary handshaking as directed by the Source/Destination Logic 2904. If the META instruction is a sequence code, the code is used as an address to preset the Sequence Address Counter 2906 to the sequence location associated with the code. A translation sequence may take many forms. It may cause a series of codes to be passed out of memory unconditionally, or it may cause a series of codes to be passed out repetitively until some condition is met.

Consider the Insert instruction as a sequence example. When the instruction is received, the character is loaded into the DATA REGISTER, the OPCODE presets the Sequence Address Counter 2905 to the proper location. First, FORM passes instructions to the WFB to direct it to save the memory counter address in the WFB stack memory and to switch its output data multiplexer to the memory data. The DL is then sent an instruction to load its DATA REGISTER from the WFB. Next, the WFB is passed a WRITE MEMORY instruction, the DATA being the character to be inserted from the FORM Data Register. The FORM Data Register is now loaded from the DL DATA REGISTER to prepare for the next insertion. The WFB is passed a code to increment its counter and raise its condition line if the memory has reached its end. The FORM does a conditional jump and repeats the sequence of steps above unitl the WFB Condition line is raised. The FORM then directs the WFB to restore its counter from its stack, and then goes not active having completed the translation of the INSERT instruction. APPENDIX MM defines the complete ROM sequences for the FORM as used in the example training system.

DISPLAY PROCESSING SUBSYSTEM

Figure 57:
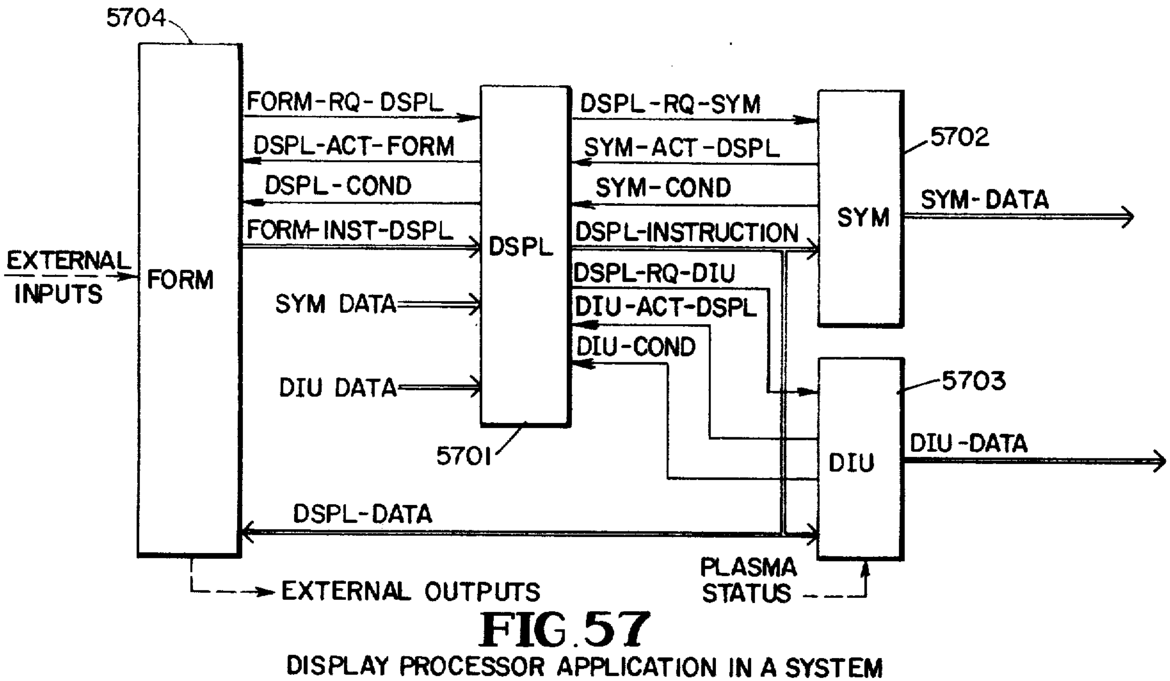

The display processing subsystem is an autonomous processor for displaying data strings and building and interpreting symbol structures. The display processing subsystem may be used as a peripheral processor to an existing computer system or as a functional processor in a graph architecture processing system such as the exemplary training system. FIG. 57 illustrates the typical interconnection of the display processing subsystem controller or DSPL in such systems. The processor called FORM (for formatting processor) may be a computer, or a control processor, and supplies the data in sequences of instructions necessary for performing display and symbol construction. FIG. 57 also lists the signals which exist between DSPL and the rest of the system. The functions of these signals are as follows:

FORM-RQ-DSPL signal which is active when the FORM processor desires the DSPL to execute an instruction.

DSPL-ACT-FORM signal which is generated by DSPL and when active indicates that DSPL is executing the instruction requested by FORM.

DSPL-COND signal which indicates the variety of conditions depending on the syntax of the sequence of the display instructions.

SYM-DATA word output of SYM supplies the readout of constructed symbols.

DIU-DATA word output of DIU supplies the readout of the cursor for providing sensitized displays.

DSPL-RQ-SYM signal which is active when the DSPL processor desires the SYM to execute an instruction.

SYM-ACT-DSPL signal which is generated by SYM and when active indicates that SYM is executing the instruction requested by DSPL.

SYM-COND signal which indicates a variety of conditions depending on the syntax of the sequence of instructions from DSPL.

DSPL-RQ-DIU signal which is generated by DIU and when active indicates that DIU is executing the instruction requested by DSPL.

DIU-COND signal which indicates when the cursor has passed beyond the lower right-hand corner of the screen. The DSPL control processor directs the activities of the SYM data processor, DIU data processor, PROJ data processor, and PRNT data processor. The SYM data processor provides the capability to construct, store and interpret symbol structures. The DIU data processor provides the interface necessary for the driving of a variety of display devices. This capability includes the plasma panel and raster scan CRT, both as indicated in APPENDIX A. The PROJ data processor provides the driving interface to a random access slide projector as specified in APPENDIX A. The PRNT data processor provides the driving interface to a hard copy printer specified in APPENDIX A.

DISPLAY PROCESSOR CONCEPTS

The display processor subsystem is designed to provide the direct processing of a grammar. This grammar defines the display syntax. As a part of the semantics of this grammar, the ability to drive a variety of display devices without regard to their various differences is a major concept implemented in the display processor subsystem. This concept may be best described by the example system where switching between the plasma panel display and the raster scan CRT display is made without regard to the structure of the display strings in the grammar describing the interface. In other words, a given display instruction string consisting of graphics, symbols, and sensitized areas may be displayed on either display device without modification of the instruction string. An additional concept is embodied in the grammar semantics provision for construction of symbols in a hierarchical tree structure. These symbols provide the ability to reference complex patterns of an image with minimal direction external to the display processor subsystem. Furthermore, the hierarchical structure of the symbol storage provides flexibility in selection for display of a symbol at any of the nodes of the "tree". The symbol concept provides a "building block" capability for construction of complex displays. In other words, an arbitrarily complex image may be decomposed into a collection of more simple portions which are duplications of some common subset of images. Hence, after construction of each of these "building blocks" as symbols, the desired complete image may be produced from references to the individual members of this collection.

EXEMPLARY DISPLAY PROCESSING SUBSYSTEM

In the display processing subsystem of the example training system, the SYM data processor implements the hierarchical symbol concept. The concept of transparency of type of display device is implemented in this display processor subsystem by the DIU data processor.

PLASMA INTERFACE DESIGN

Plasma Interface Circuits

The plasma panel interface consists of control and address signal lines to the panel of a type identified in APPENDIX A and status signal lines from the panel. The set of control instructions consist of no-operation, write, erase, and bulk-erase. The interface circuitry of FIG. 7A, Plasma Interface Circuitry, shows the two flip-flops 7AO1 and 7AO2 used to hold the instruction until acknowledged by the DIG-BUSY signal, received from the plasma panel. The CELL-DOT signal comes from the character generation circuitry when a TRUE condition indicates a lighted dot in the character definition. The COMPL signal when TRUE indicates that the character to be displayed is to be complemented (i.e., unlighted character on a lighted background). The DOT signal is supplied by the micro-enable memory and is TRUE when individual "dot-write" instructions are issued. The ERASE signal when TRUE indicates that the individual dots of a character are to be erased rather than written. The REPL signal when TRUE indicates that each of the dots making up a character are either to be written or erased. Whenever the REPL signal is FALSE, a dot representing the character will be written or erased only if CELL-DOT EXCLUSIVE-ORed with COMPL is TRUE. The BULK-ER signal when TRUE indicates a command to bulk-erase the plasma panel. The DIG-BUSY signal when TRUE indicates that the plasma panel has accepted the instruction. The instruction is immediately replaced by a NO-OPERATION instruction. FIG. 7B, Plasma Interface Timing, shows the timing sequence necessary for interface with the plasma panel. First, the CELL-DOT signal and DOT-ADR signal must be TRUE. Second, the DIG-CMD is presented to the plasma panel. Third, the plasma panel indicates acceptance of the command by the DIG-BUSY signal and the DIG-CMD is immediately set to a no-operation instruction. Finally, the plasma panel indicates completion of the instruction by the DIG-BUSY signal, at which time the DOT-ADR need no longer be held stable.

Plasma NOP Instruction

Figure 7A:
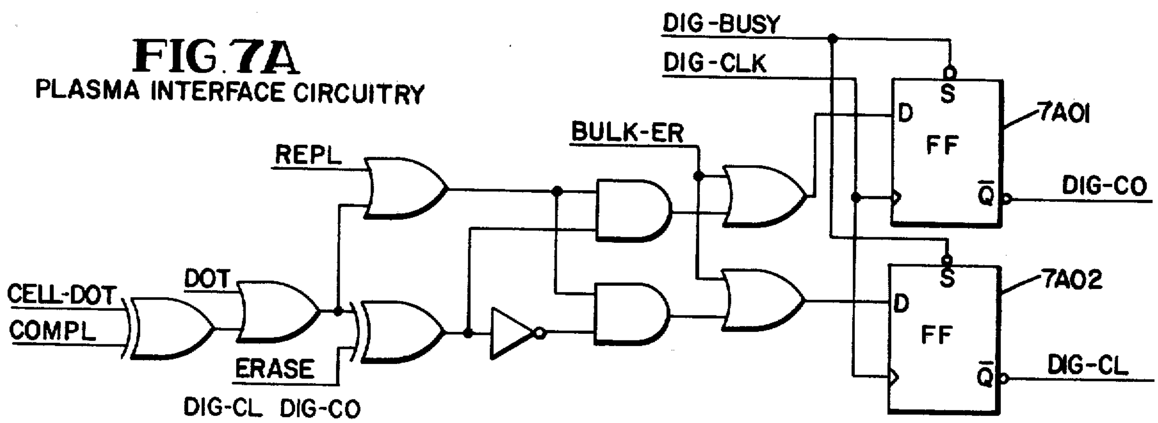
FIG. 7A illustrates interface circuitry which may be used to interface a graph architecture processing element with a prior art plasma type display external processor device, as may be used in a system as illustrated in FIG. 4B.
Figure 7B:
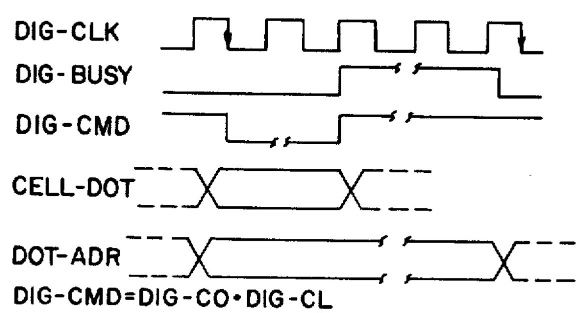
FIG. 7B illustrates the interface timing for the circuit of FIG. 7A for interfacing with a prior art plasma display external processing element.

From the table of FIG. 7A, it can be seen that when the DIG-Cϕ and DIG-C1 signals both TRUE, a NOP instruction is indicated to the plasma panel. This is the normal state of the instruction latch while the plasma panel interface is idling. During this state, the address signals to the plasma panel are not required to be stable.

Plasma Bulk Erase Instruction

As indicated in FIG. 7A, when the signals DIG-Cϕ and DIG-C1 are both FALSE (logic 0), a BULK ERASE instruction is indicated to the plasma panel. This command when executed by the plasma panel causes the entire panel to be erased. During this state, the address signals to the plasma panel are not required to be stable.

Plasma Write Dot Instruction

When signal DIG-Cϕ is FALSE and signal DIG-C1 is TRUE (as indicated in FIG. 7A), a WRITE-DOT instruction is indicated to the plasma panel. This instruction will cause one dot at the coordinates of DIG-X-ADR and DIG-Y-ADR to be lighted. Prior to the issue of this instruction and throughout the plasma panel busy cycle, the address signal, DIG-X-ADR and DIG-Y-ADR, to the plasma panel must remain stable.

Plasma Erase Dot Instruction

When signal DIG-Cϕ is TRUE and signal DIG-C1 is FALSE (as indicated in FIG. 7A) an ERASE-DOT instruction is indicated to the plasma panel. This instruction will cause one dot at the coordinates of DIG-X-ADR and DIG-Y-ADR to be extinguished. Prior to the issue of this instruction and throughout the plasma panel busy cycle, the address signals, DIG-X-ADR and DIG-Y-ADR, to the plasma panel must remain stable.

CRT INTERFACE DESIGN

CRT Interface Circuits

Figure 6A:
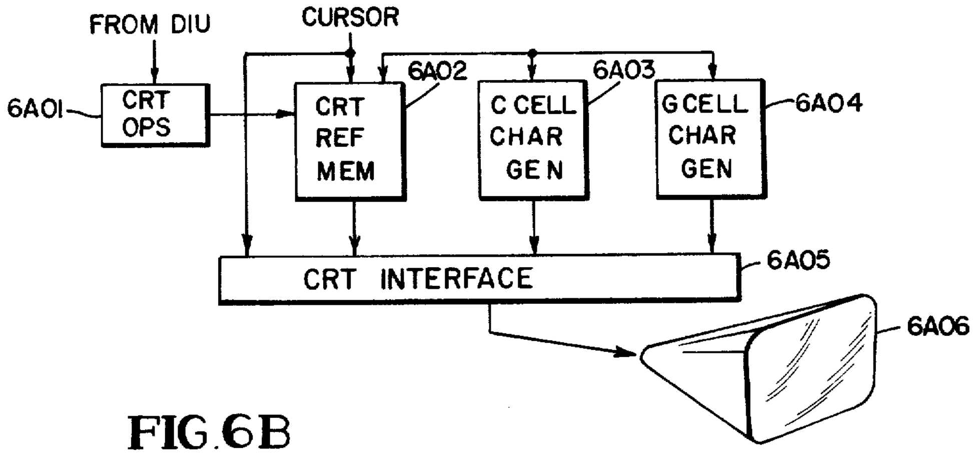
FIG. 6A illustrates the block diagram of circuits necessary for interfacing processors of a graph architecture system with a prior art CRT type display external processing element, said circuits for use in integrating such a CRT device into a system such as depicted in FIG. 4B.
Figure 6B:
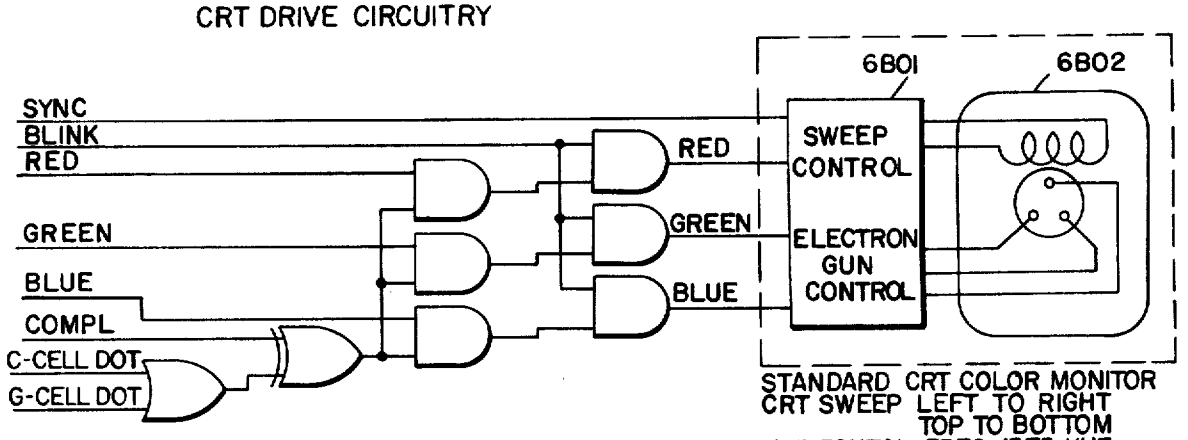
FIG. 6B illustrates the drive circuitry portion of FIG. 6A necessary for interfacing with a prior art CRT display device.

The CRT interface circuits for an example CRT of type identified in APPENDIX A consist of a series of functional units as shown in FIG. 6A, CRT Interface Block Diagram. The different CRT options (e.g., color complemented, blink) are retained by the CRT OPS latch 6AO1. The refresh timing generation and attribute memory is performed by the circuitry indicated by CRT REF MEM 6AO2. The standard character cell generation is performed by the circuitry indicated by C-CELL CHAR-GEN 6AO3. The extended redefinable graphic character cell generation is performed by the circuitry indicated by G-CELL CHAR-GEN 6AO4. The electrical interface to the CRT is performed by the circuitry indicated by CRT INTERFACE 6AO5. The CRT that will accept RGB encoded signals with external SYNC is indicated by the CRT symbol 6AO6. The CRT INTERFACE is further described by FIG. 6B, CRT Drive Circuitry. The horizontal and vertical synchronization is provided by the SYNC signal which feeds the SWEEP CONTROL 6BO1 which in turn drives the deflection circuitry of the CRT 6BO2. The individual dots of which a character or graphic cell consists are serially presented as the signals C-CELL-DOT and G-CELL-DOT, respectively. These signals are combined with the complement signal, COMPL, which when TRUE indicates the display of a dark character or graphic on a lighted background. The resulting signal is then used to control the color attribute signals, RED, GREEN and BLUE. Each of these signals when TRUE indicates the corresponding electron gun of the CRT to be turned on. Finally, these signals are further gated by the BLINK signal. This signal when TRUE allows the character to be displayed and when FALSE prevents the display of the character. If selected, the BLINK signal alternates between TRUE and FALSE approximately twice per second. The resulting signals are then presented to the ELECTRON GUN CONTROL circuit 6BO2 which in turn drives the electron guns of the CRT 6BO2.

Refresh Timing Operation

Figure 6C:
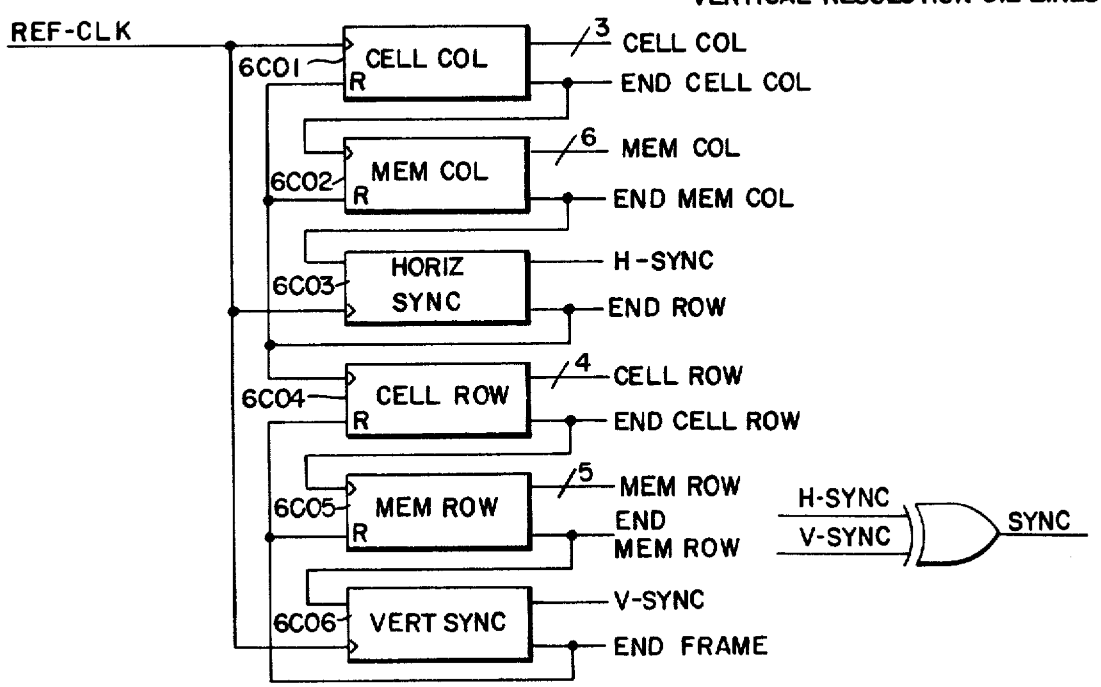
FIG. 6C illustrates an exemplary case of the refresh timing circuitry portion of FIG. 6A necessary for interfacing with a prior art CRT display device.

The iterative refresh of the CRT display requires a refresh timing circuit for the SYNC signal generation and the address generation for the attribute, standard character, and graphic memories as well as the address generation for the character cell generation and graphic cell generation. A block diagram of this circuitry is represented by FIG. 6C, Refresh Timing Circuitry. The REF-CLK signal provides the FALSE to TRUE transition used to cause each of the counters of the refresh circuitry to advance or reset. The CELL COL generator 6CO1 provides for the CELL-COL signal which provides for the individual dot column address of the character and graphic cell generators. This signal is a modulo eight count. The END-CELL-COL signal becomes TRUE each time the CELL-COL signal reaches a count of seven. This signal causes the MEM COL generator 6C02 to advance to the next count. The refresh memory column address generator provides the MEM-COL signal as a modulo 64 count for the attribute, character, and graphic refresh memories. The END-MEM-COL signal becomes TRUE each time the MEM-COL signal reaches a count of 63. This signal enables the HORIZ SYNC generator 6CO3 which generates the H-SYNC signal to the horizontal synchronization circuit of the CRT. In addition, the END-ROW signal is generated which resets the CELL COL generator and MEM COL generator and holds them at the reset condition until the next horizontal line is ready to be generated. The END-ROW signal causes the CELL-ROW generator 6CO4 to be advanced to the next count, modulo 16. The CELL-ROW signal, which is generated as a result of this action, is provided to the character and graphic cell generators as the individual dot row address. In addition, the END-CELL-ROW signal is generated each time the CELL-ROW count reaches 15. This signal is used to advance the MEM ROW generator 6CO5. This generator produces the MEM-ROW signal, modulo 32, to be used for addressing the attribute, character, and graphic refresh memories. Upon reaching a count of 31, the END-MEM-ROW signal becomes TRUE. This signal enables the VERT SYNC generator 6C06 which in turn provides the V-SYNC signal to the vertical synchronization circuit of the CRT. In addition, the END-FRAME signal is generated which resets the CELL ROW and MEM ROW generators and holds them at the reset condition until the next frame is ready to be generated. The H-SYNC and V-SYNC signals are combined to form the overall SYNC signal.

Figure 6D:
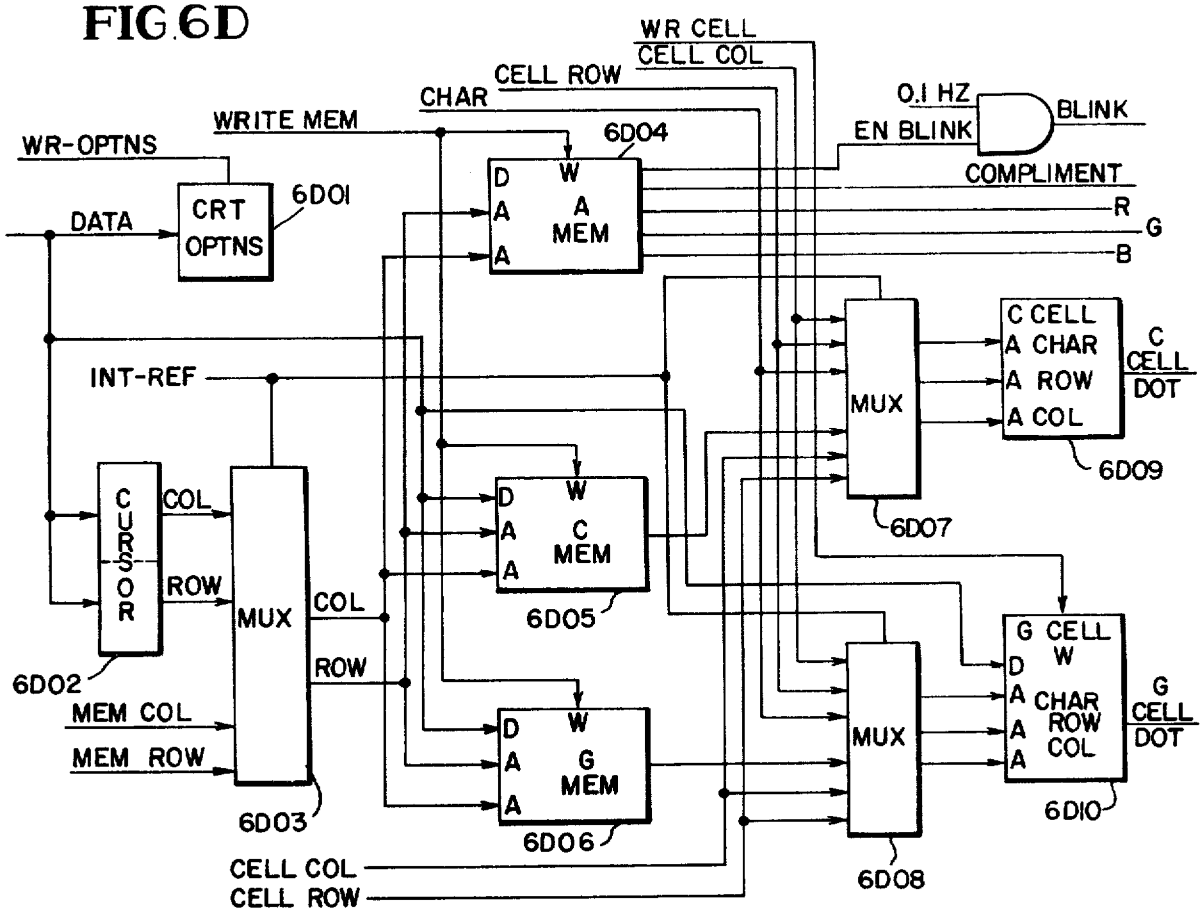
FIG. 6D illustrates the refresh memory circuitry portions of FIG. 6A necessary for constructing graphic information for a prior art CRT information display device.

The usage of the memory and cell address generation can be seen from FIG. 6D, Refresh Memory Circuitry. The CRT display options (e.g., color, complement, blink) are loaded into the CRT OPTNS latch 6DO1 from the DATA signal which is common throughout the DIU. This action is performed when the WR-OPTNS signal becomes TRUE. The cursor is similarly saves in the CRT CURSOR latch 6DO2 each time the cursor is updated by the DIU. During refresh, the INT-REF signal is FALSE which allows the MEM COL and MEM-ROW signals to flow through the MUX 6DO3 to form the address for the A-MEM 6DO4, C-MEM 6DO5, and G-MEM 6DO6. The output of the attribute memory, A-MEM, provides the signals BLINK, COMPL, RED, GREEN and BLUE for the CRT Drive Circuitry previously shown in FIG. 6B. The output of the character and graphic refresh memories flows through the MUX 6DO7 and 6DO8 (due to INT-REF being FALSE) to provide the character address to the character cell) generator C-CELL 6DO9 and the graphic cell generator G-CELL (6D10, respectively. In addition, the signals CELL-COL and CELL-ROW, through MUX 6DO7 and 6DO8, to provide the remainder of the address to the cell generators, C-CELL and G-CELL.

Figure 6E:
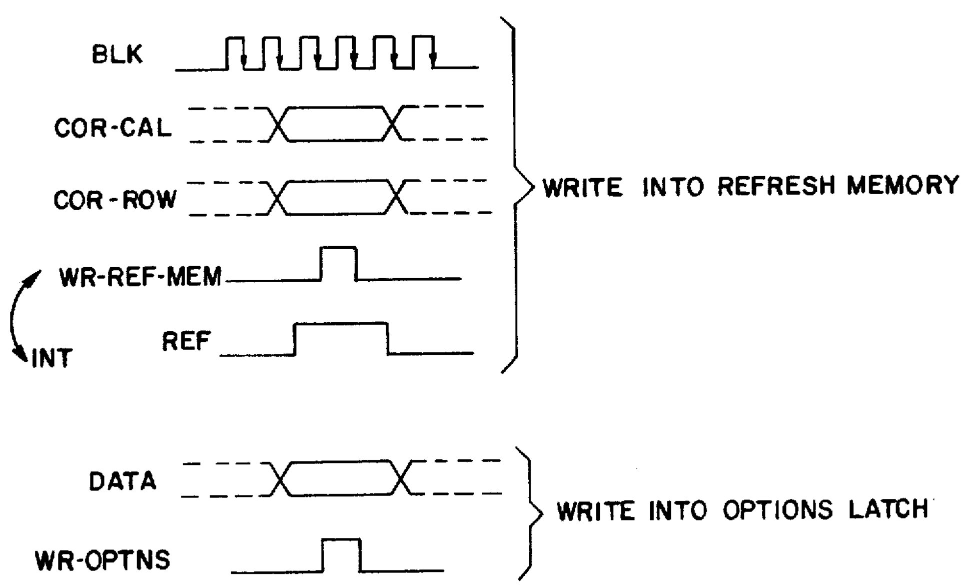
FIG. 6E illustrates the interface timing for FIG. 6A for entering data into the refresh memory of FIG. 6D.
Figure 6F:
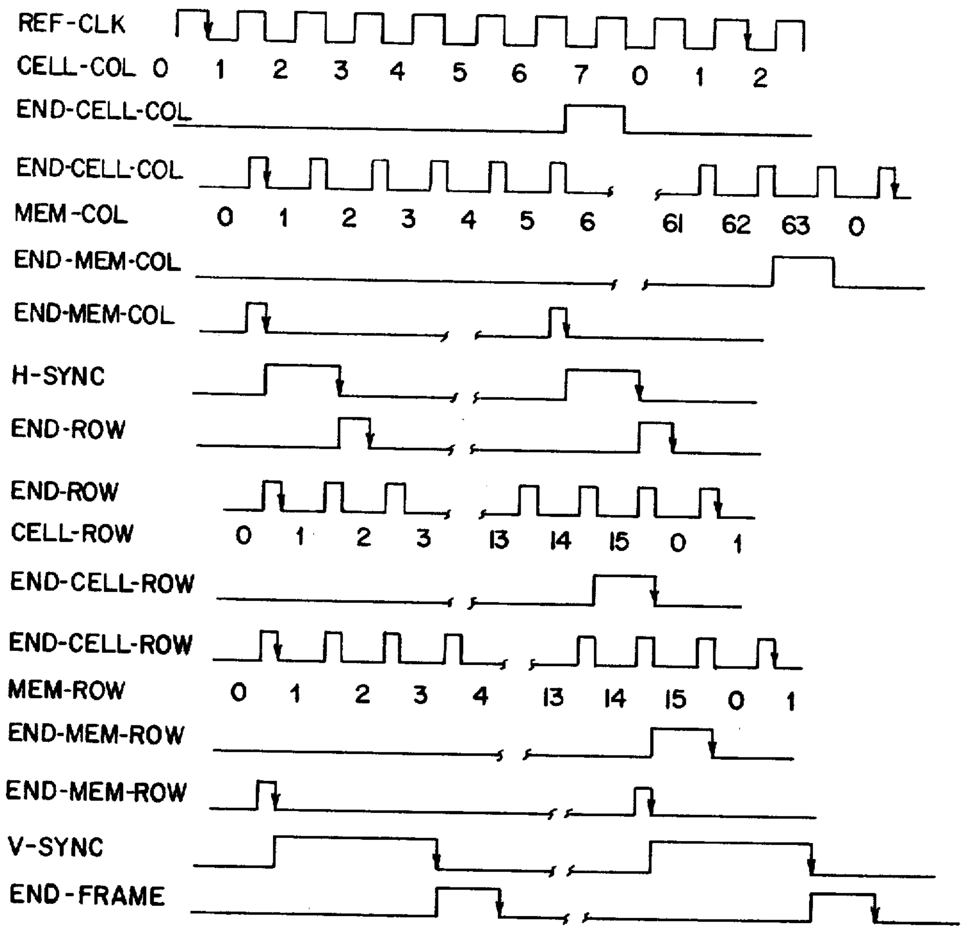
FIG. 6F illustrates the detailed refresh memory timing for the circuit of FIG. 6D for interfacing with a prior art CRT external processing element.

The timing relationship of the addressing signals during refresh can be seen from FIG. 6F, CRT Refresh Memory Timing. The refresh clock, signal REF-CLK, provides the update rate for the CELL-COL signal (modulo eight address). At the end of one character cell column cycle, the END-CELL-COL signal becomes TRUE for one REF-CLK cycle. The END-CELL-COL signal provides the clocking signal for the generation of the MEM-COL signal (modulo 64 address). At the end of one refresh memory column cycle, the END-MEM-COL signal becomes TRUE for one END-CELL-COL cycle. The END-CELL-COL signal provides the clocking signal for the generation of the H-SYNC signal (horizontal synchronization) and the END-ROW signal. The END-ROW signal provides the clocking signal for the generation of the CELL-ROW signal (modulo 16 address). At the end of one character cell row cycle, the END-CELL-ROW signal becomes TRUE for one END-CELL-ROW cycle. The END-CELL-ROW signal provides the clocking signal for the generation of the MEM-ROW signal (modulo 32 address). At the end of one refresh memory row cycle, the END-MEM-ROW signal becomes TRUE for one END-CELL-ROW cycle. The END-MEM-ROW signal provides the clocking signal for the generation of the V-SYNC signal (vertical synchronization) and the END-FRAME signal. The END-FRAME signal is used to resynchronize the entire cycle.

Load Refresh Memory Operation

In order to load the refresh memory with data to be displayed, the addressing of the A-MEM, C-MEM and G-MEM must be switched from that of the cyclical refresh timing circuitry to that of the cursor latch. This is accomplished by setting the INT-REF signal TRUE. FIG. 6E, CRT Interface Timing/Refresh, shows the timing relationship of the signals necessary to allow the loading of the refresh memory. The CUR-COL address signal and the CUR-ROW address signal must be latched stable when the INT-REF signal becomes TRUE to switch the addressing. After stability has been achieved, the WR-REF-MEM signal becomes TRUE allowing the character indicated by the DATA signal to be written into the refresh memory at the address specified by the CUR-ROW and CUR-COL signals. Similarly, the contents of the display option latch is written into the A-MEM at the same address, specified by CUR-ROW and CUR-COL. The contents of the options latch is loaded by the DATA signal becoming stable following which the WR-OPTNS signal becomes TRUE.

DISPLAY INTERFACE UNIT

Instruction and Word Formats

Figure 10:
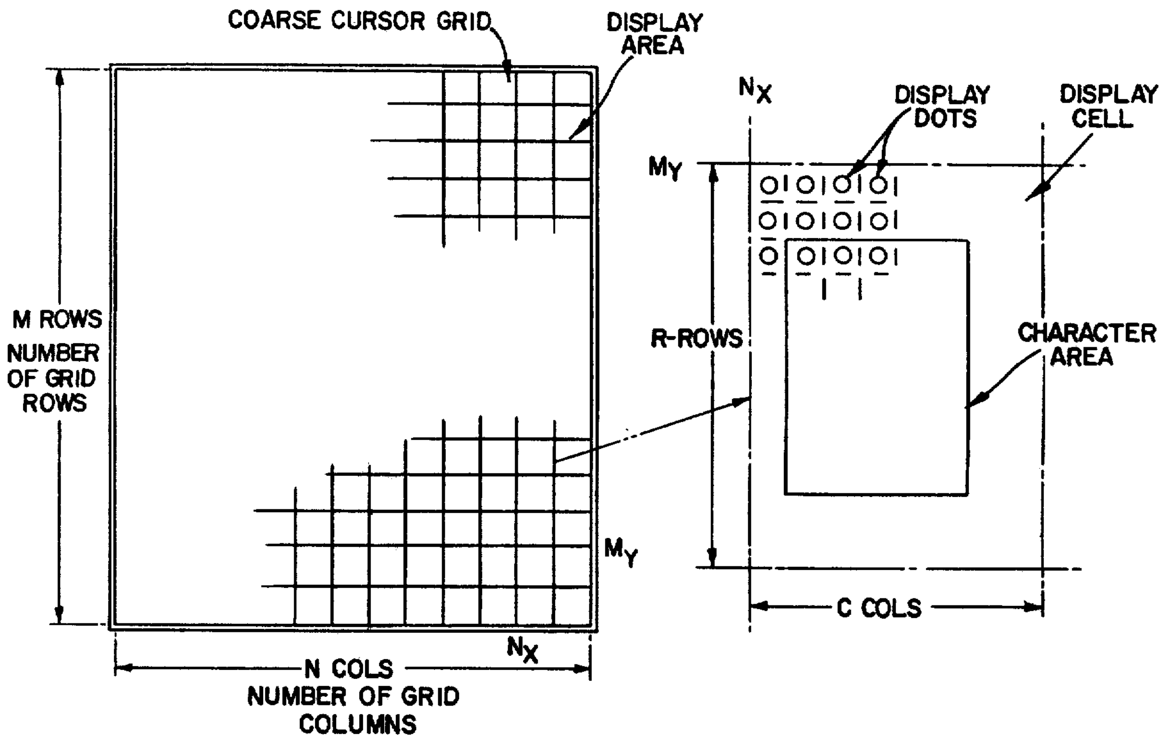
FIG. 10 illustrates the row and column breakdown of display information on a CRT or plasma type display external processing element.
Figure 11:
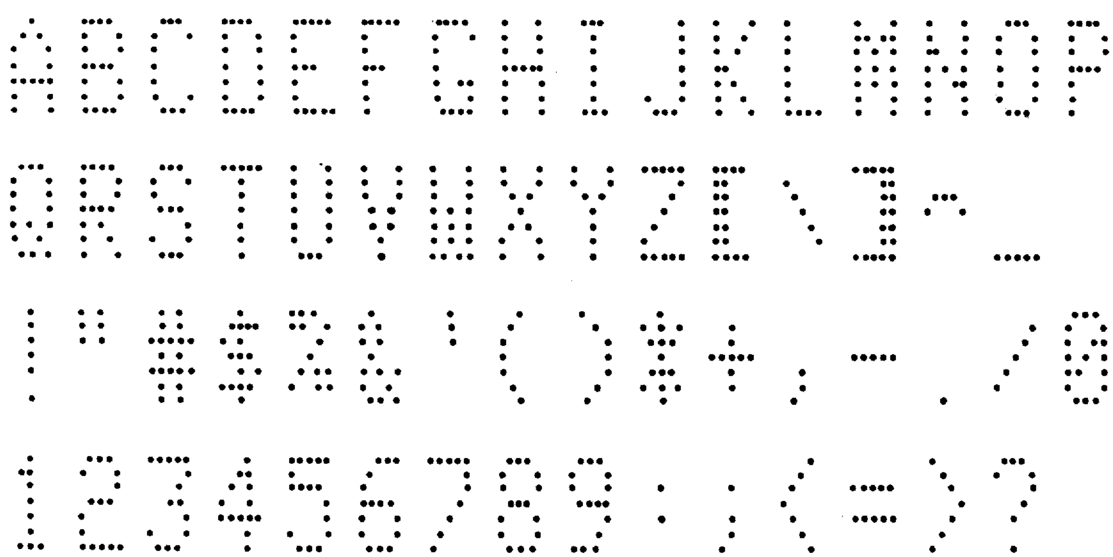
FIG. 11 illustrates the dot patterns for display of character information on a display device, so that each dot pattern may be written into any of the row and column positions of the devices of FIG. 10.

The DIU receives an instruction from the DSPL control processor. As shown in FIG. 59, DIU Instruction and Data Formats, this instruction is made up of a DIU OPCODE and DIU DATA parts. Internal to the DIU, the cursor is stored as a collection of COURSE-Y, FINE-Y, COARSE-X and FINE-X. The total cursor is used to address the CRT or plasma panel to the individual dot location. FIG. 10 and FIG. 11 show the individual dot addressing of the CRT or plasma panel. In addition, a representative character set is shown in the dot matrix format.

DIU Processor Circuits

Figure 58:
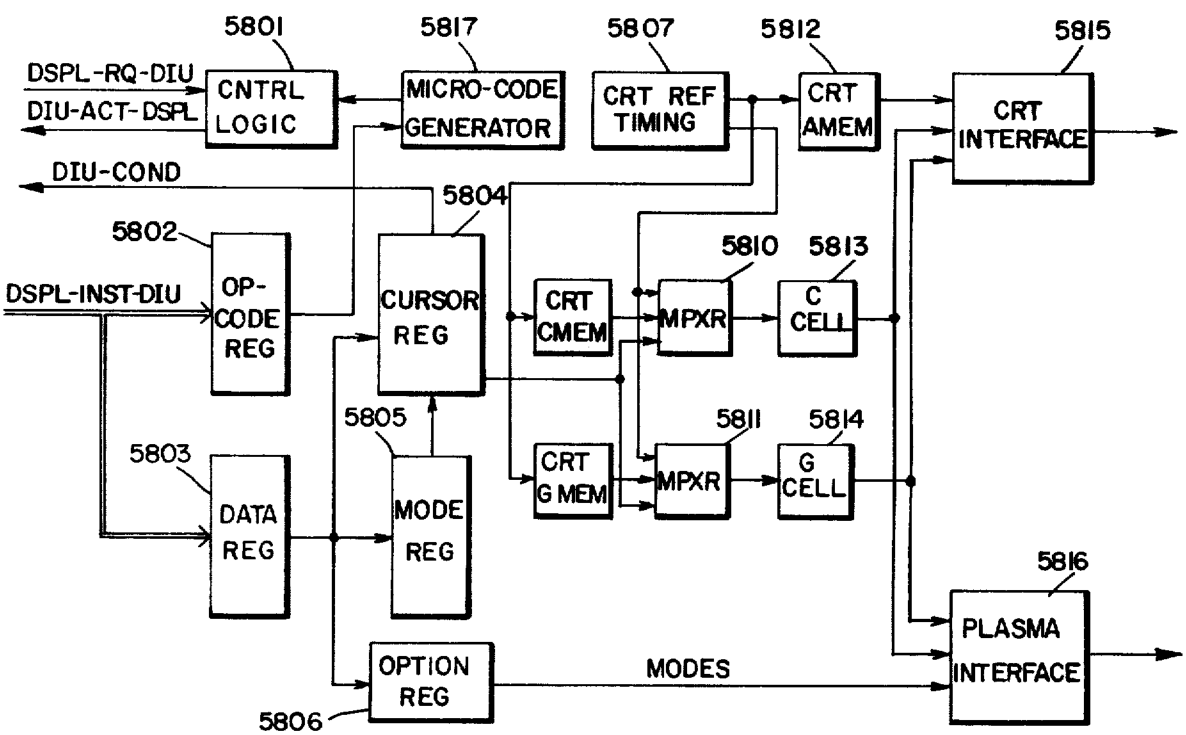

A block diagram of the DIU is shown as FIG. 58, DIU Block Diagram. A list of devices needed to implement an example DIU is given in APPENDIX TT. The control logic, CNTRL LOGIC 5801, receives a request from the display control via the signal DSPL-RQ-DIU and acknowledges receipt of the instruction by setting the DIU ACT-DSPL signal TRUE. Along with the request from the DSPL processor, the instruction, DSPL-INST-DIU, is presented to the DIU data processor. The instruction is latched into the OPCODE REG 5802 and the DATA REG 5803 as previously indicated in the instruction format description. The OPCODE is used to generate the micro-enables via the MICRO CODE GEN 5817, (defined in detail in APPENDIX RR). The CURSOR REG 5804, MODE REG 5805, and OPTION REG 5806 are loaded with the data from the data register under control of the micro-enable ROM. The cursor register provides an output condition to the DSPL control processor via the DIU-COND signal. In addition, the cursor register provides addressing to the C-CELL 5813 and G-CELL 5814 via the multiplexers, MPXR 5810 and MPXR 5811. The alternate source for addressing is derived from the CRT C-MEM 5808 and the CRT G-MEM 5809 whose addressing, in turn, is normally derived from the CRT REF TIMING 5807 circuit. This circuit also provides addressing to the CRT A-MEM 5812. The CRT attribute memory, character cell generator, and graphic cell generator provide overall display information to the CRT INTERFACE 5815. In addition, the character cell and graphic cell generators along with the display option register provide the necessary information to the PLASMA INTERFACE 5816.

A closer inspection of the control logic is presented as FIG. 60, DIU Control Logic. The external signal DSPL-RQ-DIU is combined with the internal signal DIU-BUSY to produce the DIU-LD signal which is used to load the OPCODE and data into their respective latches. In addition, this signal causes the preset flip-flop 6001 to be set at the next active edge of the CLOCK signal. This in turn generates the DIU-PRESET signal which is presented to the busy flip-flop 6002. The busy flip-flop is set on the next active edge of the CLOCK signal and generates the DIU-BUSY and DIU-ACT-DSPL signals. This signal causes the preset flip-flop to be reset on the next active edge of the CLOCK signal and prevents the generation of any further DIU-LD signals until the DIU-END signal becomes TRUE. The master reset signal, MR, provides for an overriding reset of the preset and busy flip-flops. The CLOCK, DIU-BUSY, and DIU-PRESET are combined to form the signals DIU-CLK and DIU-PRE-CLK.

The more detailed diagram of the OPCODE, data and microenable circuits are presented as FIG. 61, DIU Instruction and Data Registers and Micro-code Generator. The DIU-LD signal is used to activate the loading of the DIU-OP portion of the DSPL-INST-DIU into the latch 6101. Similarly, the DIU-DATA portion of the DSPL-INST-DIU is loaded by the DIU-LD signal into the latch 6102. The OPCODE portion of the instruction is further decoded by the ROM 6103 which generates the micro-enable signals RD-CUR, WR-CELL, UP-CELL, TI-CUR, TI-CHAR, ON-DOT, LD-CHAR, NO-TI-CUR, LD-MODE, RES-MODE, LD-CUR, LD-CUR-OP, LD-CRT-OP, EN-CUR-OP, CUR-OP-ϕ, CUR-OP-1, CUR-OP-2, CUR-OP-3, ROM-CUR-ADR-ϕ, ROM-CUR-ADR-1, INT-REF, DIG-EN and BULK-ER.

Figure 62:
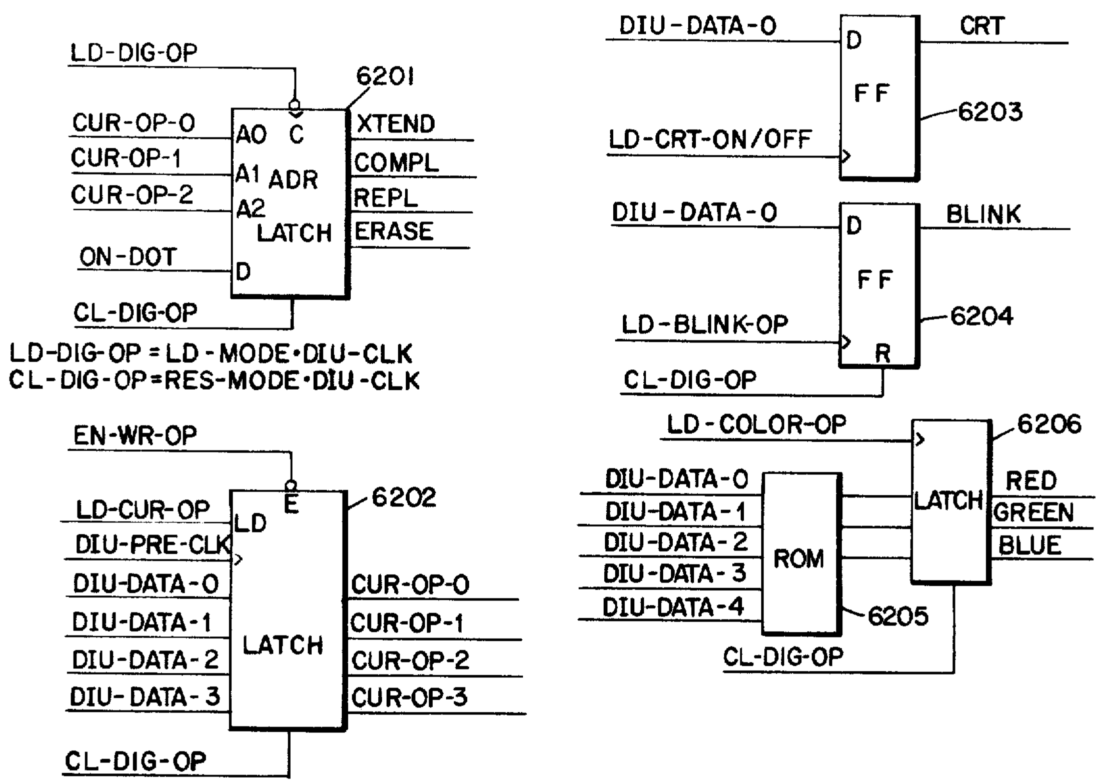

The display options and cursor modes circuitry are diagrammed in more detail as FIG. 62, Options and Modes Circuitry. The addressable latch 6201 allows the micro-enable ROM to select one of four options, XTEND, COMPL, REPL, or ERASE, which affect the display option used subsequently during the display of a character on the plasma panel or the CRT. The CL-DIG-OP signal provides for the simultaneous clearing of all display option exceptions currently in effect. The cursor mode latch 6202 is loaded with the four least significant bits of the DATA signal. The contents of this latch are used subsequently as a portion of the address of the cursor direction ROM. The value of the contents of the cursor mode latch allows the redefinable spacing modes of the cursor following the display of a character (e.g., right, left, up, down, tabulate, no-space). The selection of the control of the cursor by the cursor mode latch is made by the EN-CUR-OP signal from the micro-enable ROM. The current display in use, plasma panel or CRT, is determined by the output signal CRT from the flip-flop 6203. This flip-flop is loaded with the state of the least significant bit of the DIU-DATA signal when the active edge of the LD-CRT-ON/OFF signal is generated. The blinking character option is selected by the BLINK signal from the flip-flop 6204. This flip-flop is loaded with the state of the least significant bit of the DIU-DATA signal when the active edge of the LD-BLINK-CP is generated. The color option latch 6206 which generates the RED, GREEN, and BLUE signals to control the color of the character to be written into the CRT refresh memory is loaded from the decoded output of the ROM 6205 (illustrated in APPENDIX UU) whose address is determined by the least significant five bits of the DATA signal. The color option latch is loaded when the active edge of the LD-COLOR-OP signal is generated. Each of the outputs of the previous latches and flip-flop (except the CRT flip-flop) are cleared to a FALSE state when the CL-DIG-OP signal is generated.

Figure 63:
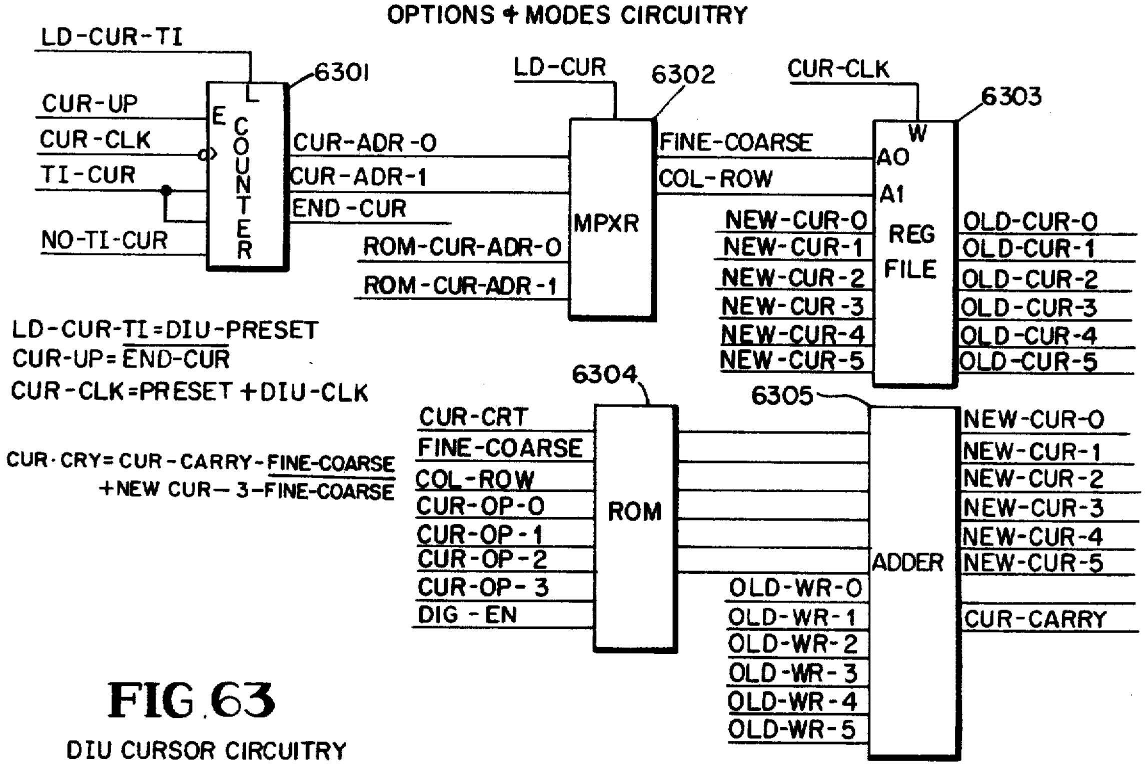

The cursor circuitry is shown in greater detail as FIG. 63, DIU Cursor Circuitry. The counter 6301 is responsible for generating the addresses of the four portions of the cursor, FINE-X, COARSE-X, FINE-Y, and COURSE-Y. The counter is loaded with the micro-enable ROM signals TI-CUR and NO-TI-CUR during the period the LD-CUR-TI signal is TRUE. The TI-CUR signal provides either one clock period for cursor update or four clock periods. However, the NO-TI-CUR signal is used to prevent any cursor clock periods from being generated whenever the microenables so direct. The multiplexer 6302 is directed by the signal LD-CUR from the micro-enable ROM to provide either the sequential addresses from the cursor address generator or the preset address from the micro-enable ROM. The preset address is used whenever the instruction directs that only one portion of the four-part cursor value is to be modified. The signals FINE-COARSE and COL-ROW provide the address to the register file 6303 containing the current cursor value. During a cursor update which uses the modified value of the old cursor, each of the portions of the cursor are sequentially addressed in the same order as mentioned above. For each value presented to the ADDER 6305, the old cursor value is modified by the contents of the ROM 6304 (illustrated in APPENDIX SS) whose address is specified by a collection of signals indicating the type of spacing to be performed. The CUR-CRY signal is the overflow or borrow condition from the previous operation on the previously addressed portion of the cursor. This feature allows the cursor to drop down one character row whenever the cursor reaches the right-hand side of the display. The FINE-COARSE and COL-ROW signals provide the addressing necessary to treat the individual portions of the cursor differently. The CUR-OP signal is provided from cursor spacing mode latch or the micro-enable ROM. The micro-enable ROM determines which data dominates the signal. Finally, the DIG-EN signal indicates the address for cursor modification depending on whether or not the operation called for by the micro-enable ROM is composed of both a character display operation and a cursor operation or only a cursor operation.

Figure 64:
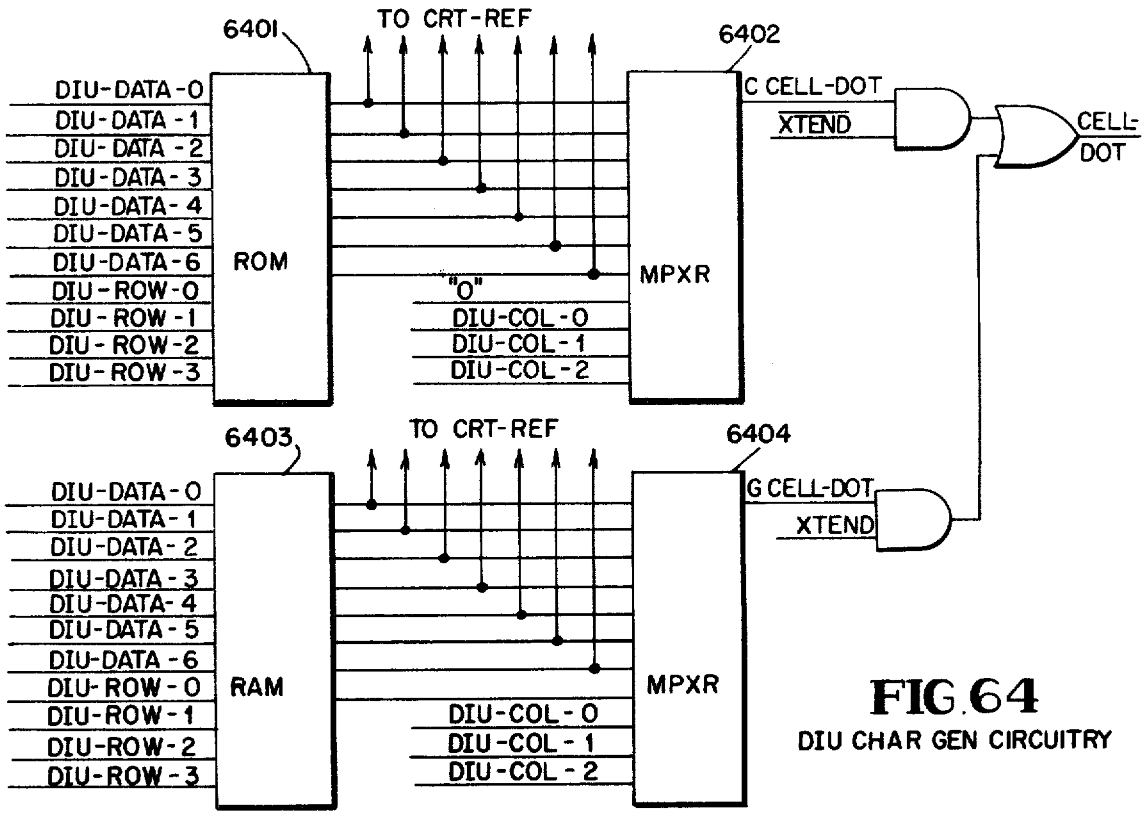

The dot matrix character generation circuit for display is shown as FIG. 64, DIU Character Generation Circuitry. The ROM 6401 is addressed by the DATA signal which is specified by the ASCII value of the character to be displayed in addition to the ROW signal produced by the row address generator. The output of the ROM (the character is a seven dot by nine dot matrix defined within an eight by sixteen dot matrix) is then fed to a multiplexer 6402 which selects one of the eight inputs as indicated by the COL signal produced by the column address generator. Similarly, the RAM 6403 is addressed by the ASCII value of the character plus the ROW signal to produce an eight-dot signal fed to the multiplexer 6404. Again, one dot is selected by the COL signal. Finally, the XTEND signal is used to select between the C-CELL-DOT and G-CELL-DOT signals to produce the CELL-DOT signal used by the plasma panel interface circuit.

Figure 65:
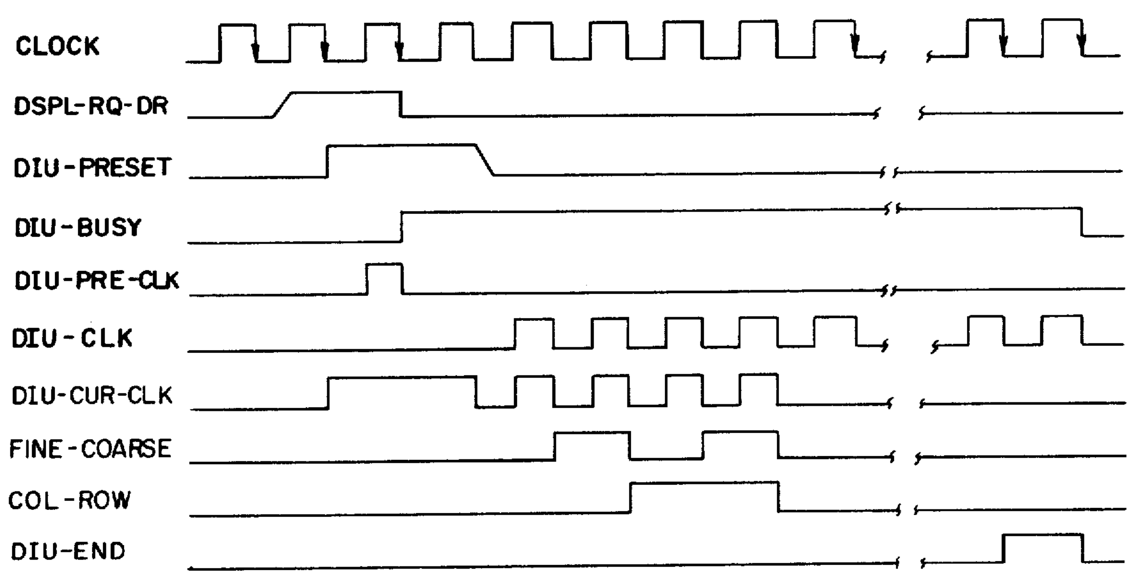

The timing relationship of the various signals used to initiate an instruction, modify the cursor, and terminate an instruction are shown as FIG. 65, DIU Timing Diagrams. The CLOCK signal provides the active edge for the actions occurring. Whenever a request is raised by the DSPL control processor, if the DIU is currently idle, then the DIU-PRESET signal will become TRUE at the next active edge. On the immediately subsequent active edge, the DIU-BUSY signal will become TRUE. The DIU-PRE-CLK signal is generated during the previous cycle. The next active edge causes the DIU-PRESET signal to become FALSE. The DIU-CLK signal now begins tracking the CLOCK signal. If the cursor address generator is selected to run by the micro-enable ROM, then four cursor clocks, DIU-CUR-CLK signal, are generated. During the period of cursor modification, the FINE-COARSE and COL-ROW signals produce the desired addresses for the cursor memory. Finally, after the termination conditions are met (as determined by the output state of the micro-enable ROM), the DIU-END signal is generated and the DIU-BUSY signal becomes FALSE on the next active edge.

DIU NOP Instruction (NUL)

The DIU raises its DIU-BUSY or DIU-ACT-DSPL signal to a TRUE condition in response to the DSPL-RQ-DIU signal. Otherwise, no cursor or display operation is performed. The DIU immediately returns to the "not-active" state.

DIU Cursor Home Instruction (SOH)

The DIU raises the DIU-ACT-DSPL signal in response to the DSPL-RQ-DIU signal. Four cursor cycles are produced during which each of the four portions of the cursor are modified to zero. This operation insures that the next cursor position will be the upper left-hand corner of the display.

DIU Write Character Instruction (STX)

The DIU acknowledges the DSPL request. The ASCII character presented in the DATA portion of the instruction is displayed on the plasma panel or written into the CRT refresh memory at the address specified by the current position of the cursor. The sequence of actions also results in the generation of four cursor clock cycles during which the cursor is updated to the new cursor position. The direction and magnitude of the cursor update depend on the current contents of the cursor mode latch.

DIU Define Cell Address Instruction (ETX)

The DIU acknowleges the DSPL request. THe ASCII character represented by the DATA portion of the instruction is used to set the address into the G-CELL memory for subsequence loading of the dot definition to the redefinable character set.

DIU Load Cell Row Instruction (EOT)

The DIU acknowledges the DSPL request. The eight-bit DATA portion of the instruction is used to load the redefinable graphic cell generator memory, G-CELL. The address is then incremented by one in order that the next load-cell-row instruction will be performed at the next address. Sixteen of these instructions are required to define an entire graphic cell.

DIU Set Coarse Column Instruction (ENQ)

The DIU acknowledges the DSPL request. The six least significant bits of the DATA portion of the instruction are used to load the COARSE-X portion of the cursor. Only one cursor clock cycle is required while the address is provided by the micro-enable ROM.

DIU Disable Erase Instruction (ACT)

The DIU acknowledges the DSPL request. The state of the ERASE signal from the display options mode addressable latch is set to FALSE. The address into the latch is provided by the micro-enable ROM. Only one DIU-CLK is required to accomplish this operation. This instruction provides the ability to disable the ERASE condition without affecting the other display options.

DIU Set Coarse Row Instruction (BEL)

The DIU acknowledges the DSPL request. The six least significant bits of the DATA portion of the instruction is used to load the COARSE-Y portion of the cursor. Only one cursor clock cycle is required while the address into the cursor memory is provided by the micro-enable ROM.

DIU CUrsor Left Instruction (BS)

The DIU acknowledges the DSPL request. Four cursor clock cycles are generated in order to update the position of the cursor one character width (eight dots) to the left. The direction and magnitude of the cursor update is provided by the CUR-OP signal from the micro-enable ROM. This instruction provides the ability to backspace the cursor during character displays.

DIU Tabulate Instruction (TAB)

The DIU acknowleges the DSPL request. Four cursor clock cycles are generated in order to update the position of the cursor to the next "tab" position. This is acomplished by incrementing the cursor COARSE-X portion by eight and setting to zero the less significant bits of the COARSE-X portion and clearing the FINE-X portion. This direction and magnitude of the cursor update is provided by the CUR-OP signal from the micro-enable ROM. This instruction provides the ability to "tab" the cursor to the next fixed "tab" position.

DIU Cursor Down Half Character Instruction (LF)

The DIU acknowledges the DSPL request. Four cursor clock cycles are generated in order to update the position of the cursor to the next half-line down the display from the current position. This is accomplished by incrementing the cursor COARSE-Y portion by one. The direction and magnitude of this cursor update is provided by the CUR-OP signal from the micro-enable ROM. The "line-feed" instruction provides the ability to display subscripts.

DIU Cursor Up Half Character Instruction (VT)

The DIU acknowledges the DSPL request. Four cursor clock cycles are generated in order to update the position of the cursor to the next half-line up the display from the current position. This is accomplished by decrementing the cursor COARSE-Y portion by one. The direction and magnitude of this cursor update is provided by the CUR-OP signal from the micro-enable ROM. The "vertical-tab" instruction provides the ability to display superscripts.

DIU Erase Screen Instruction (FF)

The DIU acknowledges the DSPL request. The BULK-ERASE signal is set TRUE in order for the plasma interface to generate a BULK-ERASE command to the plasma panel. If the CRT state is set, then the CRT refresh circuit is set to write the most significant bit of each location in the refresh memory to a TRUE state. In addition, four cursor clock cycles are generated during which each of the four portions of the cursor are modified to zero. The signals necessary for this cursor update are provided by the CUR-OP signal from the micro-enable ROM. The "form-feed" instruction provides the ability to clear the display without disturbing the display options currently in effect.

DIU Carriage Return Instruction (CR)

The DIU acknowledges the DSPL request. Four cursor clock cycles are generated in order to update the position of the cursor to the beginning of the next full character line below the current line. This is accomplished by clearing the FINE-X and COARSE-X portion of the cursor and incrementing the COARSE-Y portion of the cursor by two. The direction and magnitude of this cursor update is provided by the CUR-OP signal from the micro-enable ROM. The "carriage-return" instruction provides the ability to attain the next display line for common textual displays.

DIU Set Fine Column Instruction (SO)

The DIU acknowledges the DSPL request. The three least significant bits of the DATA portion of the instruction are used to load the FINE-X portion of the cursor. Only one cursor clock cycle is required while the cursor address (i.e., FINE-X) is provided by the micro-enable ROM.

DIU Set Fine Row Instruction (SI)

The DIU acknowledges the DSPL request. The three least significant bits of the DATA portion of the instruction are used to load the FINE-Y portion of the cursor. Only one cursor clock cycle is required while the cursor address (i.e., FINE-Y) is provided by the micro-enable ROM.

DIU Reset Unit Instruction (DLE)

The DIU acknowledges the DSPL request. The BULK-ERASE signal is set TRUE in order for the plasma interface to generate a BULK-ERASE command to the plasma panel. If the CRT state is set, then the CRT refresh circuit is set to write the most significant bit of each location in the refresh memory to a TRUE state. In addition, four cursor clock cycles are generated during which each of the four portions of the cursor are cleared. The signals necessary for this cursor update are provided by the CUR-OP signal from the micro-enable ROM. Finally, the CL-DIG-OP signal (clear display options and cursor options) is generated. The "reset" instruction provides the ability to completely reset the unit to a pristine state.

DIU Read Coarse Row Instruction (DCI)

The DIU acknowledges the DSPL request. Before the DIU-ACT-DSPL signal returns to a FALSE state, the contents of the COARSE-Y portion of the cursor memory are presented on the output of the DIU data processor. The specified cursor address is provided by the micro-enable ROM. Only one cursor clock cycle is required to complete this instruction.

DIU Read Coarse Column Instruction (DC2)

The DIU acknowledges the DSPL request. Before the DIU-ACT-DSPL signal returns to a FALSE state, the contents of the COARSE-X portion of the cursor memory are presented on the output of the DIU data processor. The specified cursor address is provided by the micro-enable ROM. Only one cursor clock cycle is required to complete this instruction.

DIU Read Fine Row Instruction (DC3)

The DIU acknowledges the DSPL request. Before the DIU-ACT-DSPL signal returns to a FASLE state, the contents of the FINE-Y portion of the cursor memory are presented on the output of the DIU data processor. The specified cursor address is provided by the micro-enable ROM. Only one cursor clock cycle is required to complete this instruction.

DIU Read Fine Column Instruction (DC4)

The DIU acknowledges the DSPL request. Before the DIU-ACT-DSPL signal returns to a FALSE state, the contents of the FINE-X portion of the cursory memory are presented on the output of the DIU data processor. The specified cursor address is provided by the micro-enable ROM. Only one cursor clock cycle is required to complete this instruction.

DIU Load CRT Option Instruction (NAK)

The DIU acknowledges the DSPL request. The upper bits (bits five and six, numbering the least significant bit as zero) of the DATA portion of the instruction are examined to determine which of three actions will occur. (1) The CRT state flip-flop will be loaded from the state of the least significant bit of the DATA portion of the instruction. (2) The BLINK state flip-flop will be loaded from the state of the least significant bit of the DATA portion of the instruction. (3) The color option latch will be loaded with the output of the color decode ROM whose address is specified by the five least most significant bits of the DATA portion of the instruction. This instruction allows the selection of the different CRT display options that are not a subset of the plasma panel display options.

DIU Move Dot Instruction (SYN)

The DIU acknowledges the DSPL request. Four cursor clock cycles are generated in order to update the position of the cursor in the direction specified by the four least significant bits of the DATA portion of the instruction. This instruction provides the ability to move the cursor in any of sixteen different manners as controlled by the input data.

DIU Enable Erase Instruction (ETB)

The DIU acknowledges the DSPL request. Only one DIU clock cycle is generated. The state of the ERASE signal from the display options mode addressable latch is set to TRUE. The address into the latch is provided by the micro-enable ROM. This instruction provides the ability to enable the ERASE condition without affecting the state of the other display options.

DIU Reset Options Instruction (CAN)

The DIU acknowledges the DSPL request. Only one DIU clock cycle is generated. The CL-DIG-OP signal is generated which clears the cursor option mode latch, the display option mode latch, the BLINK flip-flop and the CRT color option mode latch. This instruction provides the ability to reset only the display and cursor options without affecting other portions of the unit.

DIU Load Cursor Mode Instruction (EM)

The DIU acknowledges the DSPL request. Only one DIU clock cycle is generated. The least significant four bits of the DATA portion of the instruction are loaded into the cursor option mode latch. This instruction provides the ability to preset the method of cursor update that will be applied after the display of any subsequent characters.

DIU Dot Write Instruction (SUB)

The DIU acknowledges the DSPL request. Four cursor clock cycles are generated in order to update the portion of the cursor in the direction specified by the four least significant bits of the DATA portion of the instruction. In addition, a single dot is written at the previous location of the cursor during plasma panel operations. This instruction allows the ability to perform incremental dot graphic display operations.

DIU Write Character Without Move Instruction (ESC)

The DIU acknowledges the DSPL request. The ASCII character presented in the DATA portion of the instruction is displayed on the plasma panel or written into the CRT refresh memory at the address specified by the current position of the cursor. However, the cursor is not modified from its current position. This instruction allows the ability to implement a software visible cursor with a minimal number of instructions.

DIU Cursor Right Instruction (FS)

The DIU acknowledges the DSPL request. Four cursor clock cycles are generated in order to update the position of the cursor to the next character space to the right of the current position on the display. This is accomplished by incrementing the COARSE-X portion of the cursor by one. The direction and magnitude of this cursor update is provided by the CUR-OP signal from the micro-enable ROM. The "forward-space" instruction provides the ability to space the cursor without affecting the display.

DIU Enable Replace Instruction (GS)

The DIU acknowledges the DSPL request. Only one DIU clock cycle is generated. The state of the REPL signal from the display options mode addressable latch is set to TRUE. The address into the latch is provided by the micro-enable ROM. This instruction provides the ability to enable the replace condition without affecting the state of the other display options.

DIU Enable Complement Instruction (RS)

The DIU acknowledges the DSPL request. Only one DIU clock cycle is generated. The state of the COMPL signal from the display options mode addressable latch is set to TRUE. The address into the latch is provided by the micro-enable ROM. This instruction provides the ability to enable the "reverse-writing" condition (dark character on lighted background) without affecting the state of the other display options.

DIU Select Extended Instruction (US)

The DIU acknowledges the DSPL request. Only one DIU clock cycle is generated. The state of the XTEND signal from the display options mode addressable latch is set to TRUE. The address into the latch is provided by the micro-enable ROM. This instruction provides the ability to select the redefinable graphic cell generator as the character source for the plasma panel. If the CRT state is TRUE, then the extended character set refresh memory, G-MEM, is selected to be written into.

PROJ

Figure 8:
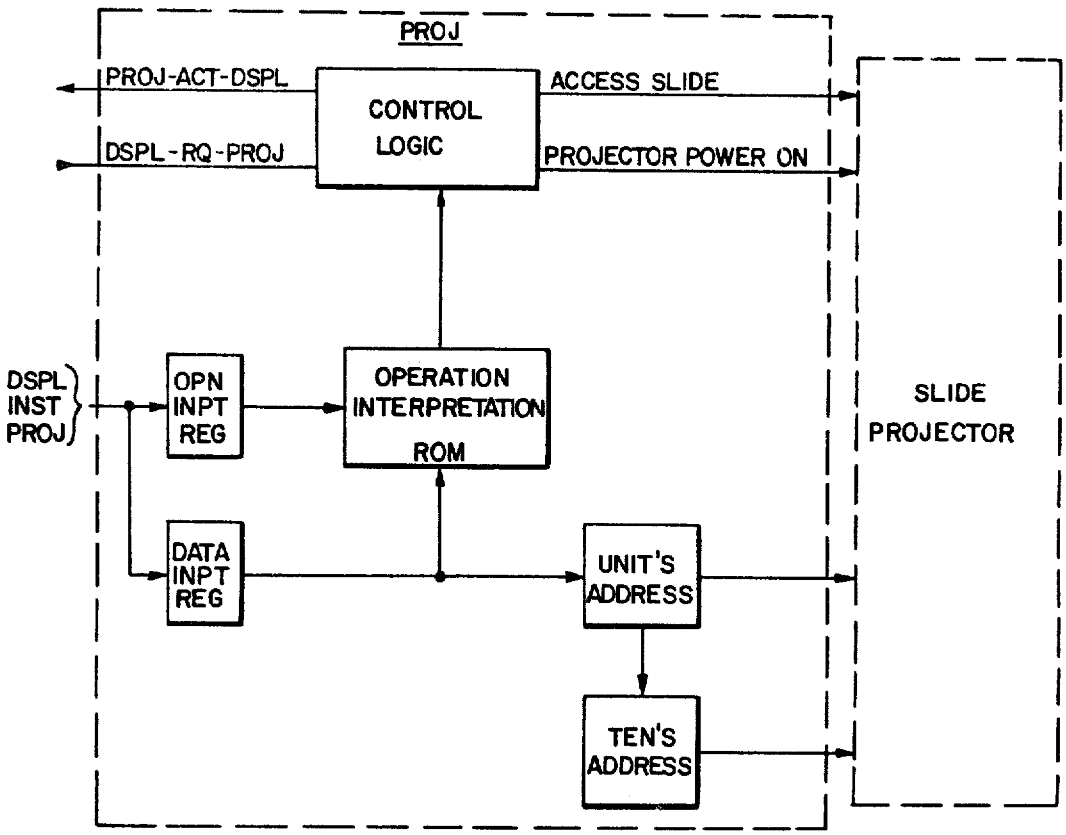
FIG. 8 is a block diagram of the PROJ data processing element shown in FIGS. 4A and 4B, the purpose of which is to allow communication with a slide projector external processor.

Referring to FIG. 8, the control of the slide projector to PROJ to rear project an image on the plasma panel will be explained. A particular projector used in the exemplary system is a Kodak RA-960 as identified in APPENDIX A which has the capability of storing 80 slides and accessing any one of these slides on demand. PROJ exercises control over the projector by performing any one of four operations commanded by DSPL:

PROJECTOR ON
PROJECTOR OFF
LOAD ADDRESS
ACCESS SLIDE

Each of the commands from DSPL is transmitted in the form of an instruction DSPL-INST-PROJ which may include an operation code portion and a data portion. Simultaneous with transmission of an instruction to an instruction input register in PROJ, DSPL transmits a request signal DSPL-RQ-PROJ to control logic in PROJ. The control logic effects latching of the instruction in the instruction input register and then transmits an active signal PROJ-ACT-DSPL to DSPL. Transmission of this active signal is maintained until the operation commanded by DSPL has been completed. The data portion of the instruction flows to an operation interpretation ROM and to a units address register. The ROM interprets data and transmits a signal designating the operation to be performed to the control logic. The control logic then effects completion of the designated operation and drops the active signal informing DSPL that PROJ is ready to perform another operation.

If a PROJECTOR ON signal is interpreted by the ROM, the control logic raises a signal on a line connected to the projector informing the projector to turn power on. If a PROJECTOR OFF signal is interpreted by the ROM, the control logic is caused to drop the signal directing the projector to turn power off.

The LOAD ADDRESS operation is commanded if the ROM detects numeric data input. The data is interpreted by the ROM causing the control logic to effect the gating of the data portion into a units address register. If it is desired to display a slide located at storage locations 0 through 9, the data in the units address register will be utilized to designate this location to the projector. If it is desired to display a slide located at a two-digit address, however, the DSPL will transmit two successive instructions with the data portion containing the lower order digit. The higher order digit will be loaded into the unit's address register during the first of these operations and during the second operation the higher order digit will be transferred to a ten's address register and the lower order digit will be loaded into the unit's address register.

The ACCESS SLIDE operation is commanded by an instruction havving an operation code portion only. After interpretation by the ROM, the control logic transmits an ACCESS SLIDE signal directing the projector to display the slide located at the address represented by the data in the ten's and unit's address registers.

PRNT

Figure 9:
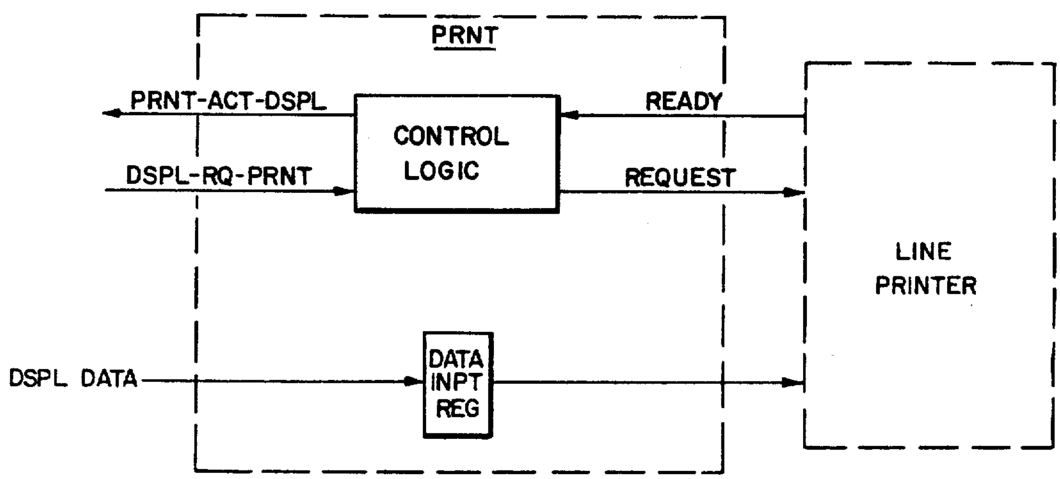
FIG. 9 illustrates the block diagram of the PRNT data processing element shown in FIGS. 4A and 4B for interfacing with a line printer external processor.

Referring to FIG. 9, the control of the line printer by PRNT to print a designated character will be explained. The Cassio Jet printer as identified in APPENDIX A requires only data giving a seven digit code designating a character to be printed and a request signal indicating that this data is being transmitted. The data designating a desired character is first transmitted from DSPL to a data input register DATA IN in the print processor, simultaneous with transmission of a request signal DSPL-RQ-PRNT to control logic. The control logic effects latching of the data into the data input register and transmits an active signal PRNT-ACT-DSPL to DSPL. The control logic then transmits a request signal to the printer indicating that data designating a character to be printed is being transmitted from the data input register to the printer. The printer writes the character designated and then transmits a READY signal to the control logic in PRNT. The READY signal causes the control logic to drop the active signal informing DSPL that the designated character has been printed.

SYM PROCESSOR DESIGN

Figure 12A:
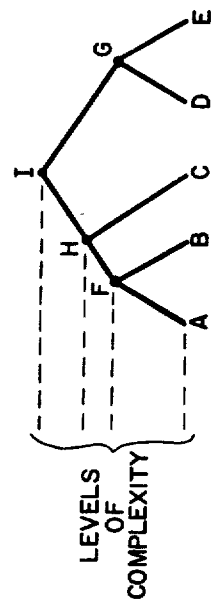
FIG. 12A illustrates the tree structure concept for constructing complex symbols from primitive symbols.
Figure 12B:
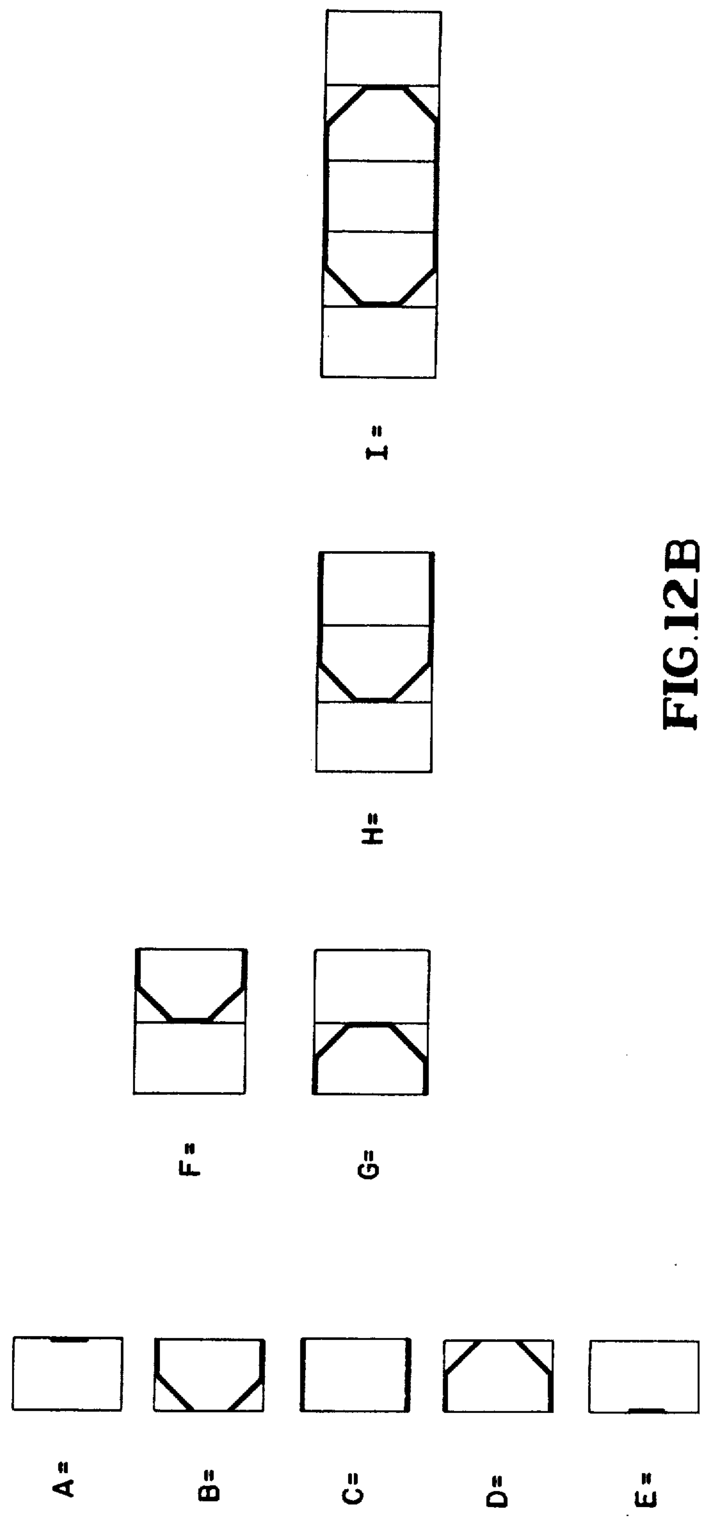
FIG. 12B illustrates the steps of generating a complex symbol in accordance with the definition of FIG. 12A in which the primitive symbols A, B, C, D and E are used to construct more complex symbols F, G and H which are in turn used to construct complex symbol I which is part of the example illustrated in FIG. 4C.

Information defining graphic and pictorial images to be presented on the plasma panel and/or the TV display device is stored in SYM before transmission to DIU by DSPL. Each image to be presented is structured from a plurality of symbols and each of these symbols is designated by a unique character assigned by the operator or by the lesson plan. Each of these symbols is in turn structured from a plurality of smaller symbols also designated by unique characters. This process of constructing larger symbols from smaller symbols and designating each by a unique character can be continued down to a primitive symbol which is formed by a single display cell. Thus, a multi-level, tree-structured definition of symbols of arbitrary complexity may be established. A very simple example of such a tree-structured definition is illustrated in FIG. 12A. The symbols defined by the characters of FIG. 12A are illustrated in FIG. 12B.

Figure 13:
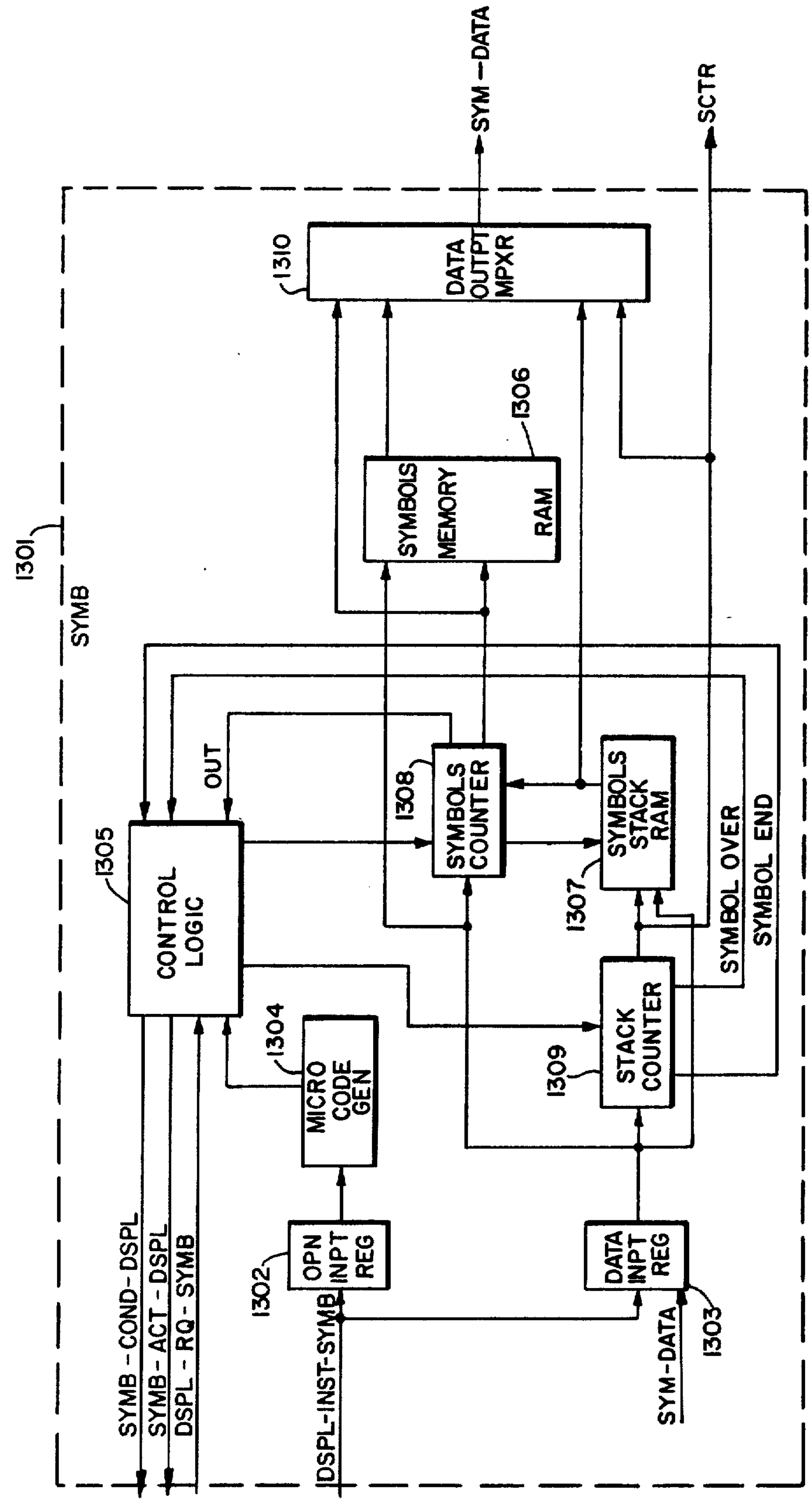
FIG. 13 is a block diagram of the symbol processing element SYM of FIGS. 4A and 4B, the purpose of which is to process the data for structures illustrated in FIG. 12A.

As illustrated in FIG. 13, SYM 1301 includes an OPERATION INPUT REGISTER 1302 and a DATA INPUT REGISTER 1303 for receiving OPCODE and data portions of instructions from DSPL. An OUTPUT DATA REGISTER 1304 is provided for holding data to be transmitted to DSPL. SYM also includes CONTROL LOGIC CIRCUITRY 1305 controlling performance of operations specified by received instructions, and two random access memories designated the SYM- BOLS MEMORY 1306 and the SYMBOLS STACK 1307. The SYMBOLS MEMORY 1306 stores symbol definitions and the SYMBOLS STACK 1307 operates as a look-up table for translating each character into the beginning address in the symbols memory for the definition of the symbol designated by the character. The SYMBOLS STACK 1307 is also used for short term storage of addresses in the SYMBOLS MEMORY 1306 which must be reentered during readout of symbols. A complete list of devices needed to construct an example SYM processor is given in APPENDIX QQ.

Storage of a symbol definition requires that DSPL transmit the starting address and the character designating this symbol to the DATA INPUT REGISTER 1302. The starting address is then gated to a SYMBOLS COUNTER 1308 and also through a STACK COUNTER 1309 to a memory location in the SYMBOLS STACK 1307 at an address designated by the transmitted character. Upon completion of these operations, DSPL transmits the symbol definition which is stored in successive memory addresses in the SYMBOLS MEMORY 1306 under the control of the SYMBOLS COUNTER 1308. The last portion of the definition is a special code indicating "end of symbol". Storage of the definition of the symbol designated by the character I in FIG. 12 requires a starting address for each of the nine definitions required to construct the nine possible symbols. These definitions are:

| | |
|---|---|
| I = HG | |
| H = FC | |
| G = DE | |
| F = AB | |
| E = | corresponding primitive symbol definitions |
| D = | |
| C = | |
| B = | |
| A = | |

Reading of a symbol definition from the symbols memory is initiated by an instruction from DSPL commanding that the definition designated by a character transmitted to the data input register be transmitted to DSPL. In the case of a symbol not formed from other symbols, the data defining this symbol is read from the symbols memory address designated by the SYMBOLS STACK 1307 for the transmitted character. This data is then transmitted by the DATA OUTPUT REGISTER 1304 to DSPL.

In the case of a symbol formed from other symbols, the first character designating this symbol is transmitted to DSPL and the address of the location in the symbols memory following the last location accessed is stored in an auxiliary address location in the SYMBOLS STACK 1307. If the original symbol requested by DSPL is F, for example, the character read would be A and the location in the symbols memory following the last one accessed would contain the character B. DSPL next commands SYM to read the contents of the symbols memory location designated by A and the data defining the symbol designated by A is transmitted to DSPL. Following this transmission, the CONTROL LOGIC 1305 causes a count in the STACK COUNTER 1309 to be referenced. This count indicates the number of auxiliary addresses that have been stored in the SYMBOLS STACK 1307 during readout of information. The count following readout of F is incremented to 1. This is now decremented to 0 and the data defining B is read from the symbols memory location designated by the auxiliary address in the SYMBOLS STACK 1307. The STACK COUNTER 1309 will then transmit a SYMBOL END signal to the CONTROL LOGIC 1307 which indicates to DSPL by transmission of the condition signal SYM-COND-DSPL the end of symbol. Two other conditions may also be transmitted to DSPL in this manner. The first condition is STACK OVERFLOW indicating that the number of auxiliary addresses in the symbols stack is insufficient for storing the number of addresses attempted. The second condition is SYMBOLS ERROR indicating that the last symbol information stored in the symbols memory exceeded the available memory locations.

A detailed description of the implementation of an exemplary SYM is now given.

SYM Instruction Set Definition

Figure 66A:
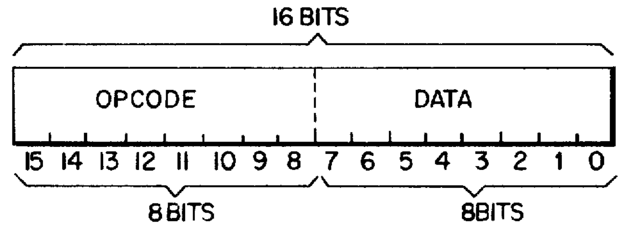
Figure 66B:
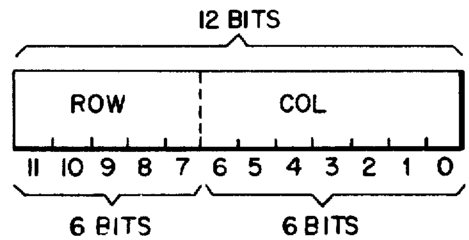

The SYM accepts 16-bit instructions from the DSPL with bit format illustrated in FIG. 66. The OPCODE portion of the instruction defines what type of operation is to be performed whereas the DATA portion of the instruction provides data which may be used with that operation.

SYM Concept of Operation

In the application as a symbol processor, the PMEM provides three fundamental data structures for the symbol readout process:

(1) a linear array of character data representing the definition of a multiplicity of symbols, (2) an address stack which is used for saving subsymbol return points, and (3) a symbol name lookup table memory which holds the starting address for each symbol.

The combination of these data structures allows all the addressing for a symbol set to be performed entirely within the SYM and thus DSPL is not required to supply the address of any specific data items. Instead, DSPL uses the instruction ADVANCE in SYM to access the next character from the symbol definition string, a combination of the RDROW, STROW, PUSPS instructions to save an address on the address stack and a combination of the instructions REPROW, REPCOL POPS to cause the symbol return address or initial symbol address to be restored to a value previously stored on the address stack.

SYM FUNCTIONAL DESCRIPTION

In this section, the circuit level operation of the SYM is described using detailed block diagrams of FIGS. 67–71.

SYM Instruction Interface Control

The instruction interface control circuitry is illustrated in FIG. 67. Operation of the SYM begins when the DSPL-RQ-SYM signal becomes active. If SYM is currently active, operation waits until it becomes inactive from the previous instruction. Once SYM becomes inactive, gate 6701 is enabled and on the next CLOCK the SYM-ACTIVE flip-flop 6704 is set. SYM-ACTIVE allows the PHASE COUNTER 6705 to count on each CLOCK PULSE. As the PHASE COUNTER counts, the PHASE-DECODE devices generate the four pulses P1, P2, P3 and P4, in that order. On the occurrence of pulse P4, the K input to the ACTIVE flip-flop is enabled and the flip-flop is reset, completing the instruction execution. The pulses P1, P2, P3 and P4 are used to control the operations unique to each instruction. The relative timing of these operations are illustrated in FIG. 71 as the COMMON TIMING for all instructions executed for SYM.

SYM Micro-Instruction Generation

Each SYM instruction is executed by performing a set of micro-instructions which are determined by the OPCODE of the instruction. FIG. 68 illustrates the circuitry for the OPCODE register and the MICROCODE GENERATOR. The OPCODE REGISTER 6801 is loaded by the same clock pulse which sets the ACTIVE flip-flop as illustrated by the LOAD-OPCODE line in timing diagram FIG. 71. SYM ROM's 1 and 2, 6802, 6804 (defined in detail in APPENDIXES OO and PP), generate the enable signals defining what micro-operations are to be performed. The BUS-ADD signals constitute a three-bit word which selects which of the registers and memories in the SYM is to be used for data on the SYM-DATA 6805 bus. The BUS ADDRESS DECODER 6803 insures that only one data source is on the bus at a time. The other ROM enables are used in conjunction with the P1, P2, P3 and P4 pulses to load registers, write memories, count counters and so forth for the different input instructions. The definition of enables for the different OPCODES are defined in APPENDIXES OO and PP.

SYM Data Input and Output

Data flow within the SYM is accomplished by a tri-state bus. The DATA REGISTER 6806 on FIG. 68 may be loaded with the DSPL-DATA portion of the input instruction if the enable LOAD-DREG and SELECT-INPUT signals are generated by the MICROCODE GENERATOR 6802, 6803 for a given instruction. The DATA REGISTER may also be loaded from any other source on the DATA-BUS 6805. The SYM-DATA signals out of the processor reflect the current contents of the DATA-REGISTER when the SYM is not active (between instructions).

SYM Address Counter Operation

The principal part of the SYM in the DATA MEMORY 6901 illustrated in FIG. 69. This memory allows storage of 2048 eight-bit words. Each location in this memory may be written or read by different input instructions. The 11-bit address for this memory is generated by the MEMORY ADDRESS COUNTER 7001 illustrated in FIG. 70. The memory address word is broken up into two fields as follows:

Bits 0–5 COLUMN ADDRESS
Bits 6–11 ROW ADDRESS

The MEMORY ADDRESS COUNTER 7001 allows the COLUMN and ROW address parts to be loaded separately and allows the current COLUMN COUNT (PCOL) and ROW COUNT (PROW) to be separately read onto the DATA-BUS through the bus drivers 7002 and 7003. The parts of the MEMORY ADDRESS COUNTER count up and count down as a single counter.

SYM Address Stack Operation

The location of different data items in the DATA MEMORY may be saved for subsequent relocation of the MEMORY ADDRESS COUNTER by the ADDRESS STACK illustrated in FIG. 70. The ADDRESS STACK may be used either as an address return stack or as an address lookup table or both concurrently. The ADDRESS STACK consists of an up/-down counter 7004 and an ADDRESS STACK MEMORY 7005. Each value of the STACK POINTER COUNTER 7004 may access either a stack row address or column address in the ADDRESS STACK MEMORY depending upon whether the SELECT-MROW or SELECT-MCOL micro-code enables are present.

For use as a return stack, the operation is as follows. To save an address, the STACK POINTER COUNTER is incremented by a PUSHS instruction and the row and column data written into the current address indicated by STACK POINTER COUNTER by the STROW and STCOL instructions. To return the stack address, the MEMORY ADDRESS COUNTER is loaded by the REPROW and REPCOL instructions after which the STACK POINTER COUNTER is decremented by a POPS instruction.

For use as a lookup table, the stack pointer is loaded into the STACK POINTER COUNTER by a SETS instruction after which the REPROW and REPCOL instructions are used to take the address from ADDRESS STACK MEMORY and put that address into the MEMORY ADDRESS COUNTER.

When the ADDRESS STACK is used for both a lookup table and a return address stack, the STACK POINTER COUNTER may be read and restored at the times which the dual usage might invalidate the current contents of the STACK POINTER COUNTER.

SYM Condition Logic Operation

As shown in FIG. 67, the SYM generates three conditions which may be monitored by the DSPL to allow looping of operation. The STACK-OVER signal is generated when the STACK POINTER COUNTER issues the MAX-COUNT signal which sets F-F 6707. This condition denotes that there is no more room in the stack memory for addresses. This condition remains set until the stack pointer is decremented or the PRESET instruction is executed.

The STACK-END signal denotes that the stack is empty and is generated when the STACK POINTER COUNTER issues the MIN-COUNT signal and sets F-F 6708. STACK-END is inhibited if the counter is incremented.

The SYM-OUT signal denotes that the MEMORY ADDRESS COUNTER has overflowed and is set when the PCTR-MAX signal is generated which sets F-F 6709 and is reset when the MEMORY ADDRESS COUNTER is reset.

SYM NOP Instruction

The SYM NOP instruction is executed when the DSPL OP-CODE sent to the SYM has value 340 (octal). This instruction does not manipulate any data in the processor, as implied by the name "NO-OPERATION", but is useful for maintenance purposes to verify that the processor can accept and execute instructions. Timing for the NOP instruction consists of the common timing signals illustrated in FIG. 71. The sequence of signals is as follows. To initiate the instruction execution, the DSPL-RQ-SYM signal activates gate 6701 and upon the next clock pulse the ACTIVE flip-flop 6704 is set which generates the SYM-ACTIVE signal. The ACTIVE signal allows the PHASE COUNTER 6705 to count and generate in order the four clock phase signals P1, P2, P3 and P4 from the PHASE DECODER 6706. Upon the occurrence of the P4 signal, the ACTIVE flip-flop 6704 is reset. Subsequent instructions may be executed by the processor when the DSPL-RQ-SYM signal is again received.

SYM Preset Instruction (OPCODE=341)

The PRESET instruction is used to initialize the conditions and memory address counter in the SYM. The time sequence for the PRESET instruction is the same as for the NOP instruction. The STACK-OVER 6707, STACK-END 6708 and SYM-OUT 6709 flip-flops are reset by the PRESET signal output from SYM ROM 6802 which is active for OPCODE 341 (octal). This signal also resets MEMORY ADDRESS COUNTER 7001. The timing for this signal is illustrated by the RESET-PCNTR signal in FIG. 71.

SYM Reset Instruction (OPCODE=342)

The RESET instruction performs the same functions as the PRESET instruction and, in addition, clears the STACK POINTER COUNTER 7004 by use of the RESET signal from the MICRO-CODE ROM 6804 which is active for OPCODE=342.

SYM LDROW Instruction (OPCODE=343)

The load memory address counter row instruction (LDROW) is used to set the value of the ROW portion of the memory address counter. Timing for this instruction is the same as for the NOP instruction. The value for loading is taken from the DATA REGISTER by enabling that register's data onto the bus by way of the signal SELECT-DATA which is active for this instruction by way of the BUS ADDRESS DECODER 6803 which in turn is given the bus address from the MICRO-CODE GENERATOR 6802. The data is loaded into the ROW portion of the MEMORY ADDRESS COUNTER 7001 by the LOAD-PROW signal which is activated by the combination of the EN-LOAD-PROW from the MICRO-CODE GENERATOR 6804 and clock pulse P4.

SYM LDCOL Instruction (OPCODE=228)

The load memory address column instruction operates the same as the LDROW instruction except that the LOAD-PCOL signal is generated instead of the LOAD-PROW signal. This causes the column portion of the MEMORY ADDRESS COUNTER 7001 to be loaded instead of the row portion.

SYM LOADPM Instruction (OPCODE=345)

The LOADPM instruction is used to load data into the DATA REGISTER 6806 from the META-DATA input value. Timing for this instruction is the same as the NOP instruction except that the LOAD-D signal is generated as a result of the LOAD-DREG signal being activated by the MICRO-CODE GENERATOR 6802. This signal loads the DATA REGISTER 6806 with the value from the INPUT BUS DRIVER 6804 which is enabled by the SELECT-INPUT signal supplied by the BUS ADDRESS DECODER 6803.

SYM Write Instruction (OPCODE=346)

The WRITE instruction is used to load one word (eight bits) of data into the DATA MEMORY 6901 at the current address location defined by the MEMORY ADDRESS COUNTER 7001. The data originates in the DATA REGISTER 6806. For this instruction, the MICRO-CODE GENERATOR 6802 enables the DATA REGISTER 6806 contents onto the DATA-BUS 6805 and activates the EN-WRT-MEM signal to load data into the DATA MEMORY 6901. The WRITE-DATA-MEMORY signal timing is illustrated in FIG. 71.

SYM Read Instruction (OPCODE=347)

The READ instruction is used to read the contents of the DATA MEMORY 6901 at the location currently defined by the MEMORY ADDRESS COUNTER 7001 and load that data into the DATA REGISTER 6806. AFter the completion of the instruction, the DATA REGISTER contents are enabled onto the DATA-BUS 6805 so that they can be used by other processors as the SYM-DATA. cl SYM POPP Instruction (OPCODE=350)

The POPP instruction performs the same functions as the READ instruction and, in addition, decreases the address count in the MEMORY ADDRESS COUNTER 7001 by a count of one.

SYM PUSHP Instruction (OPCODE=351)

The PUSHP instruction performs the same functions as the WRITE instruction and, in addition, increments the MEMORY ADDRESS COUNTER 7001 by enabling the PCTR-UP signal from the MICRO-CODE GENERATOR 6804.

SYM Advance Instruction (OPCODE=352)

The ADVANCE instruction is used to read out the next logical word in the DATA MEMORY 6901. The instruction performs the same functions as the READ instruction and, in addition, increments the MEMORY ADDRESS REGISTER 7001 by a count of one.

SYM REPROW Instruction (OPCODE=353)

The repeat row or REPROW instruction is used to load the row portion of the MEMORY ADDRESS COUNTER 7001 from the current row value output of the ADDRESS STACK MEMORY 7005. The instruction performs the same micro-functions as the LDROW instruction except that the data originates in the ADDRESS STACK MEMORY 7005 instead of the DATA REGISTER 6806.

SYM REPCOL Instruction (OPCODE=354)

The REPCOL instruction is similar to the REPROW instruction escept that the column portion of the MEMORY ADDRESS COUNTER 7001 is loaded from the column portion of the ADDRESS STACK MEMORY 7005.

SYM RDROW Instruction (OPCODE=355)

The read row (RDROW) instruction is used to load the DATA REGISTER 6806 with the current MEMORY ADDRESS COUNTER 7001 row part. After completion of the instruction, this data may be read by any processor connected to the SYM which may need this information.

SYM RDCOL Instruction (OPCODE=356)

This instruction is similar to the RDROW instruction with the exception that the column part of the MEMORY ADDRESS COUNTER 7001 is loaded into the DATA REGISTER 6896.

SYM STROW Instruction (OPCODE=357)

The store row (STROW) instruction is used to store the current row value from the MEMORY ADDRESS COUNTER 7001 into the row part of the ADDRESS STACK MEMORY 7005 at the location defined by the STACK POINTER COUNTER 7004.

SYM STCOL Instruction (OPCODE=360)

The STCOL instruction stores the current column value from the MEMORY ADDRESS COUNTER 7001 into the column part of the ADDRESS STACK MEMORY 7005 in a manner similar to the STROW instruction.

SYM PUSHS Instruction (OPCODE=361)

The PUSHS instruction increments the STACK POINTER COUNTER 7004 allowing the use of different locations in the ADDRESS STACK MEMORY.

SYM POPS Instruction (OPCODE=362)

Decrements the STACK POINTER COUNTER 7004 allowing accessing to stack address loaded by previous instructions.

SYM RDMSROW Instruction (OPCODE=363)

The read address stack memory row (RDMSROW) instruction is used to load the DATA REGISTER 6806 with the current row value from the ADDRESS STACK MEMORY 7005.

SYM RDMSCOL Instruction (OPCODE=364)

Performs the same function as the RDMSROW instruction except on the column part of the ADDRESS STACK MEMORY 7005.

SYM SETSCTR Instruction (OPCODE=365)

The set stack pointer counter (SETSCTR) instruction loads the STACK POINTER COUNTER 7004 from the current contents of the DATA REGISTER 6806. This allows selection of any of the locations in the ADDRESS STACK MEMORY 7005.

DSPL INSTRUCTIONS

The DSPL control processor self-instruction set is similar to that of the SEM control processor. This instruction set is illustrated in APPENDIX II. Additionally, the destination ROM of the DSPL control processor is similar to the distination ROM of the SEM control processor, illustrated in APPENDIX KK.

Exemplary DSPL Design

Figure 14:
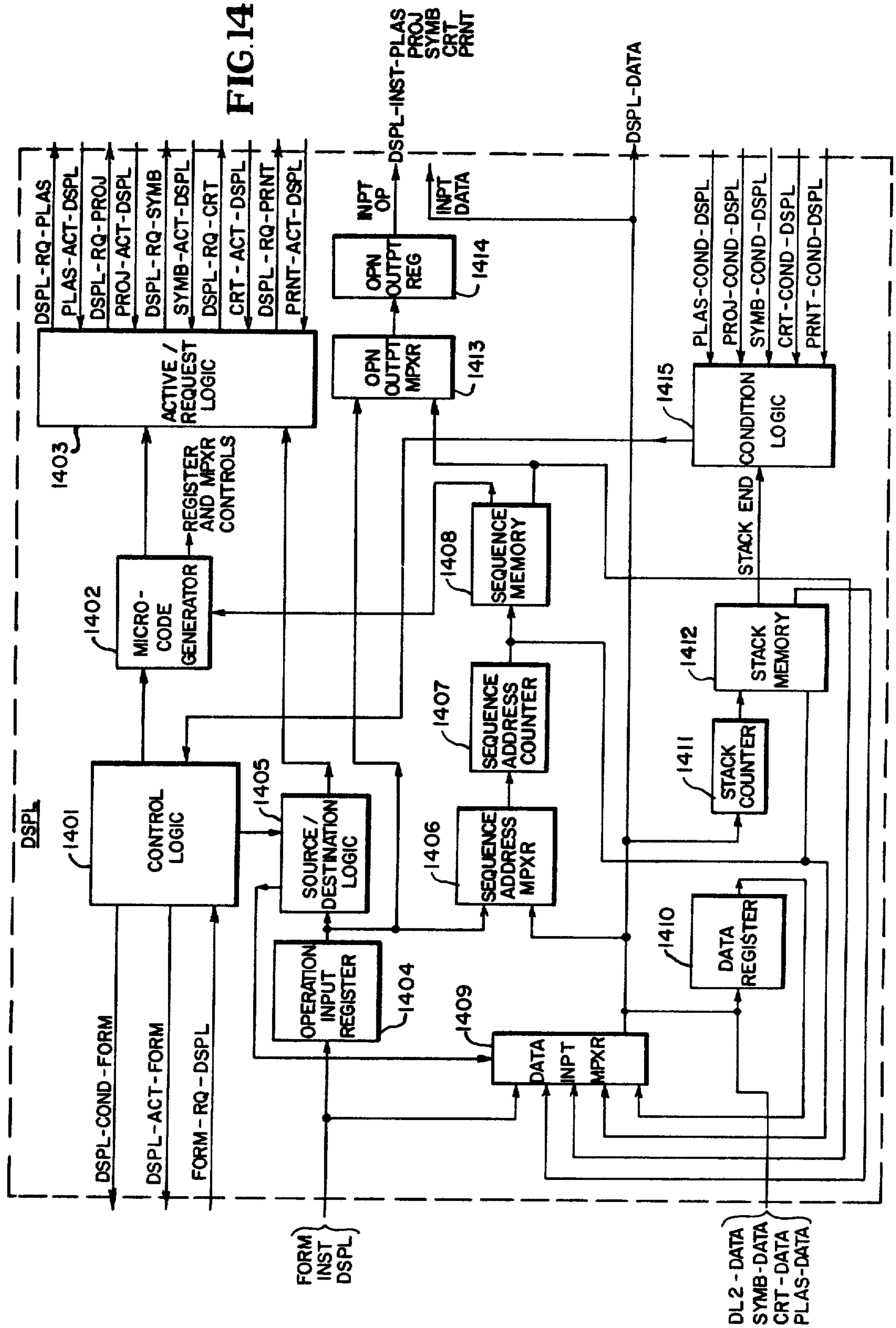
FIG. 14 is a block diagram of the DSPL control processor of FIGS. 4A and 4B, and the purpose of DSPL being to control the DIU, PROJ, PRNT and SYM processors.

The display processor DSPL illustrated in FIG. 14 controls SYM, DIU, PROJ and PRNT by issuing code execution level instructions to these processors to carry out code execution, code sequence and program interpretation commands received from FORM. DSPL also acts as a data path between the processors it controls and the FORM and DL processors.

Description of DSPL Circuits

Commands from FORM are in the form of instructions, each having an operation code portion and a data portion. As illustrated in FIG. 14, these portions are latched into an OPERATION INPUT REGISTER 1404 and a DATA REGISTER 1410. The data portion must pass through a DATA INPUT MULTIPLEXER 1409 which is controlled by SOURCE/DESTINATION LOGIC 1405 to selectively pass data from FORM, DL, SYM, DIU and elements internal to DSPL. The instructions to FORM are of two general types—set state and execute state. A set state instruction initializes a SEQUENCE ADDRESS COUNTER 1407 with the starting address in a SEQUENCE MEMORY 1408 of a grammar defining strings of data to be subsequently transmitted to DSPL. An execute state instruction causes DSPL to interpret the subsequently transmitted strings of data by utilizing this grammar. The strings of data may be transmitted by either FORM or DL. The DSPL also has the capability of setting the SEQUENCE COUNTER 1407 to the starting address of a different grammar stored within the SEQUENCE MEMORY 1408 if interpretation of data establishes a need for use of one of the other grammars.

All data and instructions received by and transmitted from DSPL are passed through MULTIPLEXERS 1406, 1409, 1413 and REGISTERS 1404, 1410, 1414, under the control of a MICRO-CODE GENERATOR 1402 which in turn is controlled by clock pulses from the CONTROL LOGIC 1401 and information from the SEQUENCE MEMORY 1408 defining a sequence of operations to be performed. Data defining a starting address in the SEQUFNCE MEMORY 1408 can be obtained either from the data transmitted to DSPL or from a location in a STACK MEMORY 1412 at an address specified by the transmitted data. The STACK MEMORY 1412 includes auxiliary addresses and operates with a STACK COUNTER 1411 in a manner similar to operation of the symbols stack and its associated stack counter so that tree-structured addressing of the SEQUENCE MEMORY 1408 is possible.

CONDITION LOGIC 1415 is provided to monitor condition signals transmitted by DIU, PROJ, SYM, and PRNT. This logic also monitors a STACK-END signal from the STACK MEMORY 1412 indicating that the full memory capacity has been utilized.

ACTIVE/REQUEST LOGIC 1403 is provided to transmit request signals to the processors commanded by the DSPL and to monitor active signals from these processors indicating that instructions have been accepted.

Typical operations of the DSPL after interpreting data by use of the grammar specified by the current set state include transmission of an instruction to DIU directing that a particular symbol or character be displayed directing DIU to display a cursor mark. The SYM is referenced by DSPL whenever symbol definitions must be transmitted to DIU. Transmission of codes and addresses to PRNT and PROJ is accomplished by simply passing code and address information received from DL along with an appropriate instruction as described in the descriptions of PRNT and PROJ.

DSPL Controller Concepts

The DSPL control processor is designed to directly process a set of grammars. These grammars describe the sequence of instructions received by the DSPL control processor in order to produce the desired display. These grammars are similar to the META grammar described previously.

Example DSPL Grammar Design

An exemplary contrast between two of the several grammars implemented in the DSPL control processor is illustrated below. The initial state is set by instructions from the FORM.

Interpreted Display (State "0")

```
<INT>      → <CNTRL CHAR> * <CNTRL OP> <INT>
           → <DATA 7 SET> * <SYMB> <INT>
           → ε * (DISPLAY CHAR) <INT>
<CNTRL OP> → . CR . (PERFORM CARRIAGE RETURN)
           → . SUB . <DOT WR> <CNTRL OP>
           → . DC3 . <SYMB>
<DOT WR>   → <CNTRL CHAR> *
           → ε * (WRITE DOT IN DIRECTION ε) <DOT WR>
<SYMB>     → ε * (DISPLAY SYMB ε)
```

Direct Display (State "2")

```
<DIR> → <DATA 7 SET> *   (SET COMPL MODE, DISPLAY CHAR,
                          MODE) <DIR>
      → ε * (DISPLAY CHAR) <DIR>
```

The complete listing of ROM sequences for the DSPL is given in APPENDIX NN.

While the invention has been described with respect to one embodiment thereof, it will be understood by those skilled in the art that changes in form and detail may be made from the described invention without departing from the spirit and scope of the invention.

INDEX TO APPENDIXES

A. Devices Used To Implement Exemplary External Processors
B. ASCII Character Set
C. SPOML Language Definition
D. GETS Instruction Set Definition
E. OIU Acknowledge Generator ROM 5303
F. OIU Fixed Op-Code ROM 5308
G. OIU Active Request Selector ROM 5401
H. OIU Input Enable ROM 5501
I. INPT ROM Table 1605
J. Devices Used To Implement Exemplary OIU
K. Devices Used To Implement Exemplary INPT
L. META Self Instruction Set
M. META Interpreter Communication Grammar
N. Communication Grammar States and Actions
O. SPOML METAPROCESSOR Grammar
P. SPOML Grammar States and Actions
Q. Self Instruction Sequence Coding for An Exemplary METAPROCESSOR
R. META Multiplexer Select ROM 4301
S. META Multiplexer Select ROM 4501
T. META Source Code ROM 4504
U. META Destination ROM 4401
V. META Micro-Code Generator ROM 4701
W. META Micro-Code Generator ROM 4702
X. META Micro-Code Generator ROM 4703
Y. META Micro-Code Generator ROM 4704
Z. META Micro-Code Generator ROM 4705
AA. META Classifier ROM 4802
BB. Devices Used To Implement An Exemplary METAPROCESSOR
CC. STG Instruction Set Definition
DD. STG Micro-Code Generator ROM 3401
EE. STG Micro-Code Generator ROM 3402
FF. STG Micro-Code Generator ROM 3403
GG. STG Micro-Code Generator ROM 3404
HH. Devices Used To Implement An Exemplary STG
II. SEM Processor Self Instruction Set
JJ. SEM Self Code ROM
KK. SEM Destination ROM
LL. SEM Self Sequence ROM
MM. FORM Self Sequence ROM
NN. DSPL Self Sequence ROM
OO. SYM Micro-Code Generator ROM 6802
PP. SYM Micro-Code Generator ROM 6804
QQ. Devices Used to Implement An Exemplary SYM
RR. DIU Micro-Code Generator ROM 5817
SS. DIU Cursor ROM 6304
TT. Devices Used to Implement An Exemplary DIU
UU. CRT Color Generator ROM
VV. References and Patent References

APPENDIX A. DEVICES USED TO IMPLEMENT EXEMPLARY EXTERNAL PROCESSORS

| Component | Vendor | Vendor Ident. |
|---|---|---|
| Keyboard | Microswitch | 61SW12-2 |
| Plasma Display | Owens-Illinois | D-141-50 |
| Plasma Power Supply | Owens-Illinois | S159 |
| Sonic Pen | SAC | 271A3534P3 |
| Sensor Unit | SAC | 271A3534P1 |
| Pen Electronics | SAC | 271A3534P2 |
| System Power Supply | PSI | 1044D11095 |
| Disc Drive | CalComp | 140-031 |
| Projector | Mast | 137-S SPECIAL (688-42GE) |

APPENDIX B. ASCII CHARACTER SET

| | | | | | | | | | | | | | | | | |
|---|---|---|---|---|---|---|---|---|---|---|---|---|---|---|---|---|
| 000 | 000 | .nul. | %NUL | 032 | 040 | b̸ | b̸ | 064 | 100 | @ | @ | 096 | 140 | ` | %QT | |
| 001 | 001 | .soh. | %SOH | 033 | 041 | ! | ! | 065 | 101 | A | A | 097 | 141 | a | A | (See Note 1) |
| 002 | 002 | .stx. | %STX | 034 | 042 | " | " | 066 | 102 | B | B | 098 | 142 | b | B | " |
| 003 | 003 | .etx. | %ETX | 033 | 043 | # | # | 067 | 103 | C | C | 099 | 143 | c | C | " |
| 004 | 004 | .eot. | %EOT | 036 | 044 | $ | $ | 068 | 104 | D | D | 100 | 144 | d | D | " |
| 005 | 005 | .enq. | %ENQ | 037 | 045 | % | % | 069 | 105 | E | E | 101 | 145 | e | E | " |
| 006 | 006 | .ack. | %ACK | 038 | 046 | & | & | 070 | 106 | F | F | 102 | 146 | f | F | " |
| 007 | 007 | .bel. | %BEL | 039 | 047 | ' | ' | 071 | 107 | G | G | 103 | 147 | g | G | " |
| 008 | 010 | .bs. | %BS | 040 | 050 | ( | ( | 072 | 110 | H | H | 104 | 150 | h | H | " |
| 009 | 011 | .ht. | %HT | 041 | 051 | ) | ) | 073 | 111 | I | I | 105 | 151 | i | I | " |
| 010 | 012 | .lf. | %LF | 042 | 052 | * | * | 074 | 112 | J | J | 106 | 152 | j | J | " |
| 011 | 013 | .vt. | %VT | 043 | 053 | + | + | 075 | 113 | K | K | 107 | 153 | k | K | " |
| 012 | 014 | .ff. | %FF | 044 | 054 | , | , | 076 | 114 | L | L | 108 | 154 | l | L | " |
| 013 | 015 | .cr. | %CR | 045 | 055 | - | - | 077 | 115 | M | M | 109 | 155 | m | M | " |
| 014 | 016 | .so. | %SO | 046 | 056 | . | . | 078 | 116 | N | N | 110 | 156 | n | N | " |
| 015 | 017 | .si. | %SI | 047 | 057 | / | / | 079 | 117 | O | O | 111 | 157 | o | O | " |
| 016 | 020 | .dle. | %DLE | 048 | 060 | 0 | 0 | 080 | 120 | P | P | 112 | 160 | p | P | " |
| 017 | 021 | .dc1. | %DC1 | 049 | 061 | 1 | 1 | 081 | 121 | Q | Q | 113 | 161 | q | Q | " |
| 018 | 022 | .dc2. | %DC2 | 050 | 062 | 2 | 2 | 082 | 122 | R | R | 114 | 162 | r | R | " |
| 019 | 023 | .dc3. | %DC3 | 051 | 063 | 3 | 3 | 083 | 123 | S | S | 115 | 163 | s | S | " |
| 020 | 024 | .dc4. | %DC4 | 052 | 064 | 4 | 4 | 084 | 124 | T | T | 116 | 164 | t | T | " |
| 021 | 025 | .nak. | %NAK | 053 | 065 | 5 | 5 | 085 | 125 | U | U | 117 | 165 | u | U | " |
| 022 | 026 | .syn. | %SYN | 054 | 066 | 6 | 6 | 086 | 126 | V | V | 118 | 166 | v | V | " |
| 023 | 027 | .etb. | %ETB | 055 | 067 | 7 | 7 | 087 | 127 | W | W | 119 | 167 | w | W | " |
| 024 | 030 | .can. | %CAN | 056 | 070 | 8 | 8 | 088 | 130 | X | X | 120 | 170 | x | X | " |
| 025 | 031 | .em. | %EM | 057 | 071 | 9 | 9 | 089 | 131 | Y | Y | 121 | 171 | y | Y | " |
| 026 | 032 | .sub. | %SUB | 058 | 072 | : | : | 090 | 132 | Z | Z | 122 | 172 | z | Z | " |
| 027 | 033 | .esc. | %ESC | 059 | 073 | ; | ; | 091 | 133 | [ | %OBK | 123 | 173 | { | %SPR | |
| 028 | 034 | .fs. | %FS | 060 | 074 | < | < | 092 | 134 | \ | %FM | 124 | 174 | \| | %ALT | |
| 029 | 035 | .gs. | %GS | 061 | 075 | = | = | 093 | 135 | ] | %CBK | 125 | 175 | } | %EPR | |
| 030 | 036 | .rs. | %RS | 062 | 076 | > | > | 094 | 136 | ^ | %HAT | 126 | 176 | ~ | %TLD | |
| 031 | 037 | .us. | %US | 063 | 077 | ? | ? | 095 | 137 | _ | %USC | 127 | 177 | .del. | %DEL | |

Column 1. Decimal Code
" 2. Octal Code
" 3. GETS Code
" 4. Meta Assembler Code

Note 1: For lower case letters, precede by LOW command; for upper case precede by CAP command.

Note 2: For characters 128-255, succeed character code with the prime character. For example $128_{10} = 200_8$ = .nul'. = %NUL'.

APPENDIX C. SPOML LANGUAGE DEFINITION

CLAUSE TYPES

| CLAUSE NAME | BEGIN CHAR. | PHRASES | FLAG SET | EXAMPLE | PURPOSE |
|---|---|---|---|---|---|
| | b̸ | N | N | b̸ | no operation, clause/phrase delimiter |
| | , | N | N | , | no operation, clause/phrase delimiter |
| stack | ! | Y | Y | !>"ABC" | manipulate top of computing stacks |
| | " | 1 | N | "PAGE 1" | immediate display string |
| let | # | Y | Y | #A+B=C | initiate numeric computation sequence |
| | $ | Y | N | $h<< | non-decimal numeric readout |
| restore | % | 1 | N | %< | clear or duplicate stack data |
| add | + | Y | Y | +1=D | add number to current numeric result value |
| subtract | - | Y | Y | -C=D | subtract number from numeric result |
| wait | . | N | N | . | halt execution until operator entry |
| drop | : | N | N | : | drop current sentence |
| push | ; | N | N | ; | begin new sentence point |
| assign | = | Y | Y | =C | store or readout numeric result |
| test | ? | N | N | ? | continue sentence if CONT=1 (see NOTE) |
| append | a | 1 | Y | append 4B,A | add appendix to program |
| bootstrap | b | 1 | Y | bOLA | load and run a new program |
| call | c | 1 | N | cA | execute appendix (subprogram) |
| display | d | Y | N | d3 "FIRST" | output data to external display device |
| exit | e | N | N | exit | continue execution at end of current sentence |
| rerun | f | 1 | N | f1 | accept new operator input |
| if | i | 1 | Y | i+ | set flag on machine conditions |
| keyboard | k | N | N | K | display cursor and wait for operator input |
| load | l | 1 | N | l | read data and push into match stack |
| micro | m | 1 | N | m "+1" | execute milli-instructions |
| name | n | 1 | Y | n4 PROG | lookup address given file name |
| octal | o | N | N | o | convert octal string to number |
| repeat | r | N | N | repeat | continue execution at begin of sentence, NOT←0 |
| sensitize | s | 1 | N | sA10, 02 | define name and size of hit area |
| use | u | 1 | Y | use "c" ABC | load cells, stack, etc. from disk file |
| WFB | w | 1 | N | w "123" | manipulate working file buffer |
| do | [ | N | N | [ | begin a new sentence, NOT←0 |

CLAUSE TYPES (continued)

| CLAUSE NAME | BEGIN CHAR. | PHRASES | FLAG SET | EXAMPLE | PURPOSE |
|---|---|---|---|---|---|
| end | ] | N | N | ] | end of current sentence |
| move | ^ | Y | Y | ^ "A" < | move data from stack to stack |
| clear | _ | Y | N | _ < | clear match, right, etc. stacks |
| define | { | Y | N | {A ∿} | begin appendix definition |
| return | } | N | N | } | end appendix definition or return |
| alternate | \| | 1 | Y | \|'A | test for data comparison |
| not | ∿ | N | N | ∿ | continue on false enable, i.e. NOT← 1 |

NOTE: CONT = $\overline{\text{FAIL}}$ ⊕ NOT

PHRASE TYPES

Stack Phrases

| | |
|---|---|
| * | pop character from match stack, set FAIL if empty |
| < | pop character from left stack, set FAIL if empty |
| > | pop character from right/label, set FAIL if empty |
| "∿" | load match stack |
| α > | delete head of right stack, set FAIL if no compare |
| α < | delete head of left stack, set FAIL if no compare |
| > α | push data onto right stack, set FAIL if full |
| < α | push data onto left stack, set FAIL if full where α is the match stack contents (*) or data "∿" |

Let Phrases (left side of = operator)

| | |
|---|---|
| t | set accumulator to current real time in seconds |
| <capital> | reference to numeric variable |
| <digit> | load decimal number and use as parameter |
| > | take decimal number from right stack |
| $o <digits> or $o> | binary number entry |
| $m <digits> or $m> | octal number entry |
| $h <letter>...ƀ or $h>...ƀ | byte data entry |
| + | perform addition operation |
| - | perform subtraction operation |
| * | perform multiplication operation |
| / | perform division operation |
| \ | perform remainder operation |
| @ <letter> | reference to system variable |
| @ < | indirect variable reference |
| = | set FAIL if current result is negative |

Let Phrases (right side of = operator)

| | |
|---|---|
| < | put decimal representation of result in left stack |
| <capital> | store result in variable |
| $o>...<... | put binary representation of result in left stack; skip characters in ">" position |
| $m>...<... | put octal representation of result in left stack |
| $h>...<... | put character representation of result in left stack |

PHRASE TYPES (continued)

<u>Restore Phrases</u>

| | |
|---|---|
| < | restore left stack contents |
| > | restore right stack contents |

<u>File Part Forms</u> <file>

| | |
|---|---|
| "~" | absolute file block address |
| <capital><ANC>... | file name ≡ <name> |
| <digit> | group address |
| * | use match stack name or absolute address |
| n | perform file name lookup for absolute address |
| <digit>* | use file at group <digit> and block address in match |
| @ | indirect file lookup (multi-level file name) |
| | NOTE: for file references FAIL is set if name lookup is not successful or file cannot be read. |

<u>Append Phrase</u>

| | |
|---|---|
| <file>, <letter> | load new appendix from file over all appendix named <letter> |

<u>Bootstrap Phrase</u>

| | |
|---|---|
| <file> | load and execute new program from <file> |

<u>Call Phrase</u>

| | |
|---|---|
| <letter> | execute appendix which has name <letter> |

<u>Display Phrases</u>

| | |
|---|---|
| 0 | plasma/CRT display data interpretation mode |
| 2 | display without interpretation |
| 3 | print or output to RS232C device |
| 4 | define new symbol |
| 5 | redefine symbol |
| 6 | projector control sequence |
| <... | display left stack data |
| >... | display right stack data |
| * | display match stack data |
| "<DATA>..." | execute display mode with <DATA> |
| '<file> | display <file> |

<u>Rerun Phrase</u>

| | |
|---|---|
| <ANC> | if no new input, then data is <ANC> |

PHRASE TYPES (continued)

WFB Phrase

| | |
|---|---|
| .del. | delete WFB character at current pointer |
| * | write top match into WFB |
| I | insert top match into WFB |
| + | save current WFB pointer |
| - | restore WFB pointer |
| "<DATA>∿ " | write DATA ... into WFB |
| .A'. | clear WFB pointer |
| .B'. | clear WFB pointer and stack |
| .J'. | advance WFB pointer |
| .H'. | backup WFB pointer |
| .Q'. | increment stack pointer |
| .R'. | decrement stack pointer |

Move Phrases

| | |
|---|---|
| < | move one character from right to left, FAIL if empty |
| > | move one character from left to right, FAIL if empty |
| α < | move left until , FAIL if α not found |
| α > | move right until , FAIL if α not found |

Clear Phrases

| | |
|---|---|
| < | clear left stack |
| > | clear right stack |
| * | clear match stack |

Appendix Definition

| | |
|---|---|
| {<letter> ∿} | <letter> is the call name for the appendix |

Alternate Phrase

| | |
|---|---|
| "<ANC>..." | set FAIL if top match ≠ any of the <ANC>'s |
| 'A | set FAIL if top match not a capital letter |
| 'a | set FAIL if top match not a small case letter |
| '1 | set FAIL if top match not a digit |
| <ANC> | set FAIL if top match ≠ <ANC> |

Micro (or Milli) Phrases

| | |
|---|---|
| "<instruction>..." | execute milli-instructions<br>NOTE: <instruction> ≡ <OP CODE><DATA> or <instruction> ≡ <OP CODE> *, data taken from match stack |
| "+ <state>" | where state is a metaprocessor state |

Name Phrase

| | |
|---|---|
| <name> | leaves address associated with <name> in match; FAIL if none |

PHRASE TYPES (continued)

Sensitize Phrase

| | |
|---|---|
| .nul..nul. | clears all sensitized point name |
| <letter>.nul. | clear names starting at <letter> |
| <letter><digit>..., <digit>... | sensitize <letter> for size <digit>...by <digit>... |

Use Phrase

| | |
|---|---|
| use, cells "<begin>" <file> | load alphabet from <file> start at <begin> |
| use, >, | use right stack |
| use, > <file> | load right stack from <file> |
| use, label | use label stack |
| use, label <file> | load label stack from <file> |
| use "!" <file> | load PMEM from <file> |
| use "=" <file> | load META sequences from <file> |
| use "C" <file> | load special CPU sequence from <file> |
| use "T" <file> | display <file> with interpretation |
| use "c" <file> | load alphabet from <file> at current point |
| use "s" <file> | define sensitize points from <file> |
| use ".a'." <file> | load WFB from <file> |
| use ".}'." <file> | load MSB from <file> |

If Phrases

| | |
|---|---|
| < | if left stack is full or empty then set FAIL |
| > | if right stack is full or empty then set FAIL |
| * | if match stack is full or empty then set FAIL |
| 5 | if MSB counter is zero then set FAIL |
| W | if WFB memory is full then set FAIL |
| + | if result not-positive then set FAIL |
| - | if result not-negative then set FAIL |
| = | if result not-zero then set FAIL |
| F | if disk alarm then set FAIL |

Load Phrases

| | |
|---|---|
| d.dcl. | load cursor row into match stack |
| d.dc2. | push cursor column into match stack |
| d.dc3. | push fine row into match stack |
| d.dc4. | push fine column into match stack |
| sK | push x-size of hit area into match stack |
| sM | push Y-size of hit area into match stack |
| sO | push x pen coordinate into match stack |
| sQ | push Y pen coordinate into match stack |
| sS | push hit point name into match stack |
| < | push top of left stack into match stack |
| > | push top of right stack into match stack |
| 0 | push MSB output into match stack |
| 2 | push MSC output into match stack |
| 3 | push FORM output into match stack |
| 4 | push WFB output into match stack |
| 5 | push DCU output into match stack |
| 6 | push RS232C output into match stack |
| 7 | push tape output into match stack |

APPENDIX D. GETS INSTRUCTION SET DEFINITION

DISPLAY INTERFACE UNIT

| | | | |
|---|---|---|---|
| 000 | 000 | NUL | DIU NŌP |
| 001 | 001 | SOH | CURSOR HŌME |
| 002 | 002 | STX | WRITE CHARACTER |
| 003 | 003 | ETX | DEFINE CELL ADDRESS |
| 004 | 004 | EOT | LOAD CELL ROW |
| 005 | 005 | ENQ | SET COARSE COLUMN |
| 006 | 006 | ACK | DISABLE ERASE |
| 007 | 007 | BEL | SET COARSE ROW |
| 008 | 010 | BS | CURSOR LEFT (CHAR) |
| 009 | 011 | TAB | TAB |
| 010 | 012 | LF | CURSOR DOWN HALF CHAR |
| 011 | 013 | VT | CURSOR UP HALF CHAR |
| 012 | 014 | FF | ERASE SCREEN |
| 013 | 015 | CR | CARRIAGE RETURN |
| 014 | 016 | SO | SET FINE COLUMN |
| 015 | 017 | SI | SET FINE ROW |
| 016 | 020 | DLE | RESET DIU |
| 017 | 021 | DC1 | READ COARSE ROW |
| 018 | 022 | DC2 | READ COARSE COL |
| 019 | 023 | DC3 | READ FINE ROW |
| 020 | 024 | DC4 | READ FINE COL |
| 021 | 025 | NAK | LOAD CRT OPTION |
| 022 | 026 | SYN | MOVE DOT |
| 023 | 027 | ETB | ENABLE ERASE |
| 024 | 030 | CAN | RESET OPTIONS |
| 025 | 031 | EM | LOAD CURSOR MODE |
| 026 | 032 | SUB | DOT WRITE |
| 027 | 033 | ESC | WRITE (NO MOVE) |
| 028 | 034 | FS | CURSOR RIGHT |
| 029 | 035 | GS | ENABLE REPLACE |
| 030 | 036 | RS | ENABLE COMPLEMENT |
| 031 | 037 | US | SELECT EXTENDED |

MASS STORAGE CONTROLLER

| | | | |
|---|---|---|---|
| 032 | 040 | ƀ | MSC NOP |
| 033 | 041 | ! | SELECT DRIVE A |
| 034 | 042 | " | SELECT DRIVE B |
| 035 | 043 | # | INITIALIZE DRIVE |
| 036 | 044 | $ | SELECT WRITE MODE |
| 037 | 045 | % | SELECT G |
| 038 | 046 | & | LØADARS |
| 039 | 047 | ' | INCREMENT ADDR. |

FORMAT CONTROLLER

| | | | |
|---|---|---|---|
| 040 | 050 | ( | FORM NOP |
| 041 | 051 | ) | FORM NOP |
| 042 | 052 | * | READ BLOCK |
| 043 | 053 | + | CLEAR FORM FLAG |
| 044 | 054 | , | LOAD NEXT LOGICAL |
| 045 | 055 | - | WRITE BLOCK, L. NEXT |
| 046 | 056 | . | WRITE BLOCK, L. IMMED. |
| 047 | 057 | / | FORM NOP |

DATA LINK UNIT

| | | | |
|---|---|---|---|
| 048 | 060 | 0 | LINKRAN |
| 049 | 061 | 1 | LINKNUM |
| 050 | 062 | 2 | LINKMSC |
| 051 | 063 | 3 | LINKFORM |
| 052 | 064 | 4 | LINKWFB |
| 053 | 065 | 5 | LINKDCU |
| 054 | 066 | 6 | LINK232 |
| 055 | 067 | 7 | LINKTCU |
| 056 | 070 | 8 | DLUNOP |
| 057 | 071 | 9 | LINK ALPHA |
| 058 | 072 | : | LDSCTR |
| 059 | 073 | ; | UPSTCR |
| 060 | 074 | < | DNSCTR |
| 061 | 075 | = | WRITE RAM COUNT |
| 062 | 076 | > | LŌAD ALPHA |
| 063 | 077 | ? | LŌAD NUMBER |

CENTRAL PROCESSING UNIT

| | | | |
|---|---|---|---|
| 064 | 100 | @ | CPUNOP |
| 065 | 101 | A | CPUSET |
| 066 | 102 | B | BOOTSTRAP |
| 067 | 103 | C | CPUEXC |
| 068 | 104 | D | RERUN |
| 069 | 105 | E | ENABLE |
| 070 | 106 | F | SETØP |
| 071 | 107 | G | KBDIN |
| 072 | 110 | H | TIMESUB |
| 073 | 111 | I | SETTIME |
| 074 | 112 | J | |
| 075 | 113 | K | READ AREA X |
| 076 | 114 | L | |
| 077 | 115 | M | READ AREA Y |
| 078 | 116 | N | |
| 079 | 117 | O | READ PEN X |
| 080 | 120 | P | PROCESS PEN HIT |
| 081 | 121 | Q | READ PEN Y |
| 082 | 122 | R | REPEAT |
| 083 | 123 | S | READ HIT NAME |
| 084 | 124 | T | RAM SPECIAL OP |
| 085 | 125 | U | |
| 086 | 126 | V | |
| 087 | 127 | W | |
| 088 | 130 | X | |
| 089 | 131 | Y | |
| 090 | 132 | Z | |
| 091 | 133 | [ | |
| 092 | 134 | \ | |
| 093 | 135 | ] | |
| 094 | 136 | ∧ | |
| 095 | 137 | - | |

SPARE

| | | | |
|---|---|---|---|
| 096 | 140 | | |
| 097 | 141 | a | |
| 098 | 142 | b | |
| 099 | 143 | c | |
| 100 | 144 | d | |
| 101 | 145 | e | |
| 102 | 146 | f | |
| 103 | 147 | g | |

DISPLAY CONTROL UNIT

| | | | |
|---|---|---|---|
| 104 | 150 | h | DCU EXC |
| 105 | 151 | i | DCU SET |
| 106 | 152 | j | |
| 107 | 153 | k | |
| 108 | 154 | l | READ DIU |
| 109 | 155 | m | DCU SUB OP |
| 110 | 156 | n | LOAD SYM |
| 111 | 157 | o | |

RANDOM ACCESS PROJECTOR UNIT

| | | | |
|---|---|---|---|
| 112 | 160 | p | RAP NŌP |
| 113 | 161 | q | CLEAR RS 232 DATA |
| 114 | 162 | r | EXECUTE SLIDE COM. |
| 115 | 163 | s | TRANSMIT CHAR. |
| 116 | 164 | t | SELECT CRT/PRINT |
| 117 | 165 | u | RESET |
| 118 | 166 | v | |
| 119 | 167 | w | OUTPUT CRT/PRINT |

FORMAT CONTROLLER

| | | | |
|---|---|---|---|
| 120 | 170 | x | FØRMEXC |
| 121 | 171 | y | FORM NOP |
| 122 | 172 | z | SINK |
| 123 | 173 | { | FORM NŌP |
| 124 | 174 | \| | SOURCE |
| 125 | 175 | } | FORM NOP |
| 126 | 176 | ~ | LOWFB/CHECK |
| 127 | 177 | DEL | FØRMSUB |

NUMERICS EXECUTION UNIT

| | | | |
|---|---|---|---|
| 128 | 200 | NUL | NEUNØP |
| 129 | 201 | SOH | BCD |
| 130 | 202 | STX | CVB |
| 131 | 203 | ETX | CEQO |
| 132 | 204 | EOT | MODE |
| 133 | 205 | ENQ | INNEU |
| 134 | 206 | ACK | READN |
| 135 | 207 | BEL | CEQ |
| 136 | 210 | BS | CEI |
| 137 | 211 | HT | SETR |
| 138 | 212 | LF | SETQ |
| 139 | 213 | VT | LCR |
| 140 | 214 | FF | LQMC |
| 141 | 215 | CR | LQR |
| 142 | 216 | SO | LRC |
| 143 | 217 | SI | TOG |
| 144 | 220 | DLE | COPY |
| 145 | 221 | DC1 | LROT |
| 146 | 222 | DC2 | ADD |
| 147 | 223 | DC3 | SUB |
| 148 | 224 | DC4 | MUL |
| 149 | 225 | NAK | DIV |
| 150 | 226 | SYN | QAXØ |
| 151 | 227 | ETB | RAØ |
| 152 | 230 | CAN | OR |
| 153 | 231 | EM | NOTR |
| 154 | 232 | SUB | NOTQ |
| 155 | 233 | ESC | RDUP |
| 156 | 234 | FS | |
| 157 | 235 | GS | LRQ |
| 158 | 236 | RS | RZERO |
| 159 | 237 | US | RA15 |

STACK EXECUTION UNIT

| | | | |
|---|---|---|---|
| 160 | 240 | ƀ | SEUNØP |
| 161 | 241 | ! | CLEARM |
| 162 | 242 | " | SAVEM |
| 163 | 243 | # | RSTRM |
| 164 | 244 | $ | PUSHM |
| 165 | 245 | % | READM2 |
| 166 | 246 | & | PØPM |
| 167 | 247 | ' | LENM |
| 168 | 250 | ( | SEUMR |
| 169 | 251 | ) | CLEARL |
| 170 | 252 | * | SAVEL |
| 171 | 253 | + | RSTRL |
| 172 | 254 | , | PUSHL |
| 173 | 255 | - | READL2 |
| 174 | 256 | . | POPL |
| 175 | 257 | / | LENL |
| 176 | 260 | 0 | SEULD |
| 177 | 261 | 1 | CLEARR |
| 178 | 262 | 2 | SAVER |
| 179 | 263 | 3 | RSTRR |
| 180 | 264 | 4 | PUSHR |
| 181 | 265 | 5 | READR2 |
| 182 | 266 | 6 | POPR |
| 183 | 267 | 7 | LENR |
| 184 | 270 | 8 | FIFO |
| 185 | 271 | 9 | LIFO |
| 186 | 272 | : | COMPM |
| 187 | 273 | ; | USER |
| 188 | 274 | < | USEL |
| 189 | 275 | = | ANY |
| 190 | 276 | > | PUSHLI |
| 191 | 277 | ? | PUSHRI |

SEMANTICS EXECUTION UNIT

| | | | |
|---|---|---|---|
| 192 | 300 | @ | SEMNOP |
| 193 | 301 | A | TIMESEQ |
| 194 | 302 | B | SEMMUL |
| 195 | 303 | C | SEMDIV |
| 196 | 304 | D | COMP RES |
| 197 | 305 | E | LT-TEST |
| 198 | 306 | F | EQ-TEST |
| 199 | 307 | G | READNEU |
| 200 | 310 | H | MOVER |
| 201 | 311 | I | MOVEL |
| 202 | 312 | J | NTOR |
| 203 | 313 | K | COMPR |
| 204 | 314 | L | COMPL |
| 205 | 315 | M | ONETØR |
| 206 | 316 | N | ONETØL |
| 207 | 317 | O | |
| 208 | 320 | P | |
| 209 | 321 | Q | |
| 210 | 322 | R | |
| 211 | 323 | ST | NEUTØL |
| 212 | 324 | T | COMP1 |
| 213 | 325 | U | READN |
| 214 | 326 | V | READR |
| 215 | 327 | W | READL |

FORMAT CONTROL UNIT

| | | | |
|---|---|---|---|
| 216 | 330 | X | FORM NOP |
| 217 | 331 | Y | WFBS |
| 218 | 332 | Z | WFBR |
| 219 | 333 | [ | WFBIRS |
| 220 | 334 | \ | WFBD |
| 221 | 335 | ] | FORM NOP |
| 222 | 336 | ^ | FORM NOP |
| 223 | 337 | _ | SET FORM FLAG |

PROGRAM EXECUTION UNIT

| | | | |
|---|---|---|---|
| 224 | 340 | ' | PRGNØP |
| 225 | 341 | a | PRESET |
| 226 | 342 | b | RESET |
| 227 | 343 | c | LIRØW |
| 228 | 344 | d | LDCØL |
| 229 | 345 | e | LOADFM |
| 230 | 346 | f | WRITE |
| 231 | 347 | g | READ |
| 232 | 350 | h | PØPP/BACKMEM |
| 233 | 351 | i | PUSHP |
| 234 | 352 | j | ADVANCE |
| 235 | 353 | k | REPROW |
| 236 | 354 | l | REPCOL |
| 237 | 355 | m | RDRØW |
| 238 | 356 | n | RDCØL |
| 239 | 357 | o | STRØW |
| 240 | 360 | p | STCØL |
| 241 | 361 | q | PUSHS |
| 242 | 362 | r | PØPS |
| 243 | 363 | s | RDMSRØW |
| 244 | 364 | t | RDMSCØL |
| 245 | 365 | u | SETST |
| 246 | 366 | v | |
| 247 | 367 | w | |

META PROCESSOR

| | | | |
|---|---|---|---|
| 248 | 370 | x | RUN META |
| 249 | 371 | y | |
| 250 | 372 | z | LOAD META LOW |
| 251 | 373 | { | LOAD META HIGH |
| 252 | 374 | \| | |
| 253 | 375 | } | |
| 254 | 376 | ~ | |
| 255 | 377 | DEL | |

MICRO-PROCESSOR UNIT

| | | |
|---|---|---|
| 200 | NUL | MICROP P NOP |
| 201 | SOH | LOAD ADDR AR→OUT |
| 202 | STX | LOAD ADDR BR→OUT |
| 203 | ETX | LOAD ADDR BR→OUT, O→BR |
| 204 | EOT | LOAD ADDR BR→OUT→Q |
| 205 | ENQ | LOAD ADDR Q→BR→OUT |
| 206 | ACK | LOAD ADDR BR+1→OUT→Q |
| 207 | BEL | LOAD ADDR AR→Q→OUT |
| 210 | BS | AR→BR→OUT |
| 211 | TAB | DATA→BR→OUT |
| 212 | LF | O→BR→OUT |
| 213 | VT | Q→OUT |
| 214 | FF | DATA→Q→OUT |
| 215 | CR | Q→OUT, SHIFT Q L→BR→Q |
| 216 | SO | Q-1→Q→OUT |
| 217 | SI | Q+1→Q→OUT |
| 220 | DLE | O→Q→OUT |
| 221 | DC1 | "OR" B A→BR→OUT |
| 222 | DC2 | "XOR" B A→BR→OUT |
| 223 | DC3 | "AND" B D→BR→OUT |
| 224 | DC4 | Q→BR→OUT |
| 225 | NAK | |
| 226 | SYN | |
| 227 | ETB | |
| 230 | CAN | B-A→Q→OUT |
| 231 | EM | B-1→B→OUT |
| 232 | SUB | B+1→B→OUT |
| 233 | ESC | B+D→Q→OUT |
| 234 | FS | Q+D→Q→OUT |
| 235 | GS | B+D→B→OUT |
| 236 | RS | B-D→Q→OUT |
| 237 | US | |

FLOPPY DISK INTERFACE UNIT

| | | |
|---|---|---|
| 300 | @ | DISK NOP |
| 301 | A | SELECT DRIVE A |
| 302 | B | SELECT DRIVE B |
| 303 | C | MOVE HEAD IN ONE TRACK |
| 304 | D | MOVE HEAD OUT ONE TRACK |
| 305 | E | ENABLE ABOVE TRACK 43 |
| 306 | F | ENABLE BELOW TRACK 43 |
| 307 | G | WAIT ONE WORD TIME/WRITE ZERO |
| 310 | H | FIND INDEX |
| 311 | I | FIND SECTOR |
| 312 | J | LOWER HEAD |
| 313 | K | RAISE HEAD |
| 314 | L | WRITE WORD/WRITE ENABLE |
| 315 | M | STOP WRITE |
| 316 | N | SYNC AND READ SYNC WORD |
| 317 | O | READ WORD |

MASS STORAGE CONTROLLER

| | | |
|---|---|---|
| 240 | ¥ | ABSOLUTE MODE ENABLE |
| 241 | ! | ABSOLUTE MODE DISABLE |
| 242 | " | INITIATE WRITE |
| 243 | # | WRITE WORD |
| 244 | $ | LINK IMMEDIATE, STOP WRITE |
| 245 | % | LINK SAVE, STOP WRITE |
| 246 | & | INITIATE READ |
| 247 | ' | READ WORD |
| 250 | ( | STOP READ |
| 251 | ) | LOAD DATA IN STACK |
| 252 | * | MSC SUB OP |
| 253 | + | READ MICRO |
| 254 | , | RESET MSC FLAG |
| 255 | - | |
| 256 | . | |
| 257 | / | |

SYMBOL UNIT

| | | |
|---|---|---|
| 340 | ¥ | SYM NŌP |
| 341 | ! | RESET MAIN |
| 342 | " | RESET MAIN STACK |
| 343 | # | LOAD ROW COUNTER |
| 344 | $ | LOAD COL COUNTER |
| 345 | % | LOAD |
| 346 | & | WRITE MEMORY |
| 347 | ' | READ MEMORY |
| 350 | ( | DECREMENT P |
| 351 | ) | PUSH P |
| 352 | * | ADVANCE AND READ |
| 353 | + | REP-ROW COUNTER |
| 354 | ) | REP-COL COUNTER |
| 355 | - | READ ROW |
| 356 | . | READ COL |
| 357 | / | STORE ROW |
| 360 | 0 | STORE COL |
| 361 | 1 | COUNT UP STACK |
| 362 | 2 | COUNT DOWN STACK |
| 363 | 3 | READ MS ROW |
| 364 | 4 | READ MS COL |
| 365 | 5 | LOAD STACK COUNTER |
| 366 | 6 | |
| 367 | 7 | |

WORKING FILE BUFFER

| | | |
|---|---|---|
| 300 | @ | WFB NŌP |
| 301 | A | RESET MAIN |
| 302 | B | RESET MAIN STACK |
| 303 | C | LOAD ROW COUNTER |
| 304 | D | LOAD COL COUNTER |
| 305 | E | LOAD WFB |
| 306 | F | WRITE MEMORY |
| 307 | G | READ MEMORY |
| 310 | H | DECREMENT P |
| 311 | I | PUSH P |
| 312 | J | ADVANCE AND READ |
| 313 | K | REP ROW |
| 314 | L | REP COL |
| 315 | M | READ ROW |
| 316 | N | READ COL |
| 317 | O | STORE ROW |
| 320 | P | STORE COL |
| 321 | Q | COUNT UP STACK |
| 322 | R | COUNT DOWN STACK |
| 323 | S | READ MS ROW |
| 324 | T | READ MS COL |
| 325 | U | LOAD STACK COUNTER |
| 326 | V | |
| 327 | W | |

MAINTENANCE ADDRESSES

| | | | |
|---|---|---|---|
| 0435 | DLU:FORM:WFB-SCTR | 00XX | META:SPARE |
| 0436 | | 0100 | PMEM:DATA |
| 0437 | META-OP | 0101 | ROW |
| | | 0102 | COL |
| 0440 | DLU:WFB:DATA | 0103 | MEM |
| 0441 | ROW | 0104 | ST-ROW |
| 0442 | COL | 0105 | ST-COL |
| 0443 | MEM | 0106 | INPUT |
| 0444 | ST-ROW | 02XX | PMEM-SCTR |
| 0445 | ST-COL | 03X0 | SEM:DATA |
| 0446 | INPUT | 03X1 | PCTR |
| 0450 | DLU:DCU:DATA | 03X2 | STACK |
| 0451 | PCTR | 03X3 | SEQ |
| 0452 | STACK | 03X5 | NEU:DATA |
| 0453 | SEQ | 0306 | SEU:DATA |
| 0454 | DIU:DATA | 0316 | SEU:LENGTH |
| 0455 | SYM:DATA | 0326 | SEU:RAM |
| 0457 | FORM-OP | 03X7 | META-OP |
| 046X | DLU:RAP:RS-232-DATA | 040X | DLU:RAM/ROM |
| 047X | DLU:TCU:DATA | 041X | DLU:NUM/ASCII |
| 05XX | OIU:DATA | 0420 | DLU:MSC:DATA |
| 06XX | META:STACK | 0421 | PCTR |
| 07XX | CONV | 0422 | STACK |
| 10XX | LINK | 0423 | SEQ |
| | | 0424 | MICRO:DATA |
| 111X | OIU-OP | 0427 | DISK:DATA |
| 112X | SEQ | 0430 | DLU:FORM:DATA |
| 113X | PCTR | 0431 | PCTR |
| 12XX | STACK | 0432 | STACK |
| 13XX | DATA | 0433 | SEQ |

DISPLAY STATES (;)

| | |
|---|---|
| 0 | INTERPRETIVE DISPLAY |
| 1 | OUTPUT TO RS 232 |
| 2 | DIRECT DISPLAY |
| 3 | OUTPUT TO CHARACTER CRT/PRINTER |
| 4 | ADD SYMBOL |
| 5 | REDEFINE SYMBOL |
| 6 | OUTPUT TO PROJECTOR → SLIDE COMMANDS |
| 7 | |
| , | PATTERN |
| + | 10 BIT MODE |
| - | 6 BIT MODE |
| * | BRIGHTNESS |

SLIDE COMMANDS

| | |
|---|---|
| ( | SLIDE ON |
| ) | SLIDE OFF |
| * | INCREMENT PROJECTOR ADDRESS |
| + | PROJECTOR POWER ON |
| , | SPARE |
| - | PROJECTOR POWER OFF |
| . | MOVE-TO-NEXT SLIDE |
| / | RESET PROJECTOR ADDRESS TO ZERO |
| 0–9 | PROJECTOR ADDRESS NUMERICS — RECEIPT OF A NUMERIC CHARACTER LOADS THE PROJECTOR ADDRESS COUNTERS |

SOURCE STATES (!)

| | |
|---|---|
| E | META DATA |
| D' | DISK FILE |
| F' | DLU BUFFER (GIVE MSC NOP WITH DATA NUL) |
| J' | WFB |
| +' | READ RS 232 (SET AS STATE ONE) ALL FORM CODES MAY BE EXECUTED AS STATE ONE |

[illegible] (")

| | |
|---|---|
| ! | BOOT PMEM (RUN META) |
| = | BOOT META (RUN META) |
| C | CPU |
| T | TRANSLATE |
| c | DIU CELL |
| u | DCU |
| s | SENSITIZED POINT |
| s' | WFB |
| }' | DLU BUFFER |

APPENDIX E. OIU ACKNOWLEDGE GENERATOR ROM 5303

| OCTAL ADDRESS | | BINARY ADDRESS $A_4$ $A_0$ | $\overline{\text{ACK-INPT}}$ $B_7$ | ACTIVE-INPTW ($\overline{\text{ACK-INPT}}$) $B_6$ | $\overline{\text{ACK-KYBD}}$ $B_5$ | (ACTIVE-FORM) $\overline{\text{ACK-FORM}}$ $B_4$ | $\overline{\text{ACK-PEN}}$ $B_3$ | $\overline{\text{ACK-RPT}}$ $B_2$ | $\overline{\text{ACK-BOOT}}$ $B_1$ | $B_0$ |
|---|---|---|---|---|---|---|---|---|---|---|
| 0 | 0 | 00000 | | | | | | | | |
| 0 | 1 | 00001 | | | | | | | | |
| 0 | 2 | 00010 | | | | | | | | |
| 0 | 3 | 00011 | | | | | | | | |
| 0 | 4 | 00100 | | | | | | | | |
| 0 | 5 | 00101 | | | | | | | | |
| 0 | 6 | 00110 | | | | | | | | |
| 0 | 7 | 00111 | | | | | | | | |
| 1 | 0 | 01000 | | | | | | | | |
| 1 | 1 | 01001 | | | | | | | | |
| 1 | 2 | 01010 | | | | | | | | |
| 1 | 3 | 01011 | | | | | | | | |
| 1 | 4 | 01100 | | | | | | | | |
| 1 | 5 | 01101 | | | | | | | | |
| 1 | 6 | 01110 | | | | | | | | |
| 1 | 7 | 01111 | | | | | | | | |
| 2 | 0 | 10000 | | | | | | | | |
| 2 | 1 | 10001 | | | | | | | | |
| 2 | 2 | 10010 | | | | | | | | |
| 2 | 3 | 10011 | | | | | | | | |
| 2 | 4 | 10100 | | | | | | | | |
| 2 | 5 | 10101 | | | | | | | | |
| 2 | 6 | 10110 | | | | | | | | |
| 2 | 7 | 10111 | | | | | | | | |
| 3 | 0 | 11000 | | | | | | | | |
| 3 | 1 | 11001 | | | | | | | | |
| 3 | 2 | 11010 | | | | | | | | |
| 3 | 3 | 11011 | | | | | | | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX F. OIU FIXED OP-CODE ROM 5308

| | GENERATED OPCODE | | | | | | | | OCTAL ADDR. | | |
|---|---|---|---|---|---|---|---|---|---|---|---|
| | $O_7$ | $O_6$ | $O_5$ | $O_4$ | $O_3$ | $O_2$ | $O_1$ | $O_0$ | | | |
| PEN | 0 | 1 | 0 | 1 | 0 | 0 | 0 | 0 | 0 | 0 | 0 |
| REPEAT | 0 | 1 | 0 | 0 | 0 | 1 | 0 | 0 | 0 | 0 | 1 |
| BOOT | 0 | 1 | 0 | 0 | 0 | 0 | 1 | 0 | 0 | 0 | 2 |
| SPARE | | | | | | | | | 0 | 0 | 3 |
| | | | | | | | | | 0 | 0 | 4 |
| | | | | | | | | | 0 | 0 | 5 |
| | | | | | | | | | 0 | 0 | 6 |
| | | | | | | | | | 0 | 0 | 7 |
| | | | | | | | | | 0 | 1 | 0 |
| | | | | | | | | | 0 | 1 | 1 |
| | | | | | | | | | 0 | 1 | 2 |
| | | | | | | | | | 0 | 1 | 3 |
| | | | | | | | | | 0 | 1 | 4 |
| | | | | | | | | | 0 | 1 | 5 |
| | | | | | | | | | 0 | 1 | 6 |
| | | | | | | | | | 0 | 1 | 7 |
| | | | | | | | | | 0 | 2 | 0 |
| | | | | | | | | | 0 | 2 | 1 |
| | | | | | | | | | 0 | 2 | 2 |
| | | | | | | | | | 0 | 2 | 3 |
| | | | | | | | | | 0 | 2 | 4 |
| | | | | | | | | | 0 | 2 | 5 |
| | | | | | | | | | 0 | 2 | 6 |
| | | | | | | | | | 0 | 2 | 7 |
| | | | | | | | | | 0 | 3 | 0 |
| | | | | | | | | | 0 | 3 | 1 |
| | | | | | | | | | 0 | 3 | 2 |
| | | | | | | | | | 0 | 3 | 3 |
| | | | | | | | | | 0 | 3 | 4 |
| | | | | | | | | | 0 | 3 | 5 |
| | | | | | | | | | 0 | 3 | 6 |
| | | | | | | | | | 0 | 3 | 7 |

APPENDIX G. OIU ACTIVE REQUEST SELECTOR ROM 5401
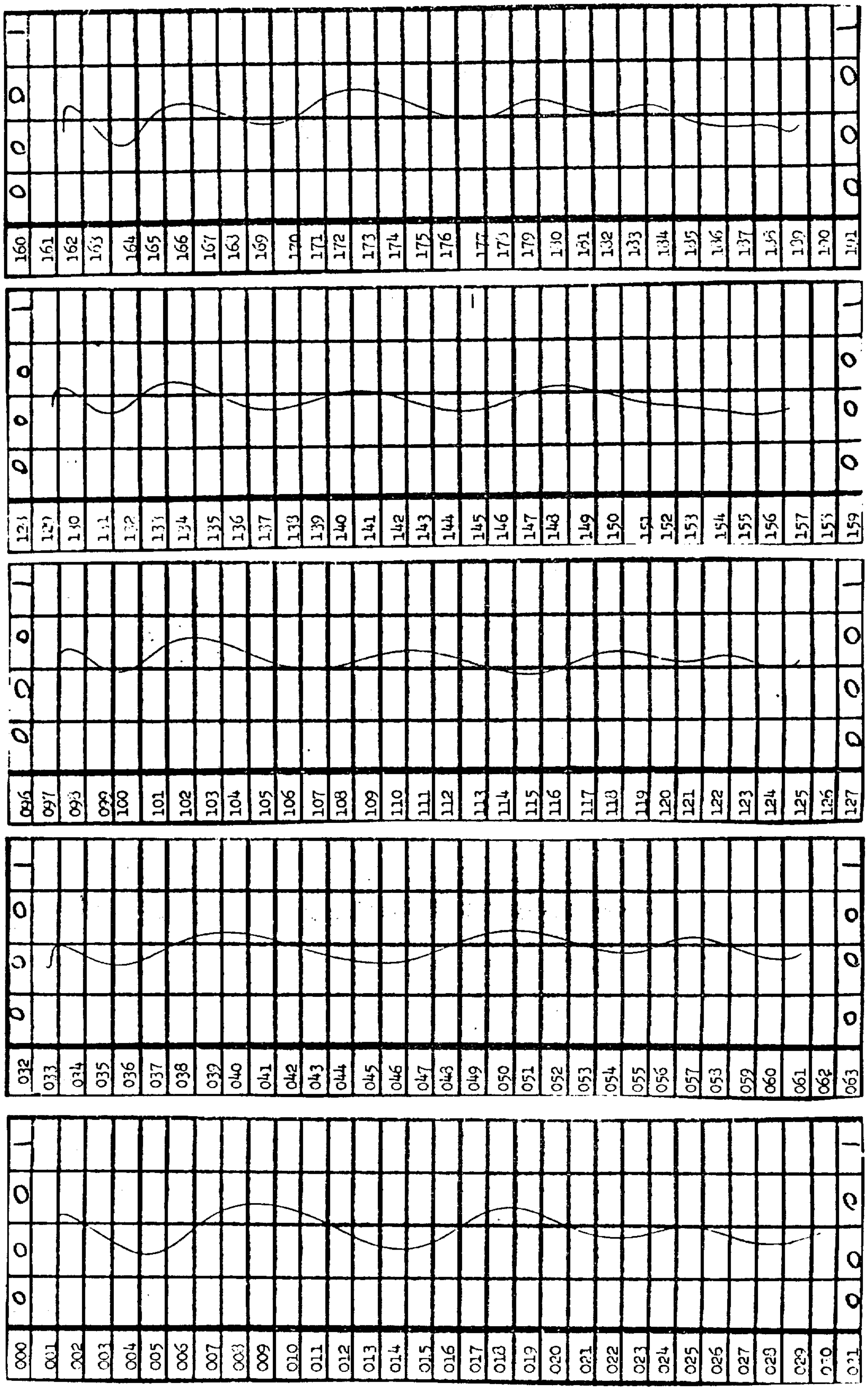

APPENDIX H. OIU INPUT ENABLE ROM 5501
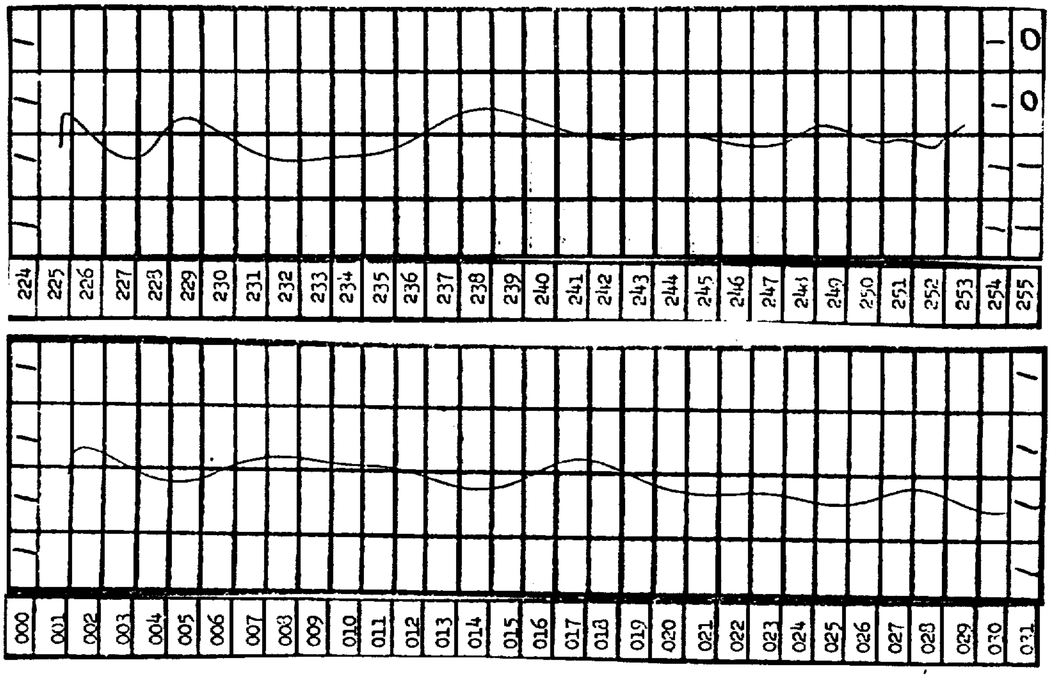
APPENDIX G. OIU ACTIVE REQUEST SELECTOR ROM 5401
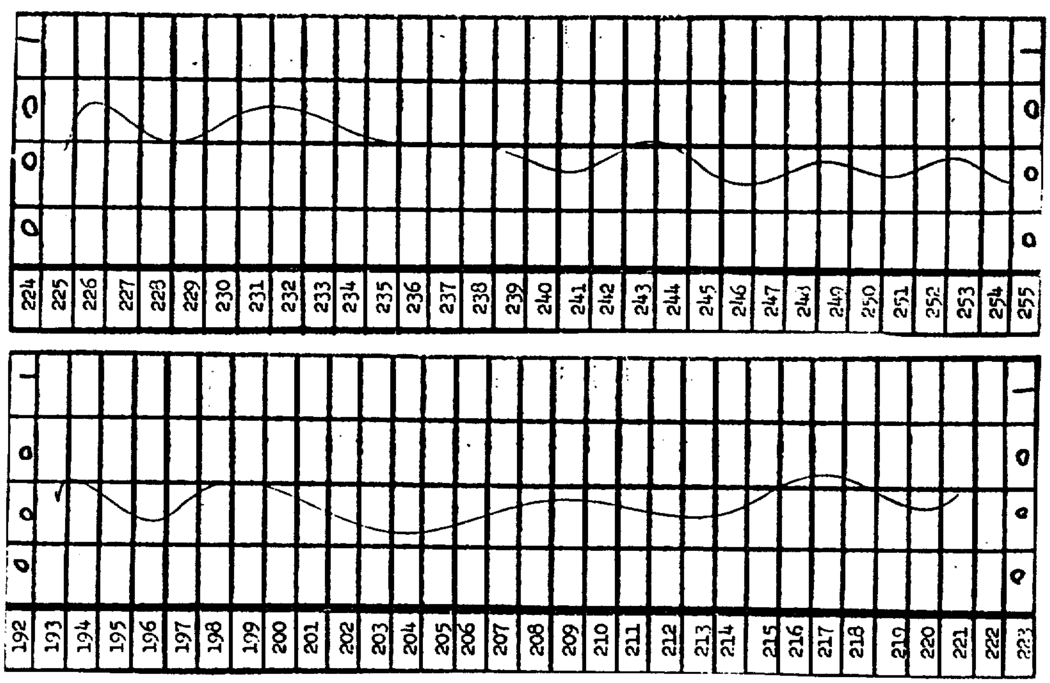

APPENDIX I. INPUT ROM TABLE 1605

ADDRESS RANGE

ROM CONTENTS (Hexadecimal Notation)

| | | | | | | | | |
|---|---|---|---|---|---|---|---|---|
| 000000 | 31' | 00' | 20' | C3' | 23' | 00' | FF' | FF' |
| 000010 | F5' | C5' | D5' | E5' | 2A' | 01' | 10' | 22' |
| 000020 | 00' | 1F' | 3E' | 01' | 32' | 00' | 11' | C0' |
| 000030 | 3B' | 00' | AF' | 32' | 00' | 11' | E1' | D1' |
| 000040 | C1' | F1' | C9' | CD' | 47' | 00' | FB' | 76' |
| 000050 | C3' | 26' | 00' | 06' | 00' | 07' | 4F' | 09' |
| 000060 | 5E' | 23' | 56' | EB' | E9' | FF' | FF' | FF' |
| 000070 | 33' | 33' | C9' | 3A' | 00' | 1F' | E6' | 1F' |
| 000100 | 21' | 5E' | 00' | CD' | 2B' | 00' | C9' | 21' |
| 000110 | 14' | 1F' | 06' | 0A' | AF' | 77' | 23' | 05' |
| 000120 | C2' | 40' | 00' | 3E' | 47' | 32' | 0C' | FF' |
| 000130 | 3E' | 01' | 32' | 17' | 1F' | C9' | 46' | 00' |
| 000140 | 19' | 01' | 09' | 00' | 22' | 01' | 81' | 02' |
| 000150 | 9D' | 02' | AE' | 02' | 70' | 02' | 81' | 03' |
| 000160 | 9D' | 03' | AC' | 00' | 2A' | 02' | FF' | FF' |
| 000170 | 35' | 02' | FF' | FF' | 19' | 02' | 47' | 02' |
| 000200 | 22' | 02' | 9E' | 00' | 41' | 02' | 00' | 17' |
| 000210 | FF' | FF' | FF' | FF' | FF' | FF' | FF' | FF' |
| 000220 | FF' | FF' | FF' | FF' | FF' | FF' | FF' | FF' |
| 000230 | FF' | FF' | FF' | FF' | FF' | FF' | 3A' | 16' |
| 000240 | 1F' | FE' | 01' | CA' | 87' | 02' | 3A' | 01' |
| 000250 | 1F' | C3' | 94' | 02' | CD' | D0' | 00' | CD' |
| 000260 | C0' | 00' | 3E' | 81' | 12' | 36' | 7F' | CD' |
| 000270 | F7' | 00' | 3A' | 01' | 1F' | C3' | 94' | 02' |
| 000300 | 3A' | 01' | 1F' | 12' | 36' | 7C' | 3E' | 80' |
| 000310 | 12' | 36' | 7F' | C9' | AF' | 32' | 17' | 1F' |
| 000320 | 21' | 08' | FF' | 11' | 0B' | FF' | 36' | 33' |
| 000330 | C9' | CD' | CC' | 00' | 36' | 21' | 36' | 23' |
| 000340 | 3E' | C4' | 12' | 36' | 7C' | 3E' | 3D' | 13' |
| 000350 | 36' | 7A' | 3E' | 04' | 12' | 36' | 25' | 3E' |
| 000360 | 02' | 12' | 36' | 26' | 36' | 78' | C9' | AF' |
| 000370 | 12' | 36' | 3A' | 36' | 37' | 06' | 00' | EB' |
| 000400 | 3E' | 7F' | 36' | B2' | 12' | 36' | B3' | 12' |
| 000410 | 36' | BB' | 12' | 36' | 3D' | 12' | 05' | C2' |
| 000420 | 05' | 01' | 36' | B5' | 12' | EB' | 36' | 33' |
| 000430 | C9' | 3A' | 01' | 1F' | E6' | 07' | 32' | 14' |
| 000440 | 1F' | C9' | 3A' | 14' | 1F' | 21' | 2C' | 01' |
| 000450 | CD' | 2B' | 00' | C9' | 46' | 00' | FF' | FF' |
| 000460 | FF' | FF' | 98' | 01' | FF' | FF' | FF' | FF' |
| 000470 | FF' | FF' | 4C' | 01' | 54' | 01' | 4C' | 01' |
| 000500 | 60' | 01' | 4C' | 01' | 6C' | 01' | 86' | 01' |
| 000510 | 86' | 01' | D7' | 01' | CD' | 7D' | 01' | 21' |
| 000520 | 14' | 1F' | 34' | C9' | CD' | 7D' | 01' | 32' |
| 000530 | 05' | 1F' | 3E' | 09' | 32' | 14' | 1F' | C9' |
| 000540 | CD' | 7D' | 01' | 32' | 06' | 1F' | 3E' | 0B' |
| 000550 | 32' | 14' | 1F' | C9' | CD' | 7D' | 01' | 2A' |
| 000560 | 05' | 1F' | 77' | 23' | 22' | 05' | 1F' | 3E' |
| 000570 | 0B' | 32' | 14' | 1F' | C9' | 3A' | 01' | 1F' |
| 000600 | FE' | 40' | FA' | 87' | 01' | C6' | 09' | E6' |
| 000610 | 0F' | 47' | 3A' | 0A' | 1F' | 07' | 07' | 07' |
| 000620 | 07' | E6' | F0' | B0' | 32' | 0A' | 1F' | C9' |
| 000630 | 3A' | 01' | 1F' | E6' | 7F' | 32' | 07' | 1F' |
| 000640 | CD' | AC' | 01' | 22' | 11' | 1F' | 3E' | 0D' |
| 000650 | 32' | 14' | 1F' | C9' | 6F' | 26' | 00' | 29' |
| 000660 | 29' | 11' | 00' | 10' | 19' | C9' | 3A' | 0A' |
| 000670 | 1F' | 07' | 07' | 07' | E6' | 38' | 47' | 3A' |
| 000700 | 01' | 1F' | FE' | 00' | CA' | EF' | 01' | FE' |
| 000710 | 7F' | CA' | 09' | 02' | E6' | 07' | B0' | 32' |
| 000720 | 0A' | 1F' | 21' | 14' | 1F' | 34' | C9' | 2A' |
| 000730 | 11' | 1F' | 3A' | 0A' | 1F' | 77' | 23' | 3A' |
| 000740 | 01' | 1F' | E6' | 3F' | 77' | 23' | 22' | 11' |
| 000750 | 1F' | 3E' | 0D' | 32' | 14' | 1F' | C9' | 2A' |
| 000760 | 11' | 1F' | 3A' | 07' | 1F' | 0E' | 04' | 36' |
| 000770 | FF' | 23' | 0D' | C2' | F7' | 01' | 3C' | FE' |

| | | | | | | | | |
|---|---|---|---|---|---|---|---|---|
| 001000 | 80' | C2' | F5' | 01' | AF' | 32' | 14' | 1F' |
| 001010 | C9' | 2A' | 11' | 1F' | 0E' | 04' | 36' | FF' |
| 001020 | 23' | 0D' | C2' | 0E' | 02' | AF' | 32' | 14' |
| 001030 | 1F' | C9' | 3A' | 08' | 1F' | F6' | 40' | C3' |
| 001040 | 94' | 02' | 3A' | 09' | 1F' | F6' | 40' | C3' |
| 001050 | 94' | 02' | 3A' | 07' | 1F' | CD' | AC' | 01' |
| 001060 | 23' | 7E' | C3' | 94' | 02' | 3A' | 07' | 1F' |
| 001070 | 3C' | CD' | AC' | 01' | 2B' | 7E' | C3' | 94' |
| 001100 | 02' | 3A' | 07' | 1F' | C3' | 94' | 02' | C0' |
| 001110 | B5' | 02' | 32' | 0D' | FF' | 3A' | 19' | 1F' |
| 001120 | FE' | 01' | 3E' | 04' | CA' | 86' | 03' | 3A' |
| 001130 | 09' | 1F' | 07' | 07' | DA' | FE' | 02' | 3A' |
| 001140 | 18' | 1F' | FE' | 00' | C2' | 6D' | 02' | CD' |
| 001150 | 06' | 03' | C3' | 70' | 02' | C0' | 57' | 03' |
| 001160 | 3A' | 16' | 1F' | FE' | 01' | C8' | 3A' | 01' |
| 001170 | 1F' | 32' | 02' | 1F' | 3E' | 01' | 32' | 16' |
| 001200 | 1F' | 3A' | 17' | 1F' | FE' | 00' | C8' | AF' |
| 001210 | 32' | 17' | 1F' | 32' | 16' | 1F' | 32' | 15' |
| 001220 | 1F' | 3A' | 02' | 1F' | 32' | 0B' | FF' | 3E' |
| 001230 | F8' | 32' | 08' | FF' | C9' | 3E' | 01' | 32' |
| 001240 | 0D' | FF' | 32' | 17' | 1F' | 3A' | 16' | 1F' |
| 001250 | FE' | 00' | C8' | C3' | 87' | 02' | 3A' | 01' |
| 001260 | 1F' | 32' | 0C' | FF' | C9' | AF' | 32' | 18' |
| 001270 | 1F' | 21' | 00' | FF' | C0' | EC' | 02' | 2A' |
| 001300 | FA' | 03' | 19' | 22' | 0D' | 1F' | 7C' | 1F' |
| 001310 | E6' | 7F' | 32' | 03' | 1F' | 7C' | 07' | D2' |
| 001320 | D7' | 02' | 3E' | 01' | 32' | 18' | 1F' | 21' |
| 001330 | 02' | FF' | CD' | EC' | 02' | 2A' | FE' | 03' |
| 001340 | 19' | 22' | 0F' | 1F' | 7C' | 1F' | E6' | 7F' |
| 001350 | 32' | 09' | 1F' | C9' | 46' | 23' | 7E' | E6' |
| 001360 | C0' | 4F' | 7E' | E6' | 38' | 6F' | AF' | 67' |
| 001370 | 29' | 29' | 29' | 09' | EB' | C9' | 3E' | FF' |
| 001400 | 32' | 01' | 1F' | C3' | 70' | 02' | AF' | 32' |
| 001410 | 13' | 1F' | 21' | 00' | 1D' | CD' | 46' | 03' |
| 001420 | 3A' | 08' | 1F' | B8' | DA' | 34' | 03' | 47' |
| 001430 | 7A' | B8' | DA' | 34' | 03' | 3A' | 09' | 1F' |
| 001440 | B9' | DA' | 34' | 03' | 4F' | 7B' | B9' | DA' |
| 001450 | 34' | 03' | 3A' | 13' | 1F' | 32' | 07' | 1F' |
| 001460 | 32' | 01' | 1F' | C9' | 3A' | 13' | 1F' | 3C' |
| 001470 | 32' | 13' | 1F' | FE' | 80' | C2' | 0D' | 03' |
| 001500 | 3E' | FF' | 32' | 01' | 1F' | C9' | F5' | 7E' |
| 001510 | 23' | 30' | 46' | 23' | 80' | 57' | 7E' | 23' |
| 001520 | 3D' | 4E' | 23' | 81' | 5F' | F1' | C9' | 0E' |
| 001530 | 00' | 3A' | 03' | 1F' | E6' | 3F' | FE' | 04' |
| 001540 | DA' | 6D' | 03' | FE' | FF' | DA' | 75' | 03' |
| 001550 | FE' | FF' | DA' | 73' | 03' | 3E' | FF' | 32' |
| 001560 | 01' | 1F' | C9' | 0E' | 10' | 3A' | 09' | 1F' |
| 001570 | E6' | 3C' | 1F' | 1F' | 81' | 32' | 01' | 1F' |
| 001600 | C9' | 3A' | 01' | 1F' | E6' | 07' | 21' | 8D' |
| 001610 | 03' | CD' | 2B' | 00' | C9' | A7' | 03' | B9' |
| 001620 | 03' | 47' | 00' | DE' | 03' | FF' | FF' | FF' |
| 001630 | FF' | FF' | FF' | FF' | FF' | 3A' | 01' | 1F' |
| 001640 | 32' | 03' | 1F' | 32' | 04' | 1F' | C9' | 3E' |
| 001650 | 01' | 32' | 15' | 1F' | 21' | 03' | 1F' | AF' |
| 001660 | 32' | 00' | 11' | FB' | 3A' | 15' | 1F' | FE' |
| 001670 | 00' | C8' | CD' | E4' | 03' | C2' | B3' | 03' |
| 001700 | F3' | 3E' | 01' | 32' | 00' | 11' | 3A' | 03' |
| 001710 | 10' | 1F' | 1F' | DA' | C6' | 03' | 3E' | 7F' |
| 001720 | CD' | 94' | 02' | 3A' | 04' | 1F' | 32' | 03' |
| 001730 | 1F' | AF' | 32' | 15' | 1F' | C9' | 3A' | 03' |
| 001740 | 1F' | C3' | 94' | 02' | 06' | FF' | CD' | EF' |
| 001750 | 03' | 05' | C2' | E6' | 03' | 35' | C9' | AF' |
| 001760 | 3D' | C2' | F0' | 03' | C9' | FF' | FF' | FF' |
| 001770 | FF' | FF' | FF' | CC' | FF' | FF' | FF' | C9' |

INPT MNEMONIC SEQUENCE CODING

```
                    ;
                    ;       MACRO DEFINITIONS
                    ;
                    ;       IFEQU:  IF (ACC = NAME) THEN CALL MODULE AND
                    ;               RETURN TO LABEL;  ELSE CONTINUE.
                    ;
        1           IFEQU       MACRO NAME,MODULE,LABEL
        1                       CPI   NAME
        1                       JNZ   $+9
        1                       CALL  MODULE
        1                       JMP   LABEL
                                ENDM
                    ;
                    ;       IFLT:   IF (ACC LT NAME) THEN CALL MODULE AND
                    ;               RETURN TO LABEL;  ELSE CONTINUE.
                    ;
        1           IFLT        MACRO NAME,MODULE,LABEL
        1                       CPI   NAME
        1                       JNC   $+9
        1                       CALL  MODULE
        1                       JMP   LABEL
                                ENDM
                    ;
                    ;       IFGTE:  IF (ACC GT= NAME) THEN CALL MODULE AND
                    ;               RETURN TO LABEL;  ELSE CONTINUE.
                    ;
        1           IFGTE       MACRO NAME,MODULE,LABEL
        1                       CPI   NAME
        1                       JC    $+9
        1                       CALL  MODULE
        1                       JMP   LABEL
                                ENDM
                    ;
                    ;       C O N S T A N T S   A N D   M E M O R Y   M A P
                    ;
FFFF                SPARE       EQU   0FFFFH
1001                OIUOP       EQU   1001H        ; OIU OPCODE
1002                OIUDAT      EQU   1002H        ; OIU DATA
1003                EXCON       EQU   1003H        ; EXTERNAL CONDITIONS
1100                BUSY        EQU   1100H        ; CPU BUSY
1101                FLG1        EQU   1101H        ; CPU OUTPUT FLAGS
1102                FLG2        EQU   1102H
1103                FLG3        EQU   1103H
1104                FLG4        EQU   1104H
1105                FLG5        EQU   1105H
1106                FLG6        EQU   1106H
1107                FLG7        EQU   1107H
1110                CPUDAT      EQU   1110H        ; CPU OUTPUT DATA LATCH
                    ;
                    ;       OIU HARDWARE ADDRESSES
                    ;
FF08                OIUPS       EQU   0FF08H       ; PASS OPCODE
FF09                OIUPW       EQU   0FF09H       ; PASS-WAIT OPCODE
FF0A                OIUKP       EQU   0FF0AH       ; REPEAT PASS KBD OPCODE
FF0B                OIUDD       EQU   0FF0BH       ; LOAD DATA LATCH
FF0C                OIUKB       EQU   0FF0CH       ; LOAD KBD OPCODE
FF0D                OIURP       EQU   0FF0DH       ; RESET PEN COUNTERS
FF00                OIUPA       EQU   0FF00H       ; PEN XH (98765432)
FF01                OIUPB       EQU   0FF01H       ; PEN XL (10,825180,---)
FF02                OIUPC       EQU   0FF02H       ; PEN YH
FF03                OIUPD       EQU   0FF03H       ; PEN YL
                    ;
00F8                MRUN        EQU   370Q         ; META RUN OPCODE
00FF                TCONST      EQU   0FFH         ; TIMER CONSTANT
001F                MASK1       EQU   1FH          ; OPCODE MASK
007F                TOUTM       EQU   177Q         ; TIMED OUT DATA FOR META
0004                SWXLH       EQU   04H          ; PEN SWITCH LH MARGIN
00FF                SWXM        EQU   0FFH         ; PEN SWITCH M MARGIN
00FF                SWXRH       EQU   0FFH         ; PEN SWITCH RH MARGIN
                    ;
                    ;       MASTER RESET INTERRUPT
                    ;
0000                            ORG   0
0000    310020                  LXI   SP,STACK     ; INITIALIZE STACK POINTER
0003    C32300                  JMP   START        ; JUMP TO START OF OPERATING
                    ;
                    ;       OIU REQUEST INTERRUPT
                    ;
0008                            ORG   8
0008    F5                      PUSH PSW           ; SAVE
0009    C5                      PUSH B             ; REGISTERS
```

```
000A   D5              PUSH D
000B   E5              PUSH H
000C   2A0110          LHLD OIUOP      ; READ OIU UPCODE, DATA
000F   22001F          SHLD OPCODE     ; AND SAVE IN RAM
0012   3E01            MVI  A,1
0014   320011          STA  BUSY       ; RAISE CPU BUSY
0017   CD3B00          CALL PROCESS    ; PROCESS OPCODE
001A   AF              XRA  A
001B   320011          STA  BUSY       ; RESET CPU BUSY
001E   E1              POP  H
001F   D1              POP  D          ; RECALL
0020   C1              POP  B          ; REGISTERS
0021   F1              POP  PSW
0022   C9              RET             ; RETURN TO CALLING ROUTINE
                ;
                ;      CENTRAL LOOP OF OPERATING SYSTEM
                ;
0023   CD4700   START:  CALL RESET     ; INITIALIZE RAM CONSTANTS
0026   FB       MLOOP:  EI
0027   76               HLT            ; ENABLE INTERRUPTS AND HALT
0028   C32600           JMP  MLOOP     ; LOOP TO PROCESS NEXT INTER
                ;
                ;      IDENTIFY TABLE LOOK-UP ROUTINE
                ;
002B   0600     IDENTIFY: MVI B,0
002D   07               RLC
002E   4F               MOV  C,A       ; LOAD B,C WITH  ACC * 2
002F   09               DAD  B         ; POINTER H,L = H,L + B,C
0030   5E               MOV  E,M
0031   23               INX  H
0032   56               MOV  D,M       ; LOAD D,E FROM TABLE
0033   EB               XCHG           ; EXCHANGE  D,E AND H,L
0034   E9               PCHL           ; INDIRECT JUMP TO H,L
                ;
                ;      ROUTINE TO MAKE UNBURNED PROM A RETURN
                ;
0038                    ORG  38H
0038   33               INX  SP
0039   33               INX  SP
003A   C9               RET
                ;
                ;      OPCODE PROCESSING
                ;
003B   3A001F   PROCESS: LDA OPCODE
003E   E61F             ANI  MASK1     ; LOOK AT LOWER 5 BITS OF OP
0040   215E00           LXI  H,JTAB1   ; SET H,L POINTER TO OPCODE
0043   CD2B00           CALL IDENTIFY  ; IDENTIFY AND CALL OPCODE
0046   C9       NOOP:   RET
                ;
                ;      INITIALIZATION ROUTINE
                ;
0047   21141F   RESET:  LXI  H,STATE   ; FISRT RAM FLAG
004A   060A             MVI  B,10      ; NUMBER OF FLAGS
004C   AF               XRA  A
004D   77       XXXXX:  MOV  M,A
004E   23               INX  H
004F   05               DCR  B
0050   C24D00           JNZ  XXXXX
0053   3E47             MVI  A,107Q
0055   320CFF           STA  OIUKB     ; SET KBD OP TO CPU
0058   3E01             MVI  A,1
005A   32171F           STA  ENFLAG    ; ENABLE INPUTS
005D   C9               RET
                ;
                ;      OPCODE JUMP TABLE
                ;
005E   4600     JTAB1:  DW   NOOP      ;00-.AT. CPU NO-OP
0060   1901             DW   SETSTATE  ;01-A SET CPU STATE
0062   D900             DW   BOOTD     ;02-B BOOT META FROM DISK
0064   2201             DW   EXSTATE   ;03-C EXECUTE CPU STATE
0066   8102             DW   REPEAT    ;04-D REPEAT KEY
0068   9D02             DW   ENABLE    ;05-E ENABLE KBD AND PEN
006A   AE02             DW   KBDOP     ;06-F LOAD OIU KBD OPCODE
006C   7002             DW   KBDIN     ;07-G PROCESS KBD INPUT
                ;
006E   8103             DW   SUBOP     ;10-H CPU SUB-OPCODE
0070   9D03             DW   LDTIME    ;11-I LOAD TIMER VALUE
0072   AC00             DW   RTAPE     ;12-J READ SYKES TO OLU
0074   2A02             DW   RDPSX     ;13-K READ SENSITIZED X
0076   FFFF             DW   SPARE     ;14-L
0078   3502             DW   RDPSY     ;15-M READ SENSITIZED Y
007A   FFFF             DW   SPARE     ;16-N
007C   1A02             DW   RDPNX     ;17-O READ PEN X
                ;
```

```
007E    4702              DW    PENIN      ;20-P PEN HIT PROCESSING
0080    2202              DW    RDPNY      ;21-Q READ PEN Y
0082    9E00              DW    RERUN      ;22-R RERUN TO META
0084    4102              DW    RDPLBL     ;23-S READ PEN LABEL
0086    0017              DW    1700H      ;24-T RAM TEST OPCODE
0088    FFFF              DW    SPARE      ;25-U
008A    FFFF              DW    SPARE      ;26-V
008C    FFFF              DW    SPARE      ;27-W
                  ;
008E    FFFF              DW    SPARE      ;30-X
0090    FFFF              DW    SPARE      ;31-Y
0092    FFFF              DW    SPARE      ;32-Z
0094    FFFF              DW    SPARE      ;33
0096    FFFF              DW    SPARE      ;34
0098    FFFF              DW    SPARE      ;35
009A    FFFF              DW    SPARE      ;36
009C    FFFF              DW    SPARE      ;37
                  ;
                  ;     RERUN OPCODE
                  ;
009E    3A161F    RERUN:  LDA   QFULL
00A1    FE01              CPI   1
00A3    CA8702            JZ    CSEND      ; IF QUEUE IS FULL SEND IT,
00A6    3A011F            LDA   OPRND      ; ELSE SEND OPERAND,
00A9    C39402            JMP   SMETA
                  ;
                  ;     BOOTSTRAP OPCODES
                  ;
00AC    CD0000    RTAPE:  CALL  BSUB2      ; READ TAPE PAGE OPCODE
00AF    CDC000            CALL  BSUB3
00B2    3EB1              MVI   A,261Q     ; TCU-ACCESS ADDRESS
00B4    12                STAX  D
00B5    367F              MVI   M,177Q     ; FORM-SUBOP
00B7    CDF700            CALL  INTAPE
00BA    3A011F            LDA   OPRND
00BD    C39402            JMP   SMETA      ; SEND A RUN TO META
                  ;
                  ;
00C0    3A011F    BSUB3:  LDA   OPRND
00C3    12                STAX  D
00C4    367C              MVI   M,174Q     ; FORM-SET STATE1 *ADDRESS
00C6    3E80              MVI   A,260Q     ; TCU-LOAD ADDRESS
00C8    12                STAX  D
00C9    367F              MVI   M,177Q     ; FORM-SUBOP
00CB    C9                RET
                  ;
                  ;
00CC    AF        BSUB1:  XRA   A
00CD    32171F            STA   ENFLAG     ; DISABLE INPUTS
00D0    2108FF    BSUB2:  LXI   H,OIUPS
00D3    1108FF            LXI   D,OIUDD
00D6    3633              MVI   M,63Q      ; OLU-LINK FORM
00D8    C9                RET
                  ;
                  ;
00D9    CDCC00    BOOTU:  CALL  BSUB1      ; BOOT FROM DISK
00DC    3621              MVI   M,41Q      ; MSC-SELECT DRIVE A
00DE    3623              MVI   M,43Q      ; MSC-INITIALIZE DRIVE
00E0    3EC4              MVI   A,304Q     ; DISC
00E2    12                STAX  D
00E3    367C              MVI   M,174Q     ; FORM-SET SOURCE
00E5    3E3D              MVI   A,75Q      ; META
00E7    12                STAX  D
00E8    367A              MVI   M,172Q     ; FORM-SET SINK
00EA    3E04              MVI   A,4        ; GROUP NUMBER
00EC    12                STAX  D
00ED    3625              MVI   M,45Q      ; MSC-LOAD GROUP
00EF    3E02              MVI   A,2        ; DISC ADDRESS
00F1    12                STAX  D
00F2    3626              MVI   M,046Q     ; MSC-LOAD ADDRESS
00F4    3678              MVI   M,170Q     ; FORM-EXEC STATE
00F6    C9                RET
                  ;
00F7    AF        INTAPE: XRA   A          ; INPUT TAPE TO OLU SUBR
00F8    12                STAX  D
00F9    363A              MVI   M,72Q      ; OLU-CTR=0
00FB    3637              MVI   M,67Q      ; OLU-LINK TCU
00FD    0600              MVI   B,0
00FF    EB                XCHG             ; EXCHANGE D,E WITH H,L
0100    3E7F              MVI   A,177Q     ; FORM-SUBOPCODE
0102    3682              MVI   M,262Q     ; TCU-INITIATE READ
0104    12                STAX  D
0105    3683      BOOTX:  MVI   M,263Q     ; TCU-READ CHARACTER
0107    12                STAX  D
```

```
0108   368D                 MVI  M,275Q     ; TCU=RESET ALARM (NOOP)
010A   12                   STAX D
010B   363D                 MVI  M,75Q      ; DLU=WRITE,INCREMENT
010D   12                   STAX D
010E   05                   DCR  B
010F   C20501               JNZ  BOOTX
0112   3685                 MVI  M,265Q     ; TCU=STOP READ
0114   12                   STAX D
0115   EB                   XCHG
0116   3633                 MVI  M,63Q      ; DLU=LINK FORM
0118   C9                   RET
                 ;
                 ;      SET STATE AND EXECUTE STATE OPCODES
                 ;
0119   3A011F    SETSTATE: LDA  OPRND
011C   E607                 ANI  7Q
011E   32141F               STA  STATE      ; SET INITIAL STATE (0-7
0121   C9                   RET
                 ;
0122   3A141F    EXSTATE:  LDA  STATE
0125   212C01               LXI  H,STABLE   ; SET PTR TO STATE TABLE
0128   CD2800               CALL IDENTIFY   ; JUMP TO STATE ADDRESS
012B   C9                   RET
                 ;
012C   4600      STABLE:   DW   NOOP        ; STATE 0  NO-OP
012E   FFFF                 DW   SPARE
0130   FFFF                 DW   SPARE
0132   9801                 DW   LOPT1       ; STATE 3  SENSITIZE
0134   FFFF                 DW   SPARE
0136   FFFF                 DW   SPARE
0138   FFFF                 DW   SPARE
013A   4C01                 DW   LRAM1       ; STATE 7  PROGRAM LOAD
                 ;
013C   5401                 DW   LRAM2       ; STATE 10
013E   4C01                 DW   LRAM1       ; STATE 11
0140   6001                 DW   LRAM3       ; STATE 12
0142   4C01                 DW   LRAM1       ; STATE 13
0144   6C01                 DW   LRAM4       ; STATE 14
0146   8601                 DW   LOPT2       ; STATE 15
0148   8601                 DW   LOPT2       ; STATE 16
014A   0701                 DW   LOPT3       ; STATE 17
                 ;
                 ;
                 ;      RAM BOOTSTRAP OPCODES FOR LOADING CPU RAM
                 ;
014C   CD7D01    LRAM1:    CALL HEXIN       ; GET UPPER HEX DIGIT
014F   21141F               LXI  H,STATE
0152   34                   INR  M          ; INCREMENT STATE
0153   C9                   RET
                 ;
0154   CD7D01    LRAM2:    CALL HEXIN       ; GET LOWER HEX DIGIT
0157   32051F               STA  RPTR1      ; SAVE IN ADDRESS PTR1
015A   3E09                 MVI  A,11Q
015C   32141F               STA  STATE      ; SET STATE = 11
015F   C9                   RET
                 ;
0160   CD7D01    LRAM3:    CALL HEXIN
0163   32061F               STA  RPTR2      ; SAVE IN ADDRESS PTR2
0166   3E0B                 MVI  A,13Q
0168   32141F               STA  STATE      ; SET STATE = 13
016B   C9                   RET
                 ;
016C   CD7D01    LRAM4:    CALL HEXIN
016F   2A051F               LHLD RPTR1
0172   77                   MOV  M,A        ; STORE PROGRAM DATA
0173   23                   INX  H
0174   22051F               SHLD RPTR1
0177   3E0B                 MVI  A,13Q
0179   32141F               STA  STATE      ; SET STATE = 13
017C   C9                   RET
                 ;
017D   3A011F    HEXIN:    LDA  OPRND
0180   FE40                 CPI  100Q
0182   FA8701               JM   HOVER
0185   C609                 ADI  11Q
0187   E60F      HOVER:    ANI  17Q
0189   47                   MOV  B,A
018A   3A0A1F               LDA  TEMP1
018D   07                   RLC
018E   07                   RLC
018F   07                   RLC
0190   07                   RLC
0191   E6F0                 ANI  0F0H
0193   B0                   ORA  B
```

```
0194    320A1F                  STA   TEMP1
0197    C9                      RET
                        ;
                        ;       SENSITIZE--LOAD PEN TABLE ENTRY(IES)
                        ;
0198    3A011F          LDPT1:  LDA   OPRNO
019B    E67F                    ANI   177Q
019D    32071F                  STA   PLABEL      ; SAVE PEN TABLE LABEL
01A0    CDAC01                  CALL  PFLBL       ; CONVERT LABEL TO H,L PTR
01A3    22111F                  SHLD  PTPTR       ; SAVE TABLE POINTER
01A6    3E0D                    MVI   A,15Q
01A8    32141F                  STA   STATE       ; SET STATE = 15
01AB    C9                      RET
01AC    6F              PFLBL:  MOV   L,A
01AD    2600                    MVI   H,0
01AF    29                      DAD   H
01B0    29                      DAD   H           ; LABEL * FOUR
01B1    11001D                  LXI   D,PTABLE
01B4    19                      DAD   D
01B5    C9                      RET
                        ;
01B6    3A0A1F          LDPT2:  LDA   TEMP1       ; INPUT AND SHIFT IN
01B9    07                      RLC               ; OCTAL NUMBERS
01BA    07                      RLC
01BB    07                      RLC
01BC    E638                    ANI   70Q
01BE    47                      MOV   B,A
01BF    3A011F                  LDA   OPRNO
01C2    FE00                    CPI   0           ; IF OCTAL DIGIT IS A NULL,
01C4    CAEF01                  JZ    PNULL       ; WIPE OUT REST OF TABLE.
01C7    FE7F                    CPI   177Q        ; IF A DEL CHARACTER,
01C9    CA0902                  JZ    PDELL       ; DESENSITIZE TABLE ENTRY.
01CC    E607                    ANI   7Q
01CE    B0                      ORA   B
01CF    320A1F                  STA   TEMP1
01D2    21141F                  LXI   H,STATE
01D5    34                      INR   M           ; INCREMENT STATE
01D6    C9                      RET
                        ;
01D7    2A111F          LDPT3:  LHLD  PTPTR
01DA    3A0A1F                  LDA   TEMP1
01DD    77                      MOV   M,A         ; SAVE DELTA
01DE    23                      INX   H
01DF    3A011F                  LDA   OPRNO
01E2    E63F                    ANI   77Q
01E4    77                      MOV   M,A         ; SAVE COORDINATE
01E5    23                      INX   H
01E6    22111F                  SHLD  PTPTR
01E9    3E0D                    MVI   A,15Q
01EB    32141F                  STA   STATE       ; SET STATE = 15
01EE    C9                      RET
                        ;
01EF    2A111F          PNULL:  LHLD  PTPTR
01F2    3A071F                  LDA   PLABEL
01F5    0E04            PNUL2:  MVI   C,4
01F7    36FF            PNUL1:  MVI   M,377Q
01F9    23                      INX   H
01FA    0D                      DCR   C
01FB    C2F701                  JNZ   PNUL1
01FE    3C                      INR   A
01FF    FE80                    CPI   128
0201    C2F501                  JNZ   PNUL2
0204    AF                      XRA   A
0205    32141F                  STA   STATE       ; SET STATE = 0
0208    C9                      RET
                        ;
0209    2A111F          PDELL:  LHLD  PTPTR
020C    0E04                    MVI   C,4
020E    36FF            PDEL1:  MVI   M,377Q
0210    23                      INX   H
0211    0D                      DCR   C
0212    C20E02                  JNZ   PDEL1
0215    AF                      XRA   A
0216    32141F                  STA   STATE       ; SET STATE = 0
0219    C9                      RET
                        ;
                        ;       READ PEN VALUE OPCODES
                        ;
021A    3A081F          RDPNX:  LDA   PENXX       ; READ PEN X
021D    F640                    ORI   100Q
021F    C39402                  JMP   SMETA       ; SEND WITH RUN META
0222    3A091F          RDPNY:  LDA   PENYY       ; READ PEN Y
0225    F640                    ORI   100Q
```

```
0227     C39402               JMP   SMETA
022A     3A071F     RDPSX:    LDA   PLABEL     ; READ SENSITIZED X
022D     CDAC01               CALL  PFLBL      ; CONVERT TO H,L PTR
0230     23                   INX   H
0231     7E                   MOV   A,M
0232     C39402               JMP   SMETA
0235     3A071F     RDPSY:    LDA   PLABEL     ; READ SENSITIZED Y
0238     3C                   INR   A
0239     CDAC01               CALL  PFLBL
023C     2B                   DCX   H
023D     7E                   MOV   A,M
023E     C39402               JMP   SMETA
0241     3A071F     RDPLBL:   LDA   PLABEL     ; READ PEN LABEL
0244     C39402               JMP   SMETA
                    ;
                    ;
                    ;     KEYBOARD, GRAF/PEN, REPEAT AND ENABLE OPCODES
                    ;
0247     CDB502     PENIN:    CALL  PENXY      ; INPUT ,SCALE, SAVE PEN
024A     3200FF               STA   OIURP      ; RESET PEN COUNTERS
024D     3A191F               LDA   PENFLG
0250     FE01                 CPI   1
0252     3E04                 MVI   A,4        ; PEN SUBOP = 4
0254     CA8603               JZ    SUBP1      ; IF FLAG SET DO SUBOP.
0257     3A091F               LDA   PENYY
025A     07                   RLC
025B     07                   RLC
025C     DAFE02               JC    PNERROR    ; IF Y GT 512 THEN TOO BIG
025F     3A181F               LDA   XHIGH
       1            +         IFEQU  0,PSCREEN,KBDIN
0262 1 FE00         +         CPI   00000H
0264 1 C26D02       +         JNZ   $+9
0267 1 CD0603       +         CALL  PSCRE
026A 1 C37002       +         JMP   KBDIN
026D     CD5703               CALL  PSWITCH
                    ;
0270     3A161F     KBDIN:    LDA   QFULL
0273     FE01                 CPI   1
0275     C8                   RZ               ; RETURN IF DATA BUFFER IS A
0276     3A011F               LDA   OPRND
0279     32021F               STA   CBUFFER    ; STORE IN DATA BUFFER
027C     3E01                 MVI   A,1
027E     32161F               STA   QFULL      ; SET BUFFER FULL FLAG
                    ;
0281     3A171F     REPEAT:   LDA   ENFLAG
0284     FE00                 CPI   0
0286     C8                   RZ               ; RETURN IF DISABLED
0287     AF         CSEND:    XRA   A
0288     32171F               STA   ENFLAG
028B     32161F               STA   QFULL      ; RESET FLAGS
028E     32151F               STA   TFLAG      ; STOP TIMER
0291     3A021F               LDA   CBUFFER
0294     320BFF     SMETA:    STA   OIUDO      ; PUT CHAR IN OIU DATA REG
0297     3EF8                 MVI   A,MRUN     ; META RUN OPCODE
0299     3208FF               STA   OIUPS      ; PASS OPCODE
029C     C9                   RET
                    ;
029D     3E01       ENABLE:   MVI   A,1
029F     3200FF               STA   OIURP      ; RESET PEN COUNTERS IN OIU
02A2     32171F               STA   ENFLAG     ; SET ENABLE FLAG
02A5     3A161F               LDA   QFULL
02A8     FE00                 CPI   0
02AA     C8                   RZ               ; RETURN IF DATA BUFFER IS E
02AB     C38702               JMP   CSEND      ; ELSE SEND DATA TO META
                    ;
                    ;
                    ;     LOAD KEYBOARD OPCODE LATCH ON OIU
                    ;
02AE     3A011F     KBDOP:    LDA   OPRND
02B1     320CFF               STA   OIUKB
02B4     C9                   RET
                    ;
                    ;
                    ;     INPUT PEN COUNTER DATA AND SCALE ROUTINE
                    ;
02B5     AF         PENXY:    XRA   A
02B6     32181F               STA   XHIGH      ; RESET PEN-SWITCH FLAG
02B9     2100FF               LXI   H,OIUPA    ; SET PTR TO PEN XH
02BC     CDEC02               CALL  SUBXY      ; INPUT AND REARRANGE
02BF     2AFA03               LHLD  XBIAS      ; PEN X COORDINATE BIAS VALU
02C2     19                   DAD   D          ; ADD BIAS TO COUNTER VALUE
02C3     220D1F               SHLD  XPENABS    ; SAVE ABSOLUTE PEN X
02C6     7C                   MOV   A,H
02C7     1F                   RAR
```

```
02C8    E67F                ANI   177Q
02CA    32081F              STA   PENXX       ; PEN X COORDINATE VALUE
02CD    7C                  MOV   A,H
02CE    07                  RLC
02CF    D20702              JNC   POVER
02D2    3E01                MVI   A,1
02D4    32181F              STA   XHIGH       ; SET IF X >= 64
02D7    2102FF     POVER:   LXI   H,OIUPC     ; SET POINTER TO PEN YH
                   ;
02DA    CDEC02              CALL  SUBXY
02DD    2AFE03              LHLD  YBIAS       ; PEN Y COORDINATE BIAS VALU
02E0    19                  DAD   D
02E1    220F1F              SHLD  YPENABS     ; SAVE ABSOLUTE PEN Y
02E4    7C                  MOV   A,H
02E5    1F                  RAR
02E6    E67F                ANI   177Q
02E8    32091F              STA   PENYY       ; PEN X COORDINATE VALUE
02EB    C9                  RET
                   ;
02EC    46         SUBXY:   MOV   B,M         ; B=CTR HIGH 9--2
02ED    23                  INX   H
02EE    7E                  MOV   A,M
02EF    E6C0                ANI   300Q
02F1    4F                  MOV   C,A         ; C= CTR LOW  10--
02F2    7E                  MOV   A,M
02F3    E638                ANI   70Q
02F5    6F                  MOV   L,A
02F6    AF                  XRA   A
02F7    67                  MOV   H,A
02F8    29                  DAD   H
02F9    29                  DAD   H
02FA    29                  DAD   H
02FB    09                  DAD   B
02FC    EB                  XCHG
02FD    C9                  RET
                   ;
02FE    3EFF       PNERROR: MVI   A,377Q
0300    32011F              STA   OPRND
0303    C37002              JMP   KBDIN       ; SEND DEL'
                   ;
                   ;     PEN SCREEN TABLE LOOK-UP ROUTINE
                   ;
0306    AF         PSCREEN: XRA   A
0307    32131F              STA   PCOUNT      ; RESET TABLEENTRY COUNTER
030A    21001D              LXI   H,PTABLE    ; SET TABLE POINTER
030D    CD4603     PSLOP:   CALL  PSIZE       ; LOAD B=XMIN, C=YMIN,
                   ;                              D=XMAX, E=YMAX.
0310    3A081F              LDA   PENXX       ; PEN X COORDINATE
0313    B8                  CMP   B           ; CARRY= PENX < XMIN
0314    DA3403              JC    PNOMAT
0317    47                  MOV   B,A
0318    7A                  MOV   A,D
0319    B8                  CMP   B           ; CARRY= XMAX < PENX
031A    DA3403              JC    PNOMAT
                   ;
031D    3A091F              LDA   PENYY       ; PEN Y COORDINATE
0320    B9                  CMP   C           ; CARRY= PENY < YMIN
0321    DA3403              JC    PNOMAT
0324    4F                  MOV   C,A
0325    7B                  MOV   A,E
0326    B9                  CMP   C           ; CARRY= YMAX < PENY
0327    DA3403              JC    PNOMAT
                   ;
032A    3A131F     PMATCH:  LDA   PCOUNT
032D    32071F              STA   PLABEL
0330    32011F              STA   OPRND       ; PCHAR=PCOUNT=PEN LABEL
0333    C9                  RET
0334    3A131F     PNOMAT:  LDA   PCOUNT
0337    3C                  INR   A           ; INCR TABLE COUNTER
0338    32131F              STA   PCOUNT
033B    FE80                CPI   128
033D    C20D03              JNZ   PSLOP
0340    3EFF                MVI   A,377Q
0342    32011F              STA   OPRND       ; DEL' = NO MATCH CHAR
0345    C9                  RET
                   ;
                   ;
0346    F5         PSIZE:   PUSH  PSW
0347    7E                  MOV   A,M         ; DELTA X
0348    23                  INX   H
0349    3D                  DCR   A
034A    46                  MOV   B,M         ; XMIN
034B    23                  INX   H
034C    80                  ADD   B
```

```
034D    57                      MOV   D,A        ; XMAX
034E    7E                      MOV   A,M        ; DELTA Y
034F    23                      INX   H
0350    3D                      DCR   A
0351    4E                      MOV   C,M        ; YMIN
0352    23                      INX   H
0353    81                      ADD   C
0354    5F                      MOV   E,A        ; YMAX
0355    F1                      POP   PSW
0356    C9                      RET
                ;
                ;      PEN "SWITCH" ROUTINE
                ;
0357    0E00    PSWITCH:        MVI   C,0        ; SET COLUMN TO 0
0359    3A081F                  LDA   PENXX
035C    E63F                    ANI   3FH
035E    FE04                    CPI   SWXLH
0360    DA6D03                  JC    PSNOT
0363    FEFF                    CPI   SWXH
0365    DA7503                  JC    PSC0
0368    FEFF                    CPI   SWXRH
036A    DA7303                  JC    PSC1
036D    3EFF    PSNOT:          MVI   A,377Q
036F    32011F                  STA   OPRND
0372    C9                      RET
                ;
0373    0E10    PSC1:           MVI   C,20Q      ; SET TO COLUMN 1
0375    3A091F  PSC0:           LDA   PENYY
0378    E63C                    ANI   74Q
037A    1F                      RAR
037B    1F                      RAR
037C    81                      ADD   C
037D    32011F                  STA   OPRND      ; CHARACTER = (0--37)
0380    C9                      RET
                ;
                ;
                ;      SUB-OPCODES
                ;
0381    3A011F  SUBOP:          LDA   OPRND
0384    E607                    ANI   7
0386    218D03  SUBP1:          LXI   H,JTABS
0389    CD2800                  CALL  IDENTIFY
038C    C9                      RET
                ;
                ;      SUB-OPCODE JUMP TABLE
                ;
038D    A703    JTABS:          DW    TSTART     ; START TIMER
038F    D903                    DW    TSTOP      ; STOP TIMER
0391    4700                    DW    RESET      ; RESET TIMESR
0393    DE03                    DW    TREAD      ; READ TIMER
0395    FFFF                    DW    SPARE      ; PEN SPECIAL PROC
0397    FFFF                    DW    SPARE
0399    FFFF                    DW    SPARE
039B    FFFF                    DW    SPARE
                ;
                ;      TIMER ROUTINES
                ;
039D    3A011F  LDTIME:         LDA   OPRND
03A0    32031F                  STA   TWORD      ; SETTIME VALUE
03A3    32041F                  STA   TIMER      ; SET RESET TIME VALUE
03A6    C9                      RET
                ;
03A7    3E01    TSTART:         MVI   A,1
03A9    32151F                  STA   TFLAG      ; SET TIMER ON FLAG
03AC    21031F                  LXI   H,TWORD
03AF    AF                      XRA   A
03B0    320011                  STA   BUSY       ; RESET CPU BUSY
03B3    FB      TLOOP:          EI               ; ENABLE CPU INTERRUPTS
03B4    3A151F                  LDA   TFLAG
03B7    FE00                    CPI   0
03B9    C8                      RZ               ; EXIT IF TIMER STOPPED
03BA    CDE403                  CALL  TIME       ; FIXED TIME LOOP
03BD    C2B303                  JNZ   TLOOP
03C0    F3                      DI
03C1    3E01                    MVI   A,1
03C3    320011                  STA   BUSY       ; SET BUSY
03C6    3A0310  TTEST:          LDA   EXCON
03C9    1F                      RAR
03CA    1F                      RAR
03CB    DAC603                  JC    TTEST      ; WAIT FOR UIU NOT BUSY
03CE    3E7F                    MVI   A,TOUTW
03D0    CD9402                  CALL  SMETA      ; SEND UP TO META
                ;
03D3    3A041F  TRESET:         LDA   TIMER
```

```
03D6    32031F             STA   TWORD
                    ;
03D9    AF          TSTOP:   XRA   A
03DA    32151F               STA   TFLAG       ; STOP TIMER
03DD    C9                   RET
                    ;
03DE    3A031F      TREAD:   LDA   TWORD
03E1    C39402               JMP   SMETA       ; SEND UP TO META
                    ;
03E4    06FF        TIME:    MVI   B,TCONST    ; MAJOR TIME LOOP
03E6    CDEF03      TMLOP:   CALL  TIME2
03E9    05                   DCR   B
03EA    C2E603               JNZ   TMLOP
03ED    35                   DCR   M
03EE    C9                   RET
                    ;
03EF    AF          TIME2:   XRA   A           ; INNERMOST TIME LOOP
03F0    3D          TMLP2:   DCR   A
03F1    C2F003               JNZ   TMLP2
03F4    C9                   RET
                    ;
                    ;
                    ;
03FA                         ORG   03FAH
03FA    FFCC        XBIAS:   DW    0CCFFH      ; PEN X BIAS VALUE
03FE                         ORG   03FEH
03FE    FFC9        YBIAS:   DW    0C9FFH      ; PEN Y BIAS VALUE
                    ;
                    ;     RAM STORAGE
                    ;
1000                         ORG   1000H
0200                PTABLE:  DS    512         ; PEN HIT POINT TABLE
1F00                         ORG   1F00H       ; START OF RAM-ONLY IN CPU
0001                OPCODE:  DS    1           ; CPU OPCODE
0001                OPRND:   DS    1           ; CPU OPERAND
0001                CBUFFER: DS    1           ; KBD,PEN ONE CHARACTER QUEU
0001                TWORD:   DS    1           ; TIMER TIMED VLUE
0001                TIMER:   DS    1           ; TIMER RESET VALUE
0001                RPTR1:   DS    1           ; PEN TABLE
0001                RPTR2:   DS    1           ;  POINTER
0001                PLABEL:  DS    1           ; PEN TABLE LABEL
0001                PENXX:   DS    1           ; PEN X COORD (=9876543)
0001                PENYY:   DS    1           ; PEN Y COORD  "
0001                TEMP1:   DS    1           ; TEMPORARY STORAGE
0001                BCOUNT:  DS    1           ; BLOCK COUNT FOR TAPE BOOT
0001                WDCTR:   DS    1           ; WORD COUNTER FOR TAPE
0002                XPENABS: DS    2           ; PEN X ABSOLUTE
0002                YPENABS: DS    2           ; PEN Y ABSOLUTE
0002                PTPTR:   DS    2           ; PEN TABLE POINTER
0001                PCOUNT:  DS    1           ; PEN SEARCH LOOP COUNTER
                    ;
                    ;     THE FOLLOWING ARE RESET TO ZERO WITH MR
                    ;
0001                STATE:   DS    1           ; CPU STATE
0001                TFLAG:   DS    1           ; TIMER ON-OFF FLG
0001                QFULL:   DS    1           ; BUFFER FULL FLAG
0001                ENFLAG:  DS    1           ; KBD,PEN ENABLE FLAG
0001                XHIGH:   DS    1           ; PEN SWITCH HIT FLAG
0001                PENFLG:  DS    1           ; PEN SUBOP FLAG
                    ;
2000                         ORG   2000H       ; TOP OF RAM STACK -1
0001                STACK:   DS    1

                             END
```

SYMBOL TABLE

```
* 01

A       0007      B       0000      BCOUN   1F0B *    BOOTD   0009
BOOTX   0105      BSUB1   00CC      BSUB2   0000      BSUB3   00C0
BUSY    1100      C       0001      CBUFF   1F02      CPUDA   1110 *
CSEND   0287      D       0002      E       0003      ENABL   029D
ENFLA   1F17      EXCON   1003      EXSTA   0122      FLG1    1101 *
FLG2    1102 *    FLG3    1103 *    FLG4    1104 *    FLG5    1105 *
FLG6    1106 *    FLG7    1107 *    H       0004      HEXIN   017D
HOVER   0187      IDENT   0028      IFEQU   0309      IFGTE   0389 *
IFLT    03C9 *    INTAP   00F7      JTAB1   005E      JTAB3   038D
KBDIN   0270      KBDOP   024E      L       0005      LDPT1   0198
LDPT2   0186      LDPT3   0107      LDTIM   0390      LRAM1   014C
LRAM2   0154      LRAM3   0160      LRAM4   016C      M       0006
```

| | | | | | | | |
|---|---|---|---|---|---|---|---|
| MASK1 | 001F | MLOOP | 0026 | MRUN | 00FB | NOUP | 0046 |
| OIUDA | 1002 * | OIUDD | FF0B | OIUKB | FF0C | OIUKP | FF0A * |
| OIUOP | 1001 | OIUPA | FF00 | OIUPB | FF01 * | OIUPC | FF02 |
| OIUPD | FF03 * | OIUPS | FF08 | OIUPW | FF09 * | OIURP | FF0D |
| OPCOD | 1F00 | OPRND | 1F01 | PCOUN | 1F13 | PDEL1 | 020E |
| PDELL | 0209 | PENFL | 1F19 | PENIN | 0247 | PENXX | 1F08 |
| PENXY | 02B5 | PENYY | 1F09 | PFLBL | 01AC | PLABE | 1F07 |
| PMATC | 032A * | PNERR | 02FE | PNOMA | 0334 | PNUL1 | 01F7 |
| PNUL2 | 01F5 | PNULL | 01EF | POVER | 02D7 | PRUCE | 003B |
| PSC0 | 0375 | PSC1 | 0373 | PSCRE | 0306 | PSIZE | 0346 |
| PSLOP | 0300 | PSNOT | 036D | PSW | 0006 | PSWIT | 0357 |
| PTABL | 1000 | PTPTR | 1F11 | QFULL | 1F16 | RDPLB | 0241 |
| RDPNX | 021A | RDPNY | 0222 | RDPSX | 022A | RDPSY | 0235 |
| REPEA | 0281 | RERUN | 009E | RESET | 0047 | RPTR1 | 1F05 |
| RPTR2 | 1F06 | RTAPE | 00AC | SETST | 0119 | SMETA | 0294 |
| SP | 0006 | SPARE | FFFF | STABL | 012C | STACK | 2000 |
| START | 0023 | STATE | 1F14 | SUBOP | 0381 | SUBP1 | 0386 |
| SUBXY | 02EC | SWXLH | 0004 | SWXM | 00FF | SWXRM | 00FF |
| TCONS | 00FF | TEMP1 | 1F0A | TFLAG | 1F15 | TIME | 03E4 |
| TIME2 | 03EF | TIMER | 1F04 | TLOOP | 0383 | TMLOP | 03E6 |
| TMLP2 | 03F0 | TOUTW | 007F | TREAD | 030E | TRESE | 0303 * |
| TSTAR | 03A7 | TSTOP | 0309 | TTEST | 03C6 | TWORD | 1F03 |
| WDCTR | 1F0C * | XBIAS | 03FA | XHIGH | 1F18 | XPENA | 1F0D |
| XXXXX | 004D | YBIAS | 03FE | YPENA | 1F0F | | |

APPENDIX J. DEVICES USED TO IMPLEMENT EXEMPLARY OIU

All gates are combinations of:

74LS00 74LS02 74LS04

Other MSI/LSI devices are as follows:

1701, 1706, 1709, 1713, 1715, 1801, 5403, 5504 : 74LS74
1702, 1716, 1717, 1802, 5310, 5311, 5312, 5304 : 74LS109
1703, 5306, 5305 : 8T95 (Signetics)
1704, 5302, 5307, 5309 : 74LS173
1803 : 74LS161
1804, 1805 : 74LS393
1806 : 74LS253
5201 : 5406.3, 8 MHZ (MF Electronics)
5202, 5402 : 74LS151
5203 : 74LS193
5301 : 74LS148
5303, 5308 : 82S123 (Signetics)
5401, 5501 : 6301 (Monolithic Memories)
5404, 5502 : 74LS138
5405 : 74LS157
1707 : 555 (Signetics)

APPENDIX K. DEVICES USED TO IMPLEMENT EXEMPLARY INPT

1601 : 8080A (Intel Corporation)
1602 : 8224, 8228 (Intel Corporation)
1603 : 74LS253 (Texas Instruments)
1604 : 74LS138 (Texas Instruments)
1605 : 6306 (Monolithic Memories), 2112 (Synertec)
1606 : 9334 (Fairchild)
1607 : 74LS174

APPENDIX L. META SELF INSTRUCTION SET

META SELF CODES/DATA

```
100 @ <> NOP
104 D <> DIRECTW
105 E <> DIRECT
110 H <op> PASW
111 I <op> PASS
114 L <op> SCNW
115 M <op> SCN
120 P <mpxr> LOAD
121 Q <data> DATA
125 U <mpxr> LOADP
126 V <> EXECP
127 W <> EXEC
130 X <data> LOAD RHI
134 \ <data> LOAD RLO
140 ' <addr> JUMP
141 a <addr-1> "
142 b <addr-2> "
143 c <addr-3> "
144 d <addr-0> CALL
145 e <addr-1>  "
146 f <addr-2>  "
147 g <addr-3>  "
150 h <cond> RET
151 i <cond> NRET
154 l <addr-0> PUSH
155 m <addr-1>  "
156 n <addr-2>  "
157 o <addr-3>  "
160 p <cond> SKIP
161 q <cond> NSKIP
162 r <mpxr> NCHARX
163 s <mpxr> CHARX
164 t <class> NCLASS
165 u <class> CLASS
166 v <data> NCHAR
167 w <data> CHAR
174 | <micro> MICRO
```

<class> DEFINITIONS

```
140 ' DIGIT
141 a CAPITAL
142 b LOW
143 c SPECIAL
144 d NUMOP
145 e BEGIN
146 f SENSE
147 g ALPHNUM
```

<Cond> CONDITION DEFINITIONS

```
140 ' OUT
141 a OVER
142 b END
143 c COMPARE
144 d NONE
145 e DLU
146 f BIT7
147 g FAIL
150 h CHECK
152 i FULL
153 k EMPTY
154 l FORM
155 m NOT
156 n CONT
157 o SEM
```

<mpxr> MULTIPLEXER DEFINITION

```
140 ' SPARE
141 a PMEM
142 b SCTR
143 c SEM
144 d DLU
145 e OIU
146 f STACK
147 g CONV
150 h LINK
153 k DREG
155 m OIUOP
171 y OPRD
175 } DCTR
```

<micro> INSTRUCTIONS

```
140 ' NOP
141 a POP
144 d NOTO
145 e NOT1
146 f FLGO
147 g FLG1
150 h LDNUM
151 i LDALPHA
154 l CLEAR
155 m PUSH
156 n HALT
```

ASSEMBLER DIRECTIVES

```
ORG <address or label>
EQU <absolute data>
EJECT CAP LOW END
```

```
Notes:  <> = don't care data
        <op> = operation code
```

APPENDIX M. META INTERPRETER COMMUNICATION GRAMMAR

```
    k
<MR>→.bs.(MRESET)<PRØG><RETURN>

    →.esc.<MRESC>

    →.ht. <MRHT>

    →.stx.(MRSTX)<MRSTX2>

    →ε(MRESET)(BOOTSYS)<PROG><RETURN>

       k
<MRESC>→ε(SELECTG)<MRESC2>
        k
<MRESC2>→ε(LOADADRS)(BOOTSYS2)(MRESET)<PRØG><RETURN>
      k
<MRHT>→ε<ε>
        k
<MRSTX2>→ε(LØADPM, display character)<MRSTX>
```

APPENDIX N. COMMUNICATION GRAMMAR STATES AND ACTIONS

<MR> This state is entered when the MASTER-RESET switch is depressed on the operator's panel. Rule selection is made upon depressing any keyboard key or graph-pen entry.

(MRESET) Initialize the program counter to zero and clear the program.control stack.

<MRESC> Allows entry of the disk file group which is one of the digits 0, 1, 2, 3 or 4. This is the first step in setting an absolute file address to program execution.

(SELECTG) Is the instruction which loads the disk group.

(BOOTSYS) Sets disk group 4 address 015, loads the SYSTEM program and initiates execution of the program.

(BOOTSYS2) The portion of BOOTSYS which loads and executes a program assuming the address has already been defined.

<MRESC2> Allows keyboard entry of the block address for loading a program.

<MRHT> Allows a state to be executed by keyboard entry.

<MRSTX2> Allows loading of program memory with a program from the keyboard.

APPENDIX O. SPOML METAPROCESSOR GRAMMAR

<PROG>→<BEGIN><LOOKUP>*
→<CAPITAL><SKIPLABL>
→ε<PROG>

<SKIPLABL>→<BEGIN><LOOKUP>*
→ε<SKIPLABL>

| | | | | | |
|---|---|---|---|---|---|
| <BEGIN> | →b̸ | <BEGIN> | →e | <CAPITAL> | →F |
| | →! | | →f | | →G |
| | →" | | →i | | →H |
| | →# | | →k | | →I |
| | →$ | | →l | | →J |

```
             →%
             →+
             →,
             →-
             →.
             →:
             →;
             →=
             →?
             →[
             →]
             →^
             →_
             →b
             →c
             →d

             →m
             →n
             →o
             →r
             →s
             →u
             →w
             →{
             →}
             →~

<CAPITAL>→A
         →B
         →C
         →D
         →E

         →K
         →L
         →M
         →N
         →O
         →P
         →Q
         →R
         →S
         →T
         →U
         →V
         →W
         →X
         →Y
         →Z

<LOW>→a
     →b
     →c
     →d
     →e
     →f
     →g
     →h
     →i
     →j
     →k
     →l
     →m
     →n
     →o
     →p
     →q
     →r
     →s
     →t
     →u
     →v
     →w
     →x
     →y
     →z

<DIGIT>→0
       →1
       →2
       →3
       →4
       →5
       →6
       →7
       →8
       →9

<ALPNANUM>→<CAP>
          →<LOW>
          →<DIGIT>

<LOOKUP> →to <PRØG>

         →!(FLGO)<STACKS>

         →"(DENTRY:Link FORM)<DQUOTE>

         →#(LET)<LETSCAN><LETSCAN><PROG>

         →$<EQDOL>

         →%<RESTORE>

         →+<LETADD>

         →,<PRØG>

         →-<LETSUB>

         →.(HALT)<PROG>

         →:(END)<PROG>

         →;(DØ)<PROG>

         →=(LETEQ)<EQUAL>

         →?(COND: if CONT then <PROG> else <FINDEND><PROG>)

         →[(DO)<PROG>

         →](END)<PROG>

         →^(MOVE1)<MOVE>

         →_<NULL>

         →b(BOOT)<FILE>(SYSBT2)

         →c<CALL>
```

```
→d(DISPLAY)<D>
→e(EXIT)<FINDEND><PROG>
→f<RERUN>
→i(FLGO)<ITEST>
→k(KBD)<PROG>
→l<LOAD>
→m<MICRO>
→n<NAME>
→o(OCTAL)<PROG>
→r(REPEAT)<PROG>
→s(SENSE)<SENSE2>
→u<USE>
→w<WFB>
→{<MACRO>
→}(MEND)<PROG>
→~(NOT)<PROG>
→|(FLG1)<ALT>
<RETURN>#→ε<PROG><RETURN>

<NAME>→ε<NAMEFND>*<PROG>

<NAMEFND>→<DIGIT>(LOADGP)<NAMEFND>*
          →*(NAMSTAR)
          →"<GETM>
          →<CAPITAL>(NAME2)<NAMLD1>*
          →ε(FLG1)

<NAMLD1>→<ALPMNUM>(PUSHM)<NAMLD1>
        →ε(NAMSTAR)

<MACRO>→}<PROG>
       →"<FINDQT><MACRO>
       →ε<MACRO>

<FINDEND>→]
          →[<FINDEND><FINDEND>
          →"<FINDQT><FINDEND>
          →ε<FINDEND>

<FINDQT>→"
        →.esc.<FINDQTESC>
```

```
        →ε<FINDQT>
<FINDQTESC>→ε<FINDQT>
<CALL>→ε(Link=ε,SAVEPT)(MRESET)<CALL2>
<CALL2>→(<CALL3>
        →"<FINDQT><CALL2>
        →ε<CALL2>
<CALL3>→ε(if ε = link then <PROG> else <CALL2>)
<D>→ɓ<D>
    →"<DQUOTE>
    →'(DFILE)<FILE><PROG>*
    →*(DMATCH)<D>
    →<(DLEFT)<D>
    →>(DRIGHT)<D>
    →<DIGIT>(DNUM)
    →ε(Restore stacks)<PROG>*
<DQUOTE>→"<D>
        →.esc.<DQESC>
<DQESC> →ε(DCUEXC)<DQUOTE>
<FILE>→<DIGIT>(LDGROUP)<FILE>*
      →*(DFSTAR)
      →η<NAMEFND>(if FAIL then <PROG>else (DFSTAR)<PROG>)
      →ε<NAMEFND>*(if FAIL then<PROG>else (DFSTAR)<PROG>)

<ALT>→"<ALTLOOP>
     →'<ALTCLASS>
     →ε(if ε = TOPM then FLGO) (COND)<ALTLOOP>→"<PROG>
<ALTLOOP>→"<PROG>
         →.esc.<ALTESC>
         →ε(if ε = TOPM then FLGO)<ALTLOOP>
<ALTESC> →ε(if ε = TOPM then FLGO)<ALTLOOP>

<ALTCLASS>→<DIGIT>(if TOPM = digit then FLGO)<PROG>
          →<CAPITAL>(if TOPM = capital then FLGO)<PROG>
          →<LOW>(if TOPM = low then FLGO)<PROG>
          →ε<PROG>
<MICRO>→"<MICROP>
       →ε<MICRO>
<MICROP>→"<PROG>
        →+<MICSYS>
        →.esc.<MICOPESC>
        →ε(SAVEOP)<MICDAT>
```

```
<MICDAT>→*(READM)(MICSND)<MKROP>
         →ε(MICEND)<MICROP>
         →.esc.<MICDESC>
<MICOPESC>→ε(SAVEOP)<MICDAT>
<MICDESC>→ε(MICSND)<MICROP>
<MICSYS>→ε<ε>
<ITEST>→<(IFL)<PROG>
        →>(IFR)<PROG>
        →*(IFM)<PROG>
        →5(IFDLU)<PROG>
        →W(IFWFB)<PROG>
        →+(IFPOS)<PROG>
        →-(IFNEG)<PROG>
        →=(IFEQ)<PROG>
        →F(IFFORM)<PROG>
        →ε<PROG>*

<LOAD>→d<LOADD>
      →s<LOADS>
      →<(LODL)<PROG>
      →>(LODR)<PROG>
      →ε(LOAD1)<PROG>

<LOADD>→ε(LOADD)(LOAD1)<PROG>
<LOADS>→ε(LOADS)(LOAD1)<PROG>

<NULL>→ƀ<NULL>
      →<(NULLL)<NULL>
      →>(NULLR)<NULL>
      →*(NULLM)<NULL>
      →ε<PROG>*

<RESTORE>→<(RSTRL)<PROG>
         →>(RSTRR)<PROG>
         →*(RSTRM)<PROG>
         →ε<PROG>

<MOVE>→ƀ<MOVE>
      →*<MOVEOP>
      →<(ONETOL)(MCOND)<MOVE>
      →>(ONETOR)(MCOND)<MOVE>
      →"<GETM><MOVEOP>
      →ε<PROG>*
```

```
<MOVEOP>→b̸<MOVEOP>
        →>(MOVER)(MCOND)<MOVE>
        →<(MOVEL)(MCOND)<MOVE>
        →ε<PROG>*

<GETM>→"
        →.esc.<GETESC>
        →ε(PUSHM)<GETM>
<GETESC>→ε(PUSHM)<GETM>

<STACKS>→b̸<STACKS>
        →,<STACKS>
        →><STAKR>
        →<<STAKL>
        →*<STAKOP>
        →"<GETM><LDM>
        →ε<PROG>*

<LDM>→b̸<LDM>
        →<(if LSTAK ≠ MSTAK then FLG1)<CMTL>
        →>(if RSTAK ≠ MSTAK then FLG1)<CMTR>
        →ε<STACK>*
<CMTR>→"(CLEARM)<GETM>(MTOR)<STACK>
        →ε<STACK>*
<CMTL>→"(CLEARM)<GETM>(MTOL)<STACK>
        →ε<STACK>*

<STAKOP>→<(if LSTACK ≠ MSTAK then FLG1)<CMTL>
        →>(if RSTAK ≠ MSTAK then FLG1)<CMTR>
        →ε(POPM)(MCOND)<STACK>
<STAKR>→b̸<STAKR>
        →"(CLEARM)<GETM><CMTR>
        →*<CMTR>
        →ε(POPR)(MCOND)<STACKS>*
<STAKL>→b̸<STAKL>
        →"(CLEARM)<GETM><CMTL>
        →*<CMTL>
        →ε(POPL)(MCOND)<STACKS>*
<LETSCAN>→b̸<LETSCAN>
        →,<LETSCAN>
        → <DIGIT>(LETDIG)<LETDIG2>
        → <CAPITAL>(LETCAP)
        → $<LETDOL>
        → =(LETEQ)<EQUAL>
```

```
      → >(LETRIGHT)
      → t<TIME>
      → @<LETAT>
      → +(LETADD)<LETSCAN>(ADDR2)<LETSCAN>
      → -(LETSUB)<LETSCAN>(SUBR)<LETSCAN>
      → *(LETSUB)<LETSCAN>(SUBR)<LETSCAN>
      →/(LETDIV)<LETSCAN>(DIV2)<LETSCAN>
      →  (LETMOD)<LETSCAN>(MOD2)<LETSCAN>
      →ε*(BACKMEM)

<LETDOL>→h(SETMODE)<BYTEIN>
      →ε(SETMODE)<LETDOL2>
<LETDOL2>→>(DOLIN)
      →<DIGIT>(DIGIN)<LETDOL2>
      →ε*(BACKMEM)(CTOQ)
<BYTEIN>→>(BSTAK)<BYTEIN>
      →ƀ(CTOQ)
      →ε(INNEU)<BYTEIN>

<EQUAL>→ƀ<EQUAL>
      →$<EQDOL>
      →<(BCDOUT)<EQUAL>
      →<CAPITAL>(EQCAP)<EQUAL>
      →@<EQAT>
      →ε<LETSCAN>*<LETSCAN>
<EQDOL>→ε(SETMODE)<EQDOL2>
<EQDOL2>→<(OUTL)<EQDOL2>
      →>(READNEU)<EQDOL2>
      →ε<EQUAL>*
<EQAT>→<(STORE at top LSTACK variable)<EQUAL>
      →ε(SOTRE at ε)<EQUAL>
<LETAT>→<(LOAD from top LSTACK variable)
      →ε(LOAD from ε)

<TIME>→x<TIME2>
      →ε(LOAD time in seconds)(BACKMEM)
<TIME2>→ε(LOAD time in ε units)

<LETDIG2>→<DIGIT>(INNEU)<LETDIG2>
      →ε(BACKMEM)(LOAD BINARY)

<SENSE>→>(SNAME = RSTAK)<SENEL>
      →ε(SNAME = ε)<SENSEL>
```

```
<SENSEL>→>(input = RSTAK)<SENSEL2>
        →ε<SENSEL2>*
<SENSEL2>→<SENSE-CLASS>(EXECUTE)<SENSEL>
        →ε<PROG>*

<WFB>→.del.(WFBDEL)<PROG>
    →*(WFBM: write WFB from MSTAK)<PROG>
    →I(WFBI: insert top MSTAK into WFB)<PROG>
    →+(WFBS1: save WFB point)<PROG>
    →-(WFBR1: restore WFB point)<PROG>
    →"<WFBQT>
    →ε<PROG>
<WFBQT>→"<PROG>
      →.esc.<WFBQT2>
      →ε<WFBQT2>*
<WFBQT2>→ε(WRITWF: write WFB)<WFBQT>

<LSTRING>→<LOW><LSTRING>
        →b̸<LSTRING2>
        →,<LSTRING2>
        →ε*
<LSTRING2 >→b̸<LSTRING2>
          →;<LSTRING2>
          →ε*
<USE>→ε<LSTRING><USE1>
<USE1>→"<USEQT>
      →ε<LSTRING><USECELLS>
      →ι(USEL)<LSTRING><FILE><PROG>*
      →>(USER)<FILE><PROG>*

<USEQT>→ε(SETSINK)"<FILE><PROG>*

<USECELLS>→"<LOADSTART>
          →ε<PROG>*

<LOADSTART>→ε(load initial load character)<USEC2>
<USEC2>→"<FILE><PROG>*
      →ε<PROG>*

<RERUN>→ε(HALT2)

<SENSE-CLASS>→<DIGIT>
             →,
             →>
```

APPENDIX P. SPOML GRAMMAR STATES AND ACTIONS

| | |
|---|---|
| <PROG> | The initial state for program execution; from this state, the basic statement types are selected and each clause (statement) returns to this state. |
| <BEGIN> | Is a class of characters which represents the first character of possible statement types. |
| <SKIPLABL> | Causes label names (a sequence of alphanumeric characters) to be skipped. |
| <CAPITAL> | The set of capital letters. |
| <LOOKUP> | Clause type selection is made by a lookup table which relates the first character in the clause name to the first rule for that clause. |
| (FLGO) | The FLG flag is used to determine sentence continuation; FLGO resets this flag. |
| (LET) | Clear the numerics accumulator. |
| (HALT) | Clears the match stack and deactivates processor activity. After processor is activated, input character is loaded into the match stack. |
| (END) | Drops the current point in the program location stack. |
| (DO) | Define beginning of a control sentence; save position on program stack; FLGO and clear the NOT condition. |
| (LETEG) | Transfer current accumulator value to the output register; set the FLG if the accumulator value is negative. |
| (COND) | Determines whether the current sentence is to be continued based upon the CONTinue signal. CONT = NOT ⊕ FLG |
| (MOVE1) | Move clause setup: clear FLG. |
| (BOOT) | Sets the file destination to be the program memory. |
| (SYSBT2) | Resets the program counter and halts the meta so that the new program can be received and executed. |

| | |
|---|---|
| (DISPLAY) | Save current stack contents in anticipation of displaying stack data. |
| (EXIT) | Return to previous control point and then skip to the end of that sentence. |
| (KBD) | Display the visual cursor and then halt. Upon receipt of input, push input onto match stack and then erase the visual cursor. |
| (OCTAL) | Shift the lower three bits of the current input into the top of match stack and push the result into the match stack. Three successive applications results in three successive characters being packed into one 8-bit character. |
| (REPEAT) | Use the location of the last defined sentence begin point and continue execution from that point. |
| (SENSE) | Set up processors for defining a sensitized point. |
| (MEND) | Return to calling point as defined by last entry in the program control stack. |
| (NOT) | Set the NOT condition for subsequent use in the COND action. |
| (FLG1) | Set the FLG condition. |
| <RETURN> | This state ensures that a clause return always causes that PROG state to be executed. |
| <NAME> | Allows lookup of a file name in a label table. |
| <NAMEFND> | Accepts a file name, possibly preceeded by a group number and associates that name with its address. |
| <NAMLD1> | Loads up the name portion for subsequent label lookup. |
| (NAMSTAR) | Performs the actual label lookup in the LABEL table. |
| <MACRO> | Skip the MACRO definition unless the MACRO is called. |
| <FINDEND> | Recursively finds the end of the current sentence, skipping lower level nested sentences. |
| <FINDQT> | Skip data parameter sequence portion of clauses when looking for control points. |

| | |
|---|---|
| <CALL> | Initiate MACRO call by first saving the calling point, recording the calling name and then set the program counter to zero. |
| <CALL2> | Finds the beginning of the next MACRO definition in the program memory. |
| <CALL3> | Determine if MACRO name is the one being looked for. If not, repeat CALL2 state. |
| <D> | Display interpreting state, determines the type of display operation to be performed. |
| (DFILE) | Setup for displaying disk file. |
| (DMATCH) | Display top character in the match stack. |
| (DLEFT) | Display next character in the left stack. |
| (DRIGHT) | Display next character in the right stack. |
| (DNUM) | Set display mode. |
| (DCUEXC) | Execute current display grammar with the current input character. |
| <DQUOTE> | Immediate data string for display. |
| <FILE> | Finds the absolute address of a disk file and performs the data transfer to the previously defined destination. |
| (LDGROUP) | Load up the label table required. |
| (DFSTAR) | Set the file address and initiate file transfer. |
| <ALT> | Allows comparison of immediate data to the top of the match stack to determine if the current sentence is to be continued. |
| <ALTLOOP> | Determines if the match character is one of a set of characters. |
| <ALTCLASS> | Determine if the match character is a member of a predefined class of characters, DIGIT, CAPITAL or LOW. |
| <MICRO> | Allow execution of inter-processor instructions. |

<MICROP> Finds the instruction operation code.

<MICDAT> Finds the data portion of the instruction.

(MICSND) Send out the instruction.

<MICSYS> Execute syntax state given by micro command.

<ITEST> Allows checking of various machine conditions.

(IFL) Test for the left stack empty or full.

(IFR) Test for the right stack empty or full.

(IFM) Test match stack empty or full.

(IFDLU) Test for MSB counter at count zero.

(IFWFB) Test for WFB counter overflow.

(IFFORM) Test for File read/write error.

<LOAD> Allows loading various register values into the match stack.

(LODL) Load top of left onto match stack.

(LODR) Load top of right stack onto match stack.

(LOAD1) Use $\epsilon$ as read instruction op-code for loading data into match stack.

<LOADD> Load cursor value part into the match stack.

<LOADS> Load sense point data part into the match stack.

<NULL> Allows clearing one or more of the computing stacks.

(NULLL) Clear left stack.

(NULLR) Clear right stack.

(NULLM) Clear match stack.

<RESTORE> Allow restoration of data in one or more stacks after a move operation.

| | |
|---|---|
| (RSTRL) | Restore left stack data. |
| (RSTRR) | Restore right stack data. |
| (RSTRM) | Restore match stack data. |
| <MOVE> | Move the data from one stack into another. |
| (ONETOL) | Move one character from the right stack into the left stack. |
| (ONETOR) | Move one character from the left stack into the right stack. |
| (MCOND) | Set FLG condition if stack becomes full or empty. |
| (MOVER) | Move data from left to right stack until string on match is found. |
| <GETM> | Load a data string into the match stack. |
| <STACKS> | Clause allows manipulation of the head of a computing stack. |
| <LDM> | Compare match string with head of stack contents. |
| <CMTR> | Load data string into RSTAK if comparison. |
| <CMTL> | Load data string into LSTAK if comparison. |
| <STAKOP> | Determines whether operation is to be performed on the left, right or match stack. |
| <STAKR> | Push data on the right stack. |
| <STAKL> | Push data on the left stack. |
| <LETSCAN> | Major state for numerics operations: selects arithmetic operations and loading the accumulator register. |
| (LETDIG) | Load digit into conversion register. |
| (LETCAP) | Load numerics variable from memory into the accumulator. |
| (LETEQ) | Transfer accumulator value to output register: set FLG if value is negative. |
| (LETRIGHT) | Take a string of BCD characters from the right stack, convert to binary and load into the accumulator. |

| | |
|---|---|
| (LETADD) | Transfer R register to Q and set up for add. |
| (ADDR2) | R←R+Q (add result left in the accumulator). |
| (LETSUB) | Q←R, subtract setup. |
| (SUBR) | R←Q−R. |
| (LETMUL) | Q←D, multiply setup. |
| (MUL2) | D←D*Q. |
| (LETDIV) | Q←D, divide setup. |
| (DIV2) | D←Q/D. |
| (LETMOD) | Q←D, modulus function setup. |
| (MOD2) | D← remainder of Q/D. |
| <LETDOL> | Allows loading accumulator using binary, octal or byte data strings. |
| (SETMODE) | Set data input/read mode. |
| <LETDOL2> | Load accumulator with converted string from the right stack or from immediate program data. |
| <BYTEIN> | Load accumulator with 8-bit words. |
| (CTOQ) | Load accumulator from conversion register. |
| (DIGIN) | Load next character into conversion register. |
| <EQUAL> | Allows read out or storage of accumulator register results. |
| (BCDOUT) | Convert the accumulator value to a BCD character string and push into the left stack. |
| (EQCAP) | Store accumulator value into a memory variable location. |
| <EQDOL> | Allow output of data as binary, octal or byte string. |
| <EQDOL2> | Load character into left stack. |

| | |
|---|---|
| <EQAT> | Allow storing indirectly using left stack character as the address or store into system variables. |
| <LETAT> | Load accumulator from system variable or indirectly using left stack character as the address. |
| <TIME> | Allows loading the accumulator with the current value of the real time clock. |
| <TIME2> | Load time using scale factor. |
| <LETDIG2> | Convert immediate decimal data string to binary and load into the accumulator. |
| <SENSE> | Accepts program data string for defining a sensitized point and issues to the CPU processor for table loading. |
| <WFB> | Allows manipulation of data in the working file buffer processor. |
| <WFBQT> | Writes string of characters from the program into the WFB. |
| (WFBM) | Write WFB from character in the match stack. |
| (WFBI) | Insert character from match stack into the WFB. |
| (WFBS) | Save current WFB location on the WFB stack. |
| (WFBR) | Restore last WFB location. |
| (WFBDEL) | Delete character from WFB memory. |
| <LSTRING> | Allows shipping over lower case letter string which completes the spelling out of a word; also skips blanks and commas. |
| <USE> | Allows loading of disk file into the cells memory, WFB, right stack or left stack. |
| (USEL) | Select label stack for use vice the right stack. |
| (USER) | Select the right stack for use. |
| <USEQT> | Find the destination of disk file data. |
| <USECELLS> | Find initial character location for loading cells. |

<USEC2> Load a table of display cells from the disk.

<RERUN> Causes the match stack to be loaded either with the character given or a keyboard/pen input character if a new entry has been received.

<LOW> Definition of LOW set of characters.

<DIGIT> Set of digit characters.

<SENSE-CLASS> Set of sensitized string characters.

<ALPHANUM> Set of alphanumeric characters.

APPENDIX Q. SELF INSTRUCTION SEQUENCE CODING FOR AN EXEMPLARY METAPROCESSOR

```
                     *
                     *     INTERPRETER COMMUNICATION
                     *
0 000   154 117      MR        PUSH     RETURN
0 001   111 063                PASS     LINKFORM
0 002   166 010                NCHAR    '%BS'     IF BS, RE-RUN PROGRAM
0 003   140 100                JUMP     PSTAPT
0 004   166 033                NCHAR    '%FSC'    IF ESC, BOOT ABSOLUTE
0 005   140 024                JUMP     MRESC
0 006   166 002                NCHAR    '%STX'    IF STX, LOAD PMEM DIRE
0 007   140 030                JUMP     MRSTX
                     *  BOOT SYSTEM PROGRAM
0 010   121 004      SYSBOOT   DATA     004   DISK GROUP
0 011   111 045                PASS     SELECTG
0 012   121 014                DATA     014       DISK ADDRESS
0 013   111 046      SYSBT1    PASS     LOADADRS
0 014   121 304                DATA     0304      DISC
0 015   111 174                PASS     SOURCE    SET FORM STATE 1
0 016   121 041                DATA     041       PMEM
0 017   111 172                PASS     SINK      SET FORM STATE 2
0 020   111 170                PASS     FORMEXC
0 021   111 342      SYSBT2    PASS     RESET
0 022   174 156                HALT
0 023   140 100                JUMP     PSTART
                     *
0 024   144 060      MRESC     CALL     EHALT     ABSOLUTE PROGRAM BOOT
0 025   111 045                PASS     SELECTG
0 026   144 060                CALL     EHALT
0 027   140 013                JUMP     SYSBT1
0 030   111 020      MRSTX     PASS     '%DLE'
0 031   111 342                PASS     RESET
0 032   144 060      MRSTX2    CALL     EHALT
0 033   111 002                PASS     '%STX'
0 034   110 345                PASW     LOADPM
0 035   110 346                PASW     WRITE
0 036   111 352                PASS     ADVANCE
0 037   140 032                JUMP     MRSTX2

 LOC    CODE

                               EJECT
                     *
                     *  INSTRUCTION LOOKUP TABLE -- SPECIAL
                     *  CHARACTERS AND NUMERICS
                     *
0 040                          ORG      040
0 040   140 103                JUMP     PROG        ( )
0 041   142 071                JUMP     STACKS    (!)
0 042   141 063                JUMP     DENTRY    QUOTE
0 043   142 170                JUMP     LET         (#)
0 044   142 276                JUMP     EQDOL
0 045   142 017                JUMP     RESTORE     x
```

```
0 046   147 346    TRANS     CALL      LSTRING
0 047   145 035              CALL      CALL+1
0 050   111 362              PASS      POPS
0 051   140 103              JUMP      PROG
0 052   143 010              JUMP      LETMUL
0 053   143 000              JUMP      LETADD  (+)
0 054   140 103              JUMP      PROG      ,
0 055   143 106              JUMP      LETSUB  (-)
0 056   140 121              JUMP      HALT    .
0 057   143 017              JUMP      LETDIV
                   *
0 060   111 105    EHALT     PASS      ENABLE    ENABLE KBD,PEN,
0 061   174 156              HALT      HALT, AND
0 062   151 144              NRET      NONE      RETURN WITH DATA
0 063   143 377              JUMP      01777
0 064   120 141    NUMLOOK   LOAD      PMEM
0 065   127 000              EXEC
0 066   100 000              NOP 6
0 067   114 352    MICSYS  SCNW        ADVANCE
0 070   111 352              PASS      ADVANCE
0 071   127 000              EXEC
0 072   140 370              JUMP      END       :
0 073   140 103              JUMP      PROG        ;
0 074   100 000              NOP <
0 075   142 252              JUMP      LETEQ      =
0 076   100 000              NOP >
0 077   141 021              JUMP    COND        ?
 LOC     CODE
                             EJECT
                   *
0 100   111 342    PSTART    PASS      RESET     START OF PROGRAM
0 101   110 347              PASW      READ
0 102   140 104              JUMP      PROG+1
0 103   110 352    PROG      PASW      ADVANCE
0 104   120 141              LOAD      PMEM      READ PMEM
0 105   160 150              SKIP      CHECK
0 106   111 002              PASS      'XSTX'
0 107   164 145              NCLASS    BEGIN
0 110   127 000              EXEC                IF A VALID STMT, EXECU
0 111   164 142              NCLASS    LMW
0 112   127 000              EXEC
0 113   140 103              JUMP      PROG
                   *
0 114   146 061    NAMQUOT   CALL      GETM
0 115   114 352              SCNW      ADVANCE
0 116   151 144              NRET      NONE
                   *
0 117   154 117    RETURN    PUSH      RETURN
0 120   140 103              JUMP      PROG
                   *
0 121   111 241    HALT      PASS      CLEARM    CLEAR MATCH STACK
0 122   144 060              CALL      EHALT     ENABLE INPUTS AND HALT
0 123   110 244              PASW      PUSHM     PUSH INPUT ON MATCH ST
0 124   151 144              NRET      NONE
                   *
0 125   100 000              NOP
0 126   111 053    CLEARF    PASS      FRMCLR
0 127   111 063              PASS      LINKFORM
0 130   121 254              DATA      ','
0 131   111 177              PASS      FORMSUP
0 132   151 144              NRET      NONE
 LOC     CODE
                             EJECT
                   *
                   *  INSTRUCTION LOOKUP TABLE
                   *
0 133   140 364              JUMP      OR     3!  OBK
0 134   143 026              JUMP      LETMOD
0 135   140 370              JUMP      END       CRK
0 136   142 025              JUMP      MOVF1
0 137   142 002              JUMP      NULL  -
0 140   100 000              NOP '
0 141   140 202              JUMP      APPEND
0 142   140 200              JUMP      BRMT  B
0 143   141 034              JUMP      CALL  C
0 144   141 062              JUMP      DEF
0 145   141 016              JUMP      EXIT  E
0 146   143 255              JUMP      RERUN  F
0 147   143 357              JUMO      GET
0 150   140 103              JUMP      PROG
0 151   141 261              JUMP      ITEST I
0 152   100 000              NOP J
0 153   143 117              JUMP KBD               K
```

```
0 154   141 345                    JUMP      LOAD  L
0 155   141 233                    JUMP      MICRO
0 156   140 216                    JUMP      NAME
0 157   141 225                    JUMP    OCTAL   O
0 160   143 370                    JUMP       PUT
0 161   140 103                    JUMP       PROG
0 162   141 055                    JUMP      REP    R
0 163   143 142                    JUMP      SENSE
0 164   140 046                    JUMP       TRANS
0 165   143 267                    JUMP      USE
0 166   140 103                    JUMP PROG     VVV
0 167   143 165                    JUMP      MFB
0 170   147 346        DELOO       CALL       LSTRING
0 171   141 035                    JUMP       CALL+1
0 172   100 000                    NOP 2
0 173   140 374                    JUMP      MACRO
0 174   141 156                    JUMP      ALT     I
0 175   141 002                    JUMP      MEND
0 176   174 145        NOT         MICRO     'E'
0 177   140 103                    JUMP      PROG
  LOC     CODE
                                     EJECT
                       *
0 200   144 210        BOOT1       CALL       BOOT2
0 201   140 021                    JUMP       SYSBT2
0 202   144 210        APPEND      CALL       BOOT2
0 203   147 346                    CALL       LSTRING
0 204   145 035                    CALL       CALL+1
0 205   111 350                    PASS       PACKMEM
0 206   174 156                    HALT
0 207   141 002                    JUMP       MEND
0 210   121 041        BOOT2       DATA       0041
0 211   174 150                    MICRO      LDNUM
0 212   147 346                    CALL       LSTRING
0 213   144 267                    CALL       FILE+1
0 214   151 147                    NRET       FAIL
0 215   140 117                    JUMP       RETURN
                       *
0 216   154 104        NAME        PUSH     PROG+1
0 217   147 346                    CALL       LSTRING
0 220   174 146        NAMEFND     MICRO     FLG0
0 221   111 063                    PASS       LINKFORM
0 222   164 140                    NCLASS    DIGIT
0 223   144 316                    CALL      LOGROUP
0 224   166 052                    NCHAR     '*'
0 225   140 252                    JUMP      NAMSTAR
0 226   166 042                    NCHAR     '"'
0 227   140 114                    JUMP     NAMQUOT
0 230   166 100                    NCHAR      0100      AT
0 231   140 236                    JUMP       TWOLEVEL
0 232   164 141                    NCLASS    CAPITAL
0 233   140 245                    JUMP      NAME2
0 234   174 147                    MICRO     FLG1
0 235   151 144                    NRET      NONE
0 236   144 217        TWOLEVEL    CALL       NAME+1
0 237   150 147                    RET        FAIL
0 240   110 325                    PASW       READM
0 241   120 143                    LOAD       SEM
0 242   144 320                    CALL       GTABLE+1
0 243   147 346                    CALL       LSTRING
0 244   140 220                    JUMP       NAMEFND
0 245   111 241        NAME2       PASS      CLEARM
0 246   111 244        NAMLD1      PASS      PUSHM
0 247   114 352                    SCNR       ADVANCE
0 250   164 147                    NCLASS    ALPHNUM
0 251   140 246                    JUMP      NAMLD1
0 252   121 000        NAMSTAR     DATA     '%NUL'
0 253   111 244                    PASS       PUSHM
0 254   111 274        LSEARCH     PASS      USEL
0 255   110 311                    PASW      MOVEL
0 256   161 157                    NSKIP     SEM
0 257   174 147                    MICRO     FLG1
0 260   110 326                    PASW      READR
0 261   120 143                    LOAD      SEM
0 262   111 273                    PASS      USER
0 263   111 241                    PASS      CLEARM
0 264   111 244                    PASS      PUSHM
0 265   151 144                    NRET      NONE
  LOC     CODE
                                   EJECT
0 266   114 352        FILE        SCNR      ADVANCE
0 267   174 146                    MICRO     FLG0
0 270   111 063                    PASS       LINKFORM
```

```
 0 271  164 140            NCLASS   DIGIT
 0 272  144 316            CALL     LDGROUP
 0 273  166 146            NCHAR    'F'
 0 274  143 336            JUMP     FROM
 0 275  166 052            NCHAR    '*'
 0 276  140 304            JUMP     DFSTAR
 0 277  166 156            NCHAR    'N'
 0 300  114 352            SCNW     ADVANCE
 0 301  144 220            CALL     NAMEEND
 0 302  161 147            NSKIP    FAIL
 0 303  151 144            NRET     NONE
 0 304  110 325  DFSTAR    PASW     READM
 0 305  120 143            LOAD     SEM
 0 306  111 046            PASS     LOADADRS
 0 307  144 126            CALL     CLEARF
 0 310  121 304            DATA     0304      DISK
 0 311  111 174            PASS     SOURCE
 0 312  120 150            LOAD     LINK
 0 313  111 172            PASS     SINK
 0 314  111 170            PASS     FORMEXC
 0 315  151 144            NRET     NONE
                 *
 0 316  111 045  LDGROUP   PASS     SELECTG
 0 317  121 000  GTABLE    DATA     000
 0 320  111 063            PASS     LINKFORM
 0 321  111 046            PASS     LOADADRS
 0 322  121 304            DATA     0304
 0 323  111 174            PASS     SOURCE    DISK
 0 324  121 375            DATA     0375
 0 325  111 172            PASS     SINK      DLU
 0 326  144 126            CALL     CLEARF
 0 327  111 170            PASS     FORMEXC   LOAD TABLE INTO DLU
 0 330  111 274            PASS     USEL
 0 331  144 336            CALL     DTOL      LOAD TABLE INTO LABEL
 0 332  111 273            PASS     USER
 0 333  114 352            SCNW     ADVANCE
 0 334  111 063            PASS     LINKFORM
 0 335  151 144            NRET     NONE
                 *
                 *    LOAD DLU TO RIGHT STACK
                 *
 0 336  110 074  DTOL      PASW     DNSCTR
 0 337  110 060            PASW     LINKRAM
 0 340  111 261            PASS     CLEARR
 0 341  120 144            LOAD     DLU
 0 342  165 200            CHAR     '%NUL'
 0 343  141 227            JUMP     DTOL4
 0 344  111 264            PASS     PUSHR
 0 345  110 074  DTOL2     PASW     DNSCTR
 0 346  150 145            RET      DLU
 0 347  162 200            NCHARX   DLU
 0 350  140 345            JUMP     DTOL2
 0 351  141 225            JUMP     DTOL3
 0 352  100 000            NOP
 0 353  100 000            NOP
 0 354  100 000            NOP
 0 355  100 000            NOP
                 *
  LOC    CODE
                           EJECT
                 *
 0 356  111 361  SAVEPT    PASS     PUSHS
 0 357  111 355            PASS     KDROW
 0 360  111 357            PASS     STROW
 0 361  111 356            PASS     KDCOL
 0 362  111 360            PASS     STCOL
 0 363  151 144            NRET     NONE
 0 364  144 356  DS        CALL     SAVEPT
 0 365  174 146            MICRO    FLGO
 0 366  174 144            MICRO    NOTO
 0 367  140 103            JUMP     PROG
                 *
 0 370  110 362  END       PASW     POPS
 0 371  160 142            SKIP     'B'
 0 372  140 103            JUMP     PROG
 0 373  140 000            JUMP     MR
                 *
 0 374  114 352  MACRO     SCNW     ADVANCE
 0 375  166 175            NCHAR    0175
 0 376  140 103            JUMP     PROG
 0 377  166 042            NCHAR    '"'
 1 000  145 026            CALL     FINDGT
 1 001  140 374            JUMP     MACRO
                 *
 1 002  111 353  MENU      PASS     KEPROW
 1 003  111 354            PASS     KEPCOL
 1 004  111 362            PASS     
```

```
LOC      CODE
                                EJECT
                        *
1 006   114 352         FINDEND SCNW       ADVANCE
1 007   166 135                 NCHAR     '%CBK'
1 010   151 144                 NRET      NONE
1 011   166 133                 NCHAR     '%MRK'
1 012   155 006                 PUSH      FINDEND  RECURSIVE
1 013   166 042                 NCHAR     '"'
1 014   145 026                 CALL      FINDQT
1 015   141 006                 JUMP      FINDEND
                        *
1 016   145 002         EXIT    CALL      MEND
1 017   145 006                 CALL      FINDEND
1 020   140 103                 JUMP      PROG
                        *
1 021   161 156         COND    NSKIP      CONT
1 022   140 103                 JUMP      PROG
1 023   145 006                 CALL     FINDEND
1 024   111 362                 PASS       PROPS
1 025   140 103                 JUMP      PROG
                        *
1 026   114 352         FINDQT  SCNW       ADVANCE
1 027   166 042                 NCHAR     '"'
1 030   151 144                 NRET      NONE
1 031   166 033                 NCHAR     '%ESC'
1 032   111 352                 PASS      ADVANCE
1 033   141 026                 JUMP      FINDQT
                        *
1 034   114 352         CALL    SCNW       ADVANCE
1 035   174 150                 MICRO     LONUM    SAVE CALL NAME
1 036   144 356                 CALL      SAVEPT
1 037   111 341                 PASS      PRESET
1 040   114 347                 SCNW      READ
1 041   141 043                 JUMP      CALL2+1
1 042   114 352         CALL2   SCNW       ADVANCE
1 043   166 173                 NCHAR     0173     LOOK FOR
1 044   141 050                 JUMP      CALL3
1 045   166 042                 NCHAR     '"'
1 046   145 026                 CALL      FINDQT   SKIP OVER QUOTED STRIN
1 047   141 042                 JUMP      CALL2
1 050   120 150         CALL3   LOAD      LINK
1 051   110 352                 PASW      ADVANCE
1 052   163 141                 CHARX     PMEM     DOES LAVEL MATCH?
1 053   141 043                 JUMP       CALL2+1
1 054   151 144                 NRET       NONE
                        *
1 055   111 353         REP     PASS       REPROW
1 056   111 354                 PASS       REPCOL
1 057   174 146                 MICRO     FLGO
1 060   174 144                 MICRO      NOTO

   LOC      CODE
  1 061   140 103
                                  JUMP       PROG
```

```
LOC      CODE
                                EJECT
1 062   114 352         DEL     SCNW       ADVANCE
1 063   111 063         DELNTRY PASS       LINKFORM
1 064   166 157                 NCHAR      'O'
1 065   140 170                 JUMP       DELOB
1 066   166 151                 NCHAR      'I'
1 067   141 115                 JUMP       DI
1 070   111 252         DISPLAY PASS      SAVEL
1 071   111 262                 PASS      SAVER
1 072   111 350                 PASS       BACKMEM
1 073   114 352         D       SCNW       ADVANCE
1 074   166 040                 NCHAR     ' '
1 075   141 073                 JUMP      D
1 076   166 042                 NCHAR      '"'
1 077   141 121                 JUMP      DQUOTE
1 100   166 140                 NCHAR     0140
1 101   141 130                 JUMP      DFILE
1 102   166 052                 NCHAR     '*'
1 103   141 134                 JUMP      DMATCH
1 104   166 074                 NCHAR     '<'
1 105   141 140                 JUMP      DLEFT
1 106   166 076                 NCHAR     '>'
1 107   141 146                 JUMP      DRIGHT
1 110   164 060                 NCLASS     '0'
1 111   141 154                 JUMP      DNUM
```

```
1 112   111 253            PASS      KSTRL
1 113   111 263            PASS      KSTRR
1 114   140 104            JUMP      PROG+1
1 115   147 346   D1       CALL       LSTRING
1 116   121 060            DATA       '0'
1 117   111 151            PASS       DCUSET
1 120   141 070            JUMP       DISPLAY
                  *
1 121   114 352   DQUOTE   SCNW       ADVANCE
1 122   166 042            NCHAR     '"'
1 123   141 073            JUMP      D
1 124   166 033            NCHAR     'XESC'
1 125   114 352            SCNW       ADVANCE
1 126   111 150            PASS      DCUEXC
1 127   141 121            JUMP      DQUOTE
1 130   121 124   DFILE    DATA      O124        TRANSLATE SINK
1 131   174 150            MICRO     LDNUM
1 132   144 266            CALL      FILE
1 133   140 104            JUMP      PROG+1
                  *
                  *
1 134   110 325   DMATCH   PASW       READM
1 135   120 143            LOAD      SEM
1 136   111 150            PASS      DCUEXC
1 137   141 073            JUMP    D
 LOC     CODE
1 140   110 327   DLEFT    PASW     READL
1 141   120 143            LOAD      SEM
1 142   160 153            SKIP     EMPTY
1 143   111 150            PASS      DCUEXC
1 144   111 256            PASS     POPL
1 145   141 073            JUMP      D
1 146   110 326   DRIGHT   PASW      READR
1 147   120 143            LOAD      SEM
1 150   160 153            SKIP      EMPTY
1 151   111 150            PASS      DCUEXC
1 152   111 266            PASS    POPR
1 153   141 073            JUMP    D
1 154   111 151   DNUM     PASS       DCUSET
1 155   141 073            JUMP      D

 LOC     CODE
                           EJECT
                  *
                  *  ALTERNATIVES  INSTRUCTION
                  *
1 156   174 147   ALT      MICRO     FLG1
1 157   114 352            SCNW     ADVANCE
1 160   110 325            PASW     READM
1 161   166 042            NCHAR     '"'
1 162   141 171            JUMP      ALTLOOP
1 163   166 140            NCHAR      0140
1 164   141 202            JUMP      ALTCLASS
1 165   110 324   ALTIM    PASW       SEMEQ
1 166   160 157            SKIP      SEM
1 167   174 146            MICRO     FLG0
1 170   141 021            JUMP      CAND
1 171   114 352   ALTLOOP  SCNW       ADVANCE
1 172   166 042            NCHAR     '"'
1 173   140 103            JUMP      PROG
1 174   166 033            NCHAR     'XESC'
1 175   114 352            SCNW      ADVANCE
1 176   110 324            PASW       SEMEQ
1 177   160 157            SKIP      SEM
1 200   174 146            MICRO     FLG0
1 201   141 171            JUMP      ALTLOOP
1 202   114 352   ALTCLASS SCNW       ADVANCE
1 203   164 141            NCLASS    CAPITAL
1 204   141 215            JUMP      ALTCAP
1 205   164 142            NCLASS    LOW
1 206   141 221            JUMP      ALTLOW
1 207   165 140            CLASS     DIGIT
1 210   140 103            JUMP      PROG
1 211   120 143   ALTDIG   LOAD      SEM
1 212   164 140            NCLASS    DIGIT
1 213   174 146            MICRO     FLG0
1 214   140 103            JUMP      PROG
1 215   120 143   ALTCAP   LOAD      SEM
1 216   164 141            NCLASS    CAPITAL
1 217   174 146            MICRO     FLG0
1 220   140 103            JUMP      PROG
1 221   120 143   ALTLOW   LOAD      SEM
1 222   164 142            NCLASS    LOW
1 223   174 146            MICRO     FLG0
1 224   140 103            JUMP      PROG
```

```
LOC      CODE
                             EJECT
                  *
                  *
                  *
1 225    120 144  DTOL3      LOAD     DLU
1 226    111 264             PASS     PUSHR
1 227    110 074  DTOL4      PASW     DNSCTR
1 230    150 145             RET      DLU
1 231    141 225             JUMP     DTOL3
1 232    100 000             NOP
                  *
                  *. DIRECT SEQUENCE INSTRUCTION
                  *
1 233    114 352  MICRO      SCNW      ADVANCE
1 234    167 042             CHAR     '*'
1 235    141 233             JUMP     MICRO
1 236    114 352  MICROP     SCNW      ADVANCE
1 237    166 042             NCHAR    '*'
1 240    140 103             JUMP     PROG
1 241    166 053             NCHAR    '+'
1 242    140 067             JUMP      MICSYS
1 243    166 033             NCHAR    '%ESC'
1 244    114 352             SCNW      ADVANCE
1 245    174 150             MICRO    LONUM       SAVE MP IN LINK REG
1 246    114 352             SCNW      ADVANCE
1 247    166 033             NCHAR    '%ESC'
1 250    114 352             SCNW      ADVANCE
1 251    166 052             NCHAR    '*'
1 252    141 256             JUMP      MICSTR
1 253    125 150  MICSND    LOADP      LINK
1 254    105 000             DIRECT
1 255    141 236             JUMP     MICROP
1 256    110 325  MICSTR    PASW       READM
1 257    120 143             LOAD     SEM
1 260    141 253             JUMP      MICSND
LOC      CODE
                             EJECT
                  *
                  *    IF INSTRUCTION ... LITTLE I
                  *
1 261    174 146  ITEST       MICRO   FLG0
1 262    147 346             CALL     LSTRING
1 263    166 074             NCHAR    '<'
1 264    141 312             JUMP     IFL
1 265    166 076             NCHAR    '>'
1 266    141 320             JUMP     IFR
1 267    166 065             NCHAR    '5'
1 270    141 322             JUMP     IFDLU
                             CAP
1 271    166 127             NCHAR    'W'
                             LOW
1 272    141 325             JUMP     IFWFR
1 273    166 052             NCHAR    '*'
1 274    141 331             JUMP     IFM
                         CAP
1 275    166 106             NCHAR    'F'
                         LOW
1 276    141 306             JUMP     IFFORM
1 277    146 311             CALL      OOTOR
1 300    110 305             PASW      NEGTEST
1 301    166 053             NCHAR    '+'
1 302    141 337             JUMP     IFPOS
1 303    166 055             NCHAR    '-'
1 304    141 334             JUMP     IFNEG
1 305    141 333             JUMP     IFEQ
                  *
1 306    110 171  IFFORM     PASW      FORMNOP
1 307    161 154             NSKIP    FORM
1 310    174 147             MICRO    FLG1
1 311    140 103             JUMP     PROG
1 312    110 327  IFL        PASW      READL
1 313    161 152             NSKIP    FULL
1 314    174 147             MICRO    FLG1
1 315    161 153             NSKIP    EMPTY
1 316    174 147             MICRO    FLG1
1 317    141 376             JUMP     LODL+1
1 320    110 326  IFR        PASW      READR
1 321    141 313             JUMP     IFL+1
1 322    161 145  IFDLU      NSKIP    DLU
1 323    174 147             MICRO    FLG1
```

```
1 324   140 103              JUMP      PROG
1 325   110 176    IFNFB     PASW    LOWFB
1 326   161 154              NSKIP     FPRM
1 327   174 147              MICRO    FLG1
1 330   140 103              JUMP      PROG
1 331   110 325    IFN       PASW      READM

 LOC     CODE
1 332   141 313              JUMP      IFL+1
1 333   110 306    IFEQ      PASW      EQTEST
1 334   161 157    IFNEG     NSKIP     SEM
1 335   174 147              MICRO     FLG1
1 336   140 103              JUMP      PROG
1 337   160 157    IFPOS     SKIP      SEM
1 340   174 147              MICRO     FLG1
1 341   110 306              PASW      EQTEST
1 342   160 157              SKIP      SEM
1 343   174 147              MICRO     FLG1
1 344   140 103              JUMP      PROG



 LOC     CODE
                              EJECT
                   *
                   *   LOAD INSTRUCTION
                   *
1 345   111 063    LOAD       PASS       LINKFORM
1 346   114 352               SCNW       ADVANCE
1 347   166 144               NCHAR      'D'
1 350   141 364               JUMP       LOADD
1 351   166 163               NCHAR      'S'
1 352   141 371               JUMP       LOADS
1 353   166 074               NCHAR      '<'
1 354   141 375               JUMP       LODL
1 355   166 076               NCHAR      '>'
1 356   142 000               JUMP       LODR
1 357   110 177    LOAD1      PASW      FORMSUB
1 360   110 070               PASW       DLUNCP
1 361   120 144               LOAD       DCU
1 362   111 244               PASS       PUSHM
1 363   140 103               JUMP       PROG
1 364   114 352    LOADD      SCNW       ADVANCE
1 365   111 177               PASS      FORMSUB
1 366   110 154               PASW       DCUREAD
1 367   110 065               PASW       LINKDCU
1 370   141 360               JUMP      LOAD1+1
1 371   114 352    LOADS      SCNW       ADVANCE
1 372   111 177               PASS      FORMSUB
1 373   174 156               HALT
1 374   141 362               JUMP       LOAD1+3
1 375   110 327    LODL       PASW       READL
1 376   120 143               LOAD      SEM
1 377   141 362               JUMP       LOAD1+3
2 000   110 326    LODR       PASW       READR
2 001   141 376               JUMP       LODL+1
 LOC     CODE
                              EJECT
                   *
                   *   NULL STATEMENT
                   *
2 002   114 352    NULL       SCNW       ADVANCE
2 003   166 074               NCHAR      '<'
2 004   142 013               JUMP       NULLL
2 005   166 076               NCHAR      '>'
2 006   142 015               JUMP       NULLR
2 007   167 052               CHAR       '*'
2 010   140 104               JUMP       PROG+1
2 011   111 241    NULLM      PASS       CLEARM
2 012   142 002               JUMP       NULL
2 013   111 251    NULLL      PASS       CLEARL
2 014   142 002               JUMP       NULL
2 015   111 261    NULLR      PASS       CLEARR
2 016   142 002               JUMP       NULL
                   *
                   *   RESTORE STATEMENT
                   *
2 017   114 352    RESTORE SCNW          ADVANCE
2 020   166 074               NCHAR      '<'
2 021   111 253               PASS       RSTRL
2 022   166 076               NCHAR      '>'
2 023   111 263               PASS       RSTRR
2 024   140 103               JUMP       PROG
```

```
LOC     CODE
                               EJECT
                      *
                      *  MOVE  STATEMENT
                      *
2 025  111 252        MOVE1    PASS     SAVEL
2 026  111 262                 PASS     SAVER
2 027  174 146        MOVE     MICRO    FLGO
2 030  114 352                 SCNW      ADVANCE
2 031  166 052                 NCHAR    '*'
2 032  142 042                 JUMP     MOVEOP
2 033  166 074                 NCHAR    '<'
2 034  142 055                 JUMP     ONEL
2 035  166 076                 NCHAR    '>'
2 036  142 057                 JUMP     ONER
2 037  167 042                 CHAR     '*'
2 040  140 104                 JUMP     PROG+1
2 041  146 061        MIM      CALL     GETM
2 042  114 352        MOVEOP   SCNW      ADVANCE
2 043  166 076                 NCHAR    '>'
2 044  142 053                 JUMP     MOPR
2 045  167 074                 CHAR     '<'
2 046  140 104                 JUMP     PROG+1
2 047  110 311        MOPL     PASW     MOVEL
2 050  161 157                 NSKIP    SEM
2 051  174 147                 MICRO    FLG1
2 052  142 030                 JUMP     MOVE+1
2 053  110 310        MOPR     PASW     MOVER
2 054  142 050                 JUMP     MOPL+1
2 055  110 317        ONEL     PASW     ONETOL
2 056  142 050                 JUMP     MOPL+1
2 057  110 316        ONER     PASW     ONETOR
2 060  142 050                 JUMP     MOPL+1
                      *
                      *  LOAD MATCH STACK ROUTINE
                      *
2 061  111 241        GETM     PASS     CLEARM
2 062  114 352                 SCNW      ADVANCE
2 063  166 042                 NCHAR    '*'
2 064  151 144                 NRET     NONE
2 065  166 033                 NCHAR    '%ESC'
2 066  114 352                 SCNW      ADVANCE
2 067  111 244                 PASS     PUSHM
2 070  142 062                 JUMP     GETM+1

LOC     CODE
                               EJECT
                      *
                      *  STACKS STATEMENT
                      *
2 071  174 146        STACKS   MICRO    FLGO
2 072  114 352                 SCNW      ADVANCE
2 073  166 040                 NCHAR    ' '
2 074  142 072                 JUMP     STACKS+1
2 075  166 054                 NCHAR    ','
2 076  142 072                 JUMP     STACKS+1
2 077  166 076                 NCHAR    '>'
2 100  142 150                 JUMP     STAKR
2 101  166 074                 NCHAR    '<'
2 102  142 161                 JUMP     STAKL
2 103  166 052                 NCHAR    '*'
2 104  142 141                 JUMP     STAKOP
2 105  167 042                 CHAR     '*'
2 106  140 104                 JUMP     PROG+1
2 107  146 061        LDM      CALL     GETM
2 110  114 352                 SCNW      ADVANCE
2 111  166 074                 NCHAR    '<'
2 112  142 127                 JUMP     CMTL
2 113  167 076                 CHAR     '>'
2 114  142 073                 JUMP     STACKS+2
2 115  110 314        CMTR     PASW     COMPR
2 116  161 157                 NSKIP    SEM
2 117  174 147                 MICRO    FLG1
2 120  114 352                 SCNW      ADVANCE
2 121  167 042                 CHAR     '*'
2 122  142 073                 JUMP     STACKS+2
2 123  146 061        PUSHM3   CALL     GETM
2 124  160 147                 SKIP      FAIL
2 125  111 312                 PASS     MTOR
2 126  142 072                 JUMP     STACKS+1
2 127  110 315        CMTL     PASW     COMPL
2 130  161 157                 NSKIP    SEM
2 131  174 147                 MICRO    FLG1
2 132  114 352                 SCNW      ADVANCE
```

```
2 133   167 042                CHAR      '*'
2 134   142 073                JUMP      STACKS+2
2 135   146 061    PUSHLS      CALL      GETM
2 136   160 147                SKIP      FAIL
2 137   111 313                PASS      MTOL
2 140   142 072                JUMP      STACKS+1
2 141   114 352    STAKUP      SCNW      ADVANCE
2 142   166 074                NCHAR     '<'
2 143   142 127                JUMP      CMTL
2 144   166 076                NCHAR     '>'
2 145   142 115                JUMP      CMTR
2 146   110 246                PASW      POPM

 LOC     CODE
2 147   142 156                JUMP      STKREN
2 150   114 352    STAKR       SCNW      ADVANCE
2 151   166 042                NCHAR     '*'
2 152   142 123                JUMP      PUSHRS
2 153   166 052                NCHAR     '*'
2 154   142 124                JUMP      PUSHRS+1
2 155   110 266                PASW      POPR
2 156   161 153    STKREN      NSKIP     EMPTY
2 157   174 147                MICRO     FLG1
2 160   142 073                JUMP      STACKS+2
2 161   114 352    STAKL       SCNW      ADVANCE
2 162   166 042                NCHAR     '*'
2 163   142 135                JUMP      PUSHLS
2 164   166 052                NCHAR     '*'
2 165   142 136                JUMP      PUSHLS+1
2 166   110 256                PASW      POPL
2 167   142 156                JUMP      STKREN

 LOC     CODE
                               EJECT
                   *   LET INSTRUCTION
                   *
2 170   111 203    LET         PASS      CEQO
2 171   147 065                CALL      LTOQC                 QO=C
2 172   154 103                PUSH      PROG
2 173   156 174                PUSH      LETSCAN
2 174   114 352    LETSCAN     SCNW      ADVANCE
2 175   147 351                CALL      LSTR2
2-176   164 140                NCLASS    DIGIT
2 177   143 050                JUMP      LETDIG
2 200   164 141                NCLASS    CAPITOL
2 201   142 317                JUMP      LETCAP
2 202   166 044                NCHAR     '$'
2 203   142 216                JUMP      LETDOL
2 204   166 076                NCHAR     '>'
2 205   143 036                JUMP      LETRIGHT
                               LOW
2 206   166 164                NCHAR     'T'
2 207   142 365                JUMP      TIME
2 210   166 100                NCHAR     '@'
2 211   142 330                JUMP      LETAT
2 212   164 144                NCLASS    NUMOP
2 213   140 064                JUMP      NUMLOOK
2 214   111 350                PASS      BACKMEM
2 215   151 144                NRET      NONE
2 216   114 352    LETDOL      SCNW      ADVANCE
2 217   111 204                PASS      MODE
2 220   111 203                PASS      CEQO
2 221   166 150                NCHAR     'H'
2 222   142 233                JUMP      BYTEIN
2 223   114 352                SCNW      ADVANCE
2 224   164 140                NCLASS    DIGIT
2 225   142 250                JUMP      DIGIN
2 226   166 076                NCHAR     '>'
2 227   143 044                JUMP      DOLIN
2 230   147 065                CALL      LTOQC
2 231   111 350                PASS      BACKMEM
2 232   151 144                NRET      NONE
2 233   114 352    BYTEIN      SCNW      ADVANCE
2 234   166 076                NCHAR     '>'
2 235   142 242                JUMP      BSTAK
2 236   166 040                NCHAR     ' '
2 237   142 246                JUMP      BYTEND
2 240   111 205                PASS      INNEU
2 241   142 233                JUMP      BYTEIN
2 242   110 326    BSTAK       PASW      READR
2 243   120 143                LOAD      SEM
2 244   111 266                PASS      POPR
2 245   142 240                JUMP      BYTEIN+5
```

```
LOC      CODE
2 246   147 065   BYTEND    CALL   CTOWO
2 247   151 144             NRET      NONE
                  *
2 250   111 205   DIGIN     PASS      INNEU
2 251   142 221             JUMP    LETDOL+3
                  *
2 252   146 311   LETEW     CALL      WOTMR    RAO***
2 253   174 147             MICRO      FLG1
2 254   110 305             PASW       NEGTEST
2 255   161 157             NSKIP      SEM
2 256   174 146             MICRC     FLGO
2 257   111 237             PASS                    RA15
2 260   111 213             PASS              LCR
                  *
2 261   114 352   EQUAL     SCNW       ADVANCE
2 262   166 040             NCHAR     ' '
2 263   142 261             JUMP       EQUAL
2 264   166 044             NCHAR     '$'
2 265   142 276             JUMP     EQDOL
2 266   166 074             NCHAR      '<'
2 267   142 341             JUMP     BCDOUT
2 270   164 141             NCLASS     CAPITOL
2 271   142 322             JUMP       EQCAP
2 272   166 100             NCHAR     '@'
2 273   142 326             JUMP     EWAT
2 274   156 174             PUSH       LETSCAN
2 275   142 175             JUMP       LETSCAN+1
                  *
2 276   114 352   EQDOL     SCNW       ADVANCE
2 277   111 204             PASS       MODE
2 300   114 352   EQDOL2   SCNW        ADVANCE
2 301   166 076             NCHAR     '>'
2 302   142 307             JUMP       EQOUT1
2 303   167 074              CHAR     '<'
2 304   142 262             JUMP       EQUAL+1
2 305   111 323             PASS       NEUTOL
2 306   142 300             JUMP       EQDOL2
2 307   111 307   EQOUT1    PASS       READNEU
2 310   142 300             JUMP       EQDOL2
                  *
2 311   111 226   WOTOR     PASS       WAXO
2 312   111 227   WTOR      PASS                  RAO
2 313   111 207             PASS        CBO
2 314   111 235             PASS                  LRO
2 315   111 217             PASS                  TMS
2 316   151 144             NRET       NONE
                  *
                  *
                  *
LOC      CODE
2 317   111 212   LETCAP    PASS                  SETQ
2 320   146 312             CALL       WTOR
2 321   143 071             JUMP        RWTEQ+2
                  *
2 322   111 212   EQCAP     PASS       SETQ
2 323   111 227             PASS                  RAO
2 324   111 215             PASS                  LQR
2 325   142 261             JUMP       EQUAL
2 326   146 332   EWAT      CALL     ATSUB
2 327   142 323             JUMP     EQCAP+1
2 330   146 332   LETAT     CALL   ATSUB
2 331   142 320             JUMP     LETCAP+1
2 332   114 352   ATSUB     SCNW       ADVANCE
2 333   167 074             CHAR   '<'
2 334   142 337             JUMP       *+3
2 335   110 327             PASW       READL
2 336   120 143             LOAD      SEM
2 337   111 212             PASS SETQ
2 340   151 144             NRET      NONE
2 341   161 147   BCDOUT    NSKIP      FAIL
2 342   142 346             JUMP       NEGRES
2 343   121 053             DATA '+'
2 344   111 254             PASS    PUSHL
2 345   142 353             JUMP       BCDCONV
2 346   121 055   NEGRES      DATA   '-'
2 347   111 254             PASS PUSHL
2 350   111 227             PASS       RAO
2 351   111 210             PASS       CR1
2 352   111 232             PASS       NOTQ
2 353   121 014   BCDCONV    DATA   0014
2 354   111 204             PASS   MODE
2 355   111 237             PASS    RA15
```

```
 2 356   110 201              PASH    BCD
 2 357   111 323              PASS      NEUTRL
 2 360   111 323              PASS      NEUTRL
 2 361   111 323              PASS      NEUTRL
 2 362   111 323              PASS      NEUTRL
 2 363   111 323              PASS      NEUTRL
 2 364   142 261              JUMP    EQUAL
                  *
 2 365   114 352   TIME       SCNW      ADVANCE
 2 366   167 170              CHAR     'X'
 2 367   142 372              JUMP     *+3
 2 370   114 352              SCNW      ADVANCE
 2 371   142 374              JUMP     *+3
 2 372   121 015              DATA     0015
 2 373   111 350              PASS      BACKMEM
 2 374   111 211              PASS           SETR
 2 375   111 217              PASS          TOG
  LOC     CODE
 2 376   111 301              PASS      TIMEI
 2 377   142 312              JUMP     QTOR
                  *
 3 000   146 311   LETADD     CALL     QOTOR
 3 001   156 174              PUSH     LETSCAN
 3 002   157 004              PUSH     ADDR2
 3 003   142 174              JUMP     LETSCAN
 3 004   111 207   ADDR2      PASS      CRO
 3 005   111 222              PASS      ADD
 3 006   111 215              PASS      LQR
 3 007   151 144              NRET     NONE
                  *
 3 010   146 311   LETMUL     CALL      QOTOR
 3 011   156 174              PUSH      LETSCAN
 3 012   157 014              PUSH      MUL2
 3 013   142 174              JUMP      LETSCAN
 3 014   111 302   MUL2       PASS      SEMMUL
 3 015   111 215              PASS     LQR
 3 016   151 144              NRET      NONE
                  *
 3 017   146 311   LETDIV     CALL      QOTOR
 3 020   156 174              PUSH      LETSCAN
 3 021   157 023              PUSH      DIV2
 3 022   142 174              JUMP      LETSCAN
 3 023   111 303   DIV2       PASS      SEMDIV
 3 024   111 215              PASS      LQR
 3 025   151 144              NRET      NONE
                  *
 3 026   146 311   LETMOD     CALL      QOTOR
 3 027   156 174              PUSH      LETSCAN
 3 030   157 032              PUSH      MOD2
 3 031   142 174              JUMP      LETSCAN
 3 032   111 303   MOD2       PASS      SEMDIV
 3 033   111 217              PASS      TOG
 3 034   111 215              PASS      LQR
 3 035   151 144              NRET      NONE
                  *
 3 036   111 203   LETRIGHT   PASS      CE00
 3 037   121 014              DATA     0014
 3 040   111 204              PASS              MODE
 3 041   147 075              CALL     GETR
 3 042   147 061              CALL     BINTOQ
 3 043   151 144              NRET     NONE
                  *
 3 044   111 203   DBLIN      PASS    CE00
 3 045   147 075              CALL      GETR
 3 046   147 065              CALL     CTBOQ
 3 047   151 144              NRET     NONE
  LOC     CODE
 3 050   111 203   LETDIG     PASS      CE00
 3 051   121 014              DATA     0014
 3 052   111 204              PASS            MODE
 3 053   120 141              LOAD        PMEM
 3 054   111 205   LETDI2     PASS     INNED
 3 055   114 352              SCNW      ADVANCE
 3 056   164 140              NCLASS   DIGIT
 3 057   143 054              JUMP      LETDI2
 3 060   111 350              PASS     BACKMEM
                  *
 3 061   111 207   BINTOQ     PASS              CRO
 3 062   111 202              PASS              CVB
 3 063   147 067              CALL      RWTOQ
 3 064   151 144              NRET     NONE
 3 065   111 237   CTBOQ      PASS            RA15
```

```
3 066  111 216                PASS        LRC
3 067  111 217   KWTOW        PASS        TOG
3 070  111 227                PASS        RAD
3 071  111 226                PASS        RAXO
3 072  111 215                PASS        LOR
3 073  111 217                PASS        TOG
3 074  151 144                NRET        NONE
                 *
3 075  111 264   GETR         PASS        PUSHR
3 076  111 266                PASS        POPR
3 077  110 326                PASW        READR
3 100  150 153                RETURN      EMPTY
3 101  120 143                LOAD        SEM
3 102  165 140                CLASS       DIGIT
3 103  151 144                NRET        NONE
3 104  111 205                PASS        INNED
3 105  143 076                JUMP        GETR+1
3 106  146 311   LETSUB       CALL        WOTOR
3 107  156 174                PUSH        LETSCAN
3 110  157 112                PUSH        SUBR
3 111  142 174                JUMP        LETSCAN
                 *
3 112  111 207   SUBR         PASS        CBO
3 113  111 223                PASS        SUR
3 114  111 215                PASS        LOR
3 115  111 217                PASS        TOG
3 116  151 144                NRET        NONE
LOC    CODE
                              EJECT
3 117  111 063   KBD          PASS        LINKFORM
3 120  114 352                SCNW        ADVANCE
3 121  166 145                NCHAR       'E'
3 122  143 133                JUMP        KEY
3 123  121 137   KBD2         DATA        0137
3 124  111 033                PASS        '%ESC'
3 125  144 122                CALL        HALT+1
3 126  111 027                PASS        '%ETB'
3 127  121 137                DATA        0137
3 130  111 033                PASS        '%ESC'
3 131  111 006                PASS        0006
3 132  140 104                JUMP        PROG+1
3 133  147 346   KEY          CALL        LSTRING
3 134  167 163                CHAR        'S'
3 135  143 123                JUMP        KBD2
3 136  147 346                CALL        LSTRING
3 137  111 350                PASS        BACKMEM
3 140  121 377                DATA        0377
3 141  143 257                JUMP        RER2
                 *
                 **********      SENSE      CLAUSE        **********
                 *
3 142  111 063   SENSE        PASS        LINKFORM
3 143  111 172                PASS        SINK
3 144  111 101                PASS        CPUSET
3 145  121 105                DATA        0105       META
3 146  111 174                PASS        SOURCE
3 147  114 352                SCNW        ADVANCE
3 150  166 076                NCHAR       '>'
3 151  147 161                CALL        SENSEM
3 152  111 170   SENSEL       PASS        FORMEXC
3 153  114 352                SCNW        ADVANCE
3 154  166 076                NCHAR       '>'
3 155  147 161                CALL        SENSEM
3 156  165 146                CLASS       SENSE
3 157  140 104                JUMP        PROG+1
3 160  143 152                JUMP        SENSEL
3 161  110 326   SENSEM       PASW        READR
3 162  120 143                LOAD        SEM
3 163  111 266                PASS        POPR
3 164  151 144                NRET        NONE
LOC    CODE
                              EJECT
                 *
                 *            WORKING FILE BUFFER CLAUSE
                 *
3 165  174 147   WFB          MICRO       FLG1
3 166  144 126                CALL        CLEARF
3 167  114 352                SCNW        ADVANCE
3 170  166 177                NCHAR       '%DEL'
3 171  143 212                JUMP        WFBDEL
3 172  166 052                NCHAR       '*'
3 173  143 237                JUMP        WFBM
                                CAP
```

```
3 174  166 111            NCHAR    'I'
                            LOW
3 175  143 243            JUMP     WFBI
3 176  166 053            NCHAR    '+'
3 177  143 206            JUMP     WFBS1
3 200  166 055            NCHAR    '-'
3 201  143 210            JUMP     WFBR1
3 202  166 042            NCHAR    '"'
3 203  143 220            JUMP     WFBQT
3 204  111 177            PASS     FORMSUB
3 205  140 103            JUMP     PROG
3 206  111 331  WFBS1     PASS     WFBS
3 207  140 103            JUMP     PROG
3 210  111 332  WFBR1     PASS     WFBR
3 211  140 103            JUMP     PROG
3 212  111 331  WFBDEL    PASS     WFBS
3 213  111 334            PASS     WFBD
                          CAP
3 214  121 301            DATA     'A'          RESET WFB
                          LOW
3 215  111 177            PASS     FORMSUB
3 216  111 332            PASS     WFBR
3 217  140 103            JUMP     PROG
3 220  114 352  WFBQT     SCNW      ADVANCE
3 221  166 042            NCHAR    '"'
3 222  140 103            JUMP     PROG
3 223  166 033            NCHAR    '%ESC'
3 224  114 352            SCNW      ADVANCE
3 225  147 227            CALL     WRITWF
3 226  143 220            JUMP     WFBQT
3 227  110 176  WRITWF    PASW     LOWFB
3 230  160 154            SKIP     FORM
3 231  174 146            MICRJ     FLG0
                            CAP
3 232  121 306            DATA     'F'
3 233  111 177            PASS     FORMSUB
3 234  121 312            DATA     'J'
3 235  111 177            PASS     FORMSUB
 LOC    CODE
                            LOW
3 236  151 144            NRET     NONE
3 237  110 325  WFBN      PASW     READM
3 240  120 143            LOAD     SEM
3 241  147 227            CALL     WRITWF
3 242  140 103            JUMP     PROG
                *
3 243  110 325  WFBI      PASW      READM
3 244  120 143            LOAD      SEM
3 245  111 331            PASS     WFBS
3 246  111 333            PASS     WFBINS
                          CAP
3 247  121 301            DATA     'A'
                          LOW
3 250  111 177            PASS     FORMSUB
3 251  111 332            PASS     WFBR
                        CAP
3 252  121 312            DATA     'J'
                        LOW
3 253  111 177            PASS     FORMSUB
3 254  140 103            JUMP     PROG
 LOC    CODE
                          EJECT
                *
                *        RERUN    CLAUSE
                *
3 255  114 352  RERUN     SCNW      ADVANCE
3 256  111 241            PASS      CLEARM
3 257  111 122  RER2      PASS      RERUNC
3 260  174 147            MICRJ     FLG1
3 261  174 156            HALT
3 262  166 377            NCHAR     0377
3 263  140 103            JUMP      PROG
3 264  111 244            PASS      PUSHM
3 265  174 146            MICRM     FLG0
3 266  140 103            JUMP      PROG
                *
                *     USE CLAUSE
                *
3 267  144 126  USE       CALL      CLEARF
3 270  121 000            DATA      '%NUL'
3 271  110 072            PASW      SETSCTR
3 272  111 040            PASS      ' '
3 273  147 346            CALL      LSTRING
```

```
3 274   154 104                PUSH       PRØG+1
3 275   166 042                NCHAR      '*'
3 276   143 315                JUMP       USEQT
3 277   166 143                NCHAR      'C'
3 300   143 330                JUMP       USECELLS
3 301   166 154                NCHAR      'L'
3 302   111 274                PASS       USEL
3 303   166 076                NCHAR      '>'
3 304   111 273                PASS       USER
3 305   121 375                DATA        0375
3 306   174 150                MICRØ       LDNUM
3 307   157 312                PUSH        DUPST
3 310   147 346    SUR         CALL        LSTRING
3 311   140 267                JUMP        FILE+1
3 312   160 147    DUPST       SKIP        FAIL
3 313   144 336                CALL        DTØL
3 314   151 144                NRET        NØNE
3 315   147 321    USEQT       CALL        PARAM
3 316   174 150                MICRØ       LDNUM
3 317   147 355    USEQT2      CALL        LSTR3
3 320   140 267                JUMP        FILE+1
3 321   111 271    PARAM       PASS        LIFØ
3 322   167 052                CHAR        '*'
3 323   146 062                CALL        GETM+1
3 324   110 325    PAR2        PASH        READM
3 325   120 143                LOAD        SEM
3 326   111 246                PASS        PRPM
3 327   151 144                NRET        NØNE

 LØC     CØDE
3 330   174 150    USECELLS MICRØ       LDNUM
3 331   111 172                PASS        SINK
3 332   147 346                CALL       LSTRING
3 333   147 321                CALL        PARAM
3 334   111 003                PASS       '%ETX'
3 335   143 317                JUMP        USEQT2
3 336   147 346    FRØM        CALL        LSTRING
3 337   147 321                CALL        PARAM
3 340   111 174                PASS        SØURCE
3 341   120 150                LØAD        LINK
3 342   111 172                PASS        SINK
3 343   111 170                PASS        FØRMEXC
3 344   111 352                PASS        ADVANCE
3 345   151 144                NRET        NØNE

 LØC     CØDE
                               EJECT
3 346   114 352    LSTRING     SCNW       ADVANCE
3 347   164 142                NCLASS     LØW
3 350   143 346                JUMP       LSTRING
3 351   166 040    LSTR2       NCHAR      ' '
3 352   143 355                JUMP       LSTR3
3 353   167 054                CHAR       ','
3 354   151 144                NRET       NØNE
3 355   114 352    LSTR3       SCNW       ADVANCE
3 356   143 351                JUMP       LSTR2
3 357   144 126    GET         CALL        CLEARF
3 360   121 253                DATA        '+''
3 361   111 174                PASS        SØURCE
3 362   121 377                DATA        0377
3 363   111 170                PASS        FØRMEXC
3 364   147 346                CALL        LSTRING
3 365   147 346                CALL        LSTRING
3 366   111 350                PASS        BACKMEM
3 367   143 260                JUMP        RER2+1
3 370   111 063    PUT         PASS        LINKFØRM
3 371   147 346                CALL        LSTRING
3 372   121 061                DATA        '1'
3 373   111 164                PASS        RS232C
3 374   121 063                DATA        '3'
3 375   141 117                JUMP        DI+2
3 377                          ØRG         01777
3 377   174 156                HALT
                               END
```

APPENDIX R. META MULTIPLEXER SELECT ROM 4301

| ADDRESS | | | Sel-1 | Sel-1 | Sel- | Sel-3 | Sel-2 | Sel-1 | Sel-C | | | | |
|---|---|---|---|---|---|---|---|---|---|---|---|---|---|
| OCT. | DEC. | $Q_3$ | $Q_2$ | $Q_1$ | $Q_0$ | $Q_3$ | $Q_2$ | $Q_1$ | $Q_0$ | STATE | INSTRUCTION | | |
| 000 | 000 | | | | | | | | | P3 | | NO-OP | |
| 001 | 001 | | | | | | | | | P4 | | | |
| 002 | 002 | | | | | | | | | P2 | | | |
| 003 | 003 | | 0 | | | 0 | | 0 | | P1 | | | |
| 004 | 004 | | | | | | | | | | | | |
| 005 | 005 | | | | | | | | | | | | |
| 006 | 006 | | | | | | | | | | | | |
| 007 | 007 | | | | | | | | | | | | |
| 010 | 008 | | | | | | | | | | | | |
| 011 | 009 | | | | | | | | | | | | |
| 012 | 010 | | | | | | | | | | | | |
| 013 | 011 | | | | | | | | | | | | |
| 014 | 012 | | | | | | | | | | | | |
| 015 | 013 | | | | | | | | | | | | |
| 016 | 014 | | | | | | | | | | | | |
| 017 | 015 | | | | | | | | | | | | |
| 020 | 016 | | | | | | | | | | | DIRECT | |
| 021 | 017 | | | | | | | | | | | | |
| 022 | 018 | | | | | | | | | | | | |
| 023 | 019 | | | | | | | | | | | | |
| 024 | 020 | | | | | | | | | | | DIRECT | |
| 025 | 021 | | | | | | | | | | | | |
| 026 | 022 | | | | | | | | | | | | |
| 027 | 023 | | | | | | | | | | | | |
| 030 | 024 | | | | | | | | | | | | |
| 031 | 025 | | | | | | | | | | | | |
| 032 | 026 | | | | | | | | | | | | |
| 033 | 027 | | | | | | | | | | | | |
| 034 | 028 | | | | | | | | | | | | |
| 035 | 029 | | | | | | | | | | | | |
| 036 | 030 | | | | | | | | | | | | |
| 037 | 031 | | | | | | | | | | | | |

APPENDIX S. META MULTIPLEXER SELECT ROM 4501

| ADDRESS | | | | | | | | | | | | | |
|---|---|---|---|---|---|---|---|---|---|---|---|---|---|
| OCT. | DEC. | $Q_3$ | $Q_2$ | $Q_1$ | $Q_0$ | $Q_3$ | $Q_2$ | $Q_1$ | $Q_0$ | $Q_3$ | $Q_2$ | $Q_1$ | $Q_0$ |
| 04 0 | 032 | | | | | | | | | P3 | | PASSW | |
| 04 1 | 033 | | | | | | | | | P4 | | | |
| 04 2 | 034 | | | 0 | | | | | | P2 | | | |
| 04 3 | 035 | | | 0 | | | | | | P1 | | ↓ | |
| 04 4 | 036 | | | | | | | | | P3 | | PASS | |
| 04 5 | 037 | | | | | | | | | P4 | | | |
| 04 6 | 038 | | | 0 | | | | | | P2 | | | |
| 04 7 | 039 | | | 0 | | | | | | P1 | | ↓ | |
| 05 0 | 040 | | | | | | | | | | | | |
| 05 1 | 041 | | | | | | | | | | | | |
| 05 2 | 042 | | | | | | | | | | | | |
| 05 3 | 043 | | | | | | | | | | | | |
| 05 4 | 044 | | | | | | | | | | | | |
| 05 5 | 045 | | | | | | | | | | | | |
| 05 6 | 046 | | | | | | | | | | | | |
| 05 7 | 047 | | | | | | | | | | | | |
| 06 0 | 048 | | | | | 0 | 0 | 0 | | P3 | | SCANW | |
| 06 1 | 049 | | | | | 0 | 0 | 0 | | P4 | | | |
| 06 2 | 050 | | | 0 | | | | | | P2 | | | |
| 06 3 | 051 | | | 0 | | | | | | P1 | | ↓ | |
| 06 4 | 052 | | | | | 0 | 0 | 0 | | P3 | | SCAN | |
| 06 5 | 053 | | | | | | | | | P4 | | | |
| 06 6 | 054 | | | 0 | | 0 | 0 | 0 | | P2 | | | |
| 06 7 | 055 | | | 0 | | | | | | P1 | | ↓ | |
| 07 0 | 056 | | | | | | | | | | | | |
| 07 1 | 057 | | | | | | | | | | | | |
| 07 2 | 058 | | | | | | | | | | | | |
| 07 3 | 059 | | | | | | | | | | | | |
| 07 4 | 060 | | | | | | | | | | | | |
| 07 5 | 061 | | | | | | | | | | | | |
| 07 6 | 062 | | | | | | | | | | | | |
| 07 7 | 063 | | | | | | | | | | | | |

| ADDRESS | | | | | | | | | | | | | |
|---|---|---|---|---|---|---|---|---|---|---|---|---|---|
| OCT. | DEC. | $Q_3$ | $Q_2$ | $Q_1$ | $Q_0$ | $Q_3$ | $Q_2$ | $Q_1$ | $Q_0$ | $Q_3$ | $Q_2$ | $Q_1$ | $Q_0$ |
| 10 0 | 064 | | | | 0 | | | | | P3° | | LOAD | |
| 10 1 | 065 | | | | | | | | | P4 | | | |
| 10 2 | 066 | | | | 0 | | | | | P2 | | | |
| 10 3 | 067 | | | | | | | | | P1 | | ↓ | |
| 10 4 | 068 | | | 0 | | | | 0 | | P3 | | DATA | |
| 10 5 | 069 | | | | | | | | | P4 | | | |
| 10 6 | 070 | | | 0 | | | | 0 | | P2 | | | |
| 10 7 | 071 | | | | | | | | | P1 | | ↓ | |
| 11 0 | 072 | | | | | | | | | | | | |
| 11 1 | 073 | | | | | | | | | | | | |
| 11 2 | 074 | | | | | | | | | | | | |
| 11 3 | 075 | | | | | | | | | | | | |
| 11 4 | 076 | | | | | | | | | | | | |
| 11 5 | 077 | | | | | | | | | | | | |
| 11 6 | 078 | | | | | | | | | | | | |
| 11 7 | 079 | | | | | | | | | | | | |
| 12 0 | 080 | | | | | | | | | | | | |
| 12 1 | 081 | | | | | | | | | | | | |
| 12 2 | 082 | | | | | | | | | | | | |
| 12 3 | 083 | | | | | | | | | | | | |
| 12 4 | 084 | | | | 0 | | | | | P3 | | LOADP | |
| 12 5 | 085 | | | | | | | | | P4 | | | |
| 12 6 | 086 | | | | 0 | | | | | P2 | | | |
| 12 7 | 087 | | | | | | | | | P1 | | ↓ | |
| 13 0 | 088 | | | | | | | | | | | | |
| 13 1 | 089 | | | | | | | | | | | | |
| 13 2 | 090 | | | | | | | | | | | | |
| 13 3 | 091 | | | | | | | | | | | | |
| 13 4 | 092 | | 0 | 0 | | | | | | P3 | | EXEC | |
| 13 5 | 093 | | 0 | 0 | | | | | | P4 | | | |
| 13 6 | 094 | | | | | | | | | P2 | | | |
| 13 7 | 095 | | | | | | | | | P1 | | ↓ | |

APPENDIX T. META SOURCE CODE ROM 4504

Note; Output is 0001 for addresses not shown.

| ADDRESS OCT. | ADDRESS DEC. | $Q_3$ | $Q_2$ | $Q_1$ | $Q_0$ |
|---|---|---|---|---|---|
| 30 0 | 192 | 0 | 0 | 0 | 1 |
| 30 1 | 193 | | | | |
| 30 2 | 194 | | | | |
| 30 3 | 195 | | | | |
| 30 4 | 196 | | | | |
| 30 5 | 197 | | | | |
| 30 6 | 198 | | | | |
| 30 7 | 199 | | | | |
| 31 0 | 200 | | | | |
| 31 1 | 201 | | | | |
| 31 2 | 202 | | | | |
| 31 3 | 203 | | | | |
| 31 4 | 204 | | | | |
| 31 5 | 205 | | | | |
| 31 6 | 206 | | | | |
| 31 7 | 207 | | | | |
| 32 0 | 208 | | | | |
| 32 1 | 209 | | | | |
| 32 2 | 210 | | | | |
| 32 3 | 211 | | | | |
| 32 4 | 212 | | | | |
| 32 5 | 213 | | | | |
| 32 6 | 214 | | | | |
| 32 7 | 215 | 0 | 0 | 0 | 1 |
| 33 0 | 216 | 0 | 0 | 0 | 1 |
| 33 1 | 217 | | | | |
| 33 2 | 218 | | | | |
| 33 3 | 219 | | | | |
| 33 4 | 220 | | | | |
| 33 5 | 221 | | | | |
| 33 6 | 222 | | | | |
| 33 7 | 223 | 0 | 0 | 0 | 1 |

| ADDRESS OCT. | ADDRESS DEC. | $Q_3$ | $Q_2$ | $Q_1$ | $Q_0$ |
|---|---|---|---|---|---|
| 34 0 | 224 | 0 | 0 | 0 | 1 |
| 34 1 | 225 | | | | |
| 34 2 | 226 | | | | |
| 34 3 | 227 | | | | |
| 34 4 | 228 | | | | |
| 34 5 | 229 | | | | |
| 34 6 | 230 | | | | |
| 34 7 | 231 | | | | |
| 35 0 | 232 | | | | |
| 35 1 | 233 | | | | |
| 35 2 | 234 | | | | |
| 35 3 | 235 | | | | |
| 35 4 | 236 | | | | |
| 35 5 | 237 | | | | |
| 35 6 | 238 | | | | |
| 35 7 | 239 | | | | |
| 36 0 | 240 | | | | |
| 36 1 | 241 | | | | |
| 36 2 | 242 | | | | |
| 36 3 | 243 | | | | |
| 36 4 | 244 | | | | |
| 36 5 | 245 | | | | |
| 36 6 | 246 | | | | |
| 36 7 | 247 | 0 | 0 | 0 | 1 |
| 37 0 | 248 | 0 | 0 | 0 | 0 |
| 37 1 | 249 | | | | |
| 37 2 | 250 | 0 | 1 | 1 | 1 |
| 37 3 | 251 | 0 | 1 | 1 | 0 |
| 37 4 | 252 | | | | |
| 37 5 | 253 | | | | |
| 37 6 | 254 | | | | |
| 37 7 | 255 | | | | |

APPENDIX U. META DESTINATION ROM 4401

Note: Output is 1110 (FORM) for addresses not shown.

| ADDRESS | | $Q_3$ | $Q_2$ | $Q_1$ | $Q_0$ |
|---|---|---|---|---|---|
| OCT. | DEC. | | | | |
| 20 0 | 128 | 1 | 1 | 0 | 1 |
| 20 1 | 129 | | | | |
| 20 2 | 130 | | | | |
| 20 3 | 131 | | | | |
| 20 4 | 132 | | | | |
| 20 5 | 133 | | | | |
| 20 6 | 134 | | | | |
| 20 7 | 135 | | | | |
| 20 0 | 136 | | | | |
| 21 1 | 137 | | | | |
| 21 2 | 138 | | | | |
| 21 3 | 139 | | | | |
| 21 4 | 140 | | | | |
| 21 5 | 141 | | | | |
| 21 6 | 142 | | | | |
| 21 7 | 143 | | | | |
| 22 0 | 144 | | | | |
| 22 1 | 145 | | | | |
| 22 2 | 146 | | | | |
| 22 3 | 147 | | | | |
| 22 4 | 148 | | | | |
| 22 5 | 149 | | | | |
| 22 6 | 150 | | | | |
| 22 7 | 151 | | | | |
| 23 0 | 152 | | | | |
| 23 1 | 153 | | | | |
| 23 2 | 154 | | | | |
| 23 3 | 155 | | | | |
| 23 4 | 156 | | | | |
| 23 5 | 157 | | | | |
| 23 6 | 158 | | | | |
| 23 7 | 159 | 1 | 1 | 0 | 1 |

| ADDRESS | | $Q_3$ | $Q_2$ | $Q_1$ | $Q_0$ |
|---|---|---|---|---|---|
| OCT. | DEC. | | | | |
| 24 0 | 160 | 1 | 1 | 0 | 1 |
| 24 1 | 161 | | | | |
| 24 2 | 162 | | | | |
| 24 3 | 163 | | | | |
| 24 4 | 164 | | | | |
| 24 5 | 165 | | | | |
| 24 6 | 166 | | | | |
| 24 7 | 167 | | | | |
| 25 0 | 168 | | | | |
| 25 1 | 169 | | | | |
| 25 2 | 170 | | | | |
| 25 3 | 171 | | | | |
| 25 4 | 172 | | | | |
| 25 5 | 173 | | | | |
| 25 6 | 174 | | | | |
| 25 7 | 175 | | | | |
| 26 0 | 176 | | | | |
| 26 1 | 177 | | | | |
| 26 2 | 178 | | | | |
| 26 3 | 179 | | | | |
| 26 4 | 180 | | | | |
| 26 5 | 181 | | | | |
| 26 6 | 182 | | | | |
| 26 7 | 183 | | | | |
| 27 0 | 184 | | | | |
| 27 1 | 185 | | | | |
| 27 2 | 186 | | | | |
| 27 3 | 187 | | | | |
| 27 4 | 188 | | | | |
| 27 5 | 189 | | | | |
| 27 6 | 190 | | | | |
| 27 7 | 191 | 1 | 1 | 0 | 1 |

| ADDRESS OCT. | ADDRESS DEC. | $Q_3$ | $Q_2$ | $Q_1$ | $Q_0$ |
|---|---|---|---|---|---|
| 30 0 | 192 | 1 | 1 | 0 | 1 |
| 30 1 | 193 | | | | |
| 30 2 | 194 | | | | |
| 30 3 | 195 | | | | |
| 30 4 | 196 | | | | |
| 30 5 | 197 | | | | |
| 30 6 | 198 | | | | |
| 30 7 | 199 | | | | |
| 31 0 | 200 | | | | |
| 31 1 | 201 | | | | |
| 31 2 | 202 | | | | |
| 31 3 | 203 | | | | |
| 31 4 | 204 | | | | |
| 31 5 | 205 | | | | |
| 31 6 | 206 | | | | |
| 31 7 | 207 | | | | |
| 32 0 | 208 | | | | |
| 32 1 | 209 | | | | |
| 32 2 | 210 | | | | |
| 32 3 | 211 | | | | |
| 32 4 | 212 | | | | |
| 32 5 | 213 | | | | |
| 32 6 | 214 | | | | |
| 32 7 | 215 | 1 | 1 | 0 | 1 |
| 33 0 | 216 | 1 | 1 | 1 | 0 |
| 33 1 | 217 | | | | |
| 33 2 | 218 | | | | |
| 33 3 | 219 | | | | |
| 33 4 | 220 | | | | |
| 33 5 | 221 | | | | |
| 33 6 | 222 | | | | |
| 33 7 | 223 | 1 | 1 | 1 | 0 |

| ADDRESS OCT. | ADDRESS DEC. | $Q_3$ | $Q_2$ | $Q_1$ | $Q_0$ |
|---|---|---|---|---|---|
| 34 0 | 224 | 1 | 1 | 0 | 0 |
| 34 1 | 225 | | | | |
| 34 2 | 226 | | | | |
| 34 3 | 227 | | | | |
| 34 4 | 228 | | | | |
| 34 5 | 229 | | | | |
| 34 6 | 230 | | | | |
| 34 7 | 231 | | | | |
| 35 0 | 232 | | | | |
| 35 1 | 233 | | | | |
| 35 2 | 234 | | | | |
| 35 3 | 235 | | | | |
| 35 4 | 236 | | | | |
| 35 5 | 237 | | | | |
| 35 6 | 238 | | | | |
| 35 7 | 239 | | | | |
| 36 0 | 240 | | | | |
| 36 1 | 241 | | | | |
| 36 2 | 242 | | | | |
| 36 3 | 243 | | | | |
| 36 4 | 244 | | | | |
| 36 5 | 245 | | | | |
| 36 6 | 246 | | | | |
| 36 7 | 247 | 1 | 1 | 0 | 0 |
| 37 0 | 248 | | | | |
| 37 1 | 249 | | | | |
| 37 2 | 250 | | | | |
| 37 3 | 251 | | | | |
| 37 4 | 252 | | | | |
| 37 5 | 253 | | | | |
| 37 6 | 254 | | | | |
| 37 7 | 255 | | | | |

APPENDIX V. META MICRO-CODE GENERATOR ROM 4701

| OCTAL ADDRESS | | | BINARY ADDRESS $A_4$---$A_0$ | $B_7$ | DIRECT $B_6$ | $\overline{HALT}$ $B_5$ | $\overline{ADV}$ $B_4$ | $B_3$ | PREG $B_2$ | $B_1$ | LD-PCTR $B_0$ |
|---|---|---|---|---|---|---|---|---|---|---|---|
| 0 | 0 | 0 | 00000 | | | | | | | | |
| 0 | 1 | | 00001 | | | | | | | | |
| 0 | 2 | 1 | 00010 | | | | | | | | |
| 0 | 3 | | 00011 | | | | | | | | |
| 0 | 4 | 2 | 00100 | | | | | | | | |
| 0 | 5 | | 00101 | | | | | | | | |
| 0 | 6 | 3 | 00110 | | | | | | | | |
| 0 | 7 | | 00111 | | | | | | | | |
| 1 | 0 | 4 | 01000 | | | | | | | | |
| 1 | 1 | | 01001 | | | | | | | | |
| 1 | 2 | 5 | 01010 | | | | | | | | |
| 1 | 3 | | 01011 | | | | | | | | |
| 1 | 4 | 6 | 01100 | | | | | | | | |
| 1 | 5 | | 01101 | | | | | | | | |
| 1 | 6 | 7 | 01110 | | | | | | | | |
| 1 | 7 | | 01111 | | | | | | | | |
| 2 | 0 | 10 | 10000 | | | | | | | | |
| 2 | 1 | | 10001 | | | | | | | | |
| 2 | 2 | 11 | 10010 | | | | | | | | |
| 2 | 3 | | 10011 | | | | | | | | |
| 2 | 4 | 12 | 10100 | | | | | | | | |
| 2 | 5 | | 10101 | | | | | | | | |
| 2 | 6 | 13 | 10110 | | | | | | | | |
| 2 | 7 | | 10111 | | | | | | | | |
| 3 | 0 | 14 | 11000 | | | | | | | | |
| 3 | 1 | | 11001 | | | | | | | | |
| 3 | 2 | 15 | 11010 | | | | | | | | |
| 3 | 3 | | 11011 | | | | | | | | |
| 3 | 4 | 16 | 11100 | | | | | | | | |
| 3 | 5 | | 11101 | | | | | | | | |
| 3 | 6 | 17 | 11110 | | | | | | | | |
| 3 | 7 | | 11111 | | | | | | | | |

APPENDIX W. META MICRO-CODE GENERATOR ROM 4702

| OCTAL ADDRESS | | | BINARY ADDRESS $A_4$—$A_0$ | READY $B_7$ | PASS $B_6$ | RAM-LD $B_5$ | RAM-HI $B_4$ | $\overline{PREG}$ $B_3$ | $\overline{PCTR-3}$ $B_2$ | $B_1$ | L2-PCTR $B_0$ |
|---|---|---|---|---|---|---|---|---|---|---|---|
| 0 | 0 | 0 | 00000 | | | | | | | | |
| 0 | 1 | | 00001 | | | | | | | | |
| 0 | 2 | 1 | 00010 | | | | | | | | |
| 0 | 3 | | 00011 | | | | | | | | |
| 0 | 4 | 2 | 00100 | | | | | | | | |
| 0 | 5 | | 00101 | | | | | | | | |
| 0 | 6 | 3 | 00110 | | | | | | | | |
| 0 | 7 | | 00111 | | | | | | | | |
| 1 | 0 | 4 | 01000 | | | | | | | | |
| 1 | 1 | | 01001 | | | | | | | | |
| 1 | 2 | 5 | 01010 | | | | | | | | |
| 1 | 3 | | 01011 | | | | | | | | |
| 1 | 4 | 6 | 01100 | | | | | | | | |
| 1 | 5 | | 01101 | | | | | | | | |
| 1 | 6 | 7 | 01110 | | | | | | | | |
| 1 | 7 | | 01111 | | | | | | | | |
| 2 | 0 | 10 | 10000 | | | | | | | | |
| 2 | 1 | | 10001 | | | | | | | | |
| 2 | 2 | 11 | 10010 | | | | | | | | |
| 2 | 3 | | 10011 | | | | | | | | |
| 2 | 4 | 12 | 10100 | | | | | | | | |
| 2 | 5 | | 10101 | | | | | | | | |
| 2 | 6 | 13 | 10110 | | | | | | | | |
| 2 | 7 | | 10111 | | | | | | | | |
| 3 | 0 | 14 | 11000 | | | | | | | | |
| 3 | 1 | | 11001 | | | | | | | | |
| 3 | 2 | 15 | 11010 | | | | | | | | |
| 3 | 3 | | 11011 | | | | | | | | |
| 3 | 4 | 16 | 11100 | | | | | | | | |
| 3 | 5 | | 11101 | | | | | | | | |
| 3 | 6 | 17 | 11110 | | | | | | | | |
| 3 | 7 | | 11111 | | | | | | | | |

APPENDIX X. META MICRO-CODE GENERATOR ROM 4703

| CLASS $O_7$ | COND $O_6$ | COMP $O_5$ | $O_4$ | S.I. XY 1 =SHQ $O_3$ | $\overline{\text{LD=DREG}}$ $O_2$ | POP-P4 $O_1$ | $\overline{\text{PUSH}}$ $O_0$ | OCTAL ADDR. | | | | DEC. ADDR. |
|---|---|---|---|---|---|---|---|---|---|---|---|---|
| | | | | | | | | 0 | 0 | 0 | 0 | 0 |
| | | | | | | | | C | 0 | 1 | | 1 |
| | | | | | | | | 0 | 0 | 2 | 1 | 2 |
| | | | | | | | | 0 | 0 | 3 | | 3 |
| | | | | | | | | 0 | 0 | 4 | 2 | 4 |
| | | | | | | | | 0 | 0 | 5 | | 5 |
| | | | | | | | | 0 | 0 | 6 | 3 | 6 |
| | | | | | | | | 0 | 0 | 7 | | 7 |
| | | | | | | | | 0 | 1 | 0 | 4 | 8 |
| | | | | | | | | 0 | 1 | 1 | | 9 |
| | | | | | | | | 0 | 1 | 2 | 5 | 10 |
| | | | | | | | | 0 | 1 | 3 | | 11 |
| | | | | | | | | 0 | 1 | 4 | 6 | 12 |
| | | | | | | | | 0 | 1 | 5 | | 13 |
| | | | | | | | | 0 | 1 | 6 | 7 | 14 |
| | | | | | | | | 0 | 1 | 7 | | 15 |
| | | | | | | | | 0 | 2 | 0 | 10 | 16 |
| | | | | | | | | 0 | 2 | 1 | | 17 |
| | | | | | | | | 0 | 2 | 2 | 11 | 18 |
| | | | | | | | | 0 | 2 | 3 | | 19 |
| | | | | | | | | 0 | 2 | 4 | 12 | 20 |
| | | | | | | | | 0 | 2 | 5 | | 21 |
| | | | | | | | | 0 | 2 | 6 | 13 | 22 |
| | | | | | | | | 0 | 2 | 7 | | 23 |
| | | | | | | | | 0 | 3 | 0 | 14 | 24 |
| | | | | | | | | 0 | 3 | 1 | | 25 |
| | | | | | | | | 0 | 3 | 2 | 15 | 26 |
| | | | | | | | | 0 | 3 | 3 | | 27 |
| | | | | | | | | 0 | 3 | 4 | 16 | 28 |
| | | | | | | | | 0 | 3 | 5 | | 29 |
| | | | | | | | | 0 | 3 | 6 | 17 | 30 |
| | | | | | | | | 0 | 3 | 7 | | 31 |

APPENDIX Y. META MICRO-CODE GENERATOR ROM 4704

| $O_7$ | $O_6$ | $O_5$ | $\overline{MICRO}$ $O_4$ | LD-STACK $O_3$ | $O_2$ | SELXY $O_1$ | $\overline{LD-REG}$ $O_0$ | OCTAL ADDR. | | | | DEC. ADDR. |
|---|---|---|---|---|---|---|---|---|---|---|---|---|
| | | | | | | | | 0 | 0 | 0 | 0 | 0 |
| | | | | | | | | 0 | 0 | 1 | | 1 |
| | | | | | | | | 0 | 0 | 2 | 1 | 2 |
| | | | | | | | | 0 | 0 | 3 | | 3 |
| | | | | | | | | 0 | 0 | 4 | 2 | 4 |
| | | | | | | | | 0 | 0 | 5 | | 5 |
| | | | | | | | | 0 | 0 | 6 | 3 | 6 |
| | | | | | | | | 0 | 0 | 7 | | 7 |
| | | | | | | | | 0 | 1 | 0 | 4 | 8 |
| | | | | | | | | 0 | 1 | 1 | | 9 |
| | | | | | | | | 0 | 1 | 2 | 5 | 10 |
| | | | | | | | | 0 | 1 | 3 | | 11 |
| | | | | | | | | 0 | 1 | 4 | 6 | 12 |
| | | | | | | | | 0 | 1 | 5 | | 13 |
| | | | | | | | | 0 | 1 | 6 | 7 | 14 |
| | | | | | | | | 0 | 1 | 7 | | 15 |
| | | | | | | | | 0 | 2 | 0 | 10 | 16 |
| | | | | | | | | 0 | 2 | 1 | | 17 |
| | | | | | | | | 0 | 2 | 2 | 11 | 18 |
| | | | | | | | | 0 | 2 | 3 | | 19 |
| | | | | | | | | 0 | 2 | 4 | 12 | 20 |
| | | | | | | | | 0 | 2 | 5 | | 21 |
| | | | | | | | | 0 | 2 | 6 | 13 | 22 |
| | | | | | | | | 0 | 2 | 7 | | 23 |
| | | | | | | | | 0 | 3 | 0 | 14 | 24 |
| | | | | | | | | 0 | 3 | 1 | | 25 |
| | | | | | | | | 0 | 3 | 2 | 15 | 26 |
| | | | | | | | | 0 | 3 | 3 | | 27 |
| | | | | | | | | 0 | 3 | 4 | 16 | 28 |
| | | | | | | | | 0 | 3 | 5 | | 29 |
| | | | | | | | | 0 | 3 | 6 | 17 | 30 |
| | | | | | | | | 0 | 3 | 7 | | 31 |

APPENDIX Z. META MICRO-CODE GENERATOR ROM 4705

| OCTAL ADDRESS | | BINARY ADDRESS $A_4$---$A_0$ | LD LINK $B_7$ | $\overline{\text{HALT}}$ $B_6$ | $\overline{\text{M-POP}}$ $B_5$ | FLG-1 $B_4$ | FLG-0 $B_3$ | AD-1 $B_2$ | AD-0 $B_1$ | $\overline{\text{PUSH}}$ $B_0$ |
|---|---|---|---|---|---|---|---|---|---|---|
| | | | OUTPUTS | | | | | | | |
| 0 | 0 | 00000 | | | | | | | | |
| 0 | 1 | 00001 | | | | | | | | |
| 0 | 2 | 00010 | | | | | | | | |
| 0 | 3 | 00011 | | | | | | | | |
| 0 | 4 | 00100 | | | | | | | | |
| 0 | 5 | 00101 | | | | | | | | |
| 0 | 6 | 00110 | | | | | | | | |
| 0 | 7 | 00111 | | | | | | | | |
| 1 | 0 | 01000 | | | | | | | | |
| 1 | 1 | 01001 | | | | | | | | |
| 1 | 2 | 01010 | | | | | | | | |
| 1 | 3 | 01011 | | | | | | | | |
| 1 | 4 | 01100 | | | | | | | 1 | |
| 1 | 5 | 01101 | | | | | | 0 | | |
| 1 | 6 | 01110 | | 0 | | | | | | |
| 1 | 7 | 01111 | | | | | | | | |
| 2 | 0 | 10000 | | | | | | | | |
| 2 | 1 | 10001 | | | | | | | | |
| 2 | 2 | 10010 | | | | | | | | |
| 2 | 3 | 10011 | | | | | | | | |
| 2 | 4 | 10100 | | | | | | | | |
| 2 | 5 | 10101 | | | | | | | | |
| 2 | 6 | 10110 | | | | | | | | |
| 2 | 7 | 10111 | | | | | | | | |
| 3 | 0 | 11000 | | | | | | | | |
| 3 | 1 | 11001 | | | | | | | | |
| 3 | 2 | 11010 | | | | | | | | |
| 3 | 3 | 11011 | | | | | | | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX AA. META CLASSIFIER ROM 4802

| ADDRESS | | SPECIAL | LOW | CAPITAL | DIGIT | ALPHNUM | SENSE | BEGIN | NUMOP |
|---|---|---|---|---|---|---|---|---|---|
| OCT. | DEC. | $Q_3$ | $Q_2$ | $Q_1$ | $Q_0$ | $Q_3$ | $Q_2$ | $Q_1$ | $Q_0$ |
| 000 | 000 | | | | | | 0 | | |
| 001 | 001 | | | | | | | | |
| 002 | 002 | | | | | | | | |
| 003 | 003 | | | | | | | | |
| 004 | 004 | | | | | | | | |
| 005 | 005 | | | | | | | | |
| 006 | 006 | | | | | | | | |
| 007 | 007 | | | | | | | | |
| 010 | 008 | | | | | | | | |
| 011 | 009 | | | | | | | | |
| 012 | 010 | | | | | | | | |
| 013 | 011 | | | | | | | | |
| 014 | 012 | | | | | | | | |
| 015 | 013 | | | | | | | | |
| 016 | 014 | | | | | | | | |
| 017 | 015 | | | | | | | | |
| 020 | 016 | | | | | | | | |
| 021 | 017 | | | | | | | | |
| 022 | 018 | | | | | | | | |
| 023 | 019 | | | | | | | | |
| 024 | 020 | | | | | | | | |
| 025 | 021 | | | | | | | | |
| 026 | 022 | | | | | | | | |
| 027 | 023 | | | | | | | | |
| 030 | 024 | | | | | | | | |
| 031 | 025 | | | | | | | | |
| 032 | 026 | | | | | | | | |
| 033 | 027 | | | | | | | | |
| 034 | 028 | | | | | | | | |
| 035 | 029 | | | | | | | | |
| 036 | 030 | | | | | | | | |
| 037 | 031 | | | | | | | | |

| | ADDRESS OCT. | DEC. | $Q_3$ | $Q_2$ | $Q_1$ | $Q_0$ | $Q_3$ | $Q_2$ | $Q_1$ | $Q_0$ |
|---|---|---|---|---|---|---|---|---|---|---|
| b̸ | 04 0 | 032 | O | | | | | | O | |
| ! | 04 1 | 033 | O | | | | | | O | |
| " | 04 2 | 034 | O | | | | | | O | |
| # | 04 3 | 035 | O | | | | | | O | |
| $ | 04 4 | 036 | O | | | | | | | |
| % | 04 5 | 037 | O | | | | | | O | |
| & | 04 6 | 038 | O | | | | | | | |
| ' | 04 7 | 039 | | | | | | | | |
| ( | 05 0 | 040 | O | | | | | | | |
| ) | 05 1 | 041 | O | | | | | | | |
| * | 05 2 | 042 | | | | | | | | O |
| + | 05 3 | 043 | | | | | | | O | O |
| , | 05 4 | 044 | O | | | | | O | | |
| - | 05 5 | 045 | | | | | | | O | O |
| . | 05 6 | 046 | O | | | | | | O | |
| / | 05 7 | 047 | | | | | | | | O |
| 0 | 06 0 | 048 | | | | O | O | O | | |
| 1 | 06 1 | 049 | | | | O | O | O | | |
| 2 | 06 2 | 050 | | | | O | O | O | | |
| 3 | 06 3 | 051 | | | | O | O | O | | |
| 4 | 06 4 | 052 | | | | O | O | O | | |
| 5 | 06 5 | 053 | | | | O | O | O | | |
| 6 | 06 6 | 054 | | | | O | O | O | | |
| 7 | 06 7 | 055 | | | | O | O | O | | |
| 8 | 07 0 | 056 | | | | O | O | | | |
| 9 | 07 1 | 057 | | | | O | O | | | |
| : | 07 2 | 058 | O | | | | | | O | |
| ; | 07 3 | 059 | O | | | | | | | |
| < | 07 4 | 060 | | | | | | | | |
| = | 07 5 | 061 | | | | | | | O | O |
| > | 07 6 | 062 | | | | | | | | O |
| ? | 07 7 | 063 | O | | | | | | O | |

| | ADDRESS OCT. | ADDRESS DEC. | $Q_3$ | $Q_2$ | $Q_1$ | $Q_0$ | $Q_3$ | $Q_2$ | $Q_1$ | $Q_0$ |
|---|---|---|---|---|---|---|---|---|---|---|
| @ | 10 0 | 064 | | | | | | | | |
| A | 10 1 | 065 | | | 0 | | 0 | | | |
| B | 10 2 | 066 | | | 0 | | 0 | | | |
| C | 10 3 | 067 | | | 0 | | 0 | | | |
| D | 10 4 | 068 | | | 0 | | 0 | | | |
| E | 10 5 | 069 | | | 0 | | 0 | | | |
| F | 10 6 | 070 | | | 0 | | 0 | | | |
| G | 10 7 | 071 | | | 0 | | 0 | | | |
| H | 11 0 | 072 | | | 0 | | 0 | | | |
| I | 11 1 | 073 | | | 0 | | 0 | | | |
| J | 11 2 | 074 | | | 0 | | 0 | | | |
| K | 11 3 | 075 | | | 0 | | 0 | | | |
| L | 11 4 | 076 | | | 0 | | 0 | | | |
| M | 11 5 | 077 | | | 0 | | 0 | | | |
| N | 11 6 | 078 | | | 0 | | 0 | | | |
| O | 11 7 | 079 | | | 0 | | 0 | | | |
| P | 12 0 | 080 | | | 0 | | 0 | | | |
| Q | 12 1 | 081 | | | 0 | | 0 | | | |
| R | 12 2 | 082 | | | 0 | | 0 | | | |
| S | 12 3 | 083 | | | 0 | | 0 | | | |
| T | 12 4 | 084 | | | 0 | | 0 | | | |
| U | 12 5 | 085 | | | 0 | | 0 | | | |
| V | 12 6 | 086 | | | 0 | | 0 | | | |
| W | 12 7 | 087 | | | 0 | | 0 | | | |
| X | 13 0 | 088 | | | 0 | | 0 | | | |
| Y | 13 1 | 089 | | | 0 | | 0 | | | |
| Z | 13 2 | 090 | | | 0 | | 0 | | | |
| [ | 13 3 | 091 | 0 | | | | | | 0 | |
| \ | 13 4 | 092 | | | | | | | | 0 |
| ] | 13 5 | 093 | 0 | | | | | | 0 | |
| ^ | 13 6 | 094 | 0 | | | | | | 0 | |
| _ | 13 7 | 095 | 0 | | | | | | 0 | |

| | ADDRESS | | $Q_3$ | $Q_2$ | $Q_1$ | $Q_0$ | $Q_3$ | $Q_2$ | $Q_1$ | $Q_0$ |
|---|---|---|---|---|---|---|---|---|---|---|
| | OCT. | DEC. | | | | | | | | |
| ` | 140 | 096 | | | | | | | | |
| a | 141 | 097 | | 0 | | | 0 | | | |
| b | 142 | 098 | | 0 | | | 0 | | 0 | |
| c | 143 | 099 | | 0 | | | 0 | | 0 | |
| d | 144 | 100 | | 0 | | | 0 | | 0 | |
| e | 145 | 101 | | 0 | | | 0 | | 0 | |
| f | 146 | 102 | | 0 | | | 0 | | 0 | |
| g | 147 | 103 | | 0 | | | 0 | | | |
| h | 150 | 104 | | 0 | | | 0 | | | |
| i | 151 | 105 | | 0 | | | 0 | | 0 | |
| j | 152 | 106 | | 0 | | | 0 | | 0 | |
| k | 153 | 107 | | 0 | | | 0 | | 0 | |
| l | 154 | 108 | | 0 | | | 0 | | 0 | |
| m | 155 | 109 | | 0 | | | 0 | | 0 | |
| n | 156 | 110 | | 0 | | | 0 | | 0 | |
| o | 157 | 111 | | 0 | | | 0 | | 0 | |
| p | 160 | 112 | | 0 | | | 0 | | | |
| q | 161 | 113 | | 0 | | | 0 | | | |
| r | 162 | 114 | | 0 | | | 0 | | 0 | |
| s | 163 | 115 | | 0 | | | 0 | | 0 | |
| t | 164 | 116 | | 0 | | | 0 | | | |
| u | 165 | 117 | | 0 | | | 0 | | | |
| v | 166 | 118 | | 0 | | | 0 | | 0 | |
| w | 167 | 119 | | 0 | | | 0 | | 0 | |
| x | 170 | 120 | | 0 | | | 0 | | | |
| y | 171 | 121 | | 0 | | | 0 | | | |
| z | 172 | 122 | | 0 | | | 0 | | | |
| { | 173 | 123 | 0 | | | | | | 0 | |
| \| | 174 | 124 | 0 | | | | | | 0 | |
| } | 175 | 125 | 0 | | | | | | 0 | |
| ~ | 176 | 126 | 0 | | | | | | 0 | |
| ▨ | 177 | 127 | | | | | | 0 | | |

APPENDIX BB. DEVICES USED TO IMPLEMENT AN EXEMPLARY METAPROCESSOR

All Boolean equations and gates are implemented using the following devices:

| Function | Manufacturer | Catalog Number |
|---|---|---|
| NAND | TI | 74LS00 |
| INVERTER | TI | 74LS04 |
| NOR | TI | 74LS02 |

Other devices used:

| Figure Reference Number | Manufacturer | Catalog Number |
|---|---|---|
| 4203, 4204, 4219, 4220 | TI | 74LS109 |
| 4404, 4505, 4406 | TI | 74LS74 |
| 4221, 4402 | TI | 74LS138 |
| 4301, 4401, 4501, 4504, 4802 | MM | 6300 |
| 4302, 4403, 4502, 4803, 4901 | TI | 74LS151 |
| 4303, 4503, 4507, 4508 | TI | 74LS298 |
| 5001, 5002, 5003 | TI | 74LS298 |
| 4505 | TI | 74LS161 |
| 4601 | TI | 74LS193 |
| 4506, 4602 | SYN | 2112 |
| 4701, 4702, 4703, 4704, 4705 | SIG | 82S123 |
| 4801 | TI | 74LS85 |

Manufacturer Codes: TI = Texas Instruments, Inc.
MM = Monolithic Memories, Inc.
SYN = Synertec, Inc.
SIG = Signetics, Inc.

APPENDIX CC. STG INSTRUCTION SET DEFINITION

| OPCODE | MNEMONIC | ISP DEFINITION |
|---|---|---|
| 240 | SEU-NOP | ( ) |
| 241 | CLEARM | (F ← 0, MPTR ← 0) |
| 242 | SAVEM | (MSAVE ← MPTR) |
| 243 | RSTRM | (¬F → (MPTR ← MSAVE), F → (MPTR ← 0)) |
| 244 | PUSIM | (MPTR ← MPTR + 1; MSTACK [MPTR] ← IN) |
| 245 | READM | (DATA ← MSTACK [MPTR]) |
| 246 | POPM | (¬F → (MPTR ← MPTRO-1), F → (MPTR ← MPTR+1); DATA ← MSTACK [MPTR] |
| 247 | LENM | (DATA ← MPTR) |
| 250 | SEUMR | (F ← 0, L ← 0) |
| 251 | CLEARL | (LPTR ← 0) |
| 252 | SAVEL | (LSAVE ← LPTR) |
| 253 | RSTRL | (LPTR ← LSAVE) |
| 254 | PUSHL | (LPTR ← LPTR +1; LSTACK [LPTR] ← IN) |
| 255 | READL | (DATA ← LSTACK [LPTR]) |
| 256 | POPL | (LPTR ← LPTR-1; DATA ← LSTACK [LPTR] |
| 257 | LENL | (DATA ← LPTR) |
| 260 | LOAD | (DATA ← IN) |
| 261 | CLEARR | (RPTR [L] ← 0) |

| | | |
|---|---|---|
| 262 | SAVER | (RSAVE [L] ← RPTR [L] |
| 263 | RSTRR | (RPTR [L] ← RSAVE [L]) |
| 264 | PUSHR | (RPTR [L] ← RPTR [L] +1; RSTACK [L] [RPTR[L]] ← IN) |
| 265 | READR | (DATA ← RSTACK [RPTR [L]]) |
| 266 | POPR | (RPTR [L] ← RPTR [L]-1; DATA ← RSTACK [RPTR[L]]) |
| 267 | LENR | (DATA ← PRTR [L]) |
| 270 | FIFO | (F ← 1) |
| 271 | LIFO | (F ← 0) |
| 272 | COMPM | (EQ ← (MSTACK [MPTR] = DATA) + MSTACK <8>) |
| 273 | USER | (L ← 0) |
| 274 | USEL | (L ← 1) |
| 275 | ANY | (MSTACK [MPTR] <8> ← 1) |
| 276 | PUSHLI | (LPTR ← LPTR+1; LSTACK [LPTR] ← DATA) |
| 277 | PUSHRI | (RPTR [L] ← RPTR [L]-1; RSTACK [RPTR [L] ← DATA) |

| | |
|---|---|
| ACTIVE | Logic "1" when STC is executing an instruction |
| OPCODE <4:0> | Current instruction operation code |
| DATA <7:0> | Data register |
| MEM [1023:0] <8:0> | Stack Data Memory |
| MSTACK [255:0] = MEM [255:0] | |
| LSTACK [255:0] = MEM [511:256] | |
| RSTACK [255:0] [0] = MEM [1023:512] | |
| RIGHT-STACK = RSTACK [255:0] [0] | |
| LABEL-STACK = RSTACK [511:256] [1] | |
| STACK-POINTER-MEM [3:0] [0] <9:0> | Stack Pointers |
| MPTR <7:0> = SPM [0] [0] <7:0> | |
| MSAVE <7:0> = SPM [1] [0] <7:0> | |
| LPTR <7:0> = SPM [1] [0] <7:0> | |
| LSAVE <7:0> = SPM [1] [1] <7:0> | |
| RPTR <7:0> = SPM [L] [0] <7:0> | |
| RSAVE <7:0> = SPM [L] [1] <7:0> | |
| F | "1" if FIFO mode selected, else "0" for LIFO |
| L | "1" if using label stack, else "0" for right stack |
| SAVE | Auxiliary pointer save register |
| CTR | Stack pointer counter |
| FULL-COND | "1" if last stack referenced is full |
| EMPTY-COND | "1" if last stack referenced is empty |
| IN <7:0> | SEM data input |
| STC <7:0> = DATA <7:0> | |
| EQ | "1" if data compare |

APPENDIX DD. STG MICRO-CODE GENERATOR ROM 3401

| OCTAL ADDRESS | | BINARY ADDRESS $A_4$---$A_0$ | MATCH-S $B_7$ | WRT-AO $B_6$ | WRT-LR $B_5$ | WRT-MAT $B_4$ | RD-AO $B_3$ | RD-[illegible] $B_2$ | RD-LR $B_1$ | RD-MAT $B_0$ |
|---|---|---|---|---|---|---|---|---|---|---|
| 0 | 0 | 00000 | | | | | | | | |
| 0 | 1 | 00001 | / | | | / | | | | / |
| 0 | 2 | 00010 | / | / | | / | | | | / |
| 0 | 3 | 00011 | / | | | / | | / | | / |
| 0 | 4 | 00100 | / | | | / | | | | / |
| 0 | 5 | 00101 | / | | | | | | | / |
| 0 | 6 | 00110 | / | | | / | | | | / |
| 0 | 7 | 00111 | / | | | | | | | / |
| 1 | 0 | 01000 | | | | | | | | |
| 1 | 1 | 01001 | | | | / | | / | | / |
| 1 | 2 | 01010 | | / | | / | / | | | / |
| 1 | 3 | 01011 | | | | / | / | / | | / |
| 1 | 4 | 01100 | | | | / | / | | | / |
| 1 | 5 | 01101 | | | | . | / | | | / |
| 1 | 6 | 01110 | | | | / | / | | | / |
| 1 | 7 | 01111 | | | | | / | | | / |
| 2 | 0 | 10000 | | | | | | | | |
| 2 | 1 | 10001 | | | / | | / | | / | |
| 2 | 2 | 10010 | | / | / | | / | | / | |
| 2 | 3 | 10011 | | | / | | / | / | / | |
| 2 | 4 | 10100 | | | / | | / | | / | |
| 2 | 5 | 10101 | | | | | / | | / | |
| 2 | 6 | 10110 | | | / | | / | | / | |
| 2 | 7 | 10111 | | | | | / | | / | |
| 3 | 0 | 11000 | | | | | | | | |
| 3 | 1 | 11001 | | | | | | | | / |
| 3 | 2 | 11010 | | | | | / | | | |
| 3 | 3 | 11011 | | | | | / | | / | |
| 3 | 4 | 11100 | | | | | | | | |
| 3 | 5 | 11101 | / | | | / | | | | / |
| 3 | 6 | 11110 | | | | / | | | | / |
| 3 | 7 | 11111 | | | / | | | | / | |

APPENDIX EE. STG MICRO-CODE GENERATOR ROM 3402

| OCTAL ADDRESS | | BINARY ADDRESS $A_4$---$A_0$ | SAVE $B_7$ | MUX-ADD-1 $B_6$ | MUX-ADD-0 $B_5$ | CNT-DN $B_4$ | CNT-UP $B_3$ | POP $B_2$ | CLEAR $B_1$ | PUSH $B_0$ |
|---|---|---|---|---|---|---|---|---|---|---|
| 0 | 0 | 00000 | | | | | | | | |
| 0 | 1 | 00001 | | | | | | | 1 | |
| 0 | 2 | 00010 | 1 | | | | | | | |
| 0 | 3 | 00011 | | | | | | | | |
| 0 | 4 | 00100 | | | | | | | | 1 |
| 0 | 5 | 00101 | | 1 | | | | | | |
| 0 | 6 | 00110 | | 1 | | 1 | | 1 | | |
| 0 | 7 | 00111 | | | 1 | | | | | |
| 1 | 0 | 01000 | | | | | | | | |
| 1 | 1 | 01001 | | | | | | | 1 | |
| 1 | 2 | 01010 | 1 | | | | | | | |
| 1 | 3 | 01011 | | | | | | | | |
| 1 | 4 | 01100 | | | | | 0 | | | 1 |
| 1 | 5 | 01101 | | 1 | | | | | | |
| 1 | 6 | 01110 | | 1 | | 0 | | 1 | | |
| 1 | 7 | 01111 | | | 1 | | | | | |
| 2 | 0 | 10000 | | | | | | | | |
| 2 | 1 | 10001 | | | | | | | 1 | |
| 2 | 2 | 10010 | 1 | | | | | | | |
| 2 | 3 | 10011 | | | | | | | | |
| 2 | 4 | 10100 | | | | | | | | 1 |
| 2 | 5 | 10101 | | 1 | | | | | | |
| 2 | 6 | 10110 | | 1 | | 0 | | 1 | | |
| 2 | 7 | 10111 | | | 1 | | | | | |
| 3 | 0 | 11000 | | | | | | | | |
| 3 | 1 | 11001 | | | | | | | | |
| 3 | 2 | 11010 | | 1 | | 1 | | | | |
| 3 | 3 | 11011 | | 1 | | | | | | |
| 3 | 4 | 11100 | | | | | | | | |
| 3 | 5 | 11101 | | | | 1 | 0 | | | 1 |
| 3 | 6 | 11110 | | | | | | | | 1 |
| 3 | 7 | 11111 | | | | | 1 | | | 1 |

APPENDIX FF. STG MICRO-CODE GENERATOR ROM 3403

| OCTAL ADDRESS | | BINARY ADDRESS $A_4$---$A_0$ | RAM-A9 $B_7$ | RAM-A8 $B_6$ | RAM-RW $B_5$ | FIFO-LIFO $B_4$ | USE-LGLF $B_3$ | VALUE $B_2$ | LOAD-DOUT $B_1$ | LOAD-EN $B_0$ |
|---|---|---|---|---|---|---|---|---|---|---|
| 0 | 0 | 00000 | | | | | | | | |
| 0 | 1 | 00001 | | | | 1 | | | | |
| 0 | 2 | 00010 | | | | | | | | |
| 0 | 3 | 00011 | | | | | | | | |
| 0 | 4 | 00100 | 1 | | | | | | | 1 |
| 0 | 5 | 00101 | 1 | | | | | | 1 | |
| 0 | 6 | 00110 | 1 | | | | | | 1 | |
| 0 | 7 | 00111 | | | | | | | 1 | |
| 1 | 0 | 01000 | | | | 1 | 1 | | | |
| 1 | 1 | 01001 | | | | | | | | |
| 1 | 2 | 01010 | | | | | | | | |
| 1 | 3 | 01011 | | | | | | | | |
| 1 | 4 | 01100 | | | | | | | | 1 |
| 1 | 5 | 01101 | | | | | | | 1 | |
| 1 | 6 | 01110 | | | | | | | 1 | |
| 1 | 7 | 01111 | | | | | | | 1 | |
| 2 | 0 | 10000 | | | | | | | | 1 |
| 2 | 1 | 10001 | | | | | | | | |
| 2 | 2 | 10010 | | | | | | | | |
| 2 | 3 | 10011 | | | | | | | | |
| 2 | 4 | 10100 | | 1 | | | | | | 1 |
| 2 | 5 | 10101 | | 1 | | | | | 1 | |
| 2 | 6 | 10110 | | 1 | | | | | 1 | |
| 2 | 7 | 10111 | | | | | | | 1 | |
| 3 | 0 | 11000 | | | | 1 | | 1 | | |
| 3 | 1 | 11001 | | | | 1 | | | | |
| 3 | 2 | 11010 | | | | | | | | |
| 3 | 3 | 11011 | | 1 | | | 1 | | | |
| 3 | 4 | 11100 | | | | | 1 | 1 | | |
| 3 | 5 | 11101 | 1 | | | | | 1 | | 1 |
| 3 | 6 | 11110 | | | | | | | | |
| 3 | 7 | 11111 | | 1 | | | | | | |

APPENDIX GG. STG MICRO-CODE GENERATOR ROM 3404

| | ADDRESS OCT. | ADDRESS DEC. | $Q_3$ VRT-RAM | $Q_2$ A9 | $Q_1$ DOWN | $Q_0$ UP |
|---|---|---|---|---|---|---|
| READ LEFT | 000 | 000 | 0 | 0 | 0 | 0 |
| | 001 | 001 | | | | |
| | 002 | 002 | | | | |
| | 003 | 003 | | | | |
| | 004 | 004 | | | | |
| | 005 | 005 | | | | |
| | 006 | 006 | | | | |
| | 007 | 007 | | | | |
| | 010 | 008 | | | | |
| | 011 | 009 | | | | |
| | 012 | 010 | | | | |
| | 013 | 011 | | | | |
| | 014 | 012 | | | | |
| | 015 | 013 | | | | |
| | 016 | 014 | | | | |
| | 017 | 015 | 0 | 0 | 0 | 0 |
| READ RIGHT | 020 | 016 | 0 | 0 | 0 | 0 |
| | 021 | 017 | | | | |
| | 022 | 018 | | | | |
| | 023 | 019 | | | | |
| | 024 | 020 | | | | |
| | 025 | 021 | | | | |
| | 026 | 022 | | | | |
| | 027 | 023 | | 0 | | |
| | 030 | 024 | | | | |
| | 031 | 025 | | | | |
| | 032 | 026 | | | | |
| | 033 | 027 | | | | |
| | 034 | 028 | | | | |
| | 035 | 029 | | | | |
| | 036 | 030 | | | | |
| | 037 | 031 | 0 | | 0 | 0 |

| | ADDRESS OCT. | ADDRESS DEC. | $Q_3$ | $Q_2$ | $Q_1$ | $Q_0$ |
|---|---|---|---|---|---|---|
| MATCH READ | 040 | 032 | 0 | 1 | 0 | 0 |
| | 041 | 033 | | | | |
| | 042 | 034 | | | | |
| | 043 | 035 | | | | |
| | 044 | 036 | | | | |
| | 045 | 037 | | | | |
| | 046 | 038 | | | | |
| | 047 | 039 | | | | |
| | 050 | 040 | | | | |
| | 051 | 041 | | | | |
| | 052 | 042 | | | | |
| | 053 | 043 | | | | |
| | 054 | 044 | | | | |
| | 055 | 045 | | | | |
| | 056 | 046 | | | | |
| | 057 | 047 | 0 | 1 | 0 | 0 |
| NOP | 060 | 048 | | | | |
| | 061 | 049 | | | | |
| | 062 | 050 | | | | |
| | 063 | 051 | | | | |
| | 064 | 052 | | | | |
| | 065 | 053 | | | | |
| | 066 | 054 | | | | |
| | 067 | 055 | | | | |
| | 070 | 056 | | | | |
| | 071 | 057 | | | | |
| | 072 | 058 | | | | |
| | 073 | 059 | | | | |
| | 074 | 060 | | | | |
| | 075 | 061 | | | | |
| | 076 | 062 | | | | |
| | 077 | 063 | | | | |

| | ADDRESS OCT. | DEC. | $Q_3$ | $Q_2$ | $Q_1$ | $Q_0$ |
|---|---|---|---|---|---|---|
| PUSH LEFT | 10 0 | 064 | 1 | 0 | 0 | 1 |
| | 10 1 | 065 | 0 | | | 0 |
| | 10 2 | 066 | 1 | | | 1 |
| | 10 3 | 067 | 0 | | | 0 |
| | 10 4 | 068 | 1 | | | 1 |
| | 10 5 | 069 | 0 | | | 0 |
| | 10 6 | 070 | 1 | | | 1 |
| | 10 7 | 071 | 0 | | | 0 |
| | 11 0 | 072 | 1 | | | 1 |
| | 11 1 | 073 | 0 | | | 0 |
| | 11 2 | 074 | 1 | | | 1 |
| | 11 3 | 075 | 0 | | | 0 |
| | 11 4 | 076 | 1 | | | 1 |
| | 11 5 | 077 | 0 | | | 0 |
| | 11 6 | 078 | 1 | | | 1 |
| | 11 7 | 079 | 0 | 0 | 0 | 0 |
| RIGHT PUSH | 12 0 | 080 | 1 | 0 | 0 | 1 |
| | 12 1 | 081 | 0 | 0 | | 0 |
| | 12 2 | 082 | 1 | 0 | | 1 |
| | 12 3 | 083 | 0 | 0 | | 0 |
| | 12 4 | 084 | 1 | 0 | | 1 |
| | 12 5 | 085 | 0 | 0 | | 0 |
| | 12 6 | 086 | 1 | 0 | | 1 |
| | 12 7 | 087 | 0 | 0 | | 0 |
| | 13 0 | 088 | 1 | 1 | | 1 |
| | 13 1 | 089 | 0 | 1 | | 0 |
| | 13 2 | 090 | 1 | 1 | | 1 |
| | 13 3 | 091 | 0 | 1 | | 0 |
| | 13 4 | 092 | 1 | 1 | | 1 |
| | 13 5 | 093 | 0 | 1 | | 0 |
| | 13 6 | 094 | 1 | 1 | | 1 |
| | 13 7 | 095 | 0 | 1 | 0 | 0 |

| | ADDRESS OCT. | DEC. | $Q_3$ | $Q_2$ | $Q_1$ | $Q_0$ |
|---|---|---|---|---|---|---|
| MATCH PUSH | 14 0 | 096 | 1 | 1 | 0 | 1 |
| | 14 1 | 097 | 0 | | | 0 |
| | 14 2 | 098 | 1 | | | 1 |
| | 14 3 | 099 | 0 | | | 0 |
| | 14 4 | 100 | 1 | | | 1 |
| | 14 5 | 101 | 0 | | | 0 |
| | 14 6 | 102 | 1 | | | 1 |
| | 14 7 | 103 | 0 | | | 0 |
| | 15 0 | 104 | 1 | | | 1 |
| | 15 1 | 105 | 0 | | | 0 |
| | 15 2 | 106 | 1 | | | 1 |
| | 15 3 | 107 | 0 | | | 0 |
| | 15 4 | 108 | 1 | | | 1 |
| | 15 5 | 109 | 0 | | | 0 |
| | 15 6 | 110 | 1 | | | 1 |
| | 15 7 | 111 | 0 | 1 | 0 | 0 |
| | 16 0 | 112 | | | | |
| | 16 1 | 113 | | | | |
| | 16 2 | 114 | | | | |
| | 16 3 | 115 | | | | |
| | 16 4 | 116 | | | | |
| | 16 5 | 117 | | | | |
| | 16 6 | 118 | | | | |
| | 16 7 | 119 | | | | |
| | 17 0 | 120 | | | | |
| | 17 1 | 121 | | | | |
| | 17 2 | 122 | | | | |
| | 17 3 | 123 | | | | |
| | 17 4 | 124 | | | | |
| | 17 5 | 125 | | | | |
| | 17 6 | 126 | | | | |
| | 17 7 | 127 | | | | |

| | ADDRESS OCT. | DEC. | $Q_3$ | $Q_2$ | $Q_1$ | $Q_0$ |
|---|---|---|---|---|---|---|
| POP LEFT | 200 | 128 | 0 | 0 | 1 | 0 |
| | 201 | 129 | 0 | | 1 | |
| | 202 | 130 | 1 | | 0 | |
| | 203 | 131 | 1 | | 0 | |
| | 204 | 132 | 0 | | 1 | |
| | 205 | 133 | 0 | | 1 | |
| | 206 | 134 | 1 | | 0 | |
| | 207 | 135 | 1 | | 0 | |
| | 210 | 136 | 0 | | 1 | |
| | 211 | 137 | 0 | | 1 | |
| | 212 | 138 | 1 | | 0 | |
| | 213 | 139 | 1 | | 0 | |
| | 214 | 140 | 0 | | 1 | |
| | 215 | 141 | 0 | | 1 | |
| | 216 | 142 | 1 | | 0 | |
| | 217 | 143 | 1 | 0 | 0 | 0 |
| RIGHT POP | 220 | 144 | 0 | 0 | 1 | 0 |
| | 221 | 145 | 0 | | 1 | |
| | 222 | 146 | | | 0 | |
| | 223 | 147 | | | 0 | |
| | 224 | 148 | | | 1 | |
| | 225 | 149 | | | 1 | |
| | 226 | 150 | | | 0 | |
| | 227 | 151 | | 0 | 0 | |
| | 230 | 152 | | 1 | 1 | |
| | 231 | 153 | | | 1 | |
| | 232 | 154 | | | 0 | |
| | 233 | 155 | | | 0 | |
| | 234 | 156 | | | 1 | |
| | 235 | 157 | | | 1 | |
| | 236 | 158 | | | 0 | |
| | 237 | 159 | 0 | 1 | 0 | 0 |

| | ADDRESS OCT. | DEC. | $Q_3$ | $Q_2$ | $Q_1$ | $Q_0$ |
|---|---|---|---|---|---|---|
| MATCH POP | 240 | 160 | 0 | 1 | 1 | 0 |
| | 241 | 161 | | | 1 | 0 |
| | 242 | 162 | | | 0 | 0 |
| | 243 | 163 | | | 0 | 0 |
| | 244 | 164 | | | 0 | 1 |
| | 245 | 165 | | | 0 | 1 |
| | 246 | 166 | | | 0 | 0 |
| | 247 | 167 | | | 0 | 0 |
| | 250 | 168 | | | 1 | 0 |
| | 251 | 169 | | | 1 | 0 |
| | 252 | 170 | | | 0 | 0 |
| | 253 | 171 | | | 0 | 0 |
| | 254 | 172 | | | 0 | 1 |
| | 255 | 173 | | | 0 | 1 |
| | 256 | 174 | | | 0 | 0 |
| | 257 | 175 | 0 | 1 | 0 | 0 |
| | 260 | 176 | | | | |
| | 261 | 177 | | | | |
| | 262 | 178 | | | | |
| | 263 | 179 | | | | |
| | 264 | 180 | | | | |
| | 265 | 181 | | | | |
| | 266 | 182 | | | | |
| | 267 | 183 | | | | |
| | 270 | 184 | | | | |
| | 271 | 185 | | | | |
| | 272 | 186 | | | | |
| | 273 | 187 | | | | |
| | 274 | 188 | | | | |
| | 275 | 189 | | | | |
| | 276 | 190 | | | | |
| | 277 | 191 | | | | |

APPENDIX HH. DEVICES USED TO IMPLEMENT AN EXEMPLARY STG

All Boolean equations and gates are implemented using the following devices:

| Function | Manufacturer | Catalog Number |
|---|---|---|
| NAND | TI | 74LS00 |
| NAND | TI | 74LS10 |
| INVERTER | TI | 74LS04 |
| NOR | TI | 74LS02 |

Other devices used:

| Figure Ref. No. | Manuf. | Cat. No. |
|---|---|---|
| 3207 | TI | 74LS138 |
| 3206 | TI | 74193 |
| 3203 | TI | 74LS109 |
| 3301, 3302 | TI | 74LS298 |
| 3303 | TI | 74LS153 |
| 3401, 3402, 3403 | SIG | 8223 |
| 3404 | MM | 6300 |

Manufacturer Codes:

TI = Texas Instruments, Inc.
SIG = Signetics, Inc.

| | | | |
|---|---|---|---|
| 3501 | SIG | 82S11 | MM = Monolithic Memories Inc. |
| 3601 | TI | 74LS170 | |
| 3602 | TI | 74193 | |
| 3603, 3604 | TI | 74LS109 | |
| 3701 | TI | 74LS194 | |
| 3702 | TI | 74LS157 | |
| 3703 | TI | 7485 | |
| 3704, 3705 | TI | 74LS109 | |
| 3801 | TI | 7485 | |

APPENDIX II. SEM PROCESSOR SELF INSTRUCTION SET

| Self Code | | Function |
|---|---|---|
| 0 0 | NOP | increments program counter only |
| 0 1 | PASS | passes an op-code from the sequence ROM and goes to the next sequence address after the receiving unit goes busy |
| 0 2 | PASS W | passes an op-code from the sequence ROM and goes to the next sequence address when the receiving unit's busy has gone up and down |
| 0 3 | DIRECT | passes out the op-code in the program register, increments the program counter and causes the SEM to go not busy |
| 0 4 | JUMP | jumps to a new sequence address provided by the sequence ROM |
| 0 5 | CALL | increments the stack counter, selects the program register input to the main mux, stack (PREG), loads the sequence ROM bits 0-7 into the PREG and PCTR |
| 0 6 | SKIP | if the test condition is met the PCTR is incremented twice, otherwise it is incremented once. The test condition is determined by the sequence ROM bits 0-3 |
| 0 7 | PUSH | increments the stack counter, selects bits 0-7 of the sequence ROM as inputs to the main mux, loads the output of the main mux into the stack, and then increments the PCTR |
| 1 0 | MICRO | enables the $\mu$-ROM to expand the self codes from four to nine bits |
| 1 1 | LOAD | select an input to the main mux, load the mux output into the data register, and increment the PCTR |
| 1 6 | RETC | if a condition selected by bits 0-3 of the sequence ROM outputs is met the stack input to the main mux is selected, the PREG and PCTR are loaded with the contents of the stack, the stack counter is decremented and the SEM forced to go not busy. If the test condition is not met the PCTR is incremented and the sequence continues |
| 1 7 | RET | the same as if the test condition was met for RETC |

APPENDIX JJ. SEM SELF CODE ROM

Note: Outputs for Addresses Not Shown are 1111 (RETURN/NOP instruction)

| ADDRESS OCT. | ADDRESS DEC. | $Q_3$ | $Q_2$ | $Q_1$ | $Q_0$ |
|---|---|---|---|---|---|
| 20 0 | 128 | 0 | 0 | | |
| 20 1 | 129 | | | | |
| 20 2 | 130 | | | | |
| 20 3 | 131 | | | | |
| 20 4 | 132 | | | | |
| 20 5 | 133 | | | | |
| 20 6 | 134 | | | | |
| 20 7 | 135 | | | | |
| 20 0 | 136 | | | | |
| 21 1 | 137 | | | | |
| 21 2 | 138 | | | | |
| 21 3 | 139 | | | | |
| 21 4 | 140 | | | | |
| 21 5 | 141 | | | | |
| 21 6 | 142 | | | | |
| 21 7 | 143 | | | | |
| 22 0 | 144 | | | | |
| 22 1 | 145 | | | | |
| 22 2 | 146 | | | | |
| 22 3 | 147 | | | | |
| 22 4 | 148 | | | | |
| 22 5 | 149 | | | | |
| 22 6 | 150 | | | | |
| 22 7 | 151 | | | | |
| 23 0 | 152 | | | | |
| 23 1 | 153 | | | | |
| 23 2 | 154 | | | | |
| 23 3 | 155 | | | | |
| 23 4 | 156 | | | | |
| 23 5 | 157 | | | | |
| 23 6 | 158 | ↓ | ↓ | | |
| 23 7 | 159 | 0 | 0 | | |

| ADDRESS OCT. | ADDRESS DEC. | $Q_3$ | $Q_2$ | $Q_1$ | $Q_0$ |
|---|---|---|---|---|---|
| 24 0 | 160 | 0 | 0 | | |
| 24 1 | 161 | | | | |
| 24 2 | 162 | | | | |
| 24 3 | 163 | | | | |
| 24 4 | 164 | | | | |
| 24 5 | 165 | | | | |
| 24 6 | 166 | | | | |
| 24 7 | 167 | | | | |
| 25 0 | 168 | | | | |
| 25 1 | 169 | | | | |
| 25 2 | 170 | | | | |
| 25 3 | 171 | | | | |
| 25 4 | 172 | | | | |
| 25 5 | 173 | | | | |
| 25 6 | 174 | | | | |
| 25 7 | 175 | | | | |
| 26 0 | 176 | | | | |
| 26 1 | 177 | | | | |
| 26 2 | 178 | | | | |
| 26 3 | 179 | | | | |
| 26 4 | 180 | | | | |
| 26 5 | 181 | | | | |
| 26 6 | 182 | | | | |
| 26 7 | 183 | | | | |
| 27 0 | 184 | | | | |
| 27 1 | 185 | | | | |
| 27 2 | 186 | | | | |
| 27 3 | 187 | | | | |
| 27 4 | 188 | | | | |
| 27 5 | 189 | | | | |
| 27 6 | 190 | ↓ | ↓ | | |
| 27 7 | 191 | 0 | 0 | | |

| ADDRESS OCT. | ADDRESS DEC. | $Q_3$ | $Q_2$ | $Q_1$ | $Q_0$ |
|---|---|---|---|---|---|
| 300 | 192 | | | | |
| 301 | 193 | 0 | | 0 | 0 |
| 302 | 194 | | | | |
| 303 | 195 | | | | |
| 304 | 196 | | | | |
| 305 | 197 | | | | |
| 306 | 198 | | | | |
| 307 | 199 | | | | |
| 310 | 200 | | | | |
| 311 | 201 | | | | |
| 312 | 202 | | | | |
| 313 | 203 | | | | |
| 314 | 204 | | | | |
| 315 | 205 | | | | |
| 316 | 206 | | | | |
| 317 | 207 | | | | |
| 320 | 208 | | | | |
| 321 | 209 | | | | |
| 322 | 210 | | | | |
| 323 | 211 | | | | |
| 324 | 212 | | | | |
| 325 | 213 | | | | |
| 326 | 214 | | | | |
| 327 | 215 | | | | |
| 330 | 216 | | | | |
| 331 | 217 | | | | |
| 332 | 218 | | | | |
| 333 | 219 | | | | |
| 334 | 220 | | | | |
| 335 | 221 | | | | |
| 336 | 222 | ↓ | | ↓ | ↓ |
| 337 | 223 | 0 | | 0 | 0 |

APPENDIX KK. SEM DESTINATION ROM

Note 1. For addresses not shown there are no processor assignments
2. Output 1000 is NUM processor
3. Output 1001 is STG processor

| ADDRESS OCT. | ADDRESS DEC. | $Q_3$ | $Q_2$ | $Q_1$ | $Q_0$ |
|---|---|---|---|---|---|
| 24 0 | 160 | | O | O | O |
| 24 1 | 161 | | | | |
| 24 2 | 162 | | | | |
| 24 3 | 163 | | | | |
| 24 4 | 164 | | | | |
| 24 5 | 165 | | | | |
| 24 6 | 166 | | | | |
| 24 7 | 167 | | | | |
| 25 0 | 168 | | | | |
| 25 1 | 169 | | | | |
| 25 2 | 170 | | | | |
| 25 3 | 171 | | | | |
| 25 4 | 172 | | | | |
| 25 5 | 173 | | | | |
| 25 6 | 174 | | | | |
| 25 7 | 175 | | | | |
| 26 0 | 176 | | | | |
| 26 1 | 177 | | | | |
| 26 2 | 178 | | | | |
| 26 3 | 179 | | | | |
| 26 4 | 180 | | | | |
| 26 5 | 181 | | | | |
| 26 6 | 182 | | | | |
| 26 7 | 183 | | | | |
| 27 0 | 184 | | | | |
| 27 1 | 185 | | | | |
| 27 2 | 186 | | | | |
| 27 3 | 187 | | | | |
| 27 4 | 188 | | | | |
| 27 5 | 189 | | | | |
| 27 6 | 190 | | ↓ | ↓ | ↓ |
| 27 7 | 191 | | O | O | O |

| ADDRESS OCT. | ADDRESS DEC. | $Q_3$ | $Q_2$ | $Q_1$ | $Q_0$ |
|---|---|---|---|---|---|
| 20 0 | 128 | | O | O | |
| 20 1 | 129 | | | | |
| 20 2 | 130 | | | | |
| 20 3 | 131 | | | | |
| 20 4 | 132 | | | | |
| 20 5 | 133 | | | | |
| 20 6 | 134 | | | | |
| 20 7 | 135 | | | | |
| 20 0 | 136 | | | | |
| 21 1 | 137 | | | | |
| 21 2 | 138 | | | | |
| 21 3 | 139 | | | | |
| 21 4 | 140 | | | | |
| 21 5 | 141 | | | | |
| 21 6 | 142 | | | | |
| 21 7 | 143 | | | | |
| 22 0 | 144 | | | | |
| 22 1 | 145 | | | | |
| 22 2 | 146 | | | | |
| 22 3 | 147 | | | | |
| 22 4 | 148 | | | | |
| 22 5 | 149 | | | | |
| 22 6 | 150 | | | | |
| 22 7 | 151 | | | | |
| 23 0 | 152 | | | | |
| 23 1 | 153 | | | | |
| 23 2 | 154 | | | | |
| 23 3 | 155 | | | | |
| 23 4 | 156 | | | | |
| 23 5 | 157 | | | | |
| 23 6 | 158 | | ↓ | ↓ | |
| 23 7 | 159 | | O | O | |

APPENDIX LL. SEM SELF SEQUENCE ROM

Address (state)

Self-Code

Self-Instruction Operand

| Address (state) | Self-Code | Self-Instruction Operand |
|---|---|---|
| 0 | 00001111 | 11111111 |
| 1 | 00000001 | 10110010 |
| 2 | 00000001 | 10100010 |
| 3 | 00001000 | 00000010 |
| 4 | 00001110 | 00000001 |
| 5 | 00000001 | 10111000 |
| 6 | 00001000 | 00000011 |
| 7 | 00000001 | 10100011 |
| 8 | 00000001 | 10100110 |
| 9 | 00000001 | 10110101 |
| 10 | 00000010 | 10111010 |
| 11 | 00000110 | 00000011 |
| 12 | 00000100 | 00010100 |
| 13 | 00000110 | 00000001 |
| 14 | 00000100 | 00010001 |
| 15 | 00000001 | 10110110 |
| 16 | 00001111 | 11111111 |
| 17 | 00000001 | 10100110 |
| 18 | 00000001 | 10110110 |
| 19 | 00000100 | 00001010 |
| 20 | 00000001 | 10110011 |
| 21 | 00001000 | 00000010 |
| 22 | 00001111 | 11111111 |
| 23 | 00000001 | 10100101 |
| 24 | 00001000 | 00000010 |
| 25 | 00001110 | 00000001 |
| 26 | 00000001 | 10101010 |
| 27 | 00001000 | 00000011 |
| 28 | 00000001 | 10101101 |
| 29 | 00000010 | 10111010 |
| 30 | 00001110 | 00000001 |
| 31 | 00000110 | 00010011 |
| 32 | 00000100 | 00100100 |
| 33 | 00000001 | 10101011 |
| 34 | 00001000 | 00000010 |
| 35 | 00001111 | 11111111 |
| 36 | 00000001 | 10100110 |
| 37 | 00000001 | 10101110 |
| 38 | 00000100 | 00011101 |
| 39 | 00000010 | 10100101 |
| 40 | 00001110 | 00000001 |
| 41 | 00000001 | 10111111 |
| 42 | 00000001 | 10100110 |
| 43 | 00000100 | 00101000 |
| 44 | 00000010 | 10100010 |
| 45 | 00001110 | 00000001 |
| 46 | 00000001 | 10111000 |
| 47 | 00000001 | 10100011 |
| 48 | 00000010 | 10100110 |
| 49 | 00000110 | 00010001 |
| 50 | 00000100 | 00110101 |
| 51 | 00000001 | 10111110 |
| 52 | 00000100 | 00110000 |
| 53 | 00000001 | 10111110 |
| 54 | 00001111 | 11111111 |
| 55 | 00000001 | 10101101 |
| 56 | 00001000 | 00000010 |
| 57 | 00001110 | 00000001 |
| 58 | 00000001 | 10111111 |
| 59 | 00001000 | 00000011 |
| 60 | 00000001 | 10101110 |
| 61 | 00001111 | 11111111 |
| 62 | 00000010 | 10000110 |
| 63 | 00000100 | 11111101 |
| 64 | 00000001 | 10100010 |
| 65 | 00001000 | 00000011 |
| 66 | 00001110 | 00000001 |
| 67 | 00000001 | 10110010 |
| 68 | 00000010 | 10101010 |
| 69 | 00000110 | 00010001 |
| 70 | 00000100 | 01001111 |
| 71 | 00000001 | 10101101 |
| 72 | 00000010 | 10111010 |
| 73 | 00000110 | 00010011 |
| 74 | 00000100 | 01010011 |
| 75 | 00000001 | 10111111 |
| 76 | 00000010 | 10101110 |
| 77 | 00000110 | 00000001 |
| 78 | 00000100 | 01001000 |
| 79 | 00001000 | 00000010 |
| 80 | 00000001 | 10110011 |
| 81 | 00000001 | 10101011 |
| 82 | 00001111 | 11111111 |
| 83 | 00000001 | 10111111 |
| 84 | 00000001 | 10100110 |
| 85 | 00000001 | 10101110 |
| 86 | 00000010 | 10111010 |
| 87 | 00001110 | 00000001 |
| 88 | 00000110 | 00010011 |
| 89 | 00000100 | 01010011 |
| 90 | 00000001 | 10100011 |
| 91 | 00000100 | 01001000 |
| 92 | 00000001 | 10101010 |
| 93 | 00000001 | 10110010 |
| 94 | 00000001 | 10100010 |
| 95 | 00001000 | 00000011 |
| 96 | 00001110 | 00000001 |
| 97 | 00000001 | 10111000 |
| 98 | 00000001 | 10100011 |
| 99 | 00000001 | 10100110 |
| 100 | 00000001 | 10110101 |
| 101 | 00000110 | 00010001 |
| 102 | 00000100 | 01101110 |
| 103 | 00000010 | 10111010 |
| 104 | 00000110 | 00010011 |
| 105 | 00000100 | 01110010 |
| 106 | 00000001 | 10111110 |
| 107 | 00000010 | 10110110 |
| 108 | 00000110 | 00000001 |
| 109 | 00000100 | 01100111 |
| 110 | 00000001 | 10110011 |
| 111 | 00001000 | 00000010 |
| 112 | 00000001 | 10101011 |
| 113 | 00001111 | 11111111 |
| 114 | 00000110 | 00010001 |
| 115 | 00000100 | 01111011 |
| 116 | 00000001 | 10111110 |
| 117 | 00000001 | 10100110 |
| 118 | 00000001 | 10110110 |
| 119 | 00000010 | 10111010 |
| 120 | 00000110 | 00010011 |
| 121 | 00000100 | 01110010 |
| 122 | 00000100 | 01100010 |
| 123 | 00000001 | 10111110 |
| 124 | 00000001 | 10110110 |
| 125 | 00001111 | 11111111 |
| 126 | 11111111 | 11111111 |
| 127 | 11111111 | 11111111 |
| 128 | 00000001 | 10110101 |
| 129 | 00001000 | 00000010 |
| 130 | 00001110 | 00000001 |
| 131 | 00000001 | 10111110 |
| 132 | 00001000 | 00000011 |
| 133 | 00000001 | 10110110 |
| 134 | 00001111 | 11111111 |
| 135 | 00000001 | 10010000 |
| 136 | 00000001 | 10010110 |
| 137 | 00000001 | 10001100 |
| 138 | 00000001 | 10010111 |
| 139 | 00000001 | 10000111 |
| 140 | 00000001 | 10011101 |
| 141 | 00000001 | 10001111 |
| 142 | 00001111 | 11111111 |
| 143 | 00000001 | 10001000 |
| 144 | 00000001 | 10001111 |
| 145 | 00000001 | 10011001 |
| 146 | 00001111 | 11111111 |
| 147 | 00000001 | 10010110 |
| 148 | 00000001 | 10000111 |
| 149 | 00000001 | 10001101 |
| 150 | 00001000 | 00000011 |
| 151 | 00001110 | 00000110 |
| 152 | 00001000 | 00000010 |
| 153 | 00001111 | 11111111 |
| 154 | 00001000 | 00000011 |
| 155 | 00000001 | 10110000 |
| 156 | 00000010 | 10111010 |
| 157 | 00001110 | 00000011 |
| 158 | 00001000 | 00000010 |
| 159 | 00001111 | 11111111 |
| 160 | 00000001 | 10010110 |
| 161 | 00000001 | 10000111 |
| 162 | 00000001 | 10001101 |
| 163 | 00000010 | 10011101 |
| 164 | 00001000 | 00000011 |
| 165 | 00001110 | 00000100 |
| 166 | 00001000 | 00000010 |
| 167 | 00001111 | 11111111 |
| 168 | 00000001 | 10000111 |
| 169 | 00000001 | 10011111 |
| 170 | 00000001 | 10001011 |
| 171 | 00000001 | 10011110 |
| 172 | 00000001 | 10011110 |
| 173 | 00000001 | 10010111 |
| 174 | 00000001 | 10011110 |
| 175 | 00000001 | 10011110 |
| 176 | 00000001 | 10010100 |
| 177 | 00000001 | 10001111 |
| 178 | 00001111 | 11111111 |
| 179 | 00000001 | 10000111 |
| 180 | 00000001 | 10011111 |
| 181 | 00000001 | 10001011 |
| 182 | 00000001 | 10001110 |
| 183 | 00000001 | 10011110 |
| 184 | 00000001 | 10011110 |
| 185 | 00000001 | 10010101 |
| 186 | 00000001 | 10011111 |
| 187 | 00000001 | 10001110 |
| 188 | 00000001 | 10001111 |
| 189 | 00000001 | 10010111 |
| 190 | 00001111 | 11111111 |
| 191 | 11111111 | 11111111 |
| 192 | 00001111 | 11111111 |
| 193 | 00000100 | 10000111 |
| 194 | 00000100 | 10101000 |
| 195 | 00000100 | 10110011 |
| 196 | 00000100 | 10001111 |
| 197 | 00000100 | 10010011 |
| 198 | 00000100 | 10100000 |
| 199 | 00000100 | 11011000 |
| 200 | 00000100 | 01000000 |
| 201 | 00000100 | 01011100 |
| 202 | 00000100 | 00100111 |
| 203 | 00000100 | 00101100 |
| 204 | 00000100 | 00000001 |
| 205 | 00000100 | 00010111 |
| 206 | 00000100 | 00110111 |
| 207 | 00000100 | 10000000 |
| 208 | 11111111 | 11111111 |
| 209 | 11111111 | 11111111 |
| 210 | 11111111 | 11111111 |
| 211 | 00000100 | 00111110 |
| 212 | 00000100 | 10011010 |
| 213 | 00000100 | 11011011 |
| 214 | 00000100 | 11011110 |
| 215 | 00000100 | 11100001 |
| 216 | 00000010 | 10000110 |
| 217 | 00001001 | 00001101 |
| 218 | 00001111 | 11111111 |
| 219 | 00000010 | 10100101 |
| 220 | 00001001 | 00001110 |
| 221 | 00001111 | 11111111 |
| 222 | 00000010 | 10110101 |
| 223 | 00001001 | 00001110 |
| 224 | 00001111 | 11111111 |
| 225 | 00000010 | 10101101 |
| 226 | 00001001 | 00001110 |
| 227 | 00001111 | 11111111 |
| 228 | 11111111 | 11111111 |
| 229 | 11111111 | 11111111 |
| 230 | 11111111 | 11111111 |

| | | | | | | | |
|---|---|---|---|---|---|---|---|
| 231 | 11111111 11111111 | 239 | 11111111 11111111 | 247 | 11111111 11111111 |
| 232 | 11111111 11111111 | 240 | 11111111 11111111 | 248 | 11111111 11111111 |
| 233 | 11111111 11111111 | 241 | 11111111 11111111 | 249 | 11111111 11111111 |
| 234 | 11111111 11111111 | 242 | 11111111 11111111 | 250 | 11111111 11111111 |
| 235 | 11111111 11111111 | 243 | 11111111 11111111 | 251 | 11111111 11111111 |
| 236 | 11111111 11111111 | 244 | 11111111 11111111 | 252 | 11111111 11111111 |
| 237 | 11111111 11111111 | 245 | 11111111 11111111 | 253 | 00001001 00001101 |
| 238 | 11111111 11111111 | 246 | 11111111 11111111 | 254 | 00000001 10101100 |
| | | | | 255 | 00001111 11111111 |

SEM SELF-SEQUENCE MNEMONIC CODING

```
    & COMPH(8) OP-CODE 314
    &
 0  A                  RET                   &
 1  A     /CMPH8       PASS    2(*0262)      & SAVER
 2  A                  PASS    2(*0242)      & SAVEM
 3  A                  MICRO   2(*0002)      & FAIL=1
 4  A                  CRET    2(*0001)      & EMPTY
 5  A                  PASS    2(*0270)      & FIFO
 6  A                  MICRO   2(*0003)      & FAIL=0
 7  A                  PASS    2(*0243)      & RSTRM
 8  A                  PASS    2(*0246)      & POPM
 9  A                  PASS    2(*0265)      & READR
10  A     /ADR1        PASSW   2(*0272)      & COMPM
11  A                  SKIP    2(*0003)      & COMP
12  A                  JUMP    2(/ADR3)      &
13  A                  SKIP    2(*0001)      & EMPTY
14  A                  JUMP    2(/ADR2)      &
15  A                  PASS    2(*0266)      & POPR
16  A                  RET                   &
17  A     /ADR2        PASS    2(*0246)      & POPM
18  A                  PASS    2(*0266)      & POPR
19  A                  JUMP    2(/ADR1)      &
20  A     /ADR3        PASS    2(*0263)      & RSTRR
21  A                  MICRO   2(*0002)      & FAIL=1
22  A                  RET                   &
23  A     /CMPL8       PASS    2(*0245)      &READM
24  A                  MICRO   2(*0002)      &FAIL=1
25  A                  CRET    2(*0001)      &EMPTY
26  A                  PASS    2(*0252)      &SAVEL
27  A                  MICRO   2(*0003)      &FAIL=0
28  A                  PASS    2(*0255)      &READL
29  A     /ADR4        PASSW   2(*0272)      &COMPM
30  A                  CRET    2(*0001)      &EMPTY
31  A                  SKIP    2(*0023)      &NO-COMPARE
32  A                  JUMP    2(/ADR5)      &
33  A                  PASS    2(*0253)      & RESTL
34  A                  MICRO   2(*0002)      & FAIL=1
35  A                  RET                   &
36  A     /ADR5        PASS    2(*0246)      & POPM
37  A                  PASS    2(*0256)      & POPL
38  A                  JUMP    2(/ADR4)      &
    &
    &
    & MTOR OP-CODE 312
    &
39  A     /MTOR8       PASSW   2(*0245)      & READM
40  A     /ADR6        CRET    2(*0001)      & EMPTY
41  A                  PASS    2(*0277)      & PUSHR*
42  A                  PASS    2(*0246)      & POPM
43  A                  JUMP    2(/ADR6)      &
    &
    &
    & MTOL(8) OP-CODE 313
    &
44  A     /MTOL8       PASSW   2(*0242)      & SAVEM
45  A                  CRET    2(*0001)      & EMPTY
46  A                  PASS    2(*0270)      & FIFO
47  A                  PASS    2(*0243)      & RSTRM
48  A     /ADR7        PASSW   2(*0246)      & POPM
49  A                  SKIP    2(*0021)      & NOT-EMPTY
50  A                  JUMP    2(/ADR8)      &
51  A                  PASS    2(*0276)      & PUSHL*
52  A                  JUMP    2(/ADR7)      &
53  A     /ADR8        PASS    2(*0276)      & PUSHL*
54  A                  RET                   &
```

```
& ONE-R(B) OP-CODE 316
&
A     /ONERR          PASS     2(*0255)    & READL
A                     MICRO    2(*0002)    & FAIL=1
A                     CRET     2(*0001)    & EMPTY
A                     PASS     2(*0277)    & PUSHR*
A                     MICRO    2(*0003)    & FAIL=0
A                     PASS     2(*0256)    & POPL
A                     RET                  &
&
&
& READ-NEU TO SEU  OP-CODE 323
A     /RDNS           PASSW    2(*0206)    & NEU-READ
A                     JUMP     2(/ADR18)   & JUMP AROUND DECODE

& MOVE-RIGHT OP-CODE 310
&
A     /MOVRB          PASS     2(*0242)    & SAVEM
A                     MICRO    2(*0003)    & FAIL=0
A                     CRET     2(*0001)    & EMPTY
A                     PASS     2(*0262)    & SAVER
A                     PASSW    2(*0252)    & SAVEL
A                     SKIP     2(*0021)    & NOT-EMPTY
A                     JUMP     2(/ADR10)   &
A                     PASS     2(*0255)    & READL
A     /ADR9           PASSW    2(*0272)    & COMPM
A                     SKIP     2(*0023)    & NO-COMP
A                     JUMP     2(/ADR11)   &
A                     PASS     2(*0277)    & PUSHR*
A                     PASSW    2(*0256)    & POPL
A                     SKIP     2(*0001)    & EMPTY
A                     JUMP     2(/ADR9)    &
A     /ADR10          MICRO    2(*0002)    & FAIL=1
A                     PASS     2(*0263)    & RESTR
A                     PASS     2(*0253)    & RESTL
A                     RET                  &
A     /ADR11          PASS     2(*0277)    & PUSHR*
A                     PASS     2(*0246)    & POPM
A                     PASS     2(*0256)    & POPL
A                     PASSW    2(*0272)    & COMPM
A                     CRET     2(*0001)    & EMPTY
A                     SKIP     2(*0023)    & NO-COMP
A                     JUMP     2(/ADR11)   &
A                     PASS     2(*0243)    & RSTRM
A                     JUMP     2(/ADR9)    &
& MOVE-LEFT OP-CODE 311
&
A     /MOVLB          PASS     2(*0252)    & SAVEL
A                     PASS     2(*0262)    & SAVER
A                     PASS     2(*0242)    & SAVEM
A                     MICRO    2(*0003)    & FAIL=0
A                     CRET     2(*0001)    & EMPTY
A                     PASS     2(*0270)    & FIFO
A     /ADR12          PASS     2(*0243)    & RSTRM
A                     PASS     2(*0246)    & POPM
A                     PASS     2(*0265)    & READR
A                     SKIP     2(*0021)    & NOT-EMPTY
A                     JUMP     2(/ADR14)   &
A     /ADR13          PASSW    2(*0272)    & COMPM
A                     SKIP     2(*0023)    & NO-COMP
A                     JUMP     2(/ADR15)   &
A                     PASS     2(*0276)    & PUSHL*
A                     PASSW    2(*0266)    & POPR
A                     SKIP     2(*0001)    & EMPTY
A                     JUMP     2(/ADR13)   &
A     /ADR14          PASS     2(*0263)    & RESTRR
A                     MICRO    2(*0002)    & FAIL=1
A                     PASS     2(*0253)    & RESTL
A                     RET                  &
A     /ADR15          SKIP     2(*0021)    & NOT-EMPTY
A                     JUMP     2(/ADR16)   &
A                     PASS     2(*0276)    & PUSHL
A                     PASS     2(*0246)    & POPM
A                     PASS     2(*0266)    & POPR
A                     PASSW    2(*0272)    & COMPM
A                     SKIP     2(*0023)    & NOT-COMP
A                     JUMP     2(/ADR15)   &
A                     JUMP     2(/ADR12)   &
A     /ADR16          PASS     2(*0276)    & PUSHL*
A                     PASS     2(*0266)    & POPR
A                     RET                  &
B                     BLANK
B                     BLANK
& ONE-L(B) OP-CODE 317
&
```

```
128  A     /ONELB          PASS     2(*0265)    & READR
129  A                     MICRO    2(*0002)    & FAIL=1
130  A                     CRET     2(*0001)    & EMTY
131  A                     PASS     2(*0276)    & PUSHL
132  A                     MICRO    2(*0003)    & FAIL=0
133  A                     PASS     2(*0266)    & POPR
134  A                     RET                  &
     &
     &
     & TIME(B) OP-CODE 301
     &
135  A     /TIMEB          PASS     2(*0220)    & COPYT
136  A                     PASS     2(*0226)    & QAXO
137  A                     PASS     2(*0214)    & LQMC
138  A                     PASS     2(*0227)    & RAO
139  A                     PASS     2(*0207)    & CBO
140  A                     PASS     2(*0235)    & LRQ
141  A                     PASS     2(*0217)    & TOG
142  A                     RET                  &
     &
     &
     & COMP-RES(B) OP-CODE 304
     &
143  A     /NEGRS          PASS     2(*0210)    & CBI
144  A                     PASS     2(*0217)    & TOG
145  A                     PASS     2(*0231)    & NOTR
146  A                     RET                  &
     & LT-TEST(B) OP-CODE 305
     &
147  A     /RLTO           PASS     2(*0226)    & QAXO
148  A                     PASS     2(*0207)    & CBO
149  A                     PASS     2(*0215)    & LQR
150  A                     MICRO    2(*0003)    & FAIL=0
151  A                     CRET     2(*0006)    & Q-MSB
152  A                     MICRO    2(*0002)    & FAIL=1
153  A                     RET                  &
     &
     &
     & ONE-COMP OP-CODE  324
     &
154  A     /ONECP          MICRO    2(*0003)    & FAIL=0
155  A                     PASS     2(*0260)    & LOAD-SEU-DATA
156  A                     PASSW    2(*0272)    & #*MCOMP
157  A                     CRET     2(*0003)    & SEU-EQ
158  A                     MICRO    2(*0002)    & FAIL=1
159  A                     RET                  &
     &
     & EQ-TEST(B) OP-CODE 306
     &
160  A     /REQO           PASS     2(*0226)    & QAXO
161  A                     PASS     2(*0207)    & CBO
162  A                     PASS     2(*0215)    & LQR
163  A                     PASSW    2(*0235)    & LRQ
164  A                     MICRO    2(*0003)    & FAIL=0
165  A                     CRET     2(*0004)    & EQ
166  A                     MICRO    2(*0002)    & FAIL=1
167  A                     RET                  &
     & MULT(B) OP-CODE 302
     &
168  A     /MULTB          PASS     2(*0207)    & CBO
169  A                     PASS     2(*0237)    & RA15
170  A                     PASS     2(*0213)    & LCR
171  A                     PASS     2(*0236)    & RZERO
172  A                     PASS     2(*0236)    & RZERO
173  A                     PASS     2(*0227)    & RAO
174  A                     PASS     2(*0236)    & RZERO
175  A                     PASS     2(*0236)    & RZERO
176  A                     PASS     2(*0224)    & MULT
177  A                     PASS     2(*0217)    & TOG
178  A                     RET                  &
     &
     &
     & DIVIDE(B) OP-CODE 303
     &
179  A     /DIVB           PASS     2(*0207)    & CBO
180  A                     PASS     2(*0237)    & RA15
181  A                     PASS     2(*0213)    & LCR
182  A                     PASS     2(*0216)    & LRC
183  A                     PASS     2(*0236)    & RZERO
184  A                     PASS     2(*0236)    & RZERO
185  A                     PASS     2(*0225)    & DIV
186  A                     PASS     2(*0237)    & RA15
```

```
187  A              PASS    2(*0216)     & LRC
188  A              PASS    2(*0217)     & TOG
189  A              PASS    2(*0227)          & RAO
190  A              RET                  &
191  B              BLANK                &
     & SEM OP-CODES 300 - 327 DECODED IN THIS SECTION
     &
     &
192  A              RET                       & SEM-NOP           300
193  A              JUMP    2(/TIMEB)         & TIME (A)          301
194  A              JUMP    2(/MULTB)         & MULT (A)          302
195  A              JUMP    2(/DIVB)          & DIVIDE (A)        303
196  A              JUMP    2(/NEGRS)         & COMP-RES (A)      304
197  A              JUMP    2(/HLTO)          & LT-TEST (A)       305
198  A              JUMP    2(/HEQO)          & EQ-TEST (A)       306
199  A              JUMP    2(/RDNEU)         & READ-NEU          307
200  A              JUMP    2(/MOVRB)         & MOVE-R (A)        310
201  A              JUMP    2(/MOVLB)         & MOVE-L (A)        311
202  A              JUMP    2(/MTORB)         & MTOR (A)          312
203  A              JUMP    2(/MTOLB)         & MTOL (A)          313
204  A              JUMP    2(/CMPRB)         & COMPR (A)         314
205  A              JUMP    2(/CMPLB)         & COMPL (A)         315
206  A              JUMP    2(/ONERB)         & ONE-R (A)         316
207  A              JUMP    2(/ONELB)         & ONE-L (A)         317
208  B              BLANK                & SPARE
209  B              BLANK                & SPARE
210  B              BLANK                & SPARE
211  A              JUMP    2(/RDNS)          & READ-NEU -SEU     323
212  A              JUMP    2(/ONECP)         & ONE-COMP          324
213  A              JUMP    2(/RSEUM)         & READ-SEU M        325
214  A              JUMP    2(/RSEUR)         & READ-SEU R        326
215  A              JUMP    2(/RSEUL)         & READ-SEU L        327
     & READ-NEU OP-CODE 307
     &
216  A   /RDNEU     PASS*   2(*0206)     & READ NEU
217  A              LOAD    2(*0015)     & NEU
218  A              RET                  &
     &
     &
     & READ-SEU M  OP-CODE 325
     &
219  A   /RSEUM     PASS*   2(*0245)     & READ M
220  A              LOAD    2(*0016)     & SEU
221  A              RET                  &
     &
     &
     & READ-SEU R  OP-CODE 326
222  A   /RSEUR     PASS*   2(*0265)     & READ R
223  A              LOAD    2(*0016)     & SEU
224  A              RET                  &
     &
     & READ-SEU L  OP-CODE 327
     &
225  A   /RSEUL     PASS*   2(*0255)     & READL
226  A              LOAD    2(*0016)     & SEU
227  A              RET                  &
     *              ALIGN   253
253  A   /ADR18     LOAD    2(*0015)     & NEU
254  A              PASS    2(*0254)     & LPUSH
255  A              RET                  &
     &
     &
     SEND
```

APPENDIX MM. FORM SELF SEQUENCE ROM

| Address (state) | Self-Opcode | Operand |
|---|---|---|
| 0 | 1011 | 0000 0000 |
| 1 | 1010 | 0000 0000 |
| 2 | 1100 | 0000 0000 |
| 3 | 0110 | 0000 0011 |
| 4 | 0100 | 0000 0111 |
| 5 | 0000 | 0001 1111 |
| 6 | 1111 | 0001 0000 |
| 7 | 1001 | 0000 0100 |
| 8 | 0010 | 0011 0011 |
| 9 | 0001 | 0010 0110 |
| 10 | 1111 | 0001 0000 |
| 11 | 1110 | 0000 0000 |
| 12 | 0101 | 0001 0110 |
| 13 | 0010 | 1010 0101 |
| 14 | 0100 | 1111 1101 |
| 15 | 1110 | 0000 0000 |
| 16 | 0111 | 0000 0000 |
| 17 | 1110 | 0000 0000 |
| 18 | 0101 | 0001 0110 |
| 19 | 1001 | 0001 0010 |
| 20 | 0010 | 0011 0011 |
| 21 | 0100 | 1100 0000 |
| 22 | 1010 | 0000 0000 |
| 23 | 0010 | 0011 0011 |
| 24 | 0010 | 0011 1010 |
| 25 | 0010 | 0011 0000 |
| 26 | 0010 | 1010 0010 |
| 27 | 0110 | 0001 0010 |
| 28 | 0100 | 1100 0010 |
| 29 | 0001 | 1010 0011 |
| 30 | 0010 | 0011 1011 |
| 31 | 1111 | 0000 0101 |
| 32 | 0100 | 0001 1101 |
| 33 | 0010 | 1110 0101 |
| 34 | 0010 | 0011 1000 |
| 35 | 0010 | 1110 0110 |
| 36 | 0001 | 1110 1010 |
| 37 | 0100 | 0010 0110 |
| 38 | 0000 | 0001 0000 |
| 39 | 1111 | 0001 0000 |
| 40 | 0010 | 0011 0010 |
| 41 | 0100 | 0000 0001 |
| 42 | 0100 | 0010 1111 |
| 43 | 0100 | 1111 1100 |
| 44 | 0100 | 0010 1000 |
| 45 | 0100 | 0000 1011 |
| 46 | 0100 | 0000 1111 |
| 47 | 1010 | 0000 0000 |
| 48 | 0010 | 0011 0011 |
| 49 | 0010 | 0011 1010 |
| 50 | 0001 | 0011 0010 |
| 51 | 0010 | 1010 0110 |
| 52 | 0110 | 0001 0010 |
| 53 | 0100 | 1100 0010 |
| 54 | 0010 | 1010 0111 |
| 55 | 0010 | 0011 1101 |
| 56 | 0110 | 0000 0101 |
| 57 | 0100 | 0011 0110 |
| 58 | 0010 | 1010 1000 |
| 59 | 1111 | 0001 0010 |
| 60 | 0100 | 1100 0010 |
| 61 | 0001 | 1111 1011 |
| 62 | 1000 | 0100 0000 |
| 63 | 0100 | 0010 0110 |
| 64 | 0010 | 1111 1010 |
| 65 | 1000 | 0011 1101 |
| 66 | 0100 | 0010 0110 |
| 67 | 0001 | 0100 0011 |
| 68 | 0100 | 0010 0110 |
| 69 | 0010 | 0011 0011 |
| 70 | 0010 | 0011 1111 |
| 71 | 0010 | 0011 0001 |
| 72 | 1110 | 0000 0000 |
| 73 | 1000 | 1111 1100 |
| 74 | 0100 | 0111 0111 |
| 75 | 0001 | 1100 1011 |
| 76 | 0001 | 1100 1100 |
| 77 | 1011 | 0000 0000 |
| 78 | 0010 | 1100 1010 |
| 79 | 1111 | 0000 0001 |
| 80 | 0001 | 1100 1000 |
| 81 | 0001 | 1100 0110 |
| 82 | 0001 | 1100 1010 |
| 83 | 0100 | 0100 1110 |
| 84 | 1010 | 0001 1011 |
| 85 | 1100 | 0000 0000 |
| 86 | 0110 | 0001 0011 |
| 87 | 0100 | 0101 1111 |
| 88 | 1010 | 0010 0010 |
| 89 | 1100 | 0000 0000 |
| 90 | 0110 | 0001 0011 |
| 91 | 0100 | 0111 0001 |
| 92 | 0001 | 0110 1001 |
| 93 | 1000 | 0101 0100 |
| 94 | 0100 | 0010 0110 |
| 95 | 1000 | 0101 1100 |
| 96 | 0100 | 0010 0110 |
| 97 | 1000 | 1011 1100 |
| 98 | 0100 | 1001 0101 |
| 99 | 0001 | 0000 0100 |
| 100 | 0100 | 0010 0110 |
| 101 | 1000 | 0110 0001 |
| 102 | 0100 | 0010 0110 |
| 103 | 1000 | 0111 0000 |
| 104 | 0100 | 0010 0110 |
| 105 | 1010 | 0111 0011 |
| 106 | 1100 | 0000 0000 |
| 107 | 0110 | 0000 0011 |
| 108 | 0100 | 0101 1100 |
| 109 | 1000 | 0111 0011 |
| 110 | 0001 | 0100 0001 |
| 111 | 0100 | 0010 0110 |
| 112 | 0001 | 0110 1000 |
| 113 | 1000 | 1000 0010 |
| 114 | 0100 | 0010 0110 |
| 115 | 1000 | 1000 1100 |
| 116 | 0100 | 1001 0101 |
| 117 | 0001 | 0110 1000 |
| 118 | 0100 | 0010 0110 |
| 119 | 1110 | 0000 0000 |
| 120 | 0000 | 0000 1010 |
| 121 | 1101 | 0000 0000 |
| 122 | 1110 | 0000 0000 |
| 123 | 1110 | 0000 0000 |
| 124 | 0111 | 0000 0000 |
| 125 | 0100 | 1111 1101 |
| 126 | 0100 | 1101 1101 |
| 127 | 0000 | 0000 1000 |
| 128 | 1001 | 0000 0010 |
| 129 | 0011 | 0000 0000 |
| 130 | 1010 | 0001 1011 |
| 131 | 1100 | 0000 0000 |
| 132 | 0110 | 0001 0011 |
| 133 | 0100 | 0110 0111 |
| 134 | 1010 | 0010 0010 |
| 135 | 1100 | 0000 0000 |
| 136 | 0110 | 0000 0011 |
| 137 | 0100 | 0111 0000 |
| 138 | 1000 | 0110 1001 |
| 139 | 0100 | 0010 0110 |
| 140 | 1000 | 1001 0111 |
| 141 | 1010 | 0000 0000 |
| 142 | 1100 | 0000 0000 |
| 143 | 0110 | 0001 0011 |
| 144 | 1000 | 0101 0100 |
| 145 | 1010 | 0111 1111 |
| 146 | 1100 | 0000 0000 |
| 147 | 0110 | 0001 0011 |
| 148 | 1000 | 0101 0100 |
| 149 | 0001 | 0100 0011 |
| 150 | 0100 | 0010 0110 |
| 151 | 0001 | 0100 0011 |
| 152 | 1000 | 0110 0101 |
| 153 | 0001 | 0001 0010 |
| 154 | 0100 | 1011 1000 |
| 155 | 0001 | 1100 1101 |
| 156 | 0001 | 1100 1111 |
| 157 | 0001 | 1100 1110 |
| 158 | 0001 | 1101 0000 |
| 159 | 1011 | 0000 0000 |
| 160 | 0010 | 0011 0100 |
| 161 | 0010 | 1100 0111 |
| 162 | 1110 | 0000 0000 |
| 163 | 0111 | 0000 0100 |
| 164 | 0010 | 0011 0011 |
| 165 | 0010 | 1100 0101 |
| 166 | 0001 | 1100 0110 |
| 167 | 0010 | 1100 1010 |
| 168 | 1001 | 0001 0010 |
| 169 | 1111 | 0000 0001 |
| 170 | 0100 | 1010 0000 |
| 171 | 0010 | 0011 0110 |
| 172 | 0110 | 0000 1101 |
| 173 | 0100 | 1010 1100 |
| 174 | 0001 | 0011 1001 |
| 175 | 0010 | 0011 1000 |
| 176 | 0110 | 0001 1110 |
| 177 | 0000 | 0001 1111 |
| 178 | 0000 | 0000 1000 |
| 179 | 0011 | 0000 0000 |
| 180 | 1111 | 1111 1111 |
| 181 | 1111 | 1111 1111 |
| 182 | 1111 | 1111 1111 |
| 183 | 1111 | 1111 1111 |
| 184 | 0010 | 0011 0101 |
| 185 | 0010 | 0011 0101 |
| 186 | 0010 | 0110 1100 |
| 187 | 0100 | 1001 0101 |
| 188 | 0001 | 0100 0011 |
| 189 | 1000 | 0101 0100 |
| 190 | 0001 | 0001 0001 |
| 191 | 0100 | 1011 1000 |
| 192 | 0010 | 1010 0100 |
| 193 | 0100 | 1111 1101 |
| 194 | 0000 | 0001 1111 |
| 195 | 0100 | 1111 1101 |
| 196 | 1110 | 0000 0000 |
| 197 | 0101 | 0010 1111 |
| 198 | 1110 | 0000 0000 |
| 199 | 1000 | 1110 1010 |
| 200 | 0010 | 0011 0000 |
| 201 | 0100 | 0111 0111 |
| 202 | 1010 | 0000 0000 |
| 203 | 0010 | 0011 0011 |
| 204 | 0010 | 0011 1010 |
| 205 | 0010 | 0011 0100 |
| 206 | 0010 | 1100 0111 |
| 207 | 0110 | 0001 0001 |
| 208 | 0010 | 0011 0011 |
| 209 | 0010 | 0011 1101 |
| 210 | 0010 | 1100 1010 |
| 211 | 0110 | 0000 0101 |
| 212 | 0100 | 1100 1111 |
| 213 | 0010 | 0011 0000 |
| 214 | 1110 | 0000 0000 |
| 215 | 1000 | 1110 0100 |
| 216 | 0100 | 0111 0111 |
| 217 | 0100 | 1001 1011 |
| 218 | 0100 | 0100 1011 |
| 219 | 0100 | 1010 0000 |
| 220 | 0100 | 0100 1110 |
| 221 | 0010 | 1100 0101 |
| 222 | 0110 | 0001 0001 |
| 223 | 0000 | 0001 1111 |
| 224 | 1011 | 0000 0000 |
| 225 | 0010 | 1100 0101 |
| 226 | 0001 | 1100 0110 |
| 227 | 0001 | 1100 1010 |
| 228 | 0100 | 0010 0110 |
| 229 | 0010 | 0011 1011 |
| 230 | 0110 | 0000 0101 |

| | |
|---|---|
| 231 | 0100 1101 0101 |
| 232 | 0110 0000 0001 |
| 233 | 0100 1100 1010 |
| 234 | 0100 1111 0010 |
| 235 | 0010 0011 1011 |
| 236 | 0110 0000 0101 |
| 237 | 0100 1100 0110 |
| 238 | 1110 0000 0000 |
| 239 | 0101 0010 1000 |
| 240 | 0110 0000 0111 |
| 241 | 0100 1100 0100 |
| 242 | 1110 0000 0000 |
| 243 | 1110 0000 0000 |
| 244 | 1001 0000 0010 |
| 245 | 0010 0011 0011 |
| 246 | 0010 0011 1111 |
| 247 | 0010 0011 1001 |
| 248 | 1010 0011 0000 |
| 249 | 1100 0000 0000 |
| 250 | 0110 0001 0011 |
| 251 | 0001 1111 1000 |
| 252 | 0000 0001 1000 |
| 253 | 0000 0001 0000 |
| 254 | 0000 0001 0000 |
| 255 | 0000 0001 0000 |

FORM SEQUENCES MNEMONIC CODING

```
& MASS MEMORY CONTROLLER OP CODES
&
* /MNOP   EQUATE   '0040    & NOP
* /SELA   EQUATE   '0041    & SELECT DRIVE A
* /SELB   EQUATE   '0042    & SELECT DRIVE B
* /INITD  EQUATE   '0043    & INITIALIZE DRIVE
* /SELW   EQUATE   '0044    & SELECT WRITE MODE
* /SELG   EQUATE   '0045    & SELECT GROUP
* /LOAD   EQUATE   '0046    & LOAD ADDRESS
* /INAD   EQUATE   '0047    & INCREMENT ADDRESS
* /ABSME  EQUATE   '0240    & ABSOLUTE MODE ENABLE
* /ABSMD  EQUATE   '0241    & ABSOLUTE MODE DISABLE
* /INITW  EQUATE   '0242    & INITIATE WRITE
* /WW     EQUATE   '0243    & WRITE WORD
* /LISW   EQUATE   '0244    & LINK IMMEDIATE, STOP WRITE
* /LSSW   EQUATE   '0245    & LINK SAVE, STOP WRITE
* /INITR  EQUATE   '0246    & INITIATE READ
* /RW     EQUATE   '0247    & READ WORD
* /SR     EQUATE   '0250    & STOP READ
* /LDST   EQUATE   '0251    & LOAD DATA INTO STACK
* /PASSC  EQUATE   '0252    & PASS CODE
* /RDMC   EQUATE   '0253    & READ MICRO
* /RSMSC  EQUATE   '0254    & RESET MSC
&                    255      SPARE
&                    256      SPARE
&                    257      SPARE
&
&
& DATA LINK UNIT OP CODES
&
* /LRAM   EQUATE   '0060    & LINK RAM
* /LNUM   EQUATE   '0061    & LINK NUMBER
* /LMSC   EQUATE   '0062    & LINK MSC
* /LFORM  EQUATE   '0063    & LINK FORM
* /LWFB   EQUATE   '0064    & LINK WFB
* /LDCU   EQUATE   '0065    & LINK DCU
* /L232   EQUATE   '0066    & LINK RS232
* /LTCU   EQUATE   '0067    & LINK TCU
* /DNOP   EQUATE   '0070    & DLU NOP
* /LALPH  EQUATE   '0071    & LINK ALPHA
* /LDCT   EQUATE   '0072    & LOAD MEMORY COUNTER
* /UPCT   EQUATE   '0073    & UP MEMORY COUNTER
* /DNCT   EQUATE   '0074    & DOWN MEMORY COUNTER
* /WRCT   EQUATE   '0075    & WRITE RAM, COUNT COUNTER
* /LDALP  EQUATE   '0076    & LOAD ALPHA
* /LDNUM  EQUATE   '0077    & LOAD NUMBER
&
&
& WORKING FILE BUFFER OP CODES
&
* /WNOP   EQUATE   '0300    & NOP
* /WLDDA  EQUATE   '0305    & LOAD DATA
* /WWFB   EQUATE   '0306    & WRITE MEMORY FROM WFB LATCH
* /RWFB   EQUATE   '0307    & READ MEMORY
* /AWFB   EQUATE   '0312    & ADVANCE AND READ
* /RRWFB  EQUATE   '0313    & REP-ROW
* /RCWFB  EQUATE   '0314    & REP-COLUMN
* /RDRCT  EQUATE   '0315    & READ ROW COUNTER
* /RDCCT  EQUATE   '0316    & READ COLUMN COUNTER
* /STROW  EQUATE   '0317    &  STORE ROW
* /STCOL  EQUATE   '0320    & STORE COLUMN
* /DWFB   EQUATE   '0310    & DECREMENT WFB COUNTER
&
& DISPLAY CONTROL UNIT OP CODES
&
* /DCUSS  EQUATE   '0151    & SET STATE

* /DCUES  EQUATE   '0150    & EXECUTE STATE
* /RDDIU  EQUATE   '0154    & READ DISPLAY INTERFACE UNIT
&
& CHARACTERS USED IN TRANSLATION
```

```
&
* /NUL     EQUATE '0000
* /ESC     EQUATE '0033          & ESCAPE CHARACTER
* /QUOTE   EQUATE '0042
* /SS      EQUATE '0163          & SMALL 'S'
* /DEL     EQUATE '0177
&
&
& META PROCESSOR OP CODES
&
* /LDMHI   EQUATE    '0373       & LOAD META MEMORY HIGH
* /LDMLW   EQUATE    '0372       & LOAD META MEMORY LOW
* /RMETA   EQUATE    '0370       & RUN META
&
& RAP OP CODES
&
* /RNOP    EQUATE    '0070       & NOP
* /CLDAT   EQUATE    '0071       & CLEAR DATA
&
& DISPLAY INTERFACE OP CODES
&
* /RDXCR   EQUATE    '0022       & READ X CURSOR (COLUMN)
* /RDYCR   EQUATE    '0021       & READ Y CURSOR (ROW)
* /DIUNP   EQUATE    '0000       & NOP
* /LDCEL   EQUATE '0004          & LOAD CELL
&
&
& MICRO PROCESSOR OP CODES
&
* /LAB     EQUATE    '0202       & LOAD ADDRESS REGISTER
* /DATB    EQUATE    '0211       & DATA TO REGISTER
* /WREGL   EQUATE    'B11000000 & W SAVE LINK REGISTER
&
& PROGRAM MEMORY OP CODES
&
* /PLDDA   EQUATE    '0345       & LOAD DATA
* /WPMEM   EQUATE    '0346       & WRITE MEMORY FROM LATCH
* /APMEM   EQUATE    '0352       & ADVANCE AND READ
&
& CPU OP CODES
&
* /CPUSS   EQUATE    '0101       & SET CPU STATE
* /CPULD   EQUATE    '0103       & LOAD DATA OR EXECUTE STATE
&
&
&
D          HALT                  & THE FIRST LOCATION MUST BE A HALT
&
& LOAD ADDRESS FROM MSC          (NO DATA)


 1   A /LDCON  LDIM    2(0)
 2   D         WAIT
 3   C         SKIP    C03           & SKIP IF END OF FILE
 4   A         JUMP    2(/LDNA)
 5   B         NOP     LDFL    SEL7 & SET FLAG
 6   C         CRET    NC00          & RETURN/HALT
 7   B /LDNA   LDDA    NOMD    SEL4 & LOAD ADDRESS FROM MSC
 8   A         PASSW   2(/LFORM)
 9   A         PASS    2(/LOAD)      & LOAD MSC ADDRESS
10   C         CRET    NC00          & RETURN/HALT
     &
     & WRITE BLOCK, LINK NEXT        (NO DATA)
     &
11   D /WBLN   INSC
12   A         STJP    2(/WBLCK)     & CALL WRITE BLOCK
13   A         PASSW   2(/LSSW)      & LINK SAVE, STOP WRITE
14   A       JUMP      2(/EXIT)
     &
     & WRITE BLOCK, LINK IMMEDIATE (AAAAAAAA)
     &
15   D /WBLI   INSC
16   B         ENTDA   NOMD    SEL0 & LOAD LINK INTO STACK
17   D         INSC
18   A         STJP    2(/WBLCK)     & CALL WRITE BLOCK
19   B         LDDA    DESC    SEL2 & LOAD LINK, DECREMENT STACK
20   A         PASSW   2(/LFORM)     & LINK FORM
21   A         JUMP    2(/PATCH)
     &
     &
     & SUBROUTINE WRITE BLOCK
     &
22   A /WBLCK  LDIM    2(0)
23   A         PASSW   2(/LFORM)
```

```
24   A            PASSW   2(/LDCT)      & LOAD RAM ADDRESS COUNTER
25   A            PASSW   2(/LRAM)      & LINK RAM
26   A            PASSW   2(/INITW)     & INITIATE WRITE
27   C            SKIP    NC02          & SKIP IF MSC ALARM NOT SET
28   A            JUMP    2(/ALARM)
29   A /CONW      PASS    2(/WW)        & WRITE WORD
30   A            PASSW   2(/UPCT)      & COUNT UP COUNTER
31   C            CRET    C05           & RETURN IF COUNT ZERO
32   A            JUMP    2(/CONW)
     &
     & PMEM SINK
33   A            PASSW   2(/PLDDA)     & LOAD PMEM
34   A            PASSW   2(/DNOP)      & DELAY
35   A            PASSW   2(/WPMEM)     & WRITE MEMORY
36   A            PASS    2(/APMEM)     & ADVANCE PMEM
37   A            JUMP    2(/STAT1)     & RETURN TO STATE ONE
     & RETURN TO STATE ONE
38   B /STAT1     NOP     DESC          & POINT STACK AT STATE ONE RETURN
39   C            CRET    NC00
40   A /LDMSC     PASSW   2(/LMSC)
41   A            JUMP    2(/LDCON)
42   A            JUMP    2(/RBLCK)
43   A            JUMP    2(/CLFL)      & CLEAR FLAG
44   A            JUMP    2(/LDMSC)     & LOAD MSC ADDRESS
45   A            JUMP    2(/WBLN)      & WRITE BLOCK , LINK NEXT
46   A            JUMP    2(/WBLI)      & WRITE BLOCK, LINK IMMEDIATE
     &
     & READ BLOCK
     &
47   A /RBLCK     LDIM    2(0)
48   A            PASSW   2(/LFORM)
49   A            PASSW   2(/LDCT)      & SET DLU COUNTER TO ZERO
50   A            PASS    2(/LMSC)
51   A            PASSW   2(/INITR)     & INITATE READ
52   C            SKIP    NC02          & SKIP IF MSC ALARM NOT SET
53   A            JUMP    2(/ALARM)
54   A /CONR      PASSW   2(/RW)        & READ WORD
55   A            PASSW   2(/WRCT)      & WRITE RAM, INCREMENT ADDRESS
56   C            SKIP    C05           & SKIP IF COUNT ZERO
57   A            JUMP    2(/CONR)
58   A            PASSW   2(/SR)        & STOP READ
59   C            CRET    NC02          & RETURN IF ALARM NOT SET
60   A            JUMP    2(/ALARM)
     &
     & META SINK
     &
61   A /MLDHI     PASS    2(/LDMHI)     & LOAD META HIGH
62   A            ENTIM   2(/MLDLW)     & LOAD META LOW STATE
63   A            JUMP    2(/STAT1)     & RETURN TO STATE ONE
64   A /MLDLW     PASSW   2(/LDMLW)     & LOAD META LOW
65   A            ENTIM   2(/MLDHI)     & LOAD META HIGH STATE
66   A            JUMP    2(/STAT1)     & RETURN TO STATE ONE
     &
     &
     & CPU SINK
     &
67   A            PASS    2(/CPULD)     & LOAD CPU
68   A            JUMP    2(/STAT1)     & RETURN TO STATE ONE
     &
     & META TO SINK
     &
69   A            PASSW   2(/LFORM)
70   A            PASSW   2(/LDNUM)     & LOAD CONVERSION
71   A            PASSW   2(/LNUM)      & LINK CONVERSION REGISTER
72   D            INSC
73   A            ENTIM   2(/EXIT-1)    & HALT ON RETURN
74   A            JUMP    2(/EXECS-1)   & JUMP TO EXECUTE STATE
     &
     & RESTORE WFB
     &
75   A /RSWFB     PASS    2(/RRWFB)     & REP ROW
76   A            PASS    2(/RCWFB)     & REP COLUMN
77   D            HALT
     &
     & WFB DELETE
     &
78   A /WFBD      PASSW   2(/AWFB)      & ADVANCE AND READ MEMORY
79   C            CRET    C01           & HALT IF END OF MEMORY
80   A            PASS    2(/DWFB)      & DECREMENT MEMORY
81   A            PASS    2(/WWFB)      & WRITE MEMORY
82   A            PASS    2(/AWFB)      & ADVANCE
83   A            JUMP    2(/WFBD)
     &
     &
```

```
    & TRANSLATE
    &
    & LOOK FOR FIRST QUOTE
84  A /LKFQU  LDIM   2(/ESC)
85  D         WAIT                 & SELECT DATA REG. AND SETTLE
86  C         SKIP   NC03          & SKIP IF NOT .ESC.
87  A         JUMP   2(/SESCF)
88  A         LDIM   2(/QUOTE)
89  D         WAIT                 & SELECT DATA REG. AND SETTLE
90  C         SKIP   NC03          & SKIP IF NOT FIRST QUOTE
91  A         JUMP   2(/SLKSQ)
92  A /SDCUS  PASS   2(/DCUSS)     & SET DCU STATE
    & SET LOOK FOR FRIST QUOTE
93  A         ENTIM  2(/LKFQU)
94  A         JUMP   2(/STAT1)     & RETURN TO STATE ONE
    & .ESC. BEFORE FIRST QUOTE
95  A /SESCF  ENTIM  2(/SDCUS)     & SET DCU STATE UNDONDITIONALLY
96  A         JUMP   2(/STAT1)     & RETURN TO FIRST STATE
    & LOAD FIRST Y SENSITIZED AREA
97  A /LDYS1  ENTIM  2(/LDYS2)
98  A         JUMP   2(/LDCPU)
    &
    & LOAD CELLS
    &
99  A         PASS   2(/LDCEL)     & LOAD DIU DISPLAY CELLS
100 A         JUMP   2(/STAT1)
    & SKIP COMMA
101 A /SCOMA  ENTIM  2(/LDYS1)
102 A         JUMP   2(/STAT1)
    & .ESC. BEFORE SECOND QUOTE
103 A /SESCS  ENTIM  2(/EDCUS)     & EXECUTE DCU STATE UNCONDITIONALLY
104 A         JUMP   2(/STAT1)     & RETURN TO STATE ONE
    &
    & LOOK FOR SMALL S
    &
105 A /LKSP   LDIM   2(/SS)
106 D         WAIT                 & SELECT DATA REG. AND SETTLE
107 C         SKIP   C03           & SKIP IF SMALL S
108 A         JUMP   2(/SDCUS)
109 A         ENTIM  2(/LDLAB)
110 A         PASS   2(/CPUSS)
111 A         JUMP   2(/STAT1)
    & SET LOOK FOR SECOND QUOTE
112 A /EDCUS  PASS   2(/DCUES)     & EXECUTE DCU STATE
113 A /SLKSQ  ENTIM  2(/LKSQU)
114 A         JUMP   2(/STAT1)     & RETURN TO STATE ONE
    & LOAD LABLE
115 A /LDLAB  ENTIM  2(/LDXS1)
116 A         JUMP   2(/LDCPU)
    &
    & DCU SINK (NO TRANSLATE)
    &
117 A         PASS   2(/DCUES)     & EXECUTE STATE
118 A         JUMP   2(/STAT1)     & RETURN TO STATE ONE
119 D         INSC
    &
    & FORM OP FIELD
    & EXECUTE STATE
    &
120 B /EXECS  NOP    LDPR    SEL2  & LOAD PROGRAM REGISTER WITH STATE
121 D         EXEC                 & EXECUTE STATE
    &
    & SET STATE TWO
    &
122 D         INSC
123 D         INSC
    & SET STATE ONE / LOAD DATA
124 B         ENTDA  NOMD    SEL0  & SET STATE
125 A         JUMP   2(/EXIT)
126 A         JUMP   2(/LDWFB)     & LOAD WFB/CHECK
    &
    & SUB OP CODE
127 B         NOP    LDPR    SEL0  & LOAD OP CODE
128 B         LDDA   NOMD    SEL2  & LOAD DATA
129 D         PASDH                & PASS,HALT
    & LOOK FOR SECOND QUOTE
130 A /LKSQU  LDIM   2(/ESC)
131 D         WAIT                 & SELECT DATA REG. AND SETTLE
132 C         SKIP   NC03          & SKIP IF NOT .ESC.
133 A         JUMP   2(/SESCS)
134 A         LDIM   2(/QUOTE)
135 D         WAIT                 & SELECT DATA REG. AND SETTLE
136 C         SKIP   C03           & SKIP IF SECOND QUOTE
```

```
137  A          JUMP    2(/EDCUS)
     & SET LOOK FOR SMALL S
138  A /SLKSP   ENTIM   2(/LKSP)
139  A          JUMP    2(/STAT1)     & RETURN TO STATE ONE
     & LOAD FIRST X SENSITIZED AREA
140  A /LDXS1   ENTIM   2(/LDXS2)
141  A          LDIM    2(/NJL)
142  D          WAIT                  & SELECT DATA REG. AND SETTLE
143  C          SKIP    NC03          & SKIP IF NOT NULL
144  A          ENTIM   2(/LKFQU)     & EXIT SENSITIED POINTS
145  A          LDIM    2(/DEL)
146  D          WAIT                  & SELECT DATA REG. AND SETTLE
147  C          SKIP    NC03          & SKIP IF NOT DEL

148  A          ENTIM   2(/LKFQU)
149  A /LDCPU   PASS    2(/CPULD)
150  A          JUMP    2(/STAT1)
     & LOAD SECOND X SENSITIZE AREA
151  A /LDXS2   PASS    2(/CPULD)     & LOAD X2 SENSITIZED AREA
152  A          ENTIM   2(/SCOMA)
153  A          PASS    2(/RDXCR)     & READ X CURSOR
154  A          JUMP    2(/CURSR)
     & SAVE WFB
     &
155  A /SVWFB   PASS    2(/RDRCT)     & READ ROW
156  A          PASS    2(/STROW)     & STORE ROW
157  A          PASS    2(/RDCCT)     & READ COLUMN
158  A          PASS    2(/STCOL)     & STORE COLUMN
159  D          HALT
     &
     &WFB INSERT
     &
160  A /WFBIN   PASSW   2(/LWFB)
161  A          PASSW   2(/RWFB)      & READ WFB MEMORY
162  D          INSC
163  B          ENTDA   NOMD    SEL4  & LOAD STACK
164  A          PASSW   2(/LFORM)
165  A          PASSW   2(/WLDDA)     & LOAD WFB DATA
166  A          PASS    2(/WWFB)      & WRITE WFB MEMORY
167  A          PASSW   2(/AWFB)      & ADVANCE
168  B          LDDA    DESC    SEL2  & STACK TO DATA LATCH
169  C          CRET    C01           & HALT IF END OF MEMORY
170  A          JUMP    2(/WFBIN)
     &
     & READ RS 232
     &
171  A /RD232   PASSW   2(/L232)
172  C          SKIP    C15           & SKIP IF DATA AVAILABLE
173  A          JUMP    2(*-1)
174  A          PASS    2(/CLDAT)     & CLEAR DATA
175  A          PASSW   2(/RNOP)      & RAP NOP
176  C          SKIP    NC16          & SKIP IF NO ERROR
177  B          NOP     LDFL    SEL7  & SET FLAG
178  B          NOP     LDPR    SEL0  & LOAD CODE
179  D          PASDH                 & PASS AND HALT
180  E          BLANK
181  E          BLANK
182  E          BLANK
183  E          BLANK
     &
184  A /CURSR   PASSW   2(/LDCU)
185  A          PASSW   2(/LDCU)      & DELAY
186  A          PASSW   2(/RDDIU)     & READ DIU
187  A          JUMP    2(/LDCPU)
     &
     & LOAD SECOND Y SENSITIZE AREA
188  A /LDYS2   PASS    2(/CPULD)     & LOAD Y2 SENSITIZED AREA
189  A          ENTIM   2(/LKFQU)
190  A          PASS    2(/RDYCR)     & READ Y CURSOR
191  A          JUMP    2(/CURSR)
     &
192  A /PATCH   PASSW   2(/LISW)      & LINK IMMEDIATE, STOP WRITE
193  A          JUMP    2(/EXIT)
194  B /ALARM   NOP     LDFL    SEL7  & SET FLAG
195  A          JUMP    2(/EXIT)
     &
     & DISK FILE TO SINK
     &
196  D /DSOUR   INSC
197  A          STJP    2(/RBLCK)     & READ DISK BLOCK
198  D /DISK2   INSC
199  A          ENTIM   2(/DRET-1)    & ENTER STATE ONE
200  A          PASSW   2(/LRAM)
201  A          JUMP    2(/EXECS-1)   & JUMP TO EXECUTE STATE
```

```
    &
    & WFB TO SINK
    &
    A /WSOUR  LDIM    2(0)
    A         PASSW   2(/LFORM)
    A         PASSW   2(/LDCT)       & LOAD MEMORY COUNTER
    A         PASSW   2(/LWFB)
    A         PASSW   2(/RWFB)       & READ WFB
    C /CKWFB  SKIP    NC01           & SKIP IF WFB NOT OUT
    A         PASSW   2(/LFORM)
    A         PASSW   2(/WRCT)       & LOAD DLU MEMORY, INCREMENT
    A         PASSW   2(/AWFB)       & ADVANCE WFB
    C         SKIP    C05            & SKIP IF DLU END
    A         JUMP    2(/CKWFB)
    A /WFB2   PASSW   2(/LRAM)
    D         INSC
    A         ENTIM   2(/WRET-1)     & ENTER STATE ONE
    A         JUMP    2(/EXECS-1)    & JUMP TO EXECUTE STATE

    &
    & FORM OP CODE FIELD
    &
    A         JUMP    2(/SVWFB)      & SAVE WFB COUNTER
    A         JUMP    2(/RSWFB)      & RESTORE WFB COUNTER
    A         JUMP    2(/WFBIN)      & INSERT WORD WFB
    A         JUMP    2(/WFBD)       & DELETE WORD WFB
    &
    & LOAD WORKING FILE BUFFER
    &
    A /LDWFB  PASSW   2(/WLDDA)      & LOAD WFB DATA
    C         SKIP    NC01           & SKIP IF WFB NOT OUT
    B         NOP     LDFL     SEL7  & SET FLAG
    D         HALT
    &
    & WFB SINK
    &
    A         PASSW   2(/WLDDA)      & LOAD WFB
    A         PASS    2(/WWFB)       & WRITE MEMORY
    A         PASS    2(/AWFB)       & ADVANCE WFB ADDRESS

    A         JUMP    2(/STAT1)      & RETURN TO STATE ONE
    & CONTINUE WFB SOURCE
    A /WRET   PASSW   2(/UPCT)       & INCREMENT DLU
    C         SKIP    C05            & SKIP IF DLU ZERO
    A         JUMP    2(/WFB2)
    C         SKIP    C01            & SKIP IF WFB OUT
    A         JUMP    2(/WSOUR)
    A         JUMP    2(/ENDST)      & JUMP TO END STATE
    &
    & DISK SOURCE CONTINUE
    &
    A /DRET   PASSW   2(/UPCT)       & INCREMENT DLU
    C         SKIP    C05            & SKIP IF DLU ZERO
    A         JUMP    2(/DISK2)
    D         INSC
    A         STJP    2(/LDMSC)      & LOAD NEXT ADDRESS
    C         SKIP    C07            & SKIP IF FILE END
    A         JUMP    2(/DSOUR)
    D /ENDST  INSC
    D         INSC
    B         LDDA    NOMD     SEL2  & LOAD STATE 2
    A         PASSW   2(/LFORM)
    A         PASSW   2(/LDNUM)      & LOAD STATE TWO
    A         PASSW   2(/LALPH)      &
    A         LDIM    2('0060)       & TEST WORD
    D         WAIT                   & SELECT DATA REG. AND SETTLE
    C         SKIP    NC03           & SKIP IF NOT META OR PMEM BOOT
    A         PASS    2(/RMETA)      & RUN META
    B /CLFL   NOP     LDFL     SEL0  & CLEAR FLAG
    B /EXIT   NOP     DESC     SEL0  & GO TO TOP OF STACK
    B         NOP     DESC     SEL0
    B         NOP     DESC     SEL0
```

APPENDIX NN. DSPL SELF SEQUENCE ROM

| Address (state) | Self-Opcode | Operand |
|---|---|---|
| 0 | 00000100 | 10100111 |
| 1 | 00000100 | 11101010 |
| 2 | 00000100 | 01110000 |
| 3 | 00000100 | 11111111 |
| 4 | 00000100 | 11111111 |
| 5 | 00000100 | 11110011 |
| 6 | 00000100 | 11101010 |
| 7 | 00000100 | 11110101 |
| 8 | 00000100 | 11101010 |
| 9 | 00000100 | 11101010 |
| 10 | 00000100 | 11101010 |
| 11 | 00000100 | 11101010 |
| 12 | 00000100 | 00111011 |
| 13 | 00000100 | 11101010 |
| 14 | 00000100 | 11110111 |
| 15 | 00000100 | 11111001 |
| 16 | 00000100 | 11101010 |
| 17 | 00000100 | 00111011 |
| 18 | 00000100 | 11000000 |
| 19 | 00000100 | 11001000 |
| 20 | 00000100 | 00111111 |
| 21 | 00000100 | 11111111 |
| 22 | 00000100 | 11100000 |
| 23 | 00000100 | 11101010 |
| 24 | 00000100 | 11101010 |
| 25 | 00000100 | 11111011 |
| 26 | 00000100 | 11100101 |
| 27 | 00000100 | 11111101 |
| 28 | 00000100 | 11101010 |
| 29 | 00000100 | 11101010 |
| 30 | 00000100 | 11101010 |
| 31 | 00000100 | 11101010 |
| 32 | 00000001 | 00000101 |
| 33 | 00000100 | 10100111 |
| 34 | 00000001 | 00000111 |
| 35 | 00000100 | 10100111 |
| 36 | 00000001 | 00001110 |
| 37 | 00000100 | 10100111 |
| 38 | 00000001 | 00001111 |
| 39 | 00000100 | 10100111 |
| 40 | 00000001 | 00011001 |
| 41 | 00000100 | 10100111 |
| 42 | 00000100 | 01011100 |
| 43 | 00000100 | 10000100 |
| 44 | 00000100 | 10010101 |
| 45 | 00000100 | 10001011 |
| 46 | 00000001 | 01110010 |
| 47 | 00001111 | 11111111 |
| 48 | 00000100 | 10101111 |
| 49 | 00000100 | 10010111 |
| 50 | 00000100 | 01111000 |
| 51 | 00000100 | 01111110 |
| 52 | 00000100 | 01001001 |
| 53 | 00000100 | 01010111 |
| 54 | 00000100 | 00101110 |
| 55 | 00001001 | 11101101 |
| 56 | 00001111 | 11111111 |
| 57 | 00000001 | 00011011 |
| 58 | 00000100 | 10100111 |
| 59 | 00001010 | 00111101 |
| 60 | 00000101 | 10100000 |
| 61 | 00001000 | 11100000 |
| 62 | 00001100 | 11111111 |
| 63 | 00000001 | 11100010 |
| 64 | 00001010 | 11111111 |
| 65 | 00000010 | 11100101 |
| 66 | 00000001 | 11101111 |
| 67 | 00000001 | 11110000 |
| 68 | 00000010 | 11110001 |
| 69 | 00000110 | 11100010 |
| 70 | 00000100 | 01000010 |
| 71 | 00000001 | 11100010 |
| 72 | 00000100 | 10100111 |
| 73 | 00000010 | 11100101 |
| 74 | 00000001 | 11110101 |
| 75 | 00001010 | 00010010 |
| 76 | 00000010 | 11100101 |
| 77 | 00000001 | 11101001 |
| 78 | 00000001 | 11101101 |
| 79 | 00000001 | 11101111 |
| 80 | 00000001 | 11101110 |
| 81 | 00000001 | 11110000 |
| 82 | 00001010 | 01010100 |
| 83 | 00000100 | 01100010 |
| 84 | 00000010 | 11100101 |
| 85 | 00000001 | 11101001 |
| 86 | 00001111 | 11111111 |
| 87 | 00000010 | 11100101 |
| 88 | 00000001 | 11110101 |
| 89 | 00000001 | 11101100 |
| 90 | 00000001 | 11101011 |
| 91 | 00000100 | 01010010 |
| 92 | 00001010 | 00110100 |
| 93 | 00000001 | 00011001 |
| 94 | 00001010 | 11011101 |
| 95 | 00000100 | 11011100 |
| 96 | 00001000 | 11100001 |
| 97 | 00001100 | 11111111 |
| 98 | 00000111 | 11111111 |
| 99 | 00001000 | 11100011 |
| 100 | 00001111 | 11111111 |
| 101 | 00001000 | 11100000 |
| 102 | 00000011 | 11111111 |
| 103 | 00001111 | 11111111 |
| 104 | 00000100 | 01100000 |
| 105 | 00000100 | 01100010 |
| 106 | 11111111 | 11111111 |
| 107 | 11111111 | 11111111 |
| 108 | 00000100 | 01110100 |
| 109 | 00000100 | 01100101 |
| 110 | 00000100 | 01110110 |
| 111 | 00000100 | 00110111 |
| 112 | 00001010 | 01110010 |
| 113 | 00000100 | 11101111 |
| 114 | 00000001 | 00010101 |
| 115 | 00000100 | 10100111 |
| 116 | 00001001 | 11101100 |
| 117 | 00001111 | 11111111 |
| 118 | 00000010 | 11100101 |
| 119 | 00001111 | 11111111 |
| 120 | 00000001 | 00011000 |
| 121 | 00001000 | 11100000 |
| 122 | 00000110 | 11111111 |
| 123 | 00000001 | 00011110 |
| 124 | 00000001 | 00000010 |
| 125 | 00001111 | 11111111 |
| 126 | 00000001 | 01100111 |
| 127 | 00001111 | 11111111 |
| 128 | 00000001 | 00000010 |
| 129 | 00000001 | 00000010 |
| 130 | 00000001 | 00011100 |
| 131 | 00000100 | 01011110 |
| 132 | 00001010 | 10000110 |
| 133 | 00000101 | 10100000 |
| 134 | 00000101 | 10110100 |
| 135 | 00000001 | 00000010 |
| 136 | 00001010 | 00110100 |
| 137 | 00000101 | 10010000 |
| 138 | 00000100 | 10000100 |
| 139 | 00001010 | 10001101 |
| 140 | 00000101 | 10100000 |
| 141 | 00000101 | 10110100 |
| 142 | 00000001 | 00000010 |
| 143 | 00000100 | 10011011 |
| 144 | 00000001 | 00010110 |
| 145 | 00000001 | 00010110 |
| 146 | 00001010 | 00110000 |
| 147 | 00000001 | 00011001 |
| 148 | 00001111 | 11111111 |
| 149 | 00001010 | 10010111 |
| 150 | 00000100 | 11101111 |
| 151 | 00000010 | 00000010 |
| 152 | 00000110 | 11100110 |
| 153 | 00000100 | 10010111 |
| 154 | 00000100 | 10100111 |
| 155 | 00001010 | 00111011 |
| 156 | 00000101 | 10010000 |
| 157 | 00000100 | 10001011 |
| 158 | 00000001 | 00000010 |
| 159 | 00000100 | 10100111 |
| 160 | 00000110 | 11100111 |
| 161 | 00000100 | 10100101 |
| 162 | 00000010 | 11101010 |
| 163 | 00001001 | 11101101 |
| 164 | 00001111 | 11111111 |
| 165 | 00001101 | 11111111 |
| 166 | 00000100 | 01100010 |
| 167 | 00001010 | 10101111 |
| 168 | 00000110 | 11100111 |
| 169 | 00000100 | 01100010 |
| 170 | 00000010 | 11101010 |
| 171 | 00001001 | 11101101 |
| 172 | 00000110 | 11100001 |
| 173 | 00000100 | 10101111 |
| 174 | 00000100 | 11000000 |
| 175 | 00000101 | 10110100 |
| 176 | 00001000 | 11100000 |
| 177 | 00000110 | 11111111 |
| 178 | 00000100 | 11001010 |
| 179 | 00000100 | 10011110 |
| 180 | 00001000 | 11100000 |
| 181 | 00000110 | 11111111 |
| 182 | 00001111 | 11111111 |
| 183 | 00000110 | 11111110 |
| 184 | 00001111 | 11111111 |
| 185 | 00000110 | 11111101 |
| 186 | 00001111 | 11111111 |
| 187 | 00001101 | 11111111 |
| 188 | 00001100 | 11111111 |
| 189 | 11111111 | 11111111 |
| 190 | 00001010 | 10101111 |
| 191 | 00000100 | 01100010 |
| 192 | 00000110 | 11100111 |
| 193 | 00000100 | 10111110 |
| 194 | 00000010 | 11110010 |
| 195 | 00000110 | 11110011 |
| 196 | 00000100 | 10111110 |
| 197 | 00000001 | 11101011 |
| 198 | 00000001 | 11101100 |
| 199 | 00000100 | 10101010 |
| 200 | 00001010 | 11001010 |
| 201 | 00000101 | 10100000 |
| 202 | 00000110 | 11100111 |
| 203 | 00000100 | 11011001 |
| 204 | 00000001 | 11101101 |
| 205 | 00000001 | 11101111 |
| 206 | 00000001 | 11101110 |
| 207 | 00000001 | 11110000 |
| 208 | 00000001 | 11110001 |
| 209 | 00000010 | 11100101 |
| 210 | 00001001 | 11101110 |
| 211 | 00000001 | 11110101 |
| 212 | 00000001 | 11101011 |
| 213 | 00000001 | 11101100 |
| 214 | 00000010 | 11100101 |
| 215 | 00000001 | 11110101 |
| 216 | 00000100 | 10101010 |
| 217 | 00001000 | 11100010 |
| 218 | 00000001 | 11100010 |
| 219 | 00000100 | 11010001 |
| 220 | 00000101 | 10100000 |
| 221 | 00000101 | 10110100 |
| 222 | 00000001 | 00000010 |
| 223 | 00000100 | 10000000 |
| 224 | 00001010 | 11100010 |
| 225 | 00000101 | 10100000 |
| 226 | 00000101 | 10110100 |
| 227 | 00000001 | 00010110 |
| 228 | 00000100 | 11100000 |
| 229 | 00001010 | 11100111 |
| 230 | 00000101 | 10100000 |
| 231 | 00000101 | 10110100 |
| 232 | 00000001 | 00011010 |
| 233 | 00000100 | 11100101 |

```
234  00001000 11100000      242  00001100 11111111      249  00001010 00100110
235  00000011 11111111      243  00001010 00100000      250  00000100 11101111
236  00000110 11100111      244  00000100 11101111      251  00001010 00101000
237  00000100 10111110      245  00001010 00100010      252  00000100 11101111
238  00000100 10101010      246  00000100 11101111      253  00001010 00111001
239  00000111 11111111      247  00001010 00100100      254  00000100 11101111
240  00000101 10100000      248  00000100 11101111      255  00000100 10100111
241  00001000 11100001
```

```
 0  A /START  JUMP   2(/STXNX)   & NUL
 1  A         JUMP   2(/DRECT)   & SOH
 2  A         JUMP   2(/CRTNX)   & STX
 3  A /ETX    JUMP   2('0377)    & ETX    NO OPERATION
    &
 4  A /EOT    JUMP   2('0377)    & EOT    NO OPERATION
 5  A         JUMP   2(/ENQNX)   & ENQ
 6  A         JUMP   2(/DRECT)   & ACK
 7  A         JUMP   2(/BELNX)   & BEL
    &
 8  A         JUMP   2(/DRECT)   & BS
 9  A         JUMP   2(/DRECT)   & HT
10  A         JUMP   2(/DRECT)   & LF
11  A         JUMP   2(/DRECT)   & VT
    &
12  A         JUMP   2(/XMDNX)   & FF
13  A         JUMP   2(/DRECT)   & CR
14  A         JUMP   2(/SONXT)   & SO
15  A         JUMP   2(/SINXT)   & SI
    &
16  A         JUMP   2(/DRECT)   & DLE
17  A         JUMP   2(/XMDNX)   & DC1
18  A         JUMP   2(/SMRET)   & DC2
19  A         JUMP   2(/SMCLN)   & DC3
    &
20  A         JUMP   2(/CLRSM)   & DC4
21  A /NAK    JUMP   2('0377)    & NAK    NO OPERATION
22  A         JUMP   2(/MOVNX)   & SYN
23  A         JUMP   2(/DRECT)   & ETB
    &
24  A         JUMP   2(/DRECT)   & CAN
25  A         JUMP   2(/EMNXT)   & EM
26  A         JUMP   2(/DOTNX)   & SUB
27  A         JUMP   2(/ESCNX)   & ESC
    &
28  A         JUMP   2(/DRECT)   & FS
29  A         JUMP   2(/DRECT)   & GS
30  A         JUMP   2(/DRECT)   & RS
31  A         JUMP   2(/DRECT)   & US
32  A         PASS   2('0005)    & ENQST
33  A         JUMP   2(/STXNX)   &
34  A         PASS   2('0007)    & BELST
35  A         JUMP   2(/STXNX)   &
    &
36  A         PASS   2('0016)    & SOST
37  A         JUMP   2(/STXNX)   &
38  A         PASS   2('0017)    & SIST
39  A         JUMP   2(/STXNX)   &
    &
40  A         PASS   2('0031)    & EMST
41  A         JUMP   2(/STXNX)   &
42  A         JUMP   2(/BRTNX)   & STAR
43  A         JUMP   2(/PLSNX)   & PLUS
    &
44  A         JUMP   2(/PATNX)   & COMMA
45  A         JUMP   2(/MNSNX)   & MINUS
46  A /PER    PASS   2('0162)    & PER
47  A         RET                & SLASH
    &
48  A         JUMP   2(/STX)     & XLATE
49  A         JUMP   2(/STAT1)   & PATRN
50  A         JUMP   2(/STAT2)   & DDISP
51  A         JUMP   2(/STAT3)   & CRT
    &
52  A         JUMP   2(/STAT4)   & DFNE
53  A         JUMP   2(/STAT5)   & RDFNE
54  A         JUMP   2(/PER)     & SLIDE
55  B /RDSYM  LOAD   SYMIN       & RDSYM
    &
56  A         RET                &
57  A         PASS   2('0033)    & ESCST
58  A         JUMP   2(/STXNX)   &
59  A /XMDNX  DATA   2('0075)    & XMDNX
    &
60  A         CALL   2(/SYMST)   &
61  B         MICRO  RRDCU       & XMODE  LOAD PREG FROM DCU
62  A         EXEC               &
63  A /CLRSM  PASS   2('0342)    & CLRSM  RESET SYM
```

```
A          DATA    2('0345)    & 377
A          PASW    2('0345)    &         LOAD SYM
A /ADR1    PASS    2('0357)    &         WRITE MSROW
A          PASS    2('0360)    &         WRITE MSCOL
&
A          PASW    2('0361)    &         UP SCTR
B          SKIP    SNOVR       &         SYM=OVER
A          JUMP    2(/ADR1)    &
A          PASS    2('0342)    &         RESET SYM
&
A          JUMP    2(/STXNX)   &
A /STAT4   PASW    2('0345)    & STAT4   LOAD SYM
A          PASS    2('0365)    &         SET SCTR
A          DATA    2('0022)    &         DC2
&
A          PASW    2('0345)    &         LOAD SYM
A          PASS    2('0351)    &         PUSH P
A          PASS    2('0355)    &         READ ROW
A          PASS    2('0357)    &         STORE ROW
&
A          PASS    2('0356)    &         READ COL
A          PASS    2('0360)    &         STORE COL
A /STA42   DATA    2('0124)    & STA42   SYMPUSH
A          JUMP    2(/SSTAT)   &         SETSTATE
&
A          PASW    2('0345)    &         LOAD SYM
A          PASS    2('0351)    &         PUSH WRITE
A          RET                 &
A /STAT5   PASW    2('0345)    & STAT5   SYM
&
A          PASS    2('0365)    &         SET SCTR
A          PASS    2('0354)    &         REP COL
A          PASS    2('0353)    &         REP ROW
A          JUMP    2(/STA42)   &
&
A /BRTNX   DATA    2('0064)    & BRTNX
A          PASS    2('0031)    &
A /BRT2    DATA    2('0335)    &
A          JUMP    2(/BRT3)    &
B /XSTAT   MICRO   PRSTK       & XSTAT   LOAD PREG FROM STACK
A          EXEC                &
A /SSTAT   ENTST               & SSTAT
B          MICRO   RSETF       &         SYM=0
&
A          RET                 &
B /SUBOP   MICRO   PRDCU       & SUBOP   LOAD PREG FROM DCU
A          DIR                 &
A          RET                 &
&
A          JUMP    2(/XSTAT)   & H
A          JUMP    2(/SSTAT)   & I
A          BLANK               & J       SPARE
A          BLANK               & K       SPARE
&
A          JUMP    2(/RDDIU)   & L
A          JUMP    2(/SUBOP)   & M
A          JUMP    2(/LDSYM)   & N
A          JUMP    2(/RDSYM)   & O
&
A /CRTNX   DATA    2('0162)    & CRTNX   CRTST
A          JUMP    2(/DRNXT)   &
A          PASS    2('0025)    & CRTST   NAK
A          JUMP    2(/STXNX)   &
&
B /RDDIU   LOAD    DIUIN       & RDDIU
A          RET                 &
A /LDSYM   PASW    2('0345)    & LDSYM   DOTNX
A          RET                 &
&
A /STAT2   PASS    2('0030)    & STAT2   CAN
B          MICRO   PRDCU       &         LOAD PREG FROM DCU
B          SKIP    RBT7        &         NOT PREG7
A          PASS    2('0036)    &         RS
&
A          PASS    2('0002)    &         STX
A          RET                 &
A /STAT3   PASS    2('0147)    &         WRITE CRT
A          RET                 &
A /BRT4    PASS    2('0002)    & BRT4    STX
A          PASS    2('0002)    &         STX
A          PASS    2('0034)    &         FS
A          JUMP    2(/BRT2)    &
&
A /PLSNX   DATA    2('0206)    & PLSNX   BIT10
```

```
133  A          CALL   2(/SYMST)   &         SYMST
134  A          CALL   2(/CNTRL)   & BIT10   CNTRL
135  A          PASS   2('0002)    &         STX
     &
136  A          DATA   2('0064)    &         064
137  A          CALL   2(/MOVND)   &         MOVND
138  A          JUMP   2(/PLSNX)   &
139  A /MNSNX   DATA   2('0215)    & MNSNX   BIT6
     &
140  A          CALL   2(/SYMST)   &         SYMST
141  A          CALL   2(/CNTRL)   & BIT6    CNTRL
142  A          PASS   2('0002)    &         STX
143  A          JUMP   2(/MNSN2)   &         MNSN2
     &
144  A /MOVND   PASS   2('0026)    & MOVND   SYN
145  A          PASS   2('0026)    &         SYN
146  A          DATA   2('0060)    &         ZERO(XLATE)
147  A          PASS   2('0031)    &         EM
     &
148  A          RET                &
149  A /PATNX   DATA   2('0227)    &         STAT1
150  A          JUMP   2(/DRNXT)   &
151  A /STAT1   PASW   2('0002)    & STAT1   STX
     &
152  B          SKIP   DIUND       &
153  A          JUMP   2(/STAT1)   &
154  A          JUMP   2(/STXNX)   &
155  A /MNSN2   DATA   2('0073)    & MNSN2
     &
156  A          CALL   2(/MOVND)   &
157  A          JUMP   2(/MNSNX)   &
158  A /STX2    PASS   2('0002)    & STX2    STX
159  A          JUMP   2(/STXNX)   &
160  B /SYMST   SKIP   SYM         & SYMST   SYM
161  A          JUMP   2(/SMST2)   &
162  A          PASW   2('0352)    &         DRECT
163  B          LOAD   SYMIN       &         SYMIN
     &
164  A          RET                &
165  A /SMST2   POP                & SMST2
166  A          JUMP   2(/SSTAT)   &
167  A /STXNX   DATA   2('0257)    & STXNX   STX
     &
168  B          SKIP   SYM         &         SYM
169  A          JUMP   2(/SSTAT)   &
170  A /BSTX    PASW   2('0352)    & BSTX    DRECT
171  B          LOAD   SYMIN       &         SYMIN
     &
172  B          SKIP   SMOUT       &         SMOUT
173  A          JUMP   2(/STX)     &
174  A          JUMP   2(/SMRET)   &
175  A /STX     CALL   2(/CNTRL)   & STX
     &
176  B          MICRO  PRDCU       &         LOAD PREG FROM DCU
177  B          SKIP   NOT7        &         NOT PREG7
178  A          JUMP   2(/SMCAL)   &
179  A          JUMP   2(/STX2)    &
     &
180  B /CNTRL   MICRO  PRDCU       &         LOAD PREG FROM DCU
181  B          SKIP   NOT7        &         NOT PREG7
182  A          RET                &
183  B          SKIP   NOT6        &         NOT PREG6
     &
184  A          RET                &
185  B          SKIP   NOT5        &         NOT PREG5
186  A          RET                &
187  A          POP                &
     &
188  A          EXEC               &
189  A          BLANK              & SPARE
190  A /ASTX    DATA   2('0257)    & ASTX    STX
191  A          JUMP   2(/SSTAT)   &
192  B /SMRET   SKIP   SYM         & SMRET   SYM
193  A          JUMP   2(/ASTX)    &
194  A          PASW   2('0362)    &
195  B          SKIP   NSMND       &         NOT SYMEND
     &
196  A          JUMP   2(/ASTX)    &
197  A          PASS   2('0353)    &
198  A          PASS   2('0354)    &
199  A          JUMP   2(/BSTX)    &
     &
200  A /SMCLN   DATA   2('0312)    & SMCLN   SMCAL
201  A          CALL   2(/SYMST)   &
```

```
B /SMCAL   SKIP    SYM          & SMCAL   SYM
A          JUMP    2(/SMCL2)    &
&
A          PASS    2('0355)     &         READ ROW
A          PASS    2('0357)     &         STORE ROW
A          PASS    2('0356)     &         READ COL
A          PASS    2('0360)     &         STORE COL
&
A          PASS    2('0361)     &         UP SCTR
A /SMCL3   PASW    2('0345)     &         DOTNX
B          LOAD    SMCTR        &
A          PASS    2('0365)     &         SET SCTR
&
A          PASS    2('0353)     &
A          PASS    2('0354)     &
A          PASW    2('0345)     &         DOTNX
A          PASS    2('0365)     &         SET SCTR
&
A          JUMP    2(/BSTX)     &
B /SMCL2   MICRO   SETF         & SMCL2
A          PASS    2('0342)     &
A          JUMP    2(/SMCL3)    &
&
A /BRT3    CALL    2(/SYMST)    & BRT3
A          CALL    2(/CNTRL)    & BRT
A          PASS    2('0002)     &         STX
A          JUMP    2(/BRT4)     &
A /MOVNX   DATA    2('0342)     & MOVNX   MOVE
A          CALL    2(/SYMST)    &
A /MOVE    CALL    2(/CNTRL)    & MOVE
A          PASS    2('0026)     &
&
A          JUMP    2(/MOVNX)    &
A /DOTNX   DATA    2('0347)     & DOTNX   DOT
A          CALL    2(/SYMST)    &
A /DOT     CALL    2(/CNTRL)    & DOT
&
A          PASS    2('0032)     &
A          JUMP    2(/DOTNX)    &
B /DRECT   MICRO   PBDCU        & DRECT   LOAD PREG FROM DCU
A          DIR                  &
&
B          SKIP    SYM          &
A          JUMP    2(/ASTX)     &
A          JUMP    2(/BSTX)     &
A /DRNXT   ENTST                & DRNXT
&
A          CALL    2(/SYMST)    &
B          MICRO   PRSTK        &         LOAD PREG FROM STACK
A          EXEC                 &
A /ENQNX   DATA    2('0040)     & ENQNX   ENQST
&
A          JUMP    2(/DRNXT)    &
A /BELNX   DATA    2('0042)     & BELNX   BELST
A          JUMP    2(/DRNXT)    &
A /SONXT   DATA    2('0044)     & SONXT   SOST
&
A          JUMP    2(/DRNXT)    &
A /SINXT   DATA    2('0046)     & SINXT   SIST
A          JUMP    2(/DRNXT)    &
A /EMNXT   DATA    2('0050)     & EMNXT   EMST
&
A          JUMP    2(/DRNXT)    &
A /ESCNX   DATA    2('0071)     & ESCNX   ESCST
A          JUMP    2(/DRNXT)    &
A          JUMP    2(/STXNX)    &
```

APPENDIX OO. SYM MICRO-CODE GENERATOR ROM 6802

| OCTAL ADDRESS | | BINARY ADDRESS $A_4$ ... $A_0$ | RESET-SCTR $B_7$ | EN-WRT-MSCOL $B_6$ | EN-WRT-MSROW $B_5$ | EN-WRT-MEM $B_4$ | LOAD-DREG $B_3$ | BUS-ADD-2 $B_2$ | BUS-ADD-1 $B_1$ | BUS-ADD-0 $B_0$ |
|---|---|---|---|---|---|---|---|---|---|---|
| | 0 | 00000 | | | | | | | | |
| 0 | 1 | 00001 | | | | | | | | |
| 0 | 2 | 00010 | 1 | | | | | | | |
| 0 | 3 | 00011 | | | | | | | | |
| 0 | 4 | 00100 | | | | | | | | |
| 0 | 5 | 00101 | | | | | 1 | 1 | 1 | |
| 0 | 6 | 00110 | | | | 1 | | | | |
| 0 | 7 | 00111 | | | | | 1 | | 1 | 1 |
| 1 | 0 | 01000 | | | | | 1 | | 1 | 1 |
| 1 | 1 | 01001 | | | | 1 | | | | |
| 1 | 2 | 01010 | | | | | 1 | | 1 | 1 |
| 1 | 3 | 01011 | | | | | | 1 | | |
| 1 | 4 | 01100 | | | | | | 1 | | 1 |
| 1 | 5 | 01101 | | | | | 1 | | | 1 |
| 1 | 6 | 01110 | | | | | 1 | | 1 | |
| 1 | 7 | 01111 | | | 1 | | | | | |
| | 0 | 10000 | | 1 | | | | | | |
| | 1 | 10001 | | | | | | | | |
| 2 | 2 | 10010 | | | | | | | | |
| 2 | 3 | 10011 | | | | | 1 | 1 | | |
| 2 | 4 | 10100 | | | | | 1 | 1 | | 1 |
| 2 | 5 | 10101 | | | | | | | | |
| 2 | 6 | 10110 | | | | | | | | |
| 2 | 7 | 10111 | | | | | | | | |
| 3 | 0 | 11000 | | | | | | | | |
| 3 | 1 | 11001 | | | | | | | | |
| 3 | 2 | 11010 | | | | | | | | |
| 3 | 3 | 11011 | | | | | | | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX PP. SYM MICRO-CODE GENERATOR ROM 6804

| OCTAL ADDRESS | | BINARY ADDRESS $A_4$ $A_0$ | RESET $B_7$ | LOAD-SCTR $B_5$ | EN-LOAD-PROW $B_6$ | EN-LOAD-PCOL $B_4$ | EN-SCTR-DN $B_3$ | EN-SCTR-UP $B_2$ | EN-PCTR-DN $B_1$ | EN-PCTR-UP $B_0$ |
|---|---|---|---|---|---|---|---|---|---|---|
| 0 | 0 | 00000 | | | | | | | | |
| 0 | 1 | 00001 | 1 | | | | | | | |
| 0 | 2 | 00010 | | | | | | | | |
| 0 | 3 | 00011 | | | 1 | | | | | |
| 0 | 4 | 00100 | | | | 1 | | | | |
| 0 | 5 | 00101 | | | | | | | | |
| 0 | 6 | 00110 | | | | | | | | |
| 0 | 7 | 00111 | | | | | | | | |
| 1 | 0 | 01000 | | | | | | | 1 | |
| 1 | 1 | 01001 | | | | | | | | 1 |
| 1 | 2 | 01010 | | | | | | | | 1 |
| 1 | 3 | 01011 | | | 1 | | | | | |
| 1 | 4 | 01100 | | | | 1 | | | | |
| 1 | 5 | 01101 | | | | | | | | |
| 1 | 6 | 01110 | | | | | | | | |
| 1 | 7 | 01111 | | | | | | | | |
| 2 | 0 | 10000 | | | | | | | | |
| 2 | 1 | 10001 | | | | | | 1 | | |
| 2 | 2 | 10010 | | | | | 1 | | | |
| 2 | 3 | 10011 | | | | | | | | |
| 2 | 4 | 10100 | | | | | | | | |
| 2 | 5 | 10101 | | 1 | | | | | | |
| 2 | 6 | 10110 | | | | | | | | |
| 2 | 7 | 10111 | | | | | | | | |
| 3 | 0 | 11000 | | | | | | | | |
| 3 | 1 | 11001 | | | | | | | | |
| 3 | 2 | 11010 | | | | | | | | |
| 3 | 3 | 11011 | | | | | | | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX QQ. DEVICES USED TO IMPLEMENT AN EXEMPLARY SYM

All Boolean equations and gates are implemented using the following devices:

| Function | Manufacturer | Catalog Number |
|---|---|---|
| NAND | TI | 74LS00 |
| NAND | TI | 74LS10 |
| INVERTER | TI | 74LS04 |
| NOR | TI | 74LS02 |

Other devices used:

| Figure Reference No. | Manuf. | Cat. No. | |
|---|---|---|---|
| 6704 | TI | 74LS109 | |
| 6705 | TI | 74LS193 | |
| 6706 | TI | 74LS138 | Manufacturer Codes: |
| 6707, 6708, 6709 | TI | 74LS109 | |

| | | | |
|---|---|---|---|
| 6801 | TI | 74LS298 | |
| 6802 | SIG | 8223 | |
| 6803 | TI | 74LS138 | |
| 6804 | SIG | 8223 | |
| 6806 | TI | 74173 | |
| 6807 | SIG | 8T96 | |
| 6901 | SYN | 2112 | |
| 7001 | TI | 74LS193 | |
| 7002, 7003 | SIG | 8T95 | |
| 7004 | TI | 74LS193 | |
| 7005 | SYN | 2112 | |

TI = Texas Instruments, Inc.
SYN = Synertec, Inc.
SIG = Signetics, Inc.

APPENDIX RR. DIU MICRO-CODE GENERATOR ROM 5817

| OCTAL ADDRESS | | BINARY ADDRESS $A_4$—$A_0$ | $B_7$ | $B_6$ | $B_5$ | $B_4$ | $B_3$ | $B_2$ | $B_1$ | $B_0$ |
|---|---|---|---|---|---|---|---|---|---|---|
| [illegible] | 0 | 00000 | | | | | 1 | | 1 | |
| 0 | 1 | 00001 | | | | | | | 1 | |
| 0 | 2 | 00010 | | | | 1 | | | | |
| 0 | 3 | 00011 | | | | 1 | 1 | | 1 | |
| 0 | 4 | 00100 | | | | | 1 | | 1 | |
| 0 | 5 | 00101 | | | | | | | 1 | 1 |
| 0 | 6 | 00110 | | | 1 | | 1 | 0 | 1 | |
| 0 | 7 | 00111 | | | | | | | 1 | 1 |
| 1 | 0 | 01000 | | | | | | | 1 | |
| 1 | 1 | 01001 | | | | | | | 1 | |
| 1 | 2 | 01010 | | | | | | | 1 | |
| 1 | 3 | 01011 | | | | | | | 1 | |
| 1 | 4 | 01100 | | | | | | | 1 | |
| 1 | 5 | 01101 | | | | | | | 1 | |
| 1 | 6 | 01110 | | | | | | | 1 | 1 |
| 1 | 7 | 01111 | | | | | | | 1 | 1 |
| [illegible] | 0 | 10000 | | 1 | | | | | 1 | |
| [illegible] | 1 | 10001 | | | | | 1 | | 1 | |
| 2 | 2 | 10010 | | | | | 1 | | 1 | |
| 2 | 3 | 10011 | | | | | 1 | | 1 | |
| 2 | 4 | 10100 | | | | | 1 | | 1 | |
| 2 | 5 | 10101 | | | | | 1 | | 1 | |
| 2 | 6 | 10110 | 1 | | | | | | 1 | |
| 2 | 7 | 10111 | | | 1 | | 1 | 1 | 1 | |
| 3 | 0 | 11000 | | 1 | | | 1 | | 1 | |
| 3 | 1 | 11001 | | | | | 1 | | 1 | |
| 3 | 2 | 11010 | 1 | | | | | | 1 | |
| 3 | 3 | 11011 | | | | 1 | | | 0 | |
| 3 | 4 | 11100 | | | | | | | 1 | |
| 3 | 5 | 11101 | | | 1 | | 1 | 1 | 1 | |
| 3 | 6 | 11110 | | | 1 | | 1 | 1 | 1 | |
| 3 | 7 | 11111 | | | 1 | | 1 | 1 | 1 | |

| | | $A_4$—$A_0$ | $B_7$ | $B_6$ | $B_5$ | $B_4$ | $B_3$ | $B_2$ | $B_1$ | $B_0$ |
|---|---|---|---|---|---|---|---|---|---|---|
| [illegible] | 0 | 00000 | | | | | | | | |
| 0 | 1 | 00001 | | 1 | 1 | | | | | |
| 0 | 2 | 00010 | 1 | 1 | 1 | 1 | 1 | | | |
| 0 | 3 | 00011 | | | | | | | | |
| 0 | 4 | 00100 | | | | | | | | |
| 0 | 5 | 00101 | | 1 | 1 | 1 | | 1 | | |
| 0 | 6 | 00110 | | | 1 | | 1 | | | |
| 0 | 7 | 00111 | | 1 | 1 | 1 | | 1 | | |
| 1 | 0 | 01000 | | 1 | 1 | 1 | 1 | | | |
| 1 | 1 | 01001 | | | | | 1 | | | |
| 1 | 2 | 01010 | | | | 1 | | | | |
| 1 | 3 | 01011 | | 1 | 1 | | 1 | | | |
| 1 | 4 | 01100 | | | | 1 | | | | |
| 1 | 5 | 01101 | | | | 1 | 1 | | | |
| 1 | 6 | 01110 | | 1 | 1 | 1 | | 1 | | |
| 1 | 7 | 01111 | | 1 | 1 | 1 | | 1 | | |
| [illegible] | 0 | 10000 | | | | 1 | | | | |
| [illegible] | 1 | 10001 | | | | | | | | |
| 2 | 2 | 10010 | | | | | | | | |
| 2 | 3 | 10011 | | | | | | | | |
| 2 | 4 | 10100 | | | | | | | | |
| 2 | 5 | 10101 | | | | | | | | |
| 2 | 6 | 10110 | 1 | 1 | 1 | 1 | 1 | | 1 | |
| 2 | 7 | 10111 | | | 1 | | 1 | | | |
| 3 | 0 | 11000 | | | | | | | | |
| 3 | 1 | 11001 | | | | | | | 1 | |
| 3 | 2 | 11010 | 1 | 1 | 1 | 1 | 1 | | 1 | |
| 3 | 3 | 11011 | 0 | 1 | 1 | [illegible] | 1 | 0 | 0 | |
| 3 | 4 | 11100 | | | | | | | | |
| 3 | 5 | 11101 | | | 1 | | | | | |
| 3 | 6 | 11110 | | | | 1 | 1 | | | |
| 3 | 7 | 11111 | | | | | | | | |

| OCTAL ADDRESS | | BINARY ADDRESS $A_4$—$A_0$ | $B_7$ | $B_6$ | $B_5$ | $B_4$ | $B_3$ | $B_2$ | $B_1$ | $B_0$ |
|---|---|---|---|---|---|---|---|---|---|---|
| [illegible] | 0 | 00000 | | | | | | | | |
| 0 | 1 | 00001 | | | | | | | | |
| 0 | 2 | 00010 | | | | | | 1 | | |
| 0 | 3 | 00011 | | | | | | | | |
| 0 | 4 | 00100 | | 1 | 1 | | | | | |
| 0 | 5 | 00101 | | | | | | | | 1 |
| 0 | 6 | 00110 | | | | | | | | |
| 0 | 7 | 00111 | | | | | | | 1 | 1 |
| 1 | 0 | 01000 | | | | | | | | |
| 1 | 1 | 01001 | | | | | | | | |
| 1 | 2 | 01010 | | | | | | | | |
| 1 | 3 | 01011 | | | | | | | | |
| 1 | 4 | 01100 | | | | | 1 | 1 | | |
| 1 | 5 | 01101 | | | | | | | | |
| 1 | 6 | 01110 | | | | | | | | |
| 1 | 7 | 01111 | | | | | | | 1 | |
| [illegible] | 0 | 10000 | | | | 1 | 1 | 1 | | |
| [illegible] | 1 | 10001 | 1 | | | | | | 1 | 1 |
| 2 | 2 | 10010 | 1 | | | | | | | 1 |
| 2 | 3 | 10011 | 1 | | | | | | 1 | |
| 2 | 4 | 10100 | 1 | | | | | | | |
| 2 | 5 | 10101 | | | 1 | | | | | |
| 2 | 6 | 10110 | | | | | | | | |
| 2 | 7 | 10111 | | | | | | | | |
| 3 | 0 | 11000 | | | | | | | | |
| 3 | 1 | 11001 | | | | | | | | |
| 3 | 2 | 11010 | | | | | | | | |
| 3 | 3 | 11011 | | | | | | 1 | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX SS. DIU CURSOR ROM 6304

| ADDRESS OCT. | ADDRESS DEC. | $Q_3$ | $Q_2$ | $Q_1$ | $Q_0$ |
|---|---|---|---|---|---|
| 000 | 000 | 0 | 0 | 0 | 0 |
| 001 | 001 | 0 | 0 | 0 | 0 |
| 002 | 002 | 0 | 1 | 0 | 0 |
| 003 | 003 | 0 | 1 | 0 | 0 |
| 004 | 004 | 0 | 0 | 0 | 0 |
| 005 | 005 | 0 | 1 | 1 | 1 |
| 006 | 006 | 0 | 0 | 0 | 0 |
| 007 | 007 | 0 | 1 | 1 | 0 |
| 010 | 008 | 1 | 1 | 1 | 1 |
| 011 | 009 | 1 | 1 | 1 | 1 |
| 012 | 010 | 0 | 1 | 1 | 1 |
| 013 | 011 | 0 | 1 | 1 | 1 |
| 014 | 012 | 0 | 0 | 0 | 0 |
| 015 | 013 | 0 | 0 | 0 | 0 |
| 016 | 014 | 0 | 0 | 0 | 0 |
| 017 | 015 | 0 | 0 | 0 | 0 |
| 020 | 016 | 0 | 0 | 0 | 0 |
| 021 | 017 | 0 | 0 | 0 | 0 |
| 022 | 018 | 0 | 0 | 0 | 0 |
| 023 | 019 | 0 | 0 | 0 | 0 |
| 024 | 020 | 0 | 0 | 0 | 0 |
| 025 | 021 | 0 | 0 | 0 | 0 |
| 026 | 022 | 0 | 1 | 0 | 0 |
| 027 | 023 | 0 | 1 | 0 | 0 |
| 030 | 024 | 1 | 1 | 1 | 1 |
| 031 | 025 | 1 | 1 | 1 | 1 |
| 032 | 026 | 1 | 1 | 1 | 1 |
| 033 | 027 | 1 | 1 | 1 | 1 |
| 034 | 028 | 0 | 0 | 0 | 0 |
| 035 | 029 | 0 | 0 | 0 | 0 |
| 036 | 030 | 0 | 1 | 1 | 0 |
| 037 | 031 | 0 | 1 | 1 | 0 |
| 040 | 032 | 0 | 1 | 0 | 0 |
| 041 | 033 | 0 | 1 | 0 | 0 |
| 042 | 034 | 0 | 0 | 0 | 0 |
| 043 | 035 | 0 | 1 | 0 | 0 |
| 044 | 036 | 0 | 0 | 0 | 0 |
| 045 | 037 | 0 | 0 | 0 | 0 |
| 046 | 038 | 0 | 0 | 0 | 0 |
| 047 | 039 | 0 | 0 | 0 | 0 |
| 050 | 040 | 0 | 1 | 0 | 0 |
| 051 | 041 | 0 | 1 | 0 | 0 |
| 052 | 042 | 0 | 0 | 0 | 0 |
| 053 | 043 | 0 | 1 | 0 | 0 |
| 054 | 044 | 0 | 1 | 0 | 0 |
| 055 | 045 | 0 | 1 | 0 | 0 |
| 056 | 046 | 0 | 0 | 0 | 0 |
| 057 | 047 | 0 | 1 | 0 | 0 |
| 060 | 048 | 0 | 0 | 0 | 0 |
| 061 | 049 | 0 | 0 | 0 | 0 |
| 062 | 050 | 0 | 0 | 0 | 0 |
| 063 | 051 | 0 | 0 | 0 | 0 |
| 064 | 052 | 0 | 1 | 0 | 0 |
| 065 | 053 | 0 | 1 | 0 | 0 |
| 066 | 054 | 0 | 0 | 0 | 0 |
| 067 | 055 | 0 | 1 | 0 | 0 |
| 070 | 056 | 1 | 1 | 0 | 1 |
| 071 | 057 | 1 | 1 | 0 | 1 |
| 072 | 058 | 0 | 0 | 0 | 0 |
| 073 | 059 | 1 | 1 | 0 | 1 |
| 074 | 060 | 0 | 1 | 0 | 0 |
| 075 | 061 | 0 | 1 | 0 | 0 |
| 076 | 062 | 0 | 0 | 0 | 0 |
| 077 | 063 | 0 | 1 | 0 | 0 |

| ADDRESS | | $Q_3$ | $Q_2$ | $Q_1$ | $Q_0$ |
|---|---|---|---|---|---|
| OCT. | DEC. | | | | |
| 10 0 | 064 | 0 | 1 | 0 | 0 |
| 10 1 | 065 | 0 | 1 | 0 | 0 |
| 10 2 | 066 | 0 | 0 | 0 | 0 |
| 10 3 | 067 | 0 | 1 | 0 | 0 |
| 10 4 | 068 | 1 | 1 | 0 | 1 |
| 10 5 | 069 | 1 | 1 | 0 | 1 |
| 10 6 | 070 | 0 | 0 | 0 | 0 |
| 10 7 | 071 | 1 | 1 | 0 | 1 |
| 11 0 | 072 | 0 | 0 | 0 | 0 |
| 11 1 | 073 | 0 | 0 | 0 | 0 |
| 11 2 | 074 | 0 | 0 | 0 | 0 |
| 11 3 | 075 | 0 | 0 | 0 | 0 |
| 11 4 | 076 | 1 | 1 | 0 | 1 |
| 11 5 | 077 | 1 | 1 | 0 | 1 |
| 11 6 | 078 | 0 | 0 | 0 | 0 |
| 11 7 | 079 | 1 | 1 | 0 | 1 |
| 12 0 | 080 | 1 | 1 | 0 | 1 |
| 12 1 | 081 | 1 | 1 | 0 | 1 |
| 12 2 | 082 | 0 | 0 | 0 | 0 |
| 12 3 | 083 | 1 | 1 | 0 | 1 |
| 12 4 | 084 | 1 | 1 | 0 | 1 |
| 12 5 | 085 | 1 | 1 | 0 | 1 |
| 12 6 | 086 | 0 | 0 | 0 | 0 |
| 12 7 | 087 | 1 | 1 | 0 | 1 |
| 13 0 | 088 | 1 | 1 | 0 | 1 |
| 13 1 | 089 | 1 | 1 | 0 | 1 |
| 13 2 | 090 | 0 | 0 | 0 | 0 |
| 13 3 | 091 | 1 | 1 | 0 | 1 |
| 13 4 | 092 | 0 | 0 | 0 | 0 |
| 13 5 | 093 | 0 | 0 | 0 | 0 |
| 13 6 | 094 | 0 | 0 | 0 | 0 |
| 13 7 | 095 | 0 | 0 | 0 | 0 |

| ADDRESS | | $Q_3$ | $Q_2$ | $Q_1$ | $Q_0$ |
|---|---|---|---|---|---|
| OCT. | DEC. | | | | |
| 14 0 | 096 | 1 | 1 | 1 | 1 |
| 14 1 | 097 | 1 | 1 | 1 | 1 |
| 14 2 | 098 | 1 | 1 | 1 | 1 |
| 14 3 | 099 | 1 | 1 | 1 | 1 |
| 14 4 | 100 | 1 | 1 | 1 | 1 |
| 14 5 | 101 | 1 | 1 | 1 | 1 |
| 14 6 | 102 | 1 | 1 | 1 | 1 |
| 14 7 | 103 | 1 | 1 | 1 | 1 |
| 15 0 | 104 | 0 | 0 | 0 | 0 |
| 15 1 | 105 | 0 | 0 | 0 | 0 |
| 15 2 | 106 | 0 | 0 | 0 | 0 |
| 15 3 | 107 | 0 | 0 | 0 | 0 |
| 15 4 | 108 | 0 | 0 | 0 | 0 |
| 15 5 | 109 | 0 | 0 | 0 | 0 |
| 15 6 | 110 | 1 | 1 | 0 | 1 |
| 15 7 | 111 | 1 | 1 | 0 | 1 |
| 16 0 | 112 | 0 | 0 | 0 | 0 |
| 16 1 | 113 | 0 | 0 | 0 | 0 |
| 16 2 | 114 | 0 | 0 | 0 | 0 |
| 16 3 | 115 | 0 | 0 | 0 | 0 |
| 16 4 | 116 | 0 | 0 | 0 | 0 |
| 16 5 | 117 | 0 | 0 | 0 | 0 |
| 16 6 | 118 | 0 | 0 | 0 | 0 |
| 16 7 | 119 | 0 | 0 | 0 | 0 |
| 17 0 | 120 | 0 | 0 | 0 | 0 |
| 17 1 | 121 | 0 | 0 | 0 | 0 |
| 17 2 | 122 | 1 | 1 | 0 | 1 |
| 17 3 | 123 | 1 | 1 | 0 | 1 |
| 17 4 | 124 | 0 | 0 | 0 | 0 |
| 17 5 | 125 | 0 | 1 | 1 | 1 |
| 17 6 | 126 | 0 | 0 | 0 | 0 |
| 17 7 | 127 | 0 | 0 | 0 | 0 |

| ADDRESS OCT. | DEC. | $Q_3$ | $Q_2$ | $Q_1$ | $Q_0$ |
|---|---|---|---|---|---|
| 20 0 | 128 | 0 | 0 | 0 | 0 |
| 20 1 | 129 | 0 | 0 | 0 | 0 |
| 20 2 | 130 | 0 | 1 | 0 | 0 |
| 20 3 | 131 | 0 | 1 | 0 | 0 |
| 20 4 | 132 | 0 | 0 | 0 | 0 |
| 20 5 | 133 | 0 | 1 | 1 | 1 |
| 20 6 | 134 | 0 | 0 | 0 | 0 |
| 20 7 | 135 | 0 | 1 | 1 | 1 |
| 21 0 | 136 | 1 | 1 | 1 | 1 |
| 21 1 | 137 | 1 | 1 | 1 | 1 |
| 21 2 | 138 | 0 | 1 | 1 | 1 |
| 21 3 | 139 | 0 | 1 | 1 | 1 |
| 21 4 | 140 | 0 | 0 | 0 | 0 |
| 21 5 | 141 | 0 | 0 | 0 | 0 |
| 21 6 | 142 | 0 | 0 | 0 | 0 |
| 21 7 | 143 | 0 | 0 | 0 | 0 |
| 22 0 | 144 | 1 | 1 | 1 | 1 |
| 22 1 | 145 | 1 | 1 | 1 | 1 |
| 22 2 | 146 | 1 | 1 | 1 | 1 |
| 22 3 | 147 | 1 | 1 | 1 | 1 |
| 22 4 | 148 | 1 | 1 | 1 | 1 |
| 22 5 | 149 | 1 | 1 | 1 | 1 |
| 22 6 | 150 | 1 | 1 | 1 | 1 |
| 22 7 | 151 | 1 | 1 | 1 | 1 |
| 23 0 | 152 | 0 | 0 | 0 | 0 |
| 23 1 | 153 | 0 | 0 | 0 | 0 |
| 23 2 | 154 | 0 | 0 | 0 | 0 |
| 23 3 | 155 | 0 | 0 | 0 | 0 |
| 23 4 | 156 | 0 | 0 | 0 | 0 |
| 23 5 | 157 | 0 | 0 | 0 | 0 |
| 23 6 | 158 | 0 | 1 | 1 | 0 |
| 23 7 | 159 | 0 | 1 | 1 | 0 |

| ADDRESS OCT. | DEC. | $Q_3$ | $Q_2$ | $Q_1$ | $Q_0$ |
|---|---|---|---|---|---|
| 24 0 | 160 | 0 | 1 | 0 | 0 |
| 24 1 | 161 | 0 | 1 | 0 | 0 |
| 24 2 | 162 | 0 | 0 | 0 | 0 |
| 24 3 | 163 | 0 | 1 | 0 | 0 |
| 24 4 | 164 | 0 | 0 | 0 | 0 |
| 24 5 | 165 | 0 | 0 | 0 | 0 |
| 24 6 | 166 | 0 | 0 | 0 | 0 |
| 24 7 | 167 | 0 | 0 | 0 | 0 |
| 25 0 | 168 | 0 | 1 | 0 | 0 |
| 25 1 | 169 | 0 | 1 | 0 | 0 |
| 25 2 | 170 | 0 | 0 | 0 | 0 |
| 25 3 | 171 | 0 | 1 | 0 | 0 |
| 25 4 | 172 | 0 | 1 | 0 | 0 |
| 25 5 | 173 | 0 | 1 | 0 | 0 |
| 25 6 | 174 | 0 | 0 | 0 | 0 |
| 25 7 | 175 | 0 | 1 | 0 | 0 |
| 26 0 | 176 | 0 | 0 | 0 | 0 |
| 26 1 | 177 | 0 | 0 | 0 | 0 |
| 26 2 | 178 | 0 | 0 | 0 | 0 |
| 26 3 | 179 | 0 | 0 | 0 | 0 |
| 26 4 | 180 | 0 | 1 | 0 | 0 |
| 26 5 | 181 | 0 | 1 | 0 | 0 |
| 26 6 | 182 | 0 | 0 | 0 | 0 |
| 26 7 | 183 | 0 | 1 | 0 | 0 |
| 27 0 | 184 | 1 | 1 | 0 | 1 |
| 27 1 | 185 | 1 | 1 | 0 | 1 |
| 27 2 | 186 | 0 | 0 | 0 | 0 |
| 27 3 | 187 | 1 | 1 | 0 | 1 |
| 27 4 | 188 | 0 | 1 | 0 | 0 |
| 27 5 | 189 | 0 | 1 | 0 | 0 |
| 27 6 | 190 | 0 | 0 | 0 | 0 |
| 27 7 | 191 | 0 | 0 | 0 | 0 |

| ADDRESS | | $Q_3$ | $Q_2$ | $Q_1$ | $Q_0$ |
|---|---|---|---|---|---|
| OCT. | DEC. | | | | |
| 30 0 | 192 | 0 | 1 | 0 | 0 |
| 30 1 | 193 | 0 | 1 | 0 | 0 |
| 30 2 | 194 | 0 | 0 | 0 | 0 |
| 30 3 | 195 | 0 | 1 | 0 | 0 |
| 30 4 | 196 | 1 | 1 | 0 | 1 |
| 30 5 | 197 | 1 | 1 | 0 | 1 |
| 30 6 | 198 | 0 | 0 | 0 | 0 |
| 30 7 | 199 | 1 | 1 | 0 | 1 |
| 31 0 | 200 | 0 | 0 | 0 | 0 |
| 31 1 | 201 | 0 | 0 | 0 | 0 |
| 31 2 | 202 | 0 | 0 | 0 | 0 |
| 31 3 | 203 | 0 | 0 | 0 | 0 |
| 31 4 | 204 | 1 | 1 | 0 | 1 |
| 31 5 | 205 | 1 | 1 | 0 | 1 |
| 31 6 | 206 | 0 | 0 | 0 | 0 |
| 31 7 | 207 | 1 | 1 | 0 | 1 |
| 32 0 | 208 | 1 | 1 | 0 | 1 |
| 32 1 | 209 | 1 | 1 | 0 | 1 |
| 32 2 | 210 | 0 | 0 | 0 | 0 |
| 32 3 | 211 | 1 | 1 | 0 | 1 |
| 32 4 | 212 | 1 | 1 | 0 | 1 |
| 32 5 | 213 | 1 | 1 | 0 | 1 |
| 32 6 | 214 | 0 | 0 | 0 | 0 |
| 32 7 | 215 | 1 | 1 | 0 | 1 |
| 33 0 | 216 | 1 | 1 | 0 | 1 |
| 33 1 | 217 | 1 | 1 | 0 | 1 |
| 33 2 | 218 | 0 | 0 | 0 | 0 |
| 33 3 | 219 | 1 | 1 | 0 | 1 |
| 33 4 | 220 | 0 | 0 | 0 | 0 |
| 33 5 | 221 | 0 | 0 | 0 | 0 |
| 33 6 | 222 | 0 | 0 | 0 | 0 |
| 33 7 | 223 | 0 | 0 | 0 | 0 |

| ADDRESS | | $Q_3$ | $Q_2$ | $Q_1$ | $Q_0$ |
|---|---|---|---|---|---|
| OCT. | DEC. | | | | |
| 34 0 | 224 | 0 | 0 | 0 | 0 |
| 34 1 | 225 | 0 | 0 | 0 | 0 |
| 34 2 | 226 | 0 | 0 | 0 | 0 |
| 34 3 | 227 | 0 | 0 | 0 | 0 |
| 34 4 | 228 | 0 | 0 | 0 | 0 |
| 34 5 | 229 | 0 | 0 | 0 | 0 |
| 34 6 | 230 | 1 | 0 | 0 | 1 |
| 34 7 | 231 | 1 | 0 | 0 | 1 |
| 35 0 | 232 | 0 | 0 | 0 | 0 |
| 35 1 | 233 | 0 | 0 | 0 | 0 |
| 35 2 | 234 | 0 | 0 | 0 | 0 |
| 35 3 | 235 | 0 | 0 | 0 | 0 |
| 35 4 | 236 | 0 | 0 | 0 | 0 |
| 35 5 | 237 | 0 | 0 | 0 | 0 |
| 35 6 | 238 | 0 | 0 | 0 | 0 |
| 35 7 | 239 | 0 | 0 | 0 | 0 |
| 36 0 | 240 | 1 | 1 | 1 | 1 |
| 36 1 | 241 | 1 | 1 | 1 | 1 |
| 36 2 | 242 | 1 | 0 | 0 | 0 |
| 36 3 | 243 | 1 | 0 | 0 | 0 |
| 36 4 | 244 | 0 | 0 | 0 | 0 |
| 36 5 | 245 | 0 | 0 | 0 | 0 |
| 36 6 | 246 | 0 | 0 | 0 | 0 |
| 36 7 | 247 | 0 | 0 | 0 | 0 |
| 37 0 | 248 | 0 | 0 | 0 | 0 |
| 37 1 | 249 | 0 | 0 | 0 | 0 |
| 37 2 | 250 | 1 | 1 | 0 | 1 |
| 37 3 | 251 | 1 | 1 | 0 | 1 |
| 37 4 | 252 | 0 | 0 | 0 | 0 |
| 37 5 | 253 | 0 | 1 | 1 | 1 |
| 37 6 | 254 | 0 | 1 | 0 | 0 |
| 37 7 | 255 | 0 | 0 | 0 | 0 |

APPENDIX TT. DEVICES USED TO IMPLEMENT AN EXEMPLARY DIU

All Boolean equations and gates are implemented using the following devices:

| Function | Manufacturer | Catalog Number |
|---|---|---|
| NAND | TI | 74LS00 |
| INVERTER | TI | 74LS04 |
| NOR | TI | 74LS02 |

Other devices used:

| Figure Reference Number | Manufacturer | Catalog Number |
|---|---|---|
| 6C01, 6C02, 6C03, 6C04, 6C05, 6C06, 6D02, 6301 | TI | 74LS161 |
| 6D01, 5802, 5803, 6101, 6102, 6206 | TI | 74LS174 |
| 6D03, 6D07, 6D08 | TI | 74LS157 |
| 6D04 | SIG | 82S11 |
| 6D05, 6D06, 6D10, 6403 | SYN | 2112 |
| 6D09, 6401 | MM | 6072 |
| 7A01, 7A02, 6203, 6204 | TI | 74LS74 |
| 6001, 6002 | TI | 74LS109 |
| 6103, 6304 | MM | 6300 |
| 6201 | FC | 9334 |
| 6202 | TI | 74LS173 |
| 6205 | SIG | 8223 |
| 6302 | TI | 74LS139 |
| 6303 | TI | 74LS670 |
| 6305 | TI | 74LS283 |
| 6402, 6404 | TI | 74LS151 |

Manufacturer Codes:
TI = Texas Instruments, Inc.
MM = Monolithic Memories, Inc.
SYN = Synertec, Inc.
SIG = Signetics, Inc.
FC = Fairchild, Inc.

APPENDIX UU. CRT COLOR GENERATOR ROM

| OCTAL ADDRESS | | BINARY ADDRESS $A_4$—$A_0$ | OUTPUTS $B_7$ | $B_6$ | $B_5$ | $B_4$ | $B_3$ | $B_2$ BLUE | $B_1$ GREEN | $B_0$ RED |
|---|---|---|---|---|---|---|---|---|---|---|
| | 0 | 00000 | | | | | | 1 | 1 | 1 |
| 0 | 1 | 00001 | | | | | | | | |
| 0 | 2 | 00010 | | | | | | | | 1 |
| 0 | 3 | 00011 | | | | | | | 1 | 1 |
| 0 | 4 | 00100 | | | | | | | | |
| 0 | 5 | 00101 | | | | | | | | |
| 0 | 6 | 00110 | | | | | | | | |
| 0 | 7 | 00111 | | | | | | | 1 | |
| 1 | 0 | 01000 | | | | | | | | |
| 1 | 1 | 01001 | | | | | | | | |
| 1 | 2 | 01010 | | | | | | | | |
| 1 | 3 | 01011 | | | | | | | | |
| 1 | 4 | 01100 | | | | | | | | |
| 1 | 5 | 01101 | | | | | | 1 | | 1 |
| 1 | 6 | 01110 | | | | | | | | |
| 1 | 7 | 01111 | | | | | | | | |
| 2 | 0 | 10000 | | | | | | | | |
| | 1 | 10001 | | | | | | | | |
| 2 | 2 | 10010 | | | | | | 1 | | |
| 2 | 3 | 10011 | | | | | | | | |
| 2 | 4 | 10100 | | | | | | | | |
| 2 | 5 | 10101 | | | | | | | | |
| 2 | 6 | 10110 | | | | | | | | |
| 2 | 7 | 10111 | | | | | | 1 | 1 | 1 |
| 3 | 0 | 11000 | | | | | | | | |
| 3 | 1 | 11001 | | | | | | 1 | 1 | |
| 3 | 2 | 11010 | | | | | | | | |
| 3 | 3 | 11011 | | | | | | | | |
| 3 | 4 | 11100 | | | | | | | | |
| 3 | 5 | 11101 | | | | | | | | |
| 3 | 6 | 11110 | | | | | | | | |
| 3 | 7 | 11111 | | | | | | | | |

APPENDIX VV

REFERENCES

Aho, A. V., and Ullman, J. D., "The Theory of Parsing, Translation, and Compiling", Prentice-Hall, Inc., Englewood Cliffs, N.J., 1972

Anderson, G. A., and Jensen, E. D., "Computer Interconnection: Taxonomy, Characteristics, and Examples", ACM Computing Surveys, Vol. 7, No. 4, December 1975

Bell, C. G., and Newell, A., "Computer Structures: Readings and Examples", McGraw-Hill, New York, 1971

Coffman, E. G., Jr., Elphick, M. J., and Shoshani, A., "System Deadlocks", ACM Computing Surveys, Vol. 3, No. 2, June 1971

Enslow, P. H., Jr., Ed., "Multiprocessors and Parallel Processing", John Wiley and Sons, New York, 1974

Foster, Caxton C., "Computer Architecture", Van Nostrand Rheinhold Co., New York, New York, 1970

Griswold, R. E., and Griswold, M. T., "A SNOBOL 4 Primer", Prentice-Hall, Inc., Englewood Cliffs, N.J., 1973

Hopcroft, J. E., and Ullman, J. D., "Formal Languages and their Relation to Automata", Addison-Wesley Co., Reading, Mass., 1969

Joseph, E. C., "Innovations in Heterogeneous and Homogeneous Distributed Function Architectures", IEEE Computer Magazine, March 1974

Korfphage, R. R., "Discrete Computation Structures", Academic Press, Inc., New York, 1974

Lewis, P. M., II, Rosenkrantz, D. J., and Stearns, R. E., "Compiler Design Theory", Addision-Wesley Co., Reading, Mass., 1976

Lewis, P. M., II, and Stearns, R. E., "Syntax Directed Transduction", JACM, Vol. 15, No. 3, July 1968, pp. 465–488

Rupp, Charlé R., "A Class of Multiple Processor Computers with Grammar Directed Control", copyright 1976 by Author, published by University Microfilms, Ann Arbor, Mich.

Rupp, Charlé R., "A Stand-alone CAI System Based on Procedural Grammars", IEEE EASCON, Fall 1976

Rupp, Charlé R., and Glorioso, R. M., "A Design Approach for Multiple Processor Computers", Chapter 2 in the book "Microcomputer Design and Applications", Samuel C. Lee, Editor, c. 1977, Academic Press, Inc., New York, N.Y.

Rupp, Charlé R., and Glorioso, R. M., "Grammar Based Multiple Processor Design", IEEE Micro-Computer Conference Record, c. 1977, IEEE Publication 77CH1185-8, Long Beach, Calif.

Weissman, Clark, "LISP 1.5 PRIMER", Dickenson Publishing Company, Belmont, Calif. 1967

PATENT REFERENCES

Amdahl, L. D., et al, "Modular Computer System Disconnect Capability", U.S. Pat. No. 3,226,689, issued Dec. 28, 1965

Belle Isle, Albert P., "Data Processing System Having Pyramidal Hierarchy Control Flow", U.S. Pat. No. 3,962,685, issued June 8, 1976

Belser, Karl A., "Method and Apparatus for Point Plotting of Graphical Data from a Coded Source into a Buffer and for Rearranging that Data for Supply to a Raster Responsive Device", U.S. Pat. No. 3,973,245, issued Aug. 3, 1976

Christensen, Carl, "Computer Graphics System", U.S. Pat. No. 3,534,338, issued Oct. 13, 1970

Dinman, Saul B., "Direct Function Processor", U.S. Pat. No. 3,631,401, issued Dec. 28, 1971

Mellen, Gregory E., et al, "Task Control", U.s. Pat. No. 3,530,438, issued Sept. 22, 1970

Perpiglia, Frank J., "Large Scale Multi-Level Information Processing System Employing Improved Failsafe (sic) Techniques", U.S. Pat. No. 3,905,023, issued Sept. 9, 1975

Rehhauser, Frederick V., et al, "Information Processing System Implementing Program Structures Common to Higher Level Program Languages", U.s. Pat. No. 3,665,421, issued May 23, 1972

Wahlstrom, Sven E., "Electronically Controlled Microelectronic Cellular Logic Array", U.S. Pat. No. 3,473,160, issued Oct. 14, 1969

What is claimed as new and desired to be secured by Letters Patent of the United States is:

1. A distributive function information processing system made up of interconnected processing elements for use in combination with one or more input or output devices such as display devices, keyboards, printers, cathode ray tubes and data links, comprising:

a. a plurality of processing elements including:
   (1) one or more data processors for receiving, transforming and transmitting data in response to control signals, and
   (2) two or more control processors for generating and transmitting control signals for operating said system;

b. a plurality of control arcs interconnecting said processing elements into a system, each said control arc consisting of:
   (1) control arc logic circuitry for generating and transmitting said control signals constituting a control arc transmitter,
   (2) control arc logic circuitry for receiving and interpreting said control signals constituting a control arc receiver, and
   (3) electrical connectors constituting control arc communication lines interconnecting said control arc transmitter and said control arc receiver into a control arc for conveying said control signals from transmitter to the receiver and for conveying responses to said control signals from receiver to transmitter whereby each control arc can pass said control signals in the direction from transmitter to receiver, said control arc logic circuits being located in and forming a part of said processing elements with the two logic circuits of each control arc being located in a different processing element with control arc transmitters being located only in said control processors, with control arc receivers being located in either control processors or data processors and with at least one control processor containing a control arc receiver whereby each control arc interconnects two processing elements for interconnecting said processing elements into said system, wherein the number of control arcs is equal to or greater than the total number of control and data processors, wherein said control arcs interconnecting two or more of the processing elements in a system describe a loop and wherein one said control processor includes, in addition to the control arc logic circuitry constituting a portion of one or more said control arcs, state defined control circuitry permitting said one control processor to assume, in turn, two or more different states to have state defined control whereby the control function performed by said one control processor depends in part on its state;

c. input and output data lines for connecting one or more processing elements with one or more said input or output devices wherein the network created by processing elements when interconnected by said control arcs defines a mathematical graph in the sense of graph mathematics over the processing elements and wherein said processing elements constitute the nodes of the graph; and d. data path means for movement of data among said processing elements, said electrical connectors constituting control arc communication lines also constituting means for movement of data in the same direction as said control signals are moved thereby constituting a portion of said data path means;

whereby said system may accept data from said input device, operate and transform data using a control scheme based on graph theory mathematics and produce data usable by said output device.

2. The distributive function information processing system of claim 1 wherein said loop described by control arcs interconnecting processing elements includes three or more control processors interconnected by control arcs which are oriented as to the direction in which control signals can be passed so that control signals can be passed completely around said loop in a constant direction whereby said loop constitutes a directed cycle in the language of the graph theory of mathemetics.

3. The distributive function information processing system of claim 1 wherein said system includes two or more control processors having state defined control.

4. The distributive function information processing system of claim 1 wherein:

a. said system includes two or more control processors having state defined control; and b. said loop described by control arcs in interconnecting processing elements includes three or more control processors interconnected by control arcs which are oriented as to the direction in which control signals can be passed so that said control signals can be passed completely around said loop in a single direction whereby said loop constitutes a directed cycle permitting application of a theory of operation based on the directed graph theory of mathematics.

5. The distributive function information processing system of claim 1 wherein:

a. said system includes two or more control processors having state defined control; and b. said loop described by control arcs interconnecting processing elements includes three or more control processors, at least one of which is one of said control processors having state defined control, interconnected by control arcs which are oriented as to the direction in which control signals can be passed so that said control signals can be passed completely around said loop in a single direction whereby said loop constitutes a directed cycle permitting application of a theory of operation based on the directed graph theory of mathematics.

6. The distributive function information processing system of claim 1 wherein:

a. each of said plurality of processing elements includes, in addition to the included control arc logic circuitry located therein, digital circuitry comprising one or more subcircuits for carrying out the intended function of the processing element and a maintenance multiplexer for testing said subcircuits, each said subcircuit comprising a register and an input or a memory device, said maintenance multiplexer having an input from each said subcircuit of said processing element and havng an output wherein the output of said maintenance multiplexer constitutes the data output from said processing element to other processing elements;

b. each of said two or more control processors, in addition, includes an advance and disable circuit comprising a flip-flop and gates interconnected with the control logic circuitry of said control processor wherein said flip-flop can serve to temporarily halt and allow resumption of an ongoing process of executing a sequence of instructions within said control logic circuitry as a function of signals received by said control processor which signals alternately enable or disable said flip-flop;

c. said processing system also includes a first set of electrical conductors connected to the maintenance multiplexer of each processing element constituting a maintenance address network, a second set of electrical conductors connected to the advance and disable circuits of each control processor and a test signal generator connected to both sets of electrical conductors, said test signal generator including recording means or display means and being located in one said processing element, input device or output device;

whereby operation can be stopped by said test signal generator and any said subcircuit can be addressed and inspected by recording means or display means constituting a portion of said test signal generator at any point of completion of execution of any instruction in a sequence.

7. The distributive function information processing system of claim 1 wherein one said data processor is a programmable digital processor for performing operations of string concatenation, alternation and substring search by manipulating and comparing strings of data words by transferring the words among a plurality of memory stacks comprising:

a. an input register;

b. an output register;

c. a plurality of LIFO memory stacks including:

(1) one LIFO stack designated a left stack which is particularly adapted for being loaded with a string of data words with the data word representing the right end of the string so located as to be first out, (2) at least one LIFO stack designated a right stack which is particularly adapted for being loaded with a string of data words with the data word representing the left end of the string so located as to be first out;

d. a memory stack which can be operated as either LIFO or FIFO and is designated as a match stack;

e. data manipulating and searching means for performing concatenation, alternation and substring searching on strings of data words including:

(1) conductor means interconnecting said input register, output register, and LIFO memory stacks for transmitting digital signals for:

(a) moving strings of data words among said registers and said stacks, (b) moving a string of data words from the said match stack in LIFO mode onto a strng in a said right stack, and (c) moving a string of data words from said match stack in FIFO mode onto a string in said left stack.

(2) digital signal comparator means electrically connected to said conductor means including means for determining the identity or lack of identity of signals representing data words for:

(a) comparing a string of data words in the match stack word for word with the right end of a string in the left stack, and (b) comparing a string of data words in the match stack word for word with the left end of a string of data words in a right stack, whereby strings of data words in a right or left stack can be compared word by word while being moved into another stack so as to identify a substring which compares with a string in the match stack, and (3) electronic circuitry means for processing digital signals representing characters in said data words for performing the following primitive data operations in support of said comparator means:

(a) clear, whereby all stored words are obliterated, (b) push, whereby additional words are inserted, (c) pop, whereby stored words are released and obliterated in sequence, (d) read, whereby stored words are read, (e) write, whereby new words are inserted while replacing stored words in a one-to-one basis, (f) length, whereby the number of words stored in a stack is counted, (g) save, whereby words stored in a stack are retained in memory during another operation to permit restoration to the condition existing prior to that other operation, and (h) restore, whereby a stack content is returned to content existing prior to an operation; and (4) programmable control means for selecting the order, time and sequence of said primitive operations, whereby a sequence of pop operations from one stack and push operations to a second stack results in the concatenation of the string contained in the first stack to the string contained in the second stack, whereby a sequence of pop operations from a first stack and pop operations from a second stack wherein each word popped from the first stack is compared by the comparator means with the word popped from the second stack produces the alternation operation which determines whether or not the string contained in the first stack is the same as the string contained in the second stack, and whereby a sequence of pop operations on the second stack followed by said alternation operations determines whether or not the string in the first stack is a substring of the string contained in the second stack.

8. The distributive function information processing system of claim 1 wherein one said control processor is a programmable digital machine for performing lexical and syntax analysis on a program to determine, from the grammatical definition of the language of that program, what lower level machine language instructions are to be performed by processors using said lower level language, said control processor, designated a META control processor, comprising:

a. grammatic rule memory means for storing data representing the rules which grammatically define the language being used;

b. register, flip-flop and gating means for receiving and carrying out instructions received from another processing element of the system, said register, flip-flop and gating means generating instruction signals in response to instructions received, said instruction signals including signals meaning:

(1) pass the instruction to another processor (DIRECT), (2) do nothing (NOP), which is an instruction used for maintenance purposes, (3) initiate program translation using data stored in said grammatic rule memory representing the first such rule, and (4) continue program translation from the point in said rules last used;

c. programmable control circuitry means responsive to data stored in said grammatic rule memory means for generating operation signals to cause the META processor to initiate operations, said operation signals including signals meaning:

(1) scan the next program character, (2) convert a string of characters representing numbers to numbers or vice versa, (3) change the existing rule state:

(a) unconditionally, (b) based on data comparisons, (c) based on data classification, or (d) based on external conditions, (4) issue instructions to other processing elements, (5) access data from other processing elements, and (6) temporarily discontinue program translation;

d. means responsive to data stored in said grammatic rule memory means, to one or more said operation signals, and to data received from said program memory processor, said means including (i) data comparator means, (ii) data classifier means, (iii) state LIFO memory stack means, and (iv) state register means for determining which grammatic rule is to be used, as a function of:

(1) a current rule, and (2) the current program character;

e. register, flip-flop and gating means responsive to one or more said operation signals for issuing instructions to other processing elements wherein at least one said processing element is a program memory processor, said means including a control arc transmitter for each other processing element to which said META processor will issue instructions as determined by the current grammatic rule in effect;

f. means including (i) data multiplexer means and (ii) data register means responsive to one or more said operation signals for accessing the data produced by said other processing elements to which instructions are issued by said multiplexer and register means wherein one such processing element is said program memory processor;

g. means responsive to one or more said operation signals and to the current program character, said means including (i) data multiplexer means and (ii) data register means for converting strings of data characters representing a number to the number itself and vice versa;

whereby said META control processor can provide for translation of a higher to a lower level program language to permit programming of the system in said higher language and the operation of selected processing elements of the system on the basis of said lower language, said higher level program language being the language in which the program represented by the data stored in said program memory processor is written, and said lower level program language being the language in which the instructions produced by said META processor are written.

9. The distributive function information processing system of claim 1 wherein one or more processing elements constitute a programmable digital display machine subsystem providing for control and operation of visual images on at least two dissimilar display devices from a common string of data words which defines the images to be displayed and providing storage for and use of complex visual images made up of more simple display images which in turn may consist of still more simple display images comprising:

a. a display control unit designated a DSPL control processor for generating instructions for portions of the subsystem from a higher level definition of display images originating within the display subsystem or elsewhere in said system including:

(1) rule memory means for storing data representing rules defining the visual images to be generated, (2) instruction processing means for receiving and carrying out instructions received from another processing element in the system, (3) programmable control circuitry means responsive to data stored in said rule memory means for generating signals to cause said programmable digital display machine subsystem to perform operations, said signals including signals meaning:

(a) scan display program characters from at least two sources, (b) convert strings of characters, (c) change rule states, (d) issue instructions to other portions of the subsystem, (e) access data from other portions of the subsystem, and (f) discontinue interpretation of display program, (4) comparator, stack and state register means for determining which rule is to be used, (5) means including control arc means for issuing instructions to other processing elements wherein at least one is a symbol processor, (6) data multiplexer and register accessing means for accessing data produced by said other processing elements including said symbol processor;

whereby said DSPL control processor can define images to be displayed in a lower level machine language responsive to instructions received in a higher level language;

b. a display interface unit designated a DIU data processor for interconnecting the display subsystem with at least two dissimilar display devices including:

(1) means including a control arc receiver and an input instruction register for receiving instructions from said DSPL control processor, (2) means including a micro code generation memory and a timing generator circuit for controlling the execution of each instruction received from said DSPL control processor, (3) means including a memory and counters for accessing individual bits in said memory for data representing each dot of dots representing a primitive visual image for generating a dot pattern representing a predefined primitive visual image, (4) means including an adder, a four location random access memory and a cursor movement read only memory for computing and storing a cursor value representing the x and y coordinates of the desired location on the screen of a display device for showing a primitive visual image wherein said read only memory defines the numbers to be added to an existing cursor value to determine a new cursor value as a function of the instruction being executed and contains numbers which define exactly the value that one or more values of the random access locations are to assume for a given instruction, (5) means including counters, multiplexers, flip-flops and gates for generating addresses and control signals for creating a display on a flat panel plasma display, (6) counter and gating means for generating addresses and control signals for a refresh memory to allow construction of an x and y coordinate oriented dot image, (7) a refresh memory, and (8) counter and multiplexer means for reading out of said refresh memory a serial stream of data in the sequence needed by a raster-scan cathode ray display device to allow display of the image on said cathode ray display device;

c. a symbols data processing element, designated a SYM data processor for generating symbols data including:

(1) means including a control arc receiver and an input instruction register for receiving instructions from said DSPL control processor, (2) means including an output data register for holding data results for use by said DSPL processor, (3) means including a micro code generation read only memory and a timing circuit for controlling the execution of each instruction received from said DSPL, (4) symbol storage means, including a random access memory storage means, a symbol register and addressing circuitry for sequentially accessing data characters in a string, for storing character data representing the definition of a plurality of symbols wherein each symbol definition is a string having an associated start location in said storage means, wherein the last character for the definition of each string in the storage means is a symbol end character and wherein the other characters in such string represent characters for display controls, (5) symbol name starting address location memory means including a random access memory, a register, addressing circuitry and interconnections with other components of SYM for storing the starting address of symbols in the starting address memory, for allowing the output of said starting address memory means to be loaded into said symbol storage address register means and for allowing an output of said symbol storage means representing the name of a symbol to be used as the address of the starting address memory whereby one symbol may refer to yet another symbol in its definition, and (6) return address stack memory including an address stack circuit and interconnection with the symbol storage address register means for the transfer of memory addresses, for storing the addresses of symbol memory locations for use after completion of the execution of a symbol string in those instances in which the symbol is referred to by another more complex symbol.

10. A distributed function programmable digital information processing system for use in combination with at least one input-output device such as a keyboard, a mass memory device, a display device, a cathode ray tube, a data link and the like to constitute a complete information processing system, said system comprising:

a. a plurality of processing elements including:

(1) a plurality of data processors for performing data transformations on data received from other said processing elements or from one or more input-output devices and for causing transfers of data to other said processing elements or to one or more said input-output devices, said data processors each including control logic circuitry including at least one control logic instruction receiver for receiving, interpreting, and initiating said data transformations or transfers in response to control logic instructions received, said receivers also having means for transmitting responses to control logic instructions received, and (2) a plurality of control processors for controlling said data processors, other said control processors and said system by means of control logic instructions, said control processors each including control logic circuitry including at least one control logic instruction transmitter for generating and transmitting control logic instructions in response to one or more of:

(a) data received from one or more said input-output devices, (b) data received from another said processing element, and (c) control logic instructions received from another said control processor, said transmitters also having means for receiving responses to control logic instructions transmitted, at least one said control processor having control logic circuitry which also includes at least one control logic instruction receiver to permit that said control processor to receive as well as transmit control logic instructions whereby an instruction generated and transmitted may be in response to an instruction received, and at least one said control processor having control logic circuitry which also includes state defined control circuitry permitting said control processor to assume, in turn, two or more different states whereby said control processor is said to have state defined control and whereby a control logic instruction generated by it is in part a function of its state; and b. electrical circuit lines interconnecting said processing elements into a heterohierarchic functional grouping and interconnecting said processing elements with other devices including:

(1) external lines for interconnecting processing elements of said system with input-output devices, (2) a plurality of dedicated control logic instruction line sets, each set having two or more electrical conductors and connecting one said instruction transmitter or one said control processor to one said instruction receiver of another said processing element to constitute with said transmitter and receiver a control arc for interconnecting two different processing elements for communication of said instructions, each of said plurality of sets connecting one processing element to one other processing element to connect all of the processing elements into a single system, and (3) data lines in addition to said dedicated control logic instruction line sets for carrying said data among said processing elements, whereby the network created by said processing elements when interconnected by said dedicated control logic instruction line sets defines a mathematical graph in the sense of graph mathematics over the processing elements with said processing elements constituting the nodes of the graph permitting a theory of operation based on the theory of mathematics.

11. The distributed function programmable digital information processing system of claim 10 wherein:

a. two or more said control processors have control logic circuitry having at least one said instruction receiver;

b. two or more said control processors have state defined control; and c. three or more processing elements, including at least two control processors, at least one of which has state defined control, are so connected by control arcs that said elements with control arcs describe a loop.

12. The distributed function programmable digital information processing system of claim 10 wherein:

a. three or more said control processors have control logic circuitry having at least one said instruction receiver;

b. two or more said control processors have state defined control; and c. three or more said control processors having an instruction receiver including at least one also having state defined control are so connected by control arcs into a loop with the control arc direction of the transmitter to receiver being continuous around said loop to cause said loop to constitute a directed cycle whereby the theory of operation based on the graph theory of mathematics is permitted to be that of the directed graph theory of mathematics.

13. A distributed function programmable digital information processing system comprising:

a. a plurality of processing elements including:

(1) one or more input and output devices for providing information transfer to and from the system, (2) a plurality of data processors for performing data transformations on data received from other said processing elements in response to system control logic signals received from control processors and for providing output data to said output devices, said data processors each including one or more system control logic signal receivers for receiving, interpreting, responding to, and initiating data transformations in response to said system control logic signals received, and (3) a plurality of control processors for controlling said data processors and other said control processors by means of system control logic signals, said control processors each including one or more system control logic signal transmitters for generating, transmitting and receiving responses to said system control logic signals, and at least one of said control processors also including at least one system control logic signal receiver for receiving, interpreting, responding to, and initiating other said system control logic signals, and at least one of said control processors also including state defined control circuitry permitting said control processor to assume, in turn, two or more different states whereby the function performed by said control processor depends in part on its state to constitute the condition of state defined control; and b. electrical conductors interconnecting said processing elements including:

(1) a plurality of dedicated system control logic signal conductor sets with each set interconnecting one said system control logic signal transmitter of one said processing element and one said system control logic receiver of another said processing element, to constitute one control arc interconnecting two processing elements, and (2) data lines interconnecting said processing elements and interconnecting said input and output devices with said processing elements, whereby all said processing elements in the system are connected to one or more other processing elements by said data lines, said dedicated control signal conductors or both and wherein said input and output devices are connected to said data processors or control processors only by said data lines; and wherein the number of said control arcs is equal to or greater than the total number of control and data processors and the control arcs interconnecting two or more processing elements describe a loop.

14. The distributed function programmable digital information processing system of claim 13 wherein:

a. two or more control processors each include at least one system control logic signal receiver and are so interconnected by their control arcs and with at least one other processing element so that those processing elements along with their interconnecting control arcs describe a loop including three or more processing elements; and b. two or more control processors have state defined control of which at least one is one of said control processors forming said loop described by three or more processing elements and their interconnecting control arcs.

15. The distributed function programmable digital information system of claim 14 wherein:

a. there is at least a third control processor having at least one system control logic signal receiver;

b. said third control processor is a part of said loop formed by said two or more control processors; and c. said loop consists only of three or more control processors interconnected by control arcs which are oriented so that the direction of transmitter to receiver of the control arcs is continuous around the loop;

whereby said loop constitutes a directed cycle permitting application of a theory of operation based on the directed graph theory of mathematics.

16. A programmable digital string data processor for performing operations of string concatenation, alternation and substring search by manipulating and comparing strings of data words by transferring the words among a plurality of memory stacks comprising:

a. data input lines and an input register for receipt of data on which operations are to be performed;

b. an output register and data output lines for transmission of output data;

c. a plurality of LIFO memory stacks including:

(1) one LIFO stack designated a left stack which is particularly adapted for loading with a string of data words with the data word representing the right end of the string so located as to be first out, (2) at least one LIFO stack designated a right stack which is particularly adapted for loading with a string of data words with the data word representing the left end of the string so located as to be first out;

d. a memory stack which can be operated as either LIFO or FIFO and is designated as a match stack;

e. data manipulating and searching means for performing concatenation, alternation and substring searching on strings of data words including:

(1) conductor means interconnecting said input register, output register, and LIFO memory stacks for transmitting digital signals for:

(a) moving strings of data words among said registers and said stacks, (b) moving a string of data words from the said match stack in LIFO mode onto a string in a said right stack, and (c) moving a string of data words from said match stack in FIFO mode onto a string in said left stack, (2) digital signal comparator means electrically connected to said conductor means including means for determining the identity or lack of identity of signals representing data words for:

(a) comparing a string of data words in the match stack word for word with the right end of a string in the left stack, and (b) comparing a string of data words in the match stack word for word with the left end of a string of data words in a right stack, whereby strings of data words in a right or left stack can be compared word by word while being moved into another stack so as to identify a substring which compares with a string in the match stack, and (3) electronic circuitry means for processing digital signals representing characters in said data words for performing the following primitive data operations in support of said comparator means:

(a) clear, whereby all stored words are obliterated, (b) push, whereby additional words are inserted, (c) pop, whereby stored words are released and obliterated in sequence, (d) read, whereby stored words are read, (e) write, whereby new words are inserted while replacing stored words on a one-for-one basis, (f) length, whereby the number of words stored in a stack is counted, (g) save, whereby words stored in a stack are retained in memory during another operation to permit restoration to the condition existing prior to that other operation, and (h) restore, whereby a stack content is returned to content existing prior to an operation, (4) programmable control means for selecting the order, time and sequence of said primitive operations; and f. control connection and communication means connected to said programmable control means for receipt of control signals for controlling said string data processor;

whereby a sequence of pop operations from one stack and push operations to a second stack results in the concatenation of the string contained in the first stack to the string contained in the second stack, whereby a sequence of pop operations from a first stack and pop operations from a second stack wherein each word popped from the first stack is compared by the comparator means with the word popped from the second stack produces the alternation operation which determines whether or not the string contained in the first stack is the same as the string contained in the second stack, and whereby a sequence of pop operations on the second stack followed by said alternation operations determines whether or not the string in the first stack is a substring of the string contained in the second stack.

17. A programmable digital machine for performing lexical and syntax analysis on data representing a higher level language program to determine, from the grammatical definition of the language of that program, what instructions must be issued to and performed by a processor using a lower level machine language for interfacing and interpreting between components of a data processing system using a first higher level language and processing devices used by said system which use a second lower level language comprising:

a. grammatic rule memory means for storing data representing the rules which grammatically define the language being used;

b. electrical connector, register, flip-flop and gating means for connecting the machine to and for receiving and carrying out instructions received from another processing element of the system, said electrical connector, register, flip-flop and gating means generating instruction signals in response to instructions received, said instruction signals including signals meaning:

(1) pass the instruction to another processor (DIRECT), (2), do nothing (NOP), which is an instruction used for maintenance purposes, (3) initiate program translation using data stored in said grammatic rule memory representing the first such rule, and (4) continue program translation from the point in said rules last used;

c. programmable control circuitry means responsive to data stored in said grammatic rule memory means for generating operation signals to cause the machine to initiate operations, said operation signals including signals meaning:

(1) scan the next program character, (2) convert a string of characters representing numbers to numbers or vice versa, (3) change the existing rule state:

(a) unconditionally, (b) based on data comparisons, (c) based on data classification, or (d) based on external conditions, (4) issue instructions to other processing elements, (5) access data from other processing elements, and (6) temporarily discontinue program translation;

d. means responsive to data stored in said grammatic rule memory means, to one or more said operation signals, and to data received from said program processor, said means including (i) data comparator means, (ii) data classifier means, (iii) state LIFO memory stack means, and (iv) state register means for determining which grammatic rule is to be used, as a function of:

(1) a current rule, and (2) the current program character;

e. electrical connector, register, flip-flop and gating means responsive to one or more said operation signals for connecting the machine to and for issuing instructions to other processing elements in the system wherein at least one said processing element is a program memory processor, said means including a control arc transmitter for each other processing element to which said machine will issue instructions as determined by the current grammatic rule in effect;

f. means including (i) data multiplexer means and (ii) data register means responsive to one or more said operation signals for accessing the data produced by said other processing elements to which instructions are issued by said multiplexer and register means wherein one such processing element is said program memory processor;

g. means responsive to one or more operation signals and to the current program characters, said means including (i) data multiplexer means and (ii) data register means for converting strings of data characters representing a number to the number itself and vice versa;

whereby said machine can provide for translation of a higher to a lower level program language to permit programming of the system in said higher language and the operation of selected processing elements of the system on the basis of said lower language, said higher level program language being the language in which the program represented by the data stored in said program memory processor is written, and said lower level program language being the language in which the instructions produced by said machine are written.

18. A programmable digital display machine providing for control and operation of visual images on at least two dissimilar display devices from a common string of data words which defines the images to be displayed and providing storage for and use of complex visual images made up of more simple display images which in turn may consist of still more simple display images in response to data and control signals received from another system comprising:

a. a display control unit designated a DSPL control processor for generating instructions for portions of the display machine from a higher level definition of display images originating within the display machine or elsewhere in said system from which said machine receives data and control signals including:

(1) rule memory means for storing data representing rules defining the visual images to be generated, (2) instruction processing means for receiving and carrying out instructions received from a processing element in said system from which said machine receives data and control signals, (3) programmable control circuitry means responsive to data stored in said rule memory means for generating signals to cause the said programmable digital display machine to perform operations, said signals including signals meaning:

(a) scan display program characters from at least two sources, (b) convert strings of characters, (c) change rule states, (d) issue instructions to other portions of the display machine, (e) access data from other portions of the display machine, and (f) discontinue interpretation of display program;

(4) comparator, stack and state register means for determining which rule is to be used, (5) means including control logic circuitry and interconnections means for issuing instructions to other portions of the display machine wherein at least one portion is a symbol processor, (6) data multiplexer and register accessing means for accessing data produced by said other portions of the display machine including said symbol processor, whereby said DSPL control processor can define images to be displayed in a lower level machine language responsive to instructions received in a higher level language;

b. a display interface unit designated a DIU data processor for interconnecting the display machine with at least two dissimilar display devices including:

(1) means including control logic circuitry and an input instruction register for receiving instructions from said DSPL control processor, (2) means including a micro code generation memory and a timing generator circuit for controlling the execution of each instruction received from said DSPL control processor, (3) means including a memory and counters for accessing individual bits in said memory for data representing each dot of dots representing a primitive visual image for generating a dot pattern representing a predefined primitive visual image, (4) means including an adder, a four location random access memory and a cursor movement read only memory for computing and storing a cursor value representing the x and y coordinates of the desired location on the screen of a display device for showing a primitive visual image wherein said read only memory defines the numbers to be added to an existing cursor value to determine a new cursor value as a function of the instruction being executed and contains numbers which define exactly the value that one or more values of the random access locations are to assume for a given instruction, (5) means including counters, multiplexers, flip-flops and gates for generating addresses and control signals for creating a display on a flat panel plasma display, (6) counter and gating means for generating addresses and control signals for a refresh memory to allow construction of an x and y coordinate oriented dot image, (7) a refresh memory, and (8) counter and multiplexer means for reading out of said refresh memory a serial stream of data in the sequence needed by a raster-scan cathode ray display device to allow display of the image on said cathode ray display device; and c. a symbols data processing element designated a SYM data processor for generating symbols data including:

(1) means including control logic circuitry and an input instruction register for receiving instructions from said DSPL control processor, (2) means including an output data register for holding data results for use by said DSPL processor, (3) means including a micro code generation read only memory and a timing circuit for controlling the execution of each instruction received from said DSPL, (4) symbol storage means, including a random access memory storage means, a symbol register and addressing circuitry for sequentially accessing data characters in a string, for storing character data representing the definition of a plurality of symbols wherein each symbol definition is a string having an associated start location in said storage means, wherein the last character for the definition of each string in the storage means in a symbol end character and wherein the other characters in such string represent characters for display controls, (5) symbol name starting address location memory means including a random access memory, a register, addressing circuitry and interconnections with other components of SYM for storing the starting address of symbols in the starting address memory, for allowing the output of said starting address memory means to be loaded into said symbol storage address register means and for allowing an output of said symbol storage means representing the name of a symbol to be used as the address of the starting address memory whereby one symbol may refer to yet another symbol in its definition, (6) return address stack memory including an address stack circuit and interconnection with the symbol storage address register means for the transfer of memory addresses, for storing the addresses of symbol memory locations for use after completion of the execution of a symbol string in those instances in which the symbol is referred to by another more complex symbol.

* * * * *